US007747552B2

(12) United States Patent
Kairo et al.

(10) Patent No.: US 7,747,552 B2
(45) Date of Patent: Jun. 29, 2010

(54) PREDICTING SAND-GRAIN COMPOSITION AND SAND TEXTURE

(75) Inventors: Suzanne Kairo, Houston, TX (US); William A. Heins, Houston, TX (US); Karen M. Love, Pearland, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 661 days.

(21) Appl. No.: 11/631,740

(22) PCT Filed: May 31, 2005

(86) PCT No.: PCT/US2005/018821

§ 371 (c)(1), (2), (4) Date: Jan. 5, 2007

(87) PCT Pub. No.: WO2006/016942

PCT Pub. Date: Feb. 16, 2006

(65) Prior Publication Data

US 2009/0012746 A1 Jan. 8, 2009

Related U.S. Application Data

(60) Provisional application No. 60/586,061, filed on Jul. 7, 2004, provisional application No. 60/588,265, filed on Jul. 15, 2004.

(51) Int. Cl.
*G06F 17/00* (2006.01)
*G06N 5/00* (2006.01)

(52) U.S. Cl. .......... 706/45

(58) Field of Classification Search .......... 706/45; 702/181

See application file for complete search history.

(56) References Cited

U.S. PATENT DOCUMENTS 4,279,307 A * 7/1981 Jones .......... 166/370

(Continued)

FOREIGN PATENT DOCUMENTS

WO WO 2005/052639 6/2005

(Continued)

OTHER PUBLICATIONS

Texture synthesis using asymmetric 2-D noncausal AR models, J.K. Tugnait; Higher-Order Statistics, 1993., IEEE Signal Processing Workshop on Digital Object Identifier: 10.1109/HOST.1993.264594 Publication Year: 1993 , pp. 71-75.*

(Continued)

*Primary Examiner*—Michael B Holmes
(74) *Attorney, Agent, or Firm*—ExxonMobil Upstream Research Company - Law Dept.

(57) ABSTRACT

A method and apparatus for predicting sand-grain composition and sand texture are disclosed. A first set of system variables associated with sand-grain composition and sand texture is selected (605). A second set of system variables directly or indirectly causally related to the first set of variables is also selected (610). Data for each variable in the second set is estimated or obtained (615). A network with nodes including both sets of variables is formed (625). The network has a directional links connecting interdependent nodes. The directional links honor known causality relationships. A Bayesian network algorithm is used (630) with the data to solve the network for the first set of variables and their associated uncertainties.

51 Claims, 9 Drawing Sheets

U.S. PATENT DOCUMENTS

| | | | | |
|---|---|---|---|---|
| 4,646,240 | A | 2/1987 | Serra et al. | 364/422 |
| 4,926,394 | A | 5/1990 | Doyen | |
| 4,991,095 | A | 2/1991 | Swanson | |
| 5,126,939 | A | 6/1992 | Carpentier et al. | |
| 5,416,750 | A | 5/1995 | Doyen et al. | |
| 5,444,619 | A | 8/1995 | Hoskins et al. | |
| 5,493,539 | A | 2/1996 | Haley et al. | |
| 5,539,704 | A | 7/1996 | Doyen et al. | |
| 5,612,928 | A | 3/1997 | Haley et al. | |
| 5,764,515 | A | 6/1998 | Guerillot et al. | |
| 5,835,883 | A | 11/1998 | Neff et al. | |
| 5,838,634 | A | 11/1998 | Jones et al. | |
| 5,844,799 | A | 12/1998 | Joseph et al. | |
| 5,952,569 | A | 9/1999 | Jervis et al. | |
| 5,953,680 | A | 9/1999 | Divies et al. | |
| 5,955,966 | A | 9/1999 | Jeffryes et al. | |
| 6,011,557 | A | 1/2000 | Keskes | |
| 6,205,402 | B1 | 3/2001 | Lazaar et al. | |
| 6,212,502 | B1 | 4/2001 | Ball et al. | |
| 6,246,963 | B1 | 6/2001 | Cross et al. | |
| 6,331,964 | B1 | 12/2001 | Barone | |
| 6,408,290 | B1 | 6/2002 | Thiesson et al. | 706/52 |
| 6,442,487 | B2 | 8/2002 | Kim | |
| 6,529,891 | B1 | 3/2003 | Heckerman | |
| 6,549,854 | B1 | 4/2003 | Malinverno et al. | |
| 6,571,619 | B2 | 6/2003 | Herron et al. | |
| 6,591,146 | B1 | 7/2003 | Pavlovic et al. | |
| 6,597,995 | B1 | 7/2003 | Cornu et al. | |
| 6,603,313 | B1 | 8/2003 | Srnka | |
| 6,614,716 | B2 | 9/2003 | Plona et al. | |
| 6,615,139 | B1 | 9/2003 | Chakravarthi | |
| 6,625,541 | B1 | 9/2003 | Shenoy et al. | |
| 6,646,437 | B1 | 11/2003 | Chitale et al. | |
| 6,654,692 | B1 | 11/2003 | Neff | |
| 6,662,147 | B1 | 12/2003 | Fournier et al. | |
| 6,721,661 | B2 | 4/2004 | Anstey | |
| 6,754,588 | B2 | 6/2004 | Cross et al. | |
| 6,766,255 | B2 | 7/2004 | Stone | |
| 6,771,800 | B2 | 8/2004 | Keskes et al. | |
| 6,826,486 | B1 | 11/2004 | Malinverno | |
| 6,844,729 | B2 | 1/2005 | Herron et al. | |
| 6,970,808 | B2 | 11/2005 | Abhulimen et al. | |
| 7,003,439 | B2 | 2/2006 | Aldred et al. | |
| 7,043,367 | B2 | 5/2006 | Granjeon | |
| 7,062,072 | B2 | 6/2006 | Anxionnaz et al. | 382/109 |
| 7,091,719 | B2 | 8/2006 | Freedman | |
| 7,117,091 | B2 | 10/2006 | Masson et al. | |
| 7,128,167 | B2 | 10/2006 | Dunlop et al. | |
| 7,177,764 | B2 | 2/2007 | Stone | |
| 7,181,380 | B2 | 2/2007 | Dusterhoft et al. | |
| 7,309,983 | B2 | 12/2007 | Freedman | |
| 7,320,002 | B2 | 1/2008 | Chickering | |
| 7,337,069 | B2 | 2/2008 | Masson et al. | |
| 7,392,199 | B2 | 6/2008 | Karlov et al. | |
| 7,433,851 | B2 | 10/2008 | Mirowski | |
| 2004/0122640 | A1 | 6/2004 | Dusterhoft | |
| 2008/0288172 | A1 | 11/2008 | Stone | |
| 2009/0012746 | A1 | 1/2009 | Kairo et al. | |

FOREIGN PATENT DOCUMENTS

| | | |
|---|---|---|
| WO | WO 2005/066660 | 7/2005 |
| WO | WO 2006/112864 | 10/2006 |
| WO | WO2006/112864 | 10/2006 |

OTHER PUBLICATIONS

Bottled Sand Movies, Carvalho, B.M.; Neto, L.S.B.; Oliveira, L.M.; Computer Graphics, Imaging and Visualisation, 2006 International Conference on Digital Object Identifier: 10.1109/CGIV.2006.29 Publication Year: 2006 , pp. 402-407.*

Eidsvick, et al. (2004) “Stochastic Reservoir Characterization Using Prestack Seismic Data,” *Geophysics* v. 69 No. 4, pp. 978-993.

Folk, R. L. (1968) “Petrology of Sedimentary Rocks,” Austin, Texas, *Hemphill Publishing Co.*, p. 110-119.

Johnsson, M. J. et al (1993) “The system controlling the composition of clastic sediments,” (eds); *Processes Controlling the Composition of Clastic Sediments*: Geological Society of America Special Paper 284, p. 1-19.

Potter, P. E. et al. (1956) “Sources of Basal Pennsylvanian sediments in the Eastern Interior Basin Part 3, some methodological implications,” *Journal of Geology*, v. 64, p. 447-455.

Potter, P. E. et al. (1978) “Petrology and chemistry of modern big river sands,” *Journal of Geology*. v. 86; p. 423-449.

EP Standard Search Report (2005) 2 pages.

Krynine, Paul D. (1943) “Diastrophism and the Evolution of Sedimentary Rocks,” *Pennsylvania State College Mineral Industries*, Technical Paper No. 84-a, 21 pgs.

PCT International Search & Written Opinion, 6 pages, 2007.

“An Oil Drilling Problem,” Bayesian Models CSE458 Exercise 2, Computer Science Semester I, 2003, School of Computer Science and Software Engineering, Monash University.

Coopersmith, E.M. et al. (2002) “A Practical Approach to Evaluating the Value of Information and Real Option Decisions in the Upstream Petroleum Industry,” Society of Petroleum Engineers, SPE Paper 77582, 10 pgs.

Eidsvik, et al. (2002), “Seismic Reservoir Prediction using Bayesian Integration of Rock Physics and Markov Random Fields: A North Sea Example.” Leading Edge, 21, 290-94.

Hargrave, M.M. (2003) “Prediction and Productivity Improvement in Quantitative Interpretation via Rock Physics Modeling and Interpreted Led Automation,” First Break, vol. 21, Sept. 2003.

Pendock, N. E. et al. (2002) “Choosing Geologic Models With Bayesian [sic] Belief Networks,” *S. African Journal of Sci*., 98, pp. 500-502.

Reid, C. A. et al. (1985) “A Knowledge Representation for Reasoning about Petroleum Geology,” 2nd *IEEE Computer Soc. Artif. Intel. Appl. Conf.*, Miami Beach, Fl. pp. 125-129.

Rostirolla, S.P. et al. (2003) “Bayesian Assessment of Favorability for Oil and Gas Prospects over the Reconcavo Basin, Brazil,” AAPG Bulletin, Apr. 2003 v. 87 No. 4 pp. 647-666.

Rudolph, K.W. (2001) “DHI/AVO Analysis Best Practices: A Worldwide Analysis,” *AAPG Distinguished Lecture*, 20 pgs.

Smyth, P. (1997) “Belief Networks, Hidden Markov Models, and Markof Random Fields: A Unifying View,” Pattern Recognition Letters, 18, pp. 1261-1268.

Spiegenhalter, D.J. et al. (1993) “Bayesian Analysis in Expert Systems,” Statistical Sci., 8, pp. 219-283.

Veezhinathan, J. (1992) “Uncertainty Handling Using Belief Networks and Their Applications to Petroleum Industry,” Proc. Arti Artif. Intel. In Petrol. Exploration & Production Conf., Houston, Texas, pp. 9-24.

Xiang, Y. et al. (2000) “A Constructive Bayesian Approach for Vehicle Monitoring,” Thesis, pp. 14-21.

* cited by examiner

PREDICTING SAND-GRAIN COMPOSITION AND SAND TEXTURE

This application is the National Stage of International Application No. PCT/US2005/018821, filed 31 May 2005, which claims the benefit of U.S. Provisional Patent Application Nos. 60/586,061 filed on Jul. 7, 2004 and 60/588,265 filed on Jul. 15, 2004.

BACKGROUND

Bayesian networks are a tool for modeling systems. A description of Bayesian networks is provided in U.S. Pat. No. 6,408,290, which description is provided below, with omissions indicated by ellipses. FIG. 1 from the U.S. Pat. No. 6,408,290 patent is replicated as FIG. 1 hereto:

A Bayesian network is a representation of the probabilistic relationships among distinctions about the world. Each distinction, sometimes called a variable, can take on one of a mutually exclusive and exhaustive set of possible states. A Bayesian network is expressed as an acyclic-directed graph where the variables correspond to nodes and the relationships between the nodes correspond to arcs. FIG. 1 depicts an exemplary Bayesian network 101. In FIG. 1 there are three variables, $X_1$, $X_2$, and $X_3$, which are represented by nodes 102, 106 and 110, respectively. This Bayesian network contains two arcs 104 and 108. Associated with each variable in a Bayesian network is a set of probability distributions. Using conditional probability notation, the set of probability distributions for a variable can be denoted by $p(x_i|\Pi_i,\zeta)$ where "p" refers to the probability distribution, where "$\Pi_i$" denotes the parents of variable $X_i$ and where "$\zeta$" denotes the knowledge of the expert. The Greek letter "$\zeta$" indicates that the Bayesian network reflects the knowledge of an expert in a given field. Thus, this expression reads as follows: the probability distribution for variable $X_i$ given the parents of $X_i$ and the knowledge of the expert. For example, $X_1$ is the parent of $X_2$. The probability distributions specify the strength of the relationships between variables. For instance, if $X_1$ has two states (true and false), then associated with $X_1$ is a single probability distribution $p(x_i|\zeta)$ and associated with $X_2$ are two probability distributions $p(x_i|x_1=t,\zeta)$ and $p(x_i|x_1=f,\zeta)$ . . . .

The arcs in a Bayesian network convey dependence between nodes. When there is an arc between two nodes, the probability distribution of the first node depends upon the value of the second node when the direction of the arc points from the second node to the first node. For example, node 106 depends upon node 102. Therefore, nodes 102 and 106 are said to be conditionally dependent. Missing arcs in a Bayesian network convey conditional independencies. For example, node 102 and node 110 are conditionally independent given node 106. However, two variables indirectly connected through intermediate variables are conditionally dependent given lack of knowledge of the values ("states") of the intermediate variables. Therefore, if the value for node 106 is known, node 102 and node 110 are conditionally dependent.

In other words, sets of variables X and Y are said to be conditionally independent, given a set of variables Z, if the probability distribution for X given Z does not depend on Y. If Z is empty, however, X and Y are said to be "independent" as opposed to conditionally independent. If X and Y are not conditionally independent, given Z, then X and Y are said to be conditionally dependent given Z.

The variables used for each node may be of different types. Specifically, variables may be of two types: discrete or continuous. A discrete variable is a variable that has a finite or countable number of states, whereas a continuous variable is a variable that has an uncountably infinite number of states . . . . An example of a discrete variable is a Boolean variable. Such a variable can assume only one of two states: "true" or "false." An example of a continuous variable is a variable that may assume any real value between −1 and 1. Discrete variables have an associated probability distribution. Continuous variables, however, have an associated probability density function ("density"). Where an event is a set of possible outcomes, the density p(x) for a variable "x" and events "a" and "b" is defined as:

$$p(x) = \lim_{a \to b}\left[\frac{p(a \le x \le b)}{|(a-b)|}\right]$$

where $p(a \leqq x \leqq b)$ is the probability that x lies between a and b.

Bayesian networks also make use of Bayes Rule, which states:

$$p(B \mid A) = \frac{p(B) \cdot p(A \mid B)}{p(A)}$$

for two variables, where $p(B|A)$ is sometimes called an a posteriori probability. Similar equations have been derived for more than two variables. The set of all variables associated with a system is known as the domain.

Building a network with the nodes related by Bayes Rule allows changes in the value of variables associated with a particular node to ripple through the probabilities in the network. For example, referring to FIG. 1, assuming that $X_1$, $X_2$ and $X_3$ have probability distributions and that each of the probability distributions is related by Bayes Rule to those to which it is connected by arcs, then a change to the probability distribution of $X_2$ may cause a change in the probability distribution of $X_1$ (through induction) and $X_3$ (through deduction). Those mechanisms also establish a full joint probability of all domain variables (i.e. $X_1$, $X_2$, $X_3$) while allowing the data associated with each variable to be uncertain.

Geoscientists are frequently interested in sandstone reservoir porosity and permeability, which are often related to the likelihood of producing commercial quantities of hydrocarbons from the reservoir. Some existing tools predict sandstone reservoir porosity and permeability as a function of compaction and cementation using physics- and chemistry-based numerical models. Many of these tools take sand composition and grain-size information as inputs.

SUMMARY

In general, in one aspect, the invention features a casual, probabilistic method for predicting sand-grain composition and sand texture. The method includes selecting a first set of system variables associated with sand-grain composition and sand texture and a second set of system variables directly or indirectly causally related to the first set of variables. The method further includes obtaining or estimating data for each variable in the second set and forming a network with nodes including both sets of variables. The network has directional links connecting interdependent nodes. The directional links honor known causality relationships. The method includes using a Bayesian network algorithm with the data to solve the network for the first set of variables and their associated uncertainties.

Implementations of the invention may include one or more of the following. The method may include appraising the quality of selected data and including the quality appraisals in the network and in the application of the Bayesian network algorithm. The system may have a behavior and the method may further include selecting the first set of variables and the second set of variables so that together they are sufficiently complete to account for the behavior of the system.

Forming the network may include forming a third set of intermediate nodes interposed between at least some of the nodes representing the first set of system variables and at least some of the nodes representing the second set of system variables. Selecting the first set of system variables may include selecting one or more system variables associated with sand-grain composition and selecting one or more system variables associated with sand texture. Selecting the second set of system variables may include selecting one or more system variables associated with hinterland geology, selecting one or more system variables associated with hinterland weathering and transport, selecting one or more system variables associated with basin transport and deposition.

In general, in another aspect, the invention features a method for predicting sand-grain composition and sand texture. The method includes establishing one or more root nodes in a Bayesian network, establishing one or more leaf nodes in the Bayesian network, coupling the root nodes to the leaf nodes to enable the Bayesian network to predict sand-grain composition and texture.

Implementations of the invention may include one or more of the following. Establishing the one or more root nodes may include establishing one or more root nodes for hinterland geology, establishing one or more root nodes for hinterland weathering and transport, and establishing one or more root nodes for basin transport and deposition. Establishing one or more root nodes for hinterland geology may include establishing a root node for tectonic setting. Establishing one or more root nodes for hinterland weathering and transport may include establishing a root node for climate, establishing a root node for rate of hinterland uplift, and establishing a root node for hinterland transport distance. Establishing one or more root nodes for basin transport and deposition may include establishing a root node for rate of basin subsidence, establishing a root node for basin fluvial transport distance, and establishing a root node for depositional facies.

Establishing one or more leaf nodes may include establishing one or more leaf nodes for sand-grain composition and establishing one or more leaf nodes for sand texture. Establishing one or more leaf nodes for sand texture may include establishing a leaf node for grain size, establishing a leaf node for degree of sorting, and establishing a leaf node for deposited matrix abundance. Establishing the leaf node for grain composition may include establishing a leaf node for final CIBU sand, establishing a leaf node for final CISU sand, establishing a leaf node for final CAMBU sand, establishing a leaf node for final CAMSU sand, establishing a leaf node for final SAMV sand, and establishing a leaf node for final SAMP sand.

The method may further include establishing one or more intermediate nodes. Coupling the root nodes to the leaf nodes to enable the Bayesian network to predict sand-grain composition and texture may include coupling at least some of the one or more root nodes to at least some of the one or more leaf nodes through the one or more intermediate nodes. Coupling the root nodes to the leaf nodes to enable the Bayesian network to predict sand-grain composition and texture may include coupling the root nodes to the leaf nodes in causal relationships that honor observations of natural systems. Coupling the root nodes to the leaf nodes to enable the Bayesian network to predict sand-grain composition and texture may include defining for each root node one or more outputs that connect to other nodes that the root node causes, and defining for each intermediate node: one or more inputs that connect to the other nodes that cause the intermediate node, one or more outputs that connect to other nodes that the intermediate node causes, and defining for each leaf node one or more inputs that connect to other nodes that cause the leaf node.

Establishing the one or more root nodes may include creating a probability table for each root node, each probability table having one or more predefined states, and each predefined state having associated with it a probability that the root node is in that state. Creating the probability table for each root node may include completing the probability table based on quantitative observations of a natural system associated with the root node. The method may further include modifying the probability table based on quantitative observations of the natural system associated with the root node.

Establishing the one or more leaf nodes may include creating a probability table for each leaf node, each probability table having a respective one or more predefined states, and each predefined state having associated with it a probability that the leaf node is in that state. Each leaf node may have a predefined number of inputs and creating the probability table for each leaf node may include creating a probability table having the respective predefined number of input dimensions. Creating the probability table for each leaf node may include completing the probability table with data reflecting quantitative observations of a natural system associated with the leaf node. The method may further include modifying the probability table based on quantitative observations of the natural system associated with the leaf node.

Establishing the one or more intermediate nodes may include creating a probability table for each intermediate node, each probability table having a respective one or more predefined states, and each predefined state having associated with it a probability that the intermediate node is in that state. Each intermediate node may have a predefined number of inputs and creating the probability table for each intermediate node may include creating a probability table having the respective predefined number of input dimensions. Creating the probability table for each intermediate node may include completing the probability table with data reflecting quantitative observations of a natural system associated with the intermediate node. The method may further include modifying the probability table based on quantitative observations of the natural system associated with the intermediate node.

In general, in another aspect, the invention features a Bayesian network including one or more root nodes and one or more leaf nodes. The root nodes are coupled to the leaf nodes to enable the Bayesian network to predict sand-grain composition and texture.

In general, in another aspect, the invention features a method for predicting porosity and permeability including predicting sand-grain composition and sand texture from tectonic setting, hinterland weathering and transport, and basin transport and deposition using a Bayesian network, and predicting porosity and permeability from the predicted sand-grain composition and sand texture.

DETAILED DESCRIPTION

Detrital grain composition and grain-size distribution determine the initial porosity, permeability, and other petrophysical properties of a sandstone, such as for example a clastic petroleum reservoir. Grain composition and grain-size distribution also determine how petrophysical and reservoir properties evolve as the sand is buried. Understanding the composition and texture of a sandstone reservoir body can lead to a greater understanding of reservoir properties and their variation in space.

An example system to predict sand-grain composition and sand texture uses a Bayesian network to model the relationship among (1) environment (e.g. tectonic setting, topography, climate, transport/deposition systems), (2) sand generating and modifying processes (e.g. mechanical shattering and abrasion, chemical dissolution, hydrodynamic sorting), and (3) the resulting sand character (e.g. composition, texture and clay-matrix content).

Figure 1:
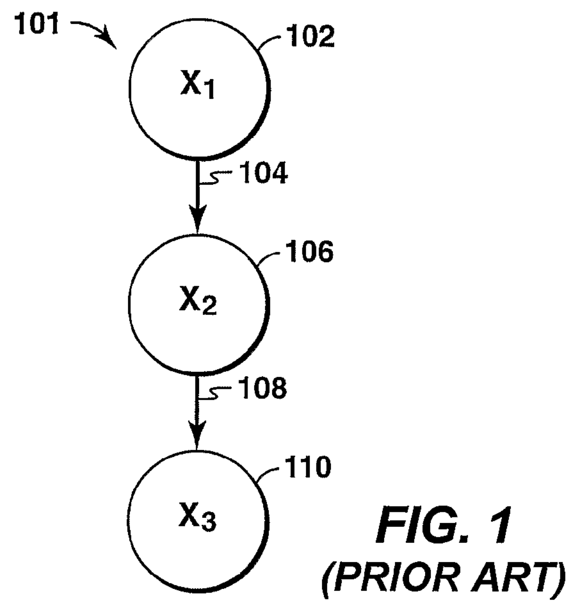
FIG. 1 is a representation of a simple Bayesian network.
Figure 2:
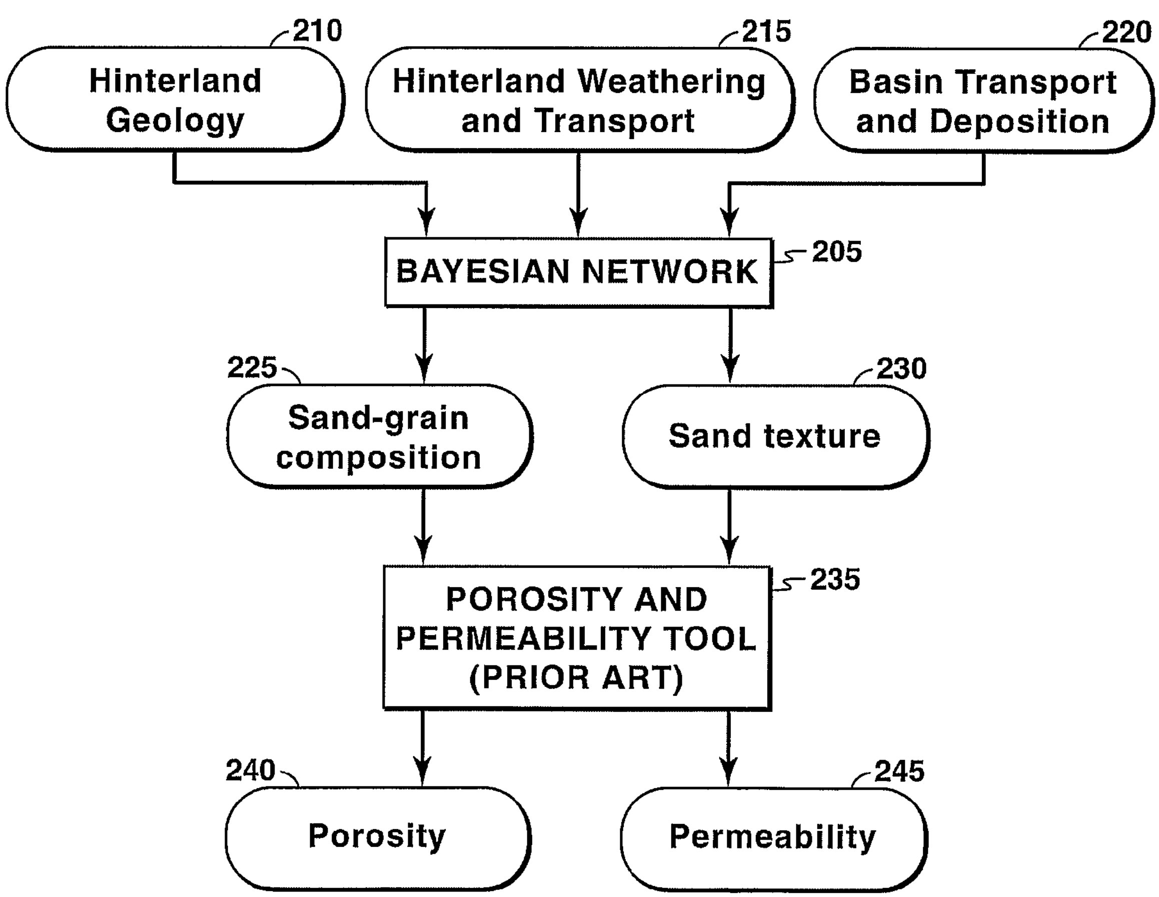
FIG. 2 is a block diagram of a system for predicting porosity and permeability using a Bayesian network to predict sand-grain composition and sand texture.

Such a system can be used to predict porosity and permeability, as shown in FIG. 2. An example Bayesian network 205 has the following inputs: hinterland geology 210, hinterland weathering and transport 215, and basin transport and deposition 220. The outputs of the Bayesian network are sand-grain composition 225 and sand texture 230. The words "input" and "output" might be considered misnomers in this context. One characteristic of Bayesian networks is that the probability distributions of any node in the network can be adjusted. The adjustments may cause changes in the probability distributions associated with other nodes in the network depending on the interconnections between the nodes. Thus, for example, a user of the Bayesian network may adjust the probability distribution of the sand-grain composition "output" 225, producing an effect on the hinterland geology "input" 210. A more likely use of the Bayesian network, however, is to adjust the inputs 210, 215, and 220 and to monitor the effect on the outputs 225 and 230.

In one example system, the resulting predictions of sand-grain composition 225 and sand texture 230 are applied as inputs to an existing porosity and permeability tool 235, which produces estimates of porosity 240 and permeability 245.

As mentioned above, a Bayesian network is a formal statistical structure for reasoning in the face of uncertainty, which propagates evidence (or information), along with its associated uncertainties, through cause-and-effect, correlation or functional relationships to yield the probabilities of various inferences that could be drawn from the evidence. A Bayesian network can be formulated by a variety of computational techniques, including use of commercial software, or programming directly in standard computing languages.

The Bayesian network 205 makes detailed, quantitative predictions about sand composition, texture, and matrix content simultaneously. "Sand character" may be parameterized as sand composition, mean grain size, sorting, and matrix content. "Sand composition" may be parameterized as a finite number of discrete sand compositions defined by specific ratios of grain types and discrete grain-size distributions defined by specific ratios of grain sizes.

The predictions about sand character are detailed enough to use for making further predictions about hydrocarbon reservoir properties. The simultaneous prediction of all aspects of sand character derives from the holistic, cause-and-effect geoscience thinking that underlies the model. Using the Bayesian network 205:

- All potential states of the system are explicitly defined, through the choice of specific nodes, and defined states of each node;
- All relationships within the system are defined and quantified, by the specific structure of the network and probability tables;
- The model can be updated from data, via modification of the probability tables;
- Inferences can be drawn inductively (child nodes from parent nodes) or deductively (parent nodes from child nodes).

Figure 3:
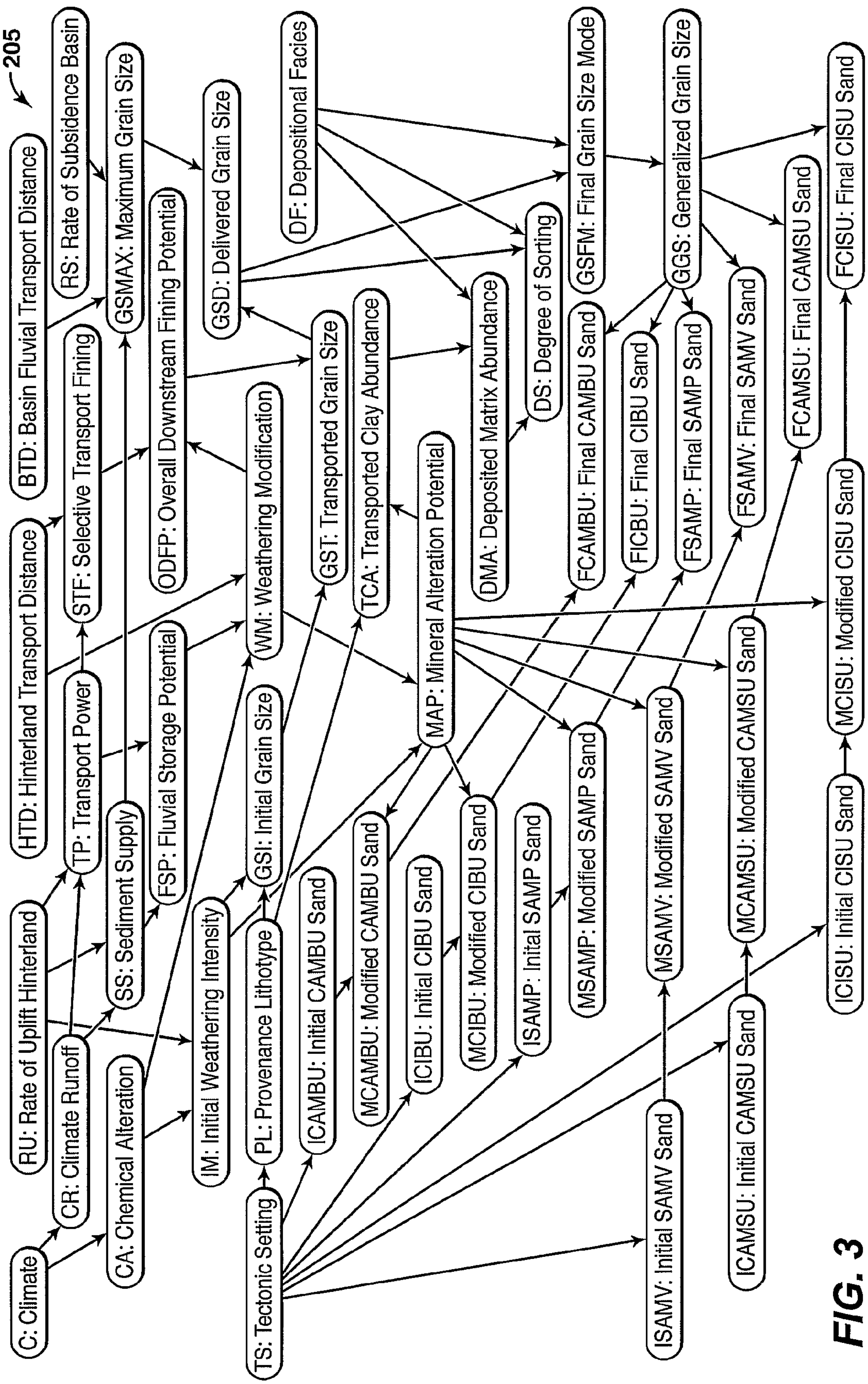
FIG. 3 is a representation of a Bayesian network to predict sand-grain composition and sand texture.

A detailed representation of the Bayesian network 205, shown in detail for one embodiment of the present invention in FIG. 3, includes nodes and arcs between the nodes. The network includes three varieties of nodes: (a) a root node, which has only arcs with the direction of the arc being away from the root node (i.e. the root node is only a parent node and not a child node), (b) leaf nodes, which have only arcs with the direction of the arc being toward the nodes (i.e., leaf nodes are only child nodes and not parent nodes), and (c) intermediate nodes, which have arcs directed toward the nodes and arcs directed away from the nodes (i.e., intermediate nodes are both parent nodes and child nodes).

In one example system, each node in the Bayesian network 205 has associated with it one or more states. Each node also has associated with it a probability distribution. The following materials, which disclose an example Bayesian network 205 in detail, are included at the end of this application before the claims and are a part of this application: (a) Description of Nodes; (b) Node States; and (c) Node Probability Distribution.

FIG. 3 illustrates one embodiment of Bayesian network 205. The same relationship between the root and leaf nodes could be achieved with a different set of intermediate nodes interconnected in a different manner. The system described by the Bayesian network 205 could also be described with different root, leaf and intermediate nodes.

The details of the Bayesian network structure and conditional probabilities may be changed depending on modeling conditions and level of knowledge about the system being modeled. The model will have the greatest predictive power when input probabilities are well constrained by evidence and the conditional probabilities are well conditioned with data.

Figure 4:
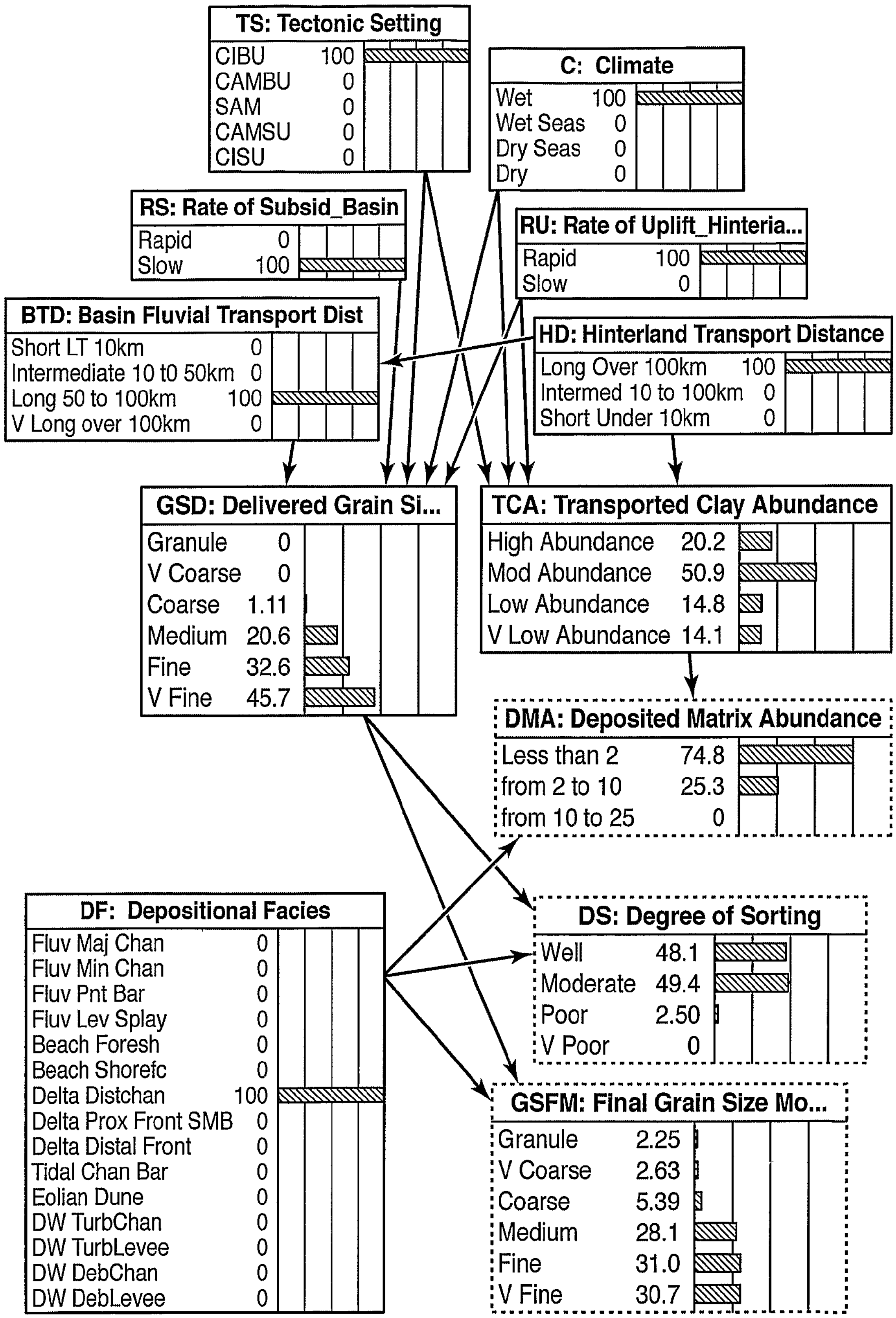
FIG. 4 is an example of a portion of the Bayesian network of FIG. 3 showing the prediction of sand texture.
Figure 5:
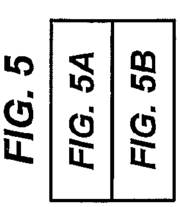
FIG. 5 is an example of a portion of the Bayesian network of FIG. 3 showing the prediction of sand-grain composition.
Figure 5A:
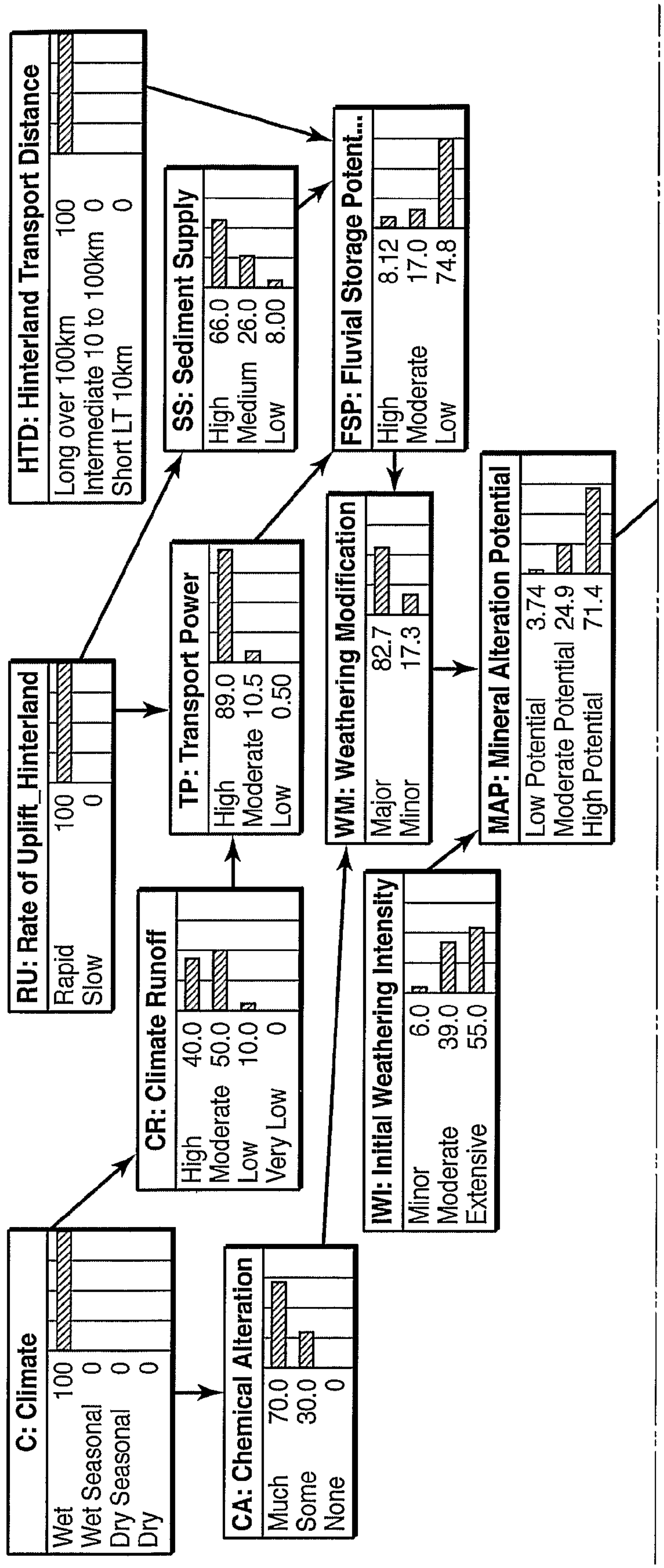
Figure 5B:
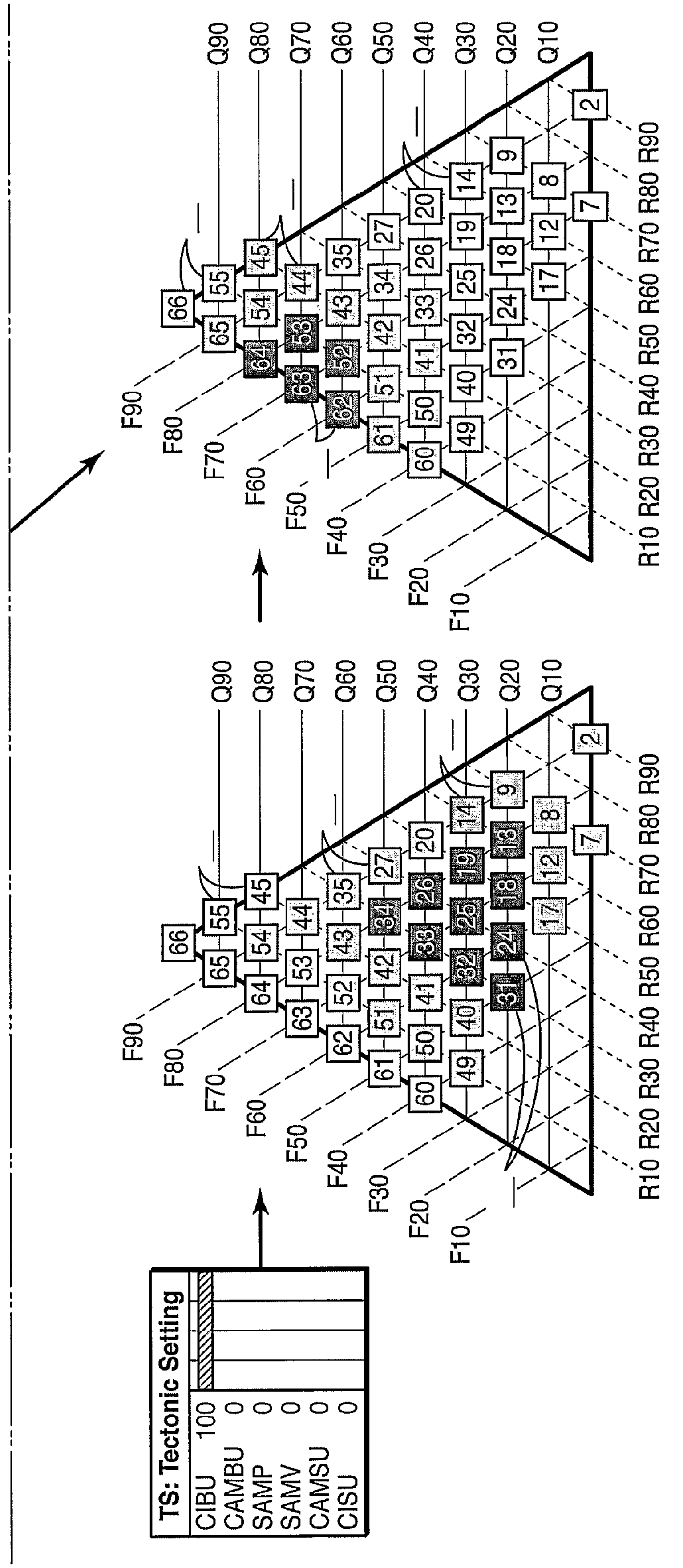

FIGS. 4 and 5 illustrate examples of the probability distribution for each state of the output (leaf) nodes when each input (root) node is set with probability=1 for one state, and all others set to 0.

In these examples, it is assumed that the seven input nodes have the following values:

1. Tectonic Setting is "Continental Interior Basement Uplift" (CIBU);
2. Climate is "Wet";
3. Uplift Rate is "Fast";
4. Hinterland Transport Distance is "Long";
5. Basin Subsidence Rate is "Slow"; and
6. Basin Transport Distance is "Long".
7. Depositional Facies is "Delta, Distributary Channel"

FIG. 4 illustrates a prediction of sand texture. In this example, all of the input nodes except Depositional Facies influence the probability distribution for the texture of sediment delivered to the depositional environment (Delivered Grain Size and Transported Clay Abundance). The delivered texture is convolved with Depositional Facies to determine the probability distribution for the states of Deposited Matrix Abundance, Degree of Sorting, and Final Grain Size Mode.

FIG. 5 illustrates a prediction of sand composition. In this example, the QFR ternary diagram on the left side of FIG. 5 shows the probability of initial sand composition derived from the exposed provenance-lithotype assemblage implied by the CIBU tectonic setting; the degree of shading associated with each small square in the triangle representing the associated probability, with the darkest square being the most probable. The ternary diagram on the right side of FIG. 5 represents fine, medium and coarse fractions of the final sand composition. Again, the distribution of probabilities of those fractions is represented by small squares within the triangle, with the darkest square being the most probable. In each case, the most probable initial composition has no probability of being the final composition because of evolution that happens during transport to and within the basin. Transport to the basin removes some grain types more than others (and reduces the size of surviving grains) through the collaboration of mechanical abrasion and chemical dissolution. Transport and deposition in the basin segregates sand by grain size through hydrodynamic sorting; because some grain types are naturally associated with particular sizes, sorting influences composition. For example, rock fragments tend to be more abundant in the coarsest grain sizes, and feldspar tends to be most abundant in the finest grain sizes. Thus, the Final Grain Size Mode node is both an output of the model and an intermediate node for Sand Composition Suite, Final.

Figure 6:
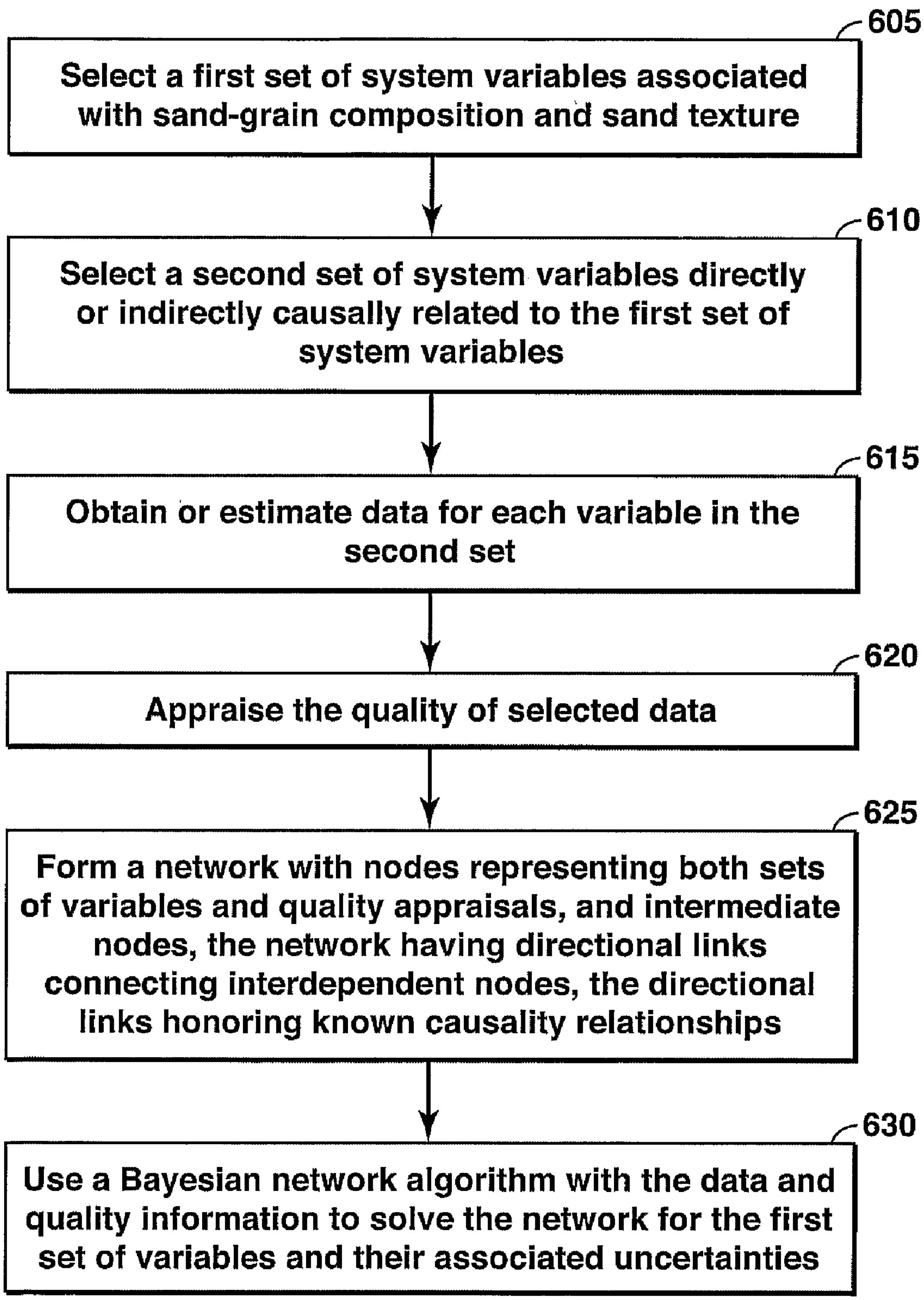
FIGS. 6-14 are flowcharts illustrating the development of a Bayesian network to predict sand-grain composition and sand texture.

One example for constructing a Bayesian network for predicting sand-grain composition and sand texture, illustrated in FIG. 6, begins by selecting a first set of system variables associated with sand-grain composition and sand texture (block 605). A second set of system variables directly or indirectly causally related to the first set of system variables is then selected (block 610). Data for each variable in the second set is then obtained or estimated (block 615). In many cases, this may involve estimating a probability distribution for some or all of the variables in the second set. As data for the variables in the second set are gathered, the probability distribution estimates may become more refined. The quality, or reliability, of selected data is then appraised (block 620). Appraising quality of selected data is optional and may occur for all, some, or none of the obtained or estimated data.

A network is then formed (block 625). The network contains nodes representing both the first and the second sets of variables and the quality appraisals. The network also contains intermediate nodes that may be situated between the first set of nodes and the second set of nodes. The network also includes directional links connecting interdependent nodes. The directional links honor known causality relationships. By way of explanation of the requirement for honoring known causality relationships, the reader is referred to a published example of a Bayesian approach (to a different petroleum application) that does not teach or suggest this requirement. See "Stochastic Reservoir Characterization Using Prestack Seismic Data," Eidsvick, et al., *Geophysics* 69, pp. 978-993 (2004). The network disclosed therein contains connections of the following kind: A causes B and C, and because B and C cause D, A is an indirect cause of D. But A is also shown in the illustrated network to be a direct cause of D. For purposes of the present invention, this is considered a logical error. Such a network does not honor known causality relationships. For further elaboration of this point, the reader is referred to U.S. Patent Application No. 60/586,027, entitled Bayesian Network Applications To Geology And Geophysics, filed on Jul. 7, 2004.

A Bayesian network algorithm is then applied to the data and quality information to solve the network for the first set of variables and their associated uncertainties (block 630). The present inventive method requires no data or other information about the first set of system variables or any similar variables associated with sand grain composition and sand texture.

Figure 7:
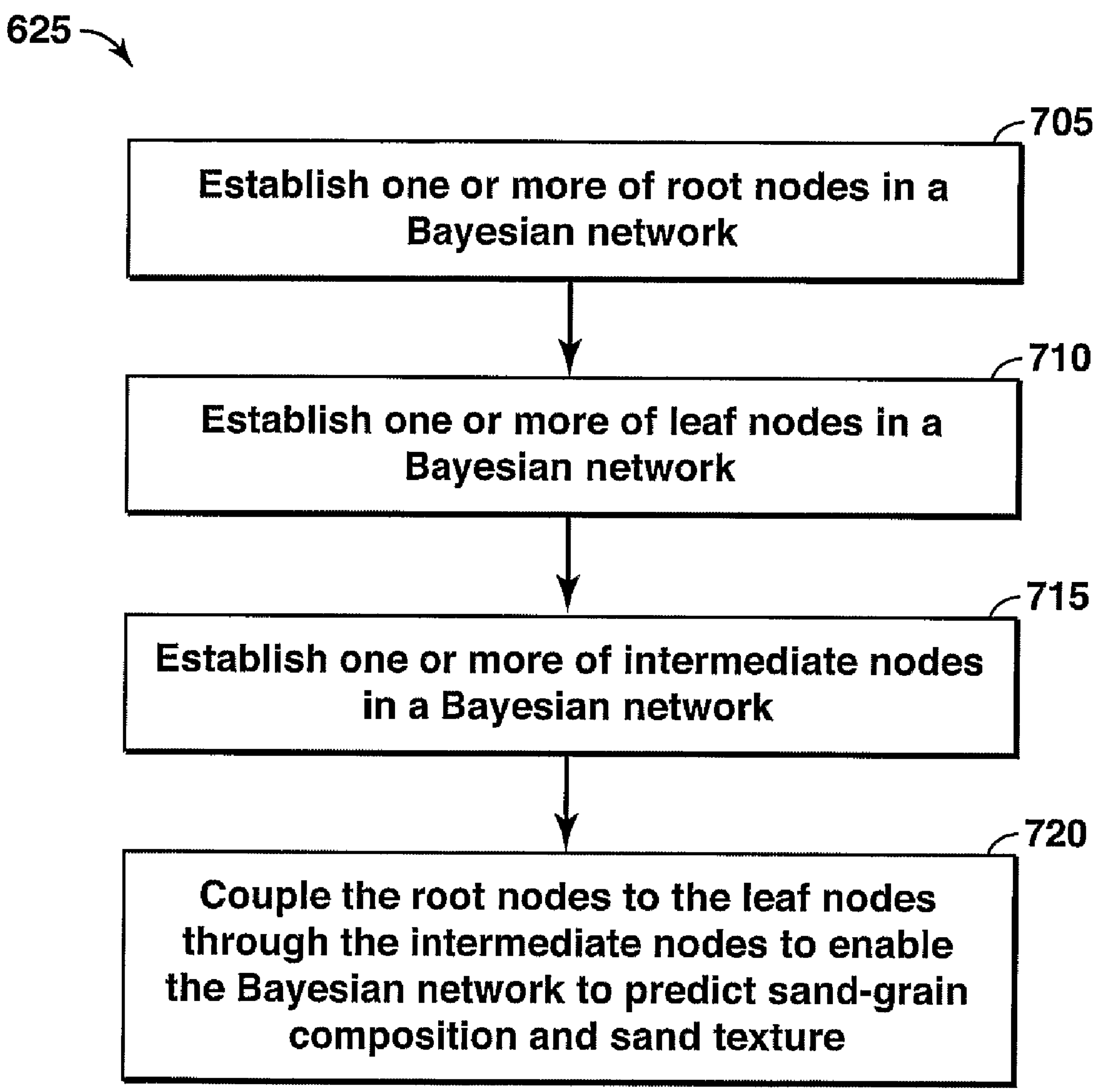

An example of forming a network (block 625), shown in detail in FIG. 7, includes establishing one or more root nodes in a Bayesian network (block 705). One or more leaf nodes (block 710) and one or more intermediate nodes are also established (block 715).

The root nodes are coupled to the leaf nodes through the intermediate nodes to enable the Bayesian network to predict sand-grain composition and sand texture (block 720).

Figure 8:
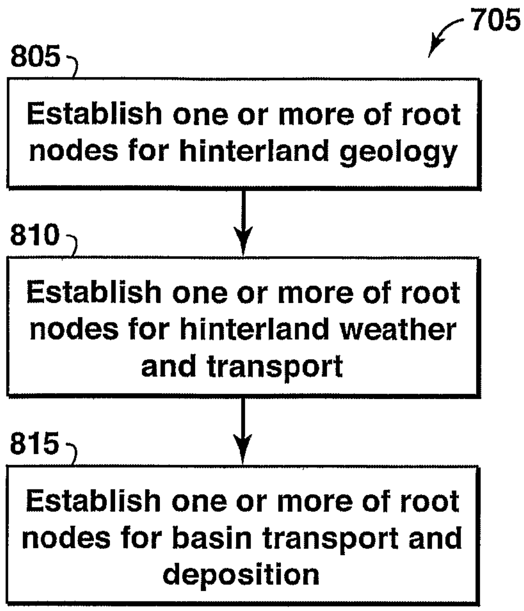

An example of establishing one or more root nodes in a Bayesian network (block 705), shown in more detail in FIG. 8, includes establishing one or more root nodes for hinterland geology (block 805), establishing one or more root nodes for hinterland weathering and transport (block 810), and establishing one or more root nodes for basin transport and deposition (block 815).

Figure 9:
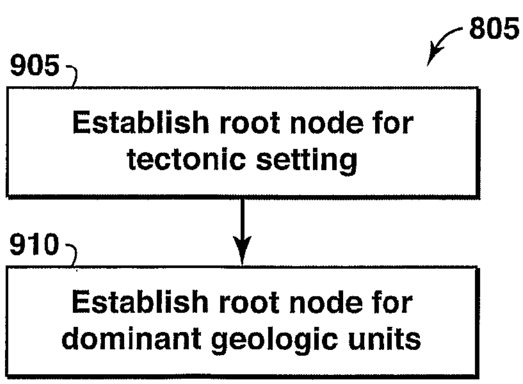

An example of establishing one or more root nodes for hinterland geology (block 805), shown in more detail in FIG. 9, includes establishing a root node for tectonic setting (block 905) and establishing a root node for dominant geologic units (block 910).

Figure 10:
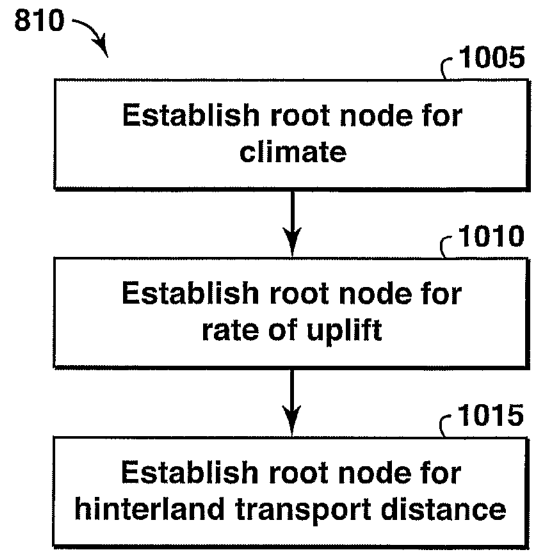

An example of establishing one or more root nodes for hinterland weathering and transport (block 810), shown in more detail in FIG. 10, includes establishing a root node for climate (block 1005), establishing a root node for Hinterland Uplift (block 1010), and establishing a root node for hinterland transport distance (block 1015).

Figure 11:
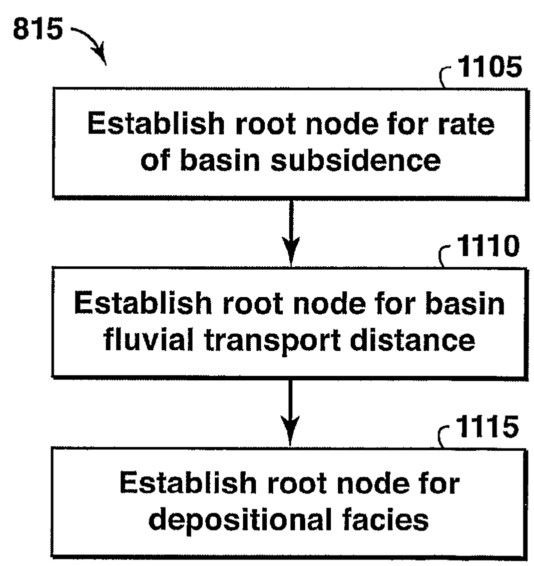

An example of establishing one or more root nodes for basin transport and deposition (block 815), shown in more detail in FIG. 11, includes establishing a root node for rate of basin subsidence (block 1105), establishing a root node for basin fluvial transport distance (block 1110), and establishing a root node for depositional facies (block 1115).

Figure 12:
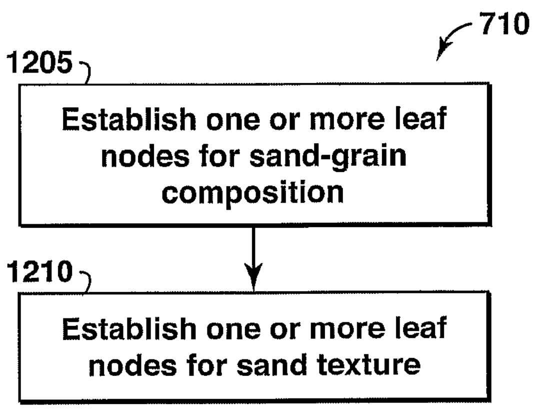

An example of establishing one or more leaf nodes in the Bayesian network (block 710), shown in more detail in FIG. 12, includes establishing one or more leaf nodes for sand-grain composition (block 1205) and establishing one or more leaf nodes for sand texture (block 1210).

Figure 13:
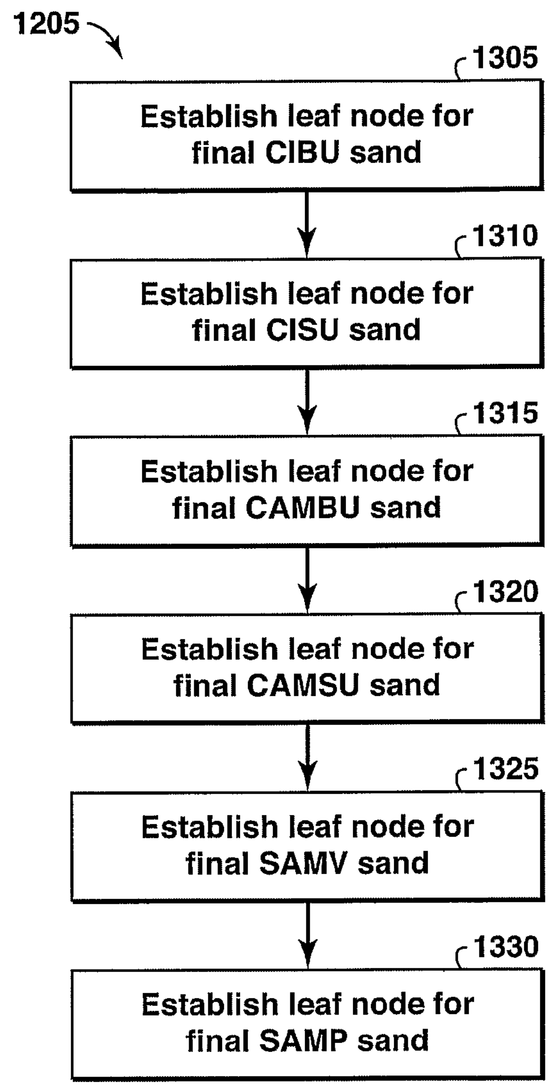

An example of establishing one or more leaf nodes for sand-grain composition (block 1205), shown in more detail in FIG. 13, includes establishing a leaf node for each of: final CIBU sand (block 1305), final CISU sand (block 1310), final CAMBU sand (block 1315), final CAMSU sand (block 1320), final SAMV sand (block 1325), and final SAMP sand (block 1330).

Figure 14:
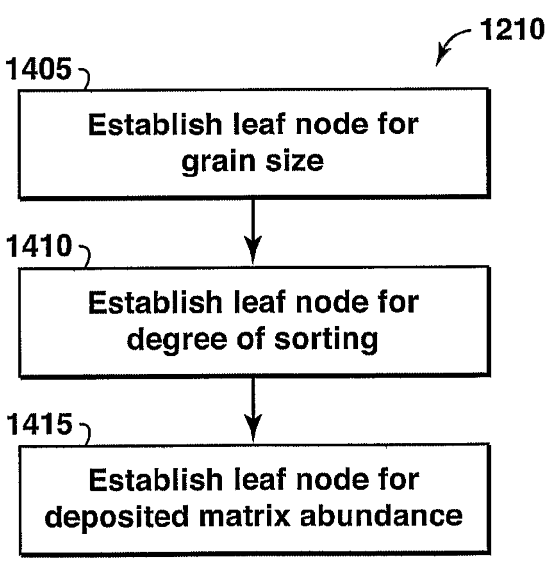

An example of establishing one or more leaf nodes for sand texture (block 1210), shown in more detail in FIG. 14, includes establishing a leaf node for grain size (block 1405), establishing a leaf node for degree of sorting (block 1410), and establishing a leaf node for deposited matrix abundance (block 1415).

While the present invention has been described with reference to an exemplary embodiment thereof, those skilled in the art will know of various changes in form that may be made without departing from the spirit and scope of the claimed invention as defined in the appended claims. For example, the person skilled in the art will recognize that nodes of marginal impact could be added to the network with little effect on the value of the network even if such nodes have non-causal connections. Further, while the tables following this paragraph and before the claims describe one embodiment of the invention, other embodiments of the invention are within the claims, including those with different probability distributions for the variables, different states for the variables, different variables, different Bayesian network nodes and interconnection, and approaches other than Bayesian networks for addressing full joint probability of domain variables. All such variations will be deemed included in the following claims.

Description of Nodes

TABLE A1

| | | Root Nodes of the Network |
|---|---|---|
| Node Name | Code | Definition |
| Tectonic Setting | TS | A combination of petrologic (crustal) and structural/tectonic features that, in combination, have the greatest effect on the composition and texture of sand that may be derived from a tectonic region. |
| Climate | C | The level and variability of wetness and temperature of the paleoenviroment that was present when and where the sand formed in the hinterland. |
| Hinterland Uplift | HU | The change in relative elevation of the sediment source area during the time the sediment is generated. It may be defined as either uplift or incision. "Hinterland Uplift" is an abstraction that stands in for topographic features of the hinterland that control sediment residence time |
| Hinterland Transport Distance | HTD | The distance sediment travels from its site of initial generation to the depositional base level (commonly, but not necessarily, the subsiding basin margin; base level may be far out in the basin during lowstands). Hinterland transport distance reflects the size of the drainage capture area and the topology of the drainage network (density and tortuosity). |
| Basin Fluvial Transport Distance | BTD | The distance sediment travels across the subsiding depositional basin from the tectonic hinge line to the end of the fluvial system. In the case of a fluvial/alluvial basin, the end of the fluvial system is the final point of deposition. |
| Basin Subsidence | BS | The Basin Subsidence of the "bottom" of the basin (not the sediment water interface) below the geoid (not sea level). This rate is approximated by the thickness of sedimentary strata that are preserved within the structural depression in a given time period. (Can be thought of as the rate of change in structural accomodation.) |
| Depositional Facies | DF | The deposits of distinct hydrodynamic regimes in geomorphic subenvironments of generalized environments of deposition (EOD) |

cf. FIG. 3 for a picture of network structure.

TABLE A2.1

| | | Intermediate Nodes of the Network |
|---|---|---|
| Node Name | Code | Definition |
| Provenance Lithotype | PL | Highly generalized, rock types (lithologies) available to produce sand in the hinterland. Lithotypes are discriminated from each other based on their propensity to generate fundamentally different types of sand (grain types, grain sizes |
| Climate,<br>Climate, Chemical Alteration | CCA | The ability of the environment to do chemical work on sediments, as a function of climate. CA recognizes the effect of: temperature on evapotranspiration (and thus on available water); the Arrhenius dependence of reaction kinetics on temperature; and the Le Chatelier dependence of reaction kinetics on available water (via the concentration of reactants). |
| Climate,<br>Climate, Runoff | RO | The amount of water available to do physical work on sediments, as a function of climate. |
| Initial Weathering Intensity | IWI | The capacity of the natural system to modify the mineral composition and structural integrity of a provenance lithotype at the time when sediment is generated. Sediment generation is controlled by the intensity and duration of weathering. Intensity is largely determined by the temperature and wetness of the climate. Duration is determined primarily by slope and Climate, Runoff. |
| Transport Power | TP | The competence of an alluvial/fluvial system to carry a sediment load. This node is primarily concerned with mass or volume of sediment. |

TABLE A2.1-continued

| Intermediate Nodes of the Network | | |
|---|---|---|
| Node Name | Code | Definition |
| Sediment Supply | SS | The volume of sediment released from the bedrock lithologies present in the hinterland. In general, this term is used to represent both the bedload and the suspended load of a fluvial system, but for the purposes of the SandGEM model, only the bedload is of interest. |
| Weathering Modification | WM | The capacity of the natural system to modify the mineral composition and grain size of a sediment. Sediment is modified in transport by Climate, Chemical Alteration, breakage and hydrodynamic sorting. As in the case of sediment generation, sediment modification is largely controlled by the intensity and duration of weathering. |
| Selective Transport Fining | STF | The ability of a fluvial system to move grains of a particular caliber down stream. This node is primarily concerned with grain-size of sediment. |
| Grain Size, Maximum | GSMAX | The maximum grain size that can be carried by a fluvial system across a subsiding basin. |
| Initial CIBU Sand<br>Initial CAMBU Sand<br>Initial SAMP Sand<br>Initial SAMV Sand<br>Initial CAMSU Sand<br>Initial CISU Sand | ICIBU<br>ICAMBU<br>ISAMP<br>ISAMV<br>ICAMSU<br>ICISU | Each state of the root node "Tectonic Setting" (see Table B1) is associated with a suite of sand compositions. "Initial Sand" represents the initial disintegration product of the PL present in the regolith of the tectonic setting, prior to any transport. |

TABLE A2.2

| Intermediate Nodes of the Network | | |
|---|---|---|
| Node Name | Code | Definition |
| Fluvial Storage Potential | FSP | The propensity for sand to be temporarily deposited in the fluvial system rather than being transported. |
| Grain Size, Initial | GSI | Grain size distribution of granule- to silt-sized sediments derived directly from a provenance lithotype, which are fed into a fluvial system. |
| Mineral Alteration Potential | MAP | The ability of a natural system to modify the mineral composition of siliciclastic sediments through dissolution and reprecipitation. |
| Overall Downstream Fining Potential | ODFP | The propensity of the fluvial system to decrease the mode of granule- to silt-sized sediments as a function of weathering (abrasion and dissolution) and selective transport. |
| Transported Clay Abundance | TCA | The relative abundance of clay transported by the fluvial feeder system to the depositional basin. |
| Modified CIBU Sand<br>Modified CAMBU Sand<br>Modified SAMP Sand<br>Modified SAMV Sand<br>Modified CAMSU Sand<br>Modified CISU Sand | MCIBU<br>MCAMBU<br>MSAMP<br>MSAMV<br>MCAMSU<br>MCISU | Each state of the root node "Tectonic Setting" (see Table B1) is associated with a suite of sand compositions. "Modified Sand" represents sand that has evolved during transport and storage in the hinterland, but has not been transported or deposited in the basin. |
| Grain Size, Transported | GST | Grain size distribution of granule- to silt-sized sediments transported by the fluvial feeder system to the depositional basin. |
| Grain Size, Delivered | GSD | Mode of sand-sized load of the fluvial system that feeds into a basin. |

cf. FIG. 3 for a picture of network structure.

TABLE A3

| Leaf Nodes of the Network | | |
|---|---|---|
| Node Name | Code | Definition |
| Grain Size, Final Mode | GSFM | Most common grain size of the sandy lithofacies assemblage in a depositional facies (i.e. a bedset). |
| Grain Size, Generalized | GSG | Mode of sand-sized grains ultimately deposited in the basin, categorized into one of three classes that could have significant implications for compositional differentiation. |
| Deposited Matrix Abundance | DMA | The volume of detrital clay and silt either deposited with, or subsequently mixed into, dominantly sandy deposits. |
| Degree of Sorting | DS | The degree of similarity of grain sizes in a sedimentary deposit, measured as the standard deviation of a grain-size distribution (in phi units). |
| Final CIBU Sand<br>Final CAMBU Sand<br>Final SAMP Sand<br>Final SAMV Sand<br>Final CAMSU Sand<br>Final CISU Sand | FCIBU<br>FCAMBU<br>FSAMP<br>FSAMV<br>FCAMSU<br>FCISU | Each state of the root node "Tectonic Setting" (see Table B1) is associated with a suite of sand compositions. "Final Sand" represents the composition of sand that has been deposited in the basin, which constitutes a potential fluid reservoir. |

cf. FIG. 3 for a picture of network structure.

TABLE A4

SandGEM Network Structure

| Code | TS | C | HU | HTD | BTD | BS | DF | *PL* | *CCA* | *CRO* | *IWI* | *TP* | *SS* | *WM* | *STF* | *GS MAX* |
|---|---|---|---|---|---|---|---|---|---|---|---|---|---|---|---|---|
| *PL* | X | | | | | | | | | | | | | | | |
| *CCA* | | X | | | | | | | | | | | | | | |
| *CRO* | | X | | | | | | | | | | | | | | |
| *IWI* | | | X | | | | | | X | | | | | | | |
| *TP* | | | X | | | | | | | X | | | | | | |
| *SS* | | | X | | | | | | | | | | | | | |
| *WM* | | | | X | | | | | X | X | | | | | | |
| *STF* | | | | X | | | | | | | | X | | | | |
| *GSMAX* | | | | | X | X | | | | | | | X | | | |
| *ICIBU* | X | | | | | | | | | | | | | | | |
| *ICAM* | X | | | | | | | | | | | | | | | |
| *BU* | | | | | | | | | | | | | | | | |
| *ISAMP* | X | | | | | | | | | | | | | | | |
| *ISAMV* | X | | | | | | | | | | | | | | | |
| *ICAMSU* | X | | | | | | | | | | | | | | | |
| *ICISU* | X | | | | | | | | | | | | | | | |
| *FSP* | | | | | | | | | | | | X | X | | | |
| *GSI* | | | | | | | | X | | | X | | | | | |
| *MAP* | | | | | | | | | | | X | | | X | | |
| *ODFP* | | | | | | | | | | | | | | X | X | |
| *TCA* | | | | | | | | X | | | | | | | | |
| *MCIBU* | | | | | | | | | | | | | | | | |
| *MCAM* | | | | | | | | | | | | | | | | |
| *BU* | | | | | | | | | | | | | | | | |
| *MSAMP* | | | | | | | | | | | | | | | | |
| *MSAMV* | | | | | | | | | | | | | | | | |
| *MCAM* | | | | | | | | | | | | | | | | |
| *SU* | | | | | | | | | | | | | | | | |
| *MCISU* | | | | | | | | | | | | | | | | |
| *GST* | | | | | | | | | | | | | | | | |
| *GSD* | | | | | | | | | | | | | | | | X |
| *GSFM* | | | | | | | X | | | | | | | | | |
| GSG | | | | | | | | | | | | | | | | |
| **DMA** | | | | | | | X | | | | | | | | | |
| **DS** | | | | | | | X | | | | | | | | | |
| **FCIBU** | | | | | | | | | | | | | | | | |
| **FCAM** | | | | | | | | | | | | | | | | |
| **BU** | | | | | | | | | | | | | | | | |
| **FSAMP** | | | | | | | | | | | | | | | | |
| **FSAMV** | | | | | | | | | | | | | | | | |
| **FCAM** | | | | | | | | | | | | | | | | |
| **SU** | | | | | | | | | | | | | | | | |
| **FCISU** | | | | | | | | | | | | | | | | |

| Code | *I CIBU* | *I CAMBU* | *I SAMP* | *I SAMV* | I CAMSU | *I CISU* | *FSP* | *GSI* | *MAP* | *ODFP* | *TCA* |
|---|---|---|---|---|---|---|---|---|---|---|---|
| *PL* | | | | | | | | | | | |
| *CCA* | | | | | | | | | | | |
| *CRO* | | | | | | | | | | | |
| *IWI* | | | | | | | | | | | |
| *TP* | | | | | | | | | | | |
| *SS* | | | | | | | | | | | |
| *WM* | | | | | | | X | | | | |
| *STF* | | | | | | | | | | | |
| *GSMAX* | | | | | | | | | | | |
| *ICIBU* | | | | | | | | | | | |
| *ICAM* | | | | | | | | | | | |
| *BU* | | | | | | | | | | | |
| *ISAMP* | | | | | | | | | | | |
| *ISAMV* | | | | | | | | | | | |
| *ICAMSU* | | | | | | | | | | | |
| *ICISU* | | | | | | | | | | | |
| *FSP* | | | | | | | | | | | |
| *GSI* | | | | | | | | | | | |
| *MAP* | | | | | | | | | | | |
| *ODFP* | | | | | | | | | | | |
| *TCA* | | | | | | | | | | | X |
| *MCIBU* | X | | | | | | | | X | | |
| *MCAM* | | X | | | | | | | X | | |
| *BU* | | | | | | | | | | | |
| *MSAMP* | | | X | | | | | | X | | |
| *MSAMV* | | | | X | | | | | X | | |
| *MCAM* | | | | | X | | | | X | | |
| *SU* | | | | | | | | | | | |
| *MCISU* | | | | | | X | | | X | | |

TABLE A4-continued

SandGEM Network Structure

| | | |
|---|---|---|
| *GST* | X | X |
| *GSD* | | |
| *GSFM* | | |
| GSG | | |
| **DMA** | | |
| **DS** | | |
| **FCIBU** | | |
| **FCAM** | | |
| **BU** | | |
| **FSAMP** | | |
| **FSAMV** | | |
| **FCAM** | | |
| **SU** | | |
| **FCISU** | | |

| Code | *M CIBU* | *M CAMBU* | *M SAMP* | *M SAMV* | *M CAMSU* | *M CISU* | *GST* | *GS D* | *GS FM* | *GS G* |
|---|---|---|---|---|---|---|---|---|---|---|
| *PL* | | | | | | | | | | |
| *CCA* | | | | | | | | | | |
| *CRO* | | | | | | | | | | |
| *IWI* | | | | | | | | | | |
| *TP* | | | | | | | | | | |
| *SS* | | | | | | | | | | |
| *WM* | | | | | | | | | | |
| *STF* | | | | | | | | | | |
| *GSMAX* | | | | | | | | | | |
| *ICIBU* | | | | | | | | | | |
| *ICAM* | | | | | | | | | | |
| *BU* | | | | | | | | | | |
| *ISAMP* | | | | | | | | | | |
| *ISAMV* | | | | | | | | | | |
| *ICAMSU* | | | | | | | | | | |
| *ICISU* | | | | | | | | | | |
| *FSP* | | | | | | | | | | |
| *GSI* | | | | | | | | | | |
| *MAP* | | | | | | | | | | |
| *ODFP* | | | | | | | | | | |
| *TCA* | | | | | | | | | | |
| *MCIBU* | | | | | | | | | | |
| *MCAM* | | | | | | | | | | |
| *BU* | | | | | | | | | | |
| *MSAMP* | | | | | | | | | | |
| *MSAMV* | | | | | | | | | | |
| *MCAM* | | | | | | | | | | |
| *SU* | | | | | | | | | | |
| *MCISU* | | | | | | | | | | |
| *GST* | | | | | | | | | | |
| *GSD* | | | | | | | X | | | |
| *GSFM* | | | | | | | | X | | |
| GSG | | | | | | | | | X | |
| **DMA** | | | | | | | | | | |
| **DS** | | | | | | | | X | | |
| **FCIBU** | X | | | | | | | | | X |
| **FCAM** | | X | | | | | | | | X |
| **BU** | | | | | | | | | | |
| **FSAMP** | | | X | | | | | | | X |
| **FSAMV** | | | | X | | | | | | X |
| **FCAM** | | | | | X | | | | | X |
| **SU** | | | | | | | | | | |
| **FCISU** | | | | | | X | | | | X |

cf. FIG. 3 for a picture of network structure; cf. Table A1 for node codes.
Look across rows to see the parent nodes for a given node.
Look down columns to see the child nodes for a given node.
Normal text indicates root nodes; there are no root-node rows, because root nodes have no parents
Italicized text indicates intermediate nodes
Bold text indicates leaf nodes; there are no leaf-node columns because leaf nodes have no children Node States

TABLE B1

| Root-Node States | | |
|---|---|---|
| Node | State | Description |
| TS | CIBU | continental interior, basement uplift |
| | CISU | continental interior sedimentary uplift |
| | CAMBU | continental active margin, basement uplift (major orogeny) |
| | CAMSU | continental active margin sedimentary uplift |
| | SAM | subducting active margins (island arc) |
| C | Hot-Wet | Uniformly hot, everwet |
| | Seasonal Wet | Uniformly hot, seasonally wet |
| | Seasonal Dry | Temperature variable, uniformly dry |
| | Cold ± Dry | Uniformly cold and/or uniformly dry |
| HU | Rapid | 1000's of meters/million years |
| | Slow | 10's to 100's of meters/million years |
| HTD | Long | 1000's of km |
| | Intermediate | Several 100's of km |
| | Short | 10's to a few 100 km |

TABLE B1-continued

| Root-Node States | | |
|---|---|---|
| Node | State | Description |
| BTD | Short | <10 km |
| | Intermediate | 10-50 km |
| | Long | 50-100 km |
| | Very Long | >100 km |
| BS | Rapid | Many 100's-1000 m/Ma |
| | Slow | 10's to a few 100/Ma |
| DF | Eolian | Eolian dune |
| | Fluvial | Major channel, Minor channel, Point bar, Levee/splay |
| | Beach | Foreshore, Shoreface |
| | Deltaic | Distributary channels, Proximal delta-front (stream-mouth bars); Distal delta-front (turbidites) |
| | Tidal | Tidal-channel/bar |
| | Deepwater | Channel axis, turbidite; Channel axis, debrite; Channel margin, turbidite; Channel margin, debrites |

TABLE B2.1

| Intermediate-Node States | | |
|---|---|---|
| Node | State | Description |
| PL | P1: plutonic, granodiorite | PKQ normative; % Q = 20-60, P:K 9:1 to 2:1; Plag(Ca) > Plag(Na) |
| | P2: plutonic, granite | PKQ normative; % Q = 20-60, K:P 9:1 to 2:1; Plag(Na) >Plag(Ca) |
| | P3: volcanic, basic | $SiO_2$ < 53 wt % (no free quartz) |
| | P4: volcanic, intermediate | $SiO_2$ 52-63 wt %(rare-no free qtz) |
| | P5: volcanic, silicic | $SiO_2$ > 63 wt % (free qtz common) |
| | P6: sedimentary, sandstone, QF | Preponderance of monomineralic quartz and feldspar grains and rock fragments with crystal size large enough (>.063 mm) to produce monomineralic sand |
| | P7: sedimentary, sandstone, lithic | Common or diagnostic abundance of lithic fragments with crystal/grain size NOT large enough (>.063 mm) to produce monomineralic sand |
| | P8: sedimentary, shale | Includes all mudrocks that are NOT sufficiently lithified to produce sand-sized grains |
| | P9: sedimentary, carbonate | Includes all carbonates and subordinate evaporites |
| | P10: metasandstone | Sandstones of all composition that are sufficiently indurated to produce sand-sized fragments of sandstone |
| | P11: metashale | Mudstones that are sufficiently indurated to produce sand-sized fragments |
| | P12: metacarbonate | Carbonates and associated evaporites that are sufficiently indurated to produce sand-sized fragments of polycrystalline carbonate. |
| | P13: metaschist | Metamorphic rocks with abundant micas and a dominant schistose foliation |
| | P14: metagneiss | Phaneritic metamorphic rocks with distinct foliation...mostly quartzo-feldspathic in character |
| CCA | much | Relatively much Climate, Chemical Alteration of Provenance Lithotypes in the hinterland |
| | some | Some Climate, Chemical Alteration of Provenance Lithotypes in the hinterland |
| | none | No Climate, Chemical Alteration of Provenance Lithotypes in the hinterland |
| CRO | high | Relatively high fraction of precipitation is converted to Climate, Runoff |
| | moderate | Relatively modest fraction of precipitation is converted to Climate, Runoff |
| | low | Relatively low fraction of precipitation is converted to Climate, Runoff |
| | very low | Relatively very low fraction of precipitation is converted to Climate, Runoff |
| IWI | Minor | Relatively minor weathering intensity |
| | Moderate | Intermediate weathering intensity |
| | Extensive | Relatively extensive weathering intensity |
| TP | High | Relatively high levels of transport power |
| | Moderate | Intermediate levels of transport power |
| | Low | Relatively low levels of transport power |
| SS | High | Relatively high supply of sediment |
| | Medium | Intermediate supply of sediment |
| | Low | Relatively low supply of sediment |
| WM | Major | Relatively major modification by weathering |
| | Minor | Relatively minor modification by weathering |
| STF | Much | Relatively much fining due to selective transport |
| | Little | Relatively little fining due to selective transport |
| | None | No fining due to selective transport |
| GSMAX | Granule | 4000-2000 microns |
| | Very coarse | 2000-1000 microns |
| | Coarse | 1000-0500 microns |
| | Medium | 500-250 microns |
| | Fine | 250-125 microns |
| | Very Fine | 125-62.5 microns |

TABLE B2.1-continued

| Intermediate-Node States | | |
|---|---|---|
| Node | State | Description |
| ICIBU<br>ICAMBU<br>ISAMP<br>ISAMV<br>ICAMSU<br>ICISU | 40 states (see Table B5)<br>32 states (see Table B6)<br>26 states (see Table B7)<br>16 states (see Table B8)<br>35 states (see Table B9)<br>26 states (see Table B10) | Each state is a unique combination of 20 common grain types (Table B2). The proportions of the grain types are determined as a function of tectonic setting, provenance lithotype, and degree of modification. Each node state is identified by an alphanumeric code. The alpha part identifies the tectonic setting, the numeric part identifies a point in QFR ternary space: grid nodes are established at every 10% increment of Q, F, and R; nodes are numbered sequentially from 1-66, starting at the R pole and running from F = (100 − R) to F = 0 along each successive 10% R isoline. (Table B4.1) |

TABLE B2.2

| Intermediate-Node States | | |
|---|---|---|
| Node | State | Description |
| FSP | Low | Relatively Low potential to store sediment in the fluvial system |
| | Moderate | Intermediate potential to store sediment in the fluvial system |
| | High | Relatively High potential to store sediment in the fluvial system |
| GSI | 42 states (see Table B11) | Each state is denoted by PxGSy, where x = 1 to 14 and y = 1 to 3. The P values refer to the PL from which the sand was derived, the GS values refer to the Grain Size Distribution generated from that PL under Initial Weathering Intensity that is Minor (1), Moderate (2), or Extensive (3). Each of the 42 states is associated with a specified proportion of granules, very coarse sand, coarse sand, medium sand, fine sand, very fine sand, and coarse-medium silt. |
| MAP | Low | Relatively low mineral alteration potential |
| | Moderate | Intermediate mineral alteration potential |
| | High | Relatively high mineral alteration potential |
| ODFP | Low | Low potential for reducing grain size downstream |
| | High | High potential for reducing grain size downstream |
| TCA | High | Relatively abundant transported clay |
| | Moderate | Intermediate abundance of transported clay |
| | Low | Relatively sparse transported clay |
| | Very Low | Virtually non-existent transported clay |
| MCIBU<br>MCAMBU<br>MSAMP<br>MSAMV<br>MCAMSU<br>MCISU | 40 states (see Table B5)<br>32 states (see Table B6)<br>26 states (see Table B7)<br>16 states (see Table B8)<br>35 states (see Table B9)<br>26 states (see Table B10) | Each state is a unique combination of 20 common grain types (Table B2). The proportions of the grain types are determined as a function of tectonic setting, provenance lithotype, and degree of modification. Each node state is identified by an alphanumeric code. The alpha part identifies the tectonic setting, the numeric part identifies a point in QFR ternary space: grid nodes are established at every 10% increment of Q, F, and R; nodes are numbered sequentially from 1-66, starting at the R pole and running from F = (100 − R) to F = 0 along each successive 10% R isoline. (Table B4.1) |
| GST | 42 states (see Table B12) | Each state is denoted by PxGSy, where PxGSy equals the states in GSI. Each of the 42 states is associated with a specified proportion of granules, very coarse sand, coarse sand, medium sand, fine sand, very fine sand, and coarse-medium silt. |
| GSD | Granule | 4000-2000 microns |
| | Very coarse | 2000-1000 microns |
| | Coarse | 1000-0500 microns |
| | Medium | 500-250 microns |
| | Fine | 250-125 microns |
| | Very Fine | 125-62.5 microns |

TABLE B3

| Final-Node States | | |
|---|---|---|
| Node | State | Description |
| GSFM | Granule | 4000-2000 microns |
| | Very coarse | 2000-1000 microns |
| | Coarse | 1000-0500 microns |
| | Medium | 500-250 microns |
| | Fine | 250-125 microns |
| | Very Fine | 125-62.5 microns |
| GSG | Very coarse-coarse | 500 to 4000 microns |
| | Medium | 250 to 500 microns |
| | Fine-very fine | 62.5 to 250 microns |
| DMA | <2% | Matrix comprises less than 2% of the reservoir facies |
| | 2-10% | Matrix comprises between 2% and 10% of the reservoir facies |
| | 10-25% | Matrix comprises more than 10% of the reservoir facies |

TABLE B3-continued

Final-Node States

| Node | State | Description |
|---|---|---|
| DS | Well | <0.5 |
| | Moderate | 0.5-1 |
| | Poor | 1-2 |
| | Very Poor | >2 |
| FCIBU | 40 states (see Table B5) | Each state is a unique combination of 20 common grain types (Table B2). The |
| FCAMBU | 32 states (see Table B6) | proportions of the grain types are determined as a function of tectonic setting, |
| FSAMP | 26 states (see Table B7) | provenance lithotype, and degree of modification. |
| FSAMV | 16 states (see Table B8) | Each node state is identified by an alphanumeric code. The alpha part identifies the |
| FCAMSU | 35 states (see Table B9) | tectonic setting, the numeric part identifies a point in QFR ternary space: grid nodes |
| FCISU | 26 states (see Table B10) | are established at every 10% increment of Q, F, and R; nodes are numbered sequentially from 1-66, starting at the R pole and running from F = (100 − R) to F = 0 along each successive 10% R isoline. (Table B4.1) |

TABLE B4

Grain Types

| Code | Grain Type |
|---|---|
| Q | quartz |
| Fk | feldspar, potassic; Or >10 |
| Fpna | feldspar, plagioclase (sodic) |
| Fpca | feldspar, plagioclase (calcic) |
| RPp | rock fragment, plutonic, plag-rich |
| RPk | rock fragment, plutonic, Kspar-rich |
| RVb | rock fragment, volcanic, basic |
| RVi | rock fragment, volcanic, intermediate |
| RVs | rock fragment, volcanic, silicic |
| RSq | rock fragment, sedimentary, quartzose |
| RSf | rock fragment, sedimentary, feldspathic |

TABLE B4-continued

Grain Types

| Code | Grain Type |
|---|---|
| RSl | rock fragment, sedimentary, lithic |
| RSsh | rock fragment, sedimentary, shale |
| RScb | rock fragment, sedimentary, carbonate |
| RSct | rock fragment, sedimentary, chert |
| RMqf | rock fragment, metasediment, quartzofeldspathic |
| RMsh | rock fragment, metasediment, shale |
| RMc | rock fragment, metasediment, carbonate |
| RMpsc | rock fragment, metamorphic, phyllite/schist |
| RMgp | rock fragment, metamorphic, gneiss, plag-rich |
| RMgk | rock fragment, metamorphic, gneiss, Kspar-rich |

Table B4.1

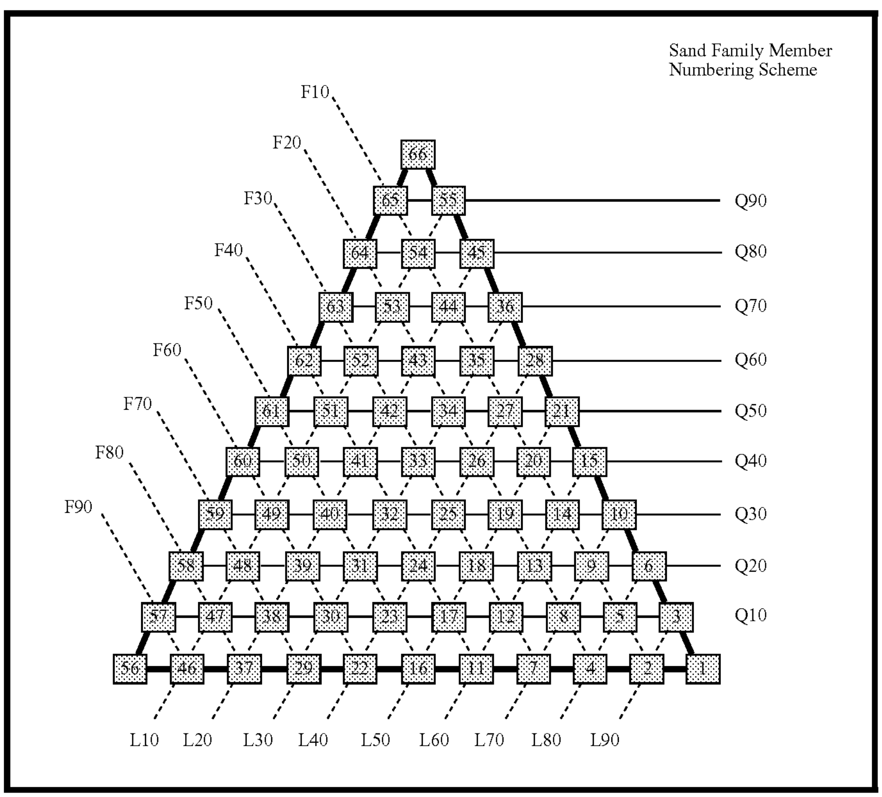

TABLE B5

States of ICIBU, MCIBU, FCIBU

| | | Q | Fk | Fpna | Fpca | RPp | RPk | RVb | RVi | RVs | RSq | RSf | RSl |
|---|---|---|---|---|---|---|---|---|---|---|---|---|---|
| CIBU | 2 | 0.0 | 5.0 | 2.2 | 2.8 | 0.0 | 0.0 | 12.9 | 0.0 | 0.0 | 0.0 | 0.0 | 12.9 |
| CIBU | 7 | 0.0 | 15.0 | 6.6 | 8.4 | 0.0 | 0.0 | 10.0 | 0.0 | 0.0 | 0.0 | 0.0 | 10.0 |
| CIBU | 8 | 10.0 | 10.0 | 4.4 | 5.6 | 0.0 | 0.0 | 5.0 | 0.0 | 0.0 | 0.0 | 5.0 | 5.0 |
| CIBU | 9 | 20.0 | 5.0 | 2.2 | 2.8 | 0.0 | 0.0 | 4.7 | 0.0 | 0.0 | 4.7 | 4.7 | 4.7 |
| CIBU | 12 | 10.0 | 15.0 | 6.6 | 8.4 | 0.0 | 0.0 | 4.3 | 0.0 | 0.0 | 0.0 | 4.3 | 4.3 |
| CIBU | 13 | 20.0 | 10.0 | 4.4 | 5.6 | 12.7 | 16.9 | 1.7 | 1.7 | 1.7 | 1.7 | 1.7 | 1.7 |
| CIBU | 14 | 30.0 | 7.5 | 0.6 | 1.9 | 0.0 | 0.0 | 0.0 | 0.0 | 0.0 | 4.3 | 4.3 | 4.3 |
| CIBU | 17 | 10.0 | 20.0 | 8.8 | 11.3 | 0.0 | 0.0 | 0.0 | 0.0 | 0.0 | 0.0 | 3.8 | 3.8 |
| CIBU | 18 | 20.0 | 15.0 | 6.6 | 8.4 | 10.9 | 14.5 | 0.0 | 1.4 | 1.4 | 1.4 | 1.4 | 1.4 |
| CIBU | 19 | 30.0 | 15.0 | 1.3 | 3.8 | 10.9 | 14.5 | 0.0 | 1.4 | 1.4 | 1.4 | 1.4 | 1.4 |
| CIBU | 20 | 40.0 | 7.5 | 0.6 | 1.9 | 0.0 | 0.0 | 0.0 | 0.0 | 0.0 | 3.6 | 3.6 | 3.6 |
| CIBU | 24 | 20.0 | 20.0 | 8.8 | 11.3 | 8.7 | 11.6 | 0.0 | 1.2 | 1.2 | 1.2 | 1.2 | 1.2 |
| CIBU | 25 | 30.0 | 22.5 | 1.9 | 5.6 | 8.7 | 11.6 | 0.0 | 1.2 | 1.2 | 1.2 | 1.2 | 1.2 |
| CIBU | 26 | 40.0 | 15.0 | 1.3 | 3.8 | 8.7 | 11.6 | 0.0 | 1.2 | 1.2 | 1.2 | 1.2 | 1.2 |
| CIBU | 27 | 50.0 | 10.0 | 0.0 | 0.0 | 0.0 | 0.0 | 0.0 | 0.0 | 0.0 | 2.9 | 2.9 | 2.9 |
| CIBU | 31 | 20.0 | 25.0 | 10.9 | 14.1 | 6.9 | 9.2 | 0.0 | 0.9 | 0.9 | 0.9 | 0.9 | 0.9 |
| CIBU | 32 | 30.0 | 30.0 | 2.5 | 7.5 | 6.9 | 9.2 | 0.0 | 0.9 | 0.9 | 0.9 | 0.9 | 0.9 |
| CIBU | 33 | 40.0 | 22.5 | 1.9 | 5.6 | 6.9 | 9.2 | 0.0 | 0.9 | 0.9 | 0.9 | 0.9 | 0.9 |
| CIBU | 34 | 50.0 | 20.0 | 0.0 | 0.0 | 6.9 | 9.2 | 0.0 | 0.9 | 0.9 | 0.9 | 0.9 | 0.9 |
| CIBU | 35 | 60.0 | 10.0 | 0.0 | 0.0 | 0.0 | 0.0 | 0.0 | 0.0 | 0.0 | 2.5 | 2.5 | 2.5 |
| CIBU | 40 | 30.0 | 25.0 | 10.9 | 14.1 | 4.8 | 6.3 | 0.0 | 0.6 | 0.6 | 0.6 | 0.6 | 0.6 |
| CIBU | 41 | 40.0 | 30.0 | 2.5 | 7.5 | 4.8 | 6.3 | 0.0 | 0.6 | 0.6 | 0.6 | 0.6 | 0.6 |
| CIBU | 42 | 50.0 | 30.0 | 0.0 | 0.0 | 4.8 | 6.3 | 0.0 | 0.6 | 0.6 | 0.6 | 0.6 | 0.6 |
| CIBU | 43 | 60.0 | 20.0 | 0.0 | 0.0 | 4.8 | 6.3 | 0.0 | 0.6 | 0.6 | 0.6 | 0.6 | 0.6 |
| CIBU | 44 | 70.0 | 10.0 | 0.0 | 0.0 | 0.0 | 0.0 | 0.0 | 0.0 | 0.0 | 1.8 | 1.8 | 1.8 |
| CIBU | 45 | 80.0 | 0.0 | 0.0 | 0.0 | 0.0 | 0.0 | 0.0 | 0.0 | 0.0 | 2.5 | 0.0 | 0.0 |
| CIBU | 49 | 30.0 | 30.0 | 13.1 | 16.9 | 0.0 | 0.0 | 0.0 | 1.1 | 1.1 | 0.0 | 0.0 | 0.0 |
| CIBU | 50 | 40.0 | 37.5 | 3.1 | 9.4 | 0.0 | 0.0 | 0.0 | 1.1 | 1.1 | 0.0 | 0.0 | 0.0 |
| CIBU | 51 | 50.0 | 30.0 | 2.5 | 7.5 | 0.0 | 0.0 | 0.0 | 1.1 | 1.1 | 0.0 | 0.0 | 0.0 |
| CIBU | 52 | 60.0 | 30.0 | 0.0 | 0.0 | 0.0 | 0.0 | 0.0 | 1.1 | 1.1 | 0.0 | 0.0 | 0.0 |
| CIBU | 53 | 70.0 | 20.0 | 0.0 | 0.0 | 0.0 | 0.0 | 0.0 | 1.1 | 1.1 | 0.0 | 0.0 | 0.0 |
| CIBU | 54 | 80.0 | 10.0 | 0.0 | 0.0 | 0.0 | 0.0 | 0.0 | 0.0 | 0.0 | 0.0 | 0.0 | 0.0 |
| CIBU | 55 | 90.0 | 0.0 | 0.0 | 0.0 | 0.0 | 0.0 | 0.0 | 0.0 | 0.0 | 0.0 | 0.0 | 0.0 |
| CIBU | 60 | 40.0 | 45.0 | 3.8 | 11.3 | 0.0 | 0.0 | 0.0 | 0.0 | 0.0 | 0.0 | 0.0 | 0.0 |
| CIBU | 61 | 50.0 | 37.5 | 3.1 | 9.4 | 0.0 | 0.0 | 0.0 | 0.0 | 0.0 | 0.0 | 0.0 | 0.0 |
| CIBU | 62 | 60.0 | 40.0 | 0.0 | 0.0 | 0.0 | 0.0 | 0.0 | 0.0 | 0.0 | 0.0 | 0.0 | 0.0 |
| CIBU | 63 | 70.0 | 30.0 | 0.0 | 0.0 | 0.0 | 0.0 | 0.0 | 0.0 | 0.0 | 0.0 | 0.0 | 0.0 |
| CIBU | 64 | 80.0 | 20.0 | 0.0 | 0.0 | 0.0 | 0.0 | 0.0 | 0.0 | 0.0 | 0.0 | 0.0 | 0.0 |
| CIBU | 65 | 90.0 | 10.0 | 0.0 | 0.0 | 0.0 | 0.0 | 0.0 | 0.0 | 0.0 | 0.0 | 0.0 | 0.0 |
| CIBU | 66 | 100.0 | 0.0 | 0.0 | 0.0 | 0.0 | 0.0 | 0.0 | 0.0 | 0.0 | 0.0 | 0.0 | 0.0 |

| | RSsh | RScb | RSct | RMqf | RMsh | RMc | RMpsc | RMgp | RMgk |
|---|---|---|---|---|---|---|---|---|---|
| CIBU | 12.9 | 0.0 | 12.9 | 0.0 | 12.9 | 12.9 | 12.9 | 0.0 | 0.0 |
| CIBU | 10.0 | 0.0 | 10.0 | 0.0 | 10.0 | 10.0 | 10.0 | 0.0 | 0.0 |
| CIBU | 5.0 | 5.0 | 5.0 | 25.0 | 5.0 | 5.0 | 5.0 | 0.0 | 0.0 |
| CIBU | 4.7 | 4.7 | 4.7 | 23.3 | 4.7 | 4.7 | 4.7 | 0.0 | 0.0 |
| CIBU | 4.3 | 4.3 | 4.3 | 21.4 | 4.3 | 4.3 | 4.3 | 0.0 | 0.0 |
| CIBU | 1.7 | 1.7 | 1.7 | 8.5 | 1.7 | 1.7 | 1.7 | 1.7 | 0.0 |
| CIBU | 4.3 | 4.3 | 4.3 | 21.4 | 4.3 | 4.3 | 4.3 | 0.0 | 0.0 |
| CIBU | 3.8 | 3.8 | 3.8 | 19.2 | 3.8 | 3.8 | 3.8 | 0.0 | 0.0 |
| CIBU | 1.4 | 1.4 | 1.4 | 7.2 | 1.4 | 1.4 | 1.4 | 1.4 | 0.0 |
| CIBU | 1.4 | 1.4 | 1.4 | 7.2 | 1.4 | 1.4 | 1.4 | 1.4 | 0.0 |
| CIBU | 3.6 | 3.6 | 3.6 | 17.9 | 3.6 | 3.6 | 3.6 | 0.0 | 0.0 |
| CIBU | 1.2 | 1.2 | 1.2 | 5.8 | 1.2 | 1.2 | 1.2 | 1.2 | 0.0 |
| CIBU | 1.2 | 1.2 | 1.2 | 5.8 | 1.2 | 1.2 | 1.2 | 1.2 | 0.0 |
| CIBU | 1.2 | 1.2 | 1.2 | 5.8 | 1.2 | 1.2 | 1.2 | 1.2 | 0.0 |
| CIBU | 2.9 | 2.9 | 2.9 | 14.3 | 2.9 | 2.9 | 2.9 | 0.0 | 0.0 |
| CIBU | 0.0 | 0.9 | 0.9 | 4.6 | 0.9 | 0.9 | 0.0 | 0.9 | 0.0 |
| CIBU | 0.0 | 0.9 | 0.9 | 4.6 | 0.9 | 0.9 | 0.0 | 0.9 | 0.0 |
| CIBU | 0.0 | 0.9 | 0.9 | 4.6 | 0.9 | 0.9 | 0.0 | 0.9 | 0.0 |
| CIBU | 0.0 | 0.9 | 0.9 | 4.6 | 0.9 | 0.9 | 0.0 | 0.9 | 0.0 |
| CIBU | 0.0 | 2.5 | 2.5 | 12.5 | 2.5 | 2.5 | 0.0 | 0.0 | 0.0 |
| CIBU | 0.0 | 0.0 | 0.6 | 3.2 | 0.6 | 0.6 | 0.0 | 0.6 | 0.0 |
| CIBU | 0.0 | 0.0 | 0.6 | 3.2 | 0.6 | 0.6 | 0.0 | 0.6 | 0.0 |
| CIBU | 0.0 | 0.0 | 0.6 | 3.2 | 0.6 | 0.6 | 0.0 | 0.6 | 0.0 |
| CIBU | 0.0 | 0.0 | 0.6 | 3.2 | 0.6 | 0.6 | 0.0 | 0.6 | 0.0 |
| CIBU | 0.0 | 0.0 | 1.8 | 9.1 | 1.8 | 1.8 | 0.0 | 0.0 | 0.0 |
| CIBU | 0.0 | 0.0 | 2.5 | 12.5 | 2.5 | 0.0 | 0.0 | 0.0 | 0.0 |
| CIBU | 0.0 | 0.0 | 1.1 | 5.6 | 0.0 | 0.0 | 0.0 | 1.1 | 0.0 |
| CIBU | 0.0 | 0.0 | 1.1 | 5.6 | 0.0 | 0.0 | 0.0 | 1.1 | 0.0 |
| CIBU | 0.0 | 0.0 | 1.1 | 5.6 | 0.0 | 0.0 | 0.0 | 1.1 | 0.0 |
| CIBU | 0.0 | 0.0 | 1.1 | 5.6 | 0.0 | 0.0 | 0.0 | 1.1 | 0.0 |
| CIBU | 0.0 | 0.0 | 1.1 | 5.6 | 0.0 | 0.0 | 0.0 | 1.1 | 0.0 |
| CIBU | 0.0 | 0.0 | 1.7 | 8.3 | 0.0 | 0.0 | 0.0 | 0.0 | 0.0 |

TABLE B5-continued

| States of ICIBU, MCIBU, FCIBU | | | | | | | | | |
|---|---|---|---|---|---|---|---|---|---|
| CIBU | 0.0 | 0.0 | 10.0 | 0.0 | 0.0 | 0.0 | 0.0 | 0.0 | 0.0 |
| CIBU | 0.0 | 0.0 | 0.0 | 0.0 | 0.0 | 0.0 | 0.0 | 0.0 | 0.0 |
| CIBU | 0.0 | 0.0 | 0.0 | 0.0 | 0.0 | 0.0 | 0.0 | 0.0 | 0.0 |
| CIBU | 0.0 | 0.0 | 0.0 | 0.0 | 0.0 | 0.0 | 0.0 | 0.0 | 0.0 |
| CIBU | 0.0 | 0.0 | 0.0 | 0.0 | 0.0 | 0.0 | 0.0 | 0.0 | 0.0 |
| CIBU | 0.0 | 0.0 | 0.0 | 0.0 | 0.0 | 0.0 | 0.0 | 0.0 | 0.0 |
| CIBU | 0.0 | 0.0 | 0.0 | 0.0 | 0.0 | 0.0 | 0.0 | 0.0 | 0.0 |
| CIBU | 0.0 | 0.0 | 0.0 | 0.0 | 0.0 | 0.0 | 0.0 | 0.0 | 0.0 |

TABLE B6

| States of ICAMBU, MCAMBU, FCAMBU | | | | | | | | | | | | | |
|---|---|---|---|---|---|---|---|---|---|---|---|---|---|
| | | Q | Fk | Fpna | Fpca | RPp | RPk | RVb | RVi | RVs | RSq | RSf | RSl |
| CAMBU | 5 | 10.0 | 5.0 | 2.2 | 2.8 | 0.0 | 0.0 | 4.1 | 0.0 | 0.0 | 0.0 | 0.0 | 4.1 |
| CAMBU | 8 | 10.0 | 10.0 | 4.4 | 5.6 | 0.0 | 0.0 | 3.6 | 0.0 | 0.0 | 0.0 | 0.0 | 3.6 |
| CAMBU | 12 | 10.0 | 15.0 | 6.6 | 8.4 | 0.0 | 0.0 | 3.1 | 0.0 | 0.0 | 0.0 | 0.0 | 3.1 |
| CAMBU | 14 | 30.0 | 7.5 | 0.6 | 1.9 | 0.0 | 0.0 | 0.0 | 0.0 | 0.0 | 2.9 | 2.9 | 2.9 |
| CAMBU | 18 | 20.0 | 15.0 | 6.6 | 8.4 | 8.2 | 8.2 | 0.0 | 1.1 | 5.5 | 0.0 | 1.1 | 1.1 |
| CAMBU | 19 | 30.0 | 15.0 | 1.3 | 3.8 | 8.1 | 8.1 | 0.0 | 1.1 | 5.4 | 1.1 | 1.1 | 1.1 |
| CAMBU | 20 | 40.0 | 7.5 | 0.6 | 1.9 | 0.0 | 0.0 | 0.0 | 0.0 | 0.0 | 2.4 | 2.4 | 2.4 |
| CAMBU | 21 | 50.0 | 0.0 | 0.0 | 0.0 | 0.0 | 0.0 | 0.0 | 0.0 | 0.0 | 2.4 | 2.4 | 2.4 |
| CAMBU | 24 | 20.0 | 20.0 | 8.8 | 11.3 | 6.6 | 6.6 | 0.0 | 0.9 | 4.4 | 0.0 | 0.9 | 0.9 |
| CAMBU | 25 | 30.0 | 15.0 | 6.6 | 8.4 | 6.5 | 6.5 | 0.0 | 0.9 | 4.3 | 0.9 | 0.9 | 0.9 |
| CAMBU | 26 | 40.0 | 15.0 | 1.3 | 3.8 | 6.5 | 6.5 | 0.0 | 0.9 | 4.3 | 0.9 | 0.9 | 0.9 |
| CAMBU | 27 | 50.0 | 7.5 | 0.6 | 1.9 | 0.0 | 0.0 | 0.0 | 0.0 | 0.0 | 2.0 | 2.0 | 2.0 |
| CAMBU | 28 | 60.0 | 0.0 | 0.0 | 0.0 | 0.0 | 0.0 | 0.0 | 0.0 | 0.0 | 2.1 | 2.1 | 2.1 |
| CAMBU | 31 | 20.0 | 25.0 | 10.9 | 14.1 | 5.2 | 5.2 | 0.0 | 0.7 | 3.4 | 0.0 | 0.7 | 0.7 |
| CAMBU | 32 | 30.0 | 20.0 | 8.8 | 11.3 | 5.1 | 5.1 | 0.0 | 0.7 | 3.4 | 0.7 | 0.7 | 0.7 |
| CAMBU | 33 | 40.0 | 22.5 | 1.9 | 5.6 | 5.1 | 5.1 | 0.0 | 0.7 | 3.4 | 0.7 | 0.7 | 0.7 |
| CAMBU | 34 | 50.0 | 15.0 | 1.3 | 3.8 | 5.1 | 5.1 | 0.0 | 0.7 | 3.4 | 0.7 | 0.7 | 0.7 |
| CAMBU | 35 | 60.0 | 10.0 | 0.0 | 0.0 | 0.0 | 0.0 | 0.0 | 0.0 | 0.0 | 1.6 | 1.6 | 1.6 |
| CAMBU | 36 | 70.0 | 0.0 | 0.0 | 0.0 | 0.0 | 0.0 | 0.0 | 0.0 | 0.0 | 1.7 | 1.7 | 1.7 |
| CAMBU | 41 | 40.0 | 20.0 | 8.8 | 11.3 | 3.4 | 3.4 | 0.0 | 0.5 | 2.3 | 0.5 | 0.5 | 0.5 |
| CAMBU | 42 | 50.0 | 22.5 | 1.9 | 5.6 | 3.4 | 3.4 | 0.0 | 0.5 | 2.3 | 0.5 | 0.5 | 0.5 |
| CAMBU | 43 | 60.0 | 20.0 | 0.0 | 0.0 | 3.4 | 3.4 | 0.0 | 0.5 | 2.3 | 0.5 | 0.5 | 0.5 |
| CAMBU | 44 | 70.0 | 10.0 | 0.0 | 0.0 | 0.0 | 0.0 | 0.0 | 0.0 | 0.0 | 1.1 | 1.1 | 1.1 |
| CAMBU | 45 | 80.0 | 0.0 | 0.0 | 0.0 | 0.0 | 0.0 | 0.0 | 0.0 | 0.0 | 0.0 | 0.0 | 1.4 |
| CAMBU | 51 | 50.0 | 30.0 | 2.5 | 7.5 | 0.0 | 0.0 | 0.0 | 0.4 | 2.1 | 0.0 | 0.0 | 0.0 |
| CAMBU | 52 | 60.0 | 30.0 | 0.0 | 0.0 | 0.0 | 0.0 | 0.0 | 0.4 | 2.1 | 0.0 | 0.0 | 0.0 |
| CAMBU | 53 | 70.0 | 20.0 | 0.0 | 0.0 | 0.0 | 0.0 | 0.0 | 0.4 | 2.1 | 0.0 | 0.0 | 0.0 |
| CAMBU | 54 | 80.0 | 10.0 | 0.0 | 0.0 | 0.0 | 0.0 | 0.0 | 0.0 | 0.0 | 0.0 | 0.0 | 0.0 |
| CAMBU | 55 | 90.0 | 0.0 | 0.0 | 0.0 | 0.0 | 0.0 | 0.0 | 0.0 | 0.0 | 0.0 | 0.0 | 0.0 |
| CAMBU | 62 | 60.0 | 30.0 | 2.5 | 7.5 | 0.0 | 0.0 | 0.0 | 0.0 | 0.0 | 0.0 | 0.0 | 0.0 |
| CAMBU | 63 | 70.0 | 30.0 | 0.0 | 0.0 | 0.0 | 0.0 | 0.0 | 0.0 | 0.0 | 0.0 | 0.0 | 0.0 |
| CAMBU | 64 | 80.0 | 20.0 | 0.0 | 0.0 | 0.0 | 0.0 | 0.0 | 0.0 | 0.0 | 0.0 | 0.0 | 0.0 |

| | RSsh | RScb | RSct | RMqf | RMsh | RMc | RMpsc | RMgp | RMgk |
|---|---|---|---|---|---|---|---|---|---|
| CAMBU | 4.1 | 4.1 | 10.3 | 41.0 | 4.1 | 4.1 | 4.1 | 0.0 | 0.0 |
| CAMBU | 3.6 | 3.6 | 9.0 | 35.9 | 3.6 | 3.6 | 3.6 | 0.0 | 0.0 |
| CAMBU | 3.1 | 3.1 | 7.7 | 30.8 | 3.1 | 3.1 | 3.1 | 0.0 | 0.0 |
| CAMBU | 2.9 | 2.9 | 7.3 | 29.3 | 2.9 | 2.9 | 2.9 | 0.0 | 0.0 |
| CAMBU | 1.1 | 1.1 | 2.7 | 11.0 | 1.1 | 1.1 | 1.1 | 5.5 | 0.0 |
| CAMBU | 1.1 | 1.1 | 2.7 | 10.8 | 1.1 | 1.1 | 1.1 | 5.4 | 0.0 |
| CAMBU | 2.4 | 2.4 | 6.1 | 24.4 | 2.4 | 2.4 | 2.4 | 0.0 | 0.0 |
| CAMBU | 2.4 | 2.4 | 6.1 | 24.4 | 2.4 | 2.4 | 2.4 | 0.0 | 0.0 |
| CAMBU | 0.9 | 0.9 | 2.2 | 8.8 | 0.9 | 0.9 | 0.9 | 4.4 | 0.0 |
| CAMBU | 0.9 | 0.9 | 2.2 | 8.6 | 0.9 | 0.9 | 0.9 | 4.3 | 0.0 |
| CAMBU | 0.9 | 0.9 | 2.2 | 8.6 | 0.9 | 0.9 | 0.9 | 4.3 | 0.0 |
| CAMBU | 2.0 | 2.0 | 4.9 | 19.5 | 2.0 | 2.0 | 2.0 | 0.0 | 0.0 |
| CAMBU | 0.0 | 2.1 | 5.1 | 20.5 | 2.1 | 2.1 | 2.1 | 0.0 | 0.0 |
| CAMBU | 0.0 | 0.7 | 1.7 | 6.9 | 0.7 | 0.7 | 0.0 | 3.4 | 0.0 |
| CAMBU | 0.0 | 0.7 | 1.7 | 6.7 | 0.7 | 0.7 | 0.0 | 3.4 | 0.0 |
| CAMBU | 0.0 | 0.7 | 1.7 | 6.7 | 0.7 | 0.7 | 0.0 | 3.4 | 0.0 |
| CAMBU | 0.0 | 0.7 | 1.7 | 6.7 | 0.7 | 0.7 | 0.0 | 3.4 | 0.0 |
| CAMBU | 0.0 | 1.6 | 4.1 | 16.2 | 1.6 | 1.6 | 0.0 | 0.0 | 0.0 |
| CAMBU | 0.0 | 0.0 | 4.3 | 17.1 | 1.7 | 1.7 | 0.0 | 0.0 | 0.0 |
| CAMBU | 0.0 | 0.0 | 1.1 | 4.6 | 0.5 | 0.5 | 0.0 | 2.3 | 0.0 |
| CAMBU | 0.0 | 0.0 | 1.1 | 4.6 | 0.5 | 0.5 | 0.0 | 2.3 | 0.0 |
| CAMBU | 0.0 | 0.0 | 1.1 | 4.6 | 0.5 | 0.5 | 0.0 | 2.3 | 0.0 |
| CAMBU | 0.0 | 0.0 | 2.9 | 11.4 | 1.1 | 1.1 | 0.0 | 0.0 | 0.0 |
| CAMBU | 0.0 | 0.0 | 3.4 | 13.8 | 1.4 | 0.0 | 0.0 | 0.0 | 0.0 |

TABLE B6-continued

States of ICAMBU, MCAMBU, FCAMBU

| | | | | | | | | | |
|---|---|---|---|---|---|---|---|---|---|
| CAMBU | 0.0 | 0.0 | 1.1 | 4.3 | 0.0 | 0.0 | 0.0 | 2.1 | 0.0 |
| CAMBU | 0.0 | 0.0 | 1.1 | 4.3 | 0.0 | 0.0 | 0.0 | 2.1 | 0.0 |
| CAMBU | 0.0 | 0.0 | 1.1 | 4.3 | 0.0 | 0.0 | 0.0 | 2.1 | 0.0 |
| CAMBU | 0.0 | 0.0 | 2.0 | 8.0 | 0.0 | 0.0 | 0.0 | 0.0 | 0.0 |
| CAMBU | 0.0 | 0.0 | 10.0 | 0.0 | 0.0 | 0.0 | 0.0 | 0.0 | 0.0 |
| CAMBU | 0.0 | 0.0 | 0.0 | 0.0 | 0.0 | 0.0 | 0.0 | 0.0 | 0.0 |
| CAMBU | 0.0 | 0.0 | 0.0 | 0.0 | 0.0 | 0.0 | 0.0 | 0.0 | 0.0 |
| CAMBU | 0.0 | 0.0 | 0.0 | 0.0 | 0.0 | 0.0 | 0.0 | 0.0 | 0.0 |

TABLE B7

States of ISAMP, MSAMP, FSAMP

| | | Q | Fk | Fpna | Fpca | RPp | RPk | RVb | RVi | RVs | RSq | RSf | RSl |
|---|---|---|---|---|---|---|---|---|---|---|---|---|---|
| SAMP | 2 | 0.0 | 3.8 | 3.4 | 2.8 | 0.0 | 0.0 | 6.2 | 0.0 | 0.0 | 0.0 | 0.0 | 6.2 |
| SAMP | 4 | 0.0 | 7.5 | 6.8 | 5.7 | 0.0 | 0.0 | 5.5 | 0.0 | 0.0 | 0.0 | 0.0 | 5.5 |
| SAMP | 7 | 0.0 | 11.3 | 10.3 | 8.5 | 0.0 | 0.0 | 4.8 | 0.0 | 0.0 | 0.0 | 0.0 | 4.8 |
| SAMP | 8 | 10.0 | 12.5 | 2.8 | 4.7 | 0.0 | 0.0 | 4.5 | 0.0 | 0.0 | 0.0 | 0.0 | 4.5 |
| SAMP | 11 | 0.0 | 15.0 | 13.7 | 11.3 | 0.0 | 0.0 | 4.1 | 0.0 | 0.0 | 0.0 | 0.0 | 4.1 |
| SAMP | 12 | 10.0 | 18.8 | 4.2 | 7.0 | 0.0 | 0.0 | 3.9 | 0.0 | 0.0 | 0.0 | 0.0 | 3.9 |
| SAMP | 13 | 20.0 | 12.5 | 2.8 | 4.7 | 16.7 | 12.5 | 1.7 | 1.7 | 1.7 | 0.0 | 0.0 | 1.7 |
| SAMP | 18 | 20.0 | 18.8 | 4.2 | 7.0 | 14.3 | 10.7 | 0.0 | 1.4 | 1.4 | 0.0 | 0.0 | 1.4 |
| SAMP | 24 | 20.0 | 25.0 | 5.6 | 9.4 | 11.4 | 8.6 | 0.0 | 1.1 | 1.1 | 0.0 | 0.0 | 1.1 |
| SAMP | 25 | 30.0 | 22.5 | 1.9 | 5.6 | 11.8 | 8.8 | 0.0 | 1.2 | 1.2 | 0.0 | 0.0 | 1.2 |
| SAMP | 26 | 40.0 | 15.0 | 1.3 | 3.8 | 12.1 | 9.1 | 0.0 | 1.2 | 1.2 | 0.0 | 0.0 | 1.2 |
| SAMP | 27 | 50.0 | 10.0 | 0.0 | 0.0 | 0.0 | 0.0 | 0.0 | 0.0 | 0.0 | 0.0 | 0.0 | 3.5 |
| SAMP | 31 | 20.0 | 31.3 | 7.0 | 11.7 | 9.1 | 6.8 | 0.0 | 0.9 | 0.9 | 0.0 | 0.0 | 0.9 |
| SAMP | 32 | 30.0 | 30.0 | 2.5 | 7.5 | 9.4 | 7.0 | 0.0 | 0.9 | 0.9 | 0.0 | 0.0 | 0.9 |
| SAMP | 33 | 40.0 | 22.5 | 1.9 | 5.6 | 9.7 | 7.3 | 0.0 | 1.0 | 1.0 | 0.0 | 0.0 | 1.0 |
| SAMP | 34 | 50.0 | 20.0 | 0.0 | 0.0 | 9.7 | 7.3 | 0.0 | 1.0 | 1.0 | 0.0 | 0.0 | 1.0 |
| SAMP | 35 | 60.0 | 10.0 | 0.0 | 0.0 | 0.0 | 0.0 | 0.0 | 0.0 | 0.0 | 0.0 | 0.0 | 3.2 |
| SAMP | 39 | 20.0 | 22.5 | 20.5 | 17.0 | 6.3 | 4.7 | 0.0 | 0.6 | 0.6 | 0.0 | 0.0 | 0.6 |
| SAMP | 41 | 40.0 | 30.0 | 2.5 | 7.5 | 6.5 | 4.8 | 0.0 | 0.6 | 0.6 | 0.0 | 0.0 | 0.6 |
| SAMP | 42 | 50.0 | 22.5 | 1.9 | 5.6 | 6.5 | 4.8 | 0.0 | 0.6 | 0.6 | 0.0 | 0.0 | 0.6 |
| SAMP | 43 | 60.0 | 20.0 | 0.0 | 0.0 | 6.7 | 5.0 | 0.0 | 0.7 | 0.7 | 0.0 | 0.0 | 0.7 |
| SAMP | 49 | 30.0 | 22.5 | 20.5 | 17.0 | 0.0 | 0.0 | 0.0 | 0.9 | 0.9 | 0.0 | 0.0 | 0.0 |
| SAMP | 50 | 40.0 | 31.3 | 7.0 | 11.7 | 0.0 | 0.0 | 0.0 | 0.9 | 0.9 | 0.0 | 0.0 | 0.0 |
| SAMP | 51 | 50.0 | 30.0 | 2.5 | 7.5 | 0.0 | 0.0 | 0.0 | 0.9 | 0.9 | 0.0 | 0.0 | 0.0 |
| SAMP | 52 | 60.0 | 30.0 | 0.0 | 0.0 | 0.0 | 0.0 | 0.0 | 0.9 | 0.9 | 0.0 | 0.0 | 0.0 |
| SAMP | 62 | 60.0 | 30.0 | 2.5 | 7.5 | 0.0 | 0.0 | 0.0 | 0.0 | 0.0 | 0.0 | 0.0 | 0.0 |

| | RSsh | RScb | RSct | RMqf | RMsh | RMc | RMpsc | RMgp | RMgk |
|---|---|---|---|---|---|---|---|---|---|
| SAMP | 6.2 | 6.2 | 6.2 | 46.6 | 0.0 | 6.2 | 6.2 | 0.0 | 0.0 |
| SAMP | 5.5 | 5.5 | 5.5 | 41.4 | 0.0 | 5.5 | 5.5 | 0.0 | 0.0 |
| SAMP | 4.8 | 4.8 | 4.8 | 36.2 | 0.0 | 4.8 | 4.8 | 0.0 | 0.0 |
| SAMP | 4.5 | 4.5 | 4.5 | 33.9 | 4.5 | 4.5 | 4.5 | 0.0 | 0.0 |
| SAMP | 4.1 | 4.1 | 4.1 | 31.0 | 0.0 | 4.1 | 4.1 | 0.0 | 0.0 |
| SAMP | 3.9 | 3.9 | 3.9 | 29.0 | 3.9 | 3.9 | 3.9 | 0.0 | 0.0 |
| SAMP | 1.7 | 1.7 | 1.7 | 12.5 | 1.7 | 1.7 | 1.7 | 1.7 | 0.0 |
| SAMP | 1.4 | 1.4 | 1.4 | 10.7 | 1.4 | 1.4 | 1.4 | 1.4 | 0.0 |
| SAMP | 1.1 | 1.1 | 1.1 | 8.6 | 1.1 | 1.1 | 1.1 | 1.1 | 0.0 |
| SAMP | 1.2 | 0.0 | 1.2 | 8.8 | 1.2 | 1.2 | 1.2 | 1.2 | 0.0 |
| SAMP | 1.2 | 0.0 | 1.2 | 9.1 | 1.2 | 0.0 | 1.2 | 1.2 | 0.0 |
| SAMP | 0.0 | 0.0 | 3.5 | 26.1 | 3.5 | 0.0 | 3.5 | 0.0 | 0.0 |
| SAMP | 0.0 | 0.9 | 0.9 | 6.8 | 0.9 | 0.9 | 0.0 | 0.9 | 0.0 |
| SAMP | 0.0 | 0.0 | 0.9 | 7.0 | 0.9 | 0.9 | 0.0 | 0.9 | 0.0 |
| SAMP | 0.0 | 0.0 | 1.0 | 7.3 | 1.0 | 0.0 | 0.0 | 1.0 | 0.0 |
| SAMP | 0.0 | 0.0 | 1.0 | 7.3 | 1.0 | 0.0 | 0.0 | 1.0 | 0.0 |
| SAMP | 0.0 | 0.0 | 3.2 | 23.7 | 0.0 | 0.0 | 0.0 | 0.0 | 0.0 |
| SAMP | 0.0 | 0.0 | 0.6 | 4.7 | 0.6 | 0.6 | 0.0 | 0.6 | 0.0 |
| SAMP | 0.0 | 0.0 | 0.6 | 4.8 | 0.6 | 0.0 | 0.0 | 0.6 | 0.0 |
| SAMP | 0.0 | 0.0 | 0.6 | 4.8 | 0.6 | 0.0 | 0.0 | 0.6 | 0.0 |
| SAMP | 0.0 | 0.0 | 0.7 | 5.0 | 0.0 | 0.0 | 0.0 | 0.7 | 0.0 |
| SAMP | 0.0 | 0.0 | 0.9 | 6.5 | 0.0 | 0.0 | 0.0 | 0.9 | 0.0 |
| SAMP | 0.0 | 0.0 | 0.9 | 6.5 | 0.0 | 0.0 | 0.0 | 0.9 | 0.0 |
| SAMP | 0.0 | 0.0 | 0.9 | 6.5 | 0.0 | 0.0 | 0.0 | 0.9 | 0.0 |
| SAMP | 0.0 | 0.0 | 0.9 | 6.5 | 0.0 | 0.0 | 0.0 | 0.9 | 0.0 |
| SAMP | 0.0 | 0.0 | 0.0 | 0.0 | 0.0 | 0.0 | 0.0 | 0.0 | 0.0 |

TABLE B8

States of ISAMV, MSAMV, FSAMV

| | | Q | Fk | Fpna | Fpca | RPp | RPk | RVb | RVi | RVs | RSq | RSf | RSl |
|---|---|---|---|---|---|---|---|---|---|---|---|---|---|
| SAMV | 4 | 0.0 | 5.0 | 2.8 | 12.2 | 0.0 | 0.0 | 5.9 | 0.0 | 0.0 | 0.0 | 0.0 | 14.8 |
| SAMV | 5 | 10.0 | 5.0 | 1.6 | 3.4 | 0.0 | 0.0 | 5.9 | 0.0 | 0.0 | 0.0 | 0.0 | 14.8 |
| SAMV | 7 | 0.0 | 7.5 | 4.2 | 18.3 | 0.0 | 0.0 | 5.2 | 0.0 | 0.0 | 0.0 | 0.0 | 13.0 |
| SAMV | 8 | 10.0 | 10.0 | 3.1 | 6.9 | 0.0 | 0.0 | 5.2 | 0.0 | 0.0 | 0.0 | 0.0 | 13.0 |
| SAMV | 9 | 20.0 | 8.8 | 0.2 | 1.1 | 0.0 | 0.0 | 5.6 | 0.0 | 0.0 | 0.0 | 0.0 | 14.0 |
| SAMV | 11 | 0.0 | 10.0 | 5.6 | 24.4 | 0.0 | 0.0 | 4.4 | 0.0 | 0.0 | 0.0 | 0.0 | 11.1 |
| SAMV | 12 | 10.0 | 15.0 | 4.7 | 10.3 | 0.0 | 0.0 | 4.4 | 0.0 | 0.0 | 0.0 | 0.0 | 11.1 |
| SAMV | 14 | 30.0 | 10.0 | 0.0 | 0.0 | 0.0 | 0.0 | 4.8 | 0.0 | 0.0 | 0.0 | 0.0 | 12.0 |
| SAMV | 17 | 10.0 | 20.0 | 6.3 | 13.8 | 0.0 | 0.0 | 0.0 | 0.0 | 0.0 | 0.0 | 0.0 | 10.0 |
| SAMV | 18 | 20.0 | 26.3 | 0.5 | 3.3 | 3.4 | 3.4 | 0.0 | 13.7 | 10.3 | 0.0 | 0.0 | 3.4 |
| SAMV | 20 | 40.0 | 10.0 | 0.0 | 0.0 | 0.0 | 0.0 | 0.0 | 0.0 | 0.0 | 0.0 | 0.0 | 10.9 |
| SAMV | 23 | 10.0 | 12.5 | 7.0 | 30.5 | 0.0 | 0.0 | 0.0 | 0.0 | 0.0 | 0.0 | 0.0 | 8.0 |
| SAMV | 24 | 20.0 | 20.0 | 6.3 | 13.8 | 2.7 | 2.7 | 0.0 | 11.0 | 8.2 | 0.0 | 0.0 | 2.7 |
| SAMV | 25 | 30.0 | 26.3 | 0.5 | 3.3 | 2.7 | 2.7 | 0.0 | 11.0 | 8.2 | 0.0 | 0.0 | 2.7 |
| SAMV | 31 | 20.0 | 12.5 | 7.0 | 30.5 | 2.2 | 2.2 | 0.0 | 8.7 | 6.5 | 0.0 | 0.0 | 2.2 |
| SAMV | 40 | 30.0 | 25.0 | 7.8 | 17.2 | 1.4 | 1.4 | 0.0 | 5.8 | 4.3 | 0.0 | 0.0 | 1.4 |

| | RSsh | RScb | RSct | RMqf | RMsh | RMc | RMpsc | RMgp | RMgk |
|---|---|---|---|---|---|---|---|---|---|
| SAMV | 5.9 | 5.9 | 29.6 | 0.0 | 5.9 | 5.9 | 5.9 | 0.0 | 0.0 |
| SAMV | 5.9 | 5.9 | 29.6 | 0.0 | 5.9 | 5.9 | 5.9 | 0.0 | 0.0 |
| SAMV | 5.2 | 5.2 | 25.9 | 0.0 | 5.2 | 5.2 | 5.2 | 0.0 | 0.0 |
| SAMV | 5.2 | 5.2 | 25.9 | 0.0 | 5.2 | 5.2 | 5.2 | 0.0 | 0.0 |
| SAMV | 5.6 | 0.0 | 28.0 | 0.0 | 5.6 | 5.6 | 5.6 | 0.0 | 0.0 |
| SAMV | 4.4 | 4.4 | 22.2 | 0.0 | 4.4 | 4.4 | 4.4 | 0.0 | 0.0 |
| SAMV | 4.4 | 4.4 | 22.2 | 0.0 | 4.4 | 4.4 | 4.4 | 0.0 | 0.0 |
| SAMV | 4.8 | 0.0 | 24.0 | 0.0 | 4.8 | 4.8 | 4.8 | 0.0 | 0.0 |
| SAMV | 4.0 | 4.0 | 20.0 | 0.0 | 4.0 | 4.0 | 4.0 | 0.0 | 0.0 |
| SAMV | 1.4 | 0.0 | 6.8 | 0.0 | 1.4 | 1.4 | 1.4 | 3.4 | 0.0 |
| SAMV | 4.3 | 0.0 | 21.7 | 0.0 | 4.3 | 4.3 | 4.3 | 0.0 | 0.0 |
| SAMV | 3.2 | 3.2 | 16.0 | 0.0 | 3.2 | 3.2 | 3.2 | 0.0 | 0.0 |
| SAMV | 1.1 | 0.0 | 5.5 | 0.0 | 1.1 | 1.1 | 1.1 | 2.7 | 0.0 |
| SAMV | 1.1 | 0.0 | 5.5 | 0.0 | 1.1 | 1.1 | 1.1 | 2.7 | 0.0 |
| SAMV | 0.0 | 0.0 | 4.3 | 0.0 | 0.9 | 0.9 | 0.0 | 2.2 | 0.0 |
| SAMV | 0.0 | 0.0 | 2.9 | 0.0 | 0.6 | 0.6 | 0.0 | 1.4 | 0.0 |

TABLE B9

States of ICAMSU, MCAMSU, FCAMSU

| | | Q | Fk | Fpna | Fpca | RPp | RPk | RVb | RVi | RVs | RSq | RSf | RSl |
|---|---|---|---|---|---|---|---|---|---|---|---|---|---|
| CAMSU | 1 | 0.0 | 0.0 | 0.0 | 0.0 | 0.0 | 0.0 | 5.7 | 0.0 | 0.0 | 0.0 | 0.0 | 0.0 |
| CAMSU | 2 | 0.0 | 5.0 | 1.9 | 3.1 | 0.0 | 0.0 | 5.1 | 0.0 | 0.0 | 0.0 | 0.0 | 0.0 |
| CAMSU | 4 | 0.0 | 10.0 | 3.8 | 6.3 | 0.0 | 0.0 | 4.6 | 0.0 | 0.0 | 0.0 | 0.0 | 0.0 |
| CAMSU | 5 | 10.0 | 5.0 | 1.9 | 3.1 | 0.0 | 0.0 | 4.3 | 0.0 | 0.0 | 0.0 | 0.0 | 0.0 |
| CAMSU | 6 | 20.0 | 0.0 | 0.0 | 0.0 | 0.0 | 0.0 | 3.5 | 0.0 | 0.0 | 8.7 | 3.5 | 3.5 |
| CAMSU | 8 | 10.0 | 10.0 | 3.8 | 6.3 | 0.0 | 0.0 | 3.8 | 0.0 | 0.0 | 0.0 | 0.0 | 0.0 |
| CAMSU | 9 | 20.0 | 7.5 | 0.6 | 1.9 | 0.0 | 0.0 | 3.0 | 0.0 | 0.0 | 7.6 | 3.0 | 3.0 |
| CAMSU | 10 | 30.0 | 0.0 | 0.0 | 0.0 | 0.0 | 0.0 | 3.0 | 0.0 | 0.0 | 7.6 | 3.0 | 3.0 |
| CAMSU | 13 | 20.0 | 10.0 | 3.8 | 6.3 | 1.8 | 4.5 | 1.8 | 1.8 | 9.0 | 4.5 | 1.8 | 1.8 |
| CAMSU | 14 | 30.0 | 7.5 | 0.6 | 1.9 | 0.0 | 0.0 | 2.6 | 0.0 | 0.0 | 6.5 | 2.6 | 2.6 |
| CAMSU | 15 | 40.0 | 0.0 | 0.0 | 0.0 | 0.0 | 0.0 | 2.6 | 0.0 | 0.0 | 6.5 | 2.6 | 2.6 |
| CAMSU | 18 | 20.0 | 15.0 | 5.6 | 9.4 | 1.5 | 3.8 | 0.0 | 1.5 | 7.7 | 3.8 | 1.5 | 1.5 |
| CAMSU | 19 | 30.0 | 10.0 | 3.8 | 6.3 | 1.5 | 3.8 | 0.0 | 1.5 | 7.7 | 3.8 | 1.5 | 1.5 |
| CAMSU | 20 | 40.0 | 7.5 | 0.6 | 1.9 | 0.0 | 0.0 | 0.0 | 0.0 | 0.0 | 5.7 | 2.3 | 2.3 |
| CAMSU | 21 | 50.0 | 0.0 | 0.0 | 0.0 | 0.0 | 0.0 | 0.0 | 0.0 | 0.0 | 5.7 | 2.3 | 2.3 |
| CAMSU | 25 | 30.0 | 15.0 | 5.6 | 9.4 | 1.2 | 3.1 | 0.0 | 1.2 | 6.2 | 3.1 | 1.2 | 1.2 |
| CAMSU | 26 | 40.0 | 15.0 | 1.3 | 3.8 | 1.2 | 3.1 | 0.0 | 1.2 | 6.2 | 3.1 | 1.2 | 1.2 |
| CAMSU | 27 | 50.0 | 7.5 | 0.6 | 1.9 | 0.0 | 0.0 | 0.0 | 0.0 | 0.0 | 4.5 | 1.8 | 1.8 |
| CAMSU | 28 | 60.0 | 0.0 | 0.0 | 0.0 | 0.0 | 0.0 | 0.0 | 0.0 | 0.0 | 4.5 | 1.8 | 1.8 |
| CAMSU | 33 | 40.0 | 22.5 | 1.9 | 5.6 | 1.0 | 2.5 | 0.0 | 1.0 | 4.9 | 2.5 | 1.0 | 1.0 |
| CAMSU | 34 | 50.0 | 15.0 | 1.3 | 3.8 | 1.0 | 2.5 | 0.0 | 1.0 | 4.9 | 2.5 | 1.0 | 1.0 |
| CAMSU | 35 | 60.0 | 10.0 | 0.0 | 0.0 | 0.0 | 0.0 | 0.0 | 0.0 | 0.0 | 3.8 | 1.5 | 1.5 |
| CAMSU | 36 | 70.0 | 0.0 | 0.0 | 0.0 | 0.0 | 0.0 | 0.0 | 0.0 | 0.0 | 3.8 | 1.5 | 1.5 |
| CAMSU | 42 | 50.0 | 22.5 | 1.9 | 5.6 | 0.7 | 1.7 | 0.0 | 0.7 | 3.4 | 1.7 | 0.7 | 0.7 |
| CAMSU | 43 | 60.0 | 20.0 | 0.0 | 0.0 | 0.7 | 1.7 | 0.0 | 0.7 | 3.4 | 1.7 | 0.7 | 0.7 |
| CAMSU | 44 | 70.0 | 10.0 | 0.0 | 0.0 | 0.0 | 0.0 | 0.0 | 0.0 | 0.0 | 2.6 | 1.1 | 1.1 |
| CAMSU | 45 | 80.0 | 0.0 | 0.0 | 0.0 | 0.0 | 0.0 | 0.0 | 0.0 | 0.0 | 2.6 | 1.1 | 1.1 |
| CAMSU | 52 | 60.0 | 30.0 | 0.0 | 0.0 | 0.0 | 0.0 | 0.0 | 0.5 | 2.6 | 0.0 | 0.0 | 0.0 |
| CAMSU | 53 | 70.0 | 20.0 | 0.0 | 0.0 | 0.0 | 0.0 | 0.0 | 0.5 | 2.6 | 0.0 | 0.0 | 0.0 |
| CAMSU | 54 | 80.0 | 10.0 | 0.0 | 0.0 | 0.0 | 0.0 | 0.0 | 0.0 | 0.0 | 0.0 | 0.0 | 0.0 |

TABLE B9-continued

States of ICAMSU, MCAMSU, FCAMSU

| | | | | | | | | | | | | | |
|---|---|---|---|---|---|---|---|---|---|---|---|---|---|
| CAMSU | 55 | 90.0 | 0.0 | 0.0 | 0.0 | 0.0 | 0.0 | 0.0 | 0.0 | 0.0 | 0.0 | 0.0 | 0.0 |
| CAMSU | 63 | 70.0 | 30.0 | 0.0 | 0.0 | 0.0 | 0.0 | 0.0 | 0.0 | 0.0 | 0.0 | 0.0 | 0.0 |
| CAMSU | 64 | 80.0 | 20.0 | 0.0 | 0.0 | 0.0 | 0.0 | 0.0 | 0.0 | 0.0 | 0.0 | 0.0 | 0.0 |
| CAMSU | 65 | 90.0 | 10.0 | 0.0 | 0.0 | 0.0 | 0.0 | 0.0 | 0.0 | 0.0 | 0.0 | 0.0 | 0.0 |
| CAMSU | 66 | 100.0 | 0.0 | 0.0 | 0.0 | 0.0 | 0.0 | 0.0 | 0.0 | 0.0 | 0.0 | 0.0 | 0.0 |

| | RSsh | RScb | RSct | RMqf | RMsh | RMc | RMpsc | RMgp | RMgk |
|---|---|---|---|---|---|---|---|---|---|
| CAMSU | 0.0 | 5.7 | 14.3 | 57.1 | 5.7 | 5.7 | 5.7 | 0.0 | 0.0 |
| CAMSU | 0.0 | 5.1 | 12.9 | 51.4 | 5.1 | 5.1 | 5.1 | 0.0 | 0.0 |
| CAMSU | 0.0 | 4.6 | 11.4 | 45.7 | 4.6 | 4.6 | 4.6 | 0.0 | 0.0 |
| CAMSU | 4.3 | 4.3 | 10.8 | 43.2 | 4.3 | 4.3 | 4.3 | 0.0 | 0.0 |
| CAMSU | 3.5 | 3.5 | 8.7 | 34.8 | 3.5 | 3.5 | 3.5 | 0.0 | 0.0 |
| CAMSU | 3.8 | 3.8 | 9.5 | 37.8 | 3.8 | 3.8 | 3.8 | 0.0 | 0.0 |
| CAMSU | 3.0 | 3.0 | 7.6 | 30.4 | 3.0 | 3.0 | 3.0 | 0.0 | 0.0 |
| CAMSU | 3.0 | 3.0 | 7.6 | 30.4 | 3.0 | 3.0 | 3.0 | 0.0 | 0.0 |
| CAMSU | 1.8 | 1.8 | 4.5 | 17.9 | 1.8 | 1.8 | 1.8 | 1.8 | 0.0 |
| CAMSU | 2.6 | 2.6 | 6.5 | 26.1 | 2.6 | 2.6 | 2.6 | 0.0 | 0.0 |
| CAMSU | 2.6 | 2.6 | 6.5 | 26.1 | 2.6 | 2.6 | 2.6 | 0.0 | 0.0 |
| CAMSU | 1.5 | 1.5 | 3.8 | 15.4 | 1.5 | 1.5 | 1.5 | 1.5 | 0.0 |
| CAMSU | 1.5 | 1.5 | 3.8 | 15.4 | 1.5 | 1.5 | 1.5 | 1.5 | 0.0 |
| CAMSU | 2.3 | 2.3 | 5.7 | 22.7 | 2.3 | 2.3 | 2.3 | 0.0 | 0.0 |
| CAMSU | 2.3 | 2.3 | 5.7 | 22.7 | 2.3 | 2.3 | 2.3 | 0.0 | 0.0 |
| CAMSU | 1.2 | 1.2 | 3.1 | 12.3 | 1.2 | 1.2 | 1.2 | 1.2 | 0.0 |
| CAMSU | 1.2 | 1.2 | 3.1 | 12.3 | 1.2 | 1.2 | 1.2 | 1.2 | 0.0 |
| CAMSU | 1.8 | 1.8 | 4.5 | 18.2 | 1.8 | 1.8 | 1.8 | 0.0 | 0.0 |
| CAMSU | 1.8 | 1.8 | 4.5 | 18.2 | 1.8 | 1.8 | 1.8 | 0.0 | 0.0 |
| CAMSU | 0.0 | 1.0 | 2.5 | 9.8 | 1.0 | 1.0 | 0.0 | 1.0 | 0.0 |
| CAMSU | 0.0 | 1.0 | 2.5 | 9.8 | 1.0 | 1.0 | 0.0 | 1.0 | 0.0 |
| CAMSU | 0.0 | 1.5 | 3.8 | 15.0 | 1.5 | 1.5 | 0.0 | 0.0 | 0.0 |
| CAMSU | 0.0 | 1.5 | 3.8 | 15.0 | 1.5 | 1.5 | 0.0 | 0.0 | 0.0 |
| CAMSU | 0.0 | 0.0 | 1.7 | 6.8 | 0.7 | 0.7 | 0.0 | 0.7 | 0.0 |
| CAMSU | 0.0 | 0.0 | 1.7 | 6.8 | 0.7 | 0.7 | 0.0 | 0.7 | 0.0 |
| CAMSU | 0.0 | 0.0 | 2.6 | 10.5 | 1.1 | 1.1 | 0.0 | 0.0 | 0.0 |
| CAMSU | 0.0 | 0.0 | 2.6 | 10.5 | 1.1 | 1.1 | 0.0 | 0.0 | 0.0 |
| CAMSU | 0.0 | 0.0 | 1.3 | 5.1 | 0.0 | 0.0 | 0.0 | 0.5 | 0.0 |
| CAMSU | 0.0 | 0.0 | 1.3 | 5.1 | 0.0 | 0.0 | 0.0 | 0.5 | 0.0 |
| CAMSU | 0.0 | 0.0 | 2.0 | 8.0 | 0.0 | 0.0 | 0.0 | 0.0 | 0.0 |
| CAMSU | 0.0 | 0.0 | 2.0 | 8.0 | 0.0 | 0.0 | 0.0 | 0.0 | 0.0 |
| CAMSU | 0.0 | 0.0 | 0.0 | 0.0 | 0.0 | 0.0 | 0.0 | 0.0 | 0.0 |
| CAMSU | 0.0 | 0.0 | 0.0 | 0.0 | 0.0 | 0.0 | 0.0 | 0.0 | 0.0 |
| CAMSU | 0.0 | 0.0 | 0.0 | 0.0 | 0.0 | 0.0 | 0.0 | 0.0 | 0.0 |
| CAMSU | 0.0 | 0.0 | 0.0 | 0.0 | 0.0 | 0.0 | 0.0 | 0.0 | 0.0 |

TABLE B10

States of ICISU, MCISU, FCISU

| | | Q | Fk | Fpna | Fpca | RPp | RPk | RVb | RVi | RVs | RSq | RSf | RSl |
|---|---|---|---|---|---|---|---|---|---|---|---|---|---|
| CISU | 10 | 30.0 | 0.0 | 0.0 | 0.0 | 0.0 | 0.0 | 0.0 | 0.0 | 0.0 | 22.6 | 5.6 | 2.3 |
| CISU | 14 | 30.0 | 5.0 | 1.9 | 3.1 | 0.0 | 0.0 | 0.0 | 0.0 | 0.0 | 19.4 | 4.8 | 1.9 |
| CISU | 15 | 40.0 | 0.0 | 0.0 | 0.0 | 0.0 | 0.0 | 0.0 | 0.0 | 0.0 | 19.4 | 4.8 | 1.9 |
| CISU | 19 | 30.0 | 10.0 | 3.8 | 6.3 | 1.4 | 1.4 | 0.0 | 1.4 | 1.4 | 13.9 | 3.5 | 1.4 |
| CISU | 20 | 40.0 | 6.3 | 1.2 | 2.5 | 0.0 | 0.0 | 0.0 | 0.0 | 0.0 | 16.1 | 4.0 | 1.6 |
| CISU | 21 | 50.0 | 0.0 | 0.0 | 0.0 | 0.0 | 0.0 | 0.0 | 0.0 | 0.0 | 16.1 | 4.0 | 1.6 |
| CISU | 25 | 30.0 | 15.0 | 5.6 | 9.4 | 1.1 | 1.1 | 0.0 | 1.1 | 1.1 | 11.1 | 2.8 | 1.1 |
| CISU | 26 | 40.0 | 12.5 | 2.5 | 5.0 | 1.1 | 1.1 | 0.0 | 1.1 | 1.1 | 11.1 | 2.8 | 1.1 |
| CISU | 27 | 50.0 | 8.8 | 0.2 | 1.1 | 0.0 | 0.0 | 0.0 | 0.0 | 0.0 | 12.9 | 3.2 | 1.3 |
| CISU | 28 | 60.0 | 0.0 | 0.0 | 0.0 | 0.0 | 0.0 | 0.0 | 0.0 | 0.0 | 12.9 | 3.2 | 1.3 |
| CISU | 33 | 40.0 | 15.0 | 5.6 | 9.4 | 0.0 | 0.0 | 0.0 | 0.0 | 0.0 | 0.0 | 0.0 | 0.0 |
| CISU | 34 | 50.0 | 12.5 | 2.5 | 5.0 | 0.9 | 0.9 | 0.0 | 0.9 | 0.9 | 8.8 | 2.2 | 0.9 |
| CISU | 35 | 60.0 | 8.8 | 0.2 | 1.1 | 0.0 | 0.0 | 0.0 | 0.0 | 0.0 | 10.3 | 2.6 | 1.0 |
| CISU | 36 | 70.0 | 0.0 | 0.0 | 0.0 | 0.0 | 0.0 | 0.0 | 0.0 | 0.0 | 10.3 | 2.6 | 1.0 |
| CISU | 42 | 50.0 | 18.8 | 3.7 | 7.6 | 0.6 | 0.6 | 0.0 | 0.6 | 0.6 | 6.1 | 1.5 | 0.6 |
| CISU | 43 | 60.0 | 17.5 | 0.3 | 2.2 | 0.6 | 0.6 | 0.0 | 0.6 | 0.6 | 6.1 | 1.5 | 0.6 |
| CISU | 44 | 70.0 | 10.0 | 0.0 | 0.0 | 0.0 | 0.0 | 0.0 | 0.0 | 0.0 | 7.1 | 1.8 | 0.7 |
| CISU | 45 | 80.0 | 0.0 | 0.0 | 0.0 | 0.0 | 0.0 | 0.0 | 0.0 | 0.0 | 0.0 | 0.0 | 1.3 |
| CISU | 52 | 60.0 | 26.3 | 0.5 | 3.3 | 0.0 | 0.0 | 0.0 | 0.6 | 0.6 | 0.0 | 0.0 | 0.0 |
| CISU | 53 | 70.0 | 20.0 | 0.0 | 0.0 | 0.0 | 0.0 | 0.0 | 0.6 | 0.6 | 0.0 | 0.0 | 0.0 |
| CISU | 54 | 80.0 | 10.0 | 0.0 | 0.0 | 0.0 | 0.0 | 0.0 | 0.0 | 0.0 | 0.0 | 0.0 | 0.0 |
| CISU | 55 | 90.0 | 0.0 | 0.0 | 0.0 | 0.0 | 0.0 | 0.0 | 0.0 | 0.0 | 0.0 | 0.0 | 0.0 |
| CISU | 63 | 70.0 | 26.3 | 0.5 | 3.3 | 0.0 | 0.0 | 0.0 | 0.0 | 0.0 | 0.0 | 0.0 | 0.0 |
| CISU | 64 | 80.0 | 20.0 | 0.0 | 0.0 | 0.0 | 0.0 | 0.0 | 0.0 | 0.0 | 0.0 | 0.0 | 0.0 |

TABLE B10-continued

States of ICISU, MCISU, FCISU

| | | | | | | | | | | | | | |
|---|---|---|---|---|---|---|---|---|---|---|---|---|---|
| CISU | 65 | 90.0 | 10.0 | 0.0 | 0.0 | 0.0 | 0.0 | 0.0 | 0.0 | 0.0 | 0.0 | 0.0 | 0.0 |
| CISU | 66 | 100.0 | 0.0 | 0.0 | 0.0 | 0.0 | 0.0 | 0.0 | 0.0 | 0.0 | 0.0 | 0.0 | 0.0 |

| | RSsh | RScb | RSct | RMqf | RMsh | RMc | RMpsc | RMgp | RMgk |
|---|---|---|---|---|---|---|---|---|---|
| CISU | 2.3 | 2.3 | 11.3 | 16.9 | 2.3 | 2.3 | 2.3 | 0.0 | 0.0 |
| CISU | 1.9 | 1.9 | 9.7 | 14.5 | 1.9 | 1.9 | 1.9 | 0.0 | 0.0 |
| CISU | 1.9 | 1.9 | 9.7 | 14.5 | 1.9 | 1.9 | 1.9 | 0.0 | 0.0 |
| CISU | 1.4 | 1.4 | 6.9 | 10.4 | 1.4 | 1.4 | 1.4 | 1.4 | 0.0 |
| CISU | 1.6 | 1.6 | 8.1 | 12.1 | 1.6 | 1.6 | 1.6 | 0.0 | 0.0 |
| CISU | 1.6 | 1.6 | 8.1 | 12.1 | 1.6 | 1.6 | 1.6 | 0.0 | 0.0 |
| CISU | 1.1 | 1.1 | 5.6 | 8.3 | 1.1 | 1.1 | 1.1 | 1.1 | 0.0 |
| CISU | 1.1 | 1.1 | 5.6 | 8.3 | 1.1 | 1.1 | 1.1 | 1.1 | 0.0 |
| CISU | 1.3 | 1.3 | 6.5 | 9.7 | 1.3 | 1.3 | 1.3 | 0.0 | 0.0 |
| CISU | 1.3 | 1.3 | 6.5 | 9.7 | 1.3 | 1.3 | 1.3 | 0.0 | 0.0 |
| CISU | 0.0 | 0.0 | 0.0 | 0.0 | 0.0 | 0.0 | 0.0 | 0.0 | 0.0 |
| CISU | 0.0 | 0.9 | 4.4 | 6.6 | 0.9 | 0.9 | 0.0 | 0.9 | 0.0 |
| CISU | 0.0 | 1.0 | 5.2 | 7.8 | 1.0 | 1.0 | 0.0 | 0.0 | 0.0 |
| CISU | 0.0 | 1.0 | 5.2 | 7.8 | 1.0 | 1.0 | 0.0 | 0.0 | 0.0 |
| CISU | 0.0 | 0.0 | 3.0 | 4.5 | 0.6 | 0.6 | 0.0 | 0.6 | 0.0 |
| CISU | 0.0 | 0.0 | 3.0 | 4.5 | 0.6 | 0.6 | 0.0 | 0.6 | 0.0 |
| CISU | 0.0 | 0.0 | 3.6 | 5.4 | 0.7 | 0.7 | 0.0 | 0.0 | 0.0 |
| CISU | 0.0 | 0.0 | 6.5 | 9.7 | 1.3 | 1.3 | 0.0 | 0.0 | 0.0 |
| CISU | 0.0 | 0.0 | 3.2 | 4.8 | 0.0 | 0.0 | 0.0 | 0.6 | 0.0 |
| CISU | 0.0 | 0.0 | 3.2 | 4.8 | 0.0 | 0.0 | 0.0 | 0.6 | 0.0 |
| CISU | 0.0 | 0.0 | 4.0 | 6.0 | 0.0 | 0.0 | 0.0 | 0.0 | 0.0 |
| CISU | 0.0 | 0.0 | 4.0 | 6.0 | 0.0 | 0.0 | 0.0 | 0.0 | 0.0 |
| CISU | 0.0 | 0.0 | 0.0 | 0.0 | 0.0 | 0.0 | 0.0 | 0.0 | 0.0 |
| CISU | 0.0 | 0.0 | 0.0 | 0.0 | 0.0 | 0.0 | 0.0 | 0.0 | 0.0 |
| CISU | 0.0 | 0.0 | 0.0 | 0.0 | 0.0 | 0.0 | 0.0 | 0.0 | 0.0 |
| CISU | 0.0 | 0.0 | 0.0 | 0.0 | 0.0 | 0.0 | 0.0 | 0.0 | 0.0 |

TABLE B11

States of GSI

| State | Description | | | | | | |
|---|---|---|---|---|---|---|---|
| | % granules | % vc sand | % c sand | % m sand | % f sand | % vf sand | % silt |
| P1GS1 | 30.0 | 25.0 | 15.0 | 15.0 | 5.0 | 5.0 | 5.0 |
| P1GS2 | 25.0 | 25.0 | 15.0 | 15.0 | 10.0 | 5.0 | 5.0 |
| P1GS3 | 10.0 | 10.0 | 25.0 | 20.0 | 15.0 | 10.0 | 10.0 |
| P2GS1 | 30.0 | 25.0 | 15.0 | 15.0 | 5.0 | 5.0 | 5.0 |
| P2GS2 | 25.0 | 25.0 | 15.0 | 15.0 | 10.0 | 5.0 | 5.0 |
| P2GS3 | 10.0 | 10.0 | 25.0 | 20.0 | 15.0 | 10.0 | 10.0 |
| P3GS1 | 20.0 | 20.0 | 20.0 | 10.0 | 10.0 | 10.0 | 10.0 |
| P3GS2 | 5.0 | 5.0 | 10.0 | 15.0 | 20.0 | 30.0 | 15.0 |
| P3GS3 | 0.0 | 0.0 | 5.0 | 10.0 | 30.0 | 30.0 | 25.0 |
| P4GS1 | 15.0 | 20.0 | 25.0 | 20.0 | 10.0 | 5.0 | 5.0 |
| P4GS2 | 10.0 | 10.0 | 20.0 | 20.0 | 20.0 | 10.0 | 10.0 |
| P4GS3 | 0.0 | 5.0 | 10.0 | 20.0 | 20.0 | 25.0 | 20.0 |
| P5GS1 | 15.0 | 20.0 | 25.0 | 20.0 | 10.0 | 5.0 | 5.0 |
| P5GS2 | 15.0 | 15.0 | 15.0 | 15.0 | 20.0 | 10.0 | 10.0 |
| P5GS3 | 5.0 | 5.0 | 15.0 | 20.0 | 25.0 | 20.0 | 10.0 |
| P6GS1 | 5.0 | 10.0 | 15.0 | 25.0 | 20.0 | 15.0 | 10.0 |
| P6GS2 | 0.0 | 10.0 | 10.0 | 30.0 | 25.0 | 15.0 | 10.0 |
| P6GS3 | 0.0 | 5.0 | 5.0 | 20.0 | 30.0 | 25.0 | 15.0 |
| P7GS1 | 5.0 | 10.0 | 10.0 | 25.0 | 25.0 | 15.0 | 10.0 |
| P7GS2 | 0.0 | 5.0 | 5.0 | 20.0 | 25.0 | 25.0 | 20.0 |
| P7GS3 | 0.0 | 0.0 | 3.0 | 10.0 | 27.0 | 35.0 | 25.0 |
| P8GS1 | 10.0 | 10.0 | 10.0 | 10.0 | 15.0 | 20.0 | 25.0 |
| P8GS2 | 5.0 | 5.0 | 5.0 | 10.0 | 10.0 | 30.0 | 35.0 |
| P8GS3 | 0.0 | 0.0 | 0.0 | 10.0 | 15.0 | 35.0 | 40.0 |
| P9GS1 | 30.0 | 20.0 | 20.0 | 5.0 | 5.0 | 10.0 | 10.0 |
| P9GS2 | 20.0 | 25.0 | 25.0 | 5.0 | 5.0 | 10.0 | 10.0 |
| P9GS3 | 30.0 | 25.0 | 25.0 | 5.0 | 5.0 | 5.0 | 5.0 |
| P10GS1 | 20.0 | 20.0 | 20.0 | 15.0 | 10.0 | 10.0 | 5.0 |
| P10GS2 | 15.0 | 15.0 | 20.0 | 20.0 | 10.0 | 10.0 | 10.0 |
| P10GS3 | 5.0 | 5.0 | 10.0 | 25.0 | 25.0 | 20.0 | 10.0 |
| P11GS1 | 15.0 | 10.0 | 10.0 | 15.0 | 15.0 | 20.0 | 15.0 |
| P11GS2 | 10.0 | 5.0 | 5.0 | 5.0 | 15.0 | 35.0 | 25.0 |
| P11GS3 | 0.0 | 0.0 | 0.0 | 15.0 | 20.0 | 35.0 | 30.0 |
| P12GS1 | 35.0 | 25.0 | 20.0 | 10.0 | 6.0 | 2.0 | 2.0 |
| P12GS2 | 30.0 | 20.0 | 20.0 | 10.0 | 5.0 | 5.0 | 10.0 |
| P12GS3 | 30.0 | 20.0 | 10.0 | 5.0 | 5.0 | 15.0 | 15.0 |
| P13GS1 | 10.0 | 15.0 | 20.0 | 20.0 | 15.0 | 10.0 | 10.0 |
| P13GS2 | 2.0 | 3.0 | 15.0 | 30.0 | 20.0 | 15.0 | 15.0 |
| P13GS3 | 0.0 | 0.0 | 5.0 | 25.0 | 30.0 | 20.0 | 20.0 |
| P14GS1 | 15.0 | 15.0 | 25.0 | 20.0 | 15.0 | 5.0 | 5.0 |
| P14GS2 | 10.0 | 10.0 | 20.0 | 20.0 | 20.0 | 10.0 | 10.0 |
| P14GS3 | 5.0 | 5.0 | 15.0 | 20.0 | 25.0 | 15.0 | 15.0 |

TABLE B12

States of GST

| State | Description | | | | | | |
|---|---|---|---|---|---|---|---|
| | % granules | % vc sand | % c sand | % m sand | % f sand | % vf sand | % silt |
| P1GS1 | 30.0 | 25.0 | 15.0 | 15.0 | 5.0 | 5.0 | 5.0 |
| P1GS2 | 25.0 | 25.0 | 15.0 | 15.0 | 10.0 | 5.0 | 5.0 |
| P1GS3 | 10.0 | 10.0 | 25.0 | 20.0 | 15.0 | 10.0 | 10.0 |
| P2GS1 | 30.0 | 25.0 | 15.0 | 15.0 | 5.0 | 5.0 | 5.0 |
| P2GS2 | 25.0 | 25.0 | 15.0 | 15.0 | 10.0 | 5.0 | 5.0 |
| P2GS3 | 10.0 | 10.0 | 25.0 | 20.0 | 15.0 | 10.0 | 10.0 |
| P3GS1 | 20.0 | 20.0 | 20.0 | 10.0 | 10.0 | 10.0 | 10.0 |
| P3GS2 | 5.0 | 5.0 | 10.0 | 15.0 | 20.0 | 30.0 | 15.0 |
| P3GS3 | 0.0 | 0.0 | 5.0 | 10.0 | 30.0 | 30.0 | 25.0 |
| P4GS1 | 15.0 | 20.0 | 25.0 | 20.0 | 10.0 | 5.0 | 5.0 |

TABLE B12-continued

| State | States of GST Description % granules | % vc sand | % c sand | % m sand | % f sand | % vf sand | % silt |
|---|---|---|---|---|---|---|---|
| P4GS2 | 10.0 | 10.0 | 20.0 | 20.0 | 20.0 | 10.0 | 10.0 |
| P4GS3 | 0.0 | 5.0 | 10.0 | 20.0 | 20.0 | 25.0 | 20.0 |
| P5GS1 | 15.0 | 20.0 | 25.0 | 20.0 | 10.0 | 5.0 | 5.0 |
| P5GS2 | 15.0 | 15.0 | 15.0 | 15.0 | 20.0 | 10.0 | 10.0 |
| P5GS3 | 5.0 | 5.0 | 15.0 | 20.0 | 25.0 | 20.0 | 10.0 |
| P6GS1 | 5.0 | 10.0 | 15.0 | 25.0 | 20.0 | 15.0 | 10.0 |
| P6GS2 | 0.0 | 10.0 | 10.0 | 30.0 | 25.0 | 15.0 | 10.0 |
| P6GS3 | 0.0 | 5.0 | 5.0 | 20.0 | 30.0 | 25.0 | 15.0 |
| P7GS1 | 5.0 | 10.0 | 10.0 | 25.0 | 25.0 | 15.0 | 10.0 |
| P7GS2 | 0.0 | 5.0 | 5.0 | 20.0 | 25.0 | 25.0 | 20.0 |
| P7GS3 | 0.0 | 0.0 | 3.0 | 10.0 | 27.0 | 35.0 | 25.0 |
| P8GS1 | 10.0 | 10.0 | 10.0 | 10.0 | 15.0 | 20.0 | 25.0 |
| P8GS2 | 5.0 | 5.0 | 5.0 | 10.0 | 10.0 | 30.0 | 35.0 |
| P8GS3 | 0.0 | 0.0 | 0.0 | 10.0 | 15.0 | 35.0 | 40.0 |
| P9GS1 | 30.0 | 20.0 | 20.0 | 5.0 | 5.0 | 10.0 | 10.0 |
| P9GS2 | 20.0 | 25.0 | 25.0 | 5.0 | 5.0 | 10.0 | 10.0 |
| P9GS3 | 30.0 | 25.0 | 25.0 | 5.0 | 5.0 | 5.0 | 5.0 |
| P10GS1 | 20.0 | 20.0 | 20.0 | 15.0 | 10.0 | 10.0 | 5.0 |
| P10GS2 | 15.0 | 15.0 | 20.0 | 20.0 | 10.0 | 10.0 | 10.0 |
| P10GS3 | 5.0 | 5.0 | 10.0 | 25.0 | 25.0 | 20.0 | 10.0 |
| P11GS1 | 15.0 | 10.0 | 10.0 | 15.0 | 15.0 | 20.0 | 15.0 |
| P11GS2 | 10.0 | 5.0 | 5.0 | 5.0 | 15.0 | 35.0 | 25.0 |
| P11GS3 | 0.0 | 0.0 | 0.0 | 15.0 | 20.0 | 35.0 | 30.0 |
| P12GS1 | 35.0 | 25.0 | 20.0 | 10.0 | 6.0 | 2.0 | 2.0 |
| P12GS2 | 30.0 | 20.0 | 20.0 | 10.0 | 5.0 | 5.0 | 10.0 |
| P12GS3 | 30.0 | 20.0 | 10.0 | 5.0 | 5.0 | 15.0 | 15.0 |
| P13GS1 | 10.0 | 15.0 | 20.0 | 20.0 | 15.0 | 10.0 | 10.0 |
| P13GS2 | 2.0 | 3.0 | 15.0 | 30.0 | 20.0 | 15.0 | 15.0 |
| P13GS3 | 0.0 | 0.0 | 5.0 | 25.0 | 30.0 | 20.0 | 20.0 |
| P14GS1 | 15.0 | 15.0 | 25.0 | 20.0 | 15.0 | 5.0 | 5.0 |
| P14GS2 | 10.0 | 10.0 | 20.0 | 20.0 | 20.0 | 10.0 | 10.0 |
| P14GS3 | 5.0 | 5.0 | 15.0 | 20.0 | 25.0 | 15.0 | 15.0 |

TABLE C3

| Probability table for Node CRO Climate | Climate, Runoff high | moderate | low | very low |
|---|---|---|---|---|
| wet | 0.40 | 0.50 | 0.10 | 0.00 |
| wet seasonal | 0.60 | 0.30 | 0.10 | 0.00 |
| dry seasonal | 0.20 | 0.40 | 0.30 | 0.10 |
| dry | 0.00 | 0.10 | 0.40 | 0.50 |

TABLE C4

| Probability table for Node IWI Climate, Chemical Alteration | Hinterland Uplift | Initial Weathering Intensity extensive | moderate | minor |
|---|---|---|---|---|
| much | rapid | 0.00 | 0.30 | 0.70 |
| much | slow | 0.00 | 0.20 | 0.80 |
| some | rapid | 0.20 | 0.60 | 0.20 |
| some | slow | 0.10 | 0.70 | 0.20 |
| none | rapid | 0.70 | 0.30 | 0.00 |
| none | slow | 0.60 | 0.40 | 0.00 |

TABLE C5

| Probability table for Node TP Climate Climate, Runoff | Hinterland Uplift | Transport Power high | moderate | low |
|---|---|---|---|---|
| high | rapid | 0.85 | 0.15 | 0.00 |
| high | slow | 0.20 | 0.50 | 0.30 |
| moderate | rapid | 0.95 | 0.05 | 0.00 |

Node Probability Distribution

TABLE C1

| Probability table for Node PL Tectonic Setting | Provenance Lithotype P1 | P2 | P3 | P4 | P5 | P6 | P7 | P8 | P9 | P10 | P11 | P12 | P13 | P14 |
|---|---|---|---|---|---|---|---|---|---|---|---|---|---|---|
| CIBU | 0.170 | 0.280 | 0.089 | 0.009 | 0.012 | 0.060 | 0.010 | 0.030 | 0.050 | 0.060 | 0.060 | 0.060 | 0.020 | 0.090 |
| CAMBU | 0.120 | 0.080 | 0.034 | 0.068 | 0.098 | 0.040 | 0.040 | 0.050 | 0.050 | 0.080 | 0.120 | 0.020 | 0.080 | 0.120 |
| SAMP | 0.270 | 0.090 | 0.146 | 0.079 | 0.014 | 0.000 | 0.080 | 0.050 | 0.020 | 0.080 | 0.050 | 0.020 | 0.020 | 0.080 |
| SAMV | 0.015 | 0.005 | 0.390 | 0.211 | 0.038 | 0.000 | 0.080 | 0.080 | 0.060 | 0.000 | 0.050 | 0.040 | 0.010 | 0.020 |
| CAMSU | 0.030 | 0.030 | 0.031 | 0.061 | 0.088 | 0.050 | 0.090 | 0.150 | 0.060 | 0.090 | 0.150 | 0.060 | 0.080 | 0.030 |
| CISU | 0.030 | 0.010 | 0.020 | 0.004 | 0.006 | 0.180 | 0.100 | 0.300 | 0.160 | 0.050 | 0.050 | 0.050 | 0.020 | 0.020 |

TABLE C2

| Probability table for Node CCA Climate | Climate, Chemical Alteration much | some | none |
|---|---|---|---|
| wet | 0.70 | 0.30 | 0.00 |
| wet seasonal | 0.60 | 0.30 | 0.10 |
| dry seasonal | 0.10 | 0.70 | 0.20 |
| dry | 0.00 | 0.60 | 0.40 |

TABLE C5-continued

| Probability table for Node TP Climate Climate, Runoff | Hinterland Uplift | Transport Power high | moderate | low |
|---|---|---|---|---|
| moderate | slow | 0.40 | 0.50 | 0.10 |
| low | rapid | 0.75 | 0.20 | 0.05 |
| low | slow | 0.00 | 0.40 | 0.60 |
| very low | rapid | 0.10 | 0.40 | 0.50 |
| very low | slow | 0.00 | 0.05 | 0.95 |

TABLE C6

Probability table for Node SS

| Climate Climate, Runoff | Hinterland Uplift | Sediment Supply high | medium | low |
|---|---|---|---|---|
| high | rapid | 0.80 | 0.20 | 0.00 |
| high | slow | 0.70 | 0.25 | 0.05 |
| moderate | rapid | 0.60 | 0.30 | 0.10 |
| moderate | slow | 0.50 | 0.40 | 0.10 |
| low | rapid | 0.40 | 0.30 | 0.30 |
| low | slow | 0.30 | 0.40 | 0.30 |
| very low | rapid | 0.20 | 0.30 | 0.50 |
| very low | slow | 0.10 | 0.20 | 0.70 |

TABLE C7

Probability table for Node WM

| Climate, Chemical Alteration | Fluvial Storage Potential | Hinterland Transport Distance | Weathering Modification Major | Minor |
|---|---|---|---|---|
| much | high | long | 1.00 | 0.00 |
| much | high | intermediate | 0.95 | 0.05 |
| much | high | short | 0.90 | 0.10 |
| much | moderate | long | 0.95 | 0.05 |
| much | moderate | intermediate | 0.90 | 0.10 |
| much | moderate | short | 0.85 | 0.05 |
| much | low | long | 0.90 | 0.10 |
| much | low | intermediate | 0.85 | 0.05 |
| much | low | short | 0.80 | 0.20 |
| some | high | long | 0.70 | 0.30 |
| some | high | intermediate | 0.65 | 0.35 |
| some | high | short | 0.60 | 0.40 |
| some | moderate | long | 0.65 | 0.35 |
| some | moderate | intermediate | 0.60 | 0.40 |
| some | moderate | short | 0.55 | 0.45 |

TABLE C7-continued

Probability table for Node WM

| Climate, Chemical Alteration | Fluvial Storage Potential | Hinterland Transport Distance | Weathering Modification Major | Minor |
|---|---|---|---|---|
| some | low | long | 0.60 | 0.40 |
| some | low | intermediate | 0.55 | 0.45 |
| some | low | short | 0.50 | 0.50 |
| none | high | long | 0.30 | 0.70 |
| none | high | intermediate | 0.25 | 0.75 |
| none | high | short | 0.20 | 0.80 |
| none | moderate | long | 0.15 | 0.85 |
| none | moderate | intermediate | 0.10 | 0.90 |
| none | moderate | short | 0.05 | 0.95 |
| none | low | long | 0.10 | 0.90 |
| none | low | intermediate | 0.05 | 0.95 |
| none | low | short | 0.00 | 1.00 |

TABLE C8

Probability table for Node STF

| Transport Power | Hinterland Transport Distance | Selective Transport Fining much fining | little fining | no fining |
|---|---|---|---|---|
| high | long | 0.20 | 0.70 | 0.10 |
| high | intermediate | 0.00 | 0.20 | 0.80 |
| high | short | 0.00 | 0.10 | 0.90 |
| moderate | long | 0.40 | 0.60 | 0.00 |
| moderate | intermediate | 0.30 | 0.40 | 0.30 |
| moderate | short | 0.00 | 0.60 | 0.40 |
| low | long | 0.90 | 0.10 | 0.00 |
| low | intermediate | 0.80 | 0.20 | 0.00 |
| low | short | 0.10 | 0.70 | 0.20 |

TABLE C9

Probability table for Node GSMAX

| Sediment Supply | Basin Fluvial Transport Distance | Basin Subsidence | Grain Size, Maximum Granular | V Coarse | Coarse | Medium | Fine | V Fine |
|---|---|---|---|---|---|---|---|---|
| high | short LT10 km | rapid | 0.50 | 0.30 | 0.20 | 0.00 | 0.00 | 0.00 |
| high | short LT10 km | slow | 0.60 | 0.40 | 0.00 | 0.00 | 0.00 | 0.00 |
| high | intermediate 10 to 50 km | rapid | 0.00 | 0.20 | 0.50 | 0.30 | 0.00 | 0.00 |
| high | intermediate 10 to 50 km | slow | 0.10 | 0.40 | 0.40 | 0.10 | 0.00 | 0.00 |
| high | long 50 to 100 km | rapid | 0.00 | 0.00 | 0.00 | 0.20 | 0.60 | 0.20 |
| high | long 50 to 100 km | slow | 0.00 | 0.00 | 0.05 | 0.50 | 0.25 | 0.20 |
| high | v long over 100 km | rapid | 0.00 | 0.00 | 0.00 | 0.00 | 0.20 | 0.80 |
| high | v long over 100 km | slow | 0.00 | 0.00 | 0.00 | 0.10 | 0.50 | 0.40 |
| medium | short LT10 km | rapid | 0.50 | 0.30 | 0.20 | 0.00 | 0.00 | 0.00 |
| medium | short LT10 km | slow | 0.60 | 0.40 | 0.00 | 0.00 | 0.00 | 0.00 |
| medium | intermediate 10 to 50 km | rapid | 0.00 | 0.20 | 0.50 | 0.30 | 0.00 | 0.00 |
| medium | intermediate 10 to 50 km | slow | 0.10 | 0.40 | 0.40 | 0.10 | 0.00 | 0.00 |
| medium | long 50 to 100 km | rapid | 0.00 | 0.00 | 0.00 | 0.20 | 0.60 | 0.20 |
| medium | long 50 to 100 km | slow | 0.00 | 0.00 | 0.05 | 0.50 | 0.25 | 0.20 |
| medium | v long over 100 km | rapid | 0.00 | 0.00 | 0.00 | 0.00 | 0.20 | 0.80 |
| medium | v long over 100 km | slow | 0.00 | 0.00 | 0.00 | 0.10 | 0.50 | 0.40 |
| low | short LT10 km | rapid | 0.50 | 0.30 | 0.20 | 0.00 | 0.00 | 0.00 |
| low | short LT10 km | slow | 0.60 | 0.40 | 0.00 | 0.00 | 0.00 | 0.00 |
| low | intermediate 10 to 50 km | rapid | 0.00 | 0.20 | 0.50 | 0.30 | 0.00 | 0.00 |
| low | intermediate 10 to 50 km | slow | 0.10 | 0.40 | 0.40 | 0.10 | 0.00 | 0.00 |
| low | long 50 to 100 km | rapid | 0.00 | 0.00 | 0.00 | 0.20 | 0.60 | 0.20 |
| low | long 50 to 100 km | slow | 0.00 | 0.00 | 0.05 | 0.50 | 0.25 | 0.20 |
| low | v long over 100 km | rapid | 0.00 | 0.00 | 0.00 | 0.00 | 0.20 | 0.80 |
| low | v long over 100 km | slow | 0.00 | 0.00 | 0.00 | 0.10 | 0.50 | 0.40 |

TABLE C10.1

Probability table for Node ICIBU

| Tectonic | Initial CIBU Sand | | | | | | | | | | | | |
|---|---|---|---|---|---|---|---|---|---|---|---|---|---|
| Setting | 2 | 7 | 8 | 9 | 12 | 13 | 14 | 17 | 18 | 19 | 20 | 24 | 25 |
| CIBU | 0.011 | 0.011 | 0.025 | 0.025 | 0.025 | 0.060 | 0.025 | 0.025 | 0.060 | 0.060 | 0.011 | 0.060 | 0.060 |
| CAMBU | 0 | 0 | 0 | 0 | 0 | 0 | 0 | 0 | 0 | 0 | 0 | 0 | 0 |
| SAMP | 0 | 0 | 0 | 0 | 0 | 0 | 0 | 0 | 0 | 0 | 0 | 0 | 0 |
| SAMV | 0 | 0 | 0 | 0 | 0 | 0 | 0 | 0 | 0 | 0 | 0 | 0 | 0 |
| CAMSU | 0 | 0 | 0 | 0 | 0 | 0 | 0 | 0 | 0 | 0 | 0 | 0 | 0 |
| CISU | 0 | 0 | 0 | 0 | 0 | 0 | 0 | 0 | 0 | 0 | 0 | 0 | 0 |

| Tectonic | Initial CIBU Sand | | | | | | |
|---|---|---|---|---|---|---|---|
| Setting | 26 | 27 | 31 | 32 | 33 | 34 | 35 |
| CIBU | 0.060 | 0.011 | 0.060 | 0.060 | 0.060 | 0.060 | 0.011 |
| CAMBU | 0 | 0 | 0 | 0 | 0 | 0 | 0 |
| SAMP | 0 | 0 | 0 | 0 | 0 | 0 | 0 |
| SAMV | 0 | 0 | 0 | 0 | 0 | 0 | 0 |
| CAMSU | 0 | 0 | 0 | 0 | 0 | 0 | 0 |
| CISU | 0 | 0 | 0 | 0 | 0 | 0 | 0 |

TABLE C10.2

Probability table for Node ICIBU

| Tectonic | Initial CIBU Sand | | | | | | | | | | | | |
|---|---|---|---|---|---|---|---|---|---|---|---|---|---|
| Setting | 40 | 41 | 42 | 43 | 44 | 45 | 49 | 50 | 51 | 52 | 53 | 54 | 55 |
| CIBU | 0.025 | 0.025 | 0.025 | 0.025 | 0.011 | 0.000 | 0.025 | 0.025 | 0.025 | 0.011 | 0.011 | 0.011 | 0.000 |
| CAMBU | 0 | 0 | 0 | 0 | 0 | 0 | 0 | 0 | 0 | 0 | 0 | 0 | 0 |
| SAMP | 0 | 0 | 0 | 0 | 0 | 0 | 0 | 0 | 0 | 0 | 0 | 0 | 0 |
| SAMV | 0 | 0 | 0 | 0 | 0 | 0 | 0 | 0 | 0 | 0 | 0 | 0 | 0 |
| CAMSU | 0 | 0 | 0 | 0 | 0 | 0 | 0 | 0 | 0 | 0 | 0 | 0 | 0 |
| CISU | 0 | 0 | 0 | 0 | 0 | 0 | 0 | 0 | 0 | 0 | 0 | 0 | 0 |

| Tectonic | Initial CIBU Sand | | | | | | |
|---|---|---|---|---|---|---|---|
| Setting | 60 | 61 | 62 | 63 | 64 | 65 | 66 |
| CIBU | 0.000 | 0.000 | 0.000 | 0.000 | 0.000 | 0.000 | 0.000 |
| CAMBU | 0 | 0 | 0 | 0 | 0 | 0 | 0 |
| SAMP | 0 | 0 | 0 | 0 | 0 | 0 | 0 |
| SAMV | 0 | 0 | 0 | 0 | 0 | 0 | 0 |
| CAMSU | 0 | 0 | 0 | 0 | 0 | 0 | 0 |
| CISU | 0 | 0 | 0 | 0 | 0 | 0 | 0 |

TABLE C11.1

Probability table for Node ICAMBU

| Tectonic | Initial CAMBU Sand | | | | | | | | | | | | |
|---|---|---|---|---|---|---|---|---|---|---|---|---|---|
| Setting | 5 | 8 | 12 | 14 | 18 | 19 | 20 | 21 | 24 | 25 | 26 | 27 | 28 |
| CIBU | 0 | 0 | 0 | 0 | 0 | 0 | 0 | 0 | 0 | 0 | 0 | 0 | 0 |
| CAMBU | 0.011 | 0.011 | 0.011 | 0.038 | 0.086 | 0.086 | 0.038 | 0.000 | 0.038 | 0.086 | 0.086 | 0.038 | 0.000 |
| SAMP | 0 | 0 | 0 | 0 | 0 | 0 | 0 | 0 | 0 | 0 | 0 | 0 | 0 |
| SAMV | 0 | 0 | 0 | 0 | 0 | 0 | 0 | 0 | 0 | 0 | 0 | 0 | 0 |
| CAMSU | 0 | 0 | 0 | 0 | 0 | 0 | 0 | 0 | 0 | 0 | 0 | 0 | 0 |
| CISU | 0 | 0 | 0 | 0 | 0 | 0 | 0 | 0 | 0 | 0 | 0 | 0 | 0 |

| Tectonic | Initial CAMBU Sand | | | | | | |
|---|---|---|---|---|---|---|---|
| Setting | 31 | 32 | 33 | 34 | 35 | 36 | 41 |
| CIBU | 0 | 0 | 0 | 0 | 0 | 0 | 0 |
| CAMBU | 0.038 | 0.086 | 0.086 | 0.086 | 0.011 | 0.000 | 0.038 |
| SAMP | 0 | 0 | 0 | 0 | 0 | 0 | 0 |
| SAMV | 0 | 0 | 0 | 0 | 0 | 0 | 0 |
| CAMSU | 0 | 0 | 0 | 0 | 0 | 0 | 0 |
| CISU | 0 | 0 | 0 | 0 | 0 | 0 | 0 |

TABLE C11.2

| Probability table for Node ICAMBU | | | | | | | | | | | | |
|---|---|---|---|---|---|---|---|---|---|---|---|---|
| Tectonic | Initial CAMBU Sand | | | | | | | | | | | |
| Setting | 42 | 43 | 44 | 45 | 51 | 52 | 53 | 54 | 55 | 62 | 63 | 64 |
| CIBU | 0 | 0 | 0 | 0 | 0 | 0 | 0 | 0 | 0 | 0 | 0 | 0 |
| CAMBU | 0.038 | 0.038 | 0.011 | 0.000 | 0.011 | 0.011 | 0.011 | 0.011 | 0.000 | 0.000 | 0.000 | 0.000 |
| SAMP | 0 | 0 | 0 | 0 | 0 | 0 | 0 | 0 | 0 | 0 | 0 | 0 |
| SAMV | 0 | 0 | 0 | 0 | 0 | 0 | 0 | 0 | 0 | 0 | 0 | 0 |
| CAMSU | 0 | 0 | 0 | 0 | 0 | 0 | 0 | 0 | 0 | 0 | 0 | 0 |
| CISU | 0 | 0 | 0 | 0 | 0 | 0 | 0 | 0 | 0 | 0 | 0 | 0 |

TABLE C12.1

| Probability table for Node ISAMP | | | | | | | | | | | | | |
|---|---|---|---|---|---|---|---|---|---|---|---|---|---|
| Tectonic | Initial SAMP Sand | | | | | | | | | | | | |
| Setting | 2 | 4 | 7 | 8 | 11 | 12 | 13 | 18 | 24 | 25 | 26 | 27 | 31 |
| CIBU | 0 | 0 | 0 | 0 | 0 | 0 | 0 | 0 | 0 | 0 | 0 | 0 | 0 |
| CAMBU | 0 | 0 | 0 | 0 | 0 | 0 | 0 | 0 | 0 | 0 | 0 | 0 | 0 |
| SAMP | 0.038 | 0.011 | 0.038 | 0.038 | 0.011 | 0.075 | 0.075 | 0.075 | 0.075 | 0.075 | 0.038 | 0.011 | 0.075 |
| SAMV | 0 | 0 | 0 | 0 | 0 | 0 | 0 | 0 | 0 | 0 | 0 | 0 | 0 |
| CAMSU | 0 | 0 | 0 | 0 | 0 | 0 | 0 | 0 | 0. | 0 | 0 | 0 | 0 |
| CISU | 0 | 0 | 0 | 0 | 0 | 0 | 0 | 0 | 0 | 0 | 0 | 0 | 0 |

| Tectonic | Initial SAMP Sand | | | | | | |
|---|---|---|---|---|---|---|---|
| Setting | 32 | 33 | 34 | 35 | 39 | 41 | 42 |
| CIBU | 0 | 0 | 0 | 0 | 0 | 0 | 0 |
| CAMBU | 0 | 0 | 0 | 0 | 0 | 0 | 0 |
| SAMP | 0.075 | 0.075 | 0.038 | 0.011 | 0.038 | 0.038 | 0.038 |
| SAMV | 0 | 0 | 0 | 0 | 0 | 0 | 0 |
| CAMSU | 0 | 0 | 0 | 0 | 0 | 0 | 0 |
| CISU | 0 | 0 | 0 | 0 | 0 | 0 | 0 |

TABLE C12.2

| Probability table for Node ISAMP | | | | | | |
|---|---|---|---|---|---|---|
| Tectonic | Initial SAMP Sand | | | | | |
| Setting | 43 | 49 | 50 | 51 | 52 | 62 |
| CIBU | 0 | 0 | 0 | 0 | 0 | 0 |
| CAMBU | 0 | 0 | 0 | 0 | 0 | 0 |
| SAMP | 0.011 | 0.011 | 0.011 | 0.011 | 0.011 | 0.000 |
| SAMV | 0 | 0 | 0 | 0 | 0 | 0 |

TABLE C12.2-continued

| Probability table for Node ISAMP | | | | | | |
|---|---|---|---|---|---|---|
| Tectonic | Initial SAMP Sand | | | | | |
| Setting | 43 | 49 | 50 | 51 | 52 | 62 |
| CAMSU | 0 | 0 | 0 | 0 | 0 | 0 |
| CISU | 0 | 0 | 0 | 0 | 0 | 0 |

TABLE C13

| Probability table for Node ISAMV | | | | | | | | | | | | | | | | |
|---|---|---|---|---|---|---|---|---|---|---|---|---|---|---|---|---|
| Tectonic | Initial SAMV Sand | | | | | | | | | | | | | | | |
| Setting | 4 | 5 | 7 | 8 | 9 | 11 | 12 | 14 | 17 | 18 | 20 | 23 | 24 | 25 | 31 | 40 |
| CIBU | 0 | 0 | 0 | 0 | 0 | 0 | 0 | 0 | 0 | 0 | 0 | 0 | 0 | 0 | 0 | 0 |
| CAMBU | 0 | 0 | 0 | 0 | 0 | 0 | 0 | 0 | 0 | 0 | 0 | 0 | 0 | 0 | 0 | 0 |
| SAMP | 0 | 0 | 0 | 0 | 0 | 0 | 0 | 0 | 0 | 0 | 0 | 0 | 0 | 0 | 0 | 0 |
| SAMV | 0.060 | 0.060 | 0.060 | 0.120 | 0.060 | 0.020 | 0.120 | 0.020 | 0.120 | 0.120 | 0.020 | 0.060 | 0.120 | 0.020 | 0.020 | 0.000 |
| CAMSU | 0 | 0 | 0 | 0 | 0 | 0 | 0 | 0 | 0 | 0 | 0 | 0 | 0 | 0 | 0 | 0 |
| CISU | 0 | 0 | 0 | 0 | 0 | 0 | 0 | 0 | 0 | 0 | 0 | 0 | 0 | 0 | 0 | 0 |

TABLE C14.1

| Probability table for Node ICAMSU | | | | | | | | | | |
|---|---|---|---|---|---|---|---|---|---|---|
| Tectonic | Initial CAMSU Sand | | | | | | | | | |
| Setting | 1 | 2 | 4 | 5 | 6 | 8 | 9 | 10 | 13 | 14 |
| CIBU | 0 | 0 | 0 | 0 | 0 | 0 | 0 | 0 | 0 | 0 |
| CAMBU | 0 | 0 | 0 | 0 | 0 | 0 | 0 | 0 | 0 | 0 |
| SAMP | 0 | 0 | 0 | 0 | 0 | 0 | 0 | 0 | 0 | 0 |
| SAMV | 0 | 0 | 0 | 0 | 0 | 0 | 0 | 0 | 0 | 0 |
| CAMSU | 0.008 | 0.008 | 0.008 | 0.030 | 0.030 | 0.008 | 0.067 | 0.030 | 0.030 | 0.067 |
| CISU | 0 | 0 | 0 | 0 | 0 | 0 | 0 | 0 | 0 | 0 |
| Tectonic | Initial CAMSU Sand | | | | | | | | | |
| Setting | 15 | 18 | 19 | 20 | 21 | 25 | 26 | 27 | 28 | 33 |
| CIBU | 0 | 0 | 0 | 0 | 0 | 0 | 0 | 0 | 0 | 0 |
| CAMBU | 0 | 0 | 0 | 0 | 0 | 0 | 0 | 0 | 0 | 0 |
| SAMP | 0 | 0 | 0 | 0 | 0 | 0 | 0 | 0 | 0 | 0 |
| SAMV | 0 | 0 | 0 | 0 | 0 | 0 | 0 | 0 | 0 | 0 |
| CAMSU | 0.030 | 0.008 | 0.067 | 0.067 | 0.067 | 0.030 | 0.067 | 0.067 | 0.030 | 0.030 |
| CISU | 0 | 0 | 0 | 0 | 0 | 0 | 0 | 0 | 0 | 0 |

TABLE C14.2

| Probability table for Node ICAMSU | | | | | | | | | | | | | | | |
|---|---|---|---|---|---|---|---|---|---|---|---|---|---|---|---|
| Tectonic | Initial CAMSU Sand | | | | | | | | | | | | | | |
| Setting | 34 | 35 | 36 | 42 | 43 | 44 | 45 | 52 | 53 | 54 | 55 | 63 | 64 | 65 | 66 |
| CIBU | 0 | 0 | 0 | 0 | 0 | 0 | 0 | 0 | 0 | 0 | 0 | 0 | 0 | 0 | 0 |
| CAMBU | 0 | 0 | 0 | 0 | 0 | 0 | 0 | 0 | 0 | 0 | 0 | 0 | 0 | 0 | 0 |
| SAMP | 0 | 0 | 0 | 0 | 0 | 0 | 0 | 0 | 0 | 0 | 0 | 0 | 0 | 0 | 0 |
| SAMV | 0 | 0 | 0 | 0 | 0 | 0 | 0 | 0 | 0 | 0 | 0 | 0 | 0 | 0 | 0 |
| CAMSU | 0.067 | 0.067 | 0.030 | 0.008 | 0.030 | 0.008 | 0.008 | 0.008 | 0.008 | 0.008 | 0.008 | 0.000 | 0.000 | 0.000 | 0.000 |
| CISU | 0 | 0 | 0 | 0 | 0 | 0 | 0 | 0 | 0 | 0 | 0 | 0 | 0 | 0 | 0 |

TABLE C15.1

| Probability table for Node ICISU | | | | | | | | | | |
|---|---|---|---|---|---|---|---|---|---|---|
| Tectonic | Initial CISU Sand | | | | | | | | | |
| Setting | 10 | 14 | 15 | 19 | 20 | 21 | 25 | 26 | 27 | 28 |
| CIBU | 0 | 0 | 0 | 0 | 0 | 0 | 0 | 0 | 0 | 0 |
| CAMBU | 0 | 0 | 0 | 0 | 0 | 0 | 0 | 0 | 0 | 0 |
| SAMP | 0 | 0 | 0 | 0 | 0 | 0 | 0 | 0 | 0 | 0 |
| SAMV | 0 | 0 | 0 | 0 | 0 | 0 | 0 | 0 | 0 | 0 |
| CAMSU | 0 | 0 | 0 | 0 | 0 | 0 | 0 | 0 | 0 | 0 |
| CISU | 0.013 | 0.013 | 0.033 | 0.013 | 0.033 | 0.067 | 0.013 | 0.033 | 0.067 | 0.067 |
| Tectonic | Initial CISU Sand | | | | | | | | | |
| Setting | 33 | 34 | 35 | 36 | 42 | 43 | 44 | 45 | 52 | 53 |
| CIBU | 0 | 0 | 0 | 0 | 0 | 0 | 0 | 0 | 0 | 0 |
| CAMBU | 0 | 0 | 0 | 0 | 0 | 0 | 0 | 0 | 0 | 0 |
| SAMP | 0 | 0 | 0 | 0 | 0 | 0 | 0 | 0 | 0 | 0 |
| SAMV | 0 | 0 | 0 | 0 | 0 | 0 | 0 | 0 | 0 | 0 |
| CAMSU | 0 | 0 | 0 | 0 | 0 | 0 | 0 | 0 | 0 | 0 |
| CISU | 0.033 | 0.067 | 0.067 | 0.067 | 0.033 | 0.067 | 0.067 | 0.067 | 0.033 | 0.033 |

TABLE C15.2

| Probability table for Node ICISU | | | | | | |
|---|---|---|---|---|---|---|
| Tectonic | Initial CISU Sand | | | | | |
| Setting | 54 | 55 | 63 | 64 | 65 | 66 |
| CIBU | 0 | 0 | 0 | 0 | 0 | 0 |
| CAMBU | 0 | 0 | 0 | 0 | 0 | 0 |
| SAMP | 0 | 0 | 0 | 0 | 0 | 0 |
| SAMV | 0 | 0 | 0 | 0 | 0 | 0 |
| CAMSU | 0 | 0 | 0 | 0 | 0 | 0 |
| CISU | 0.033 | 0.033 | 0.013 | 0.013 | 0.013 | 0.013 |

TABLE C16

| Probability table for Node FSP | | | | |
|---|---|---|---|---|
| | | Fluvial Storage Potential | | |
| Sediment Supply | Transport Power | high | moderate | low |
| high | high | 0.10 | 0.20 | 0.70 |
| high | moderate | 0.25 | 0.50 | 0.25 |
| high | low | 0.70 | 0.20 | 0.10 |
| medium | high | 0.00 | 0.05 | 0.95 |
| medium | moderate | 0.10 | 0.10 | 0.80 |
| medium | low | 0.30 | 0.60 | 0.10 |
| low | high | 0.00 | 0.01 | 0.99 |
| low | moderate | 0.00 | 0.05 | 0.95 |
| low | low | 0.25 | 0.60 | 0.15 |

TABLE C17

Probability table for Node GSI

| | | Grain Size, Initial | | | | | | | | | | | | |
|---|---|---|---|---|---|---|---|---|---|---|---|---|---|---|
| PL | IWI | P1 GS1 | P1 GS2 | P1 GS3 | P2 GS1 | P2 GS2 | P2 GS3 | P3 GS1 | P3 GS2 | P3 GS3 | P4 GS1 | P4 GS2 | P4 GS3 | P5 GS1 |
| P1 | minor | 0.80 | 0.20 | 0.00 | 0.00 | 0.00 | 0.00 | 0.00 | 0.00 | 0.00 | 0.00 | 0.00 | 0.00 | 0.00 |
| P1 | moderate | 0.10 | 0.80 | 0.10 | 0.00 | 0.00 | 0.00 | 0.00 | 0.00 | 0.00 | 0.00 | 0.00 | 0.00 | 0.00 |
| P1 | extensive | 0.00 | 0.20 | 0.80 | 0.00 | 0.00 | 0.00 | 0.00 | 0.00 | 0.00 | 0.00 | 0.00 | 0.00 | 0.00 |
| P2 | minor | 0.00 | 0.00 | 0.00 | 0.80 | 0.20 | 0.00 | 0.00 | 0.00 | 0.00 | 0.00 | 0.00 | 0.00 | 0.00 |
| P2 | moderate | 0.00 | 0.00 | 0.00 | 0.10 | 0.80 | 0.10 | 0.00 | 0.00 | 0.00 | 0.00 | 0.00 | 0.00 | 0.00 |
| P2 | extensive | 0.00 | 0.00 | 0.00 | 0.00 | 0.20 | 0.80 | 0.00 | 0.00 | 0.00 | 0.00 | 0.00 | 0.00 | 0.00 |
| P3 | minor | 0.00 | 0.00 | 0.00 | 0.00 | 0.00 | 0.00 | 0.80 | 0.20 | 0.00 | 0.00 | 0.00 | 0.00 | 0.00 |
| P3 | moderate | 0.00 | 0.00 | 0.00 | 0.00 | 0.00 | 0.00 | 0.10 | 0.80 | 0.10 | 0.00 | 0.00 | 0.00 | 0.00 |
| P3 | extensive | 0.00 | 0.00 | 0.00 | 0.00 | 0.00 | 0.00 | 0.00 | 0.20 | 0.80 | 0.00 | 0.00 | 0.00 | 0.00 |
| P4 | minor | 0.00 | 0.00 | 0.00 | 0.00 | 0.00 | 0.00 | 0.00 | 0.00 | 0.00 | 0.80 | 0.20 | 0.00 | 0.00 |
| P4 | moderate | 0.00 | 0.00 | 0.00 | 0.00 | 0.00 | 0.00 | 0.00 | 0.00 | 0.00 | 0.10 | 0.80 | 0.10 | 0.00 |
| P4 | extensive | 0.00 | 0.00 | 0.00 | 0.00 | 0.00 | 0.00 | 0.00 | 0.00 | 0.00 | 0.00 | 0.20 | 0.80 | 0.00 |
| P5 | minor | 0.00 | 0.00 | 0.00 | 0.00 | 0.00 | 0.00 | 0.00 | 0.00 | 0.00 | 0.00 | 0.00 | 0.00 | 0.80 |
| P5 | moderate | 0.00 | 0.00 | 0.00 | 0.00 | 0.00 | 0.00 | 0.00 | 0.00 | 0.00 | 0.00 | 0.00 | 0.00 | 0.10 |
| P5 | extensive | 0.00 | 0.00 | 0.00 | 0.00 | 0.00 | 0.00 | 0.00 | 0.00 | 0.00 | 0.00 | 0.00 | 0.00 | 0.00 |
| P6 | minor | 0.00 | 0.00 | 0.00 | 0.00 | 0.00 | 0.00 | 0.00 | 0.00 | 0.00 | 0.00 | 0.00 | 0.00 | 0.00 |
| P6 | moderate | 0.00 | 0.00 | 0.00 | 0.00 | 0.00 | 0.00 | 0.00 | 0.00 | 0.00 | 0.00 | 0.00 | 0.00 | 0.00 |
| P6 | extensive | 0.00 | 0.00 | 0.00 | 0.00 | 0.00 | 0.00 | 0.00 | 0.00 | 0.00 | 0.00 | 0.00 | 0.00 | 0.00 |
| P7 | minor | 0.00 | 0.00 | 0.00 | 0.00 | 0.00 | 0.00 | 0.00 | 0.00 | 0.00 | 0.00 | 0.00 | 0.00 | 0.00 |
| P7 | moderate | 0.00 | 0.00 | 0.00 | 0.00 | 0.00 | 0.00 | 0.00 | 0.00 | 0.00 | 0.00 | 0.00 | 0.00 | 0.00 |
| P7 | extensive | 0.00 | 0.00 | 0.00 | 0.00 | 0.00 | 0.00 | 0.00 | 0.00 | 0.00 | 0.00 | 0.00 | 0.00 | 0.00 |
| P8 | minor | 0.00 | 0.00 | 0.00 | 0.00 | 0.00 | 0.00 | 0.00 | 0.00 | 0.00 | 0.00 | 0.00 | 0.00 | 0.00 |
| P8 | moderate | 0.00 | 0.00 | 0.00 | 0.00 | 0.00 | 0.00 | 0.00 | 0.00 | 0.00 | 0.00 | 0.00 | 0.00 | 0.00 |
| P8 | extensive | 0.00 | 0.00 | 0.00 | 0.00 | 0.00 | 0.00 | 0.00 | 0.00 | 0.00 | 0.00 | 0.00 | 0.00 | 0.00 |
| P9 | minor | 0.00 | 0.00 | 0.00 | 0.00 | 0.00 | 0.00 | 0.00 | 0.00 | 0.00 | 0.00 | 0.00 | 0.00 | 0.00 |
| P9 | moderate | 0.00 | 0.00 | 0.00 | 0.00 | 0.00 | 0.00 | 0.00 | 0.00 | 0.00 | 0.00 | 0.00 | 0.00 | 0.00 |
| P9 | extensive | 0.00 | 0.00 | 0.00 | 0.00 | 0.00 | 0.00 | 0.00 | 0.00 | 0.00 | 0.00 | 0.00 | 0.00 | 0.00 |
| P10 | minor | 0.00 | 0.00 | 0.00 | 0.00 | 0.00 | 0.00 | 0.00 | 0.00 | 0.00 | 0.00 | 0.00 | 0.00 | 0.00 |
| P10 | moderate | 0.00 | 0.00 | 0.00 | 0.00 | 0.00 | 0.00 | 0.00 | 0.00 | 0.00 | 0.00 | 0.00 | 0.00 | 0.00 |
| P10 | extensive | 0.00 | 0.00 | 0.00 | 0.00 | 0.00 | 0.00 | 0.00 | 0.00 | 0.00 | 0.00 | 0.00 | 0.00 | 0.00 |
| P11 | minor | 0.00 | 0.00 | 0.00 | 0.00 | 0.00 | 0.00 | 0.00 | 0.00 | 0.00 | 0.00 | 0.00 | 0.00 | 0.00 |
| P11 | moderate | 0.00 | 0.00 | 0.00 | 0.00 | 0.00 | 0.00 | 0.00 | 0.00 | 0.00 | 0.00 | 0.00 | 0.00 | 0.00 |
| P11 | extensive | 0.00 | 0.00 | 0.00 | 0.00 | 0.00 | 0.00 | 0.00 | 0.00 | 0.00 | 0.00 | 0.00 | 0.00 | 0.00 |
| P12 | minor | 0.00 | 0.00 | 0.00 | 0.00 | 0.00 | 0.00 | 0.00 | 0.00 | 0.00 | 0.00 | 0.00 | 0.00 | 0.00 |
| P12 | moderate | 0.00 | 0.00 | 0.00 | 0.00 | 0.00 | 0.00 | 0.00 | 0.00 | 0.00 | 0.00 | 0.00 | 0.00 | 0.00 |
| P12 | extensive | 0.00 | 0.00 | 0.00 | 0.00 | 0.00 | 0.00 | 0.00 | 0.00 | 0.00 | 0.00 | 0.00 | 0.00 | 0.00 |
| P13 | minor | 0.00 | 0.00 | 0.00 | 0.00 | 0.00 | 0.00 | 0.00 | 0.00 | 0.00 | 0.00 | 0.00 | 0.00 | 0.00 |
| P13 | moderate | 0.00 | 0.00 | 0.00 | 0.00 | 0.00 | 0.00 | 0.00 | 0.00 | 0.00 | 0.00 | 0.00 | 0.00 | 0.00 |
| P13 | extensive | 0.00 | 0.00 | 0.00 | 0.00 | 0.00 | 0.00 | 0.00 | 0.00 | 0.00 | 0.00 | 0.00 | 0.00 | 0.00 |
| P14 | minor | 0.00 | 0.00 | 0.00 | 0.00 | 0.00 | 0.00 | 0.00 | 0.00 | 0.00 | 0.00 | 0.00 | 0.00 | 0.00 |
| P14 | moderate | 0.00 | 0.00 | 0.00 | 0.00 | 0.00 | 0.00 | 0.00 | 0.00 | 0.00 | 0.00 | 0.00 | 0.00 | 0.00 |
| P14 | extensive | 0.00 | 0.00 | 0.00 | 0.00 | 0.00 | 0.00 | 0.00 | 0.00 | 0.00 | 0.00 | 0.00 | 0.00 | 0.00 |

| | Grain Size, Initial | | | | | | | | | | | | | | |
|---|---|---|---|---|---|---|---|---|---|---|---|---|---|---|---|
| PL | P5 GS2 | P5 GS3 | P6 GS1 | P6 GS2 | P6 GS3 | P7 GS1 | P7G S2 | P7 GS3 | P8 GS1 | P8 GS2 | P8 GS3 | P9 GS1 | P9G S2 | P9 GS3 | P10 GS1 |
| P1 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P1 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |

TABLE C17-continued

Probability table for Node GSI

| | | | | | | | | | | | | | | | |
|---|---|---|---|---|---|---|---|---|---|---|---|---|---|---|---|
| P1 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P2 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P2 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P2 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P3 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P3 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P3 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P4 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P4 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P4 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P5 | 0.20 | 0.00 | 0.00 | 0.00 | 0.00 | 0.00 | 0.00 | 0.00 | 0.00 | 0.00 | 0.00 | 0.00 | 0.00 | 0.00 | 0.00 |
| P5 | 0.80 | 0.10 | 0.00 | 0.00 | 0.00 | 0.00 | 0.00 | 0.00 | 0.00 | 0.00 | 0.00 | 0.00 | 0.00 | 0.00 | 0.00 |
| P5 | 0.20 | 0.80 | 0.00 | 0.00 | 0.00 | 0.00 | 0.00 | 0.00 | 0.00 | 0.00 | 0.00 | 0.00 | 0.00 | 0.00 | 0.00 |
| P6 | 0.00 | 0.00 | 0.80 | 0.20 | 0.00 | 0.00 | 0.00 | 0.00 | 0.00 | 0.00 | 0.00 | 0.00 | 0.00 | 0.00 | 0.00 |
| P6 | 0.00 | 0.00 | 0.10 | 0.80 | 0.10 | 0.00 | 0.00 | 0.00 | 0.00 | 0.00 | 0.00 | 0.00 | 0.00 | 0.00 | 0.00 |
| P6 | 0.00 | 0.00 | 0.00 | 0.20 | 0.80 | 0.00 | 0.00 | 0.00 | 0.00 | 0.00 | 0.00 | 0.00 | 0.00 | 0.00 | 0.00 |
| P7 | 0.00 | 0.00 | 0.00 | 0.00 | 0.00 | 0.80 | 0.20 | 0.00 | 0.00 | 0.00 | 0.00 | 0.00 | 0.00 | 0.00 | 0.00 |
| P7 | 0.00 | 0.00 | 0.00 | 0.00 | 0.00 | 0.10 | 0.80 | 0.10 | 0.00 | 0.00 | 0.00 | 0.00 | 0.00 | 0.00 | 0.00 |
| P7 | 0.00 | 0.00 | 0.00 | 0.00 | 0.00 | 0.00 | 0.20 | 0.80 | 0.00 | 0.00 | 0.00 | 0.00 | 0.00 | 0.00 | 0.00 |
| P8 | 0.00 | 0.00 | 0.00 | 0.00 | 0.00 | 0.00 | 0.00 | 0.00 | 0.80 | 0.20 | 0.00 | 0.00 | 0.00 | 0.00 | 0.00 |
| P8 | 0.00 | 0.00 | 0.00 | 0.00 | 0.00 | 0.00 | 0.00 | 0.00 | 0.10 | 0.80 | 0.10 | 0.00 | 0.00 | 0.00 | 0.00 |
| P8 | 0.00 | 0.00 | 0.00 | 0.00 | 0.00 | 0.00 | 0.00 | 0.00 | 0.00 | 0.20 | 0.80 | 0.00 | 0.00 | 0.00 | 0.00 |
| P9 | 0.00 | 0.00 | 0.00 | 0.00 | 0.00 | 0.00 | 0.00 | 0.00 | 0.00 | 0.00 | 0.00 | 0.80 | 0.20 | 0.00 | 0.00 |
| P9 | 0.00 | 0.00 | 0.00 | 0.00 | 0.00 | 0.00 | 0.00 | 0.00 | 0.00 | 0.00 | 0.00 | 0.10 | 0.80 | 0.10 | 0.00 |
| P9 | 0.00 | 0.00 | 0.00 | 0.00 | 0.00 | 0.00 | 0.00 | 0.00 | 0.00 | 0.00 | 0.00 | 0.00 | 0.20 | 0.80 | 0.00 |
| P10 | 0.00 | 0.00 | 0.00 | 0.00 | 0.00 | 0.00 | 0.00 | 0.00 | 0.00 | 0.00 | 0.00 | 0.00 | 0.00 | 0.00 | 0.80 |
| P10 | 0.00 | 0.00 | 0.00 | 0.00 | 0.00 | 0.00 | 0.00 | 0.00 | 0.00 | 0.00 | 0.00 | 0.00 | 0.00 | 0.00 | 0.10 |
| P10 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P11 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P11 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P11 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P12 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P12 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P12 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P13 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P13 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P13 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P14 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P14 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| P14 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |

| | Grain Size, Initial | | | | | | | | | | | | | |
|---|---|---|---|---|---|---|---|---|---|---|---|---|---|---|
| PL | P10 GS2 | P10 GS3 | P11 GS1 | P11 GS2 | P11 GS3 | P12 GS1 | P12 GS2 | P12 GS3 | P13 GS1 | P13 GS2 | P13 GS3 | P14 GS1 | P14 GS2 | P14 GS3 |
| P1 | 0.00 | 0.00 | 0.00 | 0.00 | 0.00 | 0.00 | 0.00 | 0.00 | 0.00 | 0.00 | 0.00 | 0.00 | 0.00 | 0.00 |
| P1 | 0.00 | 0.00 | 0.00 | 0.00 | 0.00 | 0.00 | 0.00 | 0.00 | 0.00 | 0.00 | 0.00 | 0.00 | 0.00 | 0.00 |
| P1 | 0.00 | 0.00 | 0.00 | 0.00 | 0.00 | 0.00 | 0.00 | 0.00 | 0.00 | 0.00 | 0.00 | 0.00 | 0.00 | 0.00 |
| P2 | 0.00 | 0.00 | 0.00 | 0.00 | 0.00 | 0.00 | 0.00 | 0.00 | 0.00 | 0.00 | 0.00 | 0.00 | 0.00 | 0.00 |
| P2 | 0.00 | 0.00 | 0.00 | 0.00 | 0.00 | 0.00 | 0.00 | 0.00 | 0.00 | 0.00 | 0.00 | 0.00 | 0.00 | 0.00 |
| P2 | 0.00 | 0.00 | 0.00 | 0.00 | 0.00 | 0.00 | 0.00 | 0.00 | 0.00 | 0.00 | 0.00 | 0.00 | 0.00 | 0.00 |
| P3 | 0.00 | 0.00 | 0.00 | 0.00 | 0.00 | 0.00 | 0.00 | 0.00 | 0.00 | 0.00 | 0.00 | 0.00 | 0.00 | 0.00 |
| P3 | 0.00 | 0.00 | 0.00 | 0.00 | 0.00 | 0.00 | 0.00 | 0.00 | 0.00 | 0.00 | 0.00 | 0.00 | 0.00 | 0.00 |
| P3 | 0.00 | 0.00 | 0.00 | 0.00 | 0.00 | 0.00 | 0.00 | 0.00 | 0.00 | 0.00 | 0.00 | 0.00 | 0.00 | 0.00 |
| P4 | 0.00 | 0.00 | 0.00 | 0.00 | 0.00 | 0.00 | 0.00 | 0.00 | 0.00 | 0.00 | 0.00 | 0.00 | 0.00 | 0.00 |
| P4 | 0.00 | 0.00 | 0.00 | 0.00 | 0.00 | 0.00 | 0.00 | 0.00 | 0.00 | 0.00 | 0.00 | 0.00 | 0.00 | 0.00 |
| P4 | 0.00 | 0.00 | 0.00 | 0.00 | 0.00 | 0.00 | 0.00 | 0.00 | 0.00 | 0.00 | 0.00 | 0.00 | 0.00 | 0.00 |
| P5 | 0.00 | 0.00 | 0.00 | 0.00 | 0.00 | 0.00 | 0.00 | 0.00 | 0.00 | 0.00 | 0.00 | 0.00 | 0.00 | 0.00 |
| P5 | 0.00 | 0.00 | 0.00 | 0.00 | 0.00 | 0.00 | 0.00 | 0.00 | 0.00 | 0.00 | 0.00 | 0.00 | 0.00 | 0.00 |
| P5 | 0.00 | 0.00 | 0.00 | 0.00 | 0.00 | 0.00 | 0.00 | 0.00 | 0.00 | 0.00 | 0.00 | 0.00 | 0.00 | 0.00 |
| P6 | 0.00 | 0.00 | 0.00 | 0.00 | 0.00 | 0.00 | 0.00 | 0.00 | 0.00 | 0.00 | 0.00 | 0.00 | 0.00 | 0.00 |
| P6 | 0.00 | 0.00 | 0.00 | 0.00 | 0.00 | 0.00 | 0.00 | 0.00 | 0.00 | 0.00 | 0.00 | 0.00 | 0.00 | 0.00 |
| P6 | 0.00 | 0.00 | 0.00 | 0.00 | 0.00 | 0.00 | 0.00 | 0.00 | 0.00 | 0.00 | 0.00 | 0.00 | 0.00 | 0.00 |
| P7 | 0.00 | 0.00 | 0.00 | 0.00 | 0.00 | 0.00 | 0.00 | 0.00 | 0.00 | 0.00 | 0.00 | 0.00 | 0.00 | 0.00 |
| P7 | 0.00 | 0.00 | 0.00 | 0.00 | 0.00 | 0.00 | 0.00 | 0.00 | 0.00 | 0.00 | 0.00 | 0.00 | 0.00 | 0.00 |
| P7 | 0.00 | 0.00 | 0.00 | 0.00 | 0.00 | 0.00 | 0.00 | 0.00 | 0.00 | 0.00 | 0.00 | 0.00 | 0.00 | 0.00 |
| P8 | 0.00 | 0.00 | 0.00 | 0.00 | 0.00 | 0.00 | 0.00 | 0.00 | 0.00 | 0.00 | 0.00 | 0.00 | 0.00 | 0.00 |
| P8 | 0.00 | 0.00 | 0.00 | 0.00 | 0.00 | 0.00 | 0.00 | 0.00 | 0.00 | 0.00 | 0.00 | 0.00 | 0.00 | 0.00 |
| P8 | 0.00 | 0.00 | 0.00 | 0.00 | 0.00 | 0.00 | 0.00 | 0.00 | 0.00 | 0.00 | 0.00 | 0.00 | 0.00 | 0.00 |
| P9 | 0.00 | 0.00 | 0.00 | 0.00 | 0.00 | 0.00 | 0.00 | 0.00 | 0.00 | 0.00 | 0.00 | 0.00 | 0.00 | 0.00 |
| P9 | 0.00 | 0.00 | 0.00 | 0.00 | 0.00 | 0.00 | 0.00 | 0.00 | 0.00 | 0.00 | 0.00 | 0.00 | 0.00 | 0.00 |
| P9 | 0.00 | 0.00 | 0.00 | 0.00 | 0.00 | 0.00 | 0.00 | 0.00 | 0.00 | 0.00 | 0.00 | 0.00 | 0.00 | 0.00 |
| P10 | 0.20 | 0.00 | 0.00 | 0.00 | 0.00 | 0.00 | 0.00 | 0.00 | 0.00 | 0.00 | 0.00 | 0.00 | 0.00 | 0.00 |
| P10 | 0.80 | 0.10 | 0.00 | 0.00 | 0.00 | 0.00 | 0.00 | 0.00 | 0.00 | 0.00 | 0.00 | 0.00 | 0.00 | 0.00 |
| P10 | 0.20 | 0.80 | 0.00 | 0.00 | 0.00 | 0.00 | 0.00 | 0.00 | 0.00 | 0.00 | 0.00 | 0.00 | 0.00 | 0.00 |
| P11 | 0.00 | 0.00 | 0.80 | 0.20 | 0.00 | 0.00 | 0.00 | 0.00 | 0.00 | 0.00 | 0.00 | 0.00 | 0.00 | 0.00 |

TABLE C17-continued

| Probability table for Node GSI | | | | | | | | | | | | | | |
|---|---|---|---|---|---|---|---|---|---|---|---|---|---|---|
| P11 | 0.00 | 0.00 | 0.10 | 0.80 | 0.10 | 0.00 | 0.00 | 0.00 | 0.00 | 0.00 | 0.00 | 0.00 | 0.00 | 0.00 |
| P11 | 0.00 | 0.00 | 0.00 | 0.20 | 0.80 | 0.00 | 0.00 | 0.00 | 0.00 | 0.00 | 0.00 | 0.00 | 0.00 | 0.00 |
| P12 | 0.00 | 0.00 | 0.00 | 0.00 | 0.00 | 0.80 | 0.20 | 0.00 | 0.00 | 0.00 | 0.00 | 0.00 | 0.00 | 0.00 |
| P12 | 0.00 | 0.00 | 0.00 | 0.00 | 0.00 | 0.10 | 0.80 | 0.10 | 0.00 | 0.00 | 0.00 | 0.00 | 0.00 | 0.00 |
| P12 | 0.00 | 0.00 | 0.00 | 0.00 | 0.00 | 0.00 | 0.20 | 0.80 | 0.00 | 0.00 | 0.00 | 0.00 | 0.00 | 0.00 |
| P13 | 0.00 | 0.00 | 0.00 | 0.00 | 0.00 | 0.00 | 0.00 | 0.00 | 0.80 | 0.20 | 0.00 | 0.00 | 0.00 | 0.00 |
| P13 | 0.00 | 0.00 | 0.00 | 0.00 | 0.00 | 0.00 | 0.00 | 0.00 | 0.10 | 0.80 | 0.10 | 0.00 | 0.00 | 0.00 |
| P13 | 0.00 | 0.00 | 0.00 | 0.00 | 0.00 | 0.00 | 0.00 | 0.00 | 0.00 | 0.20 | 0.80 | 0.00 | 0.00 | 0.00 |
| P14 | 0.00 | 0.00 | 0.00 | 0.00 | 0.00 | 0.00 | 0.00 | 0.00 | 0.00 | 0.00 | 0.00 | 0.80 | 0.20 | 0.00 |
| P14 | 0.00 | 0.00 | 0.00 | 0.00 | 0.00 | 0.00 | 0.00 | 0.00 | 0.00 | 0.00 | 0.00 | 0.10 | 0.80 | 0.10 |
| P14 | 0.00 | 0.00 | 0.00 | 0.00 | 0.00 | 0.00 | 0.00 | 0.00 | 0.00 | 0.00 | 0.00 | 0.00 | 0.20 | 0.80 |

TABLE C18

Probability table for Node MAP

| Initial Weathering Intensity | Weathering Modification | Mineral Alteration Potential: low potential | moderate potential | high potential |
|---|---|---|---|---|
| extensive | major | 0.45 | 0.40 | 0.15 |
| extensive | minor | 0.90 | 0.10 | 0.00 |
| moderate | major | 0.00 | 0.40 | 0.60 |
| moderate | minor | 0.00 | 0.60 | 0.40 |
| minor | major | 0.00 | 0.10 | 0.90 |
| minor | minor | 0.00 | 0.15 | 0.85 |

TABLE C19

Probability table for Node ODFP

| Selective Transport Fining | Weathering Modification | Overall Downstream Fining Potential: low potential | high potential |
|---|---|---|---|
| much fining | major | 0.00 | 1.00 |
| much fining | minor | 0.40 | 0.60 |
| little fining | major | 0.50 | 0.50 |
| little fining | minor | 0.70 | 0.30 |
| no fining | major | 0.60 | 0.40 |
| no fining | minor | 1.00 | 0.00 |

TABLE C20

Probability table for Node TCA

| Provenance Lithotype | Mineral Alteration Potential | Transported Clay Abundance: high | moderate | low | very low |
|---|---|---|---|---|---|
| P1 | low potential | 0.00 | 0.00 | 0.20 | 0.80 |
| P1 | moderate potential | 0.00 | 0.20 | 0.50 | 0.30 |
| P1 | high potential | 0.20 | 0.80 | 0.00 | 0.00 |
| P2 | low potential | 0.00 | 0.00 | 0.20 | 0.80 |
| P2 | moderate potential | 0.00 | 0.20 | 0.50 | 0.30 |

TABLE C20-continued

Probability table for Node TCA

| Provenance Lithotype | Mineral Alteration Potential | Transported Clay Abundance: high | moderate | low | very low |
|---|---|---|---|---|---|
| P2 | high potential | 0.20 | 0.80 | 0.00 | 0.00 |
| P3 | low potential | 0.00 | 0.00 | 0.20 | 0.80 |
| P3 | moderate potential | 0.00 | 0.20 | 0.60 | 0.20 |
| P3 | high potential | 0.60 | 0.40 | 0.00 | 0.00 |
| P4 | low potential | 0.00 | 0.00 | 0.80 | 0.20 |
| P4 | moderate potential | 0.05 | 0.90 | 0.05 | 0.00 |
| P4 | high potential | 0.40 | 0.60 | 0.00 | 0.00 |
| P5 | low potential | 0.00 | 0.00 | 0.80 | 0.20 |
| P5 | moderate potential | 0.05 | 0.90 | 0.05 | 0.00 |
| P5 | high potential | 0.30 | 0.70 | 0.00 | 0.00 |
| P6 | low potential | 0.00 | 0.60 | 0.40 | 0.00 |
| P6 | moderate potential | 0.00 | 0.90 | 0.10 | 0.00 |
| P6 | high potential | 0.10 | 0.90 | 0.00 | 0.00 |
| P7 | low potential | 0.00 | 0.70 | 0.30 | 0.00 |
| P7 | moderate potential | 0.00 | 0.90 | 0.10 | 0.00 |
| P7 | high potential | 0.10 | 0.90 | 0.00 | 0.00 |
| P8 | low potential | 0.00 | 0.80 | 0.20 | 0.00 |
| P8 | moderate potential | 0.80 | 0.20 | 0.00 | 0.00 |
| P8 | high potential | 0.90 | 0.10 | 0.00 | 0.00 |
| P9 | low potential | 0.00 | 0.00 | 0.50 | 0.50 |
| P9 | moderate potential | 0.00 | 0.00 | 0.25 | 0.75 |
| P9 | high potential | 0.00 | 0.00 | 0.30 | 0.70 |
| P10 | low potential | 0.00 | 0.00 | 0.20 | 0.80 |
| P10 | moderate potential | 0.00 | 0.20 | 0.60 | 0.20 |
| P10 | high potential | 0.10 | 0.90 | 0.00 | 0.00 |
| P11 | low potential | 0.00 | 0.80 | 0.20 | 0.00 |
| P11 | moderate potential | 0.80 | 0.20 | 0.00 | 0.00 |
| P11 | high potential | 0.90 | 0.10 | 0.00 | 0.00 |
| P12 | low potential | 0.00 | 0.00 | 0.50 | 0.50 |
| P12 | moderate potential | 0.00 | 0.00 | 0.25 | 0.75 |
| P12 | high potential | 0.00 | 0.00 | 0.30 | 0.70 |
| P13 | low potential | 0.00 | 0.80 | 0.20 | 0.00 |
| P13 | moderate potential | 0.80 | 0.20 | 0.00 | 0.00 |
| P13 | high potential | 0.90 | 0.10 | 0.00 | 0.00 |
| P14 | low potential | 0.00 | 0.00 | 0.20 | 0.80 |
| P14 | moderate potential | 0.00 | 0.20 | 0.50 | 0.30 |
| P14 | high potential | 0.20 | 0.80 | 0.00 | 0.00 |

TABLE C20.1.1

Probability table for Node MCIBU

| Initial CIBU | MAP | Modified CIBU Sand: 2 | 7 | 8 | 9 | 12 | 13 | 14 | 17 | 18 | 19 |
|---|---|---|---|---|---|---|---|---|---|---|---|
| 2 | low | 0.025 | 0.025 | 0.025 | 0.025 | 0.025 | 0.025 | 0.025 | 0.025 | 0.025 | 0.025 |
| 2 | moderate | 0.025 | 0.025 | 0.025 | 0.025 | 0.025 | 0.025 | 0.025 | 0.025 | 0.025 | 0.025 |
| 2 | high | 0.025 | 0.025 | 0.025 | 0.025 | 0.025 | 0.025 | 0.025 | 0.025 | 0.025 | 0.025 |

TABLE C20.1.1-continued

| Probability table for Node MCIBU | | | | | | | | | | | |
|---|---|---|---|---|---|---|---|---|---|---|---|
| 7 | low | 0.025 | 0.025 | 0.025 | 0.025 | 0.025 | 0.025 | 0.025 | 0.025 | 0.025 | 0.025 |
| 7 | moderate | 0.025 | 0.025 | 0.025 | 0.025 | 0.025 | 0.025 | 0.025 | 0.025 | 0.025 | 0.025 |
| 7 | high | 0.025 | 0.025 | 0.025 | 0.025 | 0.025 | 0.025 | 0.025 | 0.025 | 0.025 | 0.025 |
| 8 | low | 0.025 | 0.025 | 0.025 | 0.025 | 0.025 | 0.025 | 0.025 | 0.025 | 0.025 | 0.025 |
| 8 | moderate | 0.025 | 0.025 | 0.025 | 0.025 | 0.025 | 0.025 | 0.025 | 0.025 | 0.025 | 0.025 |
| 8 | high | 0.025 | 0.025 | 0.025 | 0.025 | 0.025 | 0.025 | 0.025 | 0.025 | 0.025 | 0.025 |
| 9 | low | 0.025 | 0.025 | 0.025 | 0.025 | 0.025 | 0.025 | 0.025 | 0.025 | 0.025 | 0.025 |
| 9 | moderate | 0.025 | 0.025 | 0.025 | 0.025 | 0.025 | 0.025 | 0.025 | 0.025 | 0.025 | 0.025 |
| 9 | high | 0.025 | 0.025 | 0.025 | 0.025 | 0.025 | 0.025 | 0.025 | 0.025 | 0.025 | 0.025 |
| 12 | low | 0.025 | 0.025 | 0.025 | 0.025 | 0.025 | 0.025 | 0.025 | 0.025 | 0.025 | 0.025 |
| 12 | moderate | 0.025 | 0.025 | 0.025 | 0.025 | 0.025 | 0.025 | 0.025 | 0.025 | 0.025 | 0.025 |
| 12 | high | 0.025 | 0.025 | 0.025 | 0.025 | 0.025 | 0.025 | 0.025 | 0.025 | 0.025 | 0.025 |
| 13 | low | 0.025 | 0.025 | 0.025 | 0.025 | 0.025 | 0.025 | 0.025 | 0.025 | 0.025 | 0.025 |
| 13 | moderate | 0.025 | 0.025 | 0.025 | 0.025 | 0.025 | 0.025 | 0.025 | 0.025 | 0.025 | 0.025 |
| 13 | high | 0.025 | 0.025 | 0.025 | 0.025 | 0.025 | 0.025 | 0.025 | 0.025 | 0.025 | 0.025 |
| 14 | low | 0.025 | 0.025 | 0.025 | 0.025 | 0.025 | 0.025 | 0.025 | 0.025 | 0.025 | 0.025 |
| 14 | moderate | 0.025 | 0.025 | 0.025 | 0.025 | 0.025 | 0.025 | 0.025 | 0.025 | 0.025 | 0.025 |
| 14 | high | 0.025 | 0.025 | 0.025 | 0.025 | 0.025 | 0.025 | 0.025 | 0.025 | 0.025 | 0.025 |
| 17 | low | 0.025 | 0.025 | 0.025 | 0.025 | 0.025 | 0.025 | 0.025 | 0.025 | 0.025 | 0.025 |
| 17 | moderate | 0.025 | 0.025 | 0.025 | 0.025 | 0.025 | 0.025 | 0.025 | 0.025 | 0.025 | 0.025 |
| 17 | high | 0.025 | 0.025 | 0.025 | 0.025 | 0.025 | 0.025 | 0.025 | 0.025 | 0.025 | 0.025 |
| 18 | low | 0.025 | 0.025 | 0.025 | 0.025 | 0.025 | 0.025 | 0.025 | 0.025 | 0.025 | 0.025 |
| 18 | moderate | 0.025 | 0.025 | 0.025 | 0.025 | 0.025 | 0.025 | 0.025 | 0.025 | 0.025 | 0.025 |
| 18 | high | 0.025 | 0.025 | 0.025 | 0.025 | 0.025 | 0.025 | 0.025 | 0.025 | 0.025 | 0.025 |
| 19 | low | 0.025 | 0.025 | 0.025 | 0.025 | 0.025 | 0.025 | 0.025 | 0.025 | 0.025 | 0.025 |
| 19 | moderate | 0.025 | 0.025 | 0.025 | 0.025 | 0.025 | 0.025 | 0.025 | 0.025 | 0.025 | 0.025 |
| 19 | high | 0.025 | 0.025 | 0.025 | 0.025 | 0.025 | 0.025 | 0.025 | 0.025 | 0.025 | 0.025 |
| 20 | low | 0.025 | 0.025 | 0.025 | 0.025 | 0.025 | 0.025 | 0.025 | 0.025 | 0.025 | 0.025 |
| 20 | moderate | 0.025 | 0.025 | 0.025 | 0.025 | 0.025 | 0.025 | 0.025 | 0.025 | 0.025 | 0.025 |
| 20 | high | 0.025 | 0.025 | 0.025 | 0.025 | 0.025 | 0.025 | 0.025 | 0.025 | 0.025 | 0.025 |
| 24 | low | 0.025 | 0.025 | 0.025 | 0.025 | 0.025 | 0.025 | 0.025 | 0.025 | 0.025 | 0.025 |
| 24 | moderate | 0.025 | 0.025 | 0.025 | 0.025 | 0.025 | 0.025 | 0.025 | 0.025 | 0.025 | 0.025 |
| 24 | high | 0.025 | 0.025 | 0.025 | 0.025 | 0.025 | 0.025 | 0.025 | 0.025 | 0.025 | 0.025 |

| Initial | Modified CIBU Sand | | | | | | | | | |
|---|---|---|---|---|---|---|---|---|---|---|
| CIBU | 20 | 24 | 25 | 26 | 27 | 31 | 32 | 33 | 34 | 35 |
| 2 | 0.025 | 0.025 | 0.025 | 0.025 | 0.025 | 0.025 | 0.025 | 0.025 | 0.025 | 0.025 |
| 2 | 0.025 | 0.025 | 0.025 | 0.025 | 0.025 | 0.025 | 0.025 | 0.025 | 0.025 | 0.025 |
| 2 | 0.025 | 0.025 | 0.025 | 0.025 | 0.025 | 0.025 | 0.025 | 0.025 | 0.025 | 0.025 |
| 7 | 0.025 | 0.025 | 0.025 | 0.025 | 0.025 | 0.025 | 0.025 | 0.025 | 0.025 | 0.025 |
| 7 | 0.025 | 0.025 | 0.025 | 0.025 | 0.025 | 0.025 | 0.025 | 0.025 | 0.025 | 0.025 |
| 7 | 0.025 | 0.025 | 0.025 | 0.025 | 0.025 | 0.025 | 0.025 | 0.025 | 0.025 | 0.025 |
| 8 | 0.025 | 0.025 | 0.025 | 0.025 | 0.025 | 0.025 | 0.025 | 0.025 | 0.025 | 0.025 |
| 8 | 0.025 | 0.025 | 0.025 | 0.025 | 0.025 | 0.025 | 0.025 | 0.025 | 0.025 | 0.025 |
| 8 | 0.025 | 0.025 | 0.025 | 0.025 | 0.025 | 0.025 | 0.025 | 0.025 | 0.025 | 0.025 |
| 9 | 0.025 | 0.025 | 0.025 | 0.025 | 0.025 | 0.025 | 0.025 | 0.025 | 0.025 | 0.025 |
| 9 | 0.025 | 0.025 | 0.025 | 0.025 | 0.025 | 0.025 | 0.025 | 0.025 | 0.025 | 0.025 |
| 9 | 0.025 | 0.025 | 0.025 | 0.025 | 0.025 | 0.025 | 0.025 | 0.025 | 0.025 | 0.025 |
| 12 | 0.025 | 0.025 | 0.025 | 0.025 | 0.025 | 0.025 | 0.025 | 0.025 | 0.025 | 0.025 |
| 12 | 0.025 | 0.025 | 0.025 | 0.025 | 0.025 | 0.025 | 0.025 | 0.025 | 0.025 | 0.025 |
| 12 | 0.025 | 0.025 | 0.025 | 0.025 | 0.025 | 0.025 | 0.025 | 0.025 | 0.025 | 0.025 |
| 13 | 0.025 | 0.025 | 0.025 | 0.025 | 0.025 | 0.025 | 0.025 | 0.025 | 0.025 | 0.025 |
| 13 | 0.025 | 0.025 | 0.025 | 0.025 | 0.025 | 0.025 | 0.025 | 0.025 | 0.025 | 0.025 |
| 13 | 0.025 | 0.025 | 0.025 | 0.025 | 0.025 | 0.025 | 0.025 | 0.025 | 0.025 | 0.025 |
| 14 | 0.025 | 0.025 | 0.025 | 0.025 | 0.025 | 0.025 | 0.025 | 0.025 | 0.025 | 0.025 |
| 14 | 0.025 | 0.025 | 0.025 | 0.025 | 0.025 | 0.025 | 0.025 | 0.025 | 0.025 | 0.025 |
| 14 | 0.025 | 0.025 | 0.025 | 0.025 | 0.025 | 0.025 | 0.025 | 0.025 | 0.025 | 0.025 |
| 17 | 0.025 | 0.025 | 0.025 | 0.025 | 0.025 | 0.025 | 0.025 | 0.025 | 0.025 | 0.025 |
| 17 | 0.025 | 0.025 | 0.025 | 0.025 | 0.025 | 0.025 | 0.025 | 0.025 | 0.025 | 0.025 |
| 17 | 0.025 | 0.025 | 0.025 | 0.025 | 0.025 | 0.025 | 0.025 | 0.025 | 0.025 | 0.025 |
| 18 | 0.025 | 0.025 | 0.025 | 0.025 | 0.025 | 0.025 | 0.025 | 0.025 | 0.025 | 0.025 |
| 18 | 0.025 | 0.025 | 0.025 | 0.025 | 0.025 | 0.025 | 0.025 | 0.025 | 0.025 | 0.025 |
| 18 | 0.025 | 0.025 | 0.025 | 0.025 | 0.025 | 0.025 | 0.025 | 0.025 | 0.025 | 0.025 |
| 19 | 0.025 | 0.025 | 0.025 | 0.025 | 0.025 | 0.025 | 0.025 | 0.025 | 0.025 | 0.025 |
| 19 | 0.025 | 0.025 | 0.025 | 0.025 | 0.025 | 0.025 | 0.025 | 0.025 | 0.025 | 0.025 |
| 19 | 0.025 | 0.025 | 0.025 | 0.025 | 0.025 | 0.025 | 0.025 | 0.025 | 0.025 | 0.025 |
| 20 | 0.025 | 0.025 | 0.025 | 0.025 | 0.025 | 0.025 | 0.025 | 0.025 | 0.025 | 0.025 |
| 20 | 0.025 | 0.025 | 0.025 | 0.025 | 0.025 | 0.025 | 0.025 | 0.025 | 0.025 | 0.025 |
| 20 | 0.025 | 0.025 | 0.025 | 0.025 | 0.025 | 0.025 | 0.025 | 0.025 | 0.025 | 0.025 |
| 24 | 0.025 | 0.025 | 0.025 | 0.025 | 0.025 | 0.025 | 0.025 | 0.025 | 0.025 | 0.025 |
| 24 | 0.025 | 0.025 | 0.025 | 0.025 | 0.025 | 0.025 | 0.025 | 0.025 | 0.025 | 0.025 |
| 24 | 0.025 | 0.025 | 0.025 | 0.025 | 0.025 | 0.025 | 0.025 | 0.025 | 0.025 | 0.025 |

TABLE C20.1.2

Probability table for Node MCIBU

| Initial CIBU | MAP | Modified CIBU Sand 2 | 7 | 8 | 9 | 12 | 13 | 14 | 17 | 18 | 19 |
|---|---|---|---|---|---|---|---|---|---|---|---|
| 25 | low | 0.025 | 0.025 | 0.025 | 0.025 | 0.025 | 0.025 | 0.025 | 0.025 | 0.025 | 0.025 |
| 25 | moderate | 0.025 | 0.025 | 0.025 | 0.025 | 0.025 | 0.025 | 0.025 | 0.025 | 0.025 | 0.025 |
| 25 | high | 0.025 | 0.025 | 0.025 | 0.025 | 0.025 | 0.025 | 0.025 | 0.025 | 0.025 | 0.025 |
| 26 | low | 0.025 | 0.025 | 0.025 | 0.025 | 0.025 | 0.025 | 0.025 | 0.025 | 0.025 | 0.025 |
| 26 | moderate | 0.025 | 0.025 | 0.025 | 0.025 | 0.025 | 0.025 | 0.025 | 0.025 | 0.025 | 0.025 |
| 26 | high | 0.025 | 0.025 | 0.025 | 0.025 | 0.025 | 0.025 | 0.025 | 0.025 | 0.025 | 0.025 |
| 27 | low | 0.025 | 0.025 | 0.025 | 0.025 | 0.025 | 0.025 | 0.025 | 0.025 | 0.025 | 0.025 |
| 27 | moderate | 0.025 | 0.025 | 0.025 | 0.025 | 0.025 | 0.025 | 0.025 | 0.025 | 0.025 | 0.025 |
| 27 | high | 0.025 | 0.025 | 0.025 | 0.025 | 0.025 | 0.025 | 0.025 | 0.025 | 0.025 | 0.025 |
| 31 | low | 0.025 | 0.025 | 0.025 | 0.025 | 0.025 | 0.025 | 0.025 | 0.025 | 0.025 | 0.025 |
| 31 | moderate | 0.025 | 0.025 | 0.025 | 0.025 | 0.025 | 0.025 | 0.025 | 0.025 | 0.025 | 0.025 |
| 31 | high | 0.025 | 0.025 | 0.025 | 0.025 | 0.025 | 0.025 | 0.025 | 0.025 | 0.025 | 0.025 |
| 32 | low | 0.025 | 0.025 | 0.025 | 0.025 | 0.025 | 0.025 | 0.025 | 0.025 | 0.025 | 0.025 |
| 32 | moderate | 0.025 | 0.025 | 0.025 | 0.025 | 0.025 | 0.025 | 0.025 | 0.025 | 0.025 | 0.025 |
| 32 | high | 0.025 | 0.025 | 0.025 | 0.025 | 0.025 | 0.025 | 0.025 | 0.025 | 0.025 | 0.025 |
| 33 | low | 0.025 | 0.025 | 0.025 | 0.025 | 0.025 | 0.025 | 0.025 | 0.025 | 0.025 | 0.025 |
| 33 | moderate | 0.025 | 0.025 | 0.025 | 0.025 | 0.025 | 0.025 | 0.025 | 0.025 | 0.025 | 0.025 |
| 33 | high | 0.025 | 0.025 | 0.025 | 0.025 | 0.025 | 0.025 | 0.025 | 0.025 | 0.025 | 0.025 |
| 34 | low | 0.025 | 0.025 | 0.025 | 0.025 | 0.025 | 0.025 | 0.025 | 0.025 | 0.025 | 0.025 |
| 34 | moderate | 0.025 | 0.025 | 0.025 | 0.025 | 0.025 | 0.025 | 0.025 | 0.025 | 0.025 | 0.025 |
| 34 | high | 0.025 | 0.025 | 0.025 | 0.025 | 0.025 | 0.025 | 0.025 | 0.025 | 0.025 | 0.025 |
| 35 | low | 0.025 | 0.025 | 0.025 | 0.025 | 0.025 | 0.025 | 0.025 | 0.025 | 0.025 | 0.025 |
| 35 | moderate | 0.025 | 0.025 | 0.025 | 0.025 | 0.025 | 0.025 | 0.025 | 0.025 | 0.025 | 0.025 |
| 35 | high | 0.025 | 0.025 | 0.025 | 0.025 | 0.025 | 0.025 | 0.025 | 0.025 | 0.025 | 0.025 |
| 40 | low | 0.025 | 0.025 | 0.025 | 0.025 | 0.025 | 0.025 | 0.025 | 0.025 | 0.025 | 0.025 |
| 40 | moderate | 0.025 | 0.025 | 0.025 | 0.025 | 0.025 | 0.025 | 0.025 | 0.025 | 0.025 | 0.025 |
| 40 | high | 0.025 | 0.025 | 0.025 | 0.025 | 0.025 | 0.025 | 0.025 | 0.025 | 0.025 | 0.025 |
| 41 | low | 0.025 | 0.025 | 0.025 | 0.025 | 0.025 | 0.025 | 0.025 | 0.025 | 0.025 | 0.025 |
| 41 | moderate | 0.025 | 0.025 | 0.025 | 0.025 | 0.025 | 0.025 | 0.025 | 0.025 | 0.025 | 0.025 |
| 41 | high | 0.025 | 0.025 | 0.025 | 0.025 | 0.025 | 0.025 | 0.025 | 0.025 | 0.025 | 0.025 |
| 42 | low | 0.025 | 0.025 | 0.025 | 0.025 | 0.025 | 0.025 | 0.025 | 0.025 | 0.025 | 0.025 |
| 42 | moderate | 0.025 | 0.025 | 0.025 | 0.025 | 0.025 | 0.025 | 0.025 | 0.025 | 0.025 | 0.025 |
| 42 | high | 0.025 | 0.025 | 0.025 | 0.025 | 0.025 | 0.025 | 0.025 | 0.025 | 0.025 | 0.025 |
| 43 | low | 0.025 | 0.025 | 0.025 | 0.025 | 0.025 | 0.025 | 0.025 | 0.025 | 0.025 | 0.025 |
| 43 | moderate | 0.025 | 0.025 | 0.025 | 0.025 | 0.025 | 0.025 | 0.025 | 0.025 | 0.025 | 0.025 |
| 43 | high | 0.025 | 0.025 | 0.025 | 0.025 | 0.025 | 0.025 | 0.025 | 0.025 | 0.025 | 0.025 |

| Initial CIBU | Modified CIBU Sand 20 | 24 | 25 | 26 | 27 | 31 | 32 | 33 | 34 | 35 |
|---|---|---|---|---|---|---|---|---|---|---|
| 25 | 0.025 | 0.025 | 0.025 | 0.025 | 0.025 | 0.025 | 0.025 | 0.025 | 0.025 | 0.025 |
| 25 | 0.025 | 0.025 | 0.025 | 0.025 | 0.025 | 0.025 | 0.025 | 0.025 | 0.025 | 0.025 |
| 25 | 0.025 | 0.025 | 0.025 | 0.025 | 0.025 | 0.025 | 0.025 | 0.025 | 0.025 | 0.025 |
| 26 | 0.025 | 0.025 | 0.025 | 0.025 | 0.025 | 0.025 | 0.025 | 0.025 | 0.025 | 0.025 |
| 26 | 0.025 | 0.025 | 0.025 | 0.025 | 0.025 | 0.025 | 0.025 | 0.025 | 0.025 | 0.025 |
| 26 | 0.025 | 0.025 | 0.025 | 0.025 | 0.025 | 0.025 | 0.025 | 0.025 | 0.025 | 0.025 |
| 27 | 0.025 | 0.025 | 0.025 | 0.025 | 0.025 | 0.025 | 0.025 | 0.025 | 0.025 | 0.025 |
| 27 | 0.025 | 0.025 | 0.025 | 0.025 | 0.025 | 0.025 | 0.025 | 0.025 | 0.025 | 0.025 |
| 27 | 0.025 | 0.025 | 0.025 | 0.025 | 0.025 | 0.025 | 0.025 | 0.025 | 0.025 | 0.025 |
| 31 | 0.025 | 0.025 | 0.025 | 0.025 | 0.025 | 0.025 | 0.025 | 0.025 | 0.025 | 0.025 |
| 31 | 0.025 | 0.025 | 0.025 | 0.025 | 0.025 | 0.025 | 0.025 | 0.025 | 0.025 | 0.025 |
| 31 | 0.025 | 0.025 | 0.025 | 0.025 | 0.025 | 0.025 | 0.025 | 0.025 | 0.025 | 0.025 |
| 32 | 0.025 | 0.025 | 0.025 | 0.025 | 0.025 | 0.025 | 0.025 | 0.025 | 0.025 | 0.025 |
| 32 | 0.025 | 0.025 | 0.025 | 0.025 | 0.025 | 0.025 | 0.025 | 0.025 | 0.025 | 0.025 |
| 32 | 0.025 | 0.025 | 0.025 | 0.025 | 0.025 | 0.025 | 0.025 | 0.025 | 0.025 | 0.025 |
| 33 | 0.025 | 0.025 | 0.025 | 0.025 | 0.025 | 0.025 | 0.025 | 0.025 | 0.025 | 0.025 |
| 33 | 0.025 | 0.025 | 0.025 | 0.025 | 0.025 | 0.025 | 0.025 | 0.025 | 0.025 | 0.025 |
| 33 | 0.025 | 0.025 | 0.025 | 0.025 | 0.025 | 0.025 | 0.025 | 0.025 | 0.025 | 0.025 |
| 34 | 0.025 | 0.025 | 0.025 | 0.025 | 0.025 | 0.025 | 0.025 | 0.025 | 0.025 | 0.025 |
| 34 | 0.025 | 0.025 | 0.025 | 0.025 | 0.025 | 0.025 | 0.025 | 0.025 | 0.025 | 0.025 |
| 34 | 0.025 | 0.025 | 0.025 | 0.025 | 0.025 | 0.025 | 0.025 | 0.025 | 0.025 | 0.025 |
| 35 | 0.025 | 0.025 | 0.025 | 0.025 | 0.025 | 0.025 | 0.025 | 0.025 | 0.025 | 0.025 |
| 35 | 0.025 | 0.025 | 0.025 | 0.025 | 0.025 | 0.025 | 0.025 | 0.025 | 0.025 | 0.025 |
| 35 | 0.025 | 0.025 | 0.025 | 0.025 | 0.025 | 0.025 | 0.025 | 0.025 | 0.025 | 0.025 |
| 40 | 0.025 | 0.025 | 0.025 | 0.025 | 0.025 | 0.025 | 0.025 | 0.025 | 0.025 | 0.025 |
| 40 | 0.025 | 0.025 | 0.025 | 0.025 | 0.025 | 0.025 | 0.025 | 0.025 | 0.025 | 0.025 |
| 40 | 0.025 | 0.025 | 0.025 | 0.025 | 0.025 | 0.025 | 0.025 | 0.025 | 0.025 | 0.025 |
| 41 | 0.025 | 0.025 | 0.025 | 0.025 | 0.025 | 0.025 | 0.025 | 0.025 | 0.025 | 0.025 |
| 41 | 0.025 | 0.025 | 0.025 | 0.025 | 0.025 | 0.025 | 0.025 | 0.025 | 0.025 | 0.025 |
| 41 | 0.025 | 0.025 | 0.025 | 0.025 | 0.025 | 0.025 | 0.025 | 0.025 | 0.025 | 0.025 |
| 42 | 0.025 | 0.025 | 0.025 | 0.025 | 0.025 | 0.025 | 0.025 | 0.025 | 0.025 | 0.025 |
| 42 | 0.025 | 0.025 | 0.025 | 0.025 | 0.025 | 0.025 | 0.025 | 0.025 | 0.025 | 0.025 |

TABLE C20.1.2-continued

| Probability table for Node MCIBU | | | | | | | | | | |
|---|---|---|---|---|---|---|---|---|---|---|
| 42 | 0.025 | 0.025 | 0.025 | 0.025 | 0.025 | 0.025 | 0.025 | 0.025 | 0.025 | 0.025 |
| 43 | 0.025 | 0.025 | 0.025 | 0.025 | 0.025 | 0.025 | 0.025 | 0.025 | 0.025 | 0.025 |
| 43 | 0.025 | 0.025 | 0.025 | 0.025 | 0.025 | 0.025 | 0.025 | 0.025 | 0.025 | 0.025 |
| 43 | 0.025 | 0.025 | 0.025 | 0.025 | 0.025 | 0.025 | 0.025 | 0.025 | 0.025 | 0.025 |

TABLE C20.1.3

Probability table for Node MCIBU

| Initial | | Modified CIBU Sand | | | | | | | | | |
|---|---|---|---|---|---|---|---|---|---|---|---|
| CIBU | MAP | 2 | 7 | 8 | 9 | 12 | 13 | 14 | 17 | 18 | 19 |
| 44 | low | 0.025 | 0.025 | 0.025 | 0.025 | 0.025 | 0.025 | 0.025 | 0.025 | 0.025 | 0.025 |
| 44 | moderate | 0.025 | 0.025 | 0.025 | 0.025 | 0.025 | 0.025 | 0.025 | 0.025 | 0.025 | 0.025 |
| 44 | high | 0.025 | 0.025 | 0.025 | 0.025 | 0.025 | 0.025 | 0.025 | 0.025 | 0.025 | 0.025 |
| 45 | low | 0.025 | 0.025 | 0.025 | 0.025 | 0.025 | 0.025 | 0.025 | 0.025 | 0.025 | 0.025 |
| 45 | moderate | 0.025 | 0.025 | 0.025 | 0.025 | 0.025 | 0.025 | 0.025 | 0.025 | 0.025 | 0.025 |
| 45 | high | 0.025 | 0.025 | 0.025 | 0.025 | 0.025 | 0.025 | 0.025 | 0.025 | 0.025 | 0.025 |
| 49 | low | 0.025 | 0.025 | 0.025 | 0.025 | 0.025 | 0.025 | 0.025 | 0.025 | 0.025 | 0.025 |
| 49 | moderate | 0.025 | 0.025 | 0.025 | 0.025 | 0.025 | 0.025 | 0.025 | 0.025 | 0.025 | 0.025 |
| 49 | high | 0.025 | 0.025 | 0.025 | 0.025 | 0.025 | 0.025 | 0.025 | 0.025 | 0.025 | 0.025 |
| 50 | low | 0.025 | 0.025 | 0.025 | 0.025 | 0.025 | 0.025 | 0.025 | 0.025 | 0.025 | 0.025 |
| 50 | moderate | 0.025 | 0.025 | 0.025 | 0.025 | 0.025 | 0.025 | 0.025 | 0.025 | 0.025 | 0.025 |
| 50 | high | 0.025 | 0.025 | 0.025 | 0.025 | 0.025 | 0.025 | 0.025 | 0.025 | 0.025 | 0.025 |
| 51 | low | 0.025 | 0.025 | 0.025 | 0.025 | 0.025 | 0.025 | 0.025 | 0.025 | 0.025 | 0.025 |
| 51 | moderate | 0.025 | 0.025 | 0.025 | 0.025 | 0.025 | 0.025 | 0.025 | 0.025 | 0.025 | 0.025 |
| 51 | high | 0.025 | 0.025 | 0.025 | 0.025 | 0.025 | 0.025 | 0.025 | 0.025 | 0.025 | 0.025 |
| 52 | low | 0.025 | 0.025 | 0.025 | 0.025 | 0.025 | 0.025 | 0.025 | 0.025 | 0.025 | 0.025 |
| 52 | moderate | 0.025 | 0.025 | 0.025 | 0.025 | 0.025 | 0.025 | 0.025 | 0.025 | 0.025 | 0.025 |
| 52 | high | 0.025 | 0.025 | 0.025 | 0.025 | 0.025 | 0.025 | 0.025 | 0.025 | 0.025 | 0.025 |
| 53 | low | 0.025 | 0.025 | 0.025 | 0.025 | 0.025 | 0.025 | 0.025 | 0.025 | 0.025 | 0.025 |
| 53 | moderate | 0.025 | 0.025 | 0.025 | 0.025 | 0.025 | 0.025 | 0.025 | 0.025 | 0.025 | 0.025 |
| 53 | high | 0.025 | 0.025 | 0.025 | 0.025 | 0.025 | 0.025 | 0.025 | 0.025 | 0.025 | 0.025 |
| 54 | low | 0.025 | 0.025 | 0.025 | 0.025 | 0.025 | 0.025 | 0.025 | 0.025 | 0.025 | 0.025 |
| 54 | moderate | 0.025 | 0.025 | 0.025 | 0.025 | 0.025 | 0.025 | 0.025 | 0.025 | 0.025 | 0.025 |
| 54 | high | 0.025 | 0.025 | 0.025 | 0.025 | 0.025 | 0.025 | 0.025 | 0.025 | 0.025 | 0.025 |
| 55 | low | 0.025 | 0.025 | 0.025 | 0.025 | 0.025 | 0.025 | 0.025 | 0.025 | 0.025 | 0.025 |
| 55 | moderate | 0.025 | 0.025 | 0.025 | 0.025 | 0.025 | 0.025 | 0.025 | 0.025 | 0.025 | 0.025 |
| 55 | high | 0.025 | 0.025 | 0.025 | 0.025 | 0.025 | 0.025 | 0.025 | 0.025 | 0.025 | 0.025 |
| 60 | low | 0.025 | 0.025 | 0.025 | 0.025 | 0.025 | 0.025 | 0.025 | 0.025 | 0.025 | 0.025 |
| 60 | moderate | 0.025 | 0.025 | 0.025 | 0.025 | 0.025 | 0.025 | 0.025 | 0.025 | 0.025 | 0.025 |
| 60 | high | 0.025 | 0.025 | 0.025 | 0.025 | 0.025 | 0.025 | 0.025 | 0.025 | 0.025 | 0.025 |
| 61 | low | 0.025 | 0.025 | 0.025 | 0.025 | 0.025 | 0.025 | 0.025 | 0.025 | 0.025 | 0.025 |
| 61 | moderate | 0.025 | 0.025 | 0.025 | 0.025 | 0.025 | 0.025 | 0.025 | 0.025 | 0.025 | 0.025 |
| 61 | high | 0.025 | 0.025 | 0.025 | 0.025 | 0.025 | 0.025 | 0.025 | 0.025 | 0.025 | 0.025 |
| 62 | low | 0.025 | 0.025 | 0.025 | 0.025 | 0.025 | 0.025 | 0.025 | 0.025 | 0.025 | 0.025 |
| 62 | moderate | 0.025 | 0.025 | 0.025 | 0.025 | 0.025 | 0.025 | 0.025 | 0.025 | 0.025 | 0.025 |
| 62 | high | 0.025 | 0.025 | 0.025 | 0.025 | 0.025 | 0.025 | 0.025 | 0.025 | 0.025 | 0.025 |

| Initial | Modified CIBU Sand | | | | | | | | | |
|---|---|---|---|---|---|---|---|---|---|---|
| CIBU | 20 | 24 | 25 | 26 | 27 | 31 | 32 | 33 | 34 | 35 |
| 44 | 0.025 | 0.025 | 0.025 | 0.025 | 0.025 | 0.025 | 0.025 | 0.025 | 0.025 | 0.025 |
| 44 | 0.025 | 0.025 | 0.025 | 0.025 | 0.025 | 0.025 | 0.025 | 0.025 | 0.025 | 0.025 |
| 44 | 0.025 | 0.025 | 0.025 | 0.025 | 0.025 | 0.025 | 0.025 | 0.025 | 0.025 | 0.025 |
| 45 | 0.025 | 0.025 | 0.025 | 0.025 | 0.025 | 0.025 | 0.025 | 0.025 | 0.025 | 0.025 |
| 45 | 0.025 | 0.025 | 0.025 | 0.025 | 0.025 | 0.025 | 0.025 | 0.025 | 0.025 | 0.025 |
| 45 | 0.025 | 0.025 | 0.025 | 0.025 | 0.025 | 0.025 | 0.025 | 0.025 | 0.025 | 0.025 |
| 49 | 0.025 | 0.025 | 0.025 | 0.025 | 0.025 | 0.025 | 0.025 | 0.025 | 0.025 | 0.025 |
| 49 | 0.025 | 0.025 | 0.025 | 0.025 | 0.025 | 0.025 | 0.025 | 0.025 | 0.025 | 0.025 |
| 49 | 0.025 | 0.025 | 0.025 | 0.025 | 0.025 | 0.025 | 0.025 | 0.025 | 0.025 | 0.025 |
| 50 | 0.025 | 0.025 | 0.025 | 0.025 | 0.025 | 0.025 | 0.025 | 0.025 | 0.025 | 0.025 |
| 50 | 0.025 | 0.025 | 0.025 | 0.025 | 0.025 | 0.025 | 0.025 | 0.025 | 0.025 | 0.025 |
| 50 | 0.025 | 0.025 | 0.025 | 0.025 | 0.025 | 0.025 | 0.025 | 0.025 | 0.025 | 0.025 |
| 51 | 0.025 | 0.025 | 0.025 | 0.025 | 0.025 | 0.025 | 0.025 | 0.025 | 0.025 | 0.025 |
| 51 | 0.025 | 0.025 | 0.025 | 0.025 | 0.025 | 0.025 | 0.025 | 0.025 | 0.025 | 0.025 |
| 51 | 0.025 | 0.025 | 0.025 | 0.025 | 0.025 | 0.025 | 0.025 | 0.025 | 0.025 | 0.025 |
| 52 | 0.025 | 0.025 | 0.025 | 0.025 | 0.025 | 0.025 | 0.025 | 0.025 | 0.025 | 0.025 |
| 52 | 0.025 | 0.025 | 0.025 | 0.025 | 0.025 | 0.025 | 0.025 | 0.025 | 0.025 | 0.025 |
| 52 | 0.025 | 0.025 | 0.025 | 0.025 | 0.025 | 0.025 | 0.025 | 0.025 | 0.025 | 0.025 |
| 53 | 0.025 | 0.025 | 0.025 | 0.025 | 0.025 | 0.025 | 0.025 | 0.025 | 0.025 | 0.025 |
| 53 | 0.025 | 0.025 | 0.025 | 0.025 | 0.025 | 0.025 | 0.025 | 0.025 | 0.025 | 0.025 |

TABLE C20.1.3-continued

| Probability table for Node MCIBU | | | | | | | | | | |
|---|---|---|---|---|---|---|---|---|---|---|
| 53 | 0.025 | 0.025 | 0.025 | 0.025 | 0.025 | 0.025 | 0.025 | 0.025 | 0.025 | 0.025 |
| 54 | 0.025 | 0.025 | 0.025 | 0.025 | 0.025 | 0.025 | 0.025 | 0.025 | 0.025 | 0.025 |
| 54 | 0.025 | 0.025 | 0.025 | 0.025 | 0.025 | 0.025 | 0.025 | 0.025 | 0.025 | 0.025 |
| 54 | 0.025 | 0.025 | 0.025 | 0.025 | 0.025 | 0.025 | 0.025 | 0.025 | 0.025 | 0.025 |
| 55 | 0.025 | 0.025 | 0.025 | 0.025 | 0.025 | 0.025 | 0.025 | 0.025 | 0.025 | 0.025 |
| 55 | 0.025 | 0.025 | 0.025 | 0.025 | 0.025 | 0.025 | 0.025 | 0.025 | 0.025 | 0.025 |
| 55 | 0.025 | 0.025 | 0.025 | 0.025 | 0.025 | 0.025 | 0.025 | 0.025 | 0.025 | 0.025 |
| 60 | 0.025 | 0.025 | 0.025 | 0.025 | 0.025 | 0.025 | 0.025 | 0.025 | 0.025 | 0.025 |
| 60 | 0.025 | 0.025 | 0.025 | 0.025 | 0.025 | 0.025 | 0.025 | 0.025 | 0.025 | 0.025 |
| 60 | 0.025 | 0.025 | 0.025 | 0.025 | 0.025 | 0.025 | 0.025 | 0.025 | 0.025 | 0.025 |
| 61 | 0.025 | 0.025 | 0.025 | 0.025 | 0.025 | 0.025 | 0.025 | 0.025 | 0.025 | 0.025 |
| 61 | 0.025 | 0.025 | 0.025 | 0.025 | 0.025 | 0.025 | 0.025 | 0.025 | 0.025 | 0.025 |
| 61 | 0.025 | 0.025 | 0.025 | 0.025 | 0.025 | 0.025 | 0.025 | 0.025 | 0.025 | 0.025 |
| 62 | 0.025 | 0.025 | 0.025 | 0.025 | 0.025 | 0.025 | 0.025 | 0.025 | 0.025 | 0.025 |
| 62 | 0.025 | 0.025 | 0.025 | 0.025 | 0.025 | 0.025 | 0.025 | 0.025 | 0.025 | 0.025 |
| 62 | 0.025 | 0.025 | 0.025 | 0.025 | 0.025 | 0.025 | 0.025 | 0.025 | 0.025 | 0.025 |

TABLE C20.1.4

Probability table for Node MCIBU

| Initial | | Modified CIBU Sand | | | | | | | | | |
|---|---|---|---|---|---|---|---|---|---|---|---|
| CIBU | MAP | 2 | 7 | 8 | 9 | 12 | 13 | 14 | 17 | 18 | 19 |
| 63 | low | 0.025 | 0.025 | 0.025 | 0.025 | 0.025 | 0.025 | 0.025 | 0.025 | 0.025 | 0.025 |
| 63 | moderate | 0.025 | 0.025 | 0.025 | 0.025 | 0.025 | 0.025 | 0.025 | 0.025 | 0.025 | 0.025 |
| 63 | high | 0.025 | 0.025 | 0.025 | 0.025 | 0.025 | 0.025 | 0.025 | 0.025 | 0.025 | 0.025 |
| 64 | low | 0.025 | 0.025 | 0.025 | 0.025 | 0.025 | 0.025 | 0.025 | 0.025 | 0.025 | 0.025 |
| 64 | moderate | 0.025 | 0.025 | 0.025 | 0.025 | 0.025 | 0.025 | 0.025 | 0.025 | 0.025 | 0.025 |
| 64 | high | 0.025 | 0.025 | 0.025 | 0.025 | 0.025 | 0.025 | 0.025 | 0.025 | 0.025 | 0.025 |
| 65 | low | 0.025 | 0.025 | 0.025 | 0.025 | 0.025 | 0.025 | 0.025 | 0.025 | 0.025 | 0.025 |
| 65 | moderate | 0.025 | 0.025 | 0.025 | 0.025 | 0.025 | 0.025 | 0.025 | 0.025 | 0.025 | 0.025 |
| 65 | high | 0.025 | 0.025 | 0.025 | 0.025 | 0.025 | 0.025 | 0.025 | 0.025 | 0.025 | 0.025 |
| 66 | low | 0.025 | 0.025 | 0.025 | 0.025 | 0.025 | 0.025 | 0.025 | 0.025 | 0.025 | 0.025 |
| 66 | moderate | 0.025 | 0.025 | 0.025 | 0.025 | 0.025 | 0.025 | 0.025 | 0.025 | 0.025 | 0.025 |
| 66 | high | 0.025 | 0.025 | 0.025 | 0.025 | 0.025 | 0.025 | 0.025 | 0.025 | 0.025 | 0.025 |

| Initial | Modified CIBU Sand | | | | | | | | | |
|---|---|---|---|---|---|---|---|---|---|---|
| CIBU | 20 | 24 | 25 | 26 | 27 | 31 | 32 | 33 | 34 | 35 |
| 63 | 0.025 | 0.025 | 0.025 | 0.025 | 0.025 | 0.025 | 0.025 | 0.025 | 0.025 | 0.025 |
| 63 | 0.025 | 0.025 | 0.025 | 0.025 | 0.025 | 0.025 | 0.025 | 0.025 | 0.025 | 0.025 |
| 63 | 0.025 | 0.025 | 0.025 | 0.025 | 0.025 | 0.025 | 0.025 | 0.025 | 0.025 | 0.025 |
| 64 | 0.025 | 0.025 | 0.025 | 0.025 | 0.025 | 0.025 | 0.025 | 0.025 | 0.025 | 0.025 |
| 64 | 0.025 | 0.025 | 0.025 | 0.025 | 0.025 | 0.025 | 0.025 | 0.025 | 0.025 | 0.025 |
| 64 | 0.025 | 0.025 | 0.025 | 0.025 | 0.025 | 0.025 | 0.025 | 0.025 | 0.025 | 0.025 |
| 65 | 0.025 | 0.025 | 0.025 | 0.025 | 0.025 | 0.025 | 0.025 | 0.025 | 0.025 | 0.025 |
| 65 | 0.025 | 0.025 | 0.025 | 0.025 | 0.025 | 0.025 | 0.025 | 0.025 | 0.025 | 0.025 |
| 65 | 0.025 | 0.025 | 0.025 | 0.025 | 0.025 | 0.025 | 0.025 | 0.025 | 0.025 | 0.025 |
| 66 | 0.025 | 0.025 | 0.025 | 0.025 | 0.025 | 0.025 | 0.025 | 0.025 | 0.025 | 0.025 |
| 66 | 0.025 | 0.025 | 0.025 | 0.025 | 0.025 | 0.025 | 0.025 | 0.025 | 0.025 | 0.025 |
| 66 | 0.025 | 0.025 | 0.025 | 0.025 | 0.025 | 0.025 | 0.025 | 0.025 | 0.025 | 0.025 |

TABLE C20.2.1

Probability table for Node MCIBU

| Initial | | Modified CIBU Sand | | | | | | | | | |
|---|---|---|---|---|---|---|---|---|---|---|---|
| CIBU | MAP | 40 | 41 | 42 | 43 | 44 | 45 | 49 | 50 | 51 | 52 |
| 2 | low | 0.025 | 0.025 | 0.025 | 0.025 | 0.025 | 0.025 | 0.025 | 0.025 | 0.025 | 0.025 |
| 2 | moderate | 0.025 | 0.025 | 0.025 | 0.025 | 0.025 | 0.025 | 0.025 | 0.025 | 0.025 | 0.025 |
| 2 | high | 0.025 | 0.025 | 0.025 | 0.025 | 0.025 | 0.025 | 0.025 | 0.025 | 0.025 | 0.025 |
| 7 | low | 0.025 | 0.025 | 0.025 | 0.025 | 0.025 | 0.025 | 0.025 | 0.025 | 0.025 | 0.025 |
| 7 | moderate | 0.025 | 0.025 | 0.025 | 0.025 | 0.025 | 0.025 | 0.025 | 0.025 | 0.025 | 0.025 |
| 7 | high | 0.025 | 0.025 | 0.025 | 0.025 | 0.025 | 0.025 | 0.025 | 0.025 | 0.025 | 0.025 |
| 8 | low | 0.025 | 0.025 | 0.025 | 0.025 | 0.025 | 0.025 | 0.025 | 0.025 | 0.025 | 0.025 |
| 8 | moderate | 0.025 | 0.025 | 0.025 | 0.025 | 0.025 | 0.025 | 0.025 | 0.025 | 0.025 | 0.025 |
| 8 | high | 0.025 | 0.025 | 0.025 | 0.025 | 0.025 | 0.025 | 0.025 | 0.025 | 0.025 | 0.025 |
| 9 | low | 0.025 | 0.025 | 0.025 | 0.025 | 0.025 | 0.025 | 0.025 | 0.025 | 0.025 | 0.025 |
| 9 | moderate | 0.025 | 0.025 | 0.025 | 0.025 | 0.025 | 0.025 | 0.025 | 0.025 | 0.025 | 0.025 |

TABLE C20.2.1-continued

Probability table for Node MCIBU

| | | | | | | | | | | | |
|---|---|---|---|---|---|---|---|---|---|---|---|
| 9 | high | 0.025 | 0.025 | 0.025 | 0.025 | 0.025 | 0.025 | 0.025 | 0.025 | 0.025 | 0.025 |
| 12 | low | 0.025 | 0.025 | 0.025 | 0.025 | 0.025 | 0.025 | 0.025 | 0.025 | 0.025 | 0.025 |
| 12 | moderate | 0.025 | 0.025 | 0.025 | 0.025 | 0.025 | 0.025 | 0.025 | 0.025 | 0.025 | 0.025 |
| 12 | high | 0.025 | 0.025 | 0.025 | 0.025 | 0.025 | 0.025 | 0.025 | 0.025 | 0.025 | 0.025 |
| 13 | low | 0.025 | 0.025 | 0.025 | 0.025 | 0.025 | 0.025 | 0.025 | 0.025 | 0.025 | 0.025 |
| 13 | moderate | 0.025 | 0.025 | 0.025 | 0.025 | 0.025 | 0.025 | 0.025 | 0.025 | 0.025 | 0.025 |
| 13 | high | 0.025 | 0.025 | 0.025 | 0.025 | 0.025 | 0.025 | 0.025 | 0.025 | 0.025 | 0.025 |
| 14 | low | 0.025 | 0.025 | 0.025 | 0.025 | 0.025 | 0.025 | 0.025 | 0.025 | 0.025 | 0.025 |
| 14 | moderate | 0.025 | 0.025 | 0.025 | 0.025 | 0.025 | 0.025 | 0.025 | 0.025 | 0.025 | 0.025 |
| 14 | high | 0.025 | 0.025 | 0.025 | 0.025 | 0.025 | 0.025 | 0.025 | 0.025 | 0.025 | 0.025 |
| 17 | low | 0.025 | 0.025 | 0.025 | 0.025 | 0.025 | 0.025 | 0.025 | 0.025 | 0.025 | 0.025 |
| 17 | moderate | 0.025 | 0.025 | 0.025 | 0.025 | 0.025 | 0.025 | 0.025 | 0.025 | 0.025 | 0.025 |
| 17 | high | 0.025 | 0.025 | 0.025 | 0.025 | 0.025 | 0.025 | 0.025 | 0.025 | 0.025 | 0.025 |
| 18 | low | 0.025 | 0.025 | 0.025 | 0.025 | 0.025 | 0.025 | 0.025 | 0.025 | 0.025 | 0.025 |
| 18 | moderate | 0.025 | 0.025 | 0.025 | 0.025 | 0.025 | 0.025 | 0.025 | 0.025 | 0.025 | 0.025 |
| 18 | high | 0.025 | 0.025 | 0.025 | 0.025 | 0.025 | 0.025 | 0.025 | 0.025 | 0.025 | 0.025 |
| 19 | low | 0.025 | 0.025 | 0.025 | 0.025 | 0.025 | 0.025 | 0.025 | 0.025 | 0.025 | 0.025 |
| 19 | moderate | 0.025 | 0.025 | 0.025 | 0.025 | 0.025 | 0.025 | 0.025 | 0.025 | 0.025 | 0.025 |
| 19 | high | 0.025 | 0.025 | 0.025 | 0.025 | 0.025 | 0.025 | 0.025 | 0.025 | 0.025 | 0.025 |
| 20 | low | 0.025 | 0.025 | 0.025 | 0.025 | 0.025 | 0.025 | 0.025 | 0.025 | 0.025 | 0.025 |
| 20 | moderate | 0.025 | 0.025 | 0.025 | 0.025 | 0.025 | 0.025 | 0.025 | 0.025 | 0.025 | 0.025 |
| 20 | high | 0.025 | 0.025 | 0.025 | 0.025 | 0.025 | 0.025 | 0.025 | 0.025 | 0.025 | 0.025 |
| 24 | low | 0.025 | 0.025 | 0.025 | 0.025 | 0.025 | 0.025 | 0.025 | 0.025 | 0.025 | 0.025 |
| 24 | moderate | 0.025 | 0.025 | 0.025 | 0.025 | 0.025 | 0.025 | 0.025 | 0.025 | 0.025 | 0.025 |
| 24 | high | 0.025 | 0.025 | 0.025 | 0.025 | 0.025 | 0.025 | 0.025 | 0.025 | 0.025 | 0.025 |

| Initial | Modified CIBU Sand | | | | | | | | | |
|---|---|---|---|---|---|---|---|---|---|---|
| CIBU | 53 | 54 | 55 | 60 | 61 | 62 | 63 | 64 | 65 | 66 |
| 2 | 0.025 | 0.025 | 0.025 | 0.025 | 0.025 | 0.025 | 0.025 | 0.025 | 0.025 | 0.025 |
| 2 | 0.025 | 0.025 | 0.025 | 0.025 | 0.025 | 0.025 | 0.025 | 0.025 | 0.025 | 0.025 |
| 2 | 0.025 | 0.025 | 0.025 | 0.025 | 0.025 | 0.025 | 0.025 | 0.025 | 0.025 | 0.025 |
| 7 | 0.025 | 0.025 | 0.025 | 0.025 | 0.025 | 0.025 | 0.025 | 0.025 | 0.025 | 0.025 |
| 7 | 0.025 | 0.025 | 0.025 | 0.025 | 0.025 | 0.025 | 0.025 | 0.025 | 0.025 | 0.025 |
| 7 | 0.025 | 0.025 | 0.025 | 0.025 | 0.025 | 0.025 | 0.025 | 0.025 | 0.025 | 0.025 |
| 8 | 0.025 | 0.025 | 0.025 | 0.025 | 0.025 | 0.025 | 0.025 | 0.025 | 0.025 | 0.025 |
| 8 | 0.025 | 0.025 | 0.025 | 0.025 | 0.025 | 0.025 | 0.025 | 0.025 | 0.025 | 0.025 |
| 8 | 0.025 | 0.025 | 0.025 | 0.025 | 0.025 | 0.025 | 0.025 | 0.025 | 0.025 | 0.025 |
| 9 | 0.025 | 0.025 | 0.025 | 0.025 | 0.025 | 0.025 | 0.025 | 0.025 | 0.025 | 0.025 |
| 9 | 0.025 | 0.025 | 0.025 | 0.025 | 0.025 | 0.025 | 0.025 | 0.025 | 0.025 | 0.025 |
| 9 | 0.025 | 0.025 | 0.025 | 0.025 | 0.025 | 0.025 | 0.025 | 0.025 | 0.025 | 0.025 |
| 12 | 0.025 | 0.025 | 0.025 | 0.025 | 0.025 | 0.025 | 0.025 | 0.025 | 0.025 | 0.025 |
| 12 | 0.025 | 0.025 | 0.025 | 0.025 | 0.025 | 0.025 | 0.025 | 0.025 | 0.025 | 0.025 |
| 12 | 0.025 | 0.025 | 0.025 | 0.025 | 0.025 | 0.025 | 0.025 | 0.025 | 0.025 | 0.025 |
| 13 | 0.025 | 0.025 | 0.025 | 0.025 | 0.025 | 0.025 | 0.025 | 0.025 | 0.025 | 0.025 |
| 13 | 0.025 | 0.025 | 0.025 | 0.025 | 0.025 | 0.025 | 0.025 | 0.025 | 0.025 | 0.025 |
| 13 | 0.025 | 0.025 | 0.025 | 0.025 | 0.025 | 0.025 | 0.025 | 0.025 | 0.025 | 0.025 |
| 14 | 0.025 | 0.025 | 0.025 | 0.025 | 0.025 | 0.025 | 0.025 | 0.025 | 0.025 | 0.025 |
| 14 | 0.025 | 0.025 | 0.025 | 0.025 | 0.025 | 0.025 | 0.025 | 0.025 | 0.025 | 0.025 |
| 14 | 0.025 | 0.025 | 0.025 | 0.025 | 0.025 | 0.025 | 0.025 | 0.025 | 0.025 | 0.025 |
| 17 | 0.025 | 0.025 | 0.025 | 0.025 | 0.025 | 0.025 | 0.025 | 0.025 | 0.025 | 0.025 |
| 17 | 0.025 | 0.025 | 0.025 | 0.025 | 0.025 | 0.025 | 0.025 | 0.025 | 0.025 | 0.025 |
| 17 | 0.025 | 0.025 | 0.025 | 0.025 | 0.025 | 0.025 | 0.025 | 0.025 | 0.025 | 0.025 |
| 18 | 0.025 | 0.025 | 0.025 | 0.025 | 0.025 | 0.025 | 0.025 | 0.025 | 0.025 | 0.025 |
| 18 | 0.025 | 0.025 | 0.025 | 0.025 | 0.025 | 0.025 | 0.025 | 0.025 | 0.025 | 0.025 |
| 18 | 0.025 | 0.025 | 0.025 | 0.025 | 0.025 | 0.025 | 0.025 | 0.025 | 0.025 | 0.025 |
| 19 | 0.025 | 0.025 | 0.025 | 0.025 | 0.025 | 0.025 | 0.025 | 0.025 | 0.025 | 0.025 |
| 19 | 0.025 | 0.025 | 0.025 | 0.025 | 0.025 | 0.025 | 0.025 | 0.025 | 0.025 | 0.025 |
| 19 | 0.025 | 0.025 | 0.025 | 0.025 | 0.025 | 0.025 | 0.025 | 0.025 | 0.025 | 0.025 |
| 20 | 0.025 | 0.025 | 0.025 | 0.025 | 0.025 | 0.025 | 0.025 | 0.025 | 0.025 | 0.025 |
| 20 | 0.025 | 0.025 | 0.025 | 0.025 | 0.025 | 0.025 | 0.025 | 0.025 | 0.025 | 0.025 |
| 20 | 0.025 | 0.025 | 0.025 | 0.025 | 0.025 | 0.025 | 0.025 | 0.025 | 0.025 | 0.025 |
| 24 | 0.025 | 0.025 | 0.025 | 0.025 | 0.025 | 0.025 | 0.025 | 0.025 | 0.025 | 0.025 |
| 24 | 0.025 | 0.025 | 0.025 | 0.025 | 0.025 | 0.025 | 0.025 | 0.025 | 0.025 | 0.025 |
| 24 | 0.025 | 0.025 | 0.025 | 0.025 | 0.025 | 0.025 | 0.025 | 0.025 | 0.025 | 0.025 |

TABLE C20.2.2

Probability table for Node MCIBU

| Initial CIBU | MAP | Modified CIBU Sand 40 | 41 | 42 | 43 | 44 | 45 | 49 | 50 | 51 | 52 |
|---|---|---|---|---|---|---|---|---|---|---|---|
| 25 | low | 0.025 | 0.025 | 0.025 | 0.025 | 0.025 | 0.025 | 0.025 | 0.025 | 0.025 | 0.025 |
| 25 | moderate | 0.025 | 0.025 | 0.025 | 0.025 | 0.025 | 0.025 | 0.025 | 0.025 | 0.025 | 0.025 |
| 25 | high | 0.025 | 0.025 | 0.025 | 0.025 | 0.025 | 0.025 | 0.025 | 0.025 | 0.025 | 0.025 |
| 26 | low | 0.025 | 0.025 | 0.025 | 0.025 | 0.025 | 0.025 | 0.025 | 0.025 | 0.025 | 0.025 |
| 26 | moderate | 0.025 | 0.025 | 0.025 | 0.025 | 0.025 | 0.025 | 0.025 | 0.025 | 0.025 | 0.025 |
| 26 | high | 0.025 | 0.025 | 0.025 | 0.025 | 0.025 | 0.025 | 0.025 | 0.025 | 0.025 | 0.025 |
| 27 | low | 0.025 | 0.025 | 0.025 | 0.025 | 0.025 | 0.025 | 0.025 | 0.025 | 0.025 | 0.025 |
| 27 | moderate | 0.025 | 0.025 | 0.025 | 0.025 | 0.025 | 0.025 | 0.025 | 0.025 | 0.025 | 0.025 |
| 27 | high | 0.025 | 0.025 | 0.025 | 0.025 | 0.025 | 0.025 | 0.025 | 0.025 | 0.025 | 0.025 |
| 31 | low | 0.025 | 0.025 | 0.025 | 0.025 | 0.025 | 0.025 | 0.025 | 0.025 | 0.025 | 0.025 |
| 31 | moderate | 0.025 | 0.025 | 0.025 | 0.025 | 0.025 | 0.025 | 0.025 | 0.025 | 0.025 | 0.025 |
| 31 | high | 0.025 | 0.025 | 0.025 | 0.025 | 0.025 | 0.025 | 0.025 | 0.025 | 0.025 | 0.025 |
| 32 | low | 0.025 | 0.025 | 0.025 | 0.025 | 0.025 | 0.025 | 0.025 | 0.025 | 0.025 | 0.025 |
| 32 | moderate | 0.025 | 0.025 | 0.025 | 0.025 | 0.025 | 0.025 | 0.025 | 0.025 | 0.025 | 0.025 |
| 32 | high | 0.025 | 0.025 | 0.025 | 0.025 | 0.025 | 0.025 | 0.025 | 0.025 | 0.025 | 0.025 |
| 33 | low | 0.025 | 0.025 | 0.025 | 0.025 | 0.025 | 0.025 | 0.025 | 0.025 | 0.025 | 0.025 |
| 33 | moderate | 0.025 | 0.025 | 0.025 | 0.025 | 0.025 | 0.025 | 0.025 | 0.025 | 0.025 | 0.025 |
| 33 | high | 0.025 | 0.025 | 0.025 | 0.025 | 0.025 | 0.025 | 0.025 | 0.025 | 0.025 | 0.025 |
| 34 | low | 0.025 | 0.025 | 0.025 | 0.025 | 0.025 | 0.025 | 0.025 | 0.025 | 0.025 | 0.025 |
| 34 | moderate | 0.025 | 0.025 | 0.025 | 0.025 | 0.025 | 0.025 | 0.025 | 0.025 | 0.025 | 0.025 |
| 34 | high | 0.025 | 0.025 | 0.025 | 0.025 | 0.025 | 0.025 | 0.025 | 0.025 | 0.025 | 0.025 |
| 35 | low | 0.025 | 0.025 | 0.025 | 0.025 | 0.025 | 0.025 | 0.025 | 0.025 | 0.025 | 0.025 |
| 35 | moderate | 0.025 | 0.025 | 0.025 | 0.025 | 0.025 | 0.025 | 0.025 | 0.025 | 0.025 | 0.025 |
| 35 | high | 0.025 | 0.025 | 0.025 | 0.025 | 0.025 | 0.025 | 0.025 | 0.025 | 0.025 | 0.025 |
| 40 | low | 0.025 | 0.025 | 0.025 | 0.025 | 0.025 | 0.025 | 0.025 | 0.025 | 0.025 | 0.025 |
| 40 | moderate | 0.025 | 0.025 | 0.025 | 0.025 | 0.025 | 0.025 | 0.025 | 0.025 | 0.025 | 0.025 |
| 40 | high | 0.025 | 0.025 | 0.025 | 0.025 | 0.025 | 0.025 | 0.025 | 0.025 | 0.025 | 0.025 |
| 41 | low | 0.025 | 0.025 | 0.025 | 0.025 | 0.025 | 0.025 | 0.025 | 0.025 | 0.025 | 0.025 |
| 41 | moderate | 0.025 | 0.025 | 0.025 | 0.025 | 0.025 | 0.025 | 0.025 | 0.025 | 0.025 | 0.025 |
| 41 | high | 0.025 | 0.025 | 0.025 | 0.025 | 0.025 | 0.025 | 0.025 | 0.025 | 0.025 | 0.025 |
| 42 | low | 0.025 | 0.025 | 0.025 | 0.025 | 0.025 | 0.025 | 0.025 | 0.025 | 0.025 | 0.025 |
| 42 | moderate | 0.025 | 0.025 | 0.025 | 0.025 | 0.025 | 0.025 | 0.025 | 0.025 | 0.025 | 0.025 |
| 42 | high | 0.025 | 0.025 | 0.025 | 0.025 | 0.025 | 0.025 | 0.025 | 0.025 | 0.025 | 0.025 |
| 43 | low | 0.025 | 0.025 | 0.025 | 0.025 | 0.025 | 0.025 | 0.025 | 0.025 | 0.025 | 0.025 |
| 43 | moderate | 0.025 | 0.025 | 0.025 | 0.025 | 0.025 | 0.025 | 0.025 | 0.025 | 0.025 | 0.025 |
| 43 | high | 0.025 | 0.025 | 0.025 | 0.025 | 0.025 | 0.025 | 0.025 | 0.025 | 0.025 | 0.025 |

| Initial CIBU | Modified CIBU Sand 53 | 54 | 55 | 60 | 61 | 62 | 63 | 64 | 65 | 66 |
|---|---|---|---|---|---|---|---|---|---|---|
| 25 | 0.025 | 0.025 | 0.025 | 0.025 | 0.025 | 0.025 | 0.025 | 0.025 | 0.025 | 0.025 |
| 25 | 0.025 | 0.025 | 0.025 | 0.025 | 0.025 | 0.025 | 0.025 | 0.025 | 0.025 | 0.025 |
| 25 | 0.025 | 0.025 | 0.025 | 0.025 | 0.025 | 0.025 | 0.025 | 0.025 | 0.025 | 0.025 |
| 26 | 0.025 | 0.025 | 0.025 | 0.025 | 0.025 | 0.025 | 0.025 | 0.025 | 0.025 | 0.025 |
| 26 | 0.025 | 0.025 | 0.025 | 0.025 | 0.025 | 0.025 | 0.025 | 0.025 | 0.025 | 0.025 |
| 26 | 0.025 | 0.025 | 0.025 | 0.025 | 0.025 | 0.025 | 0.025 | 0.025 | 0.025 | 0.025 |
| 27 | 0.025 | 0.025 | 0.025 | 0.025 | 0.025 | 0.025 | 0.025 | 0.025 | 0.025 | 0.025 |
| 27 | 0.025 | 0.025 | 0.025 | 0.025 | 0.025 | 0.025 | 0.025 | 0.025 | 0.025 | 0.025 |
| 27 | 0.025 | 0.025 | 0.025 | 0.025 | 0.025 | 0.025 | 0.025 | 0.025 | 0.025 | 0.025 |
| 31 | 0.025 | 0.025 | 0.025 | 0.025 | 0.025 | 0.025 | 0.025 | 0.025 | 0.025 | 0.025 |
| 31 | 0.025 | 0.025 | 0.025 | 0.025 | 0.025 | 0.025 | 0.025 | 0.025 | 0.025 | 0.025 |
| 31 | 0.025 | 0.025 | 0.025 | 0.025 | 0.025 | 0.025 | 0.025 | 0.025 | 0.025 | 0.025 |
| 32 | 0.025 | 0.025 | 0.025 | 0.025 | 0.025 | 0.025 | 0.025 | 0.025 | 0.025 | 0.025 |
| 32 | 0.025 | 0.025 | 0.025 | 0.025 | 0.025 | 0.025 | 0.025 | 0.025 | 0.025 | 0.025 |
| 32 | 0.025 | 0.025 | 0.025 | 0.025 | 0.025 | 0.025 | 0.025 | 0.025 | 0.025 | 0.025 |
| 33 | 0.025 | 0.025 | 0.025 | 0.025 | 0.025 | 0.025 | 0.025 | 0.025 | 0.025 | 0.025 |
| 33 | 0.025 | 0.025 | 0.025 | 0.025 | 0.025 | 0.025 | 0.025 | 0.025 | 0.025 | 0.025 |
| 33 | 0.025 | 0.025 | 0.025 | 0.025 | 0.025 | 0.025 | 0.025 | 0.025 | 0.025 | 0.025 |
| 34 | 0.025 | 0.025 | 0.025 | 0.025 | 0.025 | 0.025 | 0.025 | 0.025 | 0.025 | 0.025 |
| 34 | 0.025 | 0.025 | 0.025 | 0.025 | 0.025 | 0.025 | 0.025 | 0.025 | 0.025 | 0.025 |
| 34 | 0.025 | 0.025 | 0.025 | 0.025 | 0.025 | 0.025 | 0.025 | 0.025 | 0.025 | 0.025 |
| 35 | 0.025 | 0.025 | 0.025 | 0.025 | 0.025 | 0.025 | 0.025 | 0.025 | 0.025 | 0.025 |
| 35 | 0.025 | 0.025 | 0.025 | 0.025 | 0.025 | 0.025 | 0.025 | 0.025 | 0.025 | 0.025 |
| 35 | 0.025 | 0.025 | 0.025 | 0.025 | 0.025 | 0.025 | 0.025 | 0.025 | 0.025 | 0.025 |
| 40 | 0.025 | 0.025 | 0.025 | 0.025 | 0.025 | 0.025 | 0.025 | 0.025 | 0.025 | 0.025 |
| 40 | 0.025 | 0.025 | 0.025 | 0.025 | 0.025 | 0.025 | 0.025 | 0.025 | 0.025 | 0.025 |
| 40 | 0.025 | 0.025 | 0.025 | 0.025 | 0.025 | 0.025 | 0.025 | 0.025 | 0.025 | 0.025 |
| 41 | 0.025 | 0.025 | 0.025 | 0.025 | 0.025 | 0.025 | 0.025 | 0.025 | 0.025 | 0.025 |
| 41 | 0.025 | 0.025 | 0.025 | 0.025 | 0.025 | 0.025 | 0.025 | 0.025 | 0.025 | 0.025 |
| 41 | 0.025 | 0.025 | 0.025 | 0.025 | 0.025 | 0.025 | 0.025 | 0.025 | 0.025 | 0.025 |
| 42 | 0.025 | 0.025 | 0.025 | 0.025 | 0.025 | 0.025 | 0.025 | 0.025 | 0.025 | 0.025 |
| 42 | 0.025 | 0.025 | 0.025 | 0.025 | 0.025 | 0.025 | 0.025 | 0.025 | 0.025 | 0.025 |

TABLE C20.2.2-continued

Probability table for Node MCIBU

| | | | | | | | | | | |
|---|---|---|---|---|---|---|---|---|---|---|
| 42 | 0.025 | 0.025 | 0.025 | 0.025 | 0.025 | 0.025 | 0.025 | 0.025 | 0.025 | 0.025 |
| 43 | 0.025 | 0.025 | 0.025 | 0.025 | 0.025 | 0.025 | 0.025 | 0.025 | 0.025 | 0.025 |
| 43 | 0.025 | 0.025 | 0.025 | 0.025 | 0.025 | 0.025 | 0.025 | 0.025 | 0.025 | 0.025 |
| 43 | 0.025 | 0.025 | 0.025 | 0.025 | 0.025 | 0.025 | 0.025 | 0.025 | 0.025 | 0.025 |

TABLE C20.2.3

Probability table for Node MCIBU

| Initial | | Modified CIBU Sand | | | | | | | | | |
|---|---|---|---|---|---|---|---|---|---|---|---|
| CIBU | MAP | 40 | 41 | 42 | 43 | 44 | 45 | 49 | 50 | 51 | 52 |
| 44 | low | 0.025 | 0.025 | 0.025 | 0.025 | 0.025 | 0.025 | 0.025 | 0.025 | 0.025 | 0.025 |
| 44 | moderate | 0.025 | 0.025 | 0.025 | 0.025 | 0.025 | 0.025 | 0.025 | 0.025 | 0.025 | 0.025 |
| 44 | high | 0.025 | 0.025 | 0.025 | 0.025 | 0.025 | 0.025 | 0.025 | 0.025 | 0.025 | 0.025 |
| 45 | low | 0.025 | 0.025 | 0.025 | 0.025 | 0.025 | 0.025 | 0.025 | 0.025 | 0.025 | 0.025 |
| 45 | moderate | 0.025 | 0.025 | 0.025 | 0.025 | 0.025 | 0.025 | 0.025 | 0.025 | 0.025 | 0.025 |
| 45 | high | 0.025 | 0.025 | 0.025 | 0.025 | 0.025 | 0.025 | 0.025 | 0.025 | 0.025 | 0.025 |
| 49 | low | 0.025 | 0.025 | 0.025 | 0.025 | 0.025 | 0.025 | 0.025 | 0.025 | 0.025 | 0.025 |
| 49 | moderate | 0.025 | 0.025 | 0.025 | 0.025 | 0.025 | 0.025 | 0.025 | 0.025 | 0.025 | 0.025 |
| 49 | high | 0.025 | 0.025 | 0.025 | 0.025 | 0.025 | 0.025 | 0.025 | 0.025 | 0.025 | 0.025 |
| 50 | low | 0.025 | 0.025 | 0.025 | 0.025 | 0.025 | 0.025 | 0.025 | 0.025 | 0.025 | 0.025 |
| 50 | moderate | 0.025 | 0.025 | 0.025 | 0.025 | 0.025 | 0.025 | 0.025 | 0.025 | 0.025 | 0.025 |
| 50 | high | 0.025 | 0.025 | 0.025 | 0.025 | 0.025 | 0.025 | 0.025 | 0.025 | 0.025 | 0.025 |
| 51 | low | 0.025 | 0.025 | 0.025 | 0.025 | 0.025 | 0.025 | 0.025 | 0.025 | 0.025 | 0.025 |
| 51 | moderate | 0.025 | 0.025 | 0.025 | 0.025 | 0.025 | 0.025 | 0.025 | 0.025 | 0.025 | 0.025 |
| 51 | high | 0.025 | 0.025 | 0.025 | 0.025 | 0.025 | 0.025 | 0.025 | 0.025 | 0.025 | 0.025 |
| 52 | low | 0.025 | 0.025 | 0.025 | 0.025 | 0.025 | 0.025 | 0.025 | 0.025 | 0.025 | 0.025 |
| 52 | moderate | 0.025 | 0.025 | 0.025 | 0.025 | 0.025 | 0.025 | 0.025 | 0.025 | 0.025 | 0.025 |
| 52 | high | 0.025 | 0.025 | 0.025 | 0.025 | 0.025 | 0.025 | 0.025 | 0.025 | 0.025 | 0.025 |
| 53 | low | 0.025 | 0.025 | 0.025 | 0.025 | 0.025 | 0.025 | 0.025 | 0.025 | 0.025 | 0.025 |
| 53 | moderate | 0.025 | 0.025 | 0.025 | 0.025 | 0.025 | 0.025 | 0.025 | 0.025 | 0.025 | 0.025 |
| 53 | high | 0.025 | 0.025 | 0.025 | 0.025 | 0.025 | 0.025 | 0.025 | 0.025 | 0.025 | 0.025 |
| 54 | low | 0.025 | 0.025 | 0.025 | 0.025 | 0.025 | 0.025 | 0.025 | 0.025 | 0.025 | 0.025 |
| 54 | moderate | 0.025 | 0.025 | 0.025 | 0.025 | 0.025 | 0.025 | 0.025 | 0.025 | 0.025 | 0.025 |
| 54 | high | 0.025 | 0.025 | 0.025 | 0.025 | 0.025 | 0.025 | 0.025 | 0.025 | 0.025 | 0.025 |
| 55 | low | 0.025 | 0.025 | 0.025 | 0.025 | 0.025 | 0.025 | 0.025 | 0.025 | 0.025 | 0.025 |
| 55 | moderate | 0.025 | 0.025 | 0.025 | 0.025 | 0.025 | 0.025 | 0.025 | 0.025 | 0.025 | 0.025 |
| 55 | high | 0.025 | 0.025 | 0.025 | 0.025 | 0.025 | 0.025 | 0.025 | 0.025 | 0.025 | 0.025 |
| 60 | low | 0.025 | 0.025 | 0.025 | 0.025 | 0.025 | 0.025 | 0.025 | 0.025 | 0.025 | 0.025 |
| 60 | moderate | 0.025 | 0.025 | 0.025 | 0.025 | 0.025 | 0.025 | 0.025 | 0.025 | 0.025 | 0.025 |
| 60 | high | 0.025 | 0.025 | 0.025 | 0.025 | 0.025 | 0.025 | 0.025 | 0.025 | 0.025 | 0.025 |
| 61 | low | 0.025 | 0.025 | 0.025 | 0.025 | 0.025 | 0.025 | 0.025 | 0.025 | 0.025 | 0.025 |
| 61 | moderate | 0.025 | 0.025 | 0.025 | 0.025 | 0.025 | 0.025 | 0.025 | 0.025 | 0.025 | 0.025 |
| 61 | high | 0.025 | 0.025 | 0.025 | 0.025 | 0.025 | 0.025 | 0.025 | 0.025 | 0.025 | 0.025 |
| 62 | low | 0.025 | 0.025 | 0.025 | 0.025 | 0.025 | 0.025 | 0.025 | 0.025 | 0.025 | 0.025 |
| 62 | moderate | 0.025 | 0.025 | 0.025 | 0.025 | 0.025 | 0.025 | 0.025 | 0.025 | 0.025 | 0.025 |
| 62 | high | 0.025 | 0.025 | 0.025 | 0.025 | 0.025 | 0.025 | 0.025 | 0.025 | 0.025 | 0.025 |

| Initial | Modified CIBU Sand | | | | | | | | | |
|---|---|---|---|---|---|---|---|---|---|---|
| CIBU | 53 | 54 | 55 | 60 | 61 | 62 | 63 | 64 | 65 | 66 |
| 44 | 0.025 | 0.025 | 0.025 | 0.025 | 0.025 | 0.025 | 0.025 | 0.025 | 0.025 | 0.025 |
| 44 | 0.025 | 0.025 | 0.025 | 0.025 | 0.025 | 0.025 | 0.025 | 0.025 | 0.025 | 0.025 |
| 44 | 0.025 | 0.025 | 0.025 | 0.025 | 0.025 | 0.025 | 0.025 | 0.025 | 0.025 | 0.025 |
| 45 | 0.025 | 0.025 | 0.025 | 0.025 | 0.025 | 0.025 | 0.025 | 0.025 | 0.025 | 0.025 |
| 45 | 0.025 | 0.025 | 0.025 | 0.025 | 0.025 | 0.025 | 0.025 | 0.025 | 0.025 | 0.025 |
| 45 | 0.025 | 0.025 | 0.025 | 0.025 | 0.025 | 0.025 | 0.025 | 0.025 | 0.025 | 0.025 |
| 49 | 0.025 | 0.025 | 0.025 | 0.025 | 0.025 | 0.025 | 0.025 | 0.025 | 0.025 | 0.025 |
| 49 | 0.025 | 0.025 | 0.025 | 0.025 | 0.025 | 0.025 | 0.025 | 0.025 | 0.025 | 0.025 |
| 49 | 0.025 | 0.025 | 0.025 | 0.025 | 0.025 | 0.025 | 0.025 | 0.025 | 0.025 | 0.025 |
| 50 | 0.025 | 0.025 | 0.025 | 0.025 | 0.025 | 0.025 | 0.025 | 0.025 | 0.025 | 0.025 |
| 50 | 0.025 | 0.025 | 0.025 | 0.025 | 0.025 | 0.025 | 0.025 | 0.025 | 0.025 | 0.025 |
| 50 | 0.025 | 0.025 | 0.025 | 0.025 | 0.025 | 0.025 | 0.025 | 0.025 | 0.025 | 0.025 |
| 51 | 0.025 | 0.025 | 0.025 | 0.025 | 0.025 | 0.025 | 0.025 | 0.025 | 0.025 | 0.025 |
| 51 | 0.025 | 0.025 | 0.025 | 0.025 | 0.025 | 0.025 | 0.025 | 0.025 | 0.025 | 0.025 |
| 51 | 0.025 | 0.025 | 0.025 | 0.025 | 0.025 | 0.025 | 0.025 | 0.025 | 0.025 | 0.025 |
| 52 | 0.025 | 0.025 | 0.025 | 0.025 | 0.025 | 0.025 | 0.025 | 0.025 | 0.025 | 0.025 |
| 52 | 0.025 | 0.025 | 0.025 | 0.025 | 0.025 | 0.025 | 0.025 | 0.025 | 0.025 | 0.025 |
| 52 | 0.025 | 0.025 | 0.025 | 0.025 | 0.025 | 0.025 | 0.025 | 0.025 | 0.025 | 0.025 |
| 53 | 0.025 | 0.025 | 0.025 | 0.025 | 0.025 | 0.025 | 0.025 | 0.025 | 0.025 | 0.025 |
| 53 | 0.025 | 0.025 | 0.025 | 0.025 | 0.025 | 0.025 | 0.025 | 0.025 | 0.025 | 0.025 |

TABLE C20.2.3-continued

Probability table for Node MCIBU

| | | | | | | | | | | |
|---|---|---|---|---|---|---|---|---|---|---|
| 53 | 0.025 | 0.025 | 0.025 | 0.025 | 0.025 | 0.025 | 0.025 | 0.025 | 0.025 | 0.025 |
| 54 | 0.025 | 0.025 | 0.025 | 0.025 | 0.025 | 0.025 | 0.025 | 0.025 | 0.025 | 0.025 |
| 54 | 0.025 | 0.025 | 0.025 | 0.025 | 0.025 | 0.025 | 0.025 | 0.025 | 0.025 | 0.025 |
| 54 | 0.025 | 0.025 | 0.025 | 0.025 | 0.025 | 0.025 | 0.025 | 0.025 | 0.025 | 0.025 |
| 55 | 0.025 | 0.025 | 0.025 | 0.025 | 0.025 | 0.025 | 0.025 | 0.025 | 0.025 | 0.025 |
| 55 | 0.025 | 0.025 | 0.025 | 0.025 | 0.025 | 0.025 | 0.025 | 0.025 | 0.025 | 0.025 |
| 55 | 0.025 | 0.025 | 0.025 | 0.025 | 0.025 | 0.025 | 0.025 | 0.025 | 0.025 | 0.025 |
| 60 | 0.025 | 0.025 | 0.025 | 0.025 | 0.025 | 0.025 | 0.025 | 0.025 | 0.025 | 0.025 |
| 60 | 0.025 | 0.025 | 0.025 | 0.025 | 0.025 | 0.025 | 0.025 | 0.025 | 0.025 | 0.025 |
| 60 | 0.025 | 0.025 | 0.025 | 0.025 | 0.025 | 0.025 | 0.025 | 0.025 | 0.025 | 0.025 |
| 61 | 0.025 | 0.025 | 0.025 | 0.025 | 0.025 | 0.025 | 0.025 | 0.025 | 0.025 | 0.025 |
| 61 | 0.025 | 0.025 | 0.025 | 0.025 | 0.025 | 0.025 | 0.025 | 0.025 | 0.025 | 0.025 |
| 61 | 0.025 | 0.025 | 0.025 | 0.025 | 0.025 | 0.025 | 0.025 | 0.025 | 0.025 | 0.025 |
| 62 | 0.025 | 0.025 | 0.025 | 0.025 | 0.025 | 0.025 | 0.025 | 0.025 | 0.025 | 0.025 |
| 62 | 0.025 | 0.025 | 0.025 | 0.025 | 0.025 | 0.025 | 0.025 | 0.025 | 0.025 | 0.025 |
| 62 | 0.025 | 0.025 | 0.025 | 0.025 | 0.025 | 0.025 | 0.025 | 0.025 | 0.025 | 0.025 |

TABLE C20.2.4

Probability table for Node MCIBU

| Initial | | Modified CIBU Sand | | | | | | | | | |
|---|---|---|---|---|---|---|---|---|---|---|---|
| CIBU | MAP | 40 | 41 | 42 | 43 | 44 | 45 | 49 | 50 | 51 | 52 |
| 63 | low | 0.025 | 0.025 | 0.025 | 0.025 | 0.025 | 0.025 | 0.025 | 0.025 | 0.025 | 0.025 |
| 63 | moderate | 0.025 | 0.025 | 0.025 | 0.025 | 0.025 | 0.025 | 0.025 | 0.025 | 0.025 | 0.025 |
| 63 | high | 0.025 | 0.025 | 0.025 | 0.025 | 0.025 | 0.025 | 0.025 | 0.025 | 0.025 | 0.025 |
| 64 | low | 0.025 | 0.025 | 0.025 | 0.025 | 0.025 | 0.025 | 0.025 | 0.025 | 0.025 | 0.025 |
| 64 | moderate | 0.025 | 0.025 | 0.025 | 0.025 | 0.025 | 0.025 | 0.025 | 0.025 | 0.025 | 0.025 |
| 64 | high | 0.025 | 0.025 | 0.025 | 0.025 | 0.025 | 0.025 | 0.025 | 0.025 | 0.025 | 0.025 |
| 65 | low | 0.025 | 0.025 | 0.025 | 0.025 | 0.025 | 0.025 | 0.025 | 0.025 | 0.025 | 0.025 |
| 65 | moderate | 0.025 | 0.025 | 0.025 | 0.025 | 0.025 | 0.025 | 0.025 | 0.025 | 0.025 | 0.025 |
| 65 | high | 0.025 | 0.025 | 0.025 | 0.025 | 0.025 | 0.025 | 0.025 | 0.025 | 0.025 | 0.025 |
| 66 | low | 0.025 | 0.025 | 0.025 | 0.025 | 0.025 | 0.025 | 0.025 | 0.025 | 0.025 | 0.025 |
| 66 | moderate | 0.025 | 0.025 | 0.025 | 0.025 | 0.025 | 0.025 | 0.025 | 0.025 | 0.025 | 0.025 |
| 66 | high | 0.025 | 0.025 | 0.025 | 0.025 | 0.025 | 0.025 | 0.025 | 0.025 | 0.025 | 0.025 |

| Initial | Modified CIBU Sand | | | | | | | | | |
|---|---|---|---|---|---|---|---|---|---|---|
| CIBU | 53 | 54 | 55 | 60 | 61 | 62 | 63 | 64 | 65 | 66 |
| 63 | 0.025 | 0.025 | 0.025 | 0.025 | 0.025 | 0.025 | 0.025 | 0.025 | 0.025 | 0.025 |
| 63 | 0.025 | 0.025 | 0.025 | 0.025 | 0.025 | 0.025 | 0.025 | 0.025 | 0.025 | 0.025 |
| 63 | 0.025 | 0.025 | 0.025 | 0.025 | 0.025 | 0.025 | 0.025 | 0.025 | 0.025 | 0.025 |
| 64 | 0.025 | 0.025 | 0.025 | 0.025 | 0.025 | 0.025 | 0.025 | 0.025 | 0.025 | 0.025 |
| 64 | 0.025 | 0.025 | 0.025 | 0.025 | 0.025 | 0.025 | 0.025 | 0.025 | 0.025 | 0.025 |
| 64 | 0.025 | 0.025 | 0.025 | 0.025 | 0.025 | 0.025 | 0.025 | 0.025 | 0.025 | 0.025 |
| 65 | 0.025 | 0.025 | 0.025 | 0.025 | 0.025 | 0.025 | 0.025 | 0.025 | 0.025 | 0.025 |
| 65 | 0.025 | 0.025 | 0.025 | 0.025 | 0.025 | 0.025 | 0.025 | 0.025 | 0.025 | 0.025 |
| 65 | 0.025 | 0.025 | 0.025 | 0.025 | 0.025 | 0.025 | 0.025 | 0.025 | 0.025 | 0.025 |
| 66 | 0.025 | 0.025 | 0.025 | 0.025 | 0.025 | 0.025 | 0.025 | 0.025 | 0.025 | 0.025 |
| 66 | 0.025 | 0.025 | 0.025 | 0.025 | 0.025 | 0.025 | 0.025 | 0.025 | 0.025 | 0.025 |
| 66 | 0.025 | 0.025 | 0.025 | 0.025 | 0.025 | 0.025 | 0.025 | 0.025 | 0.025 | 0.025 |

TABLE C21.1.1

Probability table for Node MCAMBU

| Initial | | Modified CAMBU Sand | | | | | | | | | |
|---|---|---|---|---|---|---|---|---|---|---|---|
| CAMBU | MAP | 5 | 8 | 12 | 14 | 18 | 19 | 20 | 21 | 24 | 25 |
| 5 | low | 0.031 | 0.031 | 0.031 | 0.031 | 0.031 | 0.031 | 0.031 | 0.031 | 0.031 | 0.031 |
| 5 | moderate | 0.031 | 0.031 | 0.031 | 0.031 | 0.031 | 0.031 | 0.031 | 0.031 | 0.031 | 0.031 |
| 5 | high | 0.031 | 0.031 | 0.031 | 0.031 | 0.031 | 0.031 | 0.031 | 0.031 | 0.031 | 0.031 |
| 8 | low | 0.031 | 0.031 | 0.031 | 0.031 | 0.031 | 0.031 | 0.031 | 0.031 | 0.031 | 0.031 |
| 8 | moderate | 0.031 | 0.031 | 0.031 | 0.031 | 0.031 | 0.031 | 0.031 | 0.031 | 0.031 | 0.031 |
| 8 | high | 0.031 | 0.031 | 0.031 | 0.031 | 0.031 | 0.031 | 0.031 | 0.031 | 0.031 | 0.031 |
| 12 | low | 0.031 | 0.031 | 0.031 | 0.031 | 0.031 | 0.031 | 0.031 | 0.031 | 0.031 | 0.031 |
| 12 | moderate | 0.031 | 0.031 | 0.031 | 0.031 | 0.031 | 0.031 | 0.031 | 0.031 | 0.031 | 0.031 |
| 12 | high | 0.031 | 0.031 | 0.031 | 0.031 | 0.031 | 0.031 | 0.031 | 0.031 | 0.031 | 0.031 |

TABLE C21.1.1-continued

Probability table for Node MCAMBU

| | | | | | | | | | | | |
|---|---|---|---|---|---|---|---|---|---|---|---|
| 14 | low | 0.031 | 0.031 | 0.031 | 0.031 | 0.031 | 0.031 | 0.031 | 0.031 | 0.031 | 0.031 |
| 14 | moderate | 0.031 | 0.031 | 0.031 | 0.031 | 0.031 | 0.031 | 0.031 | 0.031 | 0.031 | 0.031 |
| 14 | high | 0.031 | 0.031 | 0.031 | 0.031 | 0.031 | 0.031 | 0.031 | 0.031 | 0.031 | 0.031 |
| 18 | low | 0.031 | 0.031 | 0.031 | 0.031 | 0.031 | 0.031 | 0.031 | 0.031 | 0.031 | 0.031 |
| 18 | moderate | 0.031 | 0.031 | 0.031 | 0.031 | 0.031 | 0.031 | 0.031 | 0.031 | 0.031 | 0.031 |
| 18 | high | 0.031 | 0.031 | 0.031 | 0.031 | 0.031 | 0.031 | 0.031 | 0.031 | 0.031 | 0.031 |
| 19 | low | 0.031 | 0.031 | 0.031 | 0.031 | 0.031 | 0.031 | 0.031 | 0.031 | 0.031 | 0.031 |
| 19 | moderate | 0.031 | 0.031 | 0.031 | 0.031 | 0.031 | 0.031 | 0.031 | 0.031 | 0.031 | 0.031 |
| 19 | high | 0.031 | 0.031 | 0.031 | 0.031 | 0.031 | 0.031 | 0.031 | 0.031 | 0.031 | 0.031 |
| 20 | low | 0.031 | 0.031 | 0.031 | 0.031 | 0.031 | 0.031 | 0.031 | 0.031 | 0.031 | 0.031 |
| 20 | moderate | 0.031 | 0.031 | 0.031 | 0.031 | 0.031 | 0.031 | 0.031 | 0.031 | 0.031 | 0.031 |
| 20 | high | 0.031 | 0.031 | 0.031 | 0.031 | 0.031 | 0.031 | 0.031 | 0.031 | 0.031 | 0.031 |
| 21 | low | 0.031 | 0.031 | 0.031 | 0.031 | 0.031 | 0.031 | 0.031 | 0.031 | 0.031 | 0.031 |
| 21 | moderate | 0.031 | 0.031 | 0.031 | 0.031 | 0.031 | 0.031 | 0.031 | 0.031 | 0.031 | 0.031 |
| 21 | high | 0.031 | 0.031 | 0.031 | 0.031 | 0.031 | 0.031 | 0.031 | 0.031 | 0.031 | 0.031 |
| 24 | low | 0.031 | 0.031 | 0.031 | 0.031 | 0.031 | 0.031 | 0.031 | 0.031 | 0.031 | 0.031 |
| 24 | moderate | 0.031 | 0.031 | 0.031 | 0.031 | 0.031 | 0.031 | 0.031 | 0.031 | 0.031 | 0.031 |
| 24 | high | 0.031 | 0.031 | 0.031 | 0.031 | 0.031 | 0.031 | 0.031 | 0.031 | 0.031 | 0.031 |
| 25 | low | 0.031 | 0.031 | 0.031 | 0.031 | 0.031 | 0.031 | 0.031 | 0.031 | 0.031 | 0.031 |
| 25 | moderate | 0.031 | 0.031 | 0.031 | 0.031 | 0.031 | 0.031 | 0.031 | 0.031 | 0.031 | 0.031 |
| 25 | high | 0.031 | 0.031 | 0.031 | 0.031 | 0.031 | 0.031 | 0.031 | 0.031 | 0.031 | 0.031 |
| 26 | low | 0.031 | 0.031 | 0.031 | 0.031 | 0.031 | 0.031 | 0.031 | 0.031 | 0.031 | 0.031 |
| 26 | moderate | 0.031 | 0.031 | 0.031 | 0.031 | 0.031 | 0.031 | 0.031 | 0.031 | 0.031 | 0.031 |
| 26 | high | 0.031 | 0.031 | 0.031 | 0.031 | 0.031 | 0.031 | 0.031 | 0.031 | 0.031 | 0.031 |
| 27 | low | 0.031 | 0.031 | 0.031 | 0.031 | 0.031 | 0.031 | 0.031 | 0.031 | 0.031 | 0.031 |
| 27 | moderate | 0.031 | 0.031 | 0.031 | 0.031 | 0.031 | 0.031 | 0.031 | 0.031 | 0.031 | 0.031 |
| 27 | high | 0.031 | 0.031 | 0.031 | 0.031 | 0.031 | 0.031 | 0.031 | 0.031 | 0.031 | 0.031 |

| Initial | Modified CAMBU Sand | | | | | | | | | |
|---|---|---|---|---|---|---|---|---|---|---|
| CAMBU | 26 | 27 | 28 | 31 | 32 | 33 | 34 | 35 | 36 | 41 |
| 5 | 0.031 | 0.031 | 0.031 | 0.031 | 0.031 | 0.031 | 0.031 | 0.031 | 0.031 | 0.031 |
| 5 | 0.031 | 0.031 | 0.031 | 0.031 | 0.031 | 0.031 | 0.031 | 0.031 | 0.031 | 0.031 |
| 5 | 0.031 | 0.031 | 0.031 | 0.031 | 0.031 | 0.031 | 0.031 | 0.031 | 0.031 | 0.031 |
| 8 | 0.031 | 0.031 | 0.031 | 0.031 | 0.031 | 0.031 | 0.031 | 0.031 | 0.031 | 0.031 |
| 8 | 0.031 | 0.031 | 0.031 | 0.031 | 0.031 | 0.031 | 0.031 | 0.031 | 0.031 | 0.031 |
| 8 | 0.031 | 0.031 | 0.031 | 0.031 | 0.031 | 0.031 | 0.031 | 0.031 | 0.031 | 0.031 |
| 12 | 0.031 | 0.031 | 0.031 | 0.031 | 0.031 | 0.031 | 0.031 | 0.031 | 0.031 | 0.031 |
| 12 | 0.031 | 0.031 | 0.031 | 0.031 | 0.031 | 0.031 | 0.031 | 0.031 | 0.031 | 0.031 |
| 12 | 0.031 | 0.031 | 0.031 | 0.031 | 0.031 | 0.031 | 0.031 | 0.031 | 0.031 | 0.031 |
| 14 | 0.031 | 0.031 | 0.031 | 0.031 | 0.031 | 0.031 | 0.031 | 0.031 | 0.031 | 0.031 |
| 14 | 0.031 | 0.031 | 0.031 | 0.031 | 0.031 | 0.031 | 0.031 | 0.031 | 0.031 | 0.031 |
| 14 | 0.031 | 0.031 | 0.031 | 0.031 | 0.031 | 0.031 | 0.031 | 0.031 | 0.031 | 0.031 |
| 18 | 0.031 | 0.031 | 0.031 | 0.031 | 0.031 | 0.031 | 0.031 | 0.031 | 0.031 | 0.031 |
| 18 | 0.031 | 0.031 | 0.031 | 0.031 | 0.031 | 0.031 | 0.031 | 0.031 | 0.031 | 0.031 |
| 18 | 0.031 | 0.031 | 0.031 | 0.031 | 0.031 | 0.031 | 0.031 | 0.031 | 0.031 | 0.031 |
| 19 | 0.031 | 0.031 | 0.031 | 0.031 | 0.031 | 0.031 | 0.031 | 0.031 | 0.031 | 0.031 |
| 19 | 0.031 | 0.031 | 0.031 | 0.031 | 0.031 | 0.031 | 0.031 | 0.031 | 0.031 | 0.031 |
| 19 | 0.031 | 0.031 | 0.031 | 0.031 | 0.031 | 0.031 | 0.031 | 0.031 | 0.031 | 0.031 |
| 20 | 0.031 | 0.031 | 0.031 | 0.031 | 0.031 | 0.031 | 0.031 | 0.031 | 0.031 | 0.031 |
| 20 | 0.031 | 0.031 | 0.031 | 0.031 | 0.031 | 0.031 | 0.031 | 0.031 | 0.031 | 0.031 |
| 20 | 0.031 | 0.031 | 0.031 | 0.031 | 0.031 | 0.031 | 0.031 | 0.031 | 0.031 | 0.031 |
| 21 | 0.031 | 0.031 | 0.031 | 0.031 | 0.031 | 0.031 | 0.031 | 0.031 | 0.031 | 0.031 |
| 21 | 0.031 | 0.031 | 0.031 | 0.031 | 0.031 | 0.031 | 0.031 | 0.031 | 0.031 | 0.031 |
| 21 | 0.031 | 0.031 | 0.031 | 0.031 | 0.031 | 0.031 | 0.031 | 0.031 | 0.031 | 0.031 |
| 24 | 0.031 | 0.031 | 0.031 | 0.031 | 0.031 | 0.031 | 0.031 | 0.031 | 0.031 | 0.031 |
| 24 | 0.031 | 0.031 | 0.031 | 0.031 | 0.031 | 0.031 | 0.031 | 0.031 | 0.031 | 0.031 |
| 24 | 0.031 | 0.031 | 0.031 | 0.031 | 0.031 | 0.031 | 0.031 | 0.031 | 0.031 | 0.031 |
| 25 | 0.031 | 0.031 | 0.031 | 0.031 | 0.031 | 0.031 | 0.031 | 0.031 | 0.031 | 0.031 |
| 25 | 0.031 | 0.031 | 0.031 | 0.031 | 0.031 | 0.031 | 0.031 | 0.031 | 0.031 | 0.031 |
| 25 | 0.031 | 0.031 | 0.031 | 0.031 | 0.031 | 0.031 | 0.031 | 0.031 | 0.031 | 0.031 |
| 26 | 0.031 | 0.031 | 0.031 | 0.031 | 0.031 | 0.031 | 0.031 | 0.031 | 0.031 | 0.031 |
| 26 | 0.031 | 0.031 | 0.031 | 0.031 | 0.031 | 0.031 | 0.031 | 0.031 | 0.031 | 0.031 |
| 26 | 0.031 | 0.031 | 0.031 | 0.031 | 0.031 | 0.031 | 0.031 | 0.031 | 0.031 | 0.031 |
| 27 | 0.031 | 0.031 | 0.031 | 0.031 | 0.031 | 0.031 | 0.031 | 0.031 | 0.031 | 0.031 |
| 27 | 0.031 | 0.031 | 0.031 | 0.031 | 0.031 | 0.031 | 0.031 | 0.031 | 0.031 | 0.031 |
| 27 | 0.031 | 0.031 | 0.031 | 0.031 | 0.031 | 0.031 | 0.031 | 0.031 | 0.031 | 0.031 |

TABLE C21.1.2

Probability table for Node MCAMBU

| Initial CAMBU | MAP | Modified CAMBU Sand 5 | 8 | 12 | 14 | 18 | 19 | 20 | 21 | 24 | 25 |
|---|---|---|---|---|---|---|---|---|---|---|---|
| 28 | low | 0.031 | 0.031 | 0.031 | 0.031 | 0.031 | 0.031 | 0.031 | 0.031 | 0.031 | 0.031 |
| 28 | moderate | 0.031 | 0.031 | 0.031 | 0.031 | 0.031 | 0.031 | 0.031 | 0.031 | 0.031 | 0.031 |
| 28 | high | 0.031 | 0.031 | 0.031 | 0.031 | 0.031 | 0.031 | 0.031 | 0.031 | 0.031 | 0.031 |
| 31 | low | 0.031 | 0.031 | 0.031 | 0.031 | 0.031 | 0.031 | 0.031 | 0.031 | 0.031 | 0.031 |
| 31 | moderate | 0.031 | 0.031 | 0.031 | 0.031 | 0.031 | 0.031 | 0.031 | 0.031 | 0.031 | 0.031 |
| 31 | high | 0.031 | 0.031 | 0.031 | 0.031 | 0.031 | 0.031 | 0.031 | 0.031 | 0.031 | 0.031 |
| 32 | low | 0.031 | 0.031 | 0.031 | 0.031 | 0.031 | 0.031 | 0.031 | 0.031 | 0.031 | 0.031 |
| 32 | moderate | 0.031 | 0.031 | 0.031 | 0.031 | 0.031 | 0.031 | 0.031 | 0.031 | 0.031 | 0.031 |
| 32 | high | 0.031 | 0.031 | 0.031 | 0.031 | 0.031 | 0.031 | 0.031 | 0.031 | 0.031 | 0.031 |
| 33 | low | 0.031 | 0.031 | 0.031 | 0.031 | 0.031 | 0.031 | 0.031 | 0.031 | 0.031 | 0.031 |
| 33 | moderate | 0.031 | 0.031 | 0.031 | 0.031 | 0.031 | 0.031 | 0.031 | 0.031 | 0.031 | 0.031 |
| 33 | high | 0.031 | 0.031 | 0.031 | 0.031 | 0.031 | 0.031 | 0.031 | 0.031 | 0.031 | 0.031 |
| 34 | low | 0.031 | 0.031 | 0.031 | 0.031 | 0.031 | 0.031 | 0.031 | 0.031 | 0.031 | 0.031 |
| 34 | moderate | 0.031 | 0.031 | 0.031 | 0.031 | 0.031 | 0.031 | 0.031 | 0.031 | 0.031 | 0.031 |
| 34 | high | 0.031 | 0.031 | 0.031 | 0.031 | 0.031 | 0.031 | 0.031 | 0.031 | 0.031 | 0.031 |
| 35 | low | 0.031 | 0.031 | 0.031 | 0.031 | 0.031 | 0.031 | 0.031 | 0.031 | 0.031 | 0.031 |
| 35 | moderate | 0.031 | 0.031 | 0.031 | 0.031 | 0.031 | 0.031 | 0.031 | 0.031 | 0.031 | 0.031 |
| 35 | high | 0.031 | 0.031 | 0.031 | 0.031 | 0.031 | 0.031 | 0.031 | 0.031 | 0.031 | 0.031 |
| 36 | low | 0.031 | 0.031 | 0.031 | 0.031 | 0.031 | 0.031 | 0.031 | 0.031 | 0.031 | 0.031 |
| 36 | moderate | 0.031 | 0.031 | 0.031 | 0.031 | 0.031 | 0.031 | 0.031 | 0.031 | 0.031 | 0.031 |
| 36 | high | 0.031 | 0.031 | 0.031 | 0.031 | 0.031 | 0.031 | 0.031 | 0.031 | 0.031 | 0.031 |
| 41 | low | 0.031 | 0.031 | 0.031 | 0.031 | 0.031 | 0.031 | 0.031 | 0.031 | 0.031 | 0.031 |
| 41 | moderate | 0.031 | 0.031 | 0.031 | 0.031 | 0.031 | 0.031 | 0.031 | 0.031 | 0.031 | 0.031 |
| 41 | high | 0.031 | 0.031 | 0.031 | 0.031 | 0.031 | 0.031 | 0.031 | 0.031 | 0.031 | 0.031 |
| 42 | low | 0.031 | 0.031 | 0.031 | 0.031 | 0.031 | 0.031 | 0.031 | 0.031 | 0.031 | 0.031 |
| 42 | moderate | 0.031 | 0.031 | 0.031 | 0.031 | 0.031 | 0.031 | 0.031 | 0.031 | 0.031 | 0.031 |
| 42 | high | 0.031 | 0.031 | 0.031 | 0.031 | 0.031 | 0.031 | 0.031 | 0.031 | 0.031 | 0.031 |
| 43 | low | 0.031 | 0.031 | 0.031 | 0.031 | 0.031 | 0.031 | 0.031 | 0.031 | 0.031 | 0.031 |
| 43 | moderate | 0.031 | 0.031 | 0.031 | 0.031 | 0.031 | 0.031 | 0.031 | 0.031 | 0.031 | 0.031 |
| 43 | high | 0.031 | 0.031 | 0.031 | 0.031 | 0.031 | 0.031 | 0.031 | 0.031 | 0.031 | 0.031 |
| 44 | low | 0.031 | 0.031 | 0.031 | 0.031 | 0.031 | 0.031 | 0.031 | 0.031 | 0.031 | 0.031 |
| 44 | moderate | 0.031 | 0.031 | 0.031 | 0.031 | 0.031 | 0.031 | 0.031 | 0.031 | 0.031 | 0.031 |
| 44 | high | 0.031 | 0.031 | 0.031 | 0.031 | 0.031 | 0.031 | 0.031 | 0.031 | 0.031 | 0.031 |
| 45 | low | 0.031 | 0.031 | 0.031 | 0.031 | 0.031 | 0.031 | 0.031 | 0.031 | 0.031 | 0.031 |
| 45 | moderate | 0.031 | 0.031 | 0.031 | 0.031 | 0.031 | 0.031 | 0.031 | 0.031 | 0.031 | 0.031 |
| 45 | high | 0.031 | 0.031 | 0.031 | 0.031 | 0.031 | 0.031 | 0.031 | 0.031 | 0.031 | 0.031 |

| Initial CAMBU | Modified CAMBU Sand 26 | 27 | 28 | 31 | 32 | 33 | 34 | 35 | 36 | 41 |
|---|---|---|---|---|---|---|---|---|---|---|
| 28 | 0.031 | 0.031 | 0.031 | 0.031 | 0.031 | 0.031 | 0.031 | 0.031 | 0.031 | 0.031 |
| 28 | 0.031 | 0.031 | 0.031 | 0.031 | 0.031 | 0.031 | 0.031 | 0.031 | 0.031 | 0.031 |
| 28 | 0.031 | 0.031 | 0.031 | 0.031 | 0.031 | 0.031 | 0.031 | 0.031 | 0.031 | 0.031 |
| 31 | 0.031 | 0.031 | 0.031 | 0.031 | 0.031 | 0.031 | 0.031 | 0.031 | 0.031 | 0.031 |
| 31 | 0.031 | 0.031 | 0.031 | 0.031 | 0.031 | 0.031 | 0.031 | 0.031 | 0.031 | 0.031 |
| 31 | 0.031 | 0.031 | 0.031 | 0.031 | 0.031 | 0.031 | 0.031 | 0.031 | 0.031 | 0.031 |
| 32 | 0.031 | 0.031 | 0.031 | 0.031 | 0.031 | 0.031 | 0.031 | 0.031 | 0.031 | 0.031 |
| 32 | 0.031 | 0.031 | 0.031 | 0.031 | 0.031 | 0.031 | 0.031 | 0.031 | 0.031 | 0.031 |
| 32 | 0.031 | 0.031 | 0.031 | 0.031 | 0.031 | 0.031 | 0.031 | 0.031 | 0.031 | 0.031 |
| 33 | 0.031 | 0.031 | 0.031 | 0.031 | 0.031 | 0.031 | 0.031 | 0.031 | 0.031 | 0.031 |
| 33 | 0.031 | 0.031 | 0.031 | 0.031 | 0.031 | 0.031 | 0.031 | 0.031 | 0.031 | 0.031 |
| 33 | 0.031 | 0.031 | 0.031 | 0.031 | 0.031 | 0.031 | 0.031 | 0.031 | 0.031 | 0.031 |
| 34 | 0.031 | 0.031 | 0.031 | 0.031 | 0.031 | 0.031 | 0.031 | 0.031 | 0.031 | 0.031 |
| 34 | 0.031 | 0.031 | 0.031 | 0.031 | 0.031 | 0.031 | 0.031 | 0.031 | 0.031 | 0.031 |
| 34 | 0.031 | 0.031 | 0.031 | 0.031 | 0.031 | 0.031 | 0.031 | 0.031 | 0.031 | 0.031 |
| 35 | 0.031 | 0.031 | 0.031 | 0.031 | 0.031 | 0.031 | 0.031 | 0.031 | 0.031 | 0.031 |
| 35 | 0.031 | 0.031 | 0.031 | 0.031 | 0.031 | 0.031 | 0.031 | 0.031 | 0.031 | 0.031 |
| 35 | 0.031 | 0.031 | 0.031 | 0.031 | 0.031 | 0.031 | 0.031 | 0.031 | 0.031 | 0.031 |
| 36 | 0.031 | 0.031 | 0.031 | 0.031 | 0.031 | 0.031 | 0.031 | 0.031 | 0.031 | 0.031 |
| 36 | 0.031 | 0.031 | 0.031 | 0.031 | 0.031 | 0.031 | 0.031 | 0.031 | 0.031 | 0.031 |
| 36 | 0.031 | 0.031 | 0.031 | 0.031 | 0.031 | 0.031 | 0.031 | 0.031 | 0.031 | 0.031 |
| 41 | 0.031 | 0.031 | 0.031 | 0.031 | 0.031 | 0.031 | 0.031 | 0.031 | 0.031 | 0.031 |
| 41 | 0.031 | 0.031 | 0.031 | 0.031 | 0.031 | 0.031 | 0.031 | 0.031 | 0.031 | 0.031 |
| 41 | 0.031 | 0.031 | 0.031 | 0.031 | 0.031 | 0.031 | 0.031 | 0.031 | 0.031 | 0.031 |
| 42 | 0.031 | 0.031 | 0.031 | 0.031 | 0.031 | 0.031 | 0.031 | 0.031 | 0.031 | 0.031 |
| 42 | 0.031 | 0.031 | 0.031 | 0.031 | 0.031 | 0.031 | 0.031 | 0.031 | 0.031 | 0.031 |
| 42 | 0.031 | 0.031 | 0.031 | 0.031 | 0.031 | 0.031 | 0.031 | 0.031 | 0.031 | 0.031 |
| 43 | 0.031 | 0.031 | 0.031 | 0.031 | 0.031 | 0.031 | 0.031 | 0.031 | 0.031 | 0.031 |
| 43 | 0.031 | 0.031 | 0.031 | 0.031 | 0.031 | 0.031 | 0.031 | 0.031 | 0.031 | 0.031 |
| 43 | 0.031 | 0.031 | 0.031 | 0.031 | 0.031 | 0.031 | 0.031 | 0.031 | 0.031 | 0.031 |
| 44 | 0.031 | 0.031 | 0.031 | 0.031 | 0.031 | 0.031 | 0.031 | 0.031 | 0.031 | 0.031 |
| 44 | 0.031 | 0.031 | 0.031 | 0.031 | 0.031 | 0.031 | 0.031 | 0.031 | 0.031 | 0.031 |

TABLE C21.1.2-continued

| Probability table for Node MCAMBU | | | | | | | | | | | |
|---|---|---|---|---|---|---|---|---|---|---|---|
| | 44 | 0.031 | 0.031 | 0.031 | 0.031 | 0.031 | 0.031 | 0.031 | 0.031 | 0.031 | 0.031 |
| | 45 | 0.031 | 0.031 | 0.031 | 0.031 | 0.031 | 0.031 | 0.031 | 0.031 | 0.031 | 0.031 |
| | 45 | 0.031 | 0.031 | 0.031 | 0.031 | 0.031 | 0.031 | 0.031 | 0.031 | 0.031 | 0.031 |
| | 45 | 0.031 | 0.031 | 0.031 | 0.031 | 0.031 | 0.031 | 0.031 | 0.031 | 0.031 | 0.031 |

TABLE C21.1.3

Probability table for Node MCAMBU

| Initial CAMBU | MAP | Modified CAMBU Sand 5 | 8 | 12 | 14 | 18 | 19 | 20 | 21 | 24 | 25 |
|---|---|---|---|---|---|---|---|---|---|---|---|
| 51 | low | 0.031 | 0.031 | 0.031 | 0.031 | 0.031 | 0.031 | 0.031 | 0.031 | 0.031 | 0.031 |
| 51 | moderate | 0.031 | 0.031 | 0.031 | 0.031 | 0.031 | 0.031 | 0.031 | 0.031 | 0.031 | 0.031 |
| 51 | high | 0.031 | 0.031 | 0.031 | 0.031 | 0.031 | 0.031 | 0.031 | 0.031 | 0.031 | 0.031 |
| 52 | low | 0.031 | 0.031 | 0.031 | 0.031 | 0.031 | 0.031 | 0.031 | 0.031 | 0.031 | 0.031 |
| 52 | moderate | 0.031 | 0.031 | 0.031 | 0.031 | 0.031 | 0.031 | 0.031 | 0.031 | 0.031 | 0.031 |
| 52 | high | 0.031 | 0.031 | 0.031 | 0.031 | 0.031 | 0.031 | 0.031 | 0.031 | 0.031 | 0.031 |
| 53 | low | 0.031 | 0.031 | 0.031 | 0.031 | 0.031 | 0.031 | 0.031 | 0.031 | 0.031 | 0.031 |
| 53 | moderate | 0.031 | 0.031 | 0.031 | 0.031 | 0.031 | 0.031 | 0.031 | 0.031 | 0.031 | 0.031 |
| 53 | high | 0.031 | 0.031 | 0.031 | 0.031 | 0.031 | 0.031 | 0.031 | 0.031 | 0.031 | 0.031 |
| 54 | low | 0.031 | 0.031 | 0.031 | 0.031 | 0.031 | 0.031 | 0.031 | 0.031 | 0.031 | 0.031 |
| 54 | moderate | 0.031 | 0.031 | 0.031 | 0.031 | 0.031 | 0.031 | 0.031 | 0.031 | 0.031 | 0.031 |
| 54 | high | 0.031 | 0.031 | 0.031 | 0.031 | 0.031 | 0.031 | 0.031 | 0.031 | 0.031 | 0.031 |
| 55 | low | 0.031 | 0.031 | 0.031 | 0.031 | 0.031 | 0.031 | 0.031 | 0.031 | 0.031 | 0.031 |
| 55 | moderate | 0.031 | 0.031 | 0.031 | 0.031 | 0.031 | 0.031 | 0.031 | 0.031 | 0.031 | 0.031 |
| 55 | high | 0.031 | 0.031 | 0.031 | 0.031 | 0.031 | 0.031 | 0.031 | 0.031 | 0.031 | 0.031 |
| 62 | low | 0.031 | 0.031 | 0.031 | 0.031 | 0.031 | 0.031 | 0.031 | 0.031 | 0.031 | 0.031 |
| 62 | moderate | 0.031 | 0.031 | 0.031 | 0.031 | 0.031 | 0.031 | 0.031 | 0.031 | 0.031 | 0.031 |
| 62 | high | 0.031 | 0.031 | 0.031 | 0.031 | 0.031 | 0.031 | 0.031 | 0.031 | 0.031 | 0.031 |
| 63 | low | 0.031 | 0.031 | 0.031 | 0.031 | 0.031 | 0.031 | 0.031 | 0.031 | 0.031 | 0.031 |
| 63 | moderate | 0.031 | 0.031 | 0.031 | 0.031 | 0.031 | 0.031 | 0.031 | 0.031 | 0.031 | 0.031 |
| 63 | high | 0.031 | 0.031 | 0.031 | 0.031 | 0.031 | 0.031 | 0.031 | 0.031 | 0.031 | 0.031 |
| 64 | low | 0.031 | 0.031 | 0.031 | 0.031 | 0.031 | 0.031 | 0.031 | 0.031 | 0.031 | 0.031 |
| 64 | moderate | 0.031 | 0.031 | 0.031 | 0.031 | 0.031 | 0.031 | 0.031 | 0.031 | 0.031 | 0.031 |
| 64 | high | 0.031 | 0.031 | 0.031 | 0.031 | 0.031 | 0.031 | 0.031 | 0.031 | 0.031 | 0.031 |

| | Initial CAMBU | Modified CAMBU Sand 26 | 27 | 28 | 31 | 32 | 33 | 34 | 35 | 36 | 41 |
|---|---|---|---|---|---|---|---|---|---|---|---|
| | 51 | 0.031 | 0.031 | 0.031 | 0.031 | 0.031 | 0.031 | 0.031 | 0.031 | 0.031 | 0.031 |
| | 51 | 0.031 | 0.031 | 0.031 | 0.031 | 0.031 | 0.031 | 0.031 | 0.031 | 0.031 | 0.031 |
| | 51 | 0.031 | 0.031 | 0.031 | 0.031 | 0.031 | 0.031 | 0.031 | 0.031 | 0.031 | 0.031 |
| | 52 | 0.031 | 0.031 | 0.031 | 0.031 | 0.031 | 0.031 | 0.031 | 0.031 | 0.031 | 0.031 |
| | 52 | 0.031 | 0.031 | 0.031 | 0.031 | 0.031 | 0.031 | 0.031 | 0.031 | 0.031 | 0.031 |
| | 52 | 0.031 | 0.031 | 0.031 | 0.031 | 0.031 | 0.031 | 0.031 | 0.031 | 0.031 | 0.031 |
| | 53 | 0.031 | 0.031 | 0.031 | 0.031 | 0.031 | 0.031 | 0.031 | 0.031 | 0.031 | 0.031 |
| | 53 | 0.031 | 0.031 | 0.031 | 0.031 | 0.031 | 0.031 | 0.031 | 0.031 | 0.031 | 0.031 |
| | 53 | 0.031 | 0.031 | 0.031 | 0.031 | 0.031 | 0.031 | 0.031 | 0.031 | 0.031 | 0.031 |
| | 54 | 0.031 | 0.031 | 0.031 | 0.031 | 0.031 | 0.031 | 0.031 | 0.031 | 0.031 | 0.031 |
| | 54 | 0.031 | 0.031 | 0.031 | 0.031 | 0.031 | 0.031 | 0.031 | 0.031 | 0.031 | 0.031 |
| | 54 | 0.031 | 0.031 | 0.031 | 0.031 | 0.031 | 0.031 | 0.031 | 0.031 | 0.031 | 0.031 |
| | 55 | 0.031 | 0.031 | 0.031 | 0.031 | 0.031 | 0.031 | 0.031 | 0.031 | 0.031 | 0.031 |
| | 55 | 0.031 | 0.031 | 0.031 | 0.031 | 0.031 | 0.031 | 0.031 | 0.031 | 0.031 | 0.031 |
| | 55 | 0.031 | 0.031 | 0.031 | 0.031 | 0.031 | 0.031 | 0.031 | 0.031 | 0.031 | 0.031 |
| | 62 | 0.031 | 0.031 | 0.031 | 0.031 | 0.031 | 0.031 | 0.031 | 0.031 | 0.031 | 0.031 |
| | 62 | 0.031 | 0.031 | 0.031 | 0.031 | 0.031 | 0.031 | 0.031 | 0.031 | 0.031 | 0.031 |
| | 62 | 0.031 | 0.031 | 0.031 | 0.031 | 0.031 | 0.031 | 0.031 | 0.031 | 0.031 | 0.031 |
| | 63 | 0.031 | 0.031 | 0.031 | 0.031 | 0.031 | 0.031 | 0.031 | 0.031 | 0.031 | 0.031 |
| | 63 | 0.031 | 0.031 | 0.031 | 0.031 | 0.031 | 0.031 | 0.031 | 0.031 | 0.031 | 0.031 |
| | 63 | 0.031 | 0.031 | 0.031 | 0.031 | 0.031 | 0.031 | 0.031 | 0.031 | 0.031 | 0.031 |
| | 64 | 0.031 | 0.031 | 0.031 | 0.031 | 0.031 | 0.031 | 0.031 | 0.031 | 0.031 | 0.031 |
| | 64 | 0.031 | 0.031 | 0.031 | 0.031 | 0.031 | 0.031 | 0.031 | 0.031 | 0.031 | 0.031 |
| | 64 | 0.031 | 0.031 | 0.031 | 0.031 | 0.031 | 0.031 | 0.031 | 0.031 | 0.031 | 0.031 |

TABLE C21.2.1

Probability table for Node MCAMBU

| Initial CAMBU | MAP | Modified CAMBU Sand 42 | 43 | 44 | 45 | 51 | 52 | 53 | 54 | 55 | 62 | 63 | 64 |
|---|---|---|---|---|---|---|---|---|---|---|---|---|---|
| 5 | low | 0.031 | 0.031 | 0.031 | 0.031 | 0.031 | 0.031 | 0.031 | 0.031 | 0.031 | 0.031 | 0.031 | 0.031 |
| 5 | moderate | 0.031 | 0.031 | 0.031 | 0.031 | 0.031 | 0.031 | 0.031 | 0.031 | 0.031 | 0.031 | 0.031 | 0.031 |
| 5 | high | 0.031 | 0.031 | 0.031 | 0.031 | 0.031 | 0.031 | 0.031 | 0.031 | 0.031 | 0.031 | 0.031 | 0.031 |
| 8 | low | 0.031 | 0.031 | 0.031 | 0.031 | 0.031 | 0.031 | 0.031 | 0.031 | 0.031 | 0.031 | 0.031 | 0.031 |
| 8 | moderate | 0.031 | 0.031 | 0.031 | 0.031 | 0.031 | 0.031 | 0.031 | 0.031 | 0.031 | 0.031 | 0.031 | 0.031 |
| 8 | high | 0.031 | 0.031 | 0.031 | 0.031 | 0.031 | 0.031 | 0.031 | 0.031 | 0.031 | 0.031 | 0.031 | 0.031 |
| 12 | low | 0.031 | 0.031 | 0.031 | 0.031 | 0.031 | 0.031 | 0.031 | 0.031 | 0.031 | 0.031 | 0.031 | 0.031 |
| 12 | moderate | 0.031 | 0.031 | 0.031 | 0.031 | 0.031 | 0.031 | 0.031 | 0.031 | 0.031 | 0.031 | 0.031 | 0.031 |
| 12 | high | 0.031 | 0.031 | 0.031 | 0.031 | 0.031 | 0.031 | 0.031 | 0.031 | 0.031 | 0.031 | 0.031 | 0.031 |
| 14 | low | 0.031 | 0.031 | 0.031 | 0.031 | 0.031 | 0.031 | 0.031 | 0.031 | 0.031 | 0.031 | 0.031 | 0.031 |
| 14 | moderate | 0.031 | 0.031 | 0.031 | 0.031 | 0.031 | 0.031 | 0.031 | 0.031 | 0.031 | 0.031 | 0.031 | 0.031 |
| 14 | high | 0.031 | 0.031 | 0.031 | 0.031 | 0.031 | 0.031 | 0.031 | 0.031 | 0.031 | 0.031 | 0.031 | 0.031 |
| 18 | low | 0.031 | 0.031 | 0.031 | 0.031 | 0.031 | 0.031 | 0.031 | 0.031 | 0.031 | 0.031 | 0.031 | 0.031 |
| 18 | moderate | 0.031 | 0.031 | 0.031 | 0.031 | 0.031 | 0.031 | 0.031 | 0.031 | 0.031 | 0.031 | 0.031 | 0.031 |
| 18 | high | 0.031 | 0.031 | 0.031 | 0.031 | 0.031 | 0.031 | 0.031 | 0.031 | 0.031 | 0.031 | 0.031 | 0.031 |
| 19 | low | 0.031 | 0.031 | 0.031 | 0.031 | 0.031 | 0.031 | 0.031 | 0.031 | 0.031 | 0.031 | 0.031 | 0.031 |
| 19 | moderate | 0.031 | 0.031 | 0.031 | 0.031 | 0.031 | 0.031 | 0.031 | 0.031 | 0.031 | 0.031 | 0.031 | 0.031 |
| 19 | high | 0.031 | 0.031 | 0.031 | 0.031 | 0.031 | 0.031 | 0.031 | 0.031 | 0.031 | 0.031 | 0.031 | 0.031 |
| 20 | low | 0.031 | 0.031 | 0.031 | 0.031 | 0.031 | 0.031 | 0.031 | 0.031 | 0.031 | 0.031 | 0.031 | 0.031 |
| 20 | moderate | 0.031 | 0.031 | 0.031 | 0.031 | 0.031 | 0.031 | 0.031 | 0.031 | 0.031 | 0.031 | 0.031 | 0.031 |
| 20 | high | 0.031 | 0.031 | 0.031 | 0.031 | 0.031 | 0.031 | 0.031 | 0.031 | 0.031 | 0.031 | 0.031 | 0.031 |
| 21 | low | 0.031 | 0.031 | 0.031 | 0.031 | 0.031 | 0.031 | 0.031 | 0.031 | 0.031 | 0.031 | 0.031 | 0.031 |
| 21 | moderate | 0.031 | 0.031 | 0.031 | 0.031 | 0.031 | 0.031 | 0.031 | 0.031 | 0.031 | 0.031 | 0.031 | 0.031 |
| 21 | high | 0.031 | 0.031 | 0.031 | 0.031 | 0.031 | 0.031 | 0.031 | 0.031 | 0.031 | 0.031 | 0.031 | 0.031 |
| 24 | low | 0.031 | 0.031 | 0.031 | 0.031 | 0.031 | 0.031 | 0.031 | 0.031 | 0.031 | 0.031 | 0.031 | 0.031 |
| 24 | moderate | 0.031 | 0.031 | 0.031 | 0.031 | 0.031 | 0.031 | 0.031 | 0.031 | 0.031 | 0.031 | 0.031 | 0.031 |
| 24 | high | 0.031 | 0.031 | 0.031 | 0.031 | 0.031 | 0.031 | 0.031 | 0.031 | 0.031 | 0.031 | 0.031 | 0.031 |
| 25 | low | 0.031 | 0.031 | 0.031 | 0.031 | 0.031 | 0.031 | 0.031 | 0.031 | 0.031 | 0.031 | 0.031 | 0.031 |
| 25 | moderate | 0.031 | 0.031 | 0.031 | 0.031 | 0.031 | 0.031 | 0.031 | 0.031 | 0.031 | 0.031 | 0.031 | 0.031 |
| 25 | high | 0.031 | 0.031 | 0.031 | 0.031 | 0.031 | 0.031 | 0.031 | 0.031 | 0.031 | 0.031 | 0.031 | 0.031 |
| 26 | low | 0.031 | 0.031 | 0.031 | 0.031 | 0.031 | 0.031 | 0.031 | 0.031 | 0.031 | 0.031 | 0.031 | 0.031 |
| 26 | moderate | 0.031 | 0.031 | 0.031 | 0.031 | 0.031 | 0.031 | 0.031 | 0.031 | 0.031 | 0.031 | 0.031 | 0.031 |
| 26 | high | 0.031 | 0.031 | 0.031 | 0.031 | 0.031 | 0.031 | 0.031 | 0.031 | 0.031 | 0.031 | 0.031 | 0.031 |
| 27 | low | 0.031 | 0.031 | 0.031 | 0.031 | 0.031 | 0.031 | 0.031 | 0.031 | 0.031 | 0.031 | 0.031 | 0.031 |
| 27 | moderate | 0.031 | 0.031 | 0.031 | 0.031 | 0.031 | 0.031 | 0.031 | 0.031 | 0.031 | 0.031 | 0.031 | 0.031 |
| 27 | high | 0.031 | 0.031 | 0.031 | 0.031 | 0.031 | 0.031 | 0.031 | 0.031 | 0.031 | 0.031 | 0.031 | 0.031 |

TABLE C21.2.2

Probability table for Node MCAMBU

| Initial CAMBU | MAP | Modified CAMBU Sand 42 | 43 | 44 | 45 | 51 | 52 | 53 | 54 | 55 | 62 | 63 | 64 |
|---|---|---|---|---|---|---|---|---|---|---|---|---|---|
| 28 | low | 0.031 | 0.031 | 0.031 | 0.031 | 0.031 | 0.031 | 0.031 | 0.031 | 0.031 | 0.031 | 0.031 | 0.031 |
| 28 | moderate | 0.031 | 0.031 | 0.031 | 0.031 | 0.031 | 0.031 | 0.031 | 0.031 | 0.031 | 0.031 | 0.031 | 0.031 |
| 28 | high | 0.031 | 0.031 | 0.031 | 0.031 | 0.031 | 0.031 | 0.031 | 0.031 | 0.031 | 0.031 | 0.031 | 0.031 |
| 31 | low | 0.031 | 0.031 | 0.031 | 0.031 | 0.031 | 0.031 | 0.031 | 0.031 | 0.031 | 0.031 | 0.031 | 0.031 |
| 31 | moderate | 0.031 | 0.031 | 0.031 | 0.031 | 0.031 | 0.031 | 0.031 | 0.031 | 0.031 | 0.031 | 0.031 | 0.031 |
| 31 | high | 0.031 | 0.031 | 0.031 | 0.031 | 0.031 | 0.031 | 0.031 | 0.031 | 0.031 | 0.031 | 0.031 | 0.031 |
| 32 | low | 0.031 | 0.031 | 0.031 | 0.031 | 0.031 | 0.031 | 0.031 | 0.031 | 0.031 | 0.031 | 0.031 | 0.031 |
| 32 | moderate | 0.031 | 0.031 | 0.031 | 0.031 | 0.031 | 0.031 | 0.031 | 0.031 | 0.031 | 0.031 | 0.031 | 0.031 |
| 32 | high | 0.031 | 0.031 | 0.031 | 0.031 | 0.031 | 0.031 | 0.031 | 0.031 | 0.031 | 0.031 | 0.031 | 0.031 |
| 33 | low | 0.031 | 0.031 | 0.031 | 0.031 | 0.031 | 0.031 | 0.031 | 0.031 | 0.031 | 0.031 | 0.031 | 0.031 |
| 33 | moderate | 0.031 | 0.031 | 0.031 | 0.031 | 0.031 | 0.031 | 0.031 | 0.031 | 0.031 | 0.031 | 0.031 | 0.031 |
| 33 | high | 0.031 | 0.031 | 0.031 | 0.031 | 0.031 | 0.031 | 0.031 | 0.031 | 0.031 | 0.031 | 0.031 | 0.031 |
| 34 | low | 0.031 | 0.031 | 0.031 | 0.031 | 0.031 | 0.031 | 0.031 | 0.031 | 0.031 | 0.031 | 0.031 | 0.031 |
| 34 | moderate | 0.031 | 0.031 | 0.031 | 0.031 | 0.031 | 0.031 | 0.031 | 0.031 | 0.031 | 0.031 | 0.031 | 0.031 |
| 34 | high | 0.031 | 0.031 | 0.031 | 0.031 | 0.031 | 0.031 | 0.031 | 0.031 | 0.031 | 0.031 | 0.031 | 0.031 |
| 35 | low | 0.031 | 0.031 | 0.031 | 0.031 | 0.031 | 0.031 | 0.031 | 0.031 | 0.031 | 0.031 | 0.031 | 0.031 |
| 35 | moderate | 0.031 | 0.031 | 0.031 | 0.031 | 0.031 | 0.031 | 0.031 | 0.031 | 0.031 | 0.031 | 0.031 | 0.031 |
| 35 | high | 0.031 | 0.031 | 0.031 | 0.031 | 0.031 | 0.031 | 0.031 | 0.031 | 0.031 | 0.031 | 0.031 | 0.031 |
| 36 | low | 0.031 | 0.031 | 0.031 | 0.031 | 0.031 | 0.031 | 0.031 | 0.031 | 0.031 | 0.031 | 0.031 | 0.031 |
| 36 | moderate | 0.031 | 0.031 | 0.031 | 0.031 | 0.031 | 0.031 | 0.031 | 0.031 | 0.031 | 0.031 | 0.031 | 0.031 |
| 36 | high | 0.031 | 0.031 | 0.031 | 0.031 | 0.031 | 0.031 | 0.031 | 0.031 | 0.031 | 0.031 | 0.031 | 0.031 |
| 41 | low | 0.031 | 0.031 | 0.031 | 0.031 | 0.031 | 0.031 | 0.031 | 0.031 | 0.031 | 0.031 | 0.031 | 0.031 |
| 41 | moderate | 0.031 | 0.031 | 0.031 | 0.031 | 0.031 | 0.031 | 0.031 | 0.031 | 0.031 | 0.031 | 0.031 | 0.031 |
| 41 | high | 0.031 | 0.031 | 0.031 | 0.031 | 0.031 | 0.031 | 0.031 | 0.031 | 0.031 | 0.031 | 0.031 | 0.031 |
| 42 | low | 0.031 | 0.031 | 0.031 | 0.031 | 0.031 | 0.031 | 0.031 | 0.031 | 0.031 | 0.031 | 0.031 | 0.031 |

TABLE C21.2.2-continued

| Probability table for Node MCAMBU | | | | | | | | | | | | | |
|---|---|---|---|---|---|---|---|---|---|---|---|---|---|
| Initial | | Modified CAMBU Sand | | | | | | | | | | | |
| CAMBU | MAP | 42 | 43 | 44 | 45 | 51 | 52 | 53 | 54 | 55 | 62 | 63 | 64 |
| 42 | moderate | 0.031 | 0.031 | 0.031 | 0.031 | 0.031 | 0.031 | 0.031 | 0.031 | 0.031 | 0.031 | 0.031 | 0.031 |
| 42 | high | 0.031 | 0.031 | 0.031 | 0.031 | 0.031 | 0.031 | 0.031 | 0.031 | 0.031 | 0.031 | 0.031 | 0.031 |
| 43 | low | 0.031 | 0.031 | 0.031 | 0.031 | 0.031 | 0.031 | 0.031 | 0.031 | 0.031 | 0.031 | 0.031 | 0.031 |
| 43 | moderate | 0.031 | 0.031 | 0.031 | 0.031 | 0.031 | 0.031 | 0.031 | 0.031 | 0.031 | 0.031 | 0.031 | 0.031 |
| 43 | high | 0.031 | 0.031 | 0.031 | 0.031 | 0.031 | 0.031 | 0.031 | 0.031 | 0.031 | 0.031 | 0.031 | 0.031 |
| 44 | low | 0.031 | 0.031 | 0.031 | 0.031 | 0.031 | 0.031 | 0.031 | 0.031 | 0.031 | 0.031 | 0.031 | 0.031 |
| 44 | moderate | 0.031 | 0.031 | 0.031 | 0.031 | 0.031 | 0.031 | 0.031 | 0.031 | 0.031 | 0.031 | 0.031 | 0.031 |
| 44 | high | 0.031 | 0.031 | 0.031 | 0.031 | 0.031 | 0.031 | 0.031 | 0.031 | 0.031 | 0.031 | 0.031 | 0.031 |
| 45 | low | 0.031 | 0.031 | 0.031 | 0.031 | 0.031 | 0.031 | 0.031 | 0.031 | 0.031 | 0.031 | 0.031 | 0.031 |
| 45 | moderate | 0.031 | 0.031 | 0.031 | 0.031 | 0.031 | 0.031 | 0.031 | 0.031 | 0.031 | 0.031 | 0.031 | 0.031 |
| 45 | high | 0.031 | 0.031 | 0.031 | 0.031 | 0.031 | 0.031 | 0.031 | 0.031 | 0.031 | 0.031 | 0.031 | 0.031 |

TABLE C21.2.3

| Probability table for Node MCAMBU | | | | | | | | | | | | | |
|---|---|---|---|---|---|---|---|---|---|---|---|---|---|
| Initial | | Modified CAMBU Sand | | | | | | | | | | | |
| CAMBU | MAP | 42 | 43 | 44 | 45 | 51 | 52 | 53 | 54 | 55 | 62 | 63 | 64 |
| 51 | low | 0.031 | 0.031 | 0.031 | 0.031 | 0.031 | 0.031 | 0.031 | 0.031 | 0.031 | 0.031 | 0.031 | 0.031 |
| 51 | moderate | 0.031 | 0.031 | 0.031 | 0.031 | 0.031 | 0.031 | 0.031 | 0.031 | 0.031 | 0.031 | 0.031 | 0.031 |
| 51 | high | 0.031 | 0.031 | 0.031 | 0.031 | 0.031 | 0.031 | 0.031 | 0.031 | 0.031 | 0.031 | 0.031 | 0.031 |
| 52 | low | 0.031 | 0.031 | 0.031 | 0.031 | 0.031 | 0.031 | 0.031 | 0.031 | 0.031 | 0.031 | 0.031 | 0.031 |
| 52 | moderate | 0.031 | 0.031 | 0.031 | 0.031 | 0.031 | 0.031 | 0.031 | 0.031 | 0.031 | 0.031 | 0.031 | 0.031 |
| 52 | high | 0.031 | 0.031 | 0.031 | 0.031 | 0.031 | 0.031 | 0.031 | 0.031 | 0.031 | 0.031 | 0.031 | 0.031 |
| 53 | low | 0.031 | 0.031 | 0.031 | 0.031 | 0.031 | 0.031 | 0.031 | 0.031 | 0.031 | 0.031 | 0.031 | 0.031 |
| 53 | moderate | 0.031 | 0.031 | 0.031 | 0.031 | 0.031 | 0.031 | 0.031 | 0.031 | 0.031 | 0.031 | 0.031 | 0.031 |
| 53 | high | 0.031 | 0.031 | 0.031 | 0.031 | 0.031 | 0.031 | 0.031 | 0.031 | 0.031 | 0.031 | 0.031 | 0.031 |
| 54 | low | 0.031 | 0.031 | 0.031 | 0.031 | 0.031 | 0.031 | 0.031 | 0.031 | 0.031 | 0.031 | 0.031 | 0.031 |
| 54 | moderate | 0.031 | 0.031 | 0.031 | 0.031 | 0.031 | 0.031 | 0.031 | 0.031 | 0.031 | 0.031 | 0.031 | 0.031 |
| 54 | high | 0.031 | 0.031 | 0.031 | 0.031 | 0.031 | 0.031 | 0.031 | 0.031 | 0.031 | 0.031 | 0.031 | 0.031 |
| 55 | low | 0.031 | 0.031 | 0.031 | 0.031 | 0.031 | 0.031 | 0.031 | 0.031 | 0.031 | 0.031 | 0.031 | 0.031 |
| 55 | moderate | 0.031 | 0.031 | 0.031 | 0.031 | 0.031 | 0.031 | 0.031 | 0.031 | 0.031 | 0.031 | 0.031 | 0.031 |
| 55 | high | 0.031 | 0.031 | 0.031 | 0.031 | 0.031 | 0.031 | 0.031 | 0.031 | 0.031 | 0.031 | 0.031 | 0.031 |
| 62 | low | 0.031 | 0.031 | 0.031 | 0.031 | 0.031 | 0.031 | 0.031 | 0.031 | 0.031 | 0.031 | 0.031 | 0.031 |
| 62 | moderate | 0.031 | 0.031 | 0.031 | 0.031 | 0.031 | 0.031 | 0.031 | 0.031 | 0.031 | 0.031 | 0.031 | 0.031 |
| 62 | high | 0.031 | 0.031 | 0.031 | 0.031 | 0.031 | 0.031 | 0.031 | 0.031 | 0.031 | 0.031 | 0.031 | 0.031 |
| 63 | low | 0.031 | 0.031 | 0.031 | 0.031 | 0.031 | 0.031 | 0.031 | 0.031 | 0.031 | 0.031 | 0.031 | 0.031 |
| 63 | moderate | 0.031 | 0.031 | 0.031 | 0.031 | 0.031 | 0.031 | 0.031 | 0.031 | 0.031 | 0.031 | 0.031 | 0.031 |
| 63 | high | 0.031 | 0.031 | 0.031 | 0.031 | 0.031 | 0.031 | 0.031 | 0.031 | 0.031 | 0.031 | 0.031 | 0.031 |
| 64 | low | 0.031 | 0.031 | 0.031 | 0.031 | 0.031 | 0.031 | 0.031 | 0.031 | 0.031 | 0.031 | 0.031 | 0.031 |
| 64 | moderate | 0.031 | 0.031 | 0.031 | 0.031 | 0.031 | 0.031 | 0.031 | 0.031 | 0.031 | 0.031 | 0.031 | 0.031 |
| 64 | high | 0.031 | 0.031 | 0.031 | 0.031 | 0.031 | 0.031 | 0.031 | 0.031 | 0.031 | 0.031 | 0.031 | 0.031 |

TABLE C22.1.1

| Probability table for Node MSAMP | | | | | | | | | | | |
|---|---|---|---|---|---|---|---|---|---|---|---|
| Initial | | Modified SAMP Sand | | | | | | | | | |
| SAMP | MAP | 2 | 4 | 7 | 8 | 11 | 12 | 13 | 18 | 24 | 25 |
| 2 | low | 0.038 | 0.038 | 0.038 | 0.038 | 0.038 | 0.038 | 0.038 | 0.038 | 0.038 | 0.038 |
| 2 | moderate | 0.038 | 0.038 | 0.038 | 0.038 | 0.038 | 0.038 | 0.038 | 0.038 | 0.038 | 0.038 |
| 2 | high | 0.038 | 0.038 | 0.038 | 0.038 | 0.038 | 0.038 | 0.038 | 0.038 | 0.038 | 0.038 |
| 4 | low | 0.038 | 0.038 | 0.038 | 0.038 | 0.038 | 0.038 | 0.038 | 0.038 | 0.038 | 0.038 |
| 4 | moderate | 0.038 | 0.038 | 0.038 | 0.038 | 0.038 | 0.038 | 0.038 | 0.038 | 0.038 | 0.038 |
| 4 | high | 0.038 | 0.038 | 0.038 | 0.038 | 0.038 | 0.038 | 0.038 | 0.038 | 0.038 | 0.038 |
| 7 | low | 0.038 | 0.038 | 0.038 | 0.038 | 0.038 | 0.038 | 0.038 | 0.038 | 0.038 | 0.038 |
| 7 | moderate | 0.038 | 0.038 | 0.038 | 0.038 | 0.038 | 0.038 | 0.038 | 0.038 | 0.038 | 0.038 |
| 7 | high | 0.038 | 0.038 | 0.038 | 0.038 | 0.038 | 0.038 | 0.038 | 0.038 | 0.038 | 0.038 |
| 8 | low | 0.038 | 0.038 | 0.038 | 0.038 | 0.038 | 0.038 | 0.038 | 0.038 | 0.038 | 0.038 |
| 8 | moderate | 0.038 | 0.038 | 0.038 | 0.038 | 0.038 | 0.038 | 0.038 | 0.038 | 0.038 | 0.038 |
| 8 | high | 0.038 | 0.038 | 0.038 | 0.038 | 0.038 | 0.038 | 0.038 | 0.038 | 0.038 | 0.038 |
| 11 | low | 0.038 | 0.038 | 0.038 | 0.038 | 0.038 | 0.038 | 0.038 | 0.038 | 0.038 | 0.038 |
| 11 | moderate | 0.038 | 0.038 | 0.038 | 0.038 | 0.038 | 0.038 | 0.038 | 0.038 | 0.038 | 0.038 |
| 11 | high | 0.038 | 0.038 | 0.038 | 0.038 | 0.038 | 0.038 | 0.038 | 0.038 | 0.038 | 0.038 |

TABLE C22.1.1-continued

Probability table for Node MSAMP

| | | | | | | | | | | | |
|---|---|---|---|---|---|---|---|---|---|---|---|
| 12 | low | 0.038 | 0.038 | 0.038 | 0.038 | 0.038 | 0.038 | 0.038 | 0.038 | 0.038 | 0.038 |
| 12 | moderate | 0.038 | 0.038 | 0.038 | 0.038 | 0.038 | 0.038 | 0.038 | 0.038 | 0.038 | 0.038 |
| 12 | high | 0.038 | 0.038 | 0.038 | 0.038 | 0.038 | 0.038 | 0.038 | 0.038 | 0.038 | 0.038 |
| 13 | low | 0.038 | 0.038 | 0.038 | 0.038 | 0.038 | 0.038 | 0.038 | 0.038 | 0.038 | 0.038 |
| 13 | moderate | 0.038 | 0.038 | 0.038 | 0.038 | 0.038 | 0.038 | 0.038 | 0.038 | 0.038 | 0.038 |
| 13 | high | 0.038 | 0.038 | 0.038 | 0.038 | 0.038 | 0.038 | 0.038 | 0.038 | 0.038 | 0.038 |
| 18 | low | 0.038 | 0.038 | 0.038 | 0.038 | 0.038 | 0.038 | 0.038 | 0.038 | 0.038 | 0.038 |
| 18 | moderate | 0.038 | 0.038 | 0.038 | 0.038 | 0.038 | 0.038 | 0.038 | 0.038 | 0.038 | 0.038 |
| 18 | high | 0.038 | 0.038 | 0.038 | 0.038 | 0.038 | 0.038 | 0.038 | 0.038 | 0.038 | 0.038 |
| 24 | low | 0.038 | 0.038 | 0.038 | 0.038 | 0.038 | 0.038 | 0.038 | 0.038 | 0.038 | 0.038 |
| 24 | moderate | 0.038 | 0.038 | 0.038 | 0.038 | 0.038 | 0.038 | 0.038 | 0.038 | 0.038 | 0.038 |
| 24 | high | 0.038 | 0.038 | 0.038 | 0.038 | 0.038 | 0.038 | 0.038 | 0.038 | 0.038 | 0.038 |
| 25 | low | 0.038 | 0.038 | 0.038 | 0.038 | 0.038 | 0.038 | 0.038 | 0.038 | 0.038 | 0.038 |
| 25 | moderate | 0.038 | 0.038 | 0.038 | 0.038 | 0.038 | 0.038 | 0.038 | 0.038 | 0.038 | 0.038 |
| 25 | high | 0.038 | 0.038 | 0.038 | 0.038 | 0.038 | 0.038 | 0.038 | 0.038 | 0.038 | 0.038 |
| 26 | low | 0.038 | 0.038 | 0.038 | 0.038 | 0.038 | 0.038 | 0.038 | 0.038 | 0.038 | 0.038 |
| 26 | moderate | 0.038 | 0.038 | 0.038 | 0.038 | 0.038 | 0.038 | 0.038 | 0.038 | 0.038 | 0.038 |
| 26 | high | 0.038 | 0.038 | 0.038 | 0.038 | 0.038 | 0.038 | 0.038 | 0.038 | 0.038 | 0.038 |
| 27 | low | 0.038 | 0.038 | 0.038 | 0.038 | 0.038 | 0.038 | 0.038 | 0.038 | 0.038 | 0.038 |
| 27 | moderate | 0.038 | 0.038 | 0.038 | 0.038 | 0.038 | 0.038 | 0.038 | 0.038 | 0.038 | 0.038 |
| 27 | high | 0.038 | 0.038 | 0.038 | 0.038 | 0.038 | 0.038 | 0.038 | 0.038 | 0.038 | 0.038 |

| Initial | Modified SAMP Sand | | | | | | | | | |
|---|---|---|---|---|---|---|---|---|---|---|
| SAMP | 26 | 27 | 31 | 32 | 33 | 34 | 35 | 39 | 41 | 42 |
| 2 | 0.038 | 0.038 | 0.038 | 0.038 | 0.038 | 0.038 | 0.038 | 0.038 | 0.038 | 0.038 |
| 2 | 0.038 | 0.038 | 0.038 | 0.038 | 0.038 | 0.038 | 0.038 | 0.038 | 0.038 | 0.038 |
| 2 | 0.038 | 0.038 | 0.038 | 0.038 | 0.038 | 0.038 | 0.038 | 0.038 | 0.038 | 0.038 |
| 4 | 0.038 | 0.038 | 0.038 | 0.038 | 0.038 | 0.038 | 0.038 | 0.038 | 0.038 | 0.038 |
| 4 | 0.038 | 0.038 | 0.038 | 0.038 | 0.038 | 0.038 | 0.038 | 0.038 | 0.038 | 0.038 |
| 4 | 0.038 | 0.038 | 0.038 | 0.038 | 0.038 | 0.038 | 0.038 | 0.038 | 0.038 | 0.038 |
| 7 | 0.038 | 0.038 | 0.038 | 0.038 | 0.038 | 0.038 | 0.038 | 0.038 | 0.038 | 0.038 |
| 7 | 0.038 | 0.038 | 0.038 | 0.038 | 0.038 | 0.038 | 0.038 | 0.038 | 0.038 | 0.038 |
| 7 | 0.038 | 0.038 | 0.038 | 0.038 | 0.038 | 0.038 | 0.038 | 0.038 | 0.038 | 0.038 |
| 8 | 0.038 | 0.038 | 0.038 | 0.038 | 0.038 | 0.038 | 0.038 | 0.038 | 0.038 | 0.038 |
| 8 | 0.038 | 0.038 | 0.038 | 0.038 | 0.038 | 0.038 | 0.038 | 0.038 | 0.038 | 0.038 |
| 8 | 0.038 | 0.038 | 0.038 | 0.038 | 0.038 | 0.038 | 0.038 | 0.038 | 0.038 | 0.038 |
| 11 | 0.038 | 0.038 | 0.038 | 0.038 | 0.038 | 0.038 | 0.038 | 0.038 | 0.038 | 0.038 |
| 11 | 0.038 | 0.038 | 0.038 | 0.038 | 0.038 | 0.038 | 0.038 | 0.038 | 0.038 | 0.038 |
| 11 | 0.038 | 0.038 | 0.038 | 0.038 | 0.038 | 0.038 | 0.038 | 0.038 | 0.038 | 0.038 |
| 12 | 0.038 | 0.038 | 0.038 | 0.038 | 0.038 | 0.038 | 0.038 | 0.038 | 0.038 | 0.038 |
| 12 | 0.038 | 0.038 | 0.038 | 0.038 | 0.038 | 0.038 | 0.038 | 0.038 | 0.038 | 0.038 |
| 12 | 0.038 | 0.038 | 0.038 | 0.038 | 0.038 | 0.038 | 0.038 | 0.038 | 0.038 | 0.038 |
| 13 | 0.038 | 0.038 | 0.038 | 0.038 | 0.038 | 0.038 | 0.038 | 0.038 | 0.038 | 0.038 |
| 13 | 0.038 | 0.038 | 0.038 | 0.038 | 0.038 | 0.038 | 0.038 | 0.038 | 0.038 | 0.038 |
| 13 | 0.038 | 0.038 | 0.038 | 0.038 | 0.038 | 0.038 | 0.038 | 0.038 | 0.038 | 0.038 |
| 18 | 0.038 | 0.038 | 0.038 | 0.038 | 0.038 | 0.038 | 0.038 | 0.038 | 0.038 | 0.038 |
| 18 | 0.038 | 0.038 | 0.038 | 0.038 | 0.038 | 0.038 | 0.038 | 0.038 | 0.038 | 0.038 |
| 18 | 0.038 | 0.038 | 0.038 | 0.038 | 0.038 | 0.038 | 0.038 | 0.038 | 0.038 | 0.038 |
| 24 | 0.038 | 0.038 | 0.038 | 0.038 | 0.038 | 0.038 | 0.038 | 0.038 | 0.038 | 0.038 |
| 24 | 0.038 | 0.038 | 0.038 | 0.038 | 0.038 | 0.038 | 0.038 | 0.038 | 0.038 | 0.038 |
| 24 | 0.038 | 0.038 | 0.038 | 0.038 | 0.038 | 0.038 | 0.038 | 0.038 | 0.038 | 0.038 |
| 25 | 0.038 | 0.038 | 0.038 | 0.038 | 0.038 | 0.038 | 0.038 | 0.038 | 0.038 | 0.038 |
| 25 | 0.038 | 0.038 | 0.038 | 0.038 | 0.038 | 0.038 | 0.038 | 0.038 | 0.038 | 0.038 |
| 25 | 0.038 | 0.038 | 0.038 | 0.038 | 0.038 | 0.038 | 0.038 | 0.038 | 0.038 | 0.038 |
| 26 | 0.038 | 0.038 | 0.038 | 0.038 | 0.038 | 0.038 | 0.038 | 0.038 | 0.038 | 0.038 |
| 26 | 0.038 | 0.038 | 0.038 | 0.038 | 0.038 | 0.038 | 0.038 | 0.038 | 0.038 | 0.038 |
| 26 | 0.038 | 0.038 | 0.038 | 0.038 | 0.038 | 0.038 | 0.038 | 0.038 | 0.038 | 0.038 |
| 27 | 0.038 | 0.038 | 0.038 | 0.038 | 0.038 | 0.038 | 0.038 | 0.038 | 0.038 | 0.038 |
| 27 | 0.038 | 0.038 | 0.038 | 0.038 | 0.038 | 0.038 | 0.038 | 0.038 | 0.038 | 0.038 |
| 27 | 0.038 | 0.038 | 0.038 | 0.038 | 0.038 | 0.038 | 0.038 | 0.038 | 0.038 | 0.038 |

TABLE C22.1.2

Probability table for Node MSAMP

| Initial | | Modified SAMP Sand | | | | | | | | | |
|---|---|---|---|---|---|---|---|---|---|---|---|
| SAMP | MAP | 2 | 4 | 7 | 8 | 11 | 12 | 13 | 18 | 24 | 25 |
| 31 | low | 0.038 | 0.038 | 0.038 | 0.038 | 0.038 | 0.038 | 0.038 | 0.038 | 0.038 | 0.038 |
| 31 | moderate | 0.038 | 0.038 | 0.038 | 0.038 | 0.038 | 0.038 | 0.038 | 0.038 | 0.038 | 0.038 |
| 31 | high | 0.038 | 0.038 | 0.038 | 0.038 | 0.038 | 0.038 | 0.038 | 0.038 | 0.038 | 0.038 |

TABLE C22.1.2-continued

Probability table for Node MSAMP

| | | | | | | | | | | | |
|---|---|---|---|---|---|---|---|---|---|---|---|
| 32 | low | 0.038 | 0.038 | 0.038 | 0.038 | 0.038 | 0.038 | 0.038 | 0.038 | 0.038 | 0.038 |
| 32 | moderate | 0.038 | 0.038 | 0.038 | 0.038 | 0.038 | 0.038 | 0.038 | 0.038 | 0.038 | 0.038 |
| 32 | high | 0.038 | 0.038 | 0.038 | 0.038 | 0.038 | 0.038 | 0.038 | 0.038 | 0.038 | 0.038 |
| 33 | low | 0.038 | 0.038 | 0.038 | 0.038 | 0.038 | 0.038 | 0.038 | 0.038 | 0.038 | 0.038 |
| 33 | moderate | 0.038 | 0.038 | 0.038 | 0.038 | 0.038 | 0.038 | 0.038 | 0.038 | 0.038 | 0.038 |
| 33 | high | 0.038 | 0.038 | 0.038 | 0.038 | 0.038 | 0.038 | 0.038 | 0.038 | 0.038 | 0.038 |
| 34 | low | 0.038 | 0.038 | 0.038 | 0.038 | 0.038 | 0.038 | 0.038 | 0.038 | 0.038 | 0.038 |
| 34 | moderate | 0.038 | 0.038 | 0.038 | 0.038 | 0.038 | 0.038 | 0.038 | 0.038 | 0.038 | 0.038 |
| 34 | high | 0.038 | 0.038 | 0.038 | 0.038 | 0.038 | 0.038 | 0.038 | 0.038 | 0.038 | 0.038 |
| 35 | low | 0.038 | 0.038 | 0.038 | 0.038 | 0.038 | 0.038 | 0.038 | 0.038 | 0.038 | 0.038 |
| 35 | moderate | 0.038 | 0.038 | 0.038 | 0.038 | 0.038 | 0.038 | 0.038 | 0.038 | 0.038 | 0.038 |
| 35 | high | 0.038 | 0.038 | 0.038 | 0.038 | 0.038 | 0.038 | 0.038 | 0.038 | 0.038 | 0.038 |
| 39 | low | 0.038 | 0.038 | 0.038 | 0.038 | 0.038 | 0.038 | 0.038 | 0.038 | 0.038 | 0.038 |
| 39 | moderate | 0.038 | 0.038 | 0.038 | 0.038 | 0.038 | 0.038 | 0.038 | 0.038 | 0.038 | 0.038 |
| 39 | high | 0.038 | 0.038 | 0.038 | 0.038 | 0.038 | 0.038 | 0.038 | 0.038 | 0.038 | 0.038 |
| 41 | low | 0.038 | 0.038 | 0.038 | 0.038 | 0.038 | 0.038 | 0.038 | 0.038 | 0.038 | 0.038 |
| 41 | moderate | 0.038 | 0.038 | 0.038 | 0.038 | 0.038 | 0.038 | 0.038 | 0.038 | 0.038 | 0.038 |
| 41 | high | 0.038 | 0.038 | 0.038 | 0.038 | 0.038 | 0.038 | 0.038 | 0.038 | 0.038 | 0.038 |
| 42 | low | 0.038 | 0.038 | 0.038 | 0.038 | 0.038 | 0.038 | 0.038 | 0.038 | 0.038 | 0.038 |
| 42 | moderate | 0.038 | 0.038 | 0.038 | 0.038 | 0.038 | 0.038 | 0.038 | 0.038 | 0.038 | 0.038 |
| 42 | high | 0.038 | 0.038 | 0.038 | 0.038 | 0.038 | 0.038 | 0.038 | 0.038 | 0.038 | 0.038 |
| 43 | low | 0.038 | 0.038 | 0.038 | 0.038 | 0.038 | 0.038 | 0.038 | 0.038 | 0.038 | 0.038 |
| 43 | moderate | 0.038 | 0.038 | 0.038 | 0.038 | 0.038 | 0.038 | 0.038 | 0.038 | 0.038 | 0.038 |
| 43 | high | 0.038 | 0.038 | 0.038 | 0.038 | 0.038 | 0.038 | 0.038 | 0.038 | 0.038 | 0.038 |
| 49 | low | 0.038 | 0.038 | 0.038 | 0.038 | 0.038 | 0.038 | 0.038 | 0.038 | 0.038 | 0.038 |
| 49 | moderate | 0.038 | 0.038 | 0.038 | 0.038 | 0.038 | 0.038 | 0.038 | 0.038 | 0.038 | 0.038 |
| 49 | high | 0.038 | 0.038 | 0.038 | 0.038 | 0.038 | 0.038 | 0.038 | 0.038 | 0.038 | 0.038 |
| 50 | low | 0.038 | 0.038 | 0.038 | 0.038 | 0.038 | 0.038 | 0.038 | 0.038 | 0.038 | 0.038 |
| 50 | moderate | 0.038 | 0.038 | 0.038 | 0.038 | 0.038 | 0.038 | 0.038 | 0.038 | 0.038 | 0.038 |
| 50 | high | 0.038 | 0.038 | 0.038 | 0.038 | 0.038 | 0.038 | 0.038 | 0.038 | 0.038 | 0.038 |
| 51 | low | 0.038 | 0.038 | 0.038 | 0.038 | 0.038 | 0.038 | 0.038 | 0.038 | 0.038 | 0.038 |
| 51 | moderate | 0.038 | 0.038 | 0.038 | 0.038 | 0.038 | 0.038 | 0.038 | 0.038 | 0.038 | 0.038 |
| 51 | high | 0.038 | 0.038 | 0.038 | 0.038 | 0.038 | 0.038 | 0.038 | 0.038 | 0.038 | 0.038 |

| Initial | Modified SAMP Sand | | | | | | | | | |
|---|---|---|---|---|---|---|---|---|---|---|
| SAMP | 26 | 27 | 31 | 32 | 33 | 34 | 35 | 39 | 41 | 42 |
| 31 | 0.038 | 0.038 | 0.038 | 0.038 | 0.038 | 0.038 | 0.038 | 0.038 | 0.038 | 0.038 |
| 31 | 0.038 | 0.038 | 0.038 | 0.038 | 0.038 | 0.038 | 0.038 | 0.038 | 0.038 | 0.038 |
| 31 | 0.038 | 0.038 | 0.038 | 0.038 | 0.038 | 0.038 | 0.038 | 0.038 | 0.038 | 0.038 |
| 32 | 0.038 | 0.038 | 0.038 | 0.038 | 0.038 | 0.038 | 0.038 | 0.038 | 0.038 | 0.038 |
| 32 | 0.038 | 0.038 | 0.038 | 0.038 | 0.038 | 0.038 | 0.038 | 0.038 | 0.038 | 0.038 |
| 32 | 0.038 | 0.038 | 0.038 | 0.038 | 0.038 | 0.038 | 0.038 | 0.038 | 0.038 | 0.038 |
| 33 | 0.038 | 0.038 | 0.038 | 0.038 | 0.038 | 0.038 | 0.038 | 0.038 | 0.038 | 0.038 |
| 33 | 0.038 | 0.038 | 0.038 | 0.038 | 0.038 | 0.038 | 0.038 | 0.038 | 0.038 | 0.038 |
| 33 | 0.038 | 0.038 | 0.038 | 0.038 | 0.038 | 0.038 | 0.038 | 0.038 | 0.038 | 0.038 |
| 34 | 0.038 | 0.038 | 0.038 | 0.038 | 0.038 | 0.038 | 0.038 | 0.038 | 0.038 | 0.038 |
| 34 | 0.038 | 0.038 | 0.038 | 0.038 | 0.038 | 0.038 | 0.038 | 0.038 | 0.038 | 0.038 |
| 34 | 0.038 | 0.038 | 0.038 | 0.038 | 0.038 | 0.038 | 0.038 | 0.038 | 0.038 | 0.038 |
| 35 | 0.038 | 0.038 | 0.038 | 0.038 | 0.038 | 0.038 | 0.038 | 0.038 | 0.038 | 0.038 |
| 35 | 0.038 | 0.038 | 0.038 | 0.038 | 0.038 | 0.038 | 0.038 | 0.038 | 0.038 | 0.038 |
| 35 | 0.038 | 0.038 | 0.038 | 0.038 | 0.038 | 0.038 | 0.038 | 0.038 | 0.038 | 0.038 |
| 39 | 0.038 | 0.038 | 0.038 | 0.038 | 0.038 | 0.038 | 0.038 | 0.038 | 0.038 | 0.038 |
| 39 | 0.038 | 0.038 | 0.038 | 0.038 | 0.038 | 0.038 | 0.038 | 0.038 | 0.038 | 0.038 |
| 39 | 0.038 | 0.038 | 0.038 | 0.038 | 0.038 | 0.038 | 0.038 | 0.038 | 0.038 | 0.038 |
| 41 | 0.038 | 0.038 | 0.038 | 0.038 | 0.038 | 0.038 | 0.038 | 0.038 | 0.038 | 0.038 |
| 41 | 0.038 | 0.038 | 0.038 | 0.038 | 0.038 | 0.038 | 0.038 | 0.038 | 0.038 | 0.038 |
| 41 | 0.038 | 0.038 | 0.038 | 0.038 | 0.038 | 0.038 | 0.038 | 0.038 | 0.038 | 0.038 |
| 42 | 0.038 | 0.038 | 0.038 | 0.038 | 0.038 | 0.038 | 0.038 | 0.038 | 0.038 | 0.038 |
| 42 | 0.038 | 0.038 | 0.038 | 0.038 | 0.038 | 0.038 | 0.038 | 0.038 | 0.038 | 0.038 |
| 42 | 0.038 | 0.038 | 0.038 | 0.038 | 0.038 | 0.038 | 0.038 | 0.038 | 0.038 | 0.038 |
| 43 | 0.038 | 0.038 | 0.038 | 0.038 | 0.038 | 0.038 | 0.038 | 0.038 | 0.038 | 0.038 |
| 43 | 0.038 | 0.038 | 0.038 | 0.038 | 0.038 | 0.038 | 0.038 | 0.038 | 0.038 | 0.038 |
| 43 | 0.038 | 0.038 | 0.038 | 0.038 | 0.038 | 0.038 | 0.038 | 0.038 | 0.038 | 0.038 |
| 49 | 0.038 | 0.038 | 0.038 | 0.038 | 0.038 | 0.038 | 0.038 | 0.038 | 0.038 | 0.038 |
| 49 | 0.038 | 0.038 | 0.038 | 0.038 | 0.038 | 0.038 | 0.038 | 0.038 | 0.038 | 0.038 |
| 49 | 0.038 | 0.038 | 0.038 | 0.038 | 0.038 | 0.038 | 0.038 | 0.038 | 0.038 | 0.038 |
| 50 | 0.038 | 0.038 | 0.038 | 0.038 | 0.038 | 0.038 | 0.038 | 0.038 | 0.038 | 0.038 |
| 50 | 0.038 | 0.038 | 0.038 | 0.038 | 0.038 | 0.038 | 0.038 | 0.038 | 0.038 | 0.038 |
| 50 | 0.038 | 0.038 | 0.038 | 0.038 | 0.038 | 0.038 | 0.038 | 0.038 | 0.038 | 0.038 |
| 51 | 0.038 | 0.038 | 0.038 | 0.038 | 0.038 | 0.038 | 0.038 | 0.038 | 0.038 | 0.038 |
| 51 | 0.038 | 0.038 | 0.038 | 0.038 | 0.038 | 0.038 | 0.038 | 0.038 | 0.038 | 0.038 |
| 51 | 0.038 | 0.038 | 0.038 | 0.038 | 0.038 | 0.038 | 0.038 | 0.038 | 0.038 | 0.038 |

TABLE C22.1.3

Probability table for Node MSAMP

| Initial SAMP | MAP | Modified SAMP Sand 2 | 4 | 7 | 8 | 11 | 12 | 13 | 18 | 24 | 25 |
|---|---|---|---|---|---|---|---|---|---|---|---|
| 52 | low | 0.038 | 0.038 | 0.038 | 0.038 | 0.038 | 0.038 | 0.038 | 0.038 | 0.038 | 0.038 |
| 52 | moderate | 0.038 | 0.038 | 0.038 | 0.038 | 0.038 | 0.038 | 0.038 | 0.038 | 0.038 | 0.038 |
| 52 | high | 0.038 | 0.038 | 0.038 | 0.038 | 0.038 | 0.038 | 0.038 | 0.038 | 0.038 | 0.038 |
| 62 | low | 0.038 | 0.038 | 0.038 | 0.038 | 0.038 | 0.038 | 0.038 | 0.038 | 0.038 | 0.038 |
| 62 | moderate | 0.038 | 0.038 | 0.038 | 0.038 | 0.038 | 0.038 | 0.038 | 0.038 | 0.038 | 0.038 |
| 62 | high | 0.038 | 0.038 | 0.038 | 0.038 | 0.038 | 0.038 | 0.038 | 0.038 | 0.038 | 0.038 |

| Initial SAMP | Modified SAMP Sand 26 | 27 | 31 | 32 | 33 | 34 | 35 | 39 | 41 | 42 |
|---|---|---|---|---|---|---|---|---|---|---|
| 52 | 0.038 | 0.038 | 0.038 | 0.038 | 0.038 | 0.038 | 0.038 | 0.038 | 0.038 | 0.038 |
| 52 | 0.038 | 0.038 | 0.038 | 0.038 | 0.038 | 0.038 | 0.038 | 0.038 | 0.038 | 0.038 |
| 52 | 0.038 | 0.038 | 0.038 | 0.038 | 0.038 | 0.038 | 0.038 | 0.038 | 0.038 | 0.038 |
| 62 | 0.038 | 0.038 | 0.038 | 0.038 | 0.038 | 0.038 | 0.038 | 0.038 | 0.038 | 0.038 |
| 62 | 0.038 | 0.038 | 0.038 | 0.038 | 0.038 | 0.038 | 0.038 | 0.038 | 0.038 | 0.038 |
| 62 | 0.038 | 0.038 | 0.038 | 0.038 | 0.038 | 0.038 | 0.038 | 0.038 | 0.038 | 0.038 |

TABLE C22.2.1

Probability table for Node MSAMP

| Initial SAMP | MAP | Modified SAMP Sand 43 | 49 | 50 | 51 | 52 | 62 |
|---|---|---|---|---|---|---|---|
| 2 | low | 0.038 | 0.038 | 0.038 | 0.038 | 0.038 | 0.038 |
| 2 | moderate | 0.038 | 0.038 | 0.038 | 0.038 | 0.038 | 0.038 |
| 2 | high | 0.038 | 0.038 | 0.038 | 0.038 | 0.038 | 0.038 |
| 4 | low | 0.038 | 0.038 | 0.038 | 0.038 | 0.038 | 0.038 |
| 4 | moderate | 0.038 | 0.038 | 0.038 | 0.038 | 0.038 | 0.038 |
| 4 | high | 0.038 | 0.038 | 0.038 | 0.038 | 0.038 | 0.038 |
| 7 | low | 0.038 | 0.038 | 0.038 | 0.038 | 0.038 | 0.038 |
| 7 | moderate | 0.038 | 0.038 | 0.038 | 0.038 | 0.038 | 0.038 |
| 7 | high | 0.038 | 0.038 | 0.038 | 0.038 | 0.038 | 0.038 |
| 8 | low | 0.038 | 0.038 | 0.038 | 0.038 | 0.038 | 0.038 |
| 8 | moderate | 0.038 | 0.038 | 0.038 | 0.038 | 0.038 | 0.038 |
| 8 | high | 0.038 | 0.038 | 0.038 | 0.038 | 0.038 | 0.038 |
| 11 | low | 0.038 | 0.038 | 0.038 | 0.038 | 0.038 | 0.038 |
| 11 | moderate | 0.038 | 0.038 | 0.038 | 0.038 | 0.038 | 0.038 |
| 11 | high | 0.038 | 0.038 | 0.038 | 0.038 | 0.038 | 0.038 |
| 12 | low | 0.038 | 0.038 | 0.038 | 0.038 | 0.038 | 0.038 |
| 12 | moderate | 0.038 | 0.038 | 0.038 | 0.038 | 0.038 | 0.038 |
| 12 | high | 0.038 | 0.038 | 0.038 | 0.038 | 0.038 | 0.038 |
| 13 | low | 0.038 | 0.038 | 0.038 | 0.038 | 0.038 | 0.038 |
| 13 | moderate | 0.038 | 0.038 | 0.038 | 0.038 | 0.038 | 0.038 |
| 13 | high | 0.038 | 0.038 | 0.038 | 0.038 | 0.038 | 0.038 |
| 18 | low | 0.038 | 0.038 | 0.038 | 0.038 | 0.038 | 0.038 |
| 18 | moderate | 0.038 | 0.038 | 0.038 | 0.038 | 0.038 | 0.038 |
| 18 | high | 0.038 | 0.038 | 0.038 | 0.038 | 0.038 | 0.038 |
| 24 | low | 0.038 | 0.038 | 0.038 | 0.038 | 0.038 | 0.038 |
| 24 | moderate | 0.038 | 0.038 | 0.038 | 0.038 | 0.038 | 0.038 |
| 24 | high | 0.038 | 0.038 | 0.038 | 0.038 | 0.038 | 0.038 |
| 25 | low | 0.038 | 0.038 | 0.038 | 0.038 | 0.038 | 0.038 |
| 25 | moderate | 0.038 | 0.038 | 0.038 | 0.038 | 0.038 | 0.038 |
| 25 | high | 0.038 | 0.038 | 0.038 | 0.038 | 0.038 | 0.038 |
| 26 | low | 0.038 | 0.038 | 0.038 | 0.038 | 0.038 | 0.038 |
| 26 | moderate | 0.038 | 0.038 | 0.038 | 0.038 | 0.038 | 0.038 |
| 26 | high | 0.038 | 0.038 | 0.038 | 0.038 | 0.038 | 0.038 |
| 27 | low | 0.038 | 0.038 | 0.038 | 0.038 | 0.038 | 0.038 |
| 27 | moderate | 0.038 | 0.038 | 0.038 | 0.038 | 0.038 | 0.038 |
| 27 | high | 0.038 | 0.038 | 0.038 | 0.038 | 0.038 | 0.038 |

TABLE C22.2.2

Probability table for Node MSAMP

| Initial SAMP | MAP | Modified SAMP Sand 43 | 49 | 50 | 51 | 52 | 62 |
|---|---|---|---|---|---|---|---|
| 31 | low | 0.038 | 0.038 | 0.038 | 0.038 | 0.038 | 0.038 |
| 31 | moderate | 0.038 | 0.038 | 0.038 | 0.038 | 0.038 | 0.038 |
| 31 | high | 0.038 | 0.038 | 0.038 | 0.038 | 0.038 | 0.038 |
| 32 | low | 0.038 | 0.038 | 0.038 | 0.038 | 0.038 | 0.038 |
| 32 | moderate | 0.038 | 0.038 | 0.038 | 0.038 | 0.038 | 0.038 |
| 32 | high | 0.038 | 0.038 | 0.038 | 0.038 | 0.038 | 0.038 |
| 33 | low | 0.038 | 0.038 | 0.038 | 0.038 | 0.038 | 0.038 |
| 33 | moderate | 0.038 | 0.038 | 0.038 | 0.038 | 0.038 | 0.038 |
| 33 | high | 0.038 | 0.038 | 0.038 | 0.038 | 0.038 | 0.038 |
| 34 | low | 0.038 | 0.038 | 0.038 | 0.038 | 0.038 | 0.038 |
| 34 | moderate | 0.038 | 0.038 | 0.038 | 0.038 | 0.038 | 0.038 |
| 34 | high | 0.038 | 0.038 | 0.038 | 0.038 | 0.038 | 0.038 |
| 35 | low | 0.038 | 0.038 | 0.038 | 0.038 | 0.038 | 0.038 |
| 35 | moderate | 0.038 | 0.038 | 0.038 | 0.038 | 0.038 | 0.038 |
| 35 | high | 0.038 | 0.038 | 0.038 | 0.038 | 0.038 | 0.038 |
| 39 | low | 0.038 | 0.038 | 0.038 | 0.038 | 0.038 | 0.038 |
| 39 | moderate | 0.038 | 0.038 | 0.038 | 0.038 | 0.038 | 0.038 |
| 39 | high | 0.038 | 0.038 | 0.038 | 0.038 | 0.038 | 0.038 |
| 41 | low | 0.038 | 0.038 | 0.038 | 0.038 | 0.038 | 0.038 |
| 41 | moderate | 0.038 | 0.038 | 0.038 | 0.038 | 0.038 | 0.038 |
| 41 | high | 0.038 | 0.038 | 0.038 | 0.038 | 0.038 | 0.038 |
| 42 | low | 0.038 | 0.038 | 0.038 | 0.038 | 0.038 | 0.038 |
| 42 | moderate | 0.038 | 0.038 | 0.038 | 0.038 | 0.038 | 0.038 |
| 42 | high | 0.038 | 0.038 | 0.038 | 0.038 | 0.038 | 0.038 |
| 43 | low | 0.038 | 0.038 | 0.038 | 0.038 | 0.038 | 0.038 |
| 43 | moderate | 0.038 | 0.038 | 0.038 | 0.038 | 0.038 | 0.038 |
| 43 | high | 0.038 | 0.038 | 0.038 | 0.038 | 0.038 | 0.038 |
| 49 | low | 0.038 | 0.038 | 0.038 | 0.038 | 0.038 | 0.038 |
| 49 | moderate | 0.038 | 0.038 | 0.038 | 0.038 | 0.038 | 0.038 |
| 49 | high | 0.038 | 0.038 | 0.038 | 0.038 | 0.038 | 0.038 |
| 50 | low | 0.038 | 0.038 | 0.038 | 0.038 | 0.038 | 0.038 |
| 50 | moderate | 0.038 | 0.038 | 0.038 | 0.038 | 0.038 | 0.038 |
| 50 | high | 0.038 | 0.038 | 0.038 | 0.038 | 0.038 | 0.038 |
| 51 | low | 0.038 | 0.038 | 0.038 | 0.038 | 0.038 | 0.038 |
| 51 | moderate | 0.038 | 0.038 | 0.038 | 0.038 | 0.038 | 0.038 |
| 51 | high | 0.038 | 0.038 | 0.038 | 0.038 | 0.038 | 0.038 |

TABLE C22.2.3

Probability table for Node MSAMP

| Initial | | Modified SAMP Sand | | | | | |
|---|---|---|---|---|---|---|---|
| SAMP | MAP | 43 | 49 | 50 | 51 | 52 | 62 |
| 52 | low | 0.038 | 0.038 | 0.038 | 0.038 | 0.038 | 0.038 |
| 52 | moderate | 0.038 | 0.038 | 0.038 | 0.038 | 0.038 | 0.038 |
| 52 | high | 0.038 | 0.038 | 0.038 | 0.038 | 0.038 | 0.038 |
| 62 | low | 0.038 | 0.038 | 0.038 | 0.038 | 0.038 | 0.038 |

TABLE C22.2.3-continued

Probability table for Node MSAMP

| Initial | | Modified SAMP Sand | | | | | |
|---|---|---|---|---|---|---|---|
| SAMP | MAP | 43 | 49 | 50 | 51 | 52 | 62 |
| 62 | moderate | 0.038 | 0.038 | 0.038 | 0.038 | 0.038 | 0.038 |
| 62 | high | 0.038 | 0.038 | 0.038 | 0.038 | 0.038 | 0.038 |

TABLE C23.1.1

Probability table for Node MSAMV

| Initial | | Modified SAMV Sand | | | | | | | | | | | | | | | |
|---|---|---|---|---|---|---|---|---|---|---|---|---|---|---|---|---|---|
| SAMV | MAP | 4 | 5 | 7 | 8 | 9 | 11 | 12 | 14 | 17 | 18 | 20 | 23 | 24 | 25 | 31 | 40 |
| 4 | low | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 4 | moderate | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 4 | high | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 5 | low | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 5 | moderate | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 5 | high | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 7 | low | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 7 | moderate | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 7 | high | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 8 | low | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 8 | moderate | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 8 | high | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 9 | low | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 9 | moderate | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 9 | high | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 11 | low | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 11 | moderate | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 11 | high | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 12 | low | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 12 | moderate | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 12 | high | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 14 | low | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 14 | moderate | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 14 | high | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 17 | low | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 17 | moderate | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 17 | high | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 18 | low | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 18 | moderate | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 18 | high | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 20 | low | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 20 | moderate | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 20 | high | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 23 | low | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 23 | moderate | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 23 | high | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |

TABLE C23.1.2

Probability table for Node MSAMV

| Initial | | Modified SAMV Sand | | | | | | | | | | | | | | | |
|---|---|---|---|---|---|---|---|---|---|---|---|---|---|---|---|---|---|
| SAMV | MAP | 4 | 5 | 7 | 8 | 9 | 11 | 12 | 14 | 17 | 18 | 20 | 23 | 24 | 25 | 31 | 40 |
| 24 | low | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 24 | moderate | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 24 | high | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 25 | low | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 25 | moderate | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 25 | high | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 31 | low | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 31 | moderate | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 31 | high | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 40 | low | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |

TABLE C23.1.2-continued

| Probability table for Node MSAMV | | | | | | | | | | | | | | | | | |
|---|---|---|---|---|---|---|---|---|---|---|---|---|---|---|---|---|---|
| Initial | | Modified SAMV Sand | | | | | | | | | | | | | | | |
| SAMV | MAP | 4 | 5 | 7 | 8 | 9 | 11 | 12 | 14 | 17 | 18 | 20 | 23 | 24 | 25 | 31 | 40 |
| 40 | moderate | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 40 | high | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |

TABLE C24.1.1

| Probability table for Node MCAMSU | | | | | | | | | | | |
|---|---|---|---|---|---|---|---|---|---|---|---|
| Initial | | Modified CAMSU Sand | | | | | | | | | |
| CAMSU | MAP | 1 | 2 | 4 | 5 | 6 | 8 | 9 | 10 | 13 | 14 |
| 1 | low | 0.029 | 0.029 | 0.029 | 0.029 | 0.029 | 0.029 | 0.029 | 0.029 | 0.029 | 0.029 |
| 1 | moderate | 0.029 | 0.029 | 0.029 | 0.029 | 0.029 | 0.029 | 0.029 | 0.029 | 0.029 | 0.029 |
| 1 | high | 0.029 | 0.029 | 0.029 | 0.029 | 0.029 | 0.029 | 0.029 | 0.029 | 0.029 | 0.029 |
| 2 | low | 0.029 | 0.029 | 0.029 | 0.029 | 0.029 | 0.029 | 0.029 | 0.029 | 0.029 | 0.029 |
| 2 | moderate | 0.029 | 0.029 | 0.029 | 0.029 | 0.029 | 0.029 | 0.029 | 0.029 | 0.029 | 0.029 |
| 2 | high | 0.029 | 0.029 | 0.029 | 0.029 | 0.029 | 0.029 | 0.029 | 0.029 | 0.029 | 0.029 |
| 4 | low | 0.029 | 0.029 | 0.029 | 0.029 | 0.029 | 0.029 | 0.029 | 0.029 | 0.029 | 0.029 |
| 4 | moderate | 0.029 | 0.029 | 0.029 | 0.029 | 0.029 | 0.029 | 0.029 | 0.029 | 0.029 | 0.029 |
| 4 | high | 0.029 | 0.029 | 0.029 | 0.029 | 0.029 | 0.029 | 0.029 | 0.029 | 0.029 | 0.029 |
| 5 | low | 0.029 | 0.029 | 0.029 | 0.029 | 0.029 | 0.029 | 0.029 | 0.029 | 0.029 | 0.029 |
| 5 | moderate | 0.029 | 0.029 | 0.029 | 0.029 | 0.029 | 0.029 | 0.029 | 0.029 | 0.029 | 0.029 |
| 5 | high | 0.029 | 0.029 | 0.029 | 0.029 | 0.029 | 0.029 | 0.029 | 0.029 | 0.029 | 0.029 |
| 6 | low | 0.029 | 0.029 | 0.029 | 0.029 | 0.029 | 0.029 | 0.029 | 0.029 | 0.029 | 0.029 |
| 6 | moderate | 0.029 | 0.029 | 0.029 | 0.029 | 0.029 | 0.029 | 0.029 | 0.029 | 0.029 | 0.029 |
| 6 | high | 0.029 | 0.029 | 0.029 | 0.029 | 0.029 | 0.029 | 0.029 | 0.029 | 0.029 | 0.029 |
| 8 | low | 0.029 | 0.029 | 0.029 | 0.029 | 0.029 | 0.029 | 0.029 | 0.029 | 0.029 | 0.029 |
| 8 | moderate | 0.029 | 0.029 | 0.029 | 0.029 | 0.029 | 0.029 | 0.029 | 0.029 | 0.029 | 0.029 |
| 8 | high | 0.029 | 0.029 | 0.029 | 0.029 | 0.029 | 0.029 | 0.029 | 0.029 | 0.029 | 0.029 |
| 9 | low | 0.029 | 0.029 | 0.029 | 0.029 | 0.029 | 0.029 | 0.029 | 0.029 | 0.029 | 0.029 |
| 9 | moderate | 0.029 | 0.029 | 0.029 | 0.029 | 0.029 | 0.029 | 0.029 | 0.029 | 0.029 | 0.029 |
| 9 | high | 0.029 | 0.029 | 0.029 | 0.029 | 0.029 | 0.029 | 0.029 | 0.029 | 0.029 | 0.029 |
| 10 | low | 0.029 | 0.029 | 0.029 | 0.029 | 0.029 | 0.029 | 0.029 | 0.029 | 0.029 | 0.029 |
| 10 | moderate | 0.029 | 0.029 | 0.029 | 0.029 | 0.029 | 0.029 | 0.029 | 0.029 | 0.029 | 0.029 |
| 10 | high | 0.029 | 0.029 | 0.029 | 0.029 | 0.029 | 0.029 | 0.029 | 0.029 | 0.029 | 0.029 |
| 13 | low | 0.029 | 0.029 | 0.029 | 0.029 | 0.029 | 0.029 | 0.029 | 0.029 | 0.029 | 0.029 |
| 13 | moderate | 0.029 | 0.029 | 0.029 | 0.029 | 0.029 | 0.029 | 0.029 | 0.029 | 0.029 | 0.029 |
| 13 | high | 0.029 | 0.029 | 0.029 | 0.029 | 0.029 | 0.029 | 0.029 | 0.029 | 0.029 | 0.029 |
| 14 | low | 0.029 | 0.029 | 0.029 | 0.029 | 0.029 | 0.029 | 0.029 | 0.029 | 0.029 | 0.029 |
| 14 | moderate | 0.029 | 0.029 | 0.029 | 0.029 | 0.029 | 0.029 | 0.029 | 0.029 | 0.029 | 0.029 |
| 14 | high | 0.029 | 0.029 | 0.029 | 0.029 | 0.029 | 0.029 | 0.029 | 0.029 | 0.029 | 0.029 |
| 15 | low | 0.029 | 0.029 | 0.029 | 0.029 | 0.029 | 0.029 | 0.029 | 0.029 | 0.029 | 0.029 |
| 15 | moderate | 0.029 | 0.029 | 0.029 | 0.029 | 0.029 | 0.029 | 0.029 | 0.029 | 0.029 | 0.029 |
| 15 | high | 0.029 | 0.029 | 0.029 | 0.029 | 0.029 | 0.029 | 0.029 | 0.029 | 0.029 | 0.029 |
| 18 | low | 0.029 | 0.029 | 0.029 | 0.029 | 0.029 | 0.029 | 0.029 | 0.029 | 0.029 | 0.029 |
| 18 | moderate | 0.029 | 0.029 | 0.029 | 0.029 | 0.029 | 0.029 | 0.029 | 0.029 | 0.029 | 0.029 |
| 18 | high | 0.029 | 0.029 | 0.029 | 0.029 | 0.029 | 0.029 | 0.029 | 0.029 | 0.029 | 0.029 |

| Initial | Modified CAMSU Sand | | | | | | | | | |
|---|---|---|---|---|---|---|---|---|---|---|
| CAMSU | 15 | 18 | 19 | 20 | 21 | 25 | 26 | 27 | 28 | 33 |
| 1 | 0.029 | 0.029 | 0.029 | 0.029 | 0.029 | 0.029 | 0.029 | 0.029 | 0.029 | 0.029 |
| 1 | 0.029 | 0.029 | 0.029 | 0.029 | 0.029 | 0.029 | 0.029 | 0.029 | 0.029 | 0.029 |
| 1 | 0.029 | 0.029 | 0.029 | 0.029 | 0.029 | 0.029 | 0.029 | 0.029 | 0.029 | 0.029 |
| 2 | 0.029 | 0.029 | 0.029 | 0.029 | 0.029 | 0.029 | 0.029 | 0.029 | 0.029 | 0.029 |
| 2 | 0.029 | 0.029 | 0.029 | 0.029 | 0.029 | 0.029 | 0.029 | 0.029 | 0.029 | 0.029 |
| 2 | 0.029 | 0.029 | 0.029 | 0.029 | 0.029 | 0.029 | 0.029 | 0.029 | 0.029 | 0.029 |
| 4 | 0.029 | 0.029 | 0.029 | 0.029 | 0.029 | 0.029 | 0.029 | 0.029 | 0.029 | 0.029 |
| 4 | 0.029 | 0.029 | 0.029 | 0.029 | 0.029 | 0.029 | 0.029 | 0.029 | 0.029 | 0.029 |
| 4 | 0.029 | 0.029 | 0.029 | 0.029 | 0.029 | 0.029 | 0.029 | 0.029 | 0.029 | 0.029 |
| 5 | 0.029 | 0.029 | 0.029 | 0.029 | 0.029 | 0.029 | 0.029 | 0.029 | 0.029 | 0.029 |
| 5 | 0.029 | 0.029 | 0.029 | 0.029 | 0.029 | 0.029 | 0.029 | 0.029 | 0.029 | 0.029 |
| 5 | 0.029 | 0.029 | 0.029 | 0.029 | 0.029 | 0.029 | 0.029 | 0.029 | 0.029 | 0.029 |
| 6 | 0.029 | 0.029 | 0.029 | 0.029 | 0.029 | 0.029 | 0.029 | 0.029 | 0.029 | 0.029 |
| 6 | 0.029 | 0.029 | 0.029 | 0.029 | 0.029 | 0.029 | 0.029 | 0.029 | 0.029 | 0.029 |
| 6 | 0.029 | 0.029 | 0.029 | 0.029 | 0.029 | 0.029 | 0.029 | 0.029 | 0.029 | 0.029 |
| 8 | 0.029 | 0.029 | 0.029 | 0.029 | 0.029 | 0.029 | 0.029 | 0.029 | 0.029 | 0.029 |
| 8 | 0.029 | 0.029 | 0.029 | 0.029 | 0.029 | 0.029 | 0.029 | 0.029 | 0.029 | 0.029 |
| 8 | 0.029 | 0.029 | 0.029 | 0.029 | 0.029 | 0.029 | 0.029 | 0.029 | 0.029 | 0.029 |

TABLE C24.1.1-continued

Probability table for Node MCAMSU

| | | | | | | | | | | |
|---|---|---|---|---|---|---|---|---|---|---|
| 9 | 0.029 | 0.029 | 0.029 | 0.029 | 0.029 | 0.029 | 0.029 | 0.029 | 0.029 | 0.029 |
| 9 | 0.029 | 0.029 | 0.029 | 0.029 | 0.029 | 0.029 | 0.029 | 0.029 | 0.029 | 0.029 |
| 9 | 0.029 | 0.029 | 0.029 | 0.029 | 0.029 | 0.029 | 0.029 | 0.029 | 0.029 | 0.029 |
| 10 | 0.029 | 0.029 | 0.029 | 0.029 | 0.029 | 0.029 | 0.029 | 0.029 | 0.029 | 0.029 |
| 10 | 0.029 | 0.029 | 0.029 | 0.029 | 0.029 | 0.029 | 0.029 | 0.029 | 0.029 | 0.029 |
| 10 | 0.029 | 0.029 | 0.029 | 0.029 | 0.029 | 0.029 | 0.029 | 0.029 | 0.029 | 0.029 |
| 13 | 0.029 | 0.029 | 0.029 | 0.029 | 0.029 | 0.029 | 0.029 | 0.029 | 0.029 | 0.029 |
| 13 | 0.029 | 0.029 | 0.029 | 0.029 | 0.029 | 0.029 | 0.029 | 0.029 | 0.029 | 0.029 |
| 13 | 0.029 | 0.029 | 0.029 | 0.029 | 0.029 | 0.029 | 0.029 | 0.029 | 0.029 | 0.029 |
| 14 | 0.029 | 0.029 | 0.029 | 0.029 | 0.029 | 0.029 | 0.029 | 0.029 | 0.029 | 0.029 |
| 14 | 0.029 | 0.029 | 0.029 | 0.029 | 0.029 | 0.029 | 0.029 | 0.029 | 0.029 | 0.029 |
| 14 | 0.029 | 0.029 | 0.029 | 0.029 | 0.029 | 0.029 | 0.029 | 0.029 | 0.029 | 0.029 |
| 15 | 0.029 | 0.029 | 0.029 | 0.029 | 0.029 | 0.029 | 0.029 | 0.029 | 0.029 | 0.029 |
| 15 | 0.029 | 0.029 | 0.029 | 0.029 | 0.029 | 0.029 | 0.029 | 0.029 | 0.029 | 0.029 |
| 15 | 0.029 | 0.029 | 0.029 | 0.029 | 0.029 | 0.029 | 0.029 | 0.029 | 0.029 | 0.029 |
| 18 | 0.029 | 0.029 | 0.029 | 0.029 | 0.029 | 0.029 | 0.029 | 0.029 | 0.029 | 0.029 |
| 18 | 0.029 | 0.029 | 0.029 | 0.029 | 0.029 | 0.029 | 0.029 | 0.029 | 0.029 | 0.029 |
| 18 | 0.029 | 0.029 | 0.029 | 0.029 | 0.029 | 0.029 | 0.029 | 0.029 | 0.029 | 0.029 |

TABLE C24.1.2

Probability table for Node MCAMSU

| Initial | | Modified CAMSU Sand | | | | | | | | | |
|---|---|---|---|---|---|---|---|---|---|---|---|
| CAMSU | MAP | 1 | 2 | 4 | 5 | 6 | 8 | 9 | 10 | 13 | 14 |
| 19 | low | 0.029 | 0.029 | 0.029 | 0.029 | 0.029 | 0.029 | 0.029 | 0.029 | 0.029 | 0.029 |
| 19 | moderate | 0.029 | 0.029 | 0.029 | 0.029 | 0.029 | 0.029 | 0.029 | 0.029 | 0.029 | 0.029 |
| 19 | high | 0.029 | 0.029 | 0.029 | 0.029 | 0.029 | 0.029 | 0.029 | 0.029 | 0.029 | 0.029 |
| 20 | low | 0.029 | 0.029 | 0.029 | 0.029 | 0.029 | 0.029 | 0.029 | 0.029 | 0.029 | 0.029 |
| 20 | moderate | 0.029 | 0.029 | 0.029 | 0.029 | 0.029 | 0.029 | 0.029 | 0.029 | 0.029 | 0.029 |
| 20 | high | 0.029 | 0.029 | 0.029 | 0.029 | 0.029 | 0.029 | 0.029 | 0.029 | 0.029 | 0.029 |
| 21 | low | 0.029 | 0.029 | 0.029 | 0.029 | 0.029 | 0.029 | 0.029 | 0.029 | 0.029 | 0.029 |
| 21 | moderate | 0.029 | 0.029 | 0.029 | 0.029 | 0.029 | 0.029 | 0.029 | 0.029 | 0.029 | 0.029 |
| 21 | high | 0.029 | 0.029 | 0.029 | 0.029 | 0.029 | 0.029 | 0.029 | 0.029 | 0.029 | 0.029 |
| 25 | low | 0.029 | 0.029 | 0.029 | 0.029 | 0.029 | 0.029 | 0.029 | 0.029 | 0.029 | 0.029 |
| 25 | moderate | 0.029 | 0.029 | 0.029 | 0.029 | 0.029 | 0.029 | 0.029 | 0.029 | 0.029 | 0.029 |
| 25 | high | 0.029 | 0.029 | 0.029 | 0.029 | 0.029 | 0.029 | 0.029 | 0.029 | 0.029 | 0.029 |
| 26 | low | 0.029 | 0.029 | 0.029 | 0.029 | 0.029 | 0.029 | 0.029 | 0.029 | 0.029 | 0.029 |
| 26 | moderate | 0.029 | 0.029 | 0.029 | 0.029 | 0.029 | 0.029 | 0.029 | 0.029 | 0.029 | 0.029 |
| 26 | high | 0.029 | 0.029 | 0.029 | 0.029 | 0.029 | 0.029 | 0.029 | 0.029 | 0.029 | 0.029 |
| 27 | low | 0.029 | 0.029 | 0.029 | 0.029 | 0.029 | 0.029 | 0.029 | 0.029 | 0.029 | 0.029 |
| 27 | moderate | 0.029 | 0.029 | 0.029 | 0.029 | 0.029 | 0.029 | 0.029 | 0.029 | 0.029 | 0.029 |
| 27 | high | 0.029 | 0.029 | 0.029 | 0.029 | 0.029 | 0.029 | 0.029 | 0.029 | 0.029 | 0.029 |
| 28 | low | 0.029 | 0.029 | 0.029 | 0.029 | 0.029 | 0.029 | 0.029 | 0.029 | 0.029 | 0.029 |
| 28 | moderate | 0.029 | 0.029 | 0.029 | 0.029 | 0.029 | 0.029 | 0.029 | 0.029 | 0.029 | 0.029 |
| 28 | high | 0.029 | 0.029 | 0.029 | 0.029 | 0.029 | 0.029 | 0.029 | 0.029 | 0.029 | 0.029 |
| 33 | low | 0.029 | 0.029 | 0.029 | 0.029 | 0.029 | 0.029 | 0.029 | 0.029 | 0.029 | 0.029 |
| 33 | moderate | 0.029 | 0.029 | 0.029 | 0.029 | 0.029 | 0.029 | 0.029 | 0.029 | 0.029 | 0.029 |
| 33 | high | 0.029 | 0.029 | 0.029 | 0.029 | 0.029 | 0.029 | 0.029 | 0.029 | 0.029 | 0.029 |
| 34 | low | 0.029 | 0.029 | 0.029 | 0.029 | 0.029 | 0.029 | 0.029 | 0.029 | 0.029 | 0.029 |
| 34 | moderate | 0.029 | 0.029 | 0.029 | 0.029 | 0.029 | 0.029 | 0.029 | 0.029 | 0.029 | 0.029 |
| 34 | high | 0.029 | 0.029 | 0.029 | 0.029 | 0.029 | 0.029 | 0.029 | 0.029 | 0.029 | 0.029 |
| 35 | low | 0.029 | 0.029 | 0.029 | 0.029 | 0.029 | 0.029 | 0.029 | 0.029 | 0.029 | 0.029 |
| 35 | moderate | 0.029 | 0.029 | 0.029 | 0.029 | 0.029 | 0.029 | 0.029 | 0.029 | 0.029 | 0.029 |
| 35 | high | 0.029 | 0.029 | 0.029 | 0.029 | 0.029 | 0.029 | 0.029 | 0.029 | 0.029 | 0.029 |
| 36 | low | 0.029 | 0.029 | 0.029 | 0.029 | 0.029 | 0.029 | 0.029 | 0.029 | 0.029 | 0.029 |
| 36 | moderate | 0.029 | 0.029 | 0.029 | 0.029 | 0.029 | 0.029 | 0.029 | 0.029 | 0.029 | 0.029 |
| 36 | high | 0.029 | 0.029 | 0.029 | 0.029 | 0.029 | 0.029 | 0.029 | 0.029 | 0.029 | 0.029 |
| 42 | low | 0.029 | 0.029 | 0.029 | 0.029 | 0.029 | 0.029 | 0.029 | 0.029 | 0.029 | 0.029 |
| 42 | moderate | 0.029 | 0.029 | 0.029 | 0.029 | 0.029 | 0.029 | 0.029 | 0.029 | 0.029 | 0.029 |
| 42 | high | 0.029 | 0.029 | 0.029 | 0.029 | 0.029 | 0.029 | 0.029 | 0.029 | 0.029 | 0.029 |

| Initial | Modified CAMSU Sand | | | | | | | | | |
|---|---|---|---|---|---|---|---|---|---|---|
| CAMSU | 15 | 18 | 19 | 20 | 21 | 25 | 26 | 27 | 28 | 33 |
| 19 | 0.029 | 0.029 | 0.029 | 0.029 | 0.029 | 0.029 | 0.029 | 0.029 | 0.029 | 0.029 |
| 19 | 0.029 | 0.029 | 0.029 | 0.029 | 0.029 | 0.029 | 0.029 | 0.029 | 0.029 | 0.029 |
| 19 | 0.029 | 0.029 | 0.029 | 0.029 | 0.029 | 0.029 | 0.029 | 0.029 | 0.029 | 0.029 |
| 20 | 0.029 | 0.029 | 0.029 | 0.029 | 0.029 | 0.029 | 0.029 | 0.029 | 0.029 | 0.029 |
| 20 | 0.029 | 0.029 | 0.029 | 0.029 | 0.029 | 0.029 | 0.029 | 0.029 | 0.029 | 0.029 |
| 20 | 0.029 | 0.029 | 0.029 | 0.029 | 0.029 | 0.029 | 0.029 | 0.029 | 0.029 | 0.029 |

TABLE C24.1.2-continued

Probability table for Node MCAMSU

| | | | | | | | | | | |
|---|---|---|---|---|---|---|---|---|---|---|
| 21 | 0.029 | 0.029 | 0.029 | 0.029 | 0.029 | 0.029 | 0.029 | 0.029 | 0.029 | 0.029 |
| 21 | 0.029 | 0.029 | 0.029 | 0.029 | 0.029 | 0.029 | 0.029 | 0.029 | 0.029 | 0.029 |
| 21 | 0.029 | 0.029 | 0.029 | 0.029 | 0.029 | 0.029 | 0.029 | 0.029 | 0.029 | 0.029 |
| 25 | 0.029 | 0.029 | 0.029 | 0.029 | 0.029 | 0.029 | 0.029 | 0.029 | 0.029 | 0.029 |
| 25 | 0.029 | 0.029 | 0.029 | 0.029 | 0.029 | 0.029 | 0.029 | 0.029 | 0.029 | 0.029 |
| 25 | 0.029 | 0.029 | 0.029 | 0.029 | 0.029 | 0.029 | 0.029 | 0.029 | 0.029 | 0.029 |
| 26 | 0.029 | 0.029 | 0.029 | 0.029 | 0.029 | 0.029 | 0.029 | 0.029 | 0.029 | 0.029 |
| 26 | 0.029 | 0.029 | 0.029 | 0.029 | 0.029 | 0.029 | 0.029 | 0.029 | 0.029 | 0.029 |
| 26 | 0.029 | 0.029 | 0.029 | 0.029 | 0.029 | 0.029 | 0.029 | 0.029 | 0.029 | 0.029 |
| 27 | 0.029 | 0.029 | 0.029 | 0.029 | 0.029 | 0.029 | 0.029 | 0.029 | 0.029 | 0.029 |
| 27 | 0.029 | 0.029 | 0.029 | 0.029 | 0.029 | 0.029 | 0.029 | 0.029 | 0.029 | 0.029 |
| 27 | 0.029 | 0.029 | 0.029 | 0.029 | 0.029 | 0.029 | 0.029 | 0.029 | 0.029 | 0.029 |
| 28 | 0.029 | 0.029 | 0.029 | 0.029 | 0.029 | 0.029 | 0.029 | 0.029 | 0.029 | 0.029 |
| 28 | 0.029 | 0.029 | 0.029 | 0.029 | 0.029 | 0.029 | 0.029 | 0.029 | 0.029 | 0.029 |
| 28 | 0.029 | 0.029 | 0.029 | 0.029 | 0.029 | 0.029 | 0.029 | 0.029 | 0.029 | 0.029 |
| 33 | 0.029 | 0.029 | 0.029 | 0.029 | 0.029 | 0.029 | 0.029 | 0.029 | 0.029 | 0.029 |
| 33 | 0.029 | 0.029 | 0.029 | 0.029 | 0.029 | 0.029 | 0.029 | 0.029 | 0.029 | 0.029 |
| 33 | 0.029 | 0.029 | 0.029 | 0.029 | 0.029 | 0.029 | 0.029 | 0.029 | 0.029 | 0.029 |
| 34 | 0.029 | 0.029 | 0.029 | 0.029 | 0.029 | 0.029 | 0.029 | 0.029 | 0.029 | 0.029 |
| 34 | 0.029 | 0.029 | 0.029 | 0.029 | 0.029 | 0.029 | 0.029 | 0.029 | 0.029 | 0.029 |
| 34 | 0.029 | 0.029 | 0.029 | 0.029 | 0.029 | 0.029 | 0.029 | 0.029 | 0.029 | 0.029 |
| 35 | 0.029 | 0.029 | 0.029 | 0.029 | 0.029 | 0.029 | 0.029 | 0.029 | 0.029 | 0.029 |
| 35 | 0.029 | 0.029 | 0.029 | 0.029 | 0.029 | 0.029 | 0.029 | 0.029 | 0.029 | 0.029 |
| 35 | 0.029 | 0.029 | 0.029 | 0.029 | 0.029 | 0.029 | 0.029 | 0.029 | 0.029 | 0.029 |
| 36 | 0.029 | 0.029 | 0.029 | 0.029 | 0.029 | 0.029 | 0.029 | 0.029 | 0.029 | 0.029 |
| 36 | 0.029 | 0.029 | 0.029 | 0.029 | 0.029 | 0.029 | 0.029 | 0.029 | 0.029 | 0.029 |
| 36 | 0.029 | 0.029 | 0.029 | 0.029 | 0.029 | 0.029 | 0.029 | 0.029 | 0.029 | 0.029 |
| 42 | 0.029 | 0.029 | 0.029 | 0.029 | 0.029 | 0.029 | 0.029 | 0.029 | 0.029 | 0.029 |
| 42 | 0.029 | 0.029 | 0.029 | 0.029 | 0.029 | 0.029 | 0.029 | 0.029 | 0.029 | 0.029 |
| 42 | 0.029 | 0.029 | 0.029 | 0.029 | 0.029 | 0.029 | 0.029 | 0.029 | 0.029 | 0.029 |

TABLE C24.1.3

Probability table for Node MCAMSU

| Initial | | Modified CAMSU Sand | | | | | | | | | |
|---|---|---|---|---|---|---|---|---|---|---|---|
| CAMSU | MAP | 1 | 2 | 4 | 5 | 6 | 8 | 9 | 10 | 13 | 14 |
| 43 | low | 0.029 | 0.029 | 0.029 | 0.029 | 0.029 | 0.029 | 0.029 | 0.029 | 0.029 | 0.029 |
| 43 | moderate | 0.029 | 0.029 | 0.029 | 0.029 | 0.029 | 0.029 | 0.029 | 0.029 | 0.029 | 0.029 |
| 43 | high | 0.029 | 0.029 | 0.029 | 0.029 | 0.029 | 0.029 | 0.029 | 0.029 | 0.029 | 0.029 |
| 44 | low | 0.029 | 0.029 | 0.029 | 0.029 | 0.029 | 0.029 | 0.029 | 0.029 | 0.029 | 0.029 |
| 44 | moderate | 0.029 | 0.029 | 0.029 | 0.029 | 0.029 | 0.029 | 0.029 | 0.029 | 0.029 | 0.029 |
| 44 | high | 0.029 | 0.029 | 0.029 | 0.029 | 0.029 | 0.029 | 0.029 | 0.029 | 0.029 | 0.029 |
| 45 | low | 0.029 | 0.029 | 0.029 | 0.029 | 0.029 | 0.029 | 0.029 | 0.029 | 0.029 | 0.029 |
| 45 | moderate | 0.029 | 0.029 | 0.029 | 0.029 | 0.029 | 0.029 | 0.029 | 0.029 | 0.029 | 0.029 |
| 45 | high | 0.029 | 0.029 | 0.029 | 0.029 | 0.029 | 0.029 | 0.029 | 0.029 | 0.029 | 0.029 |
| 52 | low | 0.029 | 0.029 | 0.029 | 0.029 | 0.029 | 0.029 | 0.029 | 0.029 | 0.029 | 0.029 |
| 52 | moderate | 0.029 | 0.029 | 0.029 | 0.029 | 0.029 | 0.029 | 0.029 | 0.029 | 0.029 | 0.029 |
| 52 | high | 0.029 | 0.029 | 0.029 | 0.029 | 0.029 | 0.029 | 0.029 | 0.029 | 0.029 | 0.029 |
| 53 | low | 0.029 | 0.029 | 0.029 | 0.029 | 0.029 | 0.029 | 0.029 | 0.029 | 0.029 | 0.029 |
| 53 | moderate | 0.029 | 0.029 | 0.029 | 0.029 | 0.029 | 0.029 | 0.029 | 0.029 | 0.029 | 0.029 |
| 53 | high | 0.029 | 0.029 | 0.029 | 0.029 | 0.029 | 0.029 | 0.029 | 0.029 | 0.029 | 0.029 |
| 54 | low | 0.029 | 0.029 | 0.029 | 0.029 | 0.029 | 0.029 | 0.029 | 0.029 | 0.029 | 0.029 |
| 54 | moderate | 0.029 | 0.029 | 0.029 | 0.029 | 0.029 | 0.029 | 0.029 | 0.029 | 0.029 | 0.029 |
| 54 | high | 0.029 | 0.029 | 0.029 | 0.029 | 0.029 | 0.029 | 0.029 | 0.029 | 0.029 | 0.029 |
| 55 | low | 0.029 | 0.029 | 0.029 | 0.029 | 0.029 | 0.029 | 0.029 | 0.029 | 0.029 | 0.029 |
| 55 | moderate | 0.029 | 0.029 | 0.029 | 0.029 | 0.029 | 0.029 | 0.029 | 0.029 | 0.029 | 0.029 |
| 55 | high | 0.029 | 0.029 | 0.029 | 0.029 | 0.029 | 0.029 | 0.029 | 0.029 | 0.029 | 0.029 |
| 63 | low | 0.029 | 0.029 | 0.029 | 0.029 | 0.029 | 0.029 | 0.029 | 0.029 | 0.029 | 0.029 |
| 63 | moderate | 0.029 | 0.029 | 0.029 | 0.029 | 0.029 | 0.029 | 0.029 | 0.029 | 0.029 | 0.029 |
| 63 | high | 0.029 | 0.029 | 0.029 | 0.029 | 0.029 | 0.029 | 0.029 | 0.029 | 0.029 | 0.029 |
| 64 | low | 0.029 | 0.029 | 0.029 | 0.029 | 0.029 | 0.029 | 0.029 | 0.029 | 0.029 | 0.029 |
| 64 | moderate | 0.029 | 0.029 | 0.029 | 0.029 | 0.029 | 0.029 | 0.029 | 0.029 | 0.029 | 0.029 |
| 64 | high | 0.029 | 0.029 | 0.029 | 0.029 | 0.029 | 0.029 | 0.029 | 0.029 | 0.029 | 0.029 |
| 65 | low | 0.029 | 0.029 | 0.029 | 0.029 | 0.029 | 0.029 | 0.029 | 0.029 | 0.029 | 0.029 |
| 65 | moderate | 0.029 | 0.029 | 0.029 | 0.029 | 0.029 | 0.029 | 0.029 | 0.029 | 0.029 | 0.029 |
| 65 | high | 0.029 | 0.029 | 0.029 | 0.029 | 0.029 | 0.029 | 0.029 | 0.029 | 0.029 | 0.029 |
| 66 | low | 0.029 | 0.029 | 0.029 | 0.029 | 0.029 | 0.029 | 0.029 | 0.029 | 0.029 | 0.029 |
| 66 | moderate | 0.029 | 0.029 | 0.029 | 0.029 | 0.029 | 0.029 | 0.029 | 0.029 | 0.029 | 0.029 |
| 66 | high | 0.029 | 0.029 | 0.029 | 0.029 | 0.029 | 0.029 | 0.029 | 0.029 | 0.029 | 0.029 |

TABLE C24.1.3-continued

Probability table for Node MCAMSU

| Initial CAMSU | Modified CAMSU Sand 15 | 18 | 19 | 20 | 21 | 25 | 26 | 27 | 28 | 33 |
|---|---|---|---|---|---|---|---|---|---|---|
| 43 | 0.029 | 0.029 | 0.029 | 0.029 | 0.029 | 0.029 | 0.029 | 0.029 | 0.029 | 0.029 |
| 43 | 0.029 | 0.029 | 0.029 | 0.029 | 0.029 | 0.029 | 0.029 | 0.029 | 0.029 | 0.029 |
| 43 | 0.029 | 0.029 | 0.029 | 0.029 | 0.029 | 0.029 | 0.029 | 0.029 | 0.029 | 0.029 |
| 44 | 0.029 | 0.029 | 0.029 | 0.029 | 0.029 | 0.029 | 0.029 | 0.029 | 0.029 | 0.029 |
| 44 | 0.029 | 0.029 | 0.029 | 0.029 | 0.029 | 0.029 | 0.029 | 0.029 | 0.029 | 0.029 |
| 44 | 0.029 | 0.029 | 0.029 | 0.029 | 0.029 | 0.029 | 0.029 | 0.029 | 0.029 | 0.029 |
| 45 | 0.029 | 0.029 | 0.029 | 0.029 | 0.029 | 0.029 | 0.029 | 0.029 | 0.029 | 0.029 |
| 45 | 0.029 | 0.029 | 0.029 | 0.029 | 0.029 | 0.029 | 0.029 | 0.029 | 0.029 | 0.029 |
| 45 | 0.029 | 0.029 | 0.029 | 0.029 | 0.029 | 0.029 | 0.029 | 0.029 | 0.029 | 0.029 |
| 52 | 0.029 | 0.029 | 0.029 | 0.029 | 0.029 | 0.029 | 0.029 | 0.029 | 0.029 | 0.029 |
| 52 | 0.029 | 0.029 | 0.029 | 0.029 | 0.029 | 0.029 | 0.029 | 0.029 | 0.029 | 0.029 |
| 52 | 0.029 | 0.029 | 0.029 | 0.029 | 0.029 | 0.029 | 0.029 | 0.029 | 0.029 | 0.029 |
| 53 | 0.029 | 0.029 | 0.029 | 0.029 | 0.029 | 0.029 | 0.029 | 0.029 | 0.029 | 0.029 |
| 53 | 0.029 | 0.029 | 0.029 | 0.029 | 0.029 | 0.029 | 0.029 | 0.029 | 0.029 | 0.029 |
| 53 | 0.029 | 0.029 | 0.029 | 0.029 | 0.029 | 0.029 | 0.029 | 0.029 | 0.029 | 0.029 |
| 54 | 0.029 | 0.029 | 0.029 | 0.029 | 0.029 | 0.029 | 0.029 | 0.029 | 0.029 | 0.029 |
| 54 | 0.029 | 0.029 | 0.029 | 0.029 | 0.029 | 0.029 | 0.029 | 0.029 | 0.029 | 0.029 |
| 54 | 0.029 | 0.029 | 0.029 | 0.029 | 0.029 | 0.029 | 0.029 | 0.029 | 0.029 | 0.029 |
| 55 | 0.029 | 0.029 | 0.029 | 0.029 | 0.029 | 0.029 | 0.029 | 0.029 | 0.029 | 0.029 |
| 55 | 0.029 | 0.029 | 0.029 | 0.029 | 0.029 | 0.029 | 0.029 | 0.029 | 0.029 | 0.029 |
| 55 | 0.029 | 0.029 | 0.029 | 0.029 | 0.029 | 0.029 | 0.029 | 0.029 | 0.029 | 0.029 |
| 63 | 0.029 | 0.029 | 0.029 | 0.029 | 0.029 | 0.029 | 0.029 | 0.029 | 0.029 | 0.029 |
| 63 | 0.029 | 0.029 | 0.029 | 0.029 | 0.029 | 0.029 | 0.029 | 0.029 | 0.029 | 0.029 |
| 63 | 0.029 | 0.029 | 0.029 | 0.029 | 0.029 | 0.029 | 0.029 | 0.029 | 0.029 | 0.029 |
| 64 | 0.029 | 0.029 | 0.029 | 0.029 | 0.029 | 0.029 | 0.029 | 0.029 | 0.029 | 0.029 |
| 64 | 0.029 | 0.029 | 0.029 | 0.029 | 0.029 | 0.029 | 0.029 | 0.029 | 0.029 | 0.029 |
| 64 | 0.029 | 0.029 | 0.029 | 0.029 | 0.029 | 0.029 | 0.029 | 0.029 | 0.029 | 0.029 |
| 65 | 0.029 | 0.029 | 0.029 | 0.029 | 0.029 | 0.029 | 0.029 | 0.029 | 0.029 | 0.029 |
| 65 | 0.029 | 0.029 | 0.029 | 0.029 | 0.029 | 0.029 | 0.029 | 0.029 | 0.029 | 0.029 |
| 65 | 0.029 | 0.029 | 0.029 | 0.029 | 0.029 | 0.029 | 0.029 | 0.029 | 0.029 | 0.029 |
| 66 | 0.029 | 0.029 | 0.029 | 0.029 | 0.029 | 0.029 | 0.029 | 0.029 | 0.029 | 0.029 |
| 66 | 0.029 | 0.029 | 0.029 | 0.029 | 0.029 | 0.029 | 0.029 | 0.029 | 0.029 | 0.029 |
| 66 | 0.029 | 0.029 | 0.029 | 0.029 | 0.029 | 0.029 | 0.029 | 0.029 | 0.029 | 0.029 |

TABLE C24.2.1

Probability table for Node MCAMSU

| Initial CAMSU | MAP | Modified CAMSU Sand 34 | 35 | 36 | 42 | 43 | 44 | 45 | 52 | 53 | 54 | 55 | 63 | 64 | 65 | 66 |
|---|---|---|---|---|---|---|---|---|---|---|---|---|---|---|---|---|
| 1 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 1 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 1 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 2 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 2 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 2 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 4 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 4 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 4 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 5 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 5 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 5 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 6 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 6 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 6 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 8 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 8 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 8 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 9 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 9 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 9 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 10 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 10 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 10 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 13 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 13 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 13 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 14 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |

TABLE C24.2.1-continued

Probability table for Node MCAMSU

| Initial | | Modified CAMSU Sand | | | | | | | | | | | | | | |
|---|---|---|---|---|---|---|---|---|---|---|---|---|---|---|---|---|
| CAMSU | MAP | 34 | 35 | 36 | 42 | 43 | 44 | 45 | 52 | 53 | 54 | 55 | 63 | 64 | 65 | 66 |
| 14 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 14 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 15 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 15 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 15 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 18 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 18 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 18 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |

TABLE C24.2.2

Probability table for Node MCAMSU

| Initial | | Modified CAMSU Sand | | | | | | | | | | | | | | |
|---|---|---|---|---|---|---|---|---|---|---|---|---|---|---|---|---|
| CAMSU | MAP | 34 | 35 | 36 | 42 | 43 | 44 | 45 | 52 | 53 | 54 | 55 | 63 | 64 | 65 | 66 |
| 19 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 19 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 19 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 20 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 20 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 20 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 21 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 21 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 21 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 25 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 25 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 25 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 26 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 26 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 26 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 27 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 27 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 27 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 28 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 28 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 28 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 33 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 33 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 33 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 34 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 34 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 34 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 35 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 35 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 35 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 36 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 36 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 36 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 42 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 42 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 42 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |

TABLE C24.2.3

Probability table for Node MCAMSU

| Initial | | Modified CAMSU Sand | | | | | | | | | | | | | | |
|---|---|---|---|---|---|---|---|---|---|---|---|---|---|---|---|---|
| CAMSU | MAP | 34 | 35 | 36 | 42 | 43 | 44 | 45 | 52 | 53 | 54 | 55 | 63 | 64 | 65 | 66 |
| 43 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 43 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 43 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 44 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 44 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 44 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |

TABLE C24.2.3-continued

| Probability table for Node MCAMSU | | | | | | | | | | | | | | | | |
|---|---|---|---|---|---|---|---|---|---|---|---|---|---|---|---|---|
| Initial | | Modified CAMSU Sand | | | | | | | | | | | | | | |
| CAMSU | MAP | 34 | 35 | 36 | 42 | 43 | 44 | 45 | 52 | 53 | 54 | 55 | 63 | 64 | 65 | 66 |
| 45 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 45 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 45 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 52 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 52 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 52 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 53 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 53 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 53 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 54 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 54 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 54 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 55 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 55 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 55 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 63 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 63 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 63 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 64 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 64 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 64 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 65 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 65 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 65 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 66 | low | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 66 | moderate | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 66 | high | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |

TABLE C25.1.1

| Probability table for Node MCISU | | | | | | | | | | | |
|---|---|---|---|---|---|---|---|---|---|---|---|
| Initial | | Modified CISU Sand | | | | | | | | | |
| CISU | MAP | 10 | 14 | 15 | 19 | 20 | 21 | 25 | 26 | 27 | 28 |
| 10 | low | 0.038 | 0.038 | 0.038 | 0.038 | 0.038 | 0.038 | 0.038 | 0.038 | 0.038 | 0.038 |
| 10 | moderate | 0.038 | 0.038 | 0.038 | 0.038 | 0.038 | 0.038 | 0.038 | 0.038 | 0.038 | 0.038 |
| 10 | high | 0.038 | 0.038 | 0.038 | 0.038 | 0.038 | 0.038 | 0.038 | 0.038 | 0.038 | 0.038 |
| 14 | low | 0.038 | 0.038 | 0.038 | 0.038 | 0.038 | 0.038 | 0.038 | 0.038 | 0.038 | 0.038 |
| 14 | moderate | 0.038 | 0.038 | 0.038 | 0.038 | 0.038 | 0.038 | 0.038 | 0.038 | 0.038 | 0.038 |
| 14 | high | 0.038 | 0.038 | 0.038 | 0.038 | 0.038 | 0.038 | 0.038 | 0.038 | 0.038 | 0.038 |
| 15 | low | 0.038 | 0.038 | 0.038 | 0.038 | 0.038 | 0.038 | 0.038 | 0.038 | 0.038 | 0.038 |
| 15 | moderate | 0.038 | 0.038 | 0.038 | 0.038 | 0.038 | 0.038 | 0.038 | 0.038 | 0.038 | 0.038 |
| 15 | high | 0.038 | 0.038 | 0.038 | 0.038 | 0.038 | 0.038 | 0.038 | 0.038 | 0.038 | 0.038 |
| 19 | low | 0.038 | 0.038 | 0.038 | 0.038 | 0.038 | 0.038 | 0.038 | 0.038 | 0.038 | 0.038 |
| 19 | moderate | 0.038 | 0.038 | 0.038 | 0.038 | 0.038 | 0.038 | 0.038 | 0.038 | 0.038 | 0.038 |
| 19 | high | 0.038 | 0.038 | 0.038 | 0.038 | 0.038 | 0.038 | 0.038 | 0.038 | 0.038 | 0.038 |
| 20 | low | 0.038 | 0.038 | 0.038 | 0.038 | 0.038 | 0.038 | 0.038 | 0.038 | 0.038 | 0.038 |
| 20 | moderate | 0.038 | 0.038 | 0.038 | 0.038 | 0.038 | 0.038 | 0.038 | 0.038 | 0.038 | 0.038 |
| 20 | high | 0.038 | 0.038 | 0.038 | 0.038 | 0.038 | 0.038 | 0.038 | 0.038 | 0.038 | 0.038 |
| 21 | low | 0.038 | 0.038 | 0.038 | 0.038 | 0.038 | 0.038 | 0.038 | 0.038 | 0.038 | 0.038 |
| 21 | moderate | 0.038 | 0.038 | 0.038 | 0.038 | 0.038 | 0.038 | 0.038 | 0.038 | 0.038 | 0.038 |
| 21 | high | 0.038 | 0.038 | 0.038 | 0.038 | 0.038 | 0.038 | 0.038 | 0.038 | 0.038 | 0.038 |
| 25 | low | 0.038 | 0.038 | 0.038 | 0.038 | 0.038 | 0.038 | 0.038 | 0.038 | 0.038 | 0.038 |
| 25 | moderate | 0.038 | 0.038 | 0.038 | 0.038 | 0.038 | 0.038 | 0.038 | 0.038 | 0.038 | 0.038 |
| 25 | high | 0.038 | 0.038 | 0.038 | 0.038 | 0.038 | 0.038 | 0.038 | 0.038 | 0.038 | 0.038 |
| 26 | low | 0.038 | 0.038 | 0.038 | 0.038 | 0.038 | 0.038 | 0.038 | 0.038 | 0.038 | 0.038 |
| 26 | moderate | 0.038 | 0.038 | 0.038 | 0.038 | 0.038 | 0.038 | 0.038 | 0.038 | 0.038 | 0.038 |
| 26 | high | 0.038 | 0.038 | 0.038 | 0.038 | 0.038 | 0.038 | 0.038 | 0.038 | 0.038 | 0.038 |
| 27 | low | 0.038 | 0.038 | 0.038 | 0.038 | 0.038 | 0.038 | 0.038 | 0.038 | 0.038 | 0.038 |
| 27 | moderate | 0.038 | 0.038 | 0.038 | 0.038 | 0.038 | 0.038 | 0.038 | 0.038 | 0.038 | 0.038 |
| 27 | high | 0.038 | 0.038 | 0.038 | 0.038 | 0.038 | 0.038 | 0.038 | 0.038 | 0.038 | 0.038 |
| 28 | low | 0.038 | 0.038 | 0.038 | 0.038 | 0.038 | 0.038 | 0.038 | 0.038 | 0.038 | 0.038 |
| 28 | moderate | 0.038 | 0.038 | 0.038 | 0.038 | 0.038 | 0.038 | 0.038 | 0.038 | 0.038 | 0.038 |
| 28 | high | 0.038 | 0.038 | 0.038 | 0.038 | 0.038 | 0.038 | 0.038 | 0.038 | 0.038 | 0.038 |
| 33 | low | 0.038 | 0.038 | 0.038 | 0.038 | 0.038 | 0.038 | 0.038 | 0.038 | 0.038 | 0.038 |
| 33 | moderate | 0.038 | 0.038 | 0.038 | 0.038 | 0.038 | 0.038 | 0.038 | 0.038 | 0.038 | 0.038 |
| 33 | high | 0.038 | 0.038 | 0.038 | 0.038 | 0.038 | 0.038 | 0.038 | 0.038 | 0.038 | 0.038 |
| 34 | low | 0.038 | 0.038 | 0.038 | 0.038 | 0.038 | 0.038 | 0.038 | 0.038 | 0.038 | 0.038 |

TABLE C25.1.1-continued

| Probability table for Node MCISU | | | | | | | | | | | |
|---|---|---|---|---|---|---|---|---|---|---|---|
| 34 | moderate | 0.038 | 0.038 | 0.038 | 0.038 | 0.038 | 0.038 | 0.038 | 0.038 | 0.038 | 0.038 |
| 34 | high | 0.038 | 0.038 | 0.038 | 0.038 | 0.038 | 0.038 | 0.038 | 0.038 | 0.038 | 0.038 |
| | Initial | Modified CISU Sand | | | | | | | | | |
| | CISU | 33 | 34 | 35 | 36 | 42 | 43 | 44 | 45 | 52 | 53 |
| | 10 | 0.038 | 0.038 | 0.038 | 0.038 | 0.038 | 0.038 | 0.038 | 0.038 | 0.038 | 0.038 |
| | 10 | 0.038 | 0.038 | 0.038 | 0.038 | 0.038 | 0.038 | 0.038 | 0.038 | 0.038 | 0.038 |
| | 10 | 0.038 | 0.038 | 0.038 | 0.038 | 0.038 | 0.038 | 0.038 | 0.038 | 0.038 | 0.038 |
| | 14 | 0.038 | 0.038 | 0.038 | 0.038 | 0.038 | 0.038 | 0.038 | 0.038 | 0.038 | 0.038 |
| | 14 | 0.038 | 0.038 | 0.038 | 0.038 | 0.038 | 0.038 | 0.038 | 0.038 | 0.038 | 0.038 |
| | 14 | 0.038 | 0.038 | 0.038 | 0.038 | 0.038 | 0.038 | 0.038 | 0.038 | 0.038 | 0.038 |
| | 15 | 0.038 | 0.038 | 0.038 | 0.038 | 0.038 | 0.038 | 0.038 | 0.038 | 0.038 | 0.038 |
| | 15 | 0.038 | 0.038 | 0.038 | 0.038 | 0.038 | 0.038 | 0.038 | 0.038 | 0.038 | 0.038 |
| | 15 | 0.038 | 0.038 | 0.038 | 0.038 | 0.038 | 0.038 | 0.038 | 0.038 | 0.038 | 0.038 |
| | 19 | 0.038 | 0.038 | 0.038 | 0.038 | 0.038 | 0.038 | 0.038 | 0.038 | 0.038 | 0.038 |
| | 19 | 0.038 | 0.038 | 0.038 | 0.038 | 0.038 | 0.038 | 0.038 | 0.038 | 0.038 | 0.038 |
| | 19 | 0.038 | 0.038 | 0.038 | 0.038 | 0.038 | 0.038 | 0.038 | 0.038 | 0.038 | 0.038 |
| | 20 | 0.038 | 0.038 | 0.038 | 0.038 | 0.038 | 0.038 | 0.038 | 0.038 | 0.038 | 0.038 |
| | 20 | 0.038 | 0.038 | 0.038 | 0.038 | 0.038 | 0.038 | 0.038 | 0.038 | 0.038 | 0.038 |
| | 20 | 0.038 | 0.038 | 0.038 | 0.038 | 0.038 | 0.038 | 0.038 | 0.038 | 0.038 | 0.038 |
| | 21 | 0.038 | 0.038 | 0.038 | 0.038 | 0.038 | 0.038 | 0.038 | 0.038 | 0.038 | 0.038 |
| | 21 | 0.038 | 0.038 | 0.038 | 0.038 | 0.038 | 0.038 | 0.038 | 0.038 | 0.038 | 0.038 |
| | 21 | 0.038 | 0.038 | 0.038 | 0.038 | 0.038 | 0.038 | 0.038 | 0.038 | 0.038 | 0.038 |
| | 25 | 0.038 | 0.038 | 0.038 | 0.038 | 0.038 | 0.038 | 0.038 | 0.038 | 0.038 | 0.038 |
| | 25 | 0.038 | 0.038 | 0.038 | 0.038 | 0.038 | 0.038 | 0.038 | 0.038 | 0.038 | 0.038 |
| | 25 | 0.038 | 0.038 | 0.038 | 0.038 | 0.038 | 0.038 | 0.038 | 0.038 | 0.038 | 0.038 |
| | 26 | 0.038 | 0.038 | 0.038 | 0.038 | 0.038 | 0.038 | 0.038 | 0.038 | 0.038 | 0.038 |
| | 26 | 0.038 | 0.038 | 0.038 | 0.038 | 0.038 | 0.038 | 0.038 | 0.038 | 0.038 | 0.038 |
| | 26 | 0.038 | 0.038 | 0.038 | 0.038 | 0.038 | 0.038 | 0.038 | 0.038 | 0.038 | 0.038 |
| | 27 | 0.038 | 0.038 | 0.038 | 0.038 | 0.038 | 0.038 | 0.038 | 0.038 | 0.038 | 0.038 |
| | 27 | 0.038 | 0.038 | 0.038 | 0.038 | 0.038 | 0.038 | 0.038 | 0.038 | 0.038 | 0.038 |
| | 27 | 0.038 | 0.038 | 0.038 | 0.038 | 0.038 | 0.038 | 0.038 | 0.038 | 0.038 | 0.038 |
| | 28 | 0.038 | 0.038 | 0.038 | 0.038 | 0.038 | 0.038 | 0.038 | 0.038 | 0.038 | 0.038 |
| | 28 | 0.038 | 0.038 | 0.038 | 0.038 | 0.038 | 0.038 | 0.038 | 0.038 | 0.038 | 0.038 |
| | 28 | 0.038 | 0.038 | 0.038 | 0.038 | 0.038 | 0.038 | 0.038 | 0.038 | 0.038 | 0.038 |
| | 33 | 0.038 | 0.038 | 0.038 | 0.038 | 0.038 | 0.038 | 0.038 | 0.038 | 0.038 | 0.038 |
| | 33 | 0.038 | 0.038 | 0.038 | 0.038 | 0.038 | 0.038 | 0.038 | 0.038 | 0.038 | 0.038 |
| | 33 | 0.038 | 0.038 | 0.038 | 0.038 | 0.038 | 0.038 | 0.038 | 0.038 | 0.038 | 0.038 |
| | 34 | 0.038 | 0.038 | 0.038 | 0.038 | 0.038 | 0.038 | 0.038 | 0.038 | 0.038 | 0.038 |
| | 34 | 0.038 | 0.038 | 0.038 | 0.038 | 0.038 | 0.038 | 0.038 | 0.038 | 0.038 | 0.038 |
| | 34 | 0.038 | 0.038 | 0.038 | 0.038 | 0.038 | 0.038 | 0.038 | 0.038 | 0.038 | 0.038 |

TABLE C25.1.2

| Probability table for Node MCISU | | | | | | | | | | | |
|---|---|---|---|---|---|---|---|---|---|---|---|
| Initial | | Modified CISU Sand | | | | | | | | | |
| CISU | MAP | 10 | 14 | 15 | 19 | 20 | 21 | 25 | 26 | 27 | 28 |
| 35 | low | 0.038 | 0.038 | 0.038 | 0.038 | 0.038 | 0.038 | 0.038 | 0.038 | 0.038 | 0.038 |
| 35 | moderate | 0.038 | 0.038 | 0.038 | 0.038 | 0.038 | 0.038 | 0.038 | 0.038 | 0.038 | 0.038 |
| 35 | high | 0.038 | 0.038 | 0.038 | 0.038 | 0.038 | 0.038 | 0.038 | 0.038 | 0.038 | 0.038 |
| 36 | low | 0.038 | 0.038 | 0.038 | 0.038 | 0.038 | 0.038 | 0.038 | 0.038 | 0.038 | 0.038 |
| 36 | moderate | 0.038 | 0.038 | 0.038 | 0.038 | 0.038 | 0.038 | 0.038 | 0.038 | 0.038 | 0.038 |
| 36 | high | 0.038 | 0.038 | 0.038 | 0.038 | 0.038 | 0.038 | 0.038 | 0.038 | 0.038 | 0.038 |
| 42 | low | 0.038 | 0.038 | 0.038 | 0.038 | 0.038 | 0.038 | 0.038 | 0.038 | 0.038 | 0.038 |
| 42 | moderate | 0.038 | 0.038 | 0.038 | 0.038 | 0.038 | 0.038 | 0.038 | 0.038 | 0.038 | 0.038 |
| 42 | high | 0.038 | 0.038 | 0.038 | 0.038 | 0.038 | 0.038 | 0.038 | 0.038 | 0.038 | 0.038 |
| 43 | low | 0.038 | 0.038 | 0.038 | 0.038 | 0.038 | 0.038 | 0.038 | 0.038 | 0.038 | 0.038 |
| 43 | moderate | 0.038 | 0.038 | 0.038 | 0.038 | 0.038 | 0.038 | 0.038 | 0.038 | 0.038 | 0.038 |
| 43 | high | 0.038 | 0.038 | 0.038 | 0.038 | 0.038 | 0.038 | 0.038 | 0.038 | 0.038 | 0.038 |
| 44 | low | 0.038 | 0.038 | 0.038 | 0.038 | 0.038 | 0.038 | 0.038 | 0.038 | 0.038 | 0.038 |
| 44 | moderate | 0.038 | 0.038 | 0.038 | 0.038 | 0.038 | 0.038 | 0.038 | 0.038 | 0.038 | 0.038 |
| 44 | high | 0.038 | 0.038 | 0.038 | 0.038 | 0.038 | 0.038 | 0.038 | 0.038 | 0.038 | 0.038 |
| 45 | low | 0.038 | 0.038 | 0.038 | 0.038 | 0.038 | 0.038 | 0.038 | 0.038 | 0.038 | 0.038 |
| 45 | moderate | 0.038 | 0.038 | 0.038 | 0.038 | 0.038 | 0.038 | 0.038 | 0.038 | 0.038 | 0.038 |
| 45 | high | 0.038 | 0.038 | 0.038 | 0.038 | 0.038 | 0.038 | 0.038 | 0.038 | 0.038 | 0.038 |
| 52 | low | 0.038 | 0.038 | 0.038 | 0.038 | 0.038 | 0.038 | 0.038 | 0.038 | 0.038 | 0.038 |
| 52 | moderate | 0.038 | 0.038 | 0.038 | 0.038 | 0.038 | 0.038 | 0.038 | 0.038 | 0.038 | 0.038 |
| 52 | high | 0.038 | 0.038 | 0.038 | 0.038 | 0.038 | 0.038 | 0.038 | 0.038 | 0.038 | 0.038 |
| 53 | low | 0.038 | 0.038 | 0.038 | 0.038 | 0.038 | 0.038 | 0.038 | 0.038 | 0.038 | 0.038 |

TABLE C25.1.2-continued

Probability table for Node MCISU

| | | | | | | | | | | | |
|---|---|---|---|---|---|---|---|---|---|---|---|
| 53 | moderate | 0.038 | 0.038 | 0.038 | 0.038 | 0.038 | 0.038 | 0.038 | 0.038 | 0.038 | 0.038 |
| 53 | high | 0.038 | 0.038 | 0.038 | 0.038 | 0.038 | 0.038 | 0.038 | 0.038 | 0.038 | 0.038 |
| 54 | low | 0.038 | 0.038 | 0.038 | 0.038 | 0.038 | 0.038 | 0.038 | 0.038 | 0.038 | 0.038 |
| 54 | moderate | 0.038 | 0.038 | 0.038 | 0.038 | 0.038 | 0.038 | 0.038 | 0.038 | 0.038 | 0.038 |
| 54 | high | 0.038 | 0.038 | 0.038 | 0.038 | 0.038 | 0.038 | 0.038 | 0.038 | 0.038 | 0.038 |
| 55 | low | 0.038 | 0.038 | 0.038 | 0.038 | 0.038 | 0.038 | 0.038 | 0.038 | 0.038 | 0.038 |
| 55 | moderate | 0.038 | 0.038 | 0.038 | 0.038 | 0.038 | 0.038 | 0.038 | 0.038 | 0.038 | 0.038 |
| 55 | high | 0.038 | 0.038 | 0.038 | 0.038 | 0.038 | 0.038 | 0.038 | 0.038 | 0.038 | 0.038 |
| 63 | low | 0.038 | 0.038 | 0.038 | 0.038 | 0.038 | 0.038 | 0.038 | 0.038 | 0.038 | 0.038 |
| 63 | moderate | 0.038 | 0.038 | 0.038 | 0.038 | 0.038 | 0.038 | 0.038 | 0.038 | 0.038 | 0.038 |
| 63 | high | 0.038 | 0.038 | 0.038 | 0.038 | 0.038 | 0.038 | 0.038 | 0.038 | 0.038 | 0.038 |
| 64 | low | 0.038 | 0.038 | 0.038 | 0.038 | 0.038 | 0.038 | 0.038 | 0.038 | 0.038 | 0.038 |
| 64 | moderate | 0.038 | 0.038 | 0.038 | 0.038 | 0.038 | 0.038 | 0.038 | 0.038 | 0.038 | 0.038 |
| 64 | high | 0.038 | 0.038 | 0.038 | 0.038 | 0.038 | 0.038 | 0.038 | 0.038 | 0.038 | 0.038 |

| Initial | Modified CISU Sand | | | | | | | | | |
|---|---|---|---|---|---|---|---|---|---|---|
| CISU | 33 | 34 | 35 | 36 | 42 | 43 | 44 | 45 | 52 | 53 |
| 35 | 0.038 | 0.038 | 0.038 | 0.038 | 0.038 | 0.038 | 0.038 | 0.038 | 0.038 | 0.038 |
| 35 | 0.038 | 0.038 | 0.038 | 0.038 | 0.038 | 0.038 | 0.038 | 0.038 | 0.038 | 0.038 |
| 35 | 0.038 | 0.038 | 0.038 | 0.038 | 0.038 | 0.038 | 0.038 | 0.038 | 0.038 | 0.038 |
| 36 | 0.038 | 0.038 | 0.038 | 0.038 | 0.038 | 0.038 | 0.038 | 0.038 | 0.038 | 0.038 |
| 36 | 0.038 | 0.038 | 0.038 | 0.038 | 0.038 | 0.038 | 0.038 | 0.038 | 0.038 | 0.038 |
| 36 | 0.038 | 0.038 | 0.038 | 0.038 | 0.038 | 0.038 | 0.038 | 0.038 | 0.038 | 0.038 |
| 42 | 0.038 | 0.038 | 0.038 | 0.038 | 0.038 | 0.038 | 0.038 | 0.038 | 0.038 | 0.038 |
| 42 | 0.038 | 0.038 | 0.038 | 0.038 | 0.038 | 0.038 | 0.038 | 0.038 | 0.038 | 0.038 |
| 42 | 0.038 | 0.038 | 0.038 | 0.038 | 0.038 | 0.038 | 0.038 | 0.038 | 0.038 | 0.038 |
| 43 | 0.038 | 0.038 | 0.038 | 0.038 | 0.038 | 0.038 | 0.038 | 0.038 | 0.038 | 0.038 |
| 43 | 0.038 | 0.038 | 0.038 | 0.038 | 0.038 | 0.038 | 0.038 | 0.038 | 0.038 | 0.038 |
| 43 | 0.038 | 0.038 | 0.038 | 0.038 | 0.038 | 0.038 | 0.038 | 0.038 | 0.038 | 0.038 |
| 44 | 0.038 | 0.038 | 0.038 | 0.038 | 0.038 | 0.038 | 0.038 | 0.038 | 0.038 | 0.038 |
| 44 | 0.038 | 0.038 | 0.038 | 0.038 | 0.038 | 0.038 | 0.038 | 0.038 | 0.038 | 0.038 |
| 44 | 0.038 | 0.038 | 0.038 | 0.038 | 0.038 | 0.038 | 0.038 | 0.038 | 0.038 | 0.038 |
| 45 | 0.038 | 0.038 | 0.038 | 0.038 | 0.038 | 0.038 | 0.038 | 0.038 | 0.038 | 0.038 |
| 45 | 0.038 | 0.038 | 0.038 | 0.038 | 0.038 | 0.038 | 0.038 | 0.038 | 0.038 | 0.038 |
| 45 | 0.038 | 0.038 | 0.038 | 0.038 | 0.038 | 0.038 | 0.038 | 0.038 | 0.038 | 0.038 |
| 52 | 0.038 | 0.038 | 0.038 | 0.038 | 0.038 | 0.038 | 0.038 | 0.038 | 0.038 | 0.038 |
| 52 | 0.038 | 0.038 | 0.038 | 0.038 | 0.038 | 0.038 | 0.038 | 0.038 | 0.038 | 0.038 |
| 52 | 0.038 | 0.038 | 0.038 | 0.038 | 0.038 | 0.038 | 0.038 | 0.038 | 0.038 | 0.038 |
| 53 | 0.038 | 0.038 | 0.038 | 0.038 | 0.038 | 0.038 | 0.038 | 0.038 | 0.038 | 0.038 |
| 53 | 0.038 | 0.038 | 0.038 | 0.038 | 0.038 | 0.038 | 0.038 | 0.038 | 0.038 | 0.038 |
| 53 | 0.038 | 0.038 | 0.038 | 0.038 | 0.038 | 0.038 | 0.038 | 0.038 | 0.038 | 0.038 |
| 54 | 0.038 | 0.038 | 0.038 | 0.038 | 0.038 | 0.038 | 0.038 | 0.038 | 0.038 | 0.038 |
| 54 | 0.038 | 0.038 | 0.038 | 0.038 | 0.038 | 0.038 | 0.038 | 0.038 | 0.038 | 0.038 |
| 54 | 0.038 | 0.038 | 0.038 | 0.038 | 0.038 | 0.038 | 0.038 | 0.038 | 0.038 | 0.038 |
| 55 | 0.038 | 0.038 | 0.038 | 0.038 | 0.038 | 0.038 | 0.038 | 0.038 | 0.038 | 0.038 |
| 55 | 0.038 | 0.038 | 0.038 | 0.038 | 0.038 | 0.038 | 0.038 | 0.038 | 0.038 | 0.038 |
| 55 | 0.038 | 0.038 | 0.038 | 0.038 | 0.038 | 0.038 | 0.038 | 0.038 | 0.038 | 0.038 |
| 63 | 0.038 | 0.038 | 0.038 | 0.038 | 0.038 | 0.038 | 0.038 | 0.038 | 0.038 | 0.038 |
| 63 | 0.038 | 0.038 | 0.038 | 0.038 | 0.038 | 0.038 | 0.038 | 0.038 | 0.038 | 0.038 |
| 63 | 0.038 | 0.038 | 0.038 | 0.038 | 0.038 | 0.038 | 0.038 | 0.038 | 0.038 | 0.038 |
| 64 | 0.038 | 0.038 | 0.038 | 0.038 | 0.038 | 0.038 | 0.038 | 0.038 | 0.038 | 0.038 |
| 64 | 0.038 | 0.038 | 0.038 | 0.038 | 0.038 | 0.038 | 0.038 | 0.038 | 0.038 | 0.038 |
| 64 | 0.038 | 0.038 | 0.038 | 0.038 | 0.038 | 0.038 | 0.038 | 0.038 | 0.038 | 0.038 |

TABLE C25.1.3

Probability table for Node MCISU

| Initial | | Modified CISU Sand | | | | | | | | | |
|---|---|---|---|---|---|---|---|---|---|---|---|
| CISU | MAP | 10 | 14 | 15 | 19 | 20 | 21 | 25 | 26 | 27 | 28 |
| 65 | low | 0.038 | 0.038 | 0.038 | 0.038 | 0.038 | 0.038 | 0.038 | 0.038 | 0.038 | 0.038 |
| 65 | moderate | 0.038 | 0.038 | 0.038 | 0.038 | 0.038 | 0.038 | 0.038 | 0.038 | 0.038 | 0.038 |
| 65 | high | 0.038 | 0.038 | 0.038 | 0.038 | 0.038 | 0.038 | 0.038 | 0.038 | 0.038 | 0.038 |
| 66 | low | 0.038 | 0.038 | 0.038 | 0.038 | 0.038 | 0.038 | 0.038 | 0.038 | 0.038 | 0.038 |
| 66 | moderate | 0.038 | 0.038 | 0.038 | 0.038 | 0.038 | 0.038 | 0.038 | 0.038 | 0.038 | 0.038 |
| 66 | high | 0.038 | 0.038 | 0.038 | 0.038 | 0.038 | 0.038 | 0.038 | 0.038 | 0.038 | 0.038 |

TABLE C25.1.3-continued

| Probability table for Node MCISU | | | | | | | | | | |
|---|---|---|---|---|---|---|---|---|---|---|
| Initial | Modified CISU Sand | | | | | | | | | |
| CISU | 33 | 34 | 35 | 36 | 42 | 43 | 44 | 45 | 52 | 53 |
| 65 | 0.038 | 0.038 | 0.038 | 0.038 | 0.038 | 0.038 | 0.038 | 0.038 | 0.038 | 0.038 |
| 65 | 0.038 | 0.038 | 0.038 | 0.038 | 0.038 | 0.038 | 0.038 | 0.038 | 0.038 | 0.038 |
| 65 | 0.038 | 0.038 | 0.038 | 0.038 | 0.038 | 0.038 | 0.038 | 0.038 | 0.038 | 0.038 |
| 66 | 0.038 | 0.038 | 0.038 | 0.038 | 0.038 | 0.038 | 0.038 | 0.038 | 0.038 | 0.038 |
| 66 | 0.038 | 0.038 | 0.038 | 0.038 | 0.038 | 0.038 | 0.038 | 0.038 | 0.038 | 0.038 |
| 66 | 0.038 | 0.038 | 0.038 | 0.038 | 0.038 | 0.038 | 0.038 | 0.038 | 0.038 | 0.038 |

TABLE C25.2.1

| Probability table for Node MCISU | | | | | | | |
|---|---|---|---|---|---|---|---|
| Initial | | Modified CISU Sand | | | | | |
| CISU | MAP | 54 | 55 | 63 | 64 | 65 | 66 |
| 10 | low | 0.038 | 0.038 | 0.038 | 0.038 | 0.038 | 0.038 |
| 10 | moderate | 0.038 | 0.038 | 0.038 | 0.038 | 0.038 | 0.038 |
| 10 | high | 0.038 | 0.038 | 0.038 | 0.038 | 0.038 | 0.038 |
| 14 | low | 0.038 | 0.038 | 0.038 | 0.038 | 0.038 | 0.038 |
| 14 | moderate | 0.038 | 0.038 | 0.038 | 0.038 | 0.038 | 0.038 |
| 14 | high | 0.038 | 0.038 | 0.038 | 0.038 | 0.038 | 0.038 |
| 15 | low | 0.038 | 0.038 | 0.038 | 0.038 | 0.038 | 0.038 |
| 15 | moderate | 0.038 | 0.038 | 0.038 | 0.038 | 0.038 | 0.038 |
| 15 | high | 0.038 | 0.038 | 0.038 | 0.038 | 0.038 | 0.038 |
| 19 | low | 0.038 | 0.038 | 0.038 | 0.038 | 0.038 | 0.038 |
| 19 | moderate | 0.038 | 0.038 | 0.038 | 0.038 | 0.038 | 0.038 |
| 19 | high | 0.038 | 0.038 | 0.038 | 0.038 | 0.038 | 0.038 |
| 20 | low | 0.038 | 0.038 | 0.038 | 0.038 | 0.038 | 0.038 |
| 20 | moderate | 0.038 | 0.038 | 0.038 | 0.038 | 0.038 | 0.038 |
| 20 | high | 0.038 | 0.038 | 0.038 | 0.038 | 0.038 | 0.038 |
| 21 | low | 0.038 | 0.038 | 0.038 | 0.038 | 0.038 | 0.038 |
| 21 | moderate | 0.038 | 0.038 | 0.038 | 0.038 | 0.038 | 0.038 |
| 21 | high | 0.038 | 0.038 | 0.038 | 0.038 | 0.038 | 0.038 |
| 25 | low | 0.038 | 0.038 | 0.038 | 0.038 | 0.038 | 0.038 |
| 25 | moderate | 0.038 | 0.038 | 0.038 | 0.038 | 0.038 | 0.038 |
| 25 | high | 0.038 | 0.038 | 0.038 | 0.038 | 0.038 | 0.038 |
| 26 | low | 0.038 | 0.038 | 0.038 | 0.038 | 0.038 | 0.038 |
| 26 | moderate | 0.038 | 0.038 | 0.038 | 0.038 | 0.038 | 0.038 |
| 26 | high | 0.038 | 0.038 | 0.038 | 0.038 | 0.038 | 0.038 |
| 27 | low | 0.038 | 0.038 | 0.038 | 0.038 | 0.038 | 0.038 |
| 27 | moderate | 0.038 | 0.038 | 0.038 | 0.038 | 0.038 | 0.038 |
| 27 | high | 0.038 | 0.038 | 0.038 | 0.038 | 0.038 | 0.038 |
| 28 | low | 0.038 | 0.038 | 0.038 | 0.038 | 0.038 | 0.038 |
| 28 | moderate | 0.038 | 0.038 | 0.038 | 0.038 | 0.038 | 0.038 |
| 28 | high | 0.038 | 0.038 | 0.038 | 0.038 | 0.038 | 0.038 |
| 33 | low | 0.038 | 0.038 | 0.038 | 0.038 | 0.038 | 0.038 |
| 33 | moderate | 0.038 | 0.038 | 0.038 | 0.038 | 0.038 | 0.038 |
| 33 | high | 0.038 | 0.038 | 0.038 | 0.038 | 0.038 | 0.038 |
| 34 | low | 0.038 | 0.038 | 0.038 | 0.038 | 0.038 | 0.038 |
| 34 | moderate | 0.038 | 0.038 | 0.038 | 0.038 | 0.038 | 0.038 |
| 34 | high | 0.038 | 0.038 | 0.038 | 0.038 | 0.038 | 0.038 |

TABLE C25.2.2

| Probability table for Node MCISU | | | | | | | |
|---|---|---|---|---|---|---|---|
| Initial | | Modified CISU Sand | | | | | |
| CISU | MAP | 54 | 55 | 63 | 64 | 65 | 66 |
| 35 | low | 0.038 | 0.038 | 0.038 | 0.038 | 0.038 | 0.038 |
| 35 | moderate | 0.038 | 0.038 | 0.038 | 0.038 | 0.038 | 0.038 |
| 35 | high | 0.038 | 0.038 | 0.038 | 0.038 | 0.038 | 0.038 |
| 36 | low | 0.038 | 0.038 | 0.038 | 0.038 | 0.038 | 0.038 |

TABLE C25.2.2-continued

| Probability table for Node MCISU | | | | | | | |
|---|---|---|---|---|---|---|---|
| Initial | | Modified CISU Sand | | | | | |
| CISU | MAP | 54 | 55 | 63 | 64 | 65 | 66 |
| 36 | moderate | 0.038 | 0.038 | 0.038 | 0.038 | 0.038 | 0.038 |
| 36 | high | 0.038 | 0.038 | 0.038 | 0.038 | 0.038 | 0.038 |
| 42 | low | 0.038 | 0.038 | 0.038 | 0.038 | 0.038 | 0.038 |
| 42 | moderate | 0.038 | 0.038 | 0.038 | 0.038 | 0.038 | 0.038 |
| 42 | high | 0.038 | 0.038 | 0.038 | 0.038 | 0.038 | 0.038 |
| 43 | low | 0.038 | 0.038 | 0.038 | 0.038 | 0.038 | 0.038 |
| 43 | moderate | 0.038 | 0.038 | 0.038 | 0.038 | 0.038 | 0.038 |
| 43 | high | 0.038 | 0.038 | 0.038 | 0.038 | 0.038 | 0.038 |
| 44 | low | 0.038 | 0.038 | 0.038 | 0.038 | 0.038 | 0.038 |
| 44 | moderate | 0.038 | 0.038 | 0.038 | 0.038 | 0.038 | 0.038 |
| 44 | high | 0.038 | 0.038 | 0.038 | 0.038 | 0.038 | 0.038 |
| 45 | low | 0.038 | 0.038 | 0.038 | 0.038 | 0.038 | 0.038 |
| 45 | moderate | 0.038 | 0.038 | 0.038 | 0.038 | 0.038 | 0.038 |
| 45 | high | 0.038 | 0.038 | 0.038 | 0.038 | 0.038 | 0.038 |
| 52 | low | 0.038 | 0.038 | 0.038 | 0.038 | 0.038 | 0.038 |
| 52 | moderate | 0.038 | 0.038 | 0.038 | 0.038 | 0.038 | 0.038 |
| 52 | high | 0.038 | 0.038 | 0.038 | 0.038 | 0.038 | 0.038 |
| 53 | low | 0.038 | 0.038 | 0.038 | 0.038 | 0.038 | 0.038 |
| 53 | moderate | 0.038 | 0.038 | 0.038 | 0.038 | 0.038 | 0.038 |
| 53 | high | 0.038 | 0.038 | 0.038 | 0.038 | 0.038 | 0.038 |
| 54 | low | 0.038 | 0.038 | 0.038 | 0.038 | 0.038 | 0.038 |
| 54 | moderate | 0.038 | 0.038 | 0.038 | 0.038 | 0.038 | 0.038 |
| 54 | high | 0.038 | 0.038 | 0.038 | 0.038 | 0.038 | 0.038 |
| 55 | low | 0.038 | 0.038 | 0.038 | 0.038 | 0.038 | 0.038 |
| 55 | moderate | 0.038 | 0.038 | 0.038 | 0.038 | 0.038 | 0.038 |
| 55 | high | 0.038 | 0.038 | 0.038 | 0.038 | 0.038 | 0.038 |
| 63 | low | 0.038 | 0.038 | 0.038 | 0.038 | 0.038 | 0.038 |
| 63 | moderate | 0.038 | 0.038 | 0.038 | 0.038 | 0.038 | 0.038 |
| 63 | high | 0.038 | 0.038 | 0.038 | 0.038 | 0.038 | 0.038 |
| 64 | low | 0.038 | 0.038 | 0.038 | 0.038 | 0.038 | 0.038 |
| 64 | moderate | 0.038 | 0.038 | 0.038 | 0.038 | 0.038 | 0.038 |
| 64 | high | 0.038 | 0.038 | 0.038 | 0.038 | 0.038 | 0.038 |

TABLE C25.2.3

| Probability table for Node MCISU | | | | | | | |
|---|---|---|---|---|---|---|---|
| Initial | | Modified CISU Sand | | | | | |
| CISU | MAP | 54 | 55 | 63 | 64 | 65 | 66 |
| 65 | low | 0.038 | 0.038 | 0.038 | 0.038 | 0.038 | 0.038 |
| 65 | moderate | 0.038 | 0.038 | 0.038 | 0.038 | 0.038 | 0.038 |
| 65 | high | 0.038 | 0.038 | 0.038 | 0.038 | 0.038 | 0.038 |
| 66 | low | 0.038 | 0.038 | 0.038 | 0.038 | 0.038 | 0.038 |
| 66 | moderate | 0.038 | 0.038 | 0.038 | 0.038 | 0.038 | 0.038 |
| 66 | high | 0.038 | 0.038 | 0.038 | 0.038 | 0.038 | 0.038 |

TABLE C26.1

Probability table for Node GST

| GSI | ODFP | Grain Size, Initial P1GS1 | P1GS2 | P1GS3 | P2GS1 | P2GS2 | P2GS3 | P3GS1 | P3GS2 | P3GS3 | P4GS1 | P4GS2 |
|---|---|---|---|---|---|---|---|---|---|---|---|---|
| P1GS1 | low | 0.80 | 0.20 | 0.00 | 0.00 | 0.00 | 0.00 | 0.00 | 0.00 | 0.00 | 0.00 | 0.00 |
| P1GS2 | low | 0.10 | 0.80 | 0.10 | 0.00 | 0.00 | 0.00 | 0.00 | 0.00 | 0.00 | 0.00 | 0.00 |
| P1GS3 | low | 0.00 | 0.20 | 0.80 | 0.00 | 0.00 | 0.00 | 0.00 | 0.00 | 0.00 | 0.00 | 0.00 |
| P2GS1 | low | 0.00 | 0.00 | 0.00 | 0.80 | 0.20 | 0.00 | 0.00 | 0.00 | 0.00 | 0.00 | 0.00 |
| P2GS2 | low | 0.00 | 0.00 | 0.00 | 0.10 | 0.80 | 0.10 | 0.00 | 0.00 | 0.00 | 0.00 | 0.00 |
| P2GS3 | low | 0.00 | 0.00 | 0.00 | 0.00 | 0.20 | 0.80 | 0.00 | 0.00 | 0.00 | 0.00 | 0.00 |
| P3GS1 | low | 0.00 | 0.00 | 0.00 | 0.00 | 0.00 | 0.00 | 0.80 | 0.20 | 0.00 | 0.00 | 0.00 |
| P3GS2 | low | 0.00 | 0.00 | 0.00 | 0.00 | 0.00 | 0.00 | 0.10 | 0.80 | 0.10 | 0.00 | 0.00 |
| P3GS3 | low | 0.00 | 0.00 | 0.00 | 0.00 | 0.00 | 0.00 | 0.00 | 0.20 | 0.80 | 0.00 | 0.00 |
| P4GS1 | low | 0.00 | 0.00 | 0.00 | 0.00 | 0.00 | 0.00 | 0.00 | 0.00 | 0.00 | 0.80 | 0.20 |
| P4GS2 | low | 0.00 | 0.00 | 0.00 | 0.00 | 0.00 | 0.00 | 0.00 | 0.00 | 0.00 | 0.10 | 0.80 |
| P4GS3 | low | 0.00 | 0.00 | 0.00 | 0.00 | 0.00 | 0.00 | 0.00 | 0.00 | 0.00 | 0.00 | 0.20 |
| P5GS1 | low | 0.00 | 0.00 | 0.00 | 0.00 | 0.00 | 0.00 | 0.00 | 0.00 | 0.00 | 0.00 | 0.00 |
| P5GS2 | low | 0.00 | 0.00 | 0.00 | 0.00 | 0.00 | 0.00 | 0.00 | 0.00 | 0.00 | 0.00 | 0.00 |
| P5GS3 | low | 0.00 | 0.00 | 0.00 | 0.00 | 0.00 | 0.00 | 0.00 | 0.00 | 0.00 | 0.00 | 0.00 |
| P6GS1 | low | 0.00 | 0.00 | 0.00 | 0.00 | 0.00 | 0.00 | 0.00 | 0.00 | 0.00 | 0.00 | 0.00 |
| P6GS2 | low | 0.00 | 0.00 | 0.00 | 0.00 | 0.00 | 0.00 | 0.00 | 0.00 | 0.00 | 0.00 | 0.00 |
| P6GS3 | low | 0.00 | 0.00 | 0.00 | 0.00 | 0.00 | 0.00 | 0.00 | 0.00 | 0.00 | 0.00 | 0.00 |
| P7GS1 | low | 0.00 | 0.00 | 0.00 | 0.00 | 0.00 | 0.00 | 0.00 | 0.00 | 0.00 | 0.00 | 0.00 |
| P7GS2 | low | 0.00 | 0.00 | 0.00 | 0.00 | 0.00 | 0.00 | 0.00 | 0.00 | 0.00 | 0.00 | 0.00 |
| P7GS3 | low | 0.00 | 0.00 | 0.00 | 0.00 | 0.00 | 0.00 | 0.00 | 0.00 | 0.00 | 0.00 | 0.00 |
| P8GS1 | low | 0.00 | 0.00 | 0.00 | 0.00 | 0.00 | 0.00 | 0.00 | 0.00 | 0.00 | 0.00 | 0.00 |
| P8GS2 | low | 0.00 | 0.00 | 0.00 | 0.00 | 0.00 | 0.00 | 0.00 | 0.00 | 0.00 | 0.00 | 0.00 |
| P8GS3 | low | 0.00 | 0.00 | 0.00 | 0.00 | 0.00 | 0.00 | 0.00 | 0.00 | 0.00 | 0.00 | 0.00 |
| P9GS1 | low | 0.00 | 0.00 | 0.00 | 0.00 | 0.00 | 0.00 | 0.00 | 0.00 | 0.00 | 0.00 | 0.00 |
| P9GS2 | low | 0.00 | 0.00 | 0.00 | 0.00 | 0.00 | 0.00 | 0.00 | 0.00 | 0.00 | 0.00 | 0.00 |
| P9GS3 | low | 0.00 | 0.00 | 0.00 | 0.00 | 0.00 | 0.00 | 0.00 | 0.00 | 0.00 | 0.00 | 0.00 |
| P10GS1 | low | 0.00 | 0.00 | 0.00 | 0.00 | 0.00 | 0.00 | 0.00 | 0.00 | 0.00 | 0.00 | 0.00 |
| P10GS2 | low | 0.00 | 0.00 | 0.00 | 0.00 | 0.00 | 0.00 | 0.00 | 0.00 | 0.00 | 0.00 | 0.00 |
| P10GS3 | low | 0.00 | 0.00 | 0.00 | 0.00 | 0.00 | 0.00 | 0.00 | 0.00 | 0.00 | 0.00 | 0.00 |
| P11GS1 | low | 0.00 | 0.00 | 0.00 | 0.00 | 0.00 | 0.00 | 0.00 | 0.00 | 0.00 | 0.00 | 0.00 |
| P11GS2 | low | 0.00 | 0.00 | 0.00 | 0.00 | 0.00 | 0.00 | 0.00 | 0.00 | 0.00 | 0.00 | 0.00 |
| P11GS3 | low | 0.00 | 0.00 | 0.00 | 0.00 | 0.00 | 0.00 | 0.00 | 0.00 | 0.00 | 0.00 | 0.00 |
| P12GS1 | low | 0.00 | 0.00 | 0.00 | 0.00 | 0.00 | 0.00 | 0.00 | 0.00 | 0.00 | 0.00 | 0.00 |
| P12GS2 | low | 0.00 | 0.00 | 0.00 | 0.00 | 0.00 | 0.00 | 0.00 | 0.00 | 0.00 | 0.00 | 0.00 |
| P12GS3 | low | 0.00 | 0.00 | 0.00 | 0.00 | 0.00 | 0.00 | 0.00 | 0.00 | 0.00 | 0.00 | 0.00 |
| P13GS1 | low | 0.00 | 0.00 | 0.00 | 0.00 | 0.00 | 0.00 | 0.00 | 0.00 | 0.00 | 0.00 | 0.00 |
| P13GS2 | low | 0.00 | 0.00 | 0.00 | 0.00 | 0.00 | 0.00 | 0.00 | 0.00 | 0.00 | 0.00 | 0.00 |
| P13GS3 | low | 0.00 | 0.00 | 0.00 | 0.00 | 0.00 | 0.00 | 0.00 | 0.00 | 0.00 | 0.00 | 0.00 |
| P14GS1 | low | 0.00 | 0.00 | 0.00 | 0.00 | 0.00 | 0.00 | 0.00 | 0.00 | 0.00 | 0.00 | 0.00 |
| P14GS2 | low | 0.00 | 0.00 | 0.00 | 0.00 | 0.00 | 0.00 | 0.00 | 0.00 | 0.00 | 0.00 | 0.00 |
| P14GS3 | low | 0.00 | 0.00 | 0.00 | 0.00 | 0.00 | 0.00 | 0.00 | 0.00 | 0.00 | 0.00 | 0.00 |

| GSI | Grain Size, Initial P4GS3 | P5GS1 | P5GS2 | P5GS3 | P6GS1 | P6GS2 | P6GS3 | P7GS1 | P7GS2 | P7GS3 | P8GS1 |
|---|---|---|---|---|---|---|---|---|---|---|---|
| P1GS1 | 0.00 | 0.00 | 0.00 | 0.00 | 0.00 | 0.00 | 0.00 | 0.00 | 0.00 | 0.00 | 0.00 |
| P1GS2 | 0.00 | 0.00 | 0.00 | 0.00 | 0.00 | 0.00 | 0.00 | 0.00 | 0.00 | 0.00 | 0.00 |
| P1GS3 | 0.00 | 0.00 | 0.00 | 0.00 | 0.00 | 0.00 | 0.00 | 0.00 | 0.00 | 0.00 | 0.00 |
| P2GS1 | 0.00 | 0.00 | 0.00 | 0.00 | 0.00 | 0.00 | 0.00 | 0.00 | 0.00 | 0.00 | 0.00 |
| P2GS2 | 0.00 | 0.00 | 0.00 | 0.00 | 0.00 | 0.00 | 0.00 | 0.00 | 0.00 | 0.00 | 0.00 |
| P2GS3 | 0.00 | 0.00 | 0.00 | 0.00 | 0.00 | 0.00 | 0.00 | 0.00 | 0.00 | 0.00 | 0.00 |
| P3GS1 | 0.00 | 0.00 | 0.00 | 0.00 | 0.00 | 0.00 | 0.00 | 0.00 | 0.00 | 0.00 | 0.00 |
| P3GS2 | 0.00 | 0.00 | 0.00 | 0.00 | 0.00 | 0.00 | 0.00 | 0.00 | 0.00 | 0.00 | 0.00 |
| P3GS3 | 0.00 | 0.00 | 0.00 | 0.00 | 0.00 | 0.00 | 0.00 | 0.00 | 0.00 | 0.00 | 0.00 |
| P4GS1 | 0.00 | 0.00 | 0.00 | 0.00 | 0.00 | 0.00 | 0.00 | 0.00 | 0.00 | 0.00 | 0.00 |
| P4GS2 | 0.10 | 0.00 | 0.00 | 0.00 | 0.00 | 0.00 | 0.00 | 0.00 | 0.00 | 0.00 | 0.00 |
| P4GS3 | 0.80 | 0.00 | 0.00 | 0.00 | 0.00 | 0.00 | 0.00 | 0.00 | 0.00 | 0.00 | 0.00 |
| P5GS1 | 0.00 | 0.80 | 0.20 | 0.00 | 0.00 | 0.00 | 0.00 | 0.00 | 0.00 | 0.00 | 0.00 |
| P5GS2 | 0.00 | 0.10 | 0.80 | 0.10 | 0.00 | 0.00 | 0.00 | 0.00 | 0.00 | 0.00 | 0.00 |
| P5GS3 | 0.00 | 0.00 | 0.20 | 0.80 | 0.00 | 0.00 | 0.00 | 0.00 | 0.00 | 0.00 | 0.00 |
| P6GS1 | 0.00 | 0.00 | 0.00 | 0.00 | 0.80 | 0.20 | 0.00 | 0.00 | 0.00 | 0.00 | 0.00 |
| P6GS2 | 0.00 | 0.00 | 0.00 | 0.00 | 0.10 | 0.80 | 0.10 | 0.00 | 0.00 | 0.00 | 0.00 |
| P6GS3 | 0.00 | 0.00 | 0.00 | 0.00 | 0.00 | 0.20 | 0.80 | 0.00 | 0.00 | 0.00 | 0.00 |
| P7GS1 | 0.00 | 0.00 | 0.00 | 0.00 | 0.00 | 0.00 | 0.00 | 0.80 | 0.20 | 0.00 | 0.00 |
| P7GS2 | 0.00 | 0.00 | 0.00 | 0.00 | 0.00 | 0.00 | 0.00 | 0.10 | 0.80 | 0.10 | 0.00 |
| P7GS3 | 0.00 | 0.00 | 0.00 | 0.00 | 0.00 | 0.00 | 0.00 | 0.00 | 0.20 | 0.80 | 0.00 |
| P8GS1 | 0.00 | 0.00 | 0.00 | 0.00 | 0.00 | 0.00 | 0.00 | 0.00 | 0.00 | 0.00 | 0.80 |
| P8GS2 | 0.00 | 0.00 | 0.00 | 0.00 | 0.00 | 0.00 | 0.00 | 0.00 | 0.00 | 0.00 | 0.10 |
| P8GS3 | 0.00 | 0.00 | 0.00 | 0.00 | 0.00 | 0.00 | 0.00 | 0.00 | 0.00 | 0.00 | 0.00 |
| P9GS1 | 0.00 | 0.00 | 0.00 | 0.00 | 0.00 | 0.00 | 0.00 | 0.00 | 0.00 | 0.00 | 0.00 |
| P9GS2 | 0.00 | 0.00 | 0.00 | 0.00 | 0.00 | 0.00 | 0.00 | 0.00 | 0.00 | 0.00 | 0.00 |

TABLE C26.1-continued

Probability table for Node GST

| | | | | | | | | | | | |
|---|---|---|---|---|---|---|---|---|---|---|---|
| P9GS3 | 0.00 | 0.00 | 0.00 | 0.00 | 0.00 | 0.00 | 0.00 | 0.00 | 0.00 | 0.00 | 0.00 |
| P10GS1 | 0.00 | 0.00 | 0.00 | 0.00 | 0.00 | 0.00 | 0.00 | 0.00 | 0.00 | 0.00 | 0.00 |
| P10GS2 | 0.00 | 0.00 | 0.00 | 0.00 | 0.00 | 0.00 | 0.00 | 0.00 | 0.00 | 0.00 | 0.00 |
| P10GS3 | 0.00 | 0.00 | 0.00 | 0.00 | 0.00 | 0.00 | 0.00 | 0.00 | 0.00 | 0.00 | 0.00 |
| P11GS1 | 0.00 | 0.00 | 0.00 | 0.00 | 0.00 | 0.00 | 0.00 | 0.00 | 0.00 | 0.00 | 0.00 |
| P11GS2 | 0.00 | 0.00 | 0.00 | 0.00 | 0.00 | 0.00 | 0.00 | 0.00 | 0.00 | 0.00 | 0.00 |
| P11GS3 | 0.00 | 0.00 | 0.00 | 0.00 | 0.00 | 0.00 | 0.00 | 0.00 | 0.00 | 0.00 | 0.00 |
| P12GS1 | 0.00 | 0.00 | 0.00 | 0.00 | 0.00 | 0.00 | 0.00 | 0.00 | 0.00 | 0.00 | 0.00 |
| P12GS2 | 0.00 | 0.00 | 0.00 | 0.00 | 0.00 | 0.00 | 0.00 | 0.00 | 0.00 | 0.00 | 0.00 |
| P12GS3 | 0.00 | 0.00 | 0.00 | 0.00 | 0.00 | 0.00 | 0.00 | 0.00 | 0.00 | 0.00 | 0.00 |
| P13GS1 | 0.00 | 0.00 | 0.00 | 0.00 | 0.00 | 0.00 | 0.00 | 0.00 | 0.00 | 0.00 | 0.00 |
| P13GS2 | 0.00 | 0.00 | 0.00 | 0.00 | 0.00 | 0.00 | 0.00 | 0.00 | 0.00 | 0.00 | 0.00 |
| P13GS3 | 0.00 | 0.00 | 0.00 | 0.00 | 0.00 | 0.00 | 0.00 | 0.00 | 0.00 | 0.00 | 0.00 |
| P14GS1 | 0.00 | 0.00 | 0.00 | 0.00 | 0.00 | 0.00 | 0.00 | 0.00 | 0.00 | 0.00 | 0.00 |
| P14GS2 | 0.00 | 0.00 | 0.00 | 0.00 | 0.00 | 0.00 | 0.00 | 0.00 | 0.00 | 0.00 | 0.00 |
| P14GS3 | 0.00 | 0.00 | 0.00 | 0.00 | 0.00 | 0.00 | 0.00 | 0.00 | 0.00 | 0.00 | 0.00 |

| | Grain Size, Initial | | | | | | | | | | |
|---|---|---|---|---|---|---|---|---|---|---|---|
| GSI | P8GS2 | P8GS3 | P9GS1 | P9GS2 | P9GS3 | P10GS1 | P10GS2 | P10GS3 | P11GS1 | P11GS2 | P11GS3 |
| P1GS1 | 0.00 | 0.00 | 0.00 | 0.00 | 0.00 | 0.00 | 0.00 | 0.00 | 0.00 | 0.00 | 0.00 |
| P1GS2 | 0.00 | 0.00 | 0.00 | 0.00 | 0.00 | 0.00 | 0.00 | 0.00 | 0.00 | 0.00 | 0.00 |
| P1GS3 | 0.00 | 0.00 | 0.00 | 0.00 | 0.00 | 0.00 | 0.00 | 0.00 | 0.00 | 0.00 | 0.00 |
| P2GS1 | 0.00 | 0.00 | 0.00 | 0.00 | 0.00 | 0.00 | 0.00 | 0.00 | 0.00 | 0.00 | 0.00 |
| P2GS2 | 0.00 | 0.00 | 0.00 | 0.00 | 0.00 | 0.00 | 0.00 | 0.00 | 0.00 | 0.00 | 0.00 |
| P2GS3 | 0.00 | 0.00 | 0.00 | 0.00 | 0.00 | 0.00 | 0.00 | 0.00 | 0.00 | 0.00 | 0.00 |
| P3GS1 | 0.00 | 0.00 | 0.00 | 0.00 | 0.00 | 0.00 | 0.00 | 0.00 | 0.00 | 0.00 | 0.00 |
| P3GS2 | 0.00 | 0.00 | 0.00 | 0.00 | 0.00 | 0.00 | 0.00 | 0.00 | 0.00 | 0.00 | 0.00 |
| P3GS3 | 0.00 | 0.00 | 0.00 | 0.00 | 0.00 | 0.00 | 0.00 | 0.00 | 0.00 | 0.00 | 0.00 |
| P4GS1 | 0.00 | 0.00 | 0.00 | 0.00 | 0.00 | 0.00 | 0.00 | 0.00 | 0.00 | 0.00 | 0.00 |
| P4GS2 | 0.00 | 0.00 | 0.00 | 0.00 | 0.00 | 0.00 | 0.00 | 0.00 | 0.00 | 0.00 | 0.00 |
| P4GS3 | 0.00 | 0.00 | 0.00 | 0.00 | 0.00 | 0.00 | 0.00 | 0.00 | 0.00 | 0.00 | 0.00 |
| P5GS1 | 0.00 | 0.00 | 0.00 | 0.00 | 0.00 | 0.00 | 0.00 | 0.00 | 0.00 | 0.00 | 0.00 |
| P5GS2 | 0.00 | 0.00 | 0.00 | 0.00 | 0.00 | 0.00 | 0.00 | 0.00 | 0.00 | 0.00 | 0.00 |
| P5GS3 | 0.00 | 0.00 | 0.00 | 0.00 | 0.00 | 0.00 | 0.00 | 0.00 | 0.00 | 0.00 | 0.00 |
| P6GS1 | 0.00 | 0.00 | 0.00 | 0.00 | 0.00 | 0.00 | 0.00 | 0.00 | 0.00 | 0.00 | 0.00 |
| P6GS2 | 0.00 | 0.00 | 0.00 | 0.00 | 0.00 | 0.00 | 0.00 | 0.00 | 0.00 | 0.00 | 0.00 |
| P6GS3 | 0.00 | 0.00 | 0.00 | 0.00 | 0.00 | 0.00 | 0.00 | 0.00 | 0.00 | 0.00 | 0.00 |
| P7GS1 | 0.00 | 0.00 | 0.00 | 0.00 | 0.00 | 0.00 | 0.00 | 0.00 | 0.00 | 0.00 | 0.00 |
| P7GS2 | 0.00 | 0.00 | 0.00 | 0.00 | 0.00 | 0.00 | 0.00 | 0.00 | 0.00 | 0.00 | 0.00 |
| P7GS3 | 0.00 | 0.00 | 0.00 | 0.00 | 0.00 | 0.00 | 0.00 | 0.00 | 0.00 | 0.00 | 0.00 |
| P8GS1 | 0.20 | 0.00 | 0.00 | 0.00 | 0.00 | 0.00 | 0.00 | 0.00 | 0.00 | 0.00 | 0.00 |
| P8GS2 | 0.80 | 0.10 | 0.00 | 0.00 | 0.00 | 0.00 | 0.00 | 0.00 | 0.00 | 0.00 | 0.00 |
| P8GS3 | 0.20 | 0.80 | 0.00 | 0.00 | 0.00 | 0.00 | 0.00 | 0.00 | 0.00 | 0.00 | 0.00 |
| P9GS1 | 0.00 | 0.00 | 0.80 | 0.20 | 0.00 | 0.00 | 0.00 | 0.00 | 0.00 | 0.00 | 0.00 |
| P9GS2 | 0.00 | 0.00 | 0.10 | 0.80 | 0.10 | 0.00 | 0.00 | 0.00 | 0.00 | 0.00 | 0.00 |
| P9GS3 | 0.00 | 0.00 | 0.00 | 0.20 | 0.80 | 0.00 | 0.00 | 0.00 | 0.00 | 0.00 | 0.00 |
| P10GS1 | 0.00 | 0.00 | 0.00 | 0.00 | 0.00 | 0.80 | 0.20 | 0.00 | 0.00 | 0.00 | 0.00 |
| P10GS2 | 0.00 | 0.00 | 0.00 | 0.00 | 0.00 | 0.10 | 0.80 | 0.10 | 0.00 | 0.00 | 0.00 |
| P10GS3 | 0.00 | 0.00 | 0.00 | 0.00 | 0.00 | 0.00 | 0.20 | 0.80 | 0.00 | 0.00 | 0.00 |
| P11GS1 | 0.00 | 0.00 | 0.00 | 0.00 | 0.00 | 0.00 | 0.00 | 0.00 | 0.80 | 0.20 | 0.00 |
| P11GS2 | 0.00 | 0.00 | 0.00 | 0.00 | 0.00 | 0.00 | 0.00 | 0.00 | 0.10 | 0.80 | 0.10 |
| P11GS3 | 0.00 | 0.00 | 0.00 | 0.00 | 0.00 | 0.00 | 0.00 | 0.00 | 0.00 | 0.20 | 0.80 |
| P12GS1 | 0.00 | 0.00 | 0.00 | 0.00 | 0.00 | 0.00 | 0.00 | 0.00 | 0.00 | 0.00 | 0.00 |
| P12GS2 | 0.00 | 0.00 | 0.00 | 0.00 | 0.00 | 0.00 | 0.00 | 0.00 | 0.00 | 0.00 | 0.00 |
| P12GS3 | 0.00 | 0.00 | 0.00 | 0.00 | 0.00 | 0.00 | 0.00 | 0.00 | 0.00 | 0.00 | 0.00 |
| P13GS1 | 0.00 | 0.00 | 0.00 | 0.00 | 0.00 | 0.00 | 0.00 | 0.00 | 0.00 | 0.00 | 0.00 |
| P13GS2 | 0.00 | 0.00 | 0.00 | 0.00 | 0.00 | 0.00 | 0.00 | 0.00 | 0.00 | 0.00 | 0.00 |
| P13GS3 | 0.00 | 0.00 | 0.00 | 0.00 | 0.00 | 0.00 | 0.00 | 0.00 | 0.00 | 0.00 | 0.00 |
| P14GS1 | 0.00 | 0.00 | 0.00 | 0.00 | 0.00 | 0.00 | 0.00 | 0.00 | 0.00 | 0.00 | 0.00 |
| P14GS2 | 0.00 | 0.00 | 0.00 | 0.00 | 0.00 | 0.00 | 0.00 | 0.00 | 0.00 | 0.00 | 0.00 |
| P14GS3 | 0.00 | 0.00 | 0.00 | 0.00 | 0.00 | 0.00 | 0.00 | 0.00 | 0.00 | 0.00 | 0.00 |

| | Grain Size, Initial | | | | | | | | |
|---|---|---|---|---|---|---|---|---|---|
| GSI | P12GS1 | P12GS2 | P12GS3 | P13GS1 | P13GS2 | P13GS3 | P14GS1 | P14GS2 | P14GS3 |
| P1GS1 | 0.00 | 0.00 | 0.00 | 0.00 | 0.00 | 0.00 | 0.00 | 0.00 | 0.00 |
| P1GS2 | 0.00 | 0.00 | 0.00 | 0.00 | 0.00 | 0.00 | 0.00 | 0.00 | 0.00 |
| P1GS3 | 0.00 | 0.00 | 0.00 | 0.00 | 0.00 | 0.00 | 0.00 | 0.00 | 0.00 |
| P2GS1 | 0.00 | 0.00 | 0.00 | 0.00 | 0.00 | 0.00 | 0.00 | 0.00 | 0.00 |
| P2GS2 | 0.00 | 0.00 | 0.00 | 0.00 | 0.00 | 0.00 | 0.00 | 0.00 | 0.00 |
| P2GS3 | 0.00 | 0.00 | 0.00 | 0.00 | 0.00 | 0.00 | 0.00 | 0.00 | 0.00 |
| P3GS1 | 0.00 | 0.00 | 0.00 | 0.00 | 0.00 | 0.00 | 0.00 | 0.00 | 0.00 |
| P3GS2 | 0.00 | 0.00 | 0.00 | 0.00 | 0.00 | 0.00 | 0.00 | 0.00 | 0.00 |
| P3GS3 | 0.00 | 0.00 | 0.00 | 0.00 | 0.00 | 0.00 | 0.00 | 0.00 | 0.00 |

TABLE C26.1-continued

Probability table for Node GST

| | | | | | | | | | |
|---|---|---|---|---|---|---|---|---|---|
| P4GS1 | 0.00 | 0.00 | 0.00 | 0.00 | 0.00 | 0.00 | 0.00 | 0.00 | 0.00 |
| P4GS2 | 0.00 | 0.00 | 0.00 | 0.00 | 0.00 | 0.00 | 0.00 | 0.00 | 0.00 |
| P4GS3 | 0.00 | 0.00 | 0.00 | 0.00 | 0.00 | 0.00 | 0.00 | 0.00 | 0.00 |
| P5GS1 | 0.00 | 0.00 | 0.00 | 0.00 | 0.00 | 0.00 | 0.00 | 0.00 | 0.00 |
| P5GS2 | 0.00 | 0.00 | 0.00 | 0.00 | 0.00 | 0.00 | 0.00 | 0.00 | 0.00 |
| P5GS3 | 0.00 | 0.00 | 0.00 | 0.00 | 0.00 | 0.00 | 0.00 | 0.00 | 0.00 |
| P6GS1 | 0.00 | 0.00 | 0.00 | 0.00 | 0.00 | 0.00 | 0.00 | 0.00 | 0.00 |
| P6GS2 | 0.00 | 0.00 | 0.00 | 0.00 | 0.00 | 0.00 | 0.00 | 0.00 | 0.00 |
| P6GS3 | 0.00 | 0.00 | 0.00 | 0.00 | 0.00 | 0.00 | 0.00 | 0.00 | 0.00 |
| P7GS1 | 0.00 | 0.00 | 0.00 | 0.00 | 0.00 | 0.00 | 0.00 | 0.00 | 0.00 |
| P7GS2 | 0.00 | 0.00 | 0.00 | 0.00 | 0.00 | 0.00 | 0.00 | 0.00 | 0.00 |
| P7GS3 | 0.00 | 0.00 | 0.00 | 0.00 | 0.00 | 0.00 | 0.00 | 0.00 | 0.00 |
| P8GS1 | 0.00 | 0.00 | 0.00 | 0.00 | 0.00 | 0.00 | 0.00 | 0.00 | 0.00 |
| P8GS2 | 0.00 | 0.00 | 0.00 | 0.00 | 0.00 | 0.00 | 0.00 | 0.00 | 0.00 |
| P8GS3 | 0.00 | 0.00 | 0.00 | 0.00 | 0.00 | 0.00 | 0.00 | 0.00 | 0.00 |
| P9GS1 | 0.00 | 0.00 | 0.00 | 0.00 | 0.00 | 0.00 | 0.00 | 0.00 | 0.00 |
| P9GS2 | 0.00 | 0.00 | 0.00 | 0.00 | 0.00 | 0.00 | 0.00 | 0.00 | 0.00 |
| P9GS3 | 0.00 | 0.00 | 0.00 | 0.00 | 0.00 | 0.00 | 0.00 | 0.00 | 0.00 |
| P10GS1 | 0.00 | 0.00 | 0.00 | 0.00 | 0.00 | 0.00 | 0.00 | 0.00 | 0.00 |
| P10GS2 | 0.00 | 0.00 | 0.00 | 0.00 | 0.00 | 0.00 | 0.00 | 0.00 | 0.00 |
| P10GS3 | 0.00 | 0.00 | 0.00 | 0.00 | 0.00 | 0.00 | 0.00 | 0.00 | 0.00 |
| P11GS1 | 0.00 | 0.00 | 0.00 | 0.00 | 0.00 | 0.00 | 0.00 | 0.00 | 0.00 |
| P11GS2 | 0.00 | 0.00 | 0.00 | 0.00 | 0.00 | 0.00 | 0.00 | 0.00 | 0.00 |
| P11GS3 | 0.00 | 0.00 | 0.00 | 0.00 | 0.00 | 0.00 | 0.00 | 0.00 | 0.00 |
| P12GS1 | 0.80 | 0.20 | 0.00 | 0.00 | 0.00 | 0.00 | 0.00 | 0.00 | 0.00 |
| P12GS2 | 0.10 | 0.80 | 0.10 | 0.00 | 0.00 | 0.00 | 0.00 | 0.00 | 0.00 |
| P12GS3 | 0.00 | 0.20 | 0.80 | 0.00 | 0.00 | 0.00 | 0.00 | 0.00 | 0.00 |
| P13GS1 | 0.00 | 0.00 | 0.00 | 0.80 | 0.20 | 0.00 | 0.00 | 0.00 | 0.00 |
| P13GS2 | 0.00 | 0.00 | 0.00 | 0.10 | 0.80 | 0.10 | 0.00 | 0.00 | 0.00 |
| P13GS3 | 0.00 | 0.00 | 0.00 | 0.00 | 0.20 | 0.80 | 0.00 | 0.00 | 0.00 |
| P14GS1 | 0.00 | 0.00 | 0.00 | 0.00 | 0.00 | 0.00 | 0.80 | 0.20 | 0.00 |
| P14GS2 | 0.00 | 0.00 | 0.00 | 0.00 | 0.00 | 0.00 | 0.10 | 0.80 | 0.10 |
| P14GS3 | 0.00 | 0.00 | 0.00 | 0.00 | 0.00 | 0.00 | 0.00 | 0.20 | 0.80 |

TABLE C26.2

Probability table for Node GST

| | | Grain Size, Initial | | | | | | | | | | |
|---|---|---|---|---|---|---|---|---|---|---|---|---|
| GSI | ODFP | P1GS1 | P1GS2 | P1GS3 | P2GS1 | P2GS2 | P2GS3 | P3GS1 | P3GS2 | P3GS3 | P4GS1 | P4GS2 |
| P1GS1 | high | 0.80 | 0.20 | 0.00 | 0.00 | 0.00 | 0.00 | 0.00 | 0.00 | 0.00 | 0.00 | 0.00 |
| P1GS2 | high | 0.10 | 0.80 | 0.10 | 0.00 | 0.00 | 0.00 | 0.00 | 0.00 | 0.00 | 0.00 | 0.00 |
| P1GS3 | high | 0.00 | 0.20 | 0.80 | 0.00 | 0.00 | 0.00 | 0.00 | 0.00 | 0.00 | 0.00 | 0.00 |
| P2GS1 | high | 0.00 | 0.00 | 0.00 | 0.80 | 0.20 | 0.00 | 0.00 | 0.00 | 0.00 | 0.00 | 0.00 |
| P2GS2 | high | 0.00 | 0.00 | 0.00 | 0.10 | 0.80 | 0.10 | 0.00 | 0.00 | 0.00 | 0.00 | 0.00 |
| P2GS3 | high | 0.00 | 0.00 | 0.00 | 0.00 | 0.20 | 0.80 | 0.00 | 0.00 | 0.00 | 0.00 | 0.00 |
| P3GS1 | high | 0.00 | 0.00 | 0.00 | 0.00 | 0.00 | 0.00 | 0.80 | 0.20 | 0.00 | 0.00 | 0.00 |
| P3GS2 | high | 0.00 | 0.00 | 0.00 | 0.00 | 0.00 | 0.00 | 0.10 | 0.80 | 0.10 | 0.00 | 0.00 |
| P3GS3 | high | 0.00 | 0.00 | 0.00 | 0.00 | 0.00 | 0.00 | 0.00 | 0.20 | 0.80 | 0.00 | 0.00 |
| P4GS1 | high | 0.00 | 0.00 | 0.00 | 0.00 | 0.00 | 0.00 | 0.00 | 0.00 | 0.00 | 0.80 | 0.20 |
| P4GS2 | high | 0.00 | 0.00 | 0.00 | 0.00 | 0.00 | 0.00 | 0.00 | 0.00 | 0.00 | 0.10 | 0.80 |
| P4GS3 | high | 0.00 | 0.00 | 0.00 | 0.00 | 0.00 | 0.00 | 0.00 | 0.00 | 0.00 | 0.00 | 0.20 |
| P5GS1 | high | 0.00 | 0.00 | 0.00 | 0.00 | 0.00 | 0.00 | 0.00 | 0.00 | 0.00 | 0.00 | 0.00 |
| P5GS2 | high | 0.00 | 0.00 | 0.00 | 0.00 | 0.00 | 0.00 | 0.00 | 0.00 | 0.00 | 0.00 | 0.00 |
| P5GS3 | high | 0.00 | 0.00 | 0.00 | 0.00 | 0.00 | 0.00 | 0.00 | 0.00 | 0.00 | 0.00 | 0.00 |
| P6GS1 | high | 0.00 | 0.00 | 0.00 | 0.00 | 0.00 | 0.00 | 0.00 | 0.00 | 0.00 | 0.00 | 0.00 |
| P6GS2 | high | 0.00 | 0.00 | 0.00 | 0.00 | 0.00 | 0.00 | 0.00 | 0.00 | 0.00 | 0.00 | 0.00 |
| P6GS3 | high | 0.00 | 0.00 | 0.00 | 0.00 | 0.00 | 0.00 | 0.00 | 0.00 | 0.00 | 0.00 | 0.00 |
| P7GS1 | high | 0.00 | 0.00 | 0.00 | 0.00 | 0.00 | 0.00 | 0.00 | 0.00 | 0.00 | 0.00 | 0.00 |
| P7GS2 | high | 0.00 | 0.00 | 0.00 | 0.00 | 0.00 | 0.00 | 0.00 | 0.00 | 0.00 | 0.00 | 0.00 |
| P7GS3 | high | 0.00 | 0.00 | 0.00 | 0.00 | 0.00 | 0.00 | 0.00 | 0.00 | 0.00 | 0.00 | 0.00 |
| P8GS1 | high | 0.00 | 0.00 | 0.00 | 0.00 | 0.00 | 0.00 | 0.00 | 0.00 | 0.00 | 0.00 | 0.00 |
| P8GS2 | high | 0.00 | 0.00 | 0.00 | 0.00 | 0.00 | 0.00 | 0.00 | 0.00 | 0.00 | 0.00 | 0.00 |
| P8GS3 | high | 0.00 | 0.00 | 0.00 | 0.00 | 0.00 | 0.00 | 0.00 | 0.00 | 0.00 | 0.00 | 0.00 |
| P9GS1 | high | 0.00 | 0.00 | 0.00 | 0.00 | 0.00 | 0.00 | 0.00 | 0.00 | 0.00 | 0.00 | 0.00 |
| P9GS2 | high | 0.00 | 0.00 | 0.00 | 0.00 | 0.00 | 0.00 | 0.00 | 0.00 | 0.00 | 0.00 | 0.00 |
| P9GS3 | high | 0.00 | 0.00 | 0.00 | 0.00 | 0.00 | 0.00 | 0.00 | 0.00 | 0.00 | 0.00 | 0.00 |
| P10GS1 | high | 0.00 | 0.00 | 0.00 | 0.00 | 0.00 | 0.00 | 0.00 | 0.00 | 0.00 | 0.00 | 0.00 |
| P10GS2 | high | 0.00 | 0.00 | 0.00 | 0.00 | 0.00 | 0.00 | 0.00 | 0.00 | 0.00 | 0.00 | 0.00 |
| P10GS3 | high | 0.00 | 0.00 | 0.00 | 0.00 | 0.00 | 0.00 | 0.00 | 0.00 | 0.00 | 0.00 | 0.00 |
| P11GS1 | high | 0.00 | 0.00 | 0.00 | 0.00 | 0.00 | 0.00 | 0.00 | 0.00 | 0.00 | 0.00 | 0.00 |
| P11GS2 | high | 0.00 | 0.00 | 0.00 | 0.00 | 0.00 | 0.00 | 0.00 | 0.00 | 0.00 | 0.00 | 0.00 |

TABLE C26.2-continued

Probability table for Node GST

| | | | | | | | | | | | | |
|---|---|---|---|---|---|---|---|---|---|---|---|---|
| P11GS3 | high | 0.00 | 0.00 | 0.00 | 0.00 | 0.00 | 0.00 | 0.00 | 0.00 | 0.00 | 0.00 | 0.00 |
| P12GS1 | high | 0.00 | 0.00 | 0.00 | 0.00 | 0.00 | 0.00 | 0.00 | 0.00 | 0.00 | 0.00 | 0.00 |
| P12GS2 | high | 0.00 | 0.00 | 0.00 | 0.00 | 0.00 | 0.00 | 0.00 | 0.00 | 0.00 | 0.00 | 0.00 |
| P12GS3 | high | 0.00 | 0.00 | 0.00 | 0.00 | 0.00 | 0.00 | 0.00 | 0.00 | 0.00 | 0.00 | 0.00 |
| P13GS1 | high | 0.00 | 0.00 | 0.00 | 0.00 | 0.00 | 0.00 | 0.00 | 0.00 | 0.00 | 0.00 | 0.00 |
| P13GS2 | high | 0.00 | 0.00 | 0.00 | 0.00 | 0.00 | 0.00 | 0.00 | 0.00 | 0.00 | 0.00 | 0.00 |
| P13GS3 | high | 0.00 | 0.00 | 0.00 | 0.00 | 0.00 | 0.00 | 0.00 | 0.00 | 0.00 | 0.00 | 0.00 |
| P14GS1 | high | 0.00 | 0.00 | 0.00 | 0.00 | 0.00 | 0.00 | 0.00 | 0.00 | 0.00 | 0.00 | 0.00 |
| P14GS2 | high | 0.00 | 0.00 | 0.00 | 0.00 | 0.00 | 0.00 | 0.00 | 0.00 | 0.00 | 0.00 | 0.00 |
| P14GS3 | high | 0.00 | 0.00 | 0.00 | 0.00 | 0.00 | 0.00 | 0.00 | 0.00 | 0.00 | 0.00 | 0.00 |

| | Grain Size, Initial | | | | | | | | | | |
|---|---|---|---|---|---|---|---|---|---|---|---|
| GSI | P4GS3 | P5GS1 | P5GS2 | P5GS3 | P6GS1 | P6GS2 | P6GS3 | P7GS1 | P7GS2 | P7GS3 | P8GS1 |
| P1GS1 | 0.00 | 0.00 | 0.00 | 0.00 | 0.00 | 0.00 | 0.00 | 0.00 | 0.00 | 0.00 | 0.00 |
| P1GS2 | 0.00 | 0.00 | 0.00 | 0.00 | 0.00 | 0.00 | 0.00 | 0.00 | 0.00 | 0.00 | 0.00 |
| P1GS3 | 0.00 | 0.00 | 0.00 | 0.00 | 0.00 | 0.00 | 0.00 | 0.00 | 0.00 | 0.00 | 0.00 |
| P2GS1 | 0.00 | 0.00 | 0.00 | 0.00 | 0.00 | 0.00 | 0.00 | 0.00 | 0.00 | 0.00 | 0.00 |
| P2GS2 | 0.00 | 0.00 | 0.00 | 0.00 | 0.00 | 0.00 | 0.00 | 0.00 | 0.00 | 0.00 | 0.00 |
| P2GS3 | 0.00 | 0.00 | 0.00 | 0.00 | 0.00 | 0.00 | 0.00 | 0.00 | 0.00 | 0.00 | 0.00 |
| P3GS1 | 0.00 | 0.00 | 0.00 | 0.00 | 0.00 | 0.00 | 0.00 | 0.00 | 0.00 | 0.00 | 0.00 |
| P3GS2 | 0.00 | 0.00 | 0.00 | 0.00 | 0.00 | 0.00 | 0.00 | 0.00 | 0.00 | 0.00 | 0.00 |
| P3GS3 | 0.00 | 0.00 | 0.00 | 0.00 | 0.00 | 0.00 | 0.00 | 0.00 | 0.00 | 0.00 | 0.00 |
| P4GS1 | 0.00 | 0.00 | 0.00 | 0.00 | 0.00 | 0.00 | 0.00 | 0.00 | 0.00 | 0.00 | 0.00 |
| P4GS2 | 0.10 | 0.00 | 0.00 | 0.00 | 0.00 | 0.00 | 0.00 | 0.00 | 0.00 | 0.00 | 0.00 |
| P4GS3 | 0.80 | 0.00 | 0.00 | 0.00 | 0.00 | 0.00 | 0.00 | 0.00 | 0.00 | 0.00 | 0.00 |
| P5GS1 | 0.00 | 0.80 | 0.20 | 0.00 | 0.00 | 0.00 | 0.00 | 0.00 | 0.00 | 0.00 | 0.00 |
| P5GS2 | 0.00 | 0.10 | 0.80 | 0.10 | 0.00 | 0.00 | 0.00 | 0.00 | 0.00 | 0.00 | 0.00 |
| P5GS3 | 0.00 | 0.00 | 0.20 | 0.80 | 0.00 | 0.00 | 0.00 | 0.00 | 0.00 | 0.00 | 0.00 |
| P6GS1 | 0.00 | 0.00 | 0.00 | 0.00 | 0.80 | 0.20 | 0.00 | 0.00 | 0.00 | 0.00 | 0.00 |
| P6GS2 | 0.00 | 0.00 | 0.00 | 0.00 | 0.10 | 0.80 | 0.10 | 0.00 | 0.00 | 0.00 | 0.00 |
| P6GS3 | 0.00 | 0.00 | 0.00 | 0.00 | 0.00 | 0.20 | 0.80 | 0.00 | 0.00 | 0.00 | 0.00 |
| P7GS1 | 0.00 | 0.00 | 0.00 | 0.00 | 0.00 | 0.00 | 0.00 | 0.80 | 0.20 | 0.00 | 0.00 |
| P7GS2 | 0.00 | 0.00 | 0.00 | 0.00 | 0.00 | 0.00 | 0.00 | 0.10 | 0.80 | 0.10 | 0.00 |
| P7GS3 | 0.00 | 0.00 | 0.00 | 0.00 | 0.00 | 0.00 | 0.00 | 0.00 | 0.20 | 0.80 | 0.00 |
| P8GS1 | 0.00 | 0.00 | 0.00 | 0.00 | 0.00 | 0.00 | 0.00 | 0.00 | 0.00 | 0.00 | 0.80 |
| P8GS2 | 0.00 | 0.00 | 0.00 | 0.00 | 0.00 | 0.00 | 0.00 | 0.00 | 0.00 | 0.00 | 0.10 |
| P8GS3 | 0.00 | 0.00 | 0.00 | 0.00 | 0.00 | 0.00 | 0.00 | 0.00 | 0.00 | 0.00 | 0.00 |
| P9GS1 | 0.00 | 0.00 | 0.00 | 0.00 | 0.00 | 0.00 | 0.00 | 0.00 | 0.00 | 0.00 | 0.00 |
| P9GS2 | 0.00 | 0.00 | 0.00 | 0.00 | 0.00 | 0.00 | 0.00 | 0.00 | 0.00 | 0.00 | 0.00 |
| P9GS3 | 0.00 | 0.00 | 0.00 | 0.00 | 0.00 | 0.00 | 0.00 | 0.00 | 0.00 | 0.00 | 0.00 |
| P10GS1 | 0.00 | 0.00 | 0.00 | 0.00 | 0.00 | 0.00 | 0.00 | 0.00 | 0.00 | 0.00 | 0.00 |
| P10GS2 | 0.00 | 0.00 | 0.00 | 0.00 | 0.00 | 0.00 | 0.00 | 0.00 | 0.00 | 0.00 | 0.00 |
| P10GS3 | 0.00 | 0.00 | 0.00 | 0.00 | 0.00 | 0.00 | 0.00 | 0.00 | 0.00 | 0.00 | 0.00 |
| P11GS1 | 0.00 | 0.00 | 0.00 | 0.00 | 0.00 | 0.00 | 0.00 | 0.00 | 0.00 | 0.00 | 0.00 |
| P11GS2 | 0.00 | 0.00 | 0.00 | 0.00 | 0.00 | 0.00 | 0.00 | 0.00 | 0.00 | 0.00 | 0.00 |
| P11GS3 | 0.00 | 0.00 | 0.00 | 0.00 | 0.00 | 0.00 | 0.00 | 0.00 | 0.00 | 0.00 | 0.00 |
| P12GS1 | 0.00 | 0.00 | 0.00 | 0.00 | 0.00 | 0.00 | 0.00 | 0.00 | 0.00 | 0.00 | 0.00 |
| P12GS2 | 0.00 | 0.00 | 0.00 | 0.00 | 0.00 | 0.00 | 0.00 | 0.00 | 0.00 | 0.00 | 0.00 |
| P12GS3 | 0.00 | 0.00 | 0.00 | 0.00 | 0.00 | 0.00 | 0.00 | 0.00 | 0.00 | 0.00 | 0.00 |
| P13GS1 | 0.00 | 0.00 | 0.00 | 0.00 | 0.00 | 0.00 | 0.00 | 0.00 | 0.00 | 0.00 | 0.00 |
| P13GS2 | 0.00 | 0.00 | 0.00 | 0.00 | 0.00 | 0.00 | 0.00 | 0.00 | 0.00 | 0.00 | 0.00 |
| P13GS3 | 0.00 | 0.00 | 0.00 | 0.00 | 0.00 | 0.00 | 0.00 | 0.00 | 0.00 | 0.00 | 0.00 |
| P14GS1 | 0.00 | 0.00 | 0.00 | 0.00 | 0.00 | 0.00 | 0.00 | 0.00 | 0.00 | 0.00 | 0.00 |
| P14GS2 | 0.00 | 0.00 | 0.00 | 0.00 | 0.00 | 0.00 | 0.00 | 0.00 | 0.00 | 0.00 | 0.00 |
| P14GS3 | 0.00 | 0.00 | 0.00 | 0.00 | 0.00 | 0.00 | 0.00 | 0.00 | 0.00 | 0.00 | 0.00 |

| | Grain Size, Initial | | | | | | | | | | |
|---|---|---|---|---|---|---|---|---|---|---|---|
| GSI | P8GS2 | P8GS3 | P9GS1 | P9GS2 | P9GS3 | P10GS1 | P10GS2 | P10GS3 | P11GS1 | P11GS2 | P11GS3 |
| P1GS1 | 0.00 | 0.00 | 0.00 | 0.00 | 0.00 | 0.00 | 0.00 | 0.00 | 0.00 | 0.00 | 0.00 |
| P1GS2 | 0.00 | 0.00 | 0.00 | 0.00 | 0.00 | 0.00 | 0.00 | 0.00 | 0.00 | 0.00 | 0.00 |
| P1GS3 | 0.00 | 0.00 | 0.00 | 0.00 | 0.00 | 0.00 | 0.00 | 0.00 | 0.00 | 0.00 | 0.00 |
| P2GS1 | 0.00 | 0.00 | 0.00 | 0.00 | 0.00 | 0.00 | 0.00 | 0.00 | 0.00 | 0.00 | 0.00 |
| P2GS2 | 0.00 | 0.00 | 0.00 | 0.00 | 0.00 | 0.00 | 0.00 | 0.00 | 0.00 | 0.00 | 0.00 |
| P2GS3 | 0.00 | 0.00 | 0.00 | 0.00 | 0.00 | 0.00 | 0.00 | 0.00 | 0.00 | 0.00 | 0.00 |
| P3GS1 | 0.00 | 0.00 | 0.00 | 0.00 | 0.00 | 0.00 | 0.00 | 0.00 | 0.00 | 0.00 | 0.00 |
| P3GS2 | 0.00 | 0.00 | 0.00 | 0.00 | 0.00 | 0.00 | 0.00 | 0.00 | 0.00 | 0.00 | 0.00 |
| P3GS3 | 0.00 | 0.00 | 0.00 | 0.00 | 0.00 | 0.00 | 0.00 | 0.00 | 0.00 | 0.00 | 0.00 |
| P4GS1 | 0.00 | 0.00 | 0.00 | 0.00 | 0.00 | 0.00 | 0.00 | 0.00 | 0.00 | 0.00 | 0.00 |
| P4GS2 | 0.00 | 0.00 | 0.00 | 0.00 | 0.00 | 0.00 | 0.00 | 0.00 | 0.00 | 0.00 | 0.00 |
| P4GS3 | 0.00 | 0.00 | 0.00 | 0.00 | 0.00 | 0.00 | 0.00 | 0.00 | 0.00 | 0.00 | 0.00 |
| P5GS1 | 0.00 | 0.00 | 0.00 | 0.00 | 0.00 | 0.00 | 0.00 | 0.00 | 0.00 | 0.00 | 0.00 |
| P5GS2 | 0.00 | 0.00 | 0.00 | 0.00 | 0.00 | 0.00 | 0.00 | 0.00 | 0.00 | 0.00 | 0.00 |
| P5GS3 | 0.00 | 0.00 | 0.00 | 0.00 | 0.00 | 0.00 | 0.00 | 0.00 | 0.00 | 0.00 | 0.00 |

TABLE C26.2-continued

Probability table for Node GST

| | | | | | | | | | | | |
|---|---|---|---|---|---|---|---|---|---|---|---|
| P6GS1 | 0.00 | 0.00 | 0.00 | 0.00 | 0.00 | 0.00 | 0.00 | 0.00 | 0.00 | 0.00 | 0.00 |
| P6GS2 | 0.00 | 0.00 | 0.00 | 0.00 | 0.00 | 0.00 | 0.00 | 0.00 | 0.00 | 0.00 | 0.00 |
| P6GS3 | 0.00 | 0.00 | 0.00 | 0.00 | 0.00 | 0.00 | 0.00 | 0.00 | 0.00 | 0.00 | 0.00 |
| P7GS1 | 0.00 | 0.00 | 0.00 | 0.00 | 0.00 | 0.00 | 0.00 | 0.00 | 0.00 | 0.00 | 0.00 |
| P7GS2 | 0.00 | 0.00 | 0.00 | 0.00 | 0.00 | 0.00 | 0.00 | 0.00 | 0.00 | 0.00 | 0.00 |
| P7GS3 | 0.00 | 0.00 | 0.00 | 0.00 | 0.00 | 0.00 | 0.00 | 0.00 | 0.00 | 0.00 | 0.00 |
| P8GS1 | 0.20 | 0.00 | 0.00 | 0.00 | 0.00 | 0.00 | 0.00 | 0.00 | 0.00 | 0.00 | 0.00 |
| P8GS2 | 0.80 | 0.10 | 0.00 | 0.00 | 0.00 | 0.00 | 0.00 | 0.00 | 0.00 | 0.00 | 0.00 |
| P8GS3 | 0.20 | 0.80 | 0.00 | 0.00 | 0.00 | 0.00 | 0.00 | 0.00 | 0.00 | 0.00 | 0.00 |
| P9GS1 | 0.00 | 0.00 | 0.80 | 0.20 | 0.00 | 0.00 | 0.00 | 0.00 | 0.00 | 0.00 | 0.00 |
| P9GS2 | 0.00 | 0.00 | 0.10 | 0.80 | 0.10 | 0.00 | 0.00 | 0.00 | 0.00 | 0.00 | 0.00 |
| P9GS3 | 0.00 | 0.00 | 0.00 | 0.20 | 0.80 | 0.00 | 0.00 | 0.00 | 0.00 | 0.00 | 0.00 |
| P10GS1 | 0.00 | 0.00 | 0.00 | 0.00 | 0.00 | 0.80 | 0.20 | 0.00 | 0.00 | 0.00 | 0.00 |
| P10GS2 | 0.00 | 0.00 | 0.00 | 0.00 | 0.00 | 0.10 | 0.80 | 0.10 | 0.00 | 0.00 | 0.00 |
| P10GS3 | 0.00 | 0.00 | 0.00 | 0.00 | 0.00 | 0.00 | 0.20 | 0.80 | 0.00 | 0.00 | 0.00 |
| P11GS1 | 0.00 | 0.00 | 0.00 | 0.00 | 0.00 | 0.00 | 0.00 | 0.00 | 0.80 | 0.20 | 0.00 |
| P11GS2 | 0.00 | 0.00 | 0.00 | 0.00 | 0.00 | 0.00 | 0.00 | 0.00 | 0.10 | 0.80 | 0.10 |
| P11GS3 | 0.00 | 0.00 | 0.00 | 0.00 | 0.00 | 0.00 | 0.00 | 0.00 | 0.00 | 0.20 | 0.80 |
| P12GS1 | 0.00 | 0.00 | 0.00 | 0.00 | 0.00 | 0.00 | 0.00 | 0.00 | 0.00 | 0.00 | 0.00 |
| P12GS2 | 0.00 | 0.00 | 0.00 | 0.00 | 0.00 | 0.00 | 0.00 | 0.00 | 0.00 | 0.00 | 0.00 |
| P12GS3 | 0.00 | 0.00 | 0.00 | 0.00 | 0.00 | 0.00 | 0.00 | 0.00 | 0.00 | 0.00 | 0.00 |
| P13GS1 | 0.00 | 0.00 | 0.00 | 0.00 | 0.00 | 0.00 | 0.00 | 0.00 | 0.00 | 0.00 | 0.00 |
| P13GS2 | 0.00 | 0.00 | 0.00 | 0.00 | 0.00 | 0.00 | 0.00 | 0.00 | 0.00 | 0.00 | 0.00 |
| P13GS3 | 0.00 | 0.00 | 0.00 | 0.00 | 0.00 | 0.00 | 0.00 | 0.00 | 0.00 | 0.00 | 0.00 |
| P14GS1 | 0.00 | 0.00 | 0.00 | 0.00 | 0.00 | 0.00 | 0.00 | 0.00 | 0.00 | 0.00 | 0.00 |
| P14GS2 | 0.00 | 0.00 | 0.00 | 0.00 | 0.00 | 0.00 | 0.00 | 0.00 | 0.00 | 0.00 | 0.00 |
| P14GS3 | 0.00 | 0.00 | 0.00 | 0.00 | 0.00 | 0.00 | 0.00 | 0.00 | 0.00 | 0.00 | 0.00 |

| | Grain Size, Initial | | | | | | | | |
|---|---|---|---|---|---|---|---|---|---|
| GSI | P12GS1 | P12GS2 | P12GS3 | P13GS1 | P13GS2 | P13GS3 | P14GS1 | P14GS2 | P14GS3 |
| P1GS1 | 0.00 | 0.00 | 0.00 | 0.00 | 0.00 | 0.00 | 0.00 | 0.00 | 0.00 |
| P1GS2 | 0.00 | 0.00 | 0.00 | 0.00 | 0.00 | 0.00 | 0.00 | 0.00 | 0.00 |
| P1GS3 | 0.00 | 0.00 | 0.00 | 0.00 | 0.00 | 0.00 | 0.00 | 0.00 | 0.00 |
| P2GS1 | 0.00 | 0.00 | 0.00 | 0.00 | 0.00 | 0.00 | 0.00 | 0.00 | 0.00 |
| P2GS2 | 0.00 | 0.00 | 0.00 | 0.00 | 0.00 | 0.00 | 0.00 | 0.00 | 0.00 |
| P2GS3 | 0.00 | 0.00 | 0.00 | 0.00 | 0.00 | 0.00 | 0.00 | 0.00 | 0.00 |
| P3GS1 | 0.00 | 0.00 | 0.00 | 0.00 | 0.00 | 0.00 | 0.00 | 0.00 | 0.00 |
| P3GS2 | 0.00 | 0.00 | 0.00 | 0.00 | 0.00 | 0.00 | 0.00 | 0.00 | 0.00 |
| P3GS3 | 0.00 | 0.00 | 0.00 | 0.00 | 0.00 | 0.00 | 0.00 | 0.00 | 0.00 |
| P4GS1 | 0.00 | 0.00 | 0.00 | 0.00 | 0.00 | 0.00 | 0.00 | 0.00 | 0.00 |
| P4GS2 | 0.00 | 0.00 | 0.00 | 0.00 | 0.00 | 0.00 | 0.00 | 0.00 | 0.00 |
| P4GS3 | 0.00 | 0.00 | 0.00 | 0.00 | 0.00 | 0.00 | 0.00 | 0.00 | 0.00 |
| P5GS1 | 0.00 | 0.00 | 0.00 | 0.00 | 0.00 | 0.00 | 0.00 | 0.00 | 0.00 |
| P5GS2 | 0.00 | 0.00 | 0.00 | 0.00 | 0.00 | 0.00 | 0.00 | 0.00 | 0.00 |
| P5GS3 | 0.00 | 0.00 | 0.00 | 0.00 | 0.00 | 0.00 | 0.00 | 0.00 | 0.00 |
| P6GS1 | 0.00 | 0.00 | 0.00 | 0.00 | 0.00 | 0.00 | 0.00 | 0.00 | 0.00 |
| P6GS2 | 0.00 | 0.00 | 0.00 | 0.00 | 0.00 | 0.00 | 0.00 | 0.00 | 0.00 |
| P6GS3 | 0.00 | 0.00 | 0.00 | 0.00 | 0.00 | 0.00 | 0.00 | 0.00 | 0.00 |
| P7GS1 | 0.00 | 0.00 | 0.00 | 0.00 | 0.00 | 0.00 | 0.00 | 0.00 | 0.00 |
| P7GS2 | 0.00 | 0.00 | 0.00 | 0.00 | 0.00 | 0.00 | 0.00 | 0.00 | 0.00 |
| P7GS3 | 0.00 | 0.00 | 0.00 | 0.00 | 0.00 | 0.00 | 0.00 | 0.00 | 0.00 |
| P8GS1 | 0.00 | 0.00 | 0.00 | 0.00 | 0.00 | 0.00 | 0.00 | 0.00 | 0.00 |
| P8GS2 | 0.00 | 0.00 | 0.00 | 0.00 | 0.00 | 0.00 | 0.00 | 0.00 | 0.00 |
| P8GS3 | 0.00 | 0.00 | 0.00 | 0.00 | 0.00 | 0.00 | 0.00 | 0.00 | 0.00 |
| P9GS1 | 0.00 | 0.00 | 0.00 | 0.00 | 0.00 | 0.00 | 0.00 | 0.00 | 0.00 |
| P9GS2 | 0.00 | 0.00 | 0.00 | 0.00 | 0.00 | 0.00 | 0.00 | 0.00 | 0.00 |
| P9GS3 | 0.00 | 0.00 | 0.00 | 0.00 | 0.00 | 0.00 | 0.00 | 0.00 | 0.00 |
| P10GS1 | 0.00 | 0.00 | 0.00 | 0.00 | 0.00 | 0.00 | 0.00 | 0.00 | 0.00 |
| P10GS2 | 0.00 | 0.00 | 0.00 | 0.00 | 0.00 | 0.00 | 0.00 | 0.00 | 0.00 |
| P10GS3 | 0.00 | 0.00 | 0.00 | 0.00 | 0.00 | 0.00 | 0.00 | 0.00 | 0.00 |
| P11GS1 | 0.00 | 0.00 | 0.00 | 0.00 | 0.00 | 0.00 | 0.00 | 0.00 | 0.00 |
| P11GS2 | 0.00 | 0.00 | 0.00 | 0.00 | 0.00 | 0.00 | 0.00 | 0.00 | 0.00 |
| P11GS3 | 0.00 | 0.00 | 0.00 | 0.00 | 0.00 | 0.00 | 0.00 | 0.00 | 0.00 |
| P12GS1 | 0.80 | 0.20 | 0.00 | 0.00 | 0.00 | 0.00 | 0.00 | 0.00 | 0.00 |
| P12GS2 | 0.10 | 0.80 | 0.10 | 0.00 | 0.00 | 0.00 | 0.00 | 0.00 | 0.00 |
| P12GS3 | 0.00 | 0.20 | 0.80 | 0.00 | 0.00 | 0.00 | 0.00 | 0.00 | 0.00 |
| P13GS1 | 0.00 | 0.00 | 0.00 | 0.80 | 0.20 | 0.00 | 0.00 | 0.00 | 0.00 |
| P13GS2 | 0.00 | 0.00 | 0.00 | 0.10 | 0.80 | 0.10 | 0.00 | 0.00 | 0.00 |
| P13GS3 | 0.00 | 0.00 | 0.00 | 0.00 | 0.20 | 0.80 | 0.00 | 0.00 | 0.00 |
| P14GS1 | 0.00 | 0.00 | 0.00 | 0.00 | 0.00 | 0.00 | 0.80 | 0.20 | 0.00 |
| P14GS2 | 0.00 | 0.00 | 0.00 | 0.00 | 0.00 | 0.00 | 0.10 | 0.80 | 0.10 |
| P14GS3 | 0.00 | 0.00 | 0.00 | 0.00 | 0.00 | 0.00 | 0.00 | 0.20 | 0.80 |

TABLE C27.1

Probability table for Node GSD

| GS Transported | GS Maximum | granular | v coarse | coarse | medium | fine | v fine |
|---|---|---|---|---|---|---|---|
| P1GS1 | granular | 0.35 | 0.29 | 0.18 | 0.18 | 0.00 | 0.00 |
| P1GS1 | v coarse | 0.00 | 0.46 | 0.27 | 0.27 | 0.00 | 0.00 |
| P1GS1 | coarse | 0.00 | 0.00 | 0.50 | 0.50 | 0.00 | 0.00 |
| P1GS1 | medium | 0.00 | 0.00 | 0.00 | 0.60 | 0.20 | 0.20 |
| P1GS1 | fine | 0.00 | 0.00 | 0.00 | 0.00 | 0.50 | 0.50 |
| P1GS1 | v fine | 0.00 | 0.00 | 0.00 | 0.00 | 0.00 | 1.00 |
| P1GS2 | granular | 0.31 | 0.31 | 0.19 | 0.19 | 0.00 | 0.00 |
| P1GS2 | v coarse | 0.00 | 0.46 | 0.27 | 0.27 | 0.00 | 0.00 |
| P1GS2 | coarse | 0.00 | 0.00 | 0.38 | 0.38 | 0.24 | 0.00 |
| P1GS2 | medium | 0.00 | 0.00 | 0.00 | 0.50 | 0.32 | 0.18 |
| P1GS2 | fine | 0.00 | 0.00 | 0.00 | 0.00 | 0.65 | 0.35 |
| P1GS2 | v fine | 0.00 | 0.00 | 0.00 | 0.00 | 0.00 | 1.00 |
| P1GS3 | granular | 0.00 | 0.00 | 0.42 | 0.33 | 0.25 | 0.00 |
| P1GS3 | v coarse | 0.00 | 0.00 | 0.42 | 0.33 | 0.25 | 0.00 |
| P1GS3 | coarse | 0.00 | 0.00 | 0.36 | 0.28 | 0.21 | 0.15 |
| P1GS3 | medium | 0.00 | 0.00 | 0.00 | 0.44 | 0.33 | 0.23 |
| P1GS3 | fine | 0.00 | 0.00 | 0.00 | 0.00 | 0.60 | 0.40 |
| P1GS3 | v fine | 0.00 | 0.00 | 0.00 | 0.00 | 0.00 | 1.00 |
| P2GS1 | granular | 0.35 | 0.29 | 0.18 | 0.18 | 0.00 | 0.00 |
| P2GS1 | v coarse | 0.00 | 0.46 | 0.27 | 0.27 | 0.00 | 0.00 |
| P2GS1 | coarse | 0.00 | 0.00 | 0.50 | 0.50 | 0.00 | 0.00 |
| P2GS1 | medium | 0.00 | 0.00 | 0.00 | 0.60 | 0.20 | 0.20 |
| P2GS1 | fine | 0.00 | 0.00 | 0.00 | 0.00 | 0.50 | 0.50 |
| P2GS1 | v fine | 0.00 | 0.00 | 0.00 | 0.00 | 0.00 | 1.00 |
| P2GS2 | granular | 0.31 | 0.31 | 0.19 | 0.19 | 0.00 | 0.00 |
| P2GS2 | v coarse | 0.00 | 0.46 | 0.27 | 0.27 | 0.00 | 0.00 |
| P2GS2 | coarse | 0.00 | 0.00 | 0.38 | 0.38 | 0.24 | 0.00 |
| P2GS2 | medium | 0.00 | 0.00 | 0.00 | 0.50 | 0.33 | 0.17 |
| P2GS2 | fine | 0.00 | 0.00 | 0.00 | 0.00 | 0.67 | 0.33 |
| P2GS2 | v fine | 0.00 | 0.00 | 0.00 | 0.00 | 0.00 | 1.00 |
| P2GS3 | granular | 0.00 | 0.00 | 0.42 | 0.33 | 0.25 | 0.00 |
| P2GS3 | v coarse | 0.00 | 0.00 | 0.42 | 0.33 | 0.25 | 0.00 |
| P2GS3 | coarse | 0.00 | 0.00 | 0.36 | 0.29 | 0.21 | 0.14 |
| P2GS3 | medium | 0.00 | 0.00 | 0.00 | 0.45 | 0.33 | 0.22 |
| P2GS3 | fine | 0.00 | 0.00 | 0.00 | 0.00 | 0.60 | 0.40 |
| P2GS3 | v fine | 0.00 | 0.00 | 0.00 | 0.00 | 0.00 | 1.00 |
| P3GS1 | granular | 0.34 | 0.33 | 0.33 | 0.00 | 0.00 | 0.00 |
| P3GS1 | v coarse | 0.00 | 0.50 | 0.50 | 0.00 | 0.00 | 0.00 |
| P3GS1 | coarse | 0.00 | 0.00 | 0.40 | 0.20 | 0.20 | 0.20 |
| P3GS1 | medium | 0.00 | 0.00 | 0.00 | 0.34 | 0.33 | 0.33 |
| P3GS1 | fine | 0.00 | 0.00 | 0.00 | 0.00 | 0.50 | 0.50 |
| P3GS1 | v fine | 0.00 | 0.00 | 0.00 | 0.00 | 0.00 | 1.00 |
| P3GS2 | granular | 0.00 | 0.00 | 0.00 | 0.23 | 0.31 | 0.46 |
| P3GS2 | v coarse | 0.00 | 0.00 | 0.00 | 0.23 | 0.31 | 0.46 |
| P3GS2 | coarse | 0.00 | 0.00 | 0.00 | 0.23 | 0.31 | 0.46 |
| P3GS2 | medium | 0.00 | 0.00 | 0.00 | 0.23 | 0.31 | 0.46 |
| P3GS2 | fine | 0.00 | 0.00 | 0.00 | 0.00 | 0.40 | 0.60 |
| P3GS2 | v fine | 0.00 | 0.00 | 0.00 | 0.00 | 0.00 | 1.00 |
| P3GS3 | granular | 0.00 | 0.00 | 0.00 | 0.00 | 0.50 | 0.50 |
| P3GS3 | v coarse | 0.00 | 0.00 | 0.00 | 0.00 | 0.50 | 0.50 |
| P3GS3 | coarse | 0.00 | 0.00 | 0.00 | 0.00 | 0.50 | 0.50 |
| P3GS3 | medium | 0.00 | 0.00 | 0.00 | 0.00 | 0.50 | 0.50 |
| P3GS3 | fine | 0.00 | 0.00 | 0.00 | 0.00 | 0.50 | 0.50 |
| P3GS3 | v fine | 0.00 | 0.00 | 0.00 | 0.00 | 0.00 | 1.00 |

TABLE C27.2

Probability table for Node GSD

| GS Transported | GS Maximum | granular | v coarse | coarse | medium | fine | v fine |
|---|---|---|---|---|---|---|---|
| P4GS1 | granular | 0.19 | 0.25 | 0.31 | 0.25 | 0.00 | 0.00 |
| P4GS1 | v coarse | 0.00 | 0.31 | 0.38 | 0.31 | 0.00 | 0.00 |
| P4GS1 | coarse | 0.00 | 0.00 | 0.46 | 0.36 | 0.18 | 0.00 |
| P4GS1 | medium | 0.00 | 0.00 | 0.00 | 0.57 | 0.29 | 0.14 |
| P4GS1 | fine | 0.00 | 0.00 | 0.00 | 0.00 | 0.67 | 0.33 |
| P4GS1 | v fine | 0.00 | 0.00 | 0.00 | 0.00 | 0.00 | 1.00 |
| P4GS2 | granular | 0.00 | 0.00 | 0.34 | 0.33 | 0.33 | 0.00 |
| P4GS2 | v coarse | 0.00 | 0.00 | 0.34 | 0.33 | 0.33 | 0.00 |

TABLE C27.2-continued

Probability table for Node GSD

| GS Transported | GS Maximum | granular | v coarse | coarse | medium | fine | v fine |
|---|---|---|---|---|---|---|---|
| P4GS2 | coarse | 0.00 | 0.00 | 0.29 | 0.29 | 0.28 | 0.14 |
| P4GS2 | medium | 0.00 | 0.00 | 0.00 | 0.40 | 0.40 | 0.20 |
| P4GS2 | fine | 0.00 | 0.00 | 0.00 | 0.00 | 0.67 | 0.33 |
| P4GS2 | v fine | 0.00 | 0.00 | 0.00 | 0.00 | 0.00 | 1.00 |
| P4GS3 | granular | 0.00 | 0.00 | 0.00 | 0.31 | 0.31 | 0.38 |
| P4GS3 | v coarse | 0.00 | 0.00 | 0.00 | 0.31 | 0.31 | 0.38 |
| P4GS3 | coarse | 0.00 | 0.00 | 0.00 | 0.31 | 0.31 | 0.38 |
| P4GS3 | medium | 0.00 | 0.00 | 0.00 | 0.31 | 0.31 | 0.38 |

TABLE C27.2-continued

Probability table for Node GSD

| GS Transported | GS Maximum | granular | v coarse | coarse | medium | fine | v fine |
|---|---|---|---|---|---|---|---|
| P4GS3 | fine | 0.00 | 0.00 | 0.00 | 0.00 | 0.44 | 0.56 |
| P4GS3 | v fine | 0.00 | 0.00 | 0.00 | 0.00 | 0.00 | 1.00 |
| P5GS1 | granular | 0.19 | 0.25 | 0.31 | 0.25 | 0.00 | 0.00 |
| P5GS1 | v coarse | 0.00 | 0.31 | 0.38 | 0.31 | 0.00 | 0.00 |
| P5GS1 | coarse | 0.00 | 0.00 | 0.46 | 0.36 | 0.18 | 0.00 |
| P5GS1 | medium | 0.00 | 0.00 | 0.00 | 0.67 | 0.33 | 0.00 |
| P5GS1 | fine | 0.00 | 0.00 | 0.00 | 0.00 | 0.67 | 0.33 |
| P5GS1 | v fine | 0.00 | 0.00 | 0.00 | 0.00 | 0.00 | 1.00 |
| P5GS2 | granular | 0.19 | 0.19 | 0.19 | 0.19 | 0.24 | 0.00 |
| P5GS2 | v coarse | 0.00 | 0.23 | 0.23 | 0.23 | 0.31 | 0.00 |
| P5GS2 | coarse | 0.00 | 0.00 | 0.25 | 0.25 | 0.33 | 0.17 |
| P5GS2 | medium | 0.00 | 0.00 | 0.00 | 0.34 | 0.44 | 0.22 |
| P5GS2 | fine | 0.00 | 0.00 | 0.00 | 0.00 | 0.67 | 0.33 |
| P5GS2 | v fine | 0.00 | 0.00 | 0.00 | 0.00 | 0.00 | 1.00 |
| P5GS3 | granular | 0.00 | 0.00 | 0.19 | 0.25 | 0.31 | 0.25 |
| P5GS3 | v coarse | 0.00 | 0.00 | 0.19 | 0.25 | 0.31 | 0.25 |
| P5GS3 | coarse | 0.00 | 0.00 | 0.19 | 0.25 | 0.31 | 0.25 |
| P5GS3 | medium | 0.00 | 0.00 | 0.00 | 0.31 | 0.38 | 0.31 |
| P5GS3 | fine | 0.00 | 0.00 | 0.00 | 0.00 | 0.56 | 0.44 |
| P5GS3 | v fine | 0.00 | 0.00 | 0.00 | 0.00 | 0.00 | 1.00 |
| P6GS1 | granular | 0.06 | 0.11 | 0.17 | 0.27 | 0.22 | 0.17 |
| P6GS1 | v coarse | 0.00 | 0.12 | 0.18 | 0.29 | 0.23 | 0.18 |
| P6GS1 | coarse | 0.00 | 0.00 | 0.20 | 0.33 | 0.27 | 0.20 |
| P6GS1 | medium | 0.00 | 0.00 | 0.00 | 0.42 | 0.33 | 0.25 |
| P6GS1 | fine | 0.00 | 0.00 | 0.00 | 0.00 | 0.57 | 0.43 |
| P6GS1 | v fine | 0.00 | 0.00 | 0.00 | 0.00 | 0.00 | 1.00 |
| P6GS2 | granular | 0.00 | 0.11 | 0.11 | 0.33 | 0.28 | 0.17 |
| P6GS2 | v coarse | 0.00 | 0.11 | 0.11 | 0.33 | 0.28 | 0.17 |
| P6GS2 | coarse | 0.00 | 0.00 | 0.13 | 0.37 | 0.31 | 0.19 |
| P6GS2 | medium | 0.00 | 0.00 | 0.00 | 0.43 | 0.36 | 0.21 |
| P6GS2 | fine | 0.00 | 0.00 | 0.00 | 0.00 | 0.63 | 0.37 |
| P6GS2 | v fine | 0.00 | 0.00 | 0.00 | 0.00 | 0.00 | 1.00 |
| P6GS3 | granular | 0.00 | 0.06 | 0.06 | 0.24 | 0.35 | 0.29 |
| P6GS3 | v coarse | 0.00 | 0.06 | 0.06 | 0.24 | 0.35 | 0.29 |
| P6GS3 | coarse | 0.00 | 0.00 | 0.06 | 0.25 | 0.38 | 0.31 |
| P6GS3 | medium | 0.00 | 0.00 | 0.00 | 0.27 | 0.40 | 0.33 |
| P6GS3 | fine | 0.00 | 0.00 | 0.00 | 0.00 | 0.50 | 0.50 |
| P6GS3 | v fine | 0.00 | 0.00 | 0.00 | 0.00 | 0.00 | 1.00 |

TABLE C27.3

Probability table for Node GSD

| GS Transported | GS Maximum | granular | v coarse | coarse | medium | fine | v fine |
|---|---|---|---|---|---|---|---|
| P7GS1 | granular | 0.06 | 0.10 | 0.10 | 0.28 | 0.28 | 0.18 |
| P7GS1 | v coarse | 0.00 | 0.12 | 0.12 | 0.30 | 0.30 | 0.16 |
| P7GS1 | coarse | 0.00 | 0.00 | 0.14 | 0.33 | 0.33 | 0.20 |
| P7GS1 | medium | 0.00 | 0.00 | 0.00 | 0.38 | 0.38 | 0.24 |
| P7GS1 | fine | 0.00 | 0.00 | 0.00 | 0.00 | 0.63 | 0.37 |
| P7GS1 | v fine | 0.00 | 0.00 | 0.00 | 0.00 | 0.00 | 1.00 |
| P7GS2 | granular | 0.00 | 0.06 | 0.06 | 0.25 | 0.32 | 0.31 |
| P7GS2 | v coarse | 0.00 | 0.06 | 0.06 | 0.25 | 0.32 | 0.31 |
| P7GS2 | coarse | 0.00 | 0.00 | 0.07 | 0.27 | 0.33 | 0.33 |
| P7GS2 | medium | 0.00 | 0.00 | 0.00 | 0.29 | 0.36 | 0.35 |
| P7GS2 | fine | 0.00 | 0.00 | 0.00 | 0.00 | 0.50 | 0.50 |
| P7GS2 | v fine | 0.00 | 0.00 | 0.00 | 0.00 | 0.00 | 1.00 |
| P7GS3 | granular | 0.00 | 0.00 | 0.04 | 0.13 | 0.36 | 0.47 |
| P7GS3 | v coarse | 0.00 | 0.00 | 0.04 | 0.13 | 0.36 | 0.47 |
| P7GS3 | coarse | 0.00 | 0.00 | 0.04 | 0.13 | 0.36 | 0.47 |
| P7GS3 | medium | 0.00 | 0.00 | 0.00 | 0.14 | 0.38 | 0.48 |
| P7GS3 | fine | 0.00 | 0.00 | 0.00 | 0.00 | 0.44 | 0.56 |
| P7GS3 | v fine | 0.00 | 0.00 | 0.00 | 0.00 | 0.00 | 1.00 |
| P8GS1 | granular | 0.13 | 0.13 | 0.13 | 0.14 | 0.20 | 0.27 |
| P8GS1 | v coarse | 0.00 | 0.15 | 0.15 | 0.16 | 0.23 | 0.31 |
| P8GS1 | coarse | 0.00 | 0.00 | 0.18 | 0.19 | 0.27 | 0.36 |
| P8GS1 | medium | 0.00 | 0.00 | 0.00 | 0.22 | 0.34 | 0.44 |
| P8GS1 | fine | 0.00 | 0.00 | 0.00 | 0.00 | 0.43 | 0.57 |

TABLE C27.3-continued

Probability table for Node GSD

| GS Transported | GS Maximum | granular | v coarse | coarse | medium | fine | v fine |
|---|---|---|---|---|---|---|---|
| P8GS1 | v fine | 0.00 | 0.00 | 0.00 | 0.00 | 0.00 | 1.00 |
| P8GS2 | granular | 0.08 | 0.08 | 0.08 | 0.15 | 0.15 | 0.46 |
| P8GS2 | v coarse | 0.00 | 0.08 | 0.08 | 0.17 | 0.17 | 0.50 |
| P8GS2 | coarse | 0.00 | 0.00 | 0.09 | 0.18 | 0.19 | 0.54 |
| P8GS2 | medium | 0.00 | 0.00 | 0.00 | 0.20 | 0.20 | 0.60 |
| P8GS2 | fine | 0.00 | 0.00 | 0.00 | 0.00 | 0.25 | 0.75 |
| P8GS2 | v fine | 0.00 | 0.00 | 0.00 | 0.00 | 0.00 | 1.00 |
| P8GS3 | granular | 0.00 | 0.00 | 0.00 | 0.17 | 0.25 | 0.58 |
| P8GS3 | v coarse | 0.00 | 0.00 | 0.00 | 0.17 | 0.25 | 0.58 |
| P8GS3 | coarse | 0.00 | 0.00 | 0.00 | 0.17 | 0.25 | 0.58 |
| P8GS3 | medium | 0.00 | 0.00 | 0.00 | 0.17 | 0.25 | 0.58 |
| P8GS3 | fine | 0.00 | 0.00 | 0.00 | 0.00 | 0.30 | 0.70 |
| P8GS3 | v fine | 0.00 | 0.00 | 0.00 | 0.00 | 0.00 | 1.00 |
| P9GS1 | granular | 0.33 | 0.22 | 0.22 | 0.06 | 0.06 | 0.11 |
| P9GS1 | v coarse | 0.00 | 0.33 | 0.33 | 0.09 | 0.08 | 0.17 |
| P9GS1 | coarse | 0.00 | 0.00 | 0.50 | 0.13 | 0.12 | 0.25 |
| P9GS1 | medium | 0.00 | 0.00 | 0.00 | 0.25 | 0.25 | 0.50 |
| P9GS1 | fine | 0.00 | 0.00 | 0.00 | 0.00 | 0.33 | 0.67 |
| P9GS1 | v fine | 0.00 | 0.00 | 0.00 | 0.00 | 0.00 | 1.00 |
| P9GS2 | granular | 0.22 | 0.28 | 0.27 | 0.06 | 0.06 | 0.11 |
| P9GS2 | v coarse | 0.00 | 0.36 | 0.36 | 0.07 | 0.07 | 0.14 |
| P9GS2 | coarse | 0.00 | 0.00 | 0.56 | 0.11 | 0.11 | 0.22 |
| P9GS2 | medium | 0.00 | 0.00 | 0.00 | 0.25 | 0.25 | 0.50 |
| P9GS2 | fine | 0.00 | 0.00 | 0.00 | 0.00 | 0.33 | 0.67 |
| P9GS2 | v fine | 0.00 | 0.00 | 0.00 | 0.00 | 0.00 | 1.00 |
| P9GS3 | granular | 0.32 | 0.27 | 0.26 | 0.05 | 0.05 | 0.05 |
| P9GS3 | v coarse | 0.00 | 0.38 | 0.38 | 0.08 | 0.08 | 0.08 |
| P9GS3 | coarse | 0.00 | 0.00 | 0.63 | 0.13 | 0.12 | 0.12 |
| P9GS3 | medium | 0.00 | 0.00 | 0.00 | 0.34 | 0.33 | 0.33 |
| P9GS3 | fine | 0.00 | 0.00 | 0.00 | 0.00 | 0.50 | 0.50 |
| P9GS3 | v fine | 0.00 | 0.00 | 0.00 | 0.00 | 0.00 | 1.00 |

TABLE C27.4

Probability table for Node GSD

| GS Transported | GS Maximum | granular | v coarse | coarse | medium | fine | v fine |
|---|---|---|---|---|---|---|---|
| P10GS1 | granular | 0.21 | 0.21 | 0.20 | 0.16 | 0.11 | 0.11 |
| P10GS1 | v coarse | 0.00 | 0.27 | 0.27 | 0.20 | 0.13 | 0.13 |
| P10GS1 | coarse | 0.00 | 0.00 | 0.36 | 0.28 | 0.18 | 0.18 |
| P10GS1 | medium | 0.00 | 0.00 | 0.00 | 0.43 | 0.29 | 0.28 |
| P10GS1 | fine | 0.00 | 0.00 | 0.00 | 0.00 | 0.50 | 0.50 |
| P10GS1 | v fine | 0.00 | 0.00 | 0.00 | 0.00 | 0.00 | 1.00 |
| P10GS2 | granular | 0.17 | 0.17 | 0.22 | 0.22 | 0.11 | 0.11 |
| P10GS2 | v coarse | 0.00 | 0.20 | 0.27 | 0.27 | 0.13 | 0.13 |
| P10GS2 | coarse | 0.00 | 0.00 | 0.33 | 0.33 | 0.17 | 0.17 |
| P10GS2 | medium | 0.00 | 0.00 | 0.00 | 0.50 | 0.25 | 0.25 |
| P10GS2 | fine | 0.00 | 0.00 | 0.00 | 0.00 | 0.50 | 0.50 |
| P10GS2 | v fine | 0.00 | 0.00 | 0.00 | 0.00 | 0.00 | 1.00 |
| P10GS3 | granular | 0.00 | 0.00 | 0.13 | 0.31 | 0.31 | 0.25 |
| P10GS3 | v coarse | 0.00 | 0.00 | 0.13 | 0.31 | 0.31 | 0.25 |
| P10GS3 | coarse | 0.00 | 0.00 | 0.13 | 0.31 | 0.31 | 0.25 |
| P10GS3 | medium | 0.00 | 0.00 | 0.00 | 0.36 | 0.36 | 0.28 |
| P10GS3 | fine | 0.00 | 0.00 | 0.00 | 0.00 | 0.56 | 0.44 |
| P10GS3 | v fine | 0.00 | 0.00 | 0.00 | 0.00 | 0.00 | 1.00 |
| P1IGS1 | granular | 0.18 | 0.12 | 0.12 | 0.18 | 0.18 | 0.22 |
| P11GS1 | v coarse | 0.00 | 0.14 | 0.15 | 0.21 | 0.21 | 0.29 |
| P11GS1 | coarse | 0.00 | 0.00 | 0.17 | 0.25 | 0.25 | 0.33 |
| PI1GS1 | medium | 0.00 | 0.00 | 0.00 | 0.30 | 0.30 | 0.40 |
| P11GS1 | fine | 0.00 | 0.00 | 0.00 | 0.00 | 0.43 | 0.57 |
| P11GS1 | v fine | 0.00 | 0.00 | 0.00 | 0.00 | 0.00 | 1.00 |
| P11GS2 | granular | 0.13 | 0.07 | 0.07 | 0.07 | 0.20 | 0.46 |
| P11GS2 | v coarse | 0.00 | 0.08 | 0.08 | 0.08 | 0.23 | 0.53 |
| P11GS2 | coarse | 0.00 | 0.00 | 0.08 | 0.09 | 0.25 | 0.58 |
| P11GS2 | medium | 0.00 | 0.00 | 0.00 | 0.09 | 0.27 | 0.64 |
| P11GS2 | fine | 0.00 | 0.00 | 0.00 | 0.00 | 0.30 | 0.70 |
| P11GS2 | v fine | 0.00 | 0.00 | 0.00 | 0.00 | 0.00 | 1.00 |

TABLE C27.4-continued

Probability table for Node GSD

| GS Trans-ported | GS Maximum | granular | v coarse | coarse | medium | fine | v fine |
|---|---|---|---|---|---|---|---|
| P11GS3 | granular | 0.00 | 0.00 | 0.00 | 0.21 | 0.29 | 0.50 |
| P11GS3 | v coarse | 0.00 | 0.00 | 0.00 | 0.21 | 0.29 | 0.50 |
| P11GS3 | coarse | 0.00 | 0.00 | 0.00 | 0.21 | 0.29 | 0.50 |
| P11GS3 | medium | 0.00 | 0.00 | 0.00 | 0.21 | 0.29 | 0.50 |
| P11GS3 | fine | 0.00 | 0.00 | 0.00 | 0.00 | 0.36 | 0.64 |
| P11GS3 | v fine | 0.00 | 0.00 | 0.00 | 0.00 | 0.00 | 1.00 |
| P12GS1 | granular | 0.39 | 0.28 | 0.22 | 0.11 | 0.00 | 0.00 |
| P12GS1 | v coarse | 0.00 | 0.46 | 0.36 | 0.18 | 0.00 | 0.00 |
| P12GS1 | coarse | 0.00 | 0.00 | 0.53 | 0.26 | 0.16 | 0.05 |
| P12GS1 | medium | 0.00 | 0.00 | 0.00 | 0.56 | 0.33 | 0.11 |
| P12GS1 | fine | 0.00 | 0.00 | 0.00 | 0.00 | 0.75 | 0.25 |
| P12GS1 | v fine | 0.00 | 0.00 | 0.00 | 0.00 | 0.00 | 1.00 |
| P12GS2 | granular | 0.38 | 0.25 | 0.25 | 0.12 | 0.00 | 0.00 |
| P12GS2 | v coarse | 0.00 | 0.40 | 0.40 | 0.20 | 0.00 | 0.00 |
| P12GS2 | coarse | 0.00 | 0.00 | 0.50 | 0.25 | 0.13 | 0.12 |
| P12GS2 | medium | 0.00 | 0.00 | 0.00 | 0.50 | 0.25 | 0.25 |
| P12GS2 | fine | 0.00 | 0.00 | 0.00 | 0.00 | 0.50 | 0.50 |
| P12GS2 | v fine | 0.00 | 0.00 | 0.00 | 0.00 | 0.00 | 1.00 |
| P12GS3 | granular | 0.35 | 0.24 | 0.12 | 0.06 | 0.06 | 0.17 |
| P12GS3 | v coarse | 0.00 | 0.36 | 0.19 | 0.09 | 0.09 | 0.27 |
| P12GS3 | coarse | 0.00 | 0.00 | 0.29 | 0.14 | 0.14 | 0.43 |
| P12GS3 | medium | 0.00 | 0.00 | 0.00 | 0.20 | 0.20 | 0.60 |
| P12GS3 | fine | 0.00 | 0.00 | 0.00 | 0.00 | 0.25 | 0.75 |
| P12GS3 | v fine | 0.00 | 0.00 | 0.00 | 0.00 | 0.00 | 1.00 |

TABLE C27.5

Probability table for Node GSD

| GS Trans-ported | GS Maximum | granular | v coarse | coarse | medium | fine | v fine |
|---|---|---|---|---|---|---|---|
| P13GS1 | granular | 0.11 | 0.17 | 0.22 | 0.22 | 0.17 | 0.11 |
| P13GS1 | v coarse | 0.00 | 0.19 | 0.25 | 0.25 | 0.19 | 0.12 |
| P13GS1 | coarse | 0.00 | 0.00 | 0.31 | 0.31 | 0.23 | 0.15 |
| P13GS1 | medium | 0.00 | 0.00 | 0.00 | 0.44 | 0.33 | 0.23 |
| P13GS1 | fine | 0.00 | 0.00 | 0.00 | 0.00 | 0.60 | 0.40 |
| P13GS1 | v fine | 0.00 | 0.00 | 0.00 | 0.00 | 0.00 | 1.00 |
| P13GS2 | granular | 0.00 | 0.00 | 0.19 | 0.37 | 0.25 | 0.19 |
| P13GS2 | v coarse | 0.00 | 0.00 | 0.19 | 0.37 | 0.25 | 0.19 |
| P13GS2 | coarse | 0.00 | 0.00 | 0.19 | 0.37 | 0.25 | 0.19 |
| P13GS2 | medium | 0.00 | 0.00 | 0.00 | 0.46 | 0.31 | 0.23 |
| P13GS2 | fine | 0.00 | 0.00 | 0.00 | 0.00 | 0.57 | 0.43 |
| P13GS2 | v fine | 0.00 | 0.00 | 0.00 | 0.00 | 0.00 | 1.00 |
| P13GS3 | granular | 0.00 | 0.00 | 0.00 | 0.33 | 0.40 | 0.27 |
| P13GS3 | v coarse | 0.00 | 0.00 | 0.00 | 0.33 | 0.40 | 0.27 |
| P13GS3 | coarse | 0.00 | 0.00 | 0.00 | 0.33 | 0.40 | 0.27 |
| P13GS3 | medium | 0.00 | 0.00 | 0.00 | 0.33 | 0.40 | 0.27 |
| P13GS3 | fine | 0.00 | 0.00 | 0.00 | 0.00 | 0.60 | 0.40 |
| P13GS3 | v fine | 0.00 | 0.00 | 0.00 | 0.00 | 0.00 | 1.00 |
| P14GS1 | granular | 0.16 | 0.16 | 0.26 | 0.21 | 0.16 | 0.05 |
| P14GS1 | v coarse | 0.00 | 0.19 | 0.31 | 0.25 | 0.19 | 0.06 |
| P14GS1 | coarse | 0.00 | 0.00 | 0.39 | 0.31 | 0.23 | 0.07 |
| P14GS1 | medium | 0.00 | 0.00 | 0.00 | 0.50 | 0.38 | 0.12 |
| P14GS1 | fine | 0.00 | 0.00 | 0.00 | 0.00 | 0.75 | 0.25 |
| P14GS1 | v fine | 0.00 | 0.00 | 0.00 | 0.00 | 0.00 | 1.00 |
| P14GS2 | granular | 0.11 | 0.12 | 0.22 | 0.22 | 0.22 | 0.11 |
| P14GS2 | v coarse | 0.00 | 0.13 | 0.25 | 0.25 | 0.25 | 0.12 |
| P14GS2 | coarse | 0.00 | 0.00 | 0.29 | 0.29 | 0.29 | 0.13 |
| P14GS2 | medium | 0.00 | 0.00 | 0.00 | 0.40 | 0.40 | 0.20 |
| P14GS2 | fine | 0.00 | 0.00 | 0.00 | 0.00 | 0.67 | 0.33 |
| P14GS2 | v fine | 0.00 | 0.00 | 0.00 | 0.00 | 0.00 | 1.00 |
| P14GS3 | granular | 0.00 | 0.00 | 0.20 | 0.27 | 0.33 | 0.20 |
| P14GS3 | v coarse | 0.00 | 0.00 | 0.20 | 0.27 | 0.33 | 0.20 |
| P14GS3 | coarse | 0.00 | 0.00 | 0.20 | 0.27 | 0.33 | 0.20 |
| P14GS3 | medium | 0.00 | 0.00 | 0.00 | 0.33 | 0.42 | 0.25 |
| P14GS3 | fine | 0.00 | 0.00 | 0.00 | 0.00 | 0.63 | 0.37 |
| P14GS3 | v fine | 0.00 | 0.00 | 0.00 | 0.00 | 0.00 | 1.00 |

TABLE C28.1

Probability table for Node GSFM

| Depositional Facies | GS Delivered | granular | v coarse | coarse | medium | fine | v fine |
|---|---|---|---|---|---|---|---|
| Fluv Maj Chan | granular | 0.35 | 0.25 | 0.20 | 0.10 | 0.05 | 0.05 |
| FIuv Maj Chan | coarse | 0.15 | 0.35 | 0.20 | 0.20 | 0.05 | 0.05 |
| Fluv Maj Chan | coarse | 0.10 | 0.25 | 0.35 | 0.20 | 0.05 | 0.05 |
| Fluv Maj Chan | medium | 0.05 | 0.05 | 0.20 | 0.40 | 0.20 | 0.10 |
| Fluv Maj Chan | fine | 0.05 | 0.05 | 0.10 | 0.20 | 0.40 | 0.20 |
| Fluv Maj Chan | v fine | 0.05 | 0.05 | 0.10 | 0.15 | 0.25 | 0.40 |
| Fluv Min Chan | granular | 0.25 | 0.20 | 0.20 | 0.15 | 0.10 | 0.10 |
| Fluv Min Chan | v coarse | 0.15 | 0.25 | 0.20 | 0.20 | 0.10 | 0.10 |
| Fluv Min Chan | coarse | 0.10 | 0.15 | 0.30 | 0.25 | 0.10 | 0.10 |
| Fluv Min Chan | medium | 0.05 | 0.05 | 0.10 | 0.40 | 0.20 | 0.20 |
| Fluv Min Chan | fine | 0.02 | 0.03 | 0.05 | 0.25 | 0.40 | 0.25 |
| Fluv Min Chan | v fine | 0.01 | 0.01 | 0.03 | 0.20 | 0.30 | 0.45 |
| Fluv Pnt Bar | granular | 0.30 | 0.20 | 0.20 | 0.10 | 0.10 | 0.10 |
| Fluv Pnt Bar | v coarse | 0.15 | 0.30 | 0.20 | 0.15 | 0.10 | 0.10 |
| Fluv Pnt Bar | coarse | 0.10 | 0.15 | 0.35 | 0.20 | 0.10 | 0.10 |
| Fluv Pnt Bar | medium | 0.05 | 0.10 | 0.15 | 0.45 | 0.15 | 0.10 |
| Fluv Pnt Bar | fine | 0.05 | 0.07 | 0.08 | 0.20 | 0.40 | 0.20 |
| Fluv Pnt Bar | v fine | 0.02 | 0.03 | 0.05 | 0.15 | 0.25 | 0.50 |
| Fluv Lev Splay | granular | 0.15 | 0.15 | 0.25 | 0.20 | 0.15 | 0.10 |
| Fluv Lev Splay | v coarse | 0.10 | 0.20 | 0.20 | 0.20 | 0.15 | 0.15 |
| Fluv Lev Splay | coarse | 0.10 | 0.15 | 0.30 | 0.20 | 0.15 | 0.10 |
| Fluv Lev Splay | medium | 0.05 | 0.05 | 0.15 | 0.35 | 0.20 | 0.20 |
| Fluv Lev Splay | fine | 0.02 | 0.03 | 0.10 | 0.25 | 0.35 | 0.25 |
| Fluv Lev Splay | v fine | 0.01 | 0.02 | 0.07 | 0.20 | 0.25 | 0.45 |
| Beach Foresh | granular | 0.35 | 0.25 | 0.20 | 0.10 | 0.10 | 0.00 |
| Beach Foresh | v coarse | 0.20 | 0.35 | 0.25 | 0.10 | 0.10 | 0.00 |

TABLE C28.1-continued

Probability table for Node GSFM

| Depositional Facies | GS Delivered | granular | v coarse | coarse | medium | fine | v fine |
|---|---|---|---|---|---|---|---|
| Beach Foresh | coarse | 0.10 | 0.15 | 0.40 | 0.25 | 0.10 | 0.00 |
| Beach Foresh | medium | 0.05 | 0.10 | 0.15 | 0.40 | 0.20 | 0.10 |
| Beach Foresh | fine | 0.00 | 0.05 | 0.10 | 0.25 | 0.40 | 0.20 |
| Beach Foresh | v fine | 0.00 | 0.00 | 0.05 | 0.25 | 0.35 | 0.35 |
| Beach Shorefc | granular | 0.20 | 0.25 | 0.25 | 0.15 | 0.10 | 0.05 |
| Beach Shorefc | v coarse | 0.05 | 0.20 | 0.25 | 0.25 | 0.20 | 0.05 |
| Beach Shorefc | coarse | 0.05 | 0.15 | 0.20 | 0.25 | 0.25 | 0.10 |
| Beach Shorefc | medium | 0.05 | 0.05 | 0.10 | 0.25 | 0.30 | 0.25 |
| Beach Shorefc | fine | 0.02 | 0.03 | 0.05 | 0.25 | 0.35 | 0.30 |
| Beach Shorefc | v fine | 0.00 | 0.00 | 0.05 | 0.15 | 0.30 | 0.50 |
| Delta Distchan | granular | 0.25 | 0.20 | 0.20 | 0.15 | 0.10 | 0.10 |
| Delta Distchan | v coarse | 0.15 | 0.25 | 0.20 | 0.20 | 0.10 | 0.10 |
| Delta Distchan | coarse | 0.10 | 0.15 | 0.30 | 0.25 | 0.10 | 0.10 |
| Delta Distchan | medium | 0.05 | 0.05 | 0.10 | 0.40 | 0.20 | 0.20 |
| Delta Distchan | fine | 0.02 | 0.03 | 0.05 | 0.25 | 0.40 | 0.25 |
| Delta Distchan | v fine | 0.01 | 0.01 | 0.03 | 0.25 | 0.30 | 0.40 |
| Delta Prox Front | granular | 0.20 | 0.20 | 0.15 | 0.15 | 0.15 | 0.15 |
| Delta Prox Front | v coarse | 0.10 | 0.25 | 0.20 | 0.15 | 0.15 | 0.15 |
| Delta Prox Front | coarse | 0.05 | 0.10 | 0.30 | 0.25 | 0.15 | 0.15 |
| Delta Prox Front | medium | 0.05 | 0.10 | 0.15 | 0.30 | 0.25 | 0.15 |
| Delta Prox Front | fine | 0.02 | 0.03 | 0.05 | 0.25 | 0.35 | 0.30 |
| Delta Prox Front | v fine | 0.01 | 0.01 | 0.03 | 0.20 | 0.35 | 0.40 |
| Delta Dist Front | granular | 0.10 | 0.15 | 0.25 | 0.20 | 0.15 | 0.15 |
| Delta Dist Front | v coarse | 0.05 | 0.15 | 0.20 | 0.25 | 0.20 | 0.15 |
| Delta Dist Front | coarse | 0.05 | 0.10 | 0.20 | 0.25 | 0.25 | 0.15 |
| Delta Dist Front | medium | 0.02 | 0.03 | 0.10 | 0.25 | 0.35 | 0.25 |
| Delta Dist Front | fine | 0.01 | 0.02 | 0.02 | 0.25 | 0.30 | 0.40 |
| Delta Dist Front | v fine | 0.00 | 0.00 | 0.00 | 0.20 | 0.30 | 0.50 |
| Tidal Chan Bar | granular | 0.30 | 0.25 | 0.20 | 0.10 | 0.10 | 0.05 |
| Tidal Chan Bar | v coarse | 0.10 | 0.30 | 0.25 | 0.20 | 0.10 | 0.05 |
| Tidal Chan Bar | coarse | 0.05 | 0.10 | 0.30 | 0.25 | 0.20 | 0.10 |
| Tidal Chan Bar | medium | 0.02 | 0.03 | 0.10 | 0.40 | 0.30 | 0.15 |
| Tidal Chan Bar | fine | 0.00 | 0.02 | 0.03 | 0.25 | 0.50 | 0.20 |
| Tidal Chan Bar | v fine | 0.00 | 0.00 | 0.00 | 0.20 | 0.30 | 0.50 |

TABLE C28.2

Probability table for Node GSFM

| Depositional Facies | GS Delivered | granular | v coarse | coarse | medium | fine | v fine |
|---|---|---|---|---|---|---|---|
| Eolian Dune | granular | 0.15 | 0.15 | 0.20 | 0.25 | 0.15 | 0.10 |
| Eolian Dune | v coarse | 0.10 | 0.15 | 0.15 | 0.30 | 0.20 | 0.10 |
| Eolian Dune | coarse | 0.05 | 0.10 | 0.20 | 0.25 | 0.25 | 0.15 |
| Eolian Dune | medium | 0.03 | 0.07 | 0.10 | 0.35 | 0.30 | 0.15 |
| Eolian Dune | fine | 0.02 | 0.03 | 0.10 | 0.25 | 0.35 | 0.25 |
| Eolian Dune | v fine | 0.00 | 0.00 | 0.10 | 0.20 | 0.35 | 0.35 |
| DW TurbChan | granular | 0.25 | 0.20 | 0.20 | 0.15 | 0.10 | 0.10 |
| DW TurbChan | v coarse | 0.15 | 0.25 | 0.20 | 0.20 | 0.10 | 0.10 |
| DW TurbChan | coarse | 0.10 | 0.15 | 0.30 | 0.20 | 0.15 | 0.10 |
| DW TurbChan | medium | 0.05 | 0.10 | 0.15 | 0.35 | 0.20 | 0.15 |
| DW TurbChan | fine | 0.05 | 0.05 | 0.10 | 0.20 | 0.40 | 0.20 |
| DW TurbChan | v fine | 0.00 | 0.00 | 0.05 | 0.15 | 0.30 | 0.50 |
| DW TurbLevee | granular | 0.20 | 0.20 | 0.15 | 0.15 | 0.15 | 0.15 |
| DW TurbLevee | v coarse | 0.10 | 0.25 | 0.20 | 0.20 | 0.15 | 0.10 |
| DW TurbLevee | coarse | 0.05 | 0.10 | 0.25 | 0.25 | 0.20 | 0.15 |
| DW TurbLevee | medium | 0.03 | 0.05 | 0.12 | 0.35 | 0.25 | 0.20 |
| DW TurbLevee | fine | 0.02 | 0.01 | 0.07 | 0.20 | 0.30 | 0.40 |
| DW TurbLevee | v fine | 0.00 | 0.00 | 0.01 | 0.14 | 0.40 | 0.45 |
| DW DebChan | granular | 0.20 | 0.20 | 0.20 | 0.15 | 0.15 | 0.10 |
| DW DebChan | v coarse | 0.10 | 0.25 | 0.20 | 0.20 | 0.15 | 0.10 |
| DW DebChan | coarse | 0.10 | 0.15 | 0.30 | 0.20 | 0.15 | 0.10 |
| DW DebChan | medium | 0.05 | 0.10 | 0.15 | 0.30 | 0.20 | 0.20 |
| DW DebChan | fine | 0.05 | 0.10 | 0.15 | 0.25 | 0.25 | 0.20 |
| DW DebChan | v fine | 0.05 | 0.05 | 0.10 | 0.15 | 0.25 | 0.40 |
| DW DebLevee | granular | 0.20 | 0.20 | 0.15 | 0.15 | 0.15 | 0.15 |
| DW DebLevee | v coarse | 0.10 | 0.20 | 0.20 | 0.20 | 0.15 | 0.15 |
| DW DebLevee | coarse | 0.10 | 0.10 | 0.30 | 0.20 | 0.15 | 0.15 |
| DW DebLevee | medium | 0.05 | 0.10 | 0.15 | 0.30 | 0.20 | 0.20 |
| DW DebLevee | fine | 0.00 | 0.05 | 0.10 | 0.25 | 0.35 | 0.25 |
| DW DebLevee | v fine | 0.02 | 0.03 | 0.05 | 0.10 | 0.35 | 0.45 |

TABLE C29

Probability table for Node GSG

| GSFM:GS Final Mode | V Coarse_Coarse | Medium | Fine_V Fine |
|---|---|---|---|
| granular | 1.00 | 0.00 | 0.00 |
| v coarse | 0.90 | 0.10 | 0.00 |
| coarse | 0.80 | 0.20 | 0.00 |
| medium | 0.10 | 0.80 | 0.10 |
| fine | 0.00 | 0.20 | 0.80 |
| v fine | 0.00 | 0.00 | 1.00 |

TABLE C30

Probability table for Node DMA

| DF: Depositional Facies | TCA: Transported Clay Abundance | less than 2 | from 2 to 10 | from 10 to 25 |
|---|---|---|---|---|
| Fluv Maj Chan | high abundance | 0.40 | 0.60 | 0.00 |
| Fluv Maj Chan | moderate abundance | 0.90 | 0.10 | 0.00 |
| Fluv Maj Chan | low abundance | 0.90 | 0.10 | 0.00 |
| Fluv Maj Chan | v low abundance | 0.90 | 0.10 | 0.00 |
| Fluv Min Chan | high abundance | 0.40 | 0.60 | 0.00 |
| Fluv Min Chan | moderate abundance | 0.90 | 0.10 | 0.00 |
| Fluv Min Chan | low abundance | 0.90 | 0.10 | 0.00 |
| Fluv Min Chan | v low abundance | 0.90 | 0.10 | 0.00 |
| Fluv Pnt Bar | high abundance | 0.40 | 0.60 | 0.00 |
| Fluv Pnt Bar | moderate abundance | 0.90 | 0.10 | 0.00 |
| Fluv Pnt Bar | low abundance | 0.90 | 0.10 | 0.00 |
| Fluv Pnt Bar | v low abundance | 0.90 | 0.10 | 0.00 |
| Fluv Lev Splay | high abundance | 0.30 | 0.60 | 0.10 |
| Fluv Lev Splay | moderate abundance | 0.50 | 0.50 | 0.00 |
| Fluv Lev Splay | low abundance | 0.60 | 0.40 | 0.00 |
| Fluv Lev Splay | v low abundance | 0.70 | 0.30 | 0.00 |
| Beach Foresh | high abundance | 0.70 | 0.20 | 0.10 |
| Beach Foresh | moderate abundance | 0.90 | 0.10 | 0.00 |
| Beach Foresh | low abundance | 0.95 | 0.05 | 0.00 |
| Beach Foresh | v low abundance | 1.00 | 0.00 | 0.00 |
| Beach Shorefc | high abundance | 0.00 | 0.10 | 0.90 |
| Beach Shorefc | moderate abundance | 0.00 | 0.50 | 0.50 |
| Beach Shorefc | low abundance | 0.20 | 0.60 | 0.20 |

TABLE C30-continued

Probability table for Node DMA

| DF: Depositional Facies | TCA: Transported Clay Abundance | less than 2 | from 2 to 10 | from 10 to 25 |
|---|---|---|---|---|
| Beach Shorefc | v low abundance | 0.50 | 0.50 | 0.00 |
| Delta Distchan | high abundance | 0.40 | 0.60 | 0.00 |
| Delta Distchan | moderate abundance | 0.80 | 0.20 | 0.00 |
| Delta Distchan | low abundance | 0.90 | 0.10 | 0.00 |
| Delta Distchan | v low abundance | 0.90 | 0.10 | 0.00 |
| Delta Prox Front | high abundance | 0.20 | 0.60 | 0.20 |
| Delta Prox Front | moderate abundance | 0.50 | 0.50 | 0.00 |
| Delta Prox Front | low abundance | 0.90 | 0.10 | 0.00 |
| Delta Prox Front | v low abundance | 0.90 | 0.10 | 0.00 |
| Delta Dist Front | high abundance | 0.00 | 0.50 | 0.50 |
| Delta Dist Front | moderate abundance | 0.10 | 0.50 | 0.40 |
| Delta Dist Front | low abundance | 0.40 | 0.50 | 0.10 |
| Delta Dist Front | v low abundance | 0.50 | 0.50 | 0.00 |
| Tidal Chan Bar | high abundance | 0.25 | 0.50 | 0.25 |
| Tidal Chan Bar | moderate abundance | 0.30 | 0.50 | 0.20 |
| Tidal Chan Bar | low abundance | 0.70 | 0.30 | 0.00 |
| Tidal Chan Bar | v low abundance | 0.90 | 0.10 | 0.00 |
| Eolian Dune | high abundance | 1.00 | 0.00 | 0.00 |
| Eolian Dune | moderate abundance | 1.00 | 0.00 | 0.00 |
| Eolian Dune | low abundance | 1.00 | 0.00 | 0.00 |
| Eolian Dune | v low abundance | 1.00 | 0.00 | 0.00 |
| DW TurbChan | high abundance | 0.20 | 0.50 | 0.30 |
| DW TurbChan | moderate abundance | 0.30 | 0.50 | 0.20 |
| DW TurbChan | low abundance | 0.80 | 0.20 | 0.00 |
| DW TurbChan | v low abundance | 0.90 | 0.10 | 0.00 |
| DW TurbLevee | high abundance | 0.20 | 0.50 | 0.30 |
| DW TurbLevee | moderate abundance | 0.30 | 0.50 | 0.20 |
| DW TurbLevee | low abundance | 0.80 | 0.20 | 0.00 |
| DW TurbLevee | v low abundance | 0.90 | 0.10 | 0.00 |
| DW DebChan | high abundance | 0.10 | 0.20 | 0.70 |
| DW DebChan | moderate abundance | 0.10 | 0.50 | 0.40 |
| DW DebChan | low abundance | 0.20 | 0.50 | 0.30 |
| DW DebChan | v low abundance | 0.50 | 0.50 | 0.00 |
| DW DebLevee | high abundance | 0.10 | 0.20 | 0.70 |
| DW DebLevee | moderate abundance | 0.10 | 0.50 | 0.40 |
| DW DebLevee | low abundance | 0.20 | 0.50 | 0.30 |
| DW DebLevee | v low abundance | 0.50 | 0.50 | 0.00 |

TABLE C31.1

Probability table for Node DS

| Depositional Facies | Deposited Matrix Abundance | GS Delivered | well | moderate | poor | v poor |
|---|---|---|---|---|---|---|
| Fluv Maj Chan | less than 2 | granular | 0.00 | 0.40 | 0.60 | 0.00 |
| Fluv Maj Chan | less than 2 | v coarse | 0.00 | 0.60 | 0.40 | 0.00 |
| Fluv Maj Chan | less than 2 | coarse | 0.40 | 0.60 | 0.00 | 0.00 |
| Fluv Maj Chan | less than 2 | medium | 0.60 | 0.40 | 0.00 | 0.00 |
| Fluv Maj Chan | less than 2 | fine | 0.60 | 0.40 | 0.00 | 0.00 |
| Fluv Maj Chan | less than 2 | v fine | 0.40 | 0.60 | 0.00 | 0.00 |
| Fluv Maj Chan | from 2 to 10 | granular | 0.00 | 0.00 | 0.60 | 0.40 |
| Fluv Maj Chan | from 2 to 10 | v coarse | 0.00 | 0.00 | 0.60 | 0.40 |
| Fluv Maj Chan | from 2 to 10 | coarse | 0.00 | 0.60 | 0.40 | 0.00 |
| Fluv Maj Chan | from 2 to 10 | medium | 0.60 | 0.40 | 0.00 | 0.00 |
| Fluv Maj Chan | from 2 to 10 | fine | 0.60 | 0.40 | 0.00 | 0.00 |
| Fluv Maj Chan | from 2 to 10 | v fine | 0.20 | 0.60 | 0.20 | 0.00 |
| Fluv Maj Chan | from 10 to 25 | granular | 0.00 | 0.00 | 0.40 | 0.60 |
| Fluv Maj Chan | from 10 to 25 | v coarse | 0.00 | 0.00 | 0.40 | 0.60 |
| Fluv Maj Chan | from 10 to 25 | coarse | 0.00 | 0.00 | 0.60 | 0.40 |
| Fluv Maj Chan | from 10 to 25 | medium | 0.00 | 0.40 | 0.60 | 0.00 |
| Fluv Maj Chan | from 10 to 25 | fine | 0.00 | 0.40 | 0.60 | 0.00 |
| Fluv Maj Chan | from 10 to 25 | v fine | 0.00 | 0.20 | 0.60 | 0.20 |
| Fluv Min Chan | less than 2 | granular | 0.00 | 0.40 | 0.60 | 0.00 |
| Fluv Min Chan | less than 2 | v coarse | 0.00 | 0.60 | 0.40 | 0.00 |
| Fluv Min Chan | less than 2 | coarse | 0.40 | 0.60 | 0.00 | 0.00 |
| Fluv Min Chan | less than 2 | medium | 0.60 | 0.40 | 0.00 | 0.00 |
| Fluv Min Chan | less than 2 | fine | 0.60 | 0.40 | 0.00 | 0.00 |

TABLE C31.1-continued

Probability table for Node DS

| Depositional Facies | Deposited Matrix Abundance | GS Delivered | well | moderate | poor | v poor |
|---|---|---|---|---|---|---|
| Fluv Min Chan | less than 2 | v fine | 0.40 | 0.60 | 0.00 | 0.00 |
| Fluv Min Chan | from 2 to 10 | granular | 0.00 | 0.00 | 0.60 | 0.40 |
| Fluv Min Chan | from 2 to 10 | v coarse | 0.00 | 0.00 | 0.60 | 0.40 |
| Fluv Min Chan | from 2 to 10 | coarse | 0.00 | 0.60 | 0.40 | 0.00 |
| Fluv Min Chan | from 2 to 10 | medium | 0.60 | 0.40 | 0.00 | 0.00 |
| Fluv Min Chan | from 2 to 10 | fine | 0.60 | 0.40 | 0.00 | 0.00 |
| Fluv Min Chan | from 2 to 10 | v fine | 0.20 | 0.60 | 0.20 | 0.00 |
| Fluv Min Chan | from 10 to 25 | granular | 0.00 | 0.00 | 0.40 | 0.60 |
| Fluv Min Chan | from 10 to 25 | v coarse | 0.00 | 0.00 | 0.40 | 0.60 |
| Fluv Min Chan | from 10 to 25 | coarse | 0.00 | 0.00 | 0.60 | 0.40 |
| Fluv Min Chan | from 10 to 25 | medium | 0.00 | 0.40 | 0.60 | 0.00 |
| Fluv Min Chan | from 10 to 25 | fine | 0.00 | 0.40 | 0.60 | 0.00 |
| Fluv Min Chan | from 10 to 25 | v fine | 0.00 | 0.20 | 0.60 | 0.20 |
| Fluv Pnt Bar | less than 2 | granular | 0.00 | 0.40 | 0.60 | 0.00 |
| Fluv Pnt Bar | less than 2 | v coarse | 0.00 | 0.60 | 0.40 | 0.00 |
| Fluv Pnt Bar | less than 2 | coarse | 0.40 | 0.60 | 0.00 | 0.00 |
| Fluv Pnt Bar | less than 2 | medium | 0.60 | 0.40 | 0.00 | 0.00 |
| Fluv Pnt Bar | less than 2 | fine | 0.60 | 0.40 | 0.00 | 0.00 |
| Fluv Pnt Bar | less than 2 | v fine | 0.40 | 0.60 | 0.00 | 0.00 |
| Fluv Pnt Bar | from 2 to 10 | granular | 0.00 | 0.00 | 0.60 | 0.40 |
| Fluv Pnt Bar | from 2 to 10 | v coarse | 0.00 | 0.00 | 0.60 | 0.40 |
| Fluv Pnt Bar | from 2 to 10 | coarse | 0.00 | 0.60 | 0.40 | 0.00 |
| Fluv Pnt Bar | from 2 to 10 | medium | 0.60 | 0.40 | 0.00 | 0.00 |
| Fluv Pnt Bar | from 2 to 10 | fine | 0.60 | 0.40 | 0.00 | 0.00 |
| Fluv Pnt Bar | from 2 to 10 | v fine | 0.20 | 0.60 | 0.20 | 0.00 |
| Fluv Pnt Bar | from 10 to 25 | granular | 0.00 | 0.00 | 0.40 | 0.60 |
| Fluv Pnt Bar | from 10 to 25 | v coarse | 0.00 | 0.00 | 0.40 | 0.60 |
| Fluv Pnt Bar | from 10 to 25 | coarse | 0.00 | 0.00 | 0.60 | 0.40 |
| Fluv Pnt Bar | from 10 to 25 | medium | 0.00 | 0.40 | 0.60 | 0.00 |
| Fluv Pnt Bar | from 10 to 25 | fine | 0.00 | 0.40 | 0.60 | 0.00 |
| Fluv Pnt Bar | from 10 to 25 | v fine | 0.00 | 0.20 | 0.60 | 0.20 |

TABLE C31.2

Probability table for Node DS

| Depositional Facies | Deposited Matrix Abundance | GS Delivered | well | moderate | poor | v poor |
|---|---|---|---|---|---|---|
| Fluv Lev Splay | less than 2 | granular | 0.00 | 0.60 | 0.40 | 0.00 |
| Fluv Lev Splay | less than 2 | v coarse | 0.00 | 0.60 | 0.40 | 0.00 |
| Fluv Lev Splay | less than 2 | coarse | 0.00 | 0.60 | 0.40 | 0.00 |
| Fluv Lev Splay | less than 2 | medium | 0.60 | 0.40 | 0.00 | 0.00 |
| Fluv Lev Splay | less than 2 | fine | 0.60 | 0.40 | 0.00 | 0.00 |
| Fluv Lev Splay | less than 2 | v fine | 0.00 | 0.60 | 0.40 | 0.00 |
| Fluv Lev Splay | from 2 to 10 | granular | 0.00 | 0.10 | 0.80 | 0.10 |
| Fluv Lev Splay | from 2 to 10 | v coarse | 0.00 | 0.10 | 0.80 | 0.10 |
| Fluv Lev Splay | from 2 to 10 | coarse | 0.00 | 0.60 | 0.40 | 0.00 |
| Fluv Lev Splay | from 2 to 10 | medium | 0.10 | 0.90 | 0.00 | 0.00 |
| Fluv Lev Splay | from 2 to 10 | fine | 0.10 | 0.90 | 0.00 | 0.00 |
| Fluv Lev Splay | from 2 to 10 | v fine | 0.00 | 0.80 | 0.20 | 0.00 |
| Fluv Lev Splay | from 10 to 25 | granular | 0.00 | 0.60 | 0.40 | 0.00 |
| Fluv Lev Splay | from 10 to 25 | v coarse | 0.00 | 0.60 | 0.40 | 0.00 |
| Fluv Lev Splay | from 10 to 25 | coarse | 0.00 | 0.60 | 0.40 | 0.00 |
| Fluv Lev Splay | from 10 to 25 | medium | 0.60 | 0.40 | 0.00 | 0.00 |
| Fluv Lev Splay | from 10 to 25 | fine | 0.60 | 0.40 | 0.00 | 0.00 |
| Fluv Lev Splay | from 10 to 25 | v fine | 0.00 | 0.60 | 0.40 | 0.00 |
| Beach Foresh | less than 2 | granular | 0.80 | 0.20 | 0.00 | 0.00 |
| Beach Foresh | less than 2 | v coarse | 0.80 | 0.20 | 0.00 | 0.00 |
| Beach Foresh | less than 2 | coarse | 0.80 | 0.20 | 0.00 | 0.00 |
| Beach Foresh | less than 2 | medium | 0.90 | 0.10 | 0.00 | 0.00 |
| Beach Foresh | less than 2 | fine | 0.90 | 0.10 | 0.00 | 0.00 |
| Beach Foresh | less than 2 | v fine | 0.80 | 0.20 | 0.00 | 0.00 |
| Beach Foresh | from 2 to 10 | granular | 0.20 | 0.80 | 0.00 | 0.00 |
| Beach Foresh | from 2 to 10 | v coarse | 0.40 | 0.60 | 0.00 | 0.00 |
| Beach Foresh | from 2 to 10 | coarse | 0.40 | 0.60 | 0.00 | 0.00 |
| Beach Foresh | from 2 to 10 | medium | 0.80 | 0.20 | 0.00 | 0.00 |
| Beach Foresh | from 2 to 10 | fine | 0.80 | 0.20 | 0.00 | 0.00 |
| Beach Foresh | from 2 to 10 | v fine | 0.10 | 0.90 | 0.00 | 0.00 |

TABLE C31.2-continued

Probability table for Node DS

| Depositional Facies | Deposited Matrix Abundance | GS Delivered | well | moderate | poor | v poor |
|---|---|---|---|---|---|---|
| Beach Foresh | from 10 to 25 | granular | 0.80 | 0.20 | 0.00 | 0.00 |
| Beach Foresh | from 10 to 25 | v coarse | 0.80 | 0.20 | 0.00 | 0.00 |
| Beach Foresh | from 10 to 25 | coarse | 0.80 | 0.20 | 0.00 | 0.00 |
| Beach Foresh | from 10 to 25 | medium | 0.90 | 0.10 | 0.00 | 0.00 |
| Beach Foresh | from 10 to 25 | fine | 0.90 | 0.10 | 0.00 | 0.00 |
| Beach Foresh | from 10 to 25 | v fine | 0.80 | 0.20 | 0.00 | 0.00 |
| Beach Shorefc | less than 2 | granular | 0.00 | 0.60 | 0.40 | 0.00 |
| Beach Shorefc | less than 2 | v coarse | 0.00 | 0.60 | 0.40 | 0.00 |
| Beach Shorefc | less than 2 | coarse | 0.00 | 0.90 | 0.10 | 0.00 |
| Beach Shorefc | less than 2 | medium | 0.40 | 0.60 | 0.00 | 0.00 |
| Beach Shorefc | less than 2 | fine | 0.40 | 0.60 | 0.00 | 0.00 |
| Beach Shorefc | less than 2 | v fine | 0.00 | 0.80 | 0.20 | 0.00 |
| Beach Shorefc | from 2 to 10 | granular | 0.00 | 0.20 | 0.60 | 0.20 |
| Beach Shorefc | from 2 to 10 | v coarse | 0.00 | 0.60 | 0.40 | 0.00 |
| Beach Shorefc | from 2 to 10 | coarse | 0.00 | 0.60 | 0.40 | 0.00 |
| Beach Shorefc | from 2 to 10 | medium | 0.20 | 0.60 | 0.20 | 0.00 |
| Beach Shorefc | from 2 to 10 | fine | 0.20 | 0.60 | 0.20 | 0.00 |
| Beach Shorefc | from 2 to 10 | v fine | 0.00 | 0.80 | 0.20 | 0.00 |
| Beach Shorefc | from 10 to 25 | granular | 0.00 | 0.00 | 0.40 | 0.60 |
| Beach Shorefc | from 10 to 25 | v coarse | 0.00 | 0.00 | 0.40 | 0.60 |
| Beach Shorefc | from 10 to 25 | coarse | 0.00 | 0.00 | 0.60 | 0.40 |
| Beach Shorefc | from 10 to 25 | medium | 0.00 | 0.60 | 0.40 | 0.00 |
| Beach Shorefc | from 10 to 25 | fine | 0.00 | 0.60 | 0.40 | 0.00 |
| Beach Shorefc | from 10 to 25 | v fine | 0.00 | 0.60 | 0.20 | 0.20 |

TABLE C31.3

Probability table for Node DS

| Depositional Facies | Deposited Matrix Abundance | GS Delivered | well | moderate | poor | v poor |
|---|---|---|---|---|---|---|
| Delta Distchan | less than 2 | granular | 0.00 | 0.40 | 0.60 | 0.00 |
| Delta Distchan | less than 2 | v coarse | 0.00 | 0.60 | 0.40 | 0.00 |
| Delta Distchan | less than 2 | coarse | 0.40 | 0.60 | 0.00 | 0.00 |
| Delta Distchan | less than 2 | medium | 0.60 | 0.40 | 0.00 | 0.00 |
| Delta Distchan | less than 2 | fine | 0.60 | 0.40 | 0.00 | 0.00 |
| Delta Distchan | less than 2 | v fine | 0.40 | 0.60 | 0.00 | 0.00 |
| Delta Distchan | from 2 to 10 | granular | 0.00 | 0.00 | 0.60 | 0.40 |
| Delta Distchan | from 2 to 10 | v coarse | 0.00 | 0.00 | 0.60 | 0.40 |
| Delta Distchan | from 2 to 10 | coarse | 0.00 | 0.60 | 0.40 | 0.00 |
| Delta Distchan | from 2 to 10 | medium | 0.60 | 0.40 | 0.00 | 0.00 |
| Delta Distchan | from 2 to 10 | fine | 0.60 | 0.40 | 0.00 | 0.00 |
| Delta Distchan | from 2 to 10 | v fine | 0.20 | 0.60 | 0.20 | 0.00 |
| Delta Distchan | from 10 to 25 | granular | 0.00 | 0.00 | 0.40 | 0.60 |
| Delta Distchan | from 10 to 25 | v coarse | 0.00 | 0.00 | 0.40 | 0.60 |
| Delta Distchan | from 10 to 25 | coarse | 0.00 | 0.00 | 0.60 | 0.40 |
| Delta Distchan | from 10 to 25 | medium | 0.00 | 0.40 | 0.60 | 0.00 |
| Delta Distchan | from 10 to 25 | fine | 0.00 | 0.40 | 0.60 | 0.00 |
| Delta Distchan | from 10 to 25 | v fine | 0.00 | 0.20 | 0.60 | 0.20 |
| Delta Prox Front | less than 2 | granular | 0.00 | 0.60 | 0.40 | 0.00 |
| Delta Prox Front | less than 2 | v coarse | 0.10 | 0.90 | 0.00 | 0.00 |
| Delta Prox Front | less than 2 | coarse | 0.60 | 0.40 | 0.00 | 0.00 |
| Delta Prox Front | less than 2 | medium | 0.90 | 0.10 | 0.00 | 0.00 |
| Delta Prox Front | less than 2 | fine | 0.90 | 0.10 | 0.00 | 0.00 |
| Delta Prox Front | less than 2 | v fine | 0.60 | 0.40 | 0.00 | 0.00 |
| Delta Prox Front | from 2 to 10 | granular | 0.00 | 0.40 | 0.60 | 0.00 |
| Delta Prox Front | from 2 to 10 | v coarse | 0.00 | 0.40 | 0.60 | 0.00 |
| Delta Prox Front | from 2 to 10 | coarse | 0.00 | 0.60 | 0.40 | 0.00 |
| Delta Prox Front | from 2 to 10 | medium | 0.40 | 0.60 | 0.00 | 0.00 |
| Delta Prox Front | from 2 to 10 | fine | 0.40 | 0.60 | 0.00 | 0.00 |
| Delta Prox Front | from 2 to 10 | v fine | 0.10 | 0.90 | 0.00 | 0.00 |
| Delta Prox Front | from 10 to 25 | granular | 0.00 | 0.20 | 0.60 | 0.20 |
| Delta Prox Front | from 10 to 25 | v coarse | 0.00 | 0.20 | 0.60 | 0.20 |
| Delta Prox Front | from 10 to 25 | coarse | 0.00 | 0.20 | 0.60 | 0.20 |
| Delta Prox Front | from 10 to 25 | medium | 0.10 | 0.80 | 0.10 | 0.00 |
| Delta Prox Front | from 10 to 25 | fine | 0.10 | 0.80 | 0.10 | 0.00 |
| Delta Prox Front | from 10 to 25 | v fine | 0.00 | 0.60 | 0.40 | 0.00 |
| Delta Dist Front | less than 2 | granular | 0.70 | 0.30 | 0.00 | 0.00 |

TABLE C31.3-continued

Probability table for Node DS

| Depositional Facies | Deposited Matrix Abundance | GS Delivered | well | moderate | poor | v poor |
|---|---|---|---|---|---|---|
| Delta Dist Front | less than 2 | v coarse | 0.70 | 0.30 | 0.00 | 0.00 |
| Delta Dist Front | less than 2 | coarse | 0.80 | 0.20 | 0.00 | 0.00 |
| Delta Dist Front | less than 2 | medium | 0.90 | 0.10 | 0.00 | 0.00 |
| Delta Dist Front | less than 2 | fine | 0.90 | 0.10 | 0.00 | 0.00 |
| Delta Dist Front | less than 2 | v fine | 0.80 | 0.20 | 0.00 | 0.00 |
| Delta Dist Front | from 2 to 10 | granular | 0.00 | 0.30 | 0.50 | 0.20 |
| Delta Dist Front | from 2 to 10 | v coarse | 0.00 | 0.30 | 0.50 | 0.20 |
| Delta Dist Front | from 2 to 10 | coarse | 0.00 | 0.60 | 0.40 | 0.00 |
| Delta Dist Front | from 2 to 10 | medium | 0.50 | 0.40 | 0.10 | 0.00 |
| Delta Dist Front | from 2 to 10 | fine | 0.50 | 0.40 | 0.10 | 0.00 |
| Delta Dist Front | from 2 to 10 | v fine | 0.30 | 0.70 | 0.00 | 0.00 |
| Delta Dist Front | from 10 to 25 | granular | 0.00 | 0.30 | 0.50 | 0.20 |
| Delta Dist Front | from 10 to 25 | v coarse | 0.00 | 0.30 | 0.50 | 0.20 |
| Delta Dist Front | from 10 to 25 | coarse | 0.00 | 0.60 | 0.40 | 0.00 |
| Delta Dist Front | from 10 to 25 | medium | 0.50 | 0.40 | 0.10 | 0.00 |
| Delta Dist Front | from 10 to 25 | fine | 0.50 | 0.40 | 0.10 | 0.00 |
| Delta Dist Front | from 10 to 25 | v fine | 0.30 | 0.70 | 0.00 | 0.00 |

TABLE C31.4

Probability table for Node DS

| Depositional Facies | Deposited Matrix Abundance | GS Delivered | well | moderate | poor | v poor |
|---|---|---|---|---|---|---|
| Tidal Chan Bar | less than 2 | granular | 0.10 | 0.80 | 0.10 | 0.00 |
| Tidal Chan Bar | less than 2 | v coarse | 0.30 | 0.60 | 0.10 | 0.00 |
| Tidal Chan Bar | less than 2 | coarse | 0.30 | 0.60 | 0.10 | 0.00 |
| Tidal Chan Bar | less than 2 | medium | 0.70 | 0.30 | 0.00 | 0.00 |
| Tidal Chan Bar | less than 2 | fine | 0.70 | 0.30 | 0.00 | 0.00 |
| Tidal Chan Bar | less than 2 | v fine | 0.50 | 0.50 | 0.00 | 0.00 |
| Tidal Chan Bar | from 2 to 10 | granular | 0.00 | 0.60 | 0.40 | 0.00 |
| Tidal Chan Bar | from 2 to 10 | v coarse | 0.30 | 0.50 | 0.20 | 0.00 |
| Tidal Chan Bar | from 2 to 10 | coarse | 0.30 | 0.50 | 0.20 | 0.00 |
| Tidal Chan Bar | from 2 to 10 | medium | 0.60 | 0.30 | 0.10 | 0.00 |
| Tidal Chan Bar | from 2 to 10 | fine | 0.60 | 0.30 | 0.10 | 0.00 |
| Tidal Chan Bar | from 2 to 10 | v fine | 0.30 | 0.50 | 0.20 | 0.00 |
| Tidal Chan Bar | from 10 to 25 | granular | 0.00 | 0.40 | 0.60 | 0.00 |
| Tidal Chan Bar | from 10 to 25 | v coarse | 0.00 | 0.40 | 0.60 | 0.00 |
| Tidal Chan Bar | from 10 to 25 | coarse | 0.00 | 0.60 | 0.40 | 0.00 |
| Tidal Chan Bar | from 10 to 25 | medium | 0.50 | 0.30 | 0.20 | 0.00 |
| Tidal Chan Bar | from 10 to 25 | fine | 0.50 | 0.30 | 0.20 | 0.00 |
| Tidal Chan Bar | from 10 to 25 | v fine | 0.00 | 0.80 | 0.20 | 0.00 |
| Eolian Dune | less than 2 | granular | 0.00 | 0.40 | 0.60 | 0.00 |
| Eolian Dune | less than 2 | v coarse | 0.00 | 0.60 | 0.40 | 0.00 |
| Eolian Dune | less than 2 | coarse | 0.40 | 0.60 | 0.00 | 0.00 |
| Eolian Dune | less than 2 | medium | 0.60 | 0.40 | 0.00 | 0.00 |
| Eolian Dune | less than 2 | fine | 0.60 | 0.40 | 0.00 | 0.00 |
| Eolian Dune | less than 2 | v fine | 0.40 | 0.60 | 0.00 | 0.00 |
| Eolian Dune | from 2 to 10 | granular | 0.00 | 0.00 | 0.60 | 0.40 |
| Eolian Dune | from 2 to 10 | v coarse | 0.00 | 0.00 | 0.60 | 0.40 |
| Eolian Dune | from 2 to 10 | coarse | 0.00 | 0.60 | 0.40 | 0.00 |
| Eolian Dune | from 2 to 10 | medium | 0.60 | 0.40 | 0.00 | 0.00 |
| Eolian Dune | from 2 to 10 | fine | 0.60 | 0.40 | 0.00 | 0.00 |
| Eolian Dune | from 2 to 10 | v fine | 0.20 | 0.60 | 0.20 | 0.00 |
| Eolian Dune | from 10 to 25 | granular | 0.00 | 0.00 | 0.40 | 0.60 |
| Eolian Dune | from 10 to 25 | v coarse | 0.00 | 0.00 | 0.40 | 0.60 |
| Eolian Dune | from 10 to 25 | coarse | 0.00 | 0.00 | 0.60 | 0.40 |
| Eolian Dune | from 10 to 25 | medium | 0.00 | 0.40 | 0.60 | 0.00 |
| Eolian Dune | from 10 to 25 | fine | 0.00 | 0.40 | 0.60 | 0.00 |
| Eolian Dune | from 10 to 25 | v fine | 0.00 | 0.20 | 0.60 | 0.20 |
| DW TurbChan | less than 2 | granular | 0.70 | 0.30 | 0.00 | 0.00 |
| DW TurbChan | less than 2 | v coarse | 0.70 | 0.30 | 0.00 | 0.00 |
| DW TurbChan | less than 2 | coarse | 0.80 | 0.20 | 0.00 | 0.00 |
| DW TurbChan | less than 2 | medium | 0.90 | 0.10 | 0.00 | 0.00 |
| DW TurbChan | less than 2 | fine | 0.90 | 0.10 | 0.00 | 0.00 |
| DW TurbChan | less than 2 | v fine | 0.80 | 0.20 | 0.00 | 0.00 |
| DW TurbChan | from 2 to 10 | granular | 0.60 | 0.20 | 0.20 | 0.00 |
| DW TurbChan | from 2 to 10 | v coarse | 0.60 | 0.20 | 0.20 | 0.00 |

TABLE C31.4-continued

Probability table for Node DS

| Depositional Facies | Deposited Matrix Abundance | GS Delivered | well | moderate | poor | v poor |
|---|---|---|---|---|---|---|
| DW TurbChan | from 2 to 10 | coarse | 0.60 | 0.40 | 0.00 | 0.00 |
| DW TurbChan | from 2 to 10 | medium | 0.80 | 0.20 | 0.00 | 0.00 |
| DW TurbChan | from 2 to 10 | fine | 0.80 | 0.20 | 0.00 | 0.00 |
| DW TurbChan | from 2 to 10 | v fine | 0.60 | 0.40 | 0.00 | 0.00 |
| DW TurbChan | from 10 to 25 | granular | 0.20 | 0.60 | 0.20 | 0.00 |
| DW TurbChan | from 10 to 25 | v coarse | 0.20 | 0.60 | 0.20 | 0.00 |
| DW TurbChan | from 10 to 25 | coarse | 0.30 | 0.60 | 0.10 | 0.00 |
| DW TurbChan | from 10 to 25 | medium | 0.30 | 0.60 | 0.10 | 0.00 |
| DW TutbChan | from 10 to 25 | fine | 0.30 | 0.60 | 0.10 | 0.00 |
| DW TurbChan | from 10 to 25 | v fine | 0.40 | 0.60 | 0.00 | 0.00 |

TABLE C31.5

Probability table for Node DS

| Depositional Facies | Deposited Matrix Abundance | GS Delivered | well | moderate | poor | v poor |
|---|---|---|---|---|---|---|
| DW TurbLevee | less than 2 | granular | 0.70 | 0.30 | 0.00 | 0.00 |
| DW TurbLevee | less than 2 | v coarse | 0.70 | 0.30 | 0.00 | 0.00 |
| DW TurbLevee | less than 2 | coarse | 0.80 | 0.20 | 0.00 | 0.00 |
| DW TurbLevee | less than 2 | medium | 0.90 | 0.10 | 0.00 | 0.00 |
| DW TurbLevee | less than 2 | fine | 0.90 | 0.10 | 0.00 | 0.00 |
| DW TurbLevee | less than 2 | v fine | 0.80 | 0.20 | 0.00 | 0.00 |
| DW TurbLevee | from 2 to 10 | granular | 0.60 | 0.20 | 0.20 | 0.00 |
| DW TurbLevee | from 2 to 10 | v coarse | 0.60 | 0.20 | 0.20 | 0.00 |
| DW TurbLevee | from 2 to 10 | coarse | 0.60 | 0.40 | 0.00 | 0.00 |
| DW TurbLevee | from 2 to 10 | medium | 0.80 | 0.20 | 0.00 | 0.00 |
| DW TurbLevee | from 2 to 10 | fine | 0.80 | 0.20 | 0.00 | 0.00 |
| DW TurbLevee | from 2 to 10 | v fine | 0.60 | 0.40 | 0.00 | 0.00 |
| DW TurbLevee | from 10 to 25 | granular | 0.20 | 0.60 | 0.20 | 0.00 |
| DW TurbLevee | from 10 to 25 | v coarse | 0.20 | 0.60 | 0.20 | 0.00 |
| DW TurbLevee | from 10 to 25 | coarse | 0.30 | 0.60 | 0.10 | 0.00 |
| DW TurbLevee | from 10 to 25 | medium | 0.30 | 0.60 | 0.10 | 0.00 |
| DW TurbLevee | from 10 to 25 | fine | 0.30 | 0.60 | 0.10 | 0.00 |
| DW TurbLevee | from 10 to 25 | v fine | 0.40 | 0.60 | 0.00 | 0.00 |
| DW DebChan | less than 2 | granular | 0.00 | 0.20 | 0.60 | 0.20 |
| DW DebChan | less than 2 | v coarse | 0.00 | 0.60 | 0.20 | 0.20 |
| DW DebChan | less than 2 | coarse | 0.00 | 0.60 | 0.20 | 0.20 |
| DW DebChan | less than 2 | medium | 0.00 | 0.60 | 0.40 | 0.00 |
| DW DebChan | less than 2 | fine | 0.00 | 0.60 | 0.40 | 0.00 |
| DW DebChan | less than 2 | v fine | 0.00 | 0.60 | 0.40 | 0.00 |
| DW DebChan | from 2 to 10 | granular | 0.00 | 0.20 | 0.60 | 0.20 |
| DW DebChan | from 2 to 10 | v coarse | 0.00 | 0.20 | 0.60 | 0.20 |
| DW DebChan | from 2 to 10 | coarse | 0.00 | 0.20 | 0.60 | 0.20 |
| DW DebChan | from 2 to 10 | medium | 0.00 | 0.50 | 0.50 | 0.00 |
| DW DebChan | from 2 to 10 | fine | 0.00 | 0.60 | 0.40 | 0.00 |
| DW DebChan | from 2 to 10 | v fine | 0.00 | 0.60 | 0.40 | 0.00 |
| DW DebChan | from 10 to 25 | granular | 0.00 | 0.00 | 0.40 | 0.60 |
| DW DebChan | from 10 to 25 | v coarse | 0.00 | 0.00 | 0.60 | 0.40 |
| DW DebChan | from 10 to 25 | coarse | 0.00 | 0.20 | 0.60 | 0.20 |
| DW DebChan | from 10 to 25 | medium | 0.00 | 0.50 | 0.50 | 0.00 |
| DW DebChan | from 10 to 25 | fine | 0.00 | 0.50 | 0.50 | 0.00 |
| DW DebChan | from 10 to 25 | v fine | 0.00 | 0.50 | 0.50 | 0.00 |
| DW DebLevee | less than 2 | granular | 0.00 | 0.20 | 0.60 | 0.20 |
| DW DebLevee | less than 2 | v coarse | 0.00 | 0.60 | 0.20 | 0.20 |
| DW DebLevee | less than 2 | coarse | 0.00 | 0.60 | 0.20 | 0.20 |
| DW DebLevee | less than 2 | medium | 0.00 | 0.60 | 0.40 | 0.00 |
| DW DebLevee | less than 2 | fine | 0.00 | 0.60 | 0.40 | 0.00 |
| DW DebLevee | less than 2 | v fine | 0.00 | 0.60 | 0.40 | 0.00 |
| DW DebLevee | from 2 to 10 | granular | 0.00 | 0.20 | 0.60 | 0.20 |
| DW DebLevee | from 2 to 10 | v coarse | 0.00 | 0.20 | 0.60 | 0.20 |
| DW DebLevee | from 2 to 10 | coarse | 0.00 | 0.20 | 0.60 | 0.20 |
| DW DebLevee | from 2 to 10 | medium | 0.00 | 0.50 | 0.50 | 0.00 |
| DW DebLevee | from 2 to 10 | fine | 0.00 | 0.60 | 0.40 | 0.00 |
| DW DebLevee | from 2 to 10 | v fine | 0.00 | 0.60 | 0.40 | 0.00 |
| DW DebLevee | from 10 to 25 | granular | 0.00 | 0.00 | 0.40 | 0.60 |
| DW DebLevee | from 10 to 25 | v coarse | 0.00 | 0.00 | 0.60 | 0.40 |
| DW DebLevee | from 10 to 25 | coarse | 0.00 | 0.20 | 0.60 | 0.20 |

TABLE C31.5-continued

Probability table for Node DS

| Depositional Facies | Deposited Matrix Abundance | GS Delivered | well | moderate | poor | v poor |
|---|---|---|---|---|---|---|
| DW DebLevee | from 10 to 25 | medium | 0.00 | 0.50 | 0.50 | 0.00 |
| DW DebLevee | from 10 to 25 | fine | 0.00 | 0.50 | 0.50 | 0.00 |
| DW DebLevee | from 10 to 25 | v fine | 0.00 | 0.50 | 0.50 | 0.00 |

TABLE C32.1.1

Probability table for Node FCIBU

| Modified CIBU | GGS | Final CIBU Sand 2 | 7 | 8 | 9 | 12 | 13 | 14 | 17 | 18 | 19 |
|---|---|---|---|---|---|---|---|---|---|---|---|
| 2 | vc-c | 0.025 | 0.025 | 0.025 | 0.025 | 0.025 | 0.025 | 0.025 | 0.025 | 0.025 | 0.025 |
| 2 | m | 0.025 | 0.025 | 0.025 | 0.025 | 0.025 | 0.025 | 0.025 | 0.025 | 0.025 | 0.025 |
| 2 | f-vf | 0.025 | 0.025 | 0.025 | 0.025 | 0.025 | 0.025 | 0.025 | 0.025 | 0.025 | 0.025 |
| 7 | vc-c | 0.025 | 0.025 | 0.025 | 0.025 | 0.025 | 0.025 | 0.025 | 0.025 | 0.025 | 0.025 |
| 7 | m | 0.025 | 0.025 | 0.025 | 0.025 | 0.025 | 0.025 | 0.025 | 0.025 | 0.025 | 0.025 |
| 7 | f-vf | 0.025 | 0.025 | 0.025 | 0.025 | 0.025 | 0.025 | 0.025 | 0.025 | 0.025 | 0.025 |
| 8 | vc-c | 0.025 | 0.025 | 0.025 | 0.025 | 0.025 | 0.025 | 0.025 | 0.025 | 0.025 | 0.025 |
| 8 | m | 0.025 | 0.025 | 0.025 | 0.025 | 0.025 | 0.025 | 0.025 | 0.025 | 0.025 | 0.025 |
| 8 | f-vf | 0.025 | 0.025 | 0.025 | 0.025 | 0.025 | 0.025 | 0.025 | 0.025 | 0.025 | 0.025 |
| 9 | vc-c | 0.025 | 0.025 | 0.025 | 0.025 | 0.025 | 0.025 | 0.025 | 0.025 | 0.025 | 0.025 |
| 9 | m | 0.025 | 0.025 | 0.025 | 0.025 | 0.025 | 0.025 | 0.025 | 0.025 | 0.025 | 0.025 |
| 9 | f-vf | 0.025 | 0.025 | 0.025 | 0.025 | 0.025 | 0.025 | 0.025 | 0.025 | 0.025 | 0.025 |
| 12 | vc-c | 0.025 | 0.025 | 0.025 | 0.025 | 0.025 | 0.025 | 0.025 | 0.025 | 0.025 | 0.025 |
| 12 | m | 0.025 | 0.025 | 0.025 | 0.025 | 0.025 | 0.025 | 0.025 | 0.025 | 0.025 | 0.025 |
| 12 | f-vf | 0.025 | 0.025 | 0.025 | 0.025 | 0.025 | 0.025 | 0.025 | 0.025 | 0.025 | 0.025 |
| 13 | vc-c | 0.025 | 0.025 | 0.025 | 0.025 | 0.025 | 0.025 | 0.025 | 0.025 | 0.025 | 0.025 |
| 13 | m | 0.025 | 0.025 | 0.025 | 0.025 | 0.025 | 0.025 | 0.025 | 0.025 | 0.025 | 0.025 |
| 13 | f-vf | 0.025 | 0.025 | 0.025 | 0.025 | 0.025 | 0.025 | 0.025 | 0.025 | 0.025 | 0.025 |
| 14 | vc-c | 0.025 | 0.025 | 0.025 | 0.025 | 0.025 | 0.025 | 0.025 | 0.025 | 0.025 | 0.025 |
| 14 | m | 0.025 | 0.025 | 0.025 | 0.025 | 0.025 | 0.025 | 0.025 | 0.025 | 0.025 | 0.025 |
| 14 | f-vf | 0.025 | 0.025 | 0.025 | 0.025 | 0.025 | 0.025 | 0.025 | 0.025 | 0.025 | 0.025 |
| 17 | vc-c | 0.025 | 0.025 | 0.025 | 0.025 | 0.025 | 0.025 | 0.025 | 0.025 | 0.025 | 0.025 |
| 17 | m | 0.025 | 0.025 | 0.025 | 0.025 | 0.025 | 0.025 | 0.025 | 0.025 | 0.025 | 0.025 |
| 17 | f-vf | 0.025 | 0.025 | 0.025 | 0.025 | 0.025 | 0.025 | 0.025 | 0.025 | 0.025 | 0.025 |
| 18 | vc-c | 0.025 | 0.025 | 0.025 | 0.025 | 0.025 | 0.025 | 0.025 | 0.025 | 0.025 | 0.025 |
| 18 | m | 0.025 | 0.025 | 0.025 | 0.025 | 0.025 | 0.025 | 0.025 | 0.025 | 0.025 | 0.025 |
| 18 | f-vf | 0.025 | 0.025 | 0.025 | 0.025 | 0.025 | 0.025 | 0.025 | 0.025 | 0.025 | 0.025 |
| 19 | vc-c | 0.025 | 0.025 | 0.025 | 0.025 | 0.025 | 0.025 | 0.025 | 0.025 | 0.025 | 0.025 |
| 19 | m | 0.025 | 0.025 | 0.025 | 0.025 | 0.025 | 0.025 | 0.025 | 0.025 | 0.025 | 0.025 |
| 19 | f-vf | 0.025 | 0.025 | 0.025 | 0.025 | 0.025 | 0.025 | 0.025 | 0.025 | 0.025 | 0.025 |
| 20 | vc-c | 0.025 | 0.025 | 0.025 | 0.025 | 0.025 | 0.025 | 0.025 | 0.025 | 0.025 | 0.025 |
| 20 | m | 0.025 | 0.025 | 0.025 | 0.025 | 0.025 | 0.025 | 0.025 | 0.025 | 0.025 | 0.025 |
| 20 | f-vf | 0.025 | 0.025 | 0.025 | 0.025 | 0.025 | 0.025 | 0.025 | 0.025 | 0.025 | 0.025 |
| 24 | vc-c | 0.025 | 0.025 | 0.025 | 0.025 | 0.025 | 0.025 | 0.025 | 0.025 | 0.025 | 0.025 |
| 24 | m | 0.025 | 0.025 | 0.025 | 0.025 | 0.025 | 0.025 | 0.025 | 0.025 | 0.025 | 0.025 |
| 24 | f-vf | 0.025 | 0.025 | 0.025 | 0.025 | 0.025 | 0.025 | 0.025 | 0.025 | 0.025 | 0.025 |

| Modified CIBU | Final CIBU Sand 20 | 24 | 25 | 26 | 27 | 31 | 32 | 33 | 34 | 35 |
|---|---|---|---|---|---|---|---|---|---|---|
| 2 | 0.025 | 0.025 | 0.025 | 0.025 | 0.025 | 0.025 | 0.025 | 0.025 | 0.025 | 0.025 |
| 2 | 0.025 | 0.025 | 0.025 | 0.025 | 0.025 | 0.025 | 0.025 | 0.025 | 0.025 | 0.025 |
| 2 | 0.025 | 0.025 | 0.025 | 0.025 | 0.025 | 0.025 | 0.025 | 0.025 | 0.025 | 0.025 |
| 7 | 0.025 | 0.025 | 0.025 | 0.025 | 0.025 | 0.025 | 0.025 | 0.025 | 0.025 | 0.025 |
| 7 | 0.025 | 0.025 | 0.025 | 0.025 | 0.025 | 0.025 | 0.025 | 0.025 | 0.025 | 0.025 |
| 7 | 0.025 | 0.025 | 0.025 | 0.025 | 0.025 | 0.025 | 0.025 | 0.025 | 0.025 | 0.025 |
| 8 | 0.025 | 0.025 | 0.025 | 0.025 | 0.025 | 0.025 | 0.025 | 0.025 | 0.025 | 0.025 |
| 8 | 0.025 | 0.025 | 0.025 | 0.025 | 0.025 | 0.025 | 0.025 | 0.025 | 0.025 | 0.025 |
| 8 | 0.025 | 0.025 | 0.025 | 0.025 | 0.025 | 0.025 | 0.025 | 0.025 | 0.025 | 0.025 |
| 9 | 0.025 | 0.025 | 0.025 | 0.025 | 0.025 | 0.025 | 0.025 | 0.025 | 0.025 | 0.025 |
| 9 | 0.025 | 0.025 | 0.025 | 0.025 | 0.025 | 0.025 | 0.025 | 0.025 | 0.025 | 0.025 |
| 9 | 0.025 | 0.025 | 0.025 | 0.025 | 0.025 | 0.025 | 0.025 | 0.025 | 0.025 | 0.025 |
| 12 | 0.025 | 0.025 | 0.025 | 0.025 | 0.025 | 0.025 | 0.025 | 0.025 | 0.025 | 0.025 |
| 12 | 0.025 | 0.025 | 0.025 | 0.025 | 0.025 | 0.025 | 0.025 | 0.025 | 0.025 | 0.025 |
| 12 | 0.025 | 0.025 | 0.025 | 0.025 | 0.025 | 0.025 | 0.025 | 0.025 | 0.025 | 0.025 |
| 13 | 0.025 | 0.025 | 0.025 | 0.025 | 0.025 | 0.025 | 0.025 | 0.025 | 0.025 | 0.025 |
| 13 | 0.025 | 0.025 | 0.025 | 0.025 | 0.025 | 0.025 | 0.025 | 0.025 | 0.025 | 0.025 |

TABLE C32.1.1-continued

| Probability table for Node FCIBU | | | | | | | | | | |
|---|---|---|---|---|---|---|---|---|---|---|
| 13 | 0.025 | 0.025 | 0.025 | 0.025 | 0.025 | 0.025 | 0.025 | 0.025 | 0.025 | 0.025 |
| 14 | 0.025 | 0.025 | 0.025 | 0.025 | 0.025 | 0.025 | 0.025 | 0.025 | 0.025 | 0.025 |
| 14 | 0.025 | 0.025 | 0.025 | 0.025 | 0.025 | 0.025 | 0.025 | 0.025 | 0.025 | 0.025 |
| 14 | 0.025 | 0.025 | 0.025 | 0.025 | 0.025 | 0.025 | 0.025 | 0.025 | 0.025 | 0.025 |
| 17 | 0.025 | 0.025 | 0.025 | 0.025 | 0.025 | 0.025 | 0.025 | 0.025 | 0.025 | 0.025 |
| 17 | 0.025 | 0.025 | 0.025 | 0.025 | 0.025 | 0.025 | 0.025 | 0.025 | 0.025 | 0.025 |
| 17 | 0.025 | 0.025 | 0.025 | 0.025 | 0.025 | 0.025 | 0.025 | 0.025 | 0.025 | 0.025 |
| 18 | 0.025 | 0.025 | 0.025 | 0.025 | 0.025 | 0.025 | 0.025 | 0.025 | 0.025 | 0.025 |
| 18 | 0.025 | 0.025 | 0.025 | 0.025 | 0.025 | 0.025 | 0.025 | 0.025 | 0.025 | 0.025 |
| 18 | 0.025 | 0.025 | 0.025 | 0.025 | 0.025 | 0.025 | 0.025 | 0.025 | 0.025 | 0.025 |
| 19 | 0.025 | 0.025 | 0.025 | 0.025 | 0.025 | 0.025 | 0.025 | 0.025 | 0.025 | 0.025 |
| 19 | 0.025 | 0.025 | 0.025 | 0.025 | 0.025 | 0.025 | 0.025 | 0.025 | 0.025 | 0.025 |
| 19 | 0.025 | 0.025 | 0.025 | 0.025 | 0.025 | 0.025 | 0.025 | 0.025 | 0.025 | 0.025 |
| 20 | 0.025 | 0.025 | 0.025 | 0.025 | 0.025 | 0.025 | 0.025 | 0.025 | 0.025 | 0.025 |
| 20 | 0.025 | 0.025 | 0.025 | 0.025 | 0.025 | 0.025 | 0.025 | 0.025 | 0.025 | 0.025 |
| 20 | 0.025 | 0.025 | 0.025 | 0.025 | 0.025 | 0.025 | 0.025 | 0.025 | 0.025 | 0.025 |
| 24 | 0.025 | 0.025 | 0.025 | 0.025 | 0.025 | 0.025 | 0.025 | 0.025 | 0.025 | 0.025 |
| 24 | 0.025 | 0.025 | 0.025 | 0.025 | 0.025 | 0.025 | 0.025 | 0.025 | 0.025 | 0.025 |
| 24 | 0.025 | 0.025 | 0.025 | 0.025 | 0.025 | 0.025 | 0.025 | 0.025 | 0.025 | 0.025 |

TABLE C32.1.2

| Probability table for Node FCIBU | | | | | | | | | | | |
|---|---|---|---|---|---|---|---|---|---|---|---|
| Modified | | Final CIBU Sand | | | | | | | | | |
| CIBU | GGS | 2 | 7 | 8 | 9 | 12 | 13 | 14 | 17 | 18 | 19 |
| 25 | vc-c | 0.025 | 0.025 | 0.025 | 0.025 | 0.025 | 0.025 | 0.025 | 0.025 | 0.025 | 0.025 |
| 25 | m | 0.025 | 0.025 | 0.025 | 0.025 | 0.025 | 0.025 | 0.025 | 0.025 | 0.025 | 0.025 |
| 25 | f-vf | 0.025 | 0.025 | 0.025 | 0.025 | 0.025 | 0.025 | 0.025 | 0.025 | 0.025 | 0.025 |
| 26 | vc-c | 0.025 | 0.025 | 0.025 | 0.025 | 0.025 | 0.025 | 0.025 | 0.025 | 0.025 | 0.025 |
| 26 | m | 0.025 | 0.025 | 0.025 | 0.025 | 0.025 | 0.025 | 0.025 | 0.025 | 0.025 | 0.025 |
| 26 | f-vf | 0.025 | 0.025 | 0.025 | 0.025 | 0.025 | 0.025 | 0.025 | 0.025 | 0.025 | 0.025 |
| 27 | vc-c | 0.025 | 0.025 | 0.025 | 0.025 | 0.025 | 0.025 | 0.025 | 0.025 | 0.025 | 0.025 |
| 27 | m | 0.025 | 0.025 | 0.025 | 0.025 | 0.025 | 0.025 | 0.025 | 0.025 | 0.025 | 0.025 |
| 27 | f-vf | 0.025 | 0.025 | 0.025 | 0.025 | 0.025 | 0.025 | 0.025 | 0.025 | 0.025 | 0.025 |
| 31 | vc-c | 0.025 | 0.025 | 0.025 | 0.025 | 0.025 | 0.025 | 0.025 | 0.025 | 0.025 | 0.025 |
| 31 | m | 0.025 | 0.025 | 0.025 | 0.025 | 0.025 | 0.025 | 0.025 | 0.025 | 0.025 | 0.025 |
| 31 | f-vf | 0.025 | 0.025 | 0.025 | 0.025 | 0.025 | 0.025 | 0.025 | 0.025 | 0.025 | 0.025 |
| 32 | vc-c | 0.025 | 0.025 | 0.025 | 0.025 | 0.025 | 0.025 | 0.025 | 0.025 | 0.025 | 0.025 |
| 32 | m | 0.025 | 0.025 | 0.025 | 0.025 | 0.025 | 0.025 | 0.025 | 0.025 | 0.025 | 0.025 |
| 32 | f-vf | 0.025 | 0.025 | 0.025 | 0.025 | 0.025 | 0.025 | 0.025 | 0.025 | 0.025 | 0.025 |
| 33 | vc-c | 0.025 | 0.025 | 0.025 | 0.025 | 0.025 | 0.025 | 0.025 | 0.025 | 0.025 | 0.025 |
| 33 | m | 0.025 | 0.025 | 0.025 | 0.025 | 0.025 | 0.025 | 0.025 | 0.025 | 0.025 | 0.025 |
| 33 | f-vf | 0.025 | 0.025 | 0.025 | 0.025 | 0.025 | 0.025 | 0.025 | 0.025 | 0.025 | 0.025 |
| 34 | vc-c | 0.025 | 0.025 | 0.025 | 0.025 | 0.025 | 0.025 | 0.025 | 0.025 | 0.025 | 0.025 |
| 34 | m | 0.025 | 0.025 | 0.025 | 0.025 | 0.025 | 0.025 | 0.025 | 0.025 | 0.025 | 0.025 |
| 34 | f-vf | 0.025 | 0.025 | 0.025 | 0.025 | 0.025 | 0.025 | 0.025 | 0.025 | 0.025 | 0.025 |
| 35 | vc-c | 0.025 | 0.025 | 0.025 | 0.025 | 0.025 | 0.025 | 0.025 | 0.025 | 0.025 | 0.025 |
| 35 | m | 0.025 | 0.025 | 0.025 | 0.025 | 0.025 | 0.025 | 0.025 | 0.025 | 0.025 | 0.025 |
| 35 | f-vf | 0.025 | 0.025 | 0.025 | 0.025 | 0.025 | 0.025 | 0.025 | 0.025 | 0.025 | 0.025 |
| 40 | vc-c | 0.025 | 0.025 | 0.025 | 0.025 | 0.025 | 0.025 | 0.025 | 0.025 | 0.025 | 0.025 |
| 40 | m | 0.025 | 0.025 | 0.025 | 0.025 | 0.025 | 0.025 | 0.025 | 0.025 | 0.025 | 0.025 |
| 40 | f-vf | 0.025 | 0.025 | 0.025 | 0.025 | 0.025 | 0.025 | 0.025 | 0.025 | 0.025 | 0.025 |
| 41 | vc-c | 0.025 | 0.025 | 0.025 | 0.025 | 0.025 | 0.025 | 0.025 | 0.025 | 0.025 | 0.025 |
| 41 | m | 0.025 | 0.025 | 0.025 | 0.025 | 0.025 | 0.025 | 0.025 | 0.025 | 0.025 | 0.025 |
| 41 | f-vf | 0.025 | 0.025 | 0.025 | 0.025 | 0.025 | 0.025 | 0.025 | 0.025 | 0.025 | 0.025 |
| 42 | vc-c | 0.025 | 0.025 | 0.025 | 0.025 | 0.025 | 0.025 | 0.025 | 0.025 | 0.025 | 0.025 |
| 42 | m | 0.025 | 0.025 | 0.025 | 0.025 | 0.025 | 0.025 | 0.025 | 0.025 | 0.025 | 0.025 |
| 42 | f-vf | 0.025 | 0.025 | 0.025 | 0.025 | 0.025 | 0.025 | 0.025 | 0.025 | 0.025 | 0.025 |
| 43 | vc-c | 0.025 | 0.025 | 0.025 | 0.025 | 0.025 | 0.025 | 0.025 | 0.025 | 0.025 | 0.025 |
| 43 | m | 0.025 | 0.025 | 0.025 | 0.025 | 0.025 | 0.025 | 0.025 | 0.025 | 0.025 | 0.025 |
| 43 | f-vf | 0.025 | 0.025 | 0.025 | 0.025 | 0.025 | 0.025 | 0.025 | 0.025 | 0.025 | 0.025 |

| Modified | Final CIBU Sand | | | | | | | | | |
|---|---|---|---|---|---|---|---|---|---|---|
| CIBU | 20 | 24 | 25 | 26 | 27 | 31 | 32 | 33 | 34 | 35 |
| 25 | 0.025 | 0.025 | 0.025 | 0.025 | 0.025 | 0.025 | 0.025 | 0.025 | 0.025 | 0.025 |
| 25 | 0.025 | 0.025 | 0.025 | 0.025 | 0.025 | 0.025 | 0.025 | 0.025 | 0.025 | 0.025 |
| 25 | 0.025 | 0.025 | 0.025 | 0.025 | 0.025 | 0.025 | 0.025 | 0.025 | 0.025 | 0.025 |
| 26 | 0.025 | 0.025 | 0.025 | 0.025 | 0.025 | 0.025 | 0.025 | 0.025 | 0.025 | 0.025 |
| 26 | 0.025 | 0.025 | 0.025 | 0.025 | 0.025 | 0.025 | 0.025 | 0.025 | 0.025 | 0.025 |

TABLE C32.1.2-continued

Probability table for Node FCIBU

| | | | | | | | | | | |
|---|---|---|---|---|---|---|---|---|---|---|
| 26 | 0.025 | 0.025 | 0.025 | 0.025 | 0.025 | 0.025 | 0.025 | 0.025 | 0.025 | 0.025 |
| 27 | 0.025 | 0.025 | 0.025 | 0.025 | 0.025 | 0.025 | 0.025 | 0.025 | 0.025 | 0.025 |
| 27 | 0.025 | 0.025 | 0.025 | 0.025 | 0.025 | 0.025 | 0.025 | 0.025 | 0.025 | 0.025 |
| 27 | 0.025 | 0.025 | 0.025 | 0.025 | 0.025 | 0.025 | 0.025 | 0.025 | 0.025 | 0.025 |
| 31 | 0.025 | 0.025 | 0.025 | 0.025 | 0.025 | 0.025 | 0.025 | 0.025 | 0.025 | 0.025 |
| 31 | 0.025 | 0.025 | 0.025 | 0.025 | 0.025 | 0.025 | 0.025 | 0.025 | 0.025 | 0.025 |
| 31 | 0.025 | 0.025 | 0.025 | 0.025 | 0.025 | 0.025 | 0.025 | 0.025 | 0.025 | 0.025 |
| 32 | 0.025 | 0.025 | 0.025 | 0.025 | 0.025 | 0.025 | 0.025 | 0.025 | 0.025 | 0.025 |
| 32 | 0.025 | 0.025 | 0.025 | 0.025 | 0.025 | 0.025 | 0.025 | 0.025 | 0.025 | 0.025 |
| 32 | 0.025 | 0.025 | 0.025 | 0.025 | 0.025 | 0.025 | 0.025 | 0.025 | 0.025 | 0.025 |
| 33 | 0.025 | 0.025 | 0.025 | 0.025 | 0.025 | 0.025 | 0.025 | 0.025 | 0.025 | 0.025 |
| 33 | 0.025 | 0.025 | 0.025 | 0.025 | 0.025 | 0.025 | 0.025 | 0.025 | 0.025 | 0.025 |
| 33 | 0.025 | 0.025 | 0.025 | 0.025 | 0.025 | 0.025 | 0.025 | 0.025 | 0.025 | 0.025 |
| 34 | 0.025 | 0.025 | 0.025 | 0.025 | 0.025 | 0.025 | 0.025 | 0.025 | 0.025 | 0.025 |
| 34 | 0.025 | 0.025 | 0.025 | 0.025 | 0.025 | 0.025 | 0.025 | 0.025 | 0.025 | 0.025 |
| 34 | 0.025 | 0.025 | 0.025 | 0.025 | 0.025 | 0.025 | 0.025 | 0.025 | 0.025 | 0.025 |
| 35 | 0.025 | 0.025 | 0.025 | 0.025 | 0.025 | 0.025 | 0.025 | 0.025 | 0.025 | 0.025 |
| 35 | 0.025 | 0.025 | 0.025 | 0.025 | 0.025 | 0.025 | 0.025 | 0.025 | 0.025 | 0.025 |
| 35 | 0.025 | 0.025 | 0.025 | 0.025 | 0.025 | 0.025 | 0.025 | 0.025 | 0.025 | 0.025 |
| 40 | 0.025 | 0.025 | 0.025 | 0.025 | 0.025 | 0.025 | 0.025 | 0.025 | 0.025 | 0.025 |
| 40 | 0.025 | 0.025 | 0.025 | 0.025 | 0.025 | 0.025 | 0.025 | 0.025 | 0.025 | 0.025 |
| 40 | 0.025 | 0.025 | 0.025 | 0.025 | 0.025 | 0.025 | 0.025 | 0.025 | 0.025 | 0.025 |
| 41 | 0.025 | 0.025 | 0.025 | 0.025 | 0.025 | 0.025 | 0.025 | 0.025 | 0.025 | 0.025 |
| 41 | 0.025 | 0.025 | 0.025 | 0.025 | 0.025 | 0.025 | 0.025 | 0.025 | 0.025 | 0.025 |
| 41 | 0.025 | 0.025 | 0.025 | 0.025 | 0.025 | 0.025 | 0.025 | 0.025 | 0.025 | 0.025 |
| 42 | 0.025 | 0.025 | 0.025 | 0.025 | 0.025 | 0.025 | 0.025 | 0.025 | 0.025 | 0.025 |
| 42 | 0.025 | 0.025 | 0.025 | 0.025 | 0.025 | 0.025 | 0.025 | 0.025 | 0.025 | 0.025 |
| 42 | 0.025 | 0.025 | 0.025 | 0.025 | 0.025 | 0.025 | 0.025 | 0.025 | 0.025 | 0.025 |
| 43 | 0.025 | 0.025 | 0.025 | 0.025 | 0.025 | 0.025 | 0.025 | 0.025 | 0.025 | 0.025 |
| 43 | 0.025 | 0.025 | 0.025 | 0.025 | 0.025 | 0.025 | 0.025 | 0.025 | 0.025 | 0.025 |
| 43 | 0.025 | 0.025 | 0.025 | 0.025 | 0.025 | 0.025 | 0.025 | 0.025 | 0.025 | 0.025 |

TABLE C32.1.3

Probability table for Node FCIBU

| Modified | | Final CIBU Sand | | | | | | | | | |
|---|---|---|---|---|---|---|---|---|---|---|---|
| CIBU | GGS | 2 | 7 | 8 | 9 | 12 | 13 | 14 | 17 | 18 | 19 |
| 44 | vc-c | 0.025 | 0.025 | 0.025 | 0.025 | 0.025 | 0.025 | 0.025 | 0.025 | 0.025 | 0.025 |
| 44 | m | 0.025 | 0.025 | 0.025 | 0.025 | 0.025 | 0.025 | 0.025 | 0.025 | 0.025 | 0.025 |
| 44 | f-vf | 0.025 | 0.025 | 0.025 | 0.025 | 0.025 | 0.025 | 0.025 | 0.025 | 0.025 | 0.025 |
| 45 | vc-c | 0.025 | 0.025 | 0.025 | 0.025 | 0.025 | 0.025 | 0.025 | 0.025 | 0.025 | 0.025 |
| 45 | m | 0.025 | 0.025 | 0.025 | 0.025 | 0.025 | 0.025 | 0.025 | 0.025 | 0.025 | 0.025 |
| 45 | f-vf | 0.025 | 0.025 | 0.025 | 0.025 | 0.025 | 0.025 | 0.025 | 0.025 | 0.025 | 0.025 |
| 49 | vc-c | 0.025 | 0.025 | 0.025 | 0.025 | 0.025 | 0.025 | 0.025 | 0.025 | 0.025 | 0.025 |
| 49 | m | 0.025 | 0.025 | 0.025 | 0.025 | 0.025 | 0.025 | 0.025 | 0.025 | 0.025 | 0.025 |
| 49 | f-vf | 0.025 | 0.025 | 0.025 | 0.025 | 0.025 | 0.025 | 0.025 | 0.025 | 0.025 | 0.025 |
| 50 | vc-c | 0.025 | 0.025 | 0.025 | 0.025 | 0.025 | 0.025 | 0.025 | 0.025 | 0.025 | 0.025 |
| 50 | m | 0.025 | 0.025 | 0.025 | 0.025 | 0.025 | 0.025 | 0.025 | 0.025 | 0.025 | 0.025 |
| 50 | f-vf | 0.025 | 0.025 | 0.025 | 0.025 | 0.025 | 0.025 | 0.025 | 0.025 | 0.025 | 0.025 |
| 51 | vc-c | 0.025 | 0.025 | 0.025 | 0.025 | 0.025 | 0.025 | 0.025 | 0.025 | 0.025 | 0.025 |
| 51 | m | 0.025 | 0.025 | 0.025 | 0.025 | 0.025 | 0.025 | 0.025 | 0.025 | 0.025 | 0.025 |
| 51 | f-vf | 0.025 | 0.025 | 0.025 | 0.025 | 0.025 | 0.025 | 0.025 | 0.025 | 0.025 | 0.025 |
| 52 | vc-c | 0.025 | 0.025 | 0.025 | 0.025 | 0.025 | 0.025 | 0.025 | 0.025 | 0.025 | 0.025 |
| 52 | m | 0.025 | 0.025 | 0.025 | 0.025 | 0.025 | 0.025 | 0.025 | 0.025 | 0.025 | 0.025 |
| 52 | f-vf | 0.025 | 0.025 | 0.025 | 0.025 | 0.025 | 0.025 | 0.025 | 0.025 | 0.025 | 0.025 |
| 53 | vc-c | 0.025 | 0.025 | 0.025 | 0.025 | 0.025 | 0.025 | 0.025 | 0.025 | 0.025 | 0.025 |
| 53 | m | 0.025 | 0.025 | 0.025 | 0.025 | 0.025 | 0.025 | 0.025 | 0.025 | 0.025 | 0.025 |
| 53 | f-vf | 0.025 | 0.025 | 0.025 | 0.025 | 0.025 | 0.025 | 0.025 | 0.025 | 0.025 | 0.025 |
| 54 | vc-c | 0.025 | 0.025 | 0.025 | 0.025 | 0.025 | 0.025 | 0.025 | 0.025 | 0.025 | 0.025 |
| 54 | m | 0.025 | 0.025 | 0.025 | 0.025 | 0.025 | 0.025 | 0.025 | 0.025 | 0.025 | 0.025 |
| 54 | f-vf | 0.025 | 0.025 | 0.025 | 0.025 | 0.025 | 0.025 | 0.025 | 0.025 | 0.025 | 0.025 |
| 55 | vc-c | 0.025 | 0.025 | 0.025 | 0.025 | 0.025 | 0.025 | 0.025 | 0.025 | 0.025 | 0.025 |
| 55 | m | 0.025 | 0.025 | 0.025 | 0.025 | 0.025 | 0.025 | 0.025 | 0.025 | 0.025 | 0.025 |
| 55 | f-vf | 0.025 | 0.025 | 0.025 | 0.025 | 0.025 | 0.025 | 0.025 | 0.025 | 0.025 | 0.025 |
| 60 | vc-c | 0.025 | 0.025 | 0.025 | 0.025 | 0.025 | 0.025 | 0.025 | 0.025 | 0.025 | 0.025 |
| 60 | m | 0.025 | 0.025 | 0.025 | 0.025 | 0.025 | 0.025 | 0.025 | 0.025 | 0.025 | 0.025 |
| 60 | f-vf | 0.025 | 0.025 | 0.025 | 0.025 | 0.025 | 0.025 | 0.025 | 0.025 | 0.025 | 0.025 |
| 61 | vc-c | 0.025 | 0.025 | 0.025 | 0.025 | 0.025 | 0.025 | 0.025 | 0.025 | 0.025 | 0.025 |
| 61 | m | 0.025 | 0.025 | 0.025 | 0.025 | 0.025 | 0.025 | 0.025 | 0.025 | 0.025 | 0.025 |
| 61 | f-vf | 0.025 | 0.025 | 0.025 | 0.025 | 0.025 | 0.025 | 0.025 | 0.025 | 0.025 | 0.025 |
| 62 | vc-c | 0.025 | 0.025 | 0.025 | 0.025 | 0.025 | 0.025 | 0.025 | 0.025 | 0.025 | 0.025 |

TABLE C32.1.3-continued

Probability table for Node FCIBU

| | | | | | | | | | | | |
|---|---|---|---|---|---|---|---|---|---|---|---|
| 62 | m | 0.025 | 0.025 | 0.025 | 0.025 | 0.025 | 0.025 | 0.025 | 0.025 | 0.025 | 0.025 |
| 62 | f-vf | 0.025 | 0.025 | 0.025 | 0.025 | 0.025 | 0.025 | 0.025 | 0.025 | 0.025 | 0.025 |

| Modified | Final CIBU Sand | | | | | | | | | |
|---|---|---|---|---|---|---|---|---|---|---|
| CIBU | 20 | 24 | 25 | 26 | 27 | 31 | 32 | 33 | 34 | 35 |
| 44 | 0.025 | 0.025 | 0.025 | 0.025 | 0.025 | 0.025 | 0.025 | 0.025 | 0.025 | 0.025 |
| 44 | 0.025 | 0.025 | 0.025 | 0.025 | 0.025 | 0.025 | 0.025 | 0.025 | 0.025 | 0.025 |
| 44 | 0.025 | 0.025 | 0.025 | 0.025 | 0.025 | 0.025 | 0.025 | 0.025 | 0.025 | 0.025 |
| 45 | 0.025 | 0.025 | 0.025 | 0.025 | 0.025 | 0.025 | 0.025 | 0.025 | 0.025 | 0.025 |
| 45 | 0.025 | 0.025 | 0.025 | 0.025 | 0.025 | 0.025 | 0.025 | 0.025 | 0.025 | 0.025 |
| 45 | 0.025 | 0.025 | 0.025 | 0.025 | 0.025 | 0.025 | 0.025 | 0.025 | 0.025 | 0.025 |
| 49 | 0.025 | 0.025 | 0.025 | 0.025 | 0.025 | 0.025 | 0.025 | 0.025 | 0.025 | 0.025 |
| 49 | 0.025 | 0.025 | 0.025 | 0.025 | 0.025 | 0.025 | 0.025 | 0.025 | 0.025 | 0.025 |
| 49 | 0.025 | 0.025 | 0.025 | 0.025 | 0.025 | 0.025 | 0.025 | 0.025 | 0.025 | 0.025 |
| 50 | 0.025 | 0.025 | 0.025 | 0.025 | 0.025 | 0.025 | 0.025 | 0.025 | 0.025 | 0.025 |
| 50 | 0.025 | 0.025 | 0.025 | 0.025 | 0.025 | 0.025 | 0.025 | 0.025 | 0.025 | 0.025 |
| 50 | 0.025 | 0.025 | 0.025 | 0.025 | 0.025 | 0.025 | 0.025 | 0.025 | 0.025 | 0.025 |
| 51 | 0.025 | 0.025 | 0.025 | 0.025 | 0.025 | 0.025 | 0.025 | 0.025 | 0.025 | 0.025 |
| 51 | 0.025 | 0.025 | 0.025 | 0.025 | 0.025 | 0.025 | 0.025 | 0.025 | 0.025 | 0.025 |
| 51 | 0.025 | 0.025 | 0.025 | 0.025 | 0.025 | 0.025 | 0.025 | 0.025 | 0.025 | 0.025 |
| 52 | 0.025 | 0.025 | 0.025 | 0.025 | 0.025 | 0.025 | 0.025 | 0.025 | 0.025 | 0.025 |
| 52 | 0.025 | 0.025 | 0.025 | 0.025 | 0.025 | 0.025 | 0.025 | 0.025 | 0.025 | 0.025 |
| 52 | 0.025 | 0.025 | 0.025 | 0.025 | 0.025 | 0.025 | 0.025 | 0.025 | 0.025 | 0.025 |
| 53 | 0.025 | 0.025 | 0.025 | 0.025 | 0.025 | 0.025 | 0.025 | 0.025 | 0.025 | 0.025 |
| 53 | 0.025 | 0.025 | 0.025 | 0.025 | 0.025 | 0.025 | 0.025 | 0.025 | 0.025 | 0.025 |
| 53 | 0.025 | 0.025 | 0.025 | 0.025 | 0.025 | 0.025 | 0.025 | 0.025 | 0.025 | 0.025 |
| 54 | 0.025 | 0.025 | 0.025 | 0.025 | 0.025 | 0.025 | 0.025 | 0.025 | 0.025 | 0.025 |
| 54 | 0.025 | 0.025 | 0.025 | 0.025 | 0.025 | 0.025 | 0.025 | 0.025 | 0.025 | 0.025 |
| 54 | 0.025 | 0.025 | 0.025 | 0.025 | 0.025 | 0.025 | 0.025 | 0.025 | 0.025 | 0.025 |
| 55 | 0.025 | 0.025 | 0.025 | 0.025 | 0.025 | 0.025 | 0.025 | 0.025 | 0.025 | 0.025 |
| 55 | 0.025 | 0.025 | 0.025 | 0.025 | 0.025 | 0.025 | 0.025 | 0.025 | 0.025 | 0.025 |
| 55 | 0.025 | 0.025 | 0.025 | 0.025 | 0.025 | 0.025 | 0.025 | 0.025 | 0.025 | 0.025 |
| 60 | 0.025 | 0.025 | 0.025 | 0.025 | 0.025 | 0.025 | 0.025 | 0.025 | 0.025 | 0.025 |
| 60 | 0.025 | 0.025 | 0.025 | 0.025 | 0.025 | 0.025 | 0.025 | 0.025 | 0.025 | 0.025 |
| 60 | 0.025 | 0.025 | 0.025 | 0.025 | 0.025 | 0.025 | 0.025 | 0.025 | 0.025 | 0.025 |
| 61 | 0.025 | 0.025 | 0.025 | 0.025 | 0.025 | 0.025 | 0.025 | 0.025 | 0.025 | 0.025 |
| 61 | 0.025 | 0.025 | 0.025 | 0.025 | 0.025 | 0.025 | 0.025 | 0.025 | 0.025 | 0.025 |
| 61 | 0.025 | 0.025 | 0.025 | 0.025 | 0.025 | 0.025 | 0.025 | 0.025 | 0.025 | 0.025 |
| 62 | 0.025 | 0.025 | 0.025 | 0.025 | 0.025 | 0.025 | 0.025 | 0.025 | 0.025 | 0.025 |
| 62 | 0.025 | 0.025 | 0.025 | 0.025 | 0.025 | 0.025 | 0.025 | 0.025 | 0.025 | 0.025 |
| 62 | 0.025 | 0.025 | 0.025 | 0.025 | 0.025 | 0.025 | 0.025 | 0.025 | 0.025 | 0.025 |

TABLE C32.1.4

Probability table for Node FCIBU

| Modified | | Final CIBU Sand | | | | | | | | | |
|---|---|---|---|---|---|---|---|---|---|---|---|
| CIBU | GGS | 2 | 7 | 8 | 9 | 12 | 13 | 14 | 17 | 18 | 19 |
| 63 | vc-c | 0.025 | 0.025 | 0.025 | 0.025 | 0.025 | 0.025 | 0.025 | 0.025 | 0.025 | 0.025 |
| 63 | m | 0.025 | 0.025 | 0.025 | 0.025 | 0.025 | 0.025 | 0.025 | 0.025 | 0.025 | 0.025 |
| 63 | f-vf | 0.025 | 0.025 | 0.025 | 0.025 | 0.025 | 0.025 | 0.025 | 0.025 | 0.025 | 0.025 |
| 64 | vc-c | 0.025 | 0.025 | 0.025 | 0.025 | 0.025 | 0.025 | 0.025 | 0.025 | 0.025 | 0.025 |
| 64 | m | 0.025 | 0.025 | 0.025 | 0.025 | 0.025 | 0.025 | 0.025 | 0.025 | 0.025 | 0.025 |
| 64 | f-vf | 0.025 | 0.025 | 0.025 | 0.025 | 0.025 | 0.025 | 0.025 | 0.025 | 0.025 | 0.025 |
| 65 | vc-c | 0.025 | 0.025 | 0.025 | 0.025 | 0.025 | 0.025 | 0.025 | 0.025 | 0.025 | 0.025 |
| 65 | m | 0.025 | 0.025 | 0.025 | 0.025 | 0.025 | 0.025 | 0.025 | 0.025 | 0.025 | 0.025 |
| 65 | f-vf | 0.025 | 0.025 | 0.025 | 0.025 | 0.025 | 0.025 | 0.025 | 0.025 | 0.025 | 0.025 |
| 66 | vc-c | 0.025 | 0.025 | 0.025 | 0.025 | 0.025 | 0.025 | 0.025 | 0.025 | 0.025 | 0.025 |
| 66 | m | 0.025 | 0.025 | 0.025 | 0.025 | 0.025 | 0.025 | 0.025 | 0.025 | 0.025 | 0.025 |
| 66 | f-vf | 0.025 | 0.025 | 0.025 | 0.025 | 0.025 | 0.025 | 0.025 | 0.025 | 0.025 | 0.025 |

| Modified | Final CIBU Sand | | | | | | | | | |
|---|---|---|---|---|---|---|---|---|---|---|
| CIBU | 20 | 24 | 25 | 26 | 27 | 31 | 32 | 33 | 34 | 35 |
| 63 | 0.025 | 0.025 | 0.025 | 0.025 | 0.025 | 0.025 | 0.025 | 0.025 | 0.025 | 0.025 |
| 63 | 0.025 | 0.025 | 0.025 | 0.025 | 0.025 | 0.025 | 0.025 | 0.025 | 0.025 | 0.025 |
| 63 | 0.025 | 0.025 | 0.025 | 0.025 | 0.025 | 0.025 | 0.025 | 0.025 | 0.025 | 0.025 |
| 64 | 0.025 | 0.025 | 0.025 | 0.025 | 0.025 | 0.025 | 0.025 | 0.025 | 0.025 | 0.025 |
| 64 | 0.025 | 0.025 | 0.025 | 0.025 | 0.025 | 0.025 | 0.025 | 0.025 | 0.025 | 0.025 |
| 64 | 0.025 | 0.025 | 0.025 | 0.025 | 0.025 | 0.025 | 0.025 | 0.025 | 0.025 | 0.025 |

TABLE C32.1.4-continued

Probability table for Node FCIBU

| | | | | | | | | | | |
|---|---|---|---|---|---|---|---|---|---|---|
| 65 | 0.025 | 0.025 | 0.025 | 0.025 | 0.025 | 0.025 | 0.025 | 0.025 | 0.025 | 0.025 |
| 65 | 0.025 | 0.025 | 0.025 | 0.025 | 0.025 | 0.025 | 0.025 | 0.025 | 0.025 | 0.025 |
| 65 | 0.025 | 0.025 | 0.025 | 0.025 | 0.025 | 0.025 | 0.025 | 0.025 | 0.025 | 0.025 |
| 66 | 0.025 | 0.025 | 0.025 | 0.025 | 0.025 | 0.025 | 0.025 | 0.025 | 0.025 | 0.025 |
| 66 | 0.025 | 0.025 | 0.025 | 0.025 | 0.025 | 0.025 | 0.025 | 0.025 | 0.025 | 0.025 |
| 66 | 0.025 | 0.025 | 0.025 | 0.025 | 0.025 | 0.025 | 0.025 | 0.025 | 0.025 | 0.025 |

TABLE C32.2.1

Probability table for Node FCIBU

| Modified | | Final CIBU Sand | | | | | | | | | |
|---|---|---|---|---|---|---|---|---|---|---|---|
| CIBU | GGS | 40 | 41 | 42 | 43 | 44 | 45 | 49 | 50 | 51 | 52 |
| 2 | vc-c | 0.025 | 0.025 | 0.025 | 0.025 | 0.025 | 0.025 | 0.025 | 0.025 | 0.025 | 0.025 |
| 2 | m | 0.025 | 0.025 | 0.025 | 0.025 | 0.025 | 0.025 | 0.025 | 0.025 | 0.025 | 0.025 |
| 2 | f-vf | 0.025 | 0.025 | 0.025 | 0.025 | 0.025 | 0.025 | 0.025 | 0.025 | 0.025 | 0.025 |
| 7 | vc-c | 0.025 | 0.025 | 0.025 | 0.025 | 0.025 | 0.025 | 0.025 | 0.025 | 0.025 | 0.025 |
| 7 | m | 0.025 | 0.025 | 0.025 | 0.025 | 0.025 | 0.025 | 0.025 | 0.025 | 0.025 | 0.025 |
| 7 | f-vf | 0.025 | 0.025 | 0.025 | 0.025 | 0.025 | 0.025 | 0.025 | 0.025 | 0.025 | 0.025 |
| 8 | vc-c | 0.025 | 0.025 | 0.025 | 0.025 | 0.025 | 0.025 | 0.025 | 0.025 | 0.025 | 0.025 |
| 8 | m | 0.025 | 0.025 | 0.025 | 0.025 | 0.025 | 0.025 | 0.025 | 0.025 | 0.025 | 0.025 |
| 8 | f-vf | 0.025 | 0.025 | 0.025 | 0.025 | 0.025 | 0.025 | 0.025 | 0.025 | 0.025 | 0.025 |
| 9 | vc-c | 0.025 | 0.025 | 0.025 | 0.025 | 0.025 | 0.025 | 0.025 | 0.025 | 0.025 | 0.025 |
| 9 | m | 0.025 | 0.025 | 0.025 | 0.025 | 0.025 | 0.025 | 0.025 | 0.025 | 0.025 | 0.025 |
| 9 | f-vf | 0.025 | 0.025 | 0.025 | 0.025 | 0.025 | 0.025 | 0.025 | 0.025 | 0.025 | 0.025 |
| 12 | vc-c | 0.025 | 0.025 | 0.025 | 0.025 | 0.025 | 0.025 | 0.025 | 0.025 | 0.025 | 0.025 |
| 12 | m | 0.025 | 0.025 | 0.025 | 0.025 | 0.025 | 0.025 | 0.025 | 0.025 | 0.025 | 0.025 |
| 12 | f-vf | 0.025 | 0.025 | 0.025 | 0.025 | 0.025 | 0.025 | 0.025 | 0.025 | 0.025 | 0.025 |
| 13 | vc-c | 0.025 | 0.025 | 0.025 | 0.025 | 0.025 | 0.025 | 0.025 | 0.025 | 0.025 | 0.025 |
| 13 | m | 0.025 | 0.025 | 0.025 | 0.025 | 0.025 | 0.025 | 0.025 | 0.025 | 0.025 | 0.025 |
| 13 | f-vf | 0.025 | 0.025 | 0.025 | 0.025 | 0.025 | 0.025 | 0.025 | 0.025 | 0.025 | 0.025 |
| 14 | vc-c | 0.025 | 0.025 | 0.025 | 0.025 | 0.025 | 0.025 | 0.025 | 0.025 | 0.025 | 0.025 |
| 14 | m | 0.025 | 0.025 | 0.025 | 0.025 | 0.025 | 0.025 | 0.025 | 0.025 | 0.025 | 0.025 |
| 14 | f-vf | 0.025 | 0.025 | 0.025 | 0.025 | 0.025 | 0.025 | 0.025 | 0.025 | 0.025 | 0.025 |
| 17 | vc-c | 0.025 | 0.025 | 0.025 | 0.025 | 0.025 | 0.025 | 0.025 | 0.025 | 0.025 | 0.025 |
| 17 | m | 0.025 | 0.025 | 0.025 | 0.025 | 0.025 | 0.025 | 0.025 | 0.025 | 0.025 | 0.025 |
| 17 | f-vf | 0.025 | 0.025 | 0.025 | 0.025 | 0.025 | 0.025 | 0.025 | 0.025 | 0.025 | 0.025 |
| 18 | vc-c | 0.025 | 0.025 | 0.025 | 0.025 | 0.025 | 0.025 | 0.025 | 0.025 | 0.025 | 0.025 |
| 18 | m | 0.025 | 0.025 | 0.025 | 0.025 | 0.025 | 0.025 | 0.025 | 0.025 | 0.025 | 0.025 |
| 18 | f-vf | 0.025 | 0.025 | 0.025 | 0.025 | 0.025 | 0.025 | 0.025 | 0.025 | 0.025 | 0.025 |
| 19 | vc-c | 0.025 | 0.025 | 0.025 | 0.025 | 0.025 | 0.025 | 0.025 | 0.025 | 0.025 | 0.025 |
| 19 | m | 0.025 | 0.025 | 0.025 | 0.025 | 0.025 | 0.025 | 0.025 | 0.025 | 0.025 | 0.025 |
| 19 | f-vf | 0.025 | 0.025 | 0.025 | 0.025 | 0.025 | 0.025 | 0.025 | 0.025 | 0.025 | 0.025 |
| 20 | vc-c | 0.025 | 0.025 | 0.025 | 0.025 | 0.025 | 0.025 | 0.025 | 0.025 | 0.025 | 0.025 |
| 20 | m | 0.025 | 0.025 | 0.025 | 0.025 | 0.025 | 0.025 | 0.025 | 0.025 | 0.025 | 0.025 |
| 20 | f-vf | 0.025 | 0.025 | 0.025 | 0.025 | 0.025 | 0.025 | 0.025 | 0.025 | 0.025 | 0.025 |
| 24 | vc-c | 0.025 | 0.025 | 0.025 | 0.025 | 0.025 | 0.025 | 0.025 | 0.025 | 0.025 | 0.025 |
| 24 | m | 0.025 | 0.025 | 0.025 | 0.025 | 0.025 | 0.025 | 0.025 | 0.025 | 0.025 | 0.025 |
| 24 | f-vf | 0.025 | 0.025 | 0.025 | 0.025 | 0.025 | 0.025 | 0.025 | 0.025 | 0.025 | 0.025 |

| Modified | Final CIBU Sand | | | | | | | | | |
|---|---|---|---|---|---|---|---|---|---|---|
| CIBU | 53 | 54 | 55 | 60 | 61 | 62 | 63 | 64 | 65 | 66 |
| 2 | 0.025 | 0.025 | 0.025 | 0.025 | 0.025 | 0.025 | 0.025 | 0.025 | 0.025 | 0.025 |
| 2 | 0.025 | 0.025 | 0.025 | 0.025 | 0.025 | 0.025 | 0.025 | 0.025 | 0.025 | 0.025 |
| 2 | 0.025 | 0.025 | 0.025 | 0.025 | 0.025 | 0.025 | 0.025 | 0.025 | 0.025 | 0.025 |
| 7 | 0.025 | 0.025 | 0.025 | 0.025 | 0.025 | 0.025 | 0.025 | 0.025 | 0.025 | 0.025 |
| 7 | 0.025 | 0.025 | 0.025 | 0.025 | 0.025 | 0.025 | 0.025 | 0.025 | 0.025 | 0.025 |
| 7 | 0.025 | 0.025 | 0.025 | 0.025 | 0.025 | 0.025 | 0.025 | 0.025 | 0.025 | 0.025 |
| 8 | 0.025 | 0.025 | 0.025 | 0.025 | 0.025 | 0.025 | 0.025 | 0.025 | 0.025 | 0.025 |
| 8 | 0.025 | 0.025 | 0.025 | 0.025 | 0.025 | 0.025 | 0.025 | 0.025 | 0.025 | 0.025 |
| 8 | 0.025 | 0.025 | 0.025 | 0.025 | 0.025 | 0.025 | 0.025 | 0.025 | 0.025 | 0.025 |
| 9 | 0.025 | 0.025 | 0.025 | 0.025 | 0.025 | 0.025 | 0.025 | 0.025 | 0.025 | 0.025 |
| 9 | 0.025 | 0.025 | 0.025 | 0.025 | 0.025 | 0.025 | 0.025 | 0.025 | 0.025 | 0.025 |
| 9 | 0.025 | 0.025 | 0.025 | 0.025 | 0.025 | 0.025 | 0.025 | 0.025 | 0.025 | 0.025 |
| 12 | 0.025 | 0.025 | 0.025 | 0.025 | 0.025 | 0.025 | 0.025 | 0.025 | 0.025 | 0.025 |
| 12 | 0.025 | 0.025 | 0.025 | 0.025 | 0.025 | 0.025 | 0.025 | 0.025 | 0.025 | 0.025 |
| 12 | 0.025 | 0.025 | 0.025 | 0.025 | 0.025 | 0.025 | 0.025 | 0.025 | 0.025 | 0.025 |
| 13 | 0.025 | 0.025 | 0.025 | 0.025 | 0.025 | 0.025 | 0.025 | 0.025 | 0.025 | 0.025 |
| 13 | 0.025 | 0.025 | 0.025 | 0.025 | 0.025 | 0.025 | 0.025 | 0.025 | 0.025 | 0.025 |
| 13 | 0.025 | 0.025 | 0.025 | 0.025 | 0.025 | 0.025 | 0.025 | 0.025 | 0.025 | 0.025 |

TABLE C32.2.1-continued

| Probability table for Node FCIBU | | | | | | | | | | |
|---|---|---|---|---|---|---|---|---|---|---|
| 14 | 0.025 | 0.025 | 0.025 | 0.025 | 0.025 | 0.025 | 0.025 | 0.025 | 0.025 | 0.025 |
| 14 | 0.025 | 0.025 | 0.025 | 0.025 | 0.025 | 0.025 | 0.025 | 0.025 | 0.025 | 0.025 |
| 14 | 0.025 | 0.025 | 0.025 | 0.025 | 0.025 | 0.025 | 0.025 | 0.025 | 0.025 | 0.025 |
| 17 | 0.025 | 0.025 | 0.025 | 0.025 | 0.025 | 0.025 | 0.025 | 0.025 | 0.025 | 0.025 |
| 17 | 0.025 | 0.025 | 0.025 | 0.025 | 0.025 | 0.025 | 0.025 | 0.025 | 0.025 | 0.025 |
| 17 | 0.025 | 0.025 | 0.025 | 0.025 | 0.025 | 0.025 | 0.025 | 0.025 | 0.025 | 0.025 |
| 18 | 0.025 | 0.025 | 0.025 | 0.025 | 0.025 | 0.025 | 0.025 | 0.025 | 0.025 | 0.025 |
| 18 | 0.025 | 0.025 | 0.025 | 0.025 | 0.025 | 0.025 | 0.025 | 0.025 | 0.025 | 0.025 |
| 18 | 0.025 | 0.025 | 0.025 | 0.025 | 0.025 | 0.025 | 0.025 | 0.025 | 0.025 | 0.025 |
| 19 | 0.025 | 0.025 | 0.025 | 0.025 | 0.025 | 0.025 | 0.025 | 0.025 | 0.025 | 0.025 |
| 19 | 0.025 | 0.025 | 0.025 | 0.025 | 0.025 | 0.025 | 0.025 | 0.025 | 0.025 | 0.025 |
| 19 | 0.025 | 0.025 | 0.025 | 0.025 | 0.025 | 0.025 | 0.025 | 0.025 | 0.025 | 0.025 |
| 20 | 0.025 | 0.025 | 0.025 | 0.025 | 0.025 | 0.025 | 0.025 | 0.025 | 0.025 | 0.025 |
| 20 | 0.025 | 0.025 | 0.025 | 0.025 | 0.025 | 0.025 | 0.025 | 0.025 | 0.025 | 0.025 |
| 20 | 0.025 | 0.025 | 0.025 | 0.025 | 0.025 | 0.025 | 0.025 | 0.025 | 0.025 | 0.025 |
| 24 | 0.025 | 0.025 | 0.025 | 0.025 | 0.025 | 0.025 | 0.025 | 0.025 | 0.025 | 0.025 |
| 24 | 0.025 | 0.025 | 0.025 | 0.025 | 0.025 | 0.025 | 0.025 | 0.025 | 0.025 | 0.025 |
| 24 | 0.025 | 0.025 | 0.025 | 0.025 | 0.025 | 0.025 | 0.025 | 0.025 | 0.025 | 0.025 |

TABLE C32.2.2

Probability table for Node FCIBU

| Modified CIBU | GGS | Final CIBU Sand 40 | 41 | 42 | 43 | 44 | 45 | 49 | 50 | 51 | 52 |
|---|---|---|---|---|---|---|---|---|---|---|---|
| 25 | vc-c | 0.025 | 0.025 | 0.025 | 0.025 | 0.025 | 0.025 | 0.025 | 0.025 | 0.025 | 0.025 |
| 25 | m | 0.025 | 0.025 | 0.025 | 0.025 | 0.025 | 0.025 | 0.025 | 0.025 | 0.025 | 0.025 |
| 25 | f-vf | 0.025 | 0.025 | 0.025 | 0.025 | 0.025 | 0.025 | 0.025 | 0.025 | 0.025 | 0.025 |
| 26 | vc-c | 0.025 | 0.025 | 0.025 | 0.025 | 0.025 | 0.025 | 0.025 | 0.025 | 0.025 | 0.025 |
| 26 | m | 0.025 | 0.025 | 0.025 | 0.025 | 0.025 | 0.025 | 0.025 | 0.025 | 0.025 | 0.025 |
| 26 | f-vf | 0.025 | 0.025 | 0.025 | 0.025 | 0.025 | 0.025 | 0.025 | 0.025 | 0.025 | 0.025 |
| 27 | vc-c | 0.025 | 0.025 | 0.025 | 0.025 | 0.025 | 0.025 | 0.025 | 0.025 | 0.025 | 0.025 |
| 27 | m | 0.025 | 0.025 | 0.025 | 0.025 | 0.025 | 0.025 | 0.025 | 0.025 | 0.025 | 0.025 |
| 27 | f-vf | 0.025 | 0.025 | 0.025 | 0.025 | 0.025 | 0.025 | 0.025 | 0.025 | 0.025 | 0.025 |
| 31 | vc-c | 0.025 | 0.025 | 0.025 | 0.025 | 0.025 | 0.025 | 0.025 | 0.025 | 0.025 | 0.025 |
| 31 | m | 0.025 | 0.025 | 0.025 | 0.025 | 0.025 | 0.025 | 0.025 | 0.025 | 0.025 | 0.025 |
| 31 | f-vf | 0.025 | 0.025 | 0.025 | 0.025 | 0.025 | 0.025 | 0.025 | 0.025 | 0.025 | 0.025 |
| 32 | vc-c | 0.025 | 0.025 | 0.025 | 0.025 | 0.025 | 0.025 | 0.025 | 0.025 | 0.025 | 0.025 |
| 32 | m | 0.025 | 0.025 | 0.025 | 0.025 | 0.025 | 0.025 | 0.025 | 0.025 | 0.025 | 0.025 |
| 32 | f-vf | 0.025 | 0.025 | 0.025 | 0.025 | 0.025 | 0.025 | 0.025 | 0.025 | 0.025 | 0.025 |
| 33 | vc-c | 0.025 | 0.025 | 0.025 | 0.025 | 0.025 | 0.025 | 0.025 | 0.025 | 0.025 | 0.025 |
| 33 | m | 0.025 | 0.025 | 0.025 | 0.025 | 0.025 | 0.025 | 0.025 | 0.025 | 0.025 | 0.025 |
| 33 | f-vf | 0.025 | 0.025 | 0.025 | 0.025 | 0.025 | 0.025 | 0.025 | 0.025 | 0.025 | 0.025 |
| 34 | vc-c | 0.025 | 0.025 | 0.025 | 0.025 | 0.025 | 0.025 | 0.025 | 0.025 | 0.025 | 0.025 |
| 34 | m | 0.025 | 0.025 | 0.025 | 0.025 | 0.025 | 0.025 | 0.025 | 0.025 | 0.025 | 0.025 |
| 34 | f-vf | 0.025 | 0.025 | 0.025 | 0.025 | 0.025 | 0.025 | 0.025 | 0.025 | 0.025 | 0.025 |
| 35 | vc-c | 0.025 | 0.025 | 0.025 | 0.025 | 0.025 | 0.025 | 0.025 | 0.025 | 0.025 | 0.025 |
| 35 | m | 0.025 | 0.025 | 0.025 | 0.025 | 0.025 | 0.025 | 0.025 | 0.025 | 0.025 | 0.025 |
| 35 | f-vf | 0.025 | 0.025 | 0.025 | 0.025 | 0.025 | 0.025 | 0.025 | 0.025 | 0.025 | 0.025 |
| 40 | vc-c | 0.025 | 0.025 | 0.025 | 0.025 | 0.025 | 0.025 | 0.025 | 0.025 | 0.025 | 0.025 |
| 40 | m | 0.025 | 0.025 | 0.025 | 0.025 | 0.025 | 0.025 | 0.025 | 0.025 | 0.025 | 0.025 |
| 40 | f-vf | 0.025 | 0.025 | 0.025 | 0.025 | 0.025 | 0.025 | 0.025 | 0.025 | 0.025 | 0.025 |
| 41 | vc-c | 0.025 | 0.025 | 0.025 | 0.025 | 0.025 | 0.025 | 0.025 | 0.025 | 0.025 | 0.025 |
| 41 | m | 0.025 | 0.025 | 0.025 | 0.025 | 0.025 | 0.025 | 0.025 | 0.025 | 0.025 | 0.025 |
| 41 | f-vf | 0.025 | 0.025 | 0.025 | 0.025 | 0.025 | 0.025 | 0.025 | 0.025 | 0.025 | 0.025 |
| 42 | vc-c | 0.025 | 0.025 | 0.025 | 0.025 | 0.025 | 0.025 | 0.025 | 0.025 | 0.025 | 0.025 |
| 42 | m | 0.025 | 0.025 | 0.025 | 0.025 | 0.025 | 0.025 | 0.025 | 0.025 | 0.025 | 0.025 |
| 42 | f-vf | 0.025 | 0.025 | 0.025 | 0.025 | 0.025 | 0.025 | 0.025 | 0.025 | 0.025 | 0.025 |
| 43 | vc-c | 0.025 | 0.025 | 0.025 | 0.025 | 0.025 | 0.025 | 0.025 | 0.025 | 0.025 | 0.025 |
| 43 | m | 0.025 | 0.025 | 0.025 | 0.025 | 0.025 | 0.025 | 0.025 | 0.025 | 0.025 | 0.025 |
| 43 | f-vf | 0.025 | 0.025 | 0.025 | 0.025 | 0.025 | 0.025 | 0.025 | 0.025 | 0.025 | 0.025 |

| Modified CIBU | Final CIBU Sand 53 | 54 | 55 | 60 | 61 | 62 | 63 | 64 | 65 | 66 |
|---|---|---|---|---|---|---|---|---|---|---|
| 25 | 0.025 | 0.025 | 0.025 | 0.025 | 0.025 | 0.025 | 0.025 | 0.025 | 0.025 | 0.025 |
| 25 | 0.025 | 0.025 | 0.025 | 0.025 | 0.025 | 0.025 | 0.025 | 0.025 | 0.025 | 0.025 |
| 25 | 0.025 | 0.025 | 0.025 | 0.025 | 0.025 | 0.025 | 0.025 | 0.025 | 0.025 | 0.025 |
| 26 | 0.025 | 0.025 | 0.025 | 0.025 | 0.025 | 0.025 | 0.025 | 0.025 | 0.025 | 0.025 |
| 26 | 0.025 | 0.025 | 0.025 | 0.025 | 0.025 | 0.025 | 0.025 | 0.025 | 0.025 | 0.025 |
| 26 | 0.025 | 0.025 | 0.025 | 0.025 | 0.025 | 0.025 | 0.025 | 0.025 | 0.025 | 0.025 |

TABLE C32.2.2-continued

Probability table for Node FCIBU

| | | | | | | | | | | |
|---|---|---|---|---|---|---|---|---|---|---|
| 27 | 0.025 | 0.025 | 0.025 | 0.025 | 0.025 | 0.025 | 0.025 | 0.025 | 0.025 | 0.025 |
| 27 | 0.025 | 0.025 | 0.025 | 0.025 | 0.025 | 0.025 | 0.025 | 0.025 | 0.025 | 0.025 |
| 27 | 0.025 | 0.025 | 0.025 | 0.025 | 0.025 | 0.025 | 0.025 | 0.025 | 0.025 | 0.025 |
| 31 | 0.025 | 0.025 | 0.025 | 0.025 | 0.025 | 0.025 | 0.025 | 0.025 | 0.025 | 0.025 |
| 31 | 0.025 | 0.025 | 0.025 | 0.025 | 0.025 | 0.025 | 0.025 | 0.025 | 0.025 | 0.025 |
| 31 | 0.025 | 0.025 | 0.025 | 0.025 | 0.025 | 0.025 | 0.025 | 0.025 | 0.025 | 0.025 |
| 32 | 0.025 | 0.025 | 0.025 | 0.025 | 0.025 | 0.025 | 0.025 | 0.025 | 0.025 | 0.025 |
| 32 | 0.025 | 0.025 | 0.025 | 0.025 | 0.025 | 0.025 | 0.025 | 0.025 | 0.025 | 0.025 |
| 32 | 0.025 | 0.025 | 0.025 | 0.025 | 0.025 | 0.025 | 0.025 | 0.025 | 0.025 | 0.025 |
| 33 | 0.025 | 0.025 | 0.025 | 0.025 | 0.025 | 0.025 | 0.025 | 0.025 | 0.025 | 0.025 |
| 33 | 0.025 | 0.025 | 0.025 | 0.025 | 0.025 | 0.025 | 0.025 | 0.025 | 0.025 | 0.025 |
| 33 | 0.025 | 0.025 | 0.025 | 0.025 | 0.025 | 0.025 | 0.025 | 0.025 | 0.025 | 0.025 |
| 34 | 0.025 | 0.025 | 0.025 | 0.025 | 0.025 | 0.025 | 0.025 | 0.025 | 0.025 | 0.025 |
| 34 | 0.025 | 0.025 | 0.025 | 0.025 | 0.025 | 0.025 | 0.025 | 0.025 | 0.025 | 0.025 |
| 34 | 0.025 | 0.025 | 0.025 | 0.025 | 0.025 | 0.025 | 0.025 | 0.025 | 0.025 | 0.025 |
| 35 | 0.025 | 0.025 | 0.025 | 0.025 | 0.025 | 0.025 | 0.025 | 0.025 | 0.025 | 0.025 |
| 35 | 0.025 | 0.025 | 0.025 | 0.025 | 0.025 | 0.025 | 0.025 | 0.025 | 0.025 | 0.025 |
| 35 | 0.025 | 0.025 | 0.025 | 0.025 | 0.025 | 0.025 | 0.025 | 0.025 | 0.025 | 0.025 |
| 40 | 0.025 | 0.025 | 0.025 | 0.025 | 0.025 | 0.025 | 0.025 | 0.025 | 0.025 | 0.025 |
| 40 | 0.025 | 0.025 | 0.025 | 0.025 | 0.025 | 0.025 | 0.025 | 0.025 | 0.025 | 0.025 |
| 40 | 0.025 | 0.025 | 0.025 | 0.025 | 0.025 | 0.025 | 0.025 | 0.025 | 0.025 | 0.025 |
| 41 | 0.025 | 0.025 | 0.025 | 0.025 | 0.025 | 0.025 | 0.025 | 0.025 | 0.025 | 0.025 |
| 41 | 0.025 | 0.025 | 0.025 | 0.025 | 0.025 | 0.025 | 0.025 | 0.025 | 0.025 | 0.025 |
| 41 | 0.025 | 0.025 | 0.025 | 0.025 | 0.025 | 0.025 | 0.025 | 0.025 | 0.025 | 0.025 |
| 42 | 0.025 | 0.025 | 0.025 | 0.025 | 0.025 | 0.025 | 0.025 | 0.025 | 0.025 | 0.025 |
| 42 | 0.025 | 0.025 | 0.025 | 0.025 | 0.025 | 0.025 | 0.025 | 0.025 | 0.025 | 0.025 |
| 42 | 0.025 | 0.025 | 0.025 | 0.025 | 0.025 | 0.025 | 0.025 | 0.025 | 0.025 | 0.025 |
| 43 | 0.025 | 0.025 | 0.025 | 0.025 | 0.025 | 0.025 | 0.025 | 0.025 | 0.025 | 0.025 |
| 43 | 0.025 | 0.025 | 0.025 | 0.025 | 0.025 | 0.025 | 0.025 | 0.025 | 0.025 | 0.025 |
| 43 | 0.025 | 0.025 | 0.025 | 0.025 | 0.025 | 0.025 | 0.025 | 0.025 | 0.025 | 0.025 |

TABLE C32.2.3

Probability table for Node FCIBU

| Modified | | Final CIBU Sand | | | | | | | | | |
|---|---|---|---|---|---|---|---|---|---|---|---|
| CIBU | GGS | 40 | 41 | 42 | 43 | 44 | 45 | 49 | 50 | 51 | 52 |
| 44 | vc-c | 0.025 | 0.025 | 0.025 | 0.025 | 0.025 | 0.025 | 0.025 | 0.025 | 0.025 | 0.025 |
| 44 | m | 0.025 | 0.025 | 0.025 | 0.025 | 0.025 | 0.025 | 0.025 | 0.025 | 0.025 | 0.025 |
| 44 | f-vf | 0.025 | 0.025 | 0.025 | 0.025 | 0.025 | 0.025 | 0.025 | 0.025 | 0.025 | 0.025 |
| 45 | vc-c | 0.025 | 0.025 | 0.025 | 0.025 | 0.025 | 0.025 | 0.025 | 0.025 | 0.025 | 0.025 |
| 45 | m | 0.025 | 0.025 | 0.025 | 0.025 | 0.025 | 0.025 | 0.025 | 0.025 | 0.025 | 0.025 |
| 45 | f-vf | 0.025 | 0.025 | 0.025 | 0.025 | 0.025 | 0.025 | 0.025 | 0.025 | 0.025 | 0.025 |
| 49 | vc-c | 0.025 | 0.025 | 0.025 | 0.025 | 0.025 | 0.025 | 0.025 | 0.025 | 0.025 | 0.025 |
| 49 | m | 0.025 | 0.025 | 0.025 | 0.025 | 0.025 | 0.025 | 0.025 | 0.025 | 0.025 | 0.025 |
| 49 | f-vf | 0.025 | 0.025 | 0.025 | 0.025 | 0.025 | 0.025 | 0.025 | 0.025 | 0.025 | 0.025 |
| 50 | vc-c | 0.025 | 0.025 | 0.025 | 0.025 | 0.025 | 0.025 | 0.025 | 0.025 | 0.025 | 0.025 |
| 50 | m | 0.025 | 0.025 | 0.025 | 0.025 | 0.025 | 0.025 | 0.025 | 0.025 | 0.025 | 0.025 |
| 50 | f-vf | 0.025 | 0.025 | 0.025 | 0.025 | 0.025 | 0.025 | 0.025 | 0.025 | 0.025 | 0.025 |
| 51 | vc-c | 0.025 | 0.025 | 0.025 | 0.025 | 0.025 | 0.025 | 0.025 | 0.025 | 0.025 | 0.025 |
| 51 | m | 0.025 | 0.025 | 0.025 | 0.025 | 0.025 | 0.025 | 0.025 | 0.025 | 0.025 | 0.025 |
| 51 | f-vf | 0.025 | 0.025 | 0.025 | 0.025 | 0.025 | 0.025 | 0.025 | 0.025 | 0.025 | 0.025 |
| 52 | vc-c | 0.025 | 0.025 | 0.025 | 0.025 | 0.025 | 0.025 | 0.025 | 0.025 | 0.025 | 0.025 |
| 52 | m | 0.025 | 0.025 | 0.025 | 0.025 | 0.025 | 0.025 | 0.025 | 0.025 | 0.025 | 0.025 |
| 52 | f-vf | 0.025 | 0.025 | 0.025 | 0.025 | 0.025 | 0.025 | 0.025 | 0.025 | 0.025 | 0.025 |
| 53 | vc-c | 0.025 | 0.025 | 0.025 | 0.025 | 0.025 | 0.025 | 0.025 | 0.025 | 0.025 | 0.025 |
| 53 | m | 0.025 | 0.025 | 0.025 | 0.025 | 0.025 | 0.025 | 0.025 | 0.025 | 0.025 | 0.025 |
| 53 | f-vf | 0.025 | 0.025 | 0.025 | 0.025 | 0.025 | 0.025 | 0.025 | 0.025 | 0.025 | 0.025 |
| 54 | vc-c | 0.025 | 0.025 | 0.025 | 0.025 | 0.025 | 0.025 | 0.025 | 0.025 | 0.025 | 0.025 |
| 54 | m | 0.025 | 0.025 | 0.025 | 0.025 | 0.025 | 0.025 | 0.025 | 0.025 | 0.025 | 0.025 |
| 54 | f-vf | 0.025 | 0.025 | 0.025 | 0.025 | 0.025 | 0.025 | 0.025 | 0.025 | 0.025 | 0.025 |
| 55 | vc-c | 0.025 | 0.025 | 0.025 | 0.025 | 0.025 | 0.025 | 0.025 | 0.025 | 0.025 | 0.025 |
| 55 | m | 0.025 | 0.025 | 0.025 | 0.025 | 0.025 | 0.025 | 0.025 | 0.025 | 0.025 | 0.025 |
| 55 | f-vf | 0.025 | 0.025 | 0.025 | 0.025 | 0.025 | 0.025 | 0.025 | 0.025 | 0.025 | 0.025 |
| 60 | vc-c | 0.025 | 0.025 | 0.025 | 0.025 | 0.025 | 0.025 | 0.025 | 0.025 | 0.025 | 0.025 |
| 60 | m | 0.025 | 0.025 | 0.025 | 0.025 | 0.025 | 0.025 | 0.025 | 0.025 | 0.025 | 0.025 |
| 60 | f-vf | 0.025 | 0.025 | 0.025 | 0.025 | 0.025 | 0.025 | 0.025 | 0.025 | 0.025 | 0.025 |
| 61 | vc-c | 0.025 | 0.025 | 0.025 | 0.025 | 0.025 | 0.025 | 0.025 | 0.025 | 0.025 | 0.025 |
| 61 | m | 0.025 | 0.025 | 0.025 | 0.025 | 0.025 | 0.025 | 0.025 | 0.025 | 0.025 | 0.025 |
| 61 | f-vf | 0.025 | 0.025 | 0.025 | 0.025 | 0.025 | 0.025 | 0.025 | 0.025 | 0.025 | 0.025 |
| 62 | vc-c | 0.025 | 0.025 | 0.025 | 0.025 | 0.025 | 0.025 | 0.025 | 0.025 | 0.025 | 0.025 |

TABLE C32.2.3-continued

| Probability table for Node FCIBU | | | | | | | | | | | |
|---|---|---|---|---|---|---|---|---|---|---|---|
| 62 | m | 0.025 | 0.025 | 0.025 | 0.025 | 0.025 | 0.025 | 0.025 | 0.025 | 0.025 | 0.025 |
| 62 | f-vf | 0.025 | 0.025 | 0.025 | 0.025 | 0.025 | 0.025 | 0.025 | 0.025 | 0.025 | 0.025 |

| Modified | Final CIBU Sand | | | | | | | | | |
|---|---|---|---|---|---|---|---|---|---|---|
| CIBU | 53 | 54 | 55 | 60 | 61 | 62 | 63 | 64 | 65 | 66 |
| 44 | 0.025 | 0.025 | 0.025 | 0.025 | 0.025 | 0.025 | 0.025 | 0.025 | 0.025 | 0.025 |
| 44 | 0.025 | 0.025 | 0.025 | 0.025 | 0.025 | 0.025 | 0.025 | 0.025 | 0.025 | 0.025 |
| 44 | 0.025 | 0.025 | 0.025 | 0.025 | 0.025 | 0.025 | 0.025 | 0.025 | 0.025 | 0.025 |
| 45 | 0.025 | 0.025 | 0.025 | 0.025 | 0.025 | 0.025 | 0.025 | 0.025 | 0.025 | 0.025 |
| 45 | 0.025 | 0.025 | 0.025 | 0.025 | 0.025 | 0.025 | 0.025 | 0.025 | 0.025 | 0.025 |
| 45 | 0.025 | 0.025 | 0.025 | 0.025 | 0.025 | 0.025 | 0.025 | 0.025 | 0.025 | 0.025 |
| 49 | 0.025 | 0.025 | 0.025 | 0.025 | 0.025 | 0.025 | 0.025 | 0.025 | 0.025 | 0.025 |
| 49 | 0.025 | 0.025 | 0.025 | 0.025 | 0.025 | 0.025 | 0.025 | 0.025 | 0.025 | 0.025 |
| 49 | 0.025 | 0.025 | 0.025 | 0.025 | 0.025 | 0.025 | 0.025 | 0.025 | 0.025 | 0.025 |
| 50 | 0.025 | 0.025 | 0.025 | 0.025 | 0.025 | 0.025 | 0.025 | 0.025 | 0.025 | 0.025 |
| 50 | 0.025 | 0.025 | 0.025 | 0.025 | 0.025 | 0.025 | 0.025 | 0.025 | 0.025 | 0.025 |
| 50 | 0.025 | 0.025 | 0.025 | 0.025 | 0.025 | 0.025 | 0.025 | 0.025 | 0.025 | 0.025 |
| 51 | 0.025 | 0.025 | 0.025 | 0.025 | 0.025 | 0.025 | 0.025 | 0.025 | 0.025 | 0.025 |
| 51 | 0.025 | 0.025 | 0.025 | 0.025 | 0.025 | 0.025 | 0.025 | 0.025 | 0.025 | 0.025 |
| 51 | 0.025 | 0.025 | 0.025 | 0.025 | 0.025 | 0.025 | 0.025 | 0.025 | 0.025 | 0.025 |
| 52 | 0.025 | 0.025 | 0.025 | 0.025 | 0.025 | 0.025 | 0.025 | 0.025 | 0.025 | 0.025 |
| 52 | 0.025 | 0.025 | 0.025 | 0.025 | 0.025 | 0.025 | 0.025 | 0.025 | 0.025 | 0.025 |
| 52 | 0.025 | 0.025 | 0.025 | 0.025 | 0.025 | 0.025 | 0.025 | 0.025 | 0.025 | 0.025 |
| 53 | 0.025 | 0.025 | 0.025 | 0.025 | 0.025 | 0.025 | 0.025 | 0.025 | 0.025 | 0.025 |
| 53 | 0.025 | 0.025 | 0.025 | 0.025 | 0.025 | 0.025 | 0.025 | 0.025 | 0.025 | 0.025 |
| 53 | 0.025 | 0.025 | 0.025 | 0.025 | 0.025 | 0.025 | 0.025 | 0.025 | 0.025 | 0.025 |
| 54 | 0.025 | 0.025 | 0.025 | 0.025 | 0.025 | 0.025 | 0.025 | 0.025 | 0.025 | 0.025 |
| 54 | 0.025 | 0.025 | 0.025 | 0.025 | 0.025 | 0.025 | 0.025 | 0.025 | 0.025 | 0.025 |
| 54 | 0.025 | 0.025 | 0.025 | 0.025 | 0.025 | 0.025 | 0.025 | 0.025 | 0.025 | 0.025 |
| 55 | 0.025 | 0.025 | 0.025 | 0.025 | 0.025 | 0.025 | 0.025 | 0.025 | 0.025 | 0.025 |
| 55 | 0.025 | 0.025 | 0.025 | 0.025 | 0.025 | 0.025 | 0.025 | 0.025 | 0.025 | 0.025 |
| 55 | 0.025 | 0.025 | 0.025 | 0.025 | 0.025 | 0.025 | 0.025 | 0.025 | 0.025 | 0.025 |
| 60 | 0.025 | 0.025 | 0.025 | 0.025 | 0.025 | 0.025 | 0.025 | 0.025 | 0.025 | 0.025 |
| 60 | 0.025 | 0.025 | 0.025 | 0.025 | 0.025 | 0.025 | 0.025 | 0.025 | 0.025 | 0.025 |
| 60 | 0.025 | 0.025 | 0.025 | 0.025 | 0.025 | 0.025 | 0.025 | 0.025 | 0.025 | 0.025 |
| 61 | 0.025 | 0.025 | 0.025 | 0.025 | 0.025 | 0.025 | 0.025 | 0.025 | 0.025 | 0.025 |
| 61 | 0.025 | 0.025 | 0.025 | 0.025 | 0.025 | 0.025 | 0.025 | 0.025 | 0.025 | 0.025 |
| 61 | 0.025 | 0.025 | 0.025 | 0.025 | 0.025 | 0.025 | 0.025 | 0.025 | 0.025 | 0.025 |
| 62 | 0.025 | 0.025 | 0.025 | 0.025 | 0.025 | 0.025 | 0.025 | 0.025 | 0.025 | 0.025 |
| 62 | 0.025 | 0.025 | 0.025 | 0.025 | 0.025 | 0.025 | 0.025 | 0.025 | 0.025 | 0.025 |
| 62 | 0.025 | 0.025 | 0.025 | 0.025 | 0.025 | 0.025 | 0.025 | 0.025 | 0.025 | 0.025 |

TABLE C32.2.4

| Probability table for Node FCIBU | | | | | | | | | | | |
|---|---|---|---|---|---|---|---|---|---|---|---|
| Modified | | Final CIBU Sand | | | | | | | | | |
| CIBU | GGS | 40 | 41 | 42 | 43 | 44 | 45 | 49 | 50 | 51 | 52 |
| 63 | vc-c | 0.025 | 0.025 | 0.025 | 0.025 | 0.025 | 0.025 | 0.025 | 0.025 | 0.025 | 0.025 |
| 63 | m | 0.025 | 0.025 | 0.025 | 0.025 | 0.025 | 0.025 | 0.025 | 0.025 | 0.025 | 0.025 |
| 63 | f-vf | 0.025 | 0.025 | 0.025 | 0.025 | 0.025 | 0.025 | 0.025 | 0.025 | 0.025 | 0.025 |
| 64 | vc-c | 0.025 | 0.025 | 0.025 | 0.025 | 0.025 | 0.025 | 0.025 | 0.025 | 0.025 | 0.025 |
| 64 | m | 0.025 | 0.025 | 0.025 | 0.025 | 0.025 | 0.025 | 0.025 | 0.025 | 0.025 | 0.025 |
| 64 | f-vf | 0.025 | 0.025 | 0.025 | 0.025 | 0.025 | 0.025 | 0.025 | 0.025 | 0.025 | 0.025 |
| 65 | vc-c | 0.025 | 0.025 | 0.025 | 0.025 | 0.025 | 0.025 | 0.025 | 0.025 | 0.025 | 0.025 |
| 65 | m | 0.025 | 0.025 | 0.025 | 0.025 | 0.025 | 0.025 | 0.025 | 0.025 | 0.025 | 0.025 |
| 65 | f-vf | 0.025 | 0.025 | 0.025 | 0.025 | 0.025 | 0.025 | 0.025 | 0.025 | 0.025 | 0.025 |
| 66 | vc-c | 0.025 | 0.025 | 0.025 | 0.025 | 0.025 | 0.025 | 0.025 | 0.025 | 0.025 | 0.025 |
| 66 | m | 0.025 | 0.025 | 0.025 | 0.025 | 0.025 | 0.025 | 0.025 | 0.025 | 0.025 | 0.025 |
| 66 | f-vf | 0.025 | 0.025 | 0.025 | 0.025 | 0.025 | 0.025 | 0.025 | 0.025 | 0.025 | 0.025 |

| Modified | Final CIBU Sand | | | | | | | | | |
|---|---|---|---|---|---|---|---|---|---|---|
| CIBU | 53 | 54 | 55 | 60 | 61 | 62 | 63 | 64 | 65 | 66 |
| 63 | 0.025 | 0.025 | 0.025 | 0.025 | 0.025 | 0.025 | 0.025 | 0.025 | 0.025 | 0.025 |
| 63 | 0.025 | 0.025 | 0.025 | 0.025 | 0.025 | 0.025 | 0.025 | 0.025 | 0.025 | 0.025 |
| 63 | 0.025 | 0.025 | 0.025 | 0.025 | 0.025 | 0.025 | 0.025 | 0.025 | 0.025 | 0.025 |
| 64 | 0.025 | 0.025 | 0.025 | 0.025 | 0.025 | 0.025 | 0.025 | 0.025 | 0.025 | 0.025 |
| 64 | 0.025 | 0.025 | 0.025 | 0.025 | 0.025 | 0.025 | 0.025 | 0.025 | 0.025 | 0.025 |

TABLE C32.2.4-continued

| Probability table for Node FCIBU | | | | | | | | | | |
|---|---|---|---|---|---|---|---|---|---|---|
| 64 | 0.025 | 0.025 | 0.025 | 0.025 | 0.025 | 0.025 | 0.025 | 0.025 | 0.025 | 0.025 |
| 65 | 0.025 | 0.025 | 0.025 | 0.025 | 0.025 | 0.025 | 0.025 | 0.025 | 0.025 | 0.025 |
| 65 | 0.025 | 0.025 | 0.025 | 0.025 | 0.025 | 0.025 | 0.025 | 0.025 | 0.025 | 0.025 |
| 65 | 0.025 | 0.025 | 0.025 | 0.025 | 0.025 | 0.025 | 0.025 | 0.025 | 0.025 | 0.025 |
| 66 | 0.025 | 0.025 | 0.025 | 0.025 | 0.025 | 0.025 | 0.025 | 0.025 | 0.025 | 0.025 |
| 66 | 0.025 | 0.025 | 0.025 | 0.025 | 0.025 | 0.025 | 0.025 | 0.025 | 0.025 | 0.025 |
| 66 | 0.025 | 0.025 | 0.025 | 0.025 | 0.025 | 0.025 | 0.025 | 0.025 | 0.025 | 0.025 |

TABLE C33.1.1

Probability table for Node FCAMBU

| Modified | | Final CAMBU Sand | | | | | | | | | |
|---|---|---|---|---|---|---|---|---|---|---|---|
| CAMBU | GGS | 5 | 8 | 12 | 14 | 18 | 19 | 20 | 21 | 24 | 25 |
| 5 | vc-c | 0.031 | 0.031 | 0.031 | 0.031 | 0.031 | 0.031 | 0.031 | 0.031 | 0.031 | 0.031 |
| 5 | m | 0.031 | 0.031 | 0.031 | 0.031 | 0.031 | 0.031 | 0.031 | 0.031 | 0.031 | 0.031 |
| 5 | f-vf | 0.031 | 0.031 | 0.031 | 0.031 | 0.031 | 0.031 | 0.031 | 0.031 | 0.031 | 0.031 |
| 8 | vc-c | 0.031 | 0.031 | 0.031 | 0.031 | 0.031 | 0.031 | 0.031 | 0.031 | 0.031 | 0.031 |
| 8 | m | 0.031 | 0.031 | 0.031 | 0.031 | 0.031 | 0.031 | 0.031 | 0.031 | 0.031 | 0.031 |
| 8 | f-vf | 0.031 | 0.031 | 0.031 | 0.031 | 0.031 | 0.031 | 0.031 | 0.031 | 0.031 | 0.031 |
| 12 | vc-c | 0.031 | 0.031 | 0.031 | 0.031 | 0.031 | 0.031 | 0.031 | 0.031 | 0.031 | 0.031 |
| 12 | m | 0.031 | 0.031 | 0.031 | 0.031 | 0.031 | 0.031 | 0.031 | 0.031 | 0.031 | 0.031 |
| 12 | f-vf | 0.031 | 0.031 | 0.031 | 0.031 | 0.031 | 0.031 | 0.031 | 0.031 | 0.031 | 0.031 |
| 14 | vc-c | 0.031 | 0.031 | 0.031 | 0.031 | 0.031 | 0.031 | 0.031 | 0.031 | 0.031 | 0.031 |
| 14 | m | 0.031 | 0.031 | 0.031 | 0.031 | 0.031 | 0.031 | 0.031 | 0.031 | 0.031 | 0.031 |
| 14 | f-vf | 0.031 | 0.031 | 0.031 | 0.031 | 0.031 | 0.031 | 0.031 | 0.031 | 0.031 | 0.031 |
| 18 | vc-c | 0.031 | 0.031 | 0.031 | 0.031 | 0.031 | 0.031 | 0.031 | 0.031 | 0.031 | 0.031 |
| 18 | m | 0.031 | 0.031 | 0.031 | 0.031 | 0.031 | 0.031 | 0.031 | 0.031 | 0.031 | 0.031 |
| 18 | f-vf | 0.031 | 0.031 | 0.031 | 0.031 | 0.031 | 0.031 | 0.031 | 0.031 | 0.031 | 0.031 |
| 19 | vc-c | 0.031 | 0.031 | 0.031 | 0.031 | 0.031 | 0.031 | 0.031 | 0.031 | 0.031 | 0.031 |
| 19 | m | 0.031 | 0.031 | 0.031 | 0.031 | 0.031 | 0.031 | 0.031 | 0.031 | 0.031 | 0.031 |
| 19 | f-vf | 0.031 | 0.031 | 0.031 | 0.031 | 0.031 | 0.031 | 0.031 | 0.031 | 0.031 | 0.031 |
| 20 | vc-c | 0.031 | 0.031 | 0.031 | 0.031 | 0.031 | 0.031 | 0.031 | 0.031 | 0.031 | 0.031 |
| 20 | m | 0.031 | 0.031 | 0.031 | 0.031 | 0.031 | 0.031 | 0.031 | 0.031 | 0.031 | 0.031 |
| 20 | f-vf | 0.031 | 0.031 | 0.031 | 0.031 | 0.031 | 0.031 | 0.031 | 0.031 | 0.031 | 0.031 |
| 21 | vc-c | 0.031 | 0.031 | 0.031 | 0.031 | 0.031 | 0.031 | 0.031 | 0.031 | 0.031 | 0.031 |
| 21 | m | 0.031 | 0.031 | 0.031 | 0.031 | 0.031 | 0.031 | 0.031 | 0.031 | 0.031 | 0.031 |
| 21 | f-vf | 0.031 | 0.031 | 0.031 | 0.031 | 0.031 | 0.031 | 0.031 | 0.031 | 0.031 | 0.031 |
| 24 | vc-c | 0.031 | 0.031 | 0.031 | 0.031 | 0.031 | 0.031 | 0.031 | 0.031 | 0.031 | 0.031 |
| 24 | m | 0.031 | 0.031 | 0.031 | 0.031 | 0.031 | 0.031 | 0.031 | 0.031 | 0.031 | 0.031 |
| 24 | f-vf | 0.031 | 0.031 | 0.031 | 0.031 | 0.031 | 0.031 | 0.031 | 0.031 | 0.031 | 0.031 |
| 25 | vc-c | 0.031 | 0.031 | 0.031 | 0.031 | 0.031 | 0.031 | 0.031 | 0.031 | 0.031 | 0.031 |
| 25 | m | 0.031 | 0.031 | 0.031 | 0.031 | 0.031 | 0.031 | 0.031 | 0.031 | 0.031 | 0.031 |
| 25 | f-vf | 0.031 | 0.031 | 0.031 | 0.031 | 0.031 | 0.031 | 0.031 | 0.031 | 0.031 | 0.031 |
| 26 | vc-c | 0.031 | 0.031 | 0.031 | 0.031 | 0.031 | 0.031 | 0.031 | 0.031 | 0.031 | 0.031 |
| 26 | m | 0.031 | 0.031 | 0.031 | 0.031 | 0.031 | 0.031 | 0.031 | 0.031 | 0.031 | 0.031 |
| 26 | f-vf | 0.031 | 0.031 | 0.031 | 0.031 | 0.031 | 0.031 | 0.031 | 0.031 | 0.031 | 0.031 |
| 27 | vc-c | 0.031 | 0.031 | 0.031 | 0.031 | 0.031 | 0.031 | 0.031 | 0.031 | 0.031 | 0.031 |
| 27 | m | 0.031 | 0.031 | 0.031 | 0.031 | 0.031 | 0.031 | 0.031 | 0.031 | 0.031 | 0.031 |
| 27 | f-vf | 0.031 | 0.031 | 0.031 | 0.031 | 0.031 | 0.031 | 0.031 | 0.031 | 0.031 | 0.031 |

| Modified | Final CAMBU Sand | | | | | | | | | |
|---|---|---|---|---|---|---|---|---|---|---|
| CAMBU | 26 | 27 | 28 | 31 | 32 | 33 | 34 | 35 | 36 | 41 |
| 5 | 0.031 | 0.031 | 0.031 | 0.031 | 0.031 | 0.031 | 0.031 | 0.031 | 0.031 | 0.031 |
| 5 | 0.031 | 0.031 | 0.031 | 0.031 | 0.031 | 0.031 | 0.031 | 0.031 | 0.031 | 0.031 |
| 5 | 0.031 | 0.031 | 0.031 | 0.031 | 0.031 | 0.031 | 0.031 | 0.031 | 0.031 | 0.031 |
| 8 | 0.031 | 0.031 | 0.031 | 0.031 | 0.031 | 0.031 | 0.031 | 0.031 | 0.031 | 0.031 |
| 8 | 0.031 | 0.031 | 0.031 | 0.031 | 0.031 | 0.031 | 0.031 | 0.031 | 0.031 | 0.031 |
| 8 | 0.031 | 0.031 | 0.031 | 0.031 | 0.031 | 0.031 | 0.031 | 0.031 | 0.031 | 0.031 |
| 12 | 0.031 | 0.031 | 0.031 | 0.031 | 0.031 | 0.031 | 0.031 | 0.031 | 0.031 | 0.031 |
| 12 | 0.031 | 0.031 | 0.031 | 0.031 | 0.031 | 0.031 | 0.031 | 0.031 | 0.031 | 0.031 |
| 12 | 0.031 | 0.031 | 0.031 | 0.031 | 0.031 | 0.031 | 0.031 | 0.031 | 0.031 | 0.031 |
| 14 | 0.031 | 0.031 | 0.031 | 0.031 | 0.031 | 0.031 | 0.031 | 0.031 | 0.031 | 0.031 |
| 14 | 0.031 | 0.031 | 0.031 | 0.031 | 0.031 | 0.031 | 0.031 | 0.031 | 0.031 | 0.031 |
| 14 | 0.031 | 0.031 | 0.031 | 0.031 | 0.031 | 0.031 | 0.031 | 0.031 | 0.031 | 0.031 |
| 18 | 0.031 | 0.031 | 0.031 | 0.031 | 0.031 | 0.031 | 0.031 | 0.031 | 0.031 | 0.031 |
| 18 | 0.031 | 0.031 | 0.031 | 0.031 | 0.031 | 0.031 | 0.031 | 0.031 | 0.031 | 0.031 |
| 18 | 0.031 | 0.031 | 0.031 | 0.031 | 0.031 | 0.031 | 0.031 | 0.031 | 0.031 | 0.031 |
| 19 | 0.031 | 0.031 | 0.031 | 0.031 | 0.031 | 0.031 | 0.031 | 0.031 | 0.031 | 0.031 |
| 19 | 0.031 | 0.031 | 0.031 | 0.031 | 0.031 | 0.031 | 0.031 | 0.031 | 0.031 | 0.031 |

TABLE C33.1.1-continued

Probability table for Node FCAMBU

| | | | | | | | | | | |
|---|---|---|---|---|---|---|---|---|---|---|
| 19 | 0.031 | 0.031 | 0.031 | 0.031 | 0.031 | 0.031 | 0.031 | 0.031 | 0.031 | 0.031 |
| 20 | 0.031 | 0.031 | 0.031 | 0.031 | 0.031 | 0.031 | 0.031 | 0.031 | 0.031 | 0.031 |
| 20 | 0.031 | 0.031 | 0.031 | 0.031 | 0.031 | 0.031 | 0.031 | 0.031 | 0.031 | 0.031 |
| 20 | 0.031 | 0.031 | 0.031 | 0.031 | 0.031 | 0.031 | 0.031 | 0.031 | 0.031 | 0.031 |
| 21 | 0.031 | 0.031 | 0.031 | 0.031 | 0.031 | 0.031 | 0.031 | 0.031 | 0.031 | 0.031 |
| 21 | 0.031 | 0.031 | 0.031 | 0.031 | 0.031 | 0.031 | 0.031 | 0.031 | 0.031 | 0.031 |
| 21 | 0.031 | 0.031 | 0.031 | 0.031 | 0.031 | 0.031 | 0.031 | 0.031 | 0.031 | 0.031 |
| 24 | 0.031 | 0.031 | 0.031 | 0.031 | 0.031 | 0.031 | 0.031 | 0.031 | 0.031 | 0.031 |
| 24 | 0.031 | 0.031 | 0.031 | 0.031 | 0.031 | 0.031 | 0.031 | 0.031 | 0.031 | 0.031 |
| 24 | 0.031 | 0.031 | 0.031 | 0.031 | 0.031 | 0.031 | 0.031 | 0.031 | 0.031 | 0.031 |
| 25 | 0.031 | 0.031 | 0.031 | 0.031 | 0.031 | 0.031 | 0.031 | 0.031 | 0.031 | 0.031 |
| 25 | 0.031 | 0.031 | 0.031 | 0.031 | 0.031 | 0.031 | 0.031 | 0.031 | 0.031 | 0.031 |
| 25 | 0.031 | 0.031 | 0.031 | 0.031 | 0.031 | 0.031 | 0.031 | 0.031 | 0.031 | 0.031 |
| 26 | 0.031 | 0.031 | 0.031 | 0.031 | 0.031 | 0.031 | 0.031 | 0.031 | 0.031 | 0.031 |
| 26 | 0.031 | 0.031 | 0.031 | 0.031 | 0.031 | 0.031 | 0.031 | 0.031 | 0.031 | 0.031 |
| 26 | 0.031 | 0.031 | 0.031 | 0.031 | 0.031 | 0.031 | 0.031 | 0.031 | 0.031 | 0.031 |
| 27 | 0.031 | 0.031 | 0.031 | 0.031 | 0.031 | 0.031 | 0.031 | 0.031 | 0.031 | 0.031 |
| 27 | 0.031 | 0.031 | 0.031 | 0.031 | 0.031 | 0.031 | 0.031 | 0.031 | 0.031 | 0.031 |
| 27 | 0.031 | 0.031 | 0.031 | 0.031 | 0.031 | 0.031 | 0.031 | 0.031 | 0.031 | 0.031 |

TABLE C33.1.2

Probability table for Node FCAMBU

| Modified | | Final CAMBU Sand | | | | | | | | | |
|---|---|---|---|---|---|---|---|---|---|---|---|
| CAMBU | GGS | 5 | 8 | 12 | 14 | 18 | 19 | 20 | 21 | 24 | 25 |
| 28 | vc-c | 0.031 | 0.031 | 0.031 | 0.031 | 0.031 | 0.031 | 0.031 | 0.031 | 0.031 | 0.031 |
| 28 | m | 0.031 | 0.031 | 0.031 | 0.031 | 0.031 | 0.031 | 0.031 | 0.031 | 0.031 | 0.031 |
| 28 | f-vf | 0.031 | 0.031 | 0.031 | 0.031 | 0.031 | 0.031 | 0.031 | 0.031 | 0.031 | 0.031 |
| 31 | vc-c | 0.031 | 0.031 | 0.031 | 0.031 | 0.031 | 0.031 | 0.031 | 0.031 | 0.031 | 0.031 |
| 31 | m | 0.031 | 0.031 | 0.031 | 0.031 | 0.031 | 0.031 | 0.031 | 0.031 | 0.031 | 0.031 |
| 31 | f-vf | 0.031 | 0.031 | 0.031 | 0.031 | 0.031 | 0.031 | 0.031 | 0.031 | 0.031 | 0.031 |
| 32 | vc-c | 0.031 | 0.031 | 0.031 | 0.031 | 0.031 | 0.031 | 0.031 | 0.031 | 0.031 | 0.031 |
| 32 | m | 0.031 | 0.031 | 0.031 | 0.031 | 0.031 | 0.031 | 0.031 | 0.031 | 0.031 | 0.031 |
| 32 | f-vf | 0.031 | 0.031 | 0.031 | 0.031 | 0.031 | 0.031 | 0.031 | 0.031 | 0.031 | 0.031 |
| 33 | vc-c | 0.031 | 0.031 | 0.031 | 0.031 | 0.031 | 0.031 | 0.031 | 0.031 | 0.031 | 0.031 |
| 33 | m | 0.031 | 0.031 | 0.031 | 0.031 | 0.031 | 0.031 | 0.031 | 0.031 | 0.031 | 0.031 |
| 33 | f-vf | 0.031 | 0.031 | 0.031 | 0.031 | 0.031 | 0.031 | 0.031 | 0.031 | 0.031 | 0.031 |
| 34 | vc-c | 0.031 | 0.031 | 0.031 | 0.031 | 0.031 | 0.031 | 0.031 | 0.031 | 0.031 | 0.031 |
| 34 | m | 0.031 | 0.031 | 0.031 | 0.031 | 0.031 | 0.031 | 0.031 | 0.031 | 0.031 | 0.031 |
| 34 | f-vf | 0.031 | 0.031 | 0.031 | 0.031 | 0.031 | 0.031 | 0.031 | 0.031 | 0.031 | 0.031 |
| 35 | vc-c | 0.031 | 0.031 | 0.031 | 0.031 | 0.031 | 0.031 | 0.031 | 0.031 | 0.031 | 0.031 |
| 35 | m | 0.031 | 0.031 | 0.031 | 0.031 | 0.031 | 0.031 | 0.031 | 0.031 | 0.031 | 0.031 |
| 35 | f-vf | 0.031 | 0.031 | 0.031 | 0.031 | 0.031 | 0.031 | 0.031 | 0.031 | 0.031 | 0.031 |
| 36 | vc-c | 0.031 | 0.031 | 0.031 | 0.031 | 0.031 | 0.031 | 0.031 | 0.031 | 0.031 | 0.031 |
| 36 | m | 0.031 | 0.031 | 0.031 | 0.031 | 0.031 | 0.031 | 0.031 | 0.031 | 0.031 | 0.031 |
| 36 | f-vf | 0.031 | 0.031 | 0.031 | 0.031 | 0.031 | 0.031 | 0.031 | 0.031 | 0.031 | 0.031 |
| 41 | vc-c | 0.031 | 0.031 | 0.031 | 0.031 | 0.031 | 0.031 | 0.031 | 0.031 | 0.031 | 0.031 |
| 41 | m | 0.031 | 0.031 | 0.031 | 0.031 | 0.031 | 0.031 | 0.031 | 0.031 | 0.031 | 0.031 |
| 41 | f-vf | 0.031 | 0.031 | 0.031 | 0.031 | 0.031 | 0.031 | 0.031 | 0.031 | 0.031 | 0.031 |
| 42 | vc-c | 0.031 | 0.031 | 0.031 | 0.031 | 0.031 | 0.031 | 0.031 | 0.031 | 0.031 | 0.031 |
| 42 | m | 0.031 | 0.031 | 0.031 | 0.031 | 0.031 | 0.031 | 0.031 | 0.031 | 0.031 | 0.031 |
| 42 | f-vf | 0.031 | 0.031 | 0.031 | 0.031 | 0.031 | 0.031 | 0.031 | 0.031 | 0.031 | 0.031 |
| 43 | vc-c | 0.031 | 0.031 | 0.031 | 0.031 | 0.031 | 0.031 | 0.031 | 0.031 | 0.031 | 0.031 |
| 43 | m | 0.031 | 0.031 | 0.031 | 0.031 | 0.031 | 0.031 | 0.031 | 0.031 | 0.031 | 0.031 |
| 43 | f-vf | 0.031 | 0.031 | 0.031 | 0.031 | 0.031 | 0.031 | 0.031 | 0.031 | 0.031 | 0.031 |
| 44 | vc-c | 0.031 | 0.031 | 0.031 | 0.031 | 0.031 | 0.031 | 0.031 | 0.031 | 0.031 | 0.031 |
| 44 | m | 0.031 | 0.031 | 0.031 | 0.031 | 0.031 | 0.031 | 0.031 | 0.031 | 0.031 | 0.031 |
| 44 | f-vf | 0.031 | 0.031 | 0.031 | 0.031 | 0.031 | 0.031 | 0.031 | 0.031 | 0.031 | 0.031 |
| 45 | vc-c | 0.031 | 0.031 | 0.031 | 0.031 | 0.031 | 0.031 | 0.031 | 0.031 | 0.031 | 0.031 |
| 45 | m | 0.031 | 0.031 | 0.031 | 0.031 | 0.031 | 0.031 | 0.031 | 0.031 | 0.031 | 0.031 |
| 45 | f-vf | 0.031 | 0.031 | 0.031 | 0.031 | 0.031 | 0.031 | 0.031 | 0.031 | 0.031 | 0.031 |

| Modified | Final CAMBU Sand | | | | | | | | | |
|---|---|---|---|---|---|---|---|---|---|---|
| CAMBU | 26 | 27 | 28 | 31 | 32 | 33 | 34 | 35 | 36 | 41 |
| 28 | 0.031 | 0.031 | 0.031 | 0.031 | 0.031 | 0.031 | 0.031 | 0.031 | 0.031 | 0.031 |
| 28 | 0.031 | 0.031 | 0.031 | 0.031 | 0.031 | 0.031 | 0.031 | 0.031 | 0.031 | 0.031 |
| 28 | 0.031 | 0.031 | 0.031 | 0.031 | 0.031 | 0.031 | 0.031 | 0.031 | 0.031 | 0.031 |
| 31 | 0.031 | 0.031 | 0.031 | 0.031 | 0.031 | 0.031 | 0.031 | 0.031 | 0.031 | 0.031 |
| 31 | 0.031 | 0.031 | 0.031 | 0.031 | 0.031 | 0.031 | 0.031 | 0.031 | 0.031 | 0.031 |

TABLE C33.1.2-continued

Probability table for Node FCAMBU

| | | | | | | | | | | |
|---|---|---|---|---|---|---|---|---|---|---|
| 31 | 0.031 | 0.031 | 0.031 | 0.031 | 0.031 | 0.031 | 0.031 | 0.031 | 0.031 | 0.031 |
| 32 | 0.031 | 0.031 | 0.031 | 0.031 | 0.031 | 0.031 | 0.031 | 0.031 | 0.031 | 0.031 |
| 32 | 0.031 | 0.031 | 0.031 | 0.031 | 0.031 | 0.031 | 0.031 | 0.031 | 0.031 | 0.031 |
| 32 | 0.031 | 0.031 | 0.031 | 0.031 | 0.031 | 0.031 | 0.031 | 0.031 | 0.031 | 0.031 |
| 33 | 0.031 | 0.031 | 0.031 | 0.031 | 0.031 | 0.031 | 0.031 | 0.031 | 0.031 | 0.031 |
| 33 | 0.031 | 0.031 | 0.031 | 0.031 | 0.031 | 0.031 | 0.031 | 0.031 | 0.031 | 0.031 |
| 33 | 0.031 | 0.031 | 0.031 | 0.031 | 0.031 | 0.031 | 0.031 | 0.031 | 0.031 | 0.031 |
| 34 | 0.031 | 0.031 | 0.031 | 0.031 | 0.031 | 0.031 | 0.031 | 0.031 | 0.031 | 0.031 |
| 34 | 0.031 | 0.031 | 0.031 | 0.031 | 0.031 | 0.031 | 0.031 | 0.031 | 0.031 | 0.031 |
| 34 | 0.031 | 0.031 | 0.031 | 0.031 | 0.031 | 0.031 | 0.031 | 0.031 | 0.031 | 0.031 |
| 35 | 0.031 | 0.031 | 0.031 | 0.031 | 0.031 | 0.031 | 0.031 | 0.031 | 0.031 | 0.031 |
| 35 | 0.031 | 0.031 | 0.031 | 0.031 | 0.031 | 0.031 | 0.031 | 0.031 | 0.031 | 0.031 |
| 35 | 0.031 | 0.031 | 0.031 | 0.031 | 0.031 | 0.031 | 0.031 | 0.031 | 0.031 | 0.031 |
| 36 | 0.031 | 0.031 | 0.031 | 0.031 | 0.031 | 0.031 | 0.031 | 0.031 | 0.031 | 0.031 |
| 36 | 0.031 | 0.031 | 0.031 | 0.031 | 0.031 | 0.031 | 0.031 | 0.031 | 0.031 | 0.031 |
| 36 | 0.031 | 0.031 | 0.031 | 0.031 | 0.031 | 0.031 | 0.031 | 0.031 | 0.031 | 0.031 |
| 41 | 0.031 | 0.031 | 0.031 | 0.031 | 0.031 | 0.031 | 0.031 | 0.031 | 0.031 | 0.031 |
| 41 | 0.031 | 0.031 | 0.031 | 0.031 | 0.031 | 0.031 | 0.031 | 0.031 | 0.031 | 0.031 |
| 41 | 0.031 | 0.031 | 0.031 | 0.031 | 0.031 | 0.031 | 0.031 | 0.031 | 0.031 | 0.031 |
| 42 | 0.031 | 0.031 | 0.031 | 0.031 | 0.031 | 0.031 | 0.031 | 0.031 | 0.031 | 0.031 |
| 42 | 0.031 | 0.031 | 0.031 | 0.031 | 0.031 | 0.031 | 0.031 | 0.031 | 0.031 | 0.031 |
| 42 | 0.031 | 0.031 | 0.031 | 0.031 | 0.031 | 0.031 | 0.031 | 0.031 | 0.031 | 0.031 |
| 43 | 0.031 | 0.031 | 0.031 | 0.031 | 0.031 | 0.031 | 0.031 | 0.031 | 0.031 | 0.031 |
| 43 | 0.031 | 0.031 | 0.031 | 0.031 | 0.031 | 0.031 | 0.031 | 0.031 | 0.031 | 0.031 |
| 43 | 0.031 | 0.031 | 0.031 | 0.031 | 0.031 | 0.031 | 0.031 | 0.031 | 0.031 | 0.031 |
| 44 | 0.031 | 0.031 | 0.031 | 0.031 | 0.031 | 0.031 | 0.031 | 0.031 | 0.031 | 0.031 |
| 44 | 0.031 | 0.031 | 0.031 | 0.031 | 0.031 | 0.031 | 0.031 | 0.031 | 0.031 | 0.031 |
| 44 | 0.031 | 0.031 | 0.031 | 0.031 | 0.031 | 0.031 | 0.031 | 0.031 | 0.031 | 0.031 |
| 45 | 0.031 | 0.031 | 0.031 | 0.031 | 0.031 | 0.031 | 0.031 | 0.031 | 0.031 | 0.031 |
| 45 | 0.031 | 0.031 | 0.031 | 0.031 | 0.031 | 0.031 | 0.031 | 0.031 | 0.031 | 0.031 |
| 45 | 0.031 | 0.031 | 0.031 | 0.031 | 0.031 | 0.031 | 0.031 | 0.031 | 0.031 | 0.031 |

TABLE C33.1.3

Probability table for Node FCAMBU

| Modified | | Final CAMBU Sand | | | | | | | | | |
|---|---|---|---|---|---|---|---|---|---|---|---|
| CAMBU | GGS | 5 | 8 | 12 | 14 | 18 | 19 | 20 | 21 | 24 | 25 |
| 51 | vc-c | 0.031 | 0.031 | 0.031 | 0.031 | 0.031 | 0.031 | 0.031 | 0.031 | 0.031 | 0.031 |
| 51 | m | 0.031 | 0.031 | 0.031 | 0.031 | 0.031 | 0.031 | 0.031 | 0.031 | 0.031 | 0.031 |
| 51 | f-vf | 0.031 | 0.031 | 0.031 | 0.031 | 0.031 | 0.031 | 0.031 | 0.031 | 0.031 | 0.031 |
| 52 | vc-c | 0.031 | 0.031 | 0.031 | 0.031 | 0.031 | 0.031 | 0.031 | 0.031 | 0.031 | 0.031 |
| 52 | m | 0.031 | 0.031 | 0.031 | 0.031 | 0.031 | 0.031 | 0.031 | 0.031 | 0.031 | 0.031 |
| 52 | f-vf | 0.031 | 0.031 | 0.031 | 0.031 | 0.031 | 0.031 | 0.031 | 0.031 | 0.031 | 0.031 |
| 53 | vc-c | 0.031 | 0.031 | 0.031 | 0.031 | 0.031 | 0.031 | 0.031 | 0.031 | 0.031 | 0.031 |
| 53 | m | 0.031 | 0.031 | 0.031 | 0.031 | 0.031 | 0.031 | 0.031 | 0.031 | 0.031 | 0.031 |
| 53 | f-vf | 0.031 | 0.031 | 0.031 | 0.031 | 0.031 | 0.031 | 0.031 | 0.031 | 0.031 | 0.031 |
| 54 | vc-c | 0.031 | 0.031 | 0.031 | 0.031 | 0.031 | 0.031 | 0.031 | 0.031 | 0.031 | 0.031 |
| 54 | m | 0.031 | 0.031 | 0.031 | 0.031 | 0.031 | 0.031 | 0.031 | 0.031 | 0.031 | 0.031 |
| 54 | f-vf | 0.031 | 0.031 | 0.031 | 0.031 | 0.031 | 0.031 | 0.031 | 0.031 | 0.031 | 0.031 |
| 55 | vc-c | 0.031 | 0.031 | 0.031 | 0.031 | 0.031 | 0.031 | 0.031 | 0.031 | 0.031 | 0.031 |
| 55 | m | 0.031 | 0.031 | 0.031 | 0.031 | 0.031 | 0.031 | 0.031 | 0.031 | 0.031 | 0.031 |
| 55 | f-vf | 0.031 | 0.031 | 0.031 | 0.031 | 0.031 | 0.031 | 0.031 | 0.031 | 0.031 | 0.031 |
| 62 | vc-c | 0.031 | 0.031 | 0.031 | 0.031 | 0.031 | 0.031 | 0.031 | 0.031 | 0.031 | 0.031 |
| 62 | m | 0.031 | 0.031 | 0.031 | 0.031 | 0.031 | 0.031 | 0.031 | 0.031 | 0.031 | 0.031 |
| 62 | f-vf | 0.031 | 0.031 | 0.031 | 0.031 | 0.031 | 0.031 | 0.031 | 0.031 | 0.031 | 0.031 |
| 63 | vc-c | 0.031 | 0.031 | 0.031 | 0.031 | 0.031 | 0.031 | 0.031 | 0.031 | 0.031 | 0.031 |
| 63 | m | 0.031 | 0.031 | 0.031 | 0.031 | 0.031 | 0.031 | 0.031 | 0.031 | 0.031 | 0.031 |
| 63 | f-vf | 0.031 | 0.031 | 0.031 | 0.031 | 0.031 | 0.031 | 0.031 | 0.031 | 0.031 | 0.031 |
| 64 | vc-c | 0.031 | 0.031 | 0.031 | 0.031 | 0.031 | 0.031 | 0.031 | 0.031 | 0.031 | 0.031 |
| 64 | m | 0.031 | 0.031 | 0.031 | 0.031 | 0.031 | 0.031 | 0.031 | 0.031 | 0.031 | 0.031 |
| 64 | f-vf | 0.031 | 0.031 | 0.031 | 0.031 | 0.031 | 0.031 | 0.031 | 0.031 | 0.031 | 0.031 |

| Modified | Final CAMBU Sand | | | | | | | | | |
|---|---|---|---|---|---|---|---|---|---|---|
| CAMBU | 26 | 27 | 28 | 31 | 32 | 33 | 34 | 35 | 36 | 41 |
| 51 | 0.031 | 0.031 | 0.031 | 0.031 | 0.031 | 0.031 | 0.031 | 0.031 | 0.031 | 0.031 |
| 51 | 0.031 | 0.031 | 0.031 | 0.031 | 0.031 | 0.031 | 0.031 | 0.031 | 0.031 | 0.031 |
| 51 | 0.031 | 0.031 | 0.031 | 0.031 | 0.031 | 0.031 | 0.031 | 0.031 | 0.031 | 0.031 |
| 52 | 0.031 | 0.031 | 0.031 | 0.031 | 0.031 | 0.031 | 0.031 | 0.031 | 0.031 | 0.031 |
| 52 | 0.031 | 0.031 | 0.031 | 0.031 | 0.031 | 0.031 | 0.031 | 0.031 | 0.031 | 0.031 |

TABLE C33.1.3-continued

| Probability table for Node FCAMBU | | | | | | | | | | |
|---|---|---|---|---|---|---|---|---|---|---|
| 52 | 0.031 | 0.031 | 0.031 | 0.031 | 0.031 | 0.031 | 0.031 | 0.031 | 0.031 | 0.031 |
| 53 | 0.031 | 0.031 | 0.031 | 0.031 | 0.031 | 0.031 | 0.031 | 0.031 | 0.031 | 0.031 |
| 53 | 0.031 | 0.031 | 0.031 | 0.031 | 0.031 | 0.031 | 0.031 | 0.031 | 0.031 | 0.031 |
| 53 | 0.031 | 0.031 | 0.031 | 0.031 | 0.031 | 0.031 | 0.031 | 0.031 | 0.031 | 0.031 |
| 54 | 0.031 | 0.031 | 0.031 | 0.031 | 0.031 | 0.031 | 0.031 | 0.031 | 0.031 | 0.031 |
| 54 | 0.031 | 0.031 | 0.031 | 0.031 | 0.031 | 0.031 | 0.031 | 0.031 | 0.031 | 0.031 |
| 54 | 0.031 | 0.031 | 0.031 | 0.031 | 0.031 | 0.031 | 0.031 | 0.031 | 0.031 | 0.031 |
| 55 | 0.031 | 0.031 | 0.031 | 0.031 | 0.031 | 0.031 | 0.031 | 0.031 | 0.031 | 0.031 |
| 55 | 0.031 | 0.031 | 0.031 | 0.031 | 0.031 | 0.031 | 0.031 | 0.031 | 0.031 | 0.031 |
| 55 | 0.031 | 0.031 | 0.031 | 0.031 | 0.031 | 0.031 | 0.031 | 0.031 | 0.031 | 0.031 |
| 62 | 0.031 | 0.031 | 0.031 | 0.031 | 0.031 | 0.031 | 0.031 | 0.031 | 0.031 | 0.031 |
| 62 | 0.031 | 0.031 | 0.031 | 0.031 | 0.031 | 0.031 | 0.031 | 0.031 | 0.031 | 0.031 |
| 62 | 0.031 | 0.031 | 0.031 | 0.031 | 0.031 | 0.031 | 0.031 | 0.031 | 0.031 | 0.031 |
| 63 | 0.031 | 0.031 | 0.031 | 0.031 | 0.031 | 0.031 | 0.031 | 0.031 | 0.031 | 0.031 |
| 63 | 0.031 | 0.031 | 0.031 | 0.031 | 0.031 | 0.031 | 0.031 | 0.031 | 0.031 | 0.031 |
| 63 | 0.031 | 0.031 | 0.031 | 0.031 | 0.031 | 0.031 | 0.031 | 0.031 | 0.031 | 0.031 |
| 64 | 0.031 | 0.031 | 0.031 | 0.031 | 0.031 | 0.031 | 0.031 | 0.031 | 0.031 | 0.031 |
| 64 | 0.031 | 0.031 | 0.031 | 0.031 | 0.031 | 0.031 | 0.031 | 0.031 | 0.031 | 0.031 |
| 64 | 0.031 | 0.031 | 0.031 | 0.031 | 0.031 | 0.031 | 0.031 | 0.031 | 0.031 | 0.031 |

TABLE C33.2.1

| Probability table for Node FCAMBU | | | | | | | | | | | | | |
|---|---|---|---|---|---|---|---|---|---|---|---|---|---|
| Modified | | Final CAMBU Sand | | | | | | | | | | | |
| CAMBU | GGS | 42 | 43 | 44 | 45 | 51 | 52 | 53 | 54 | 55 | 62 | 63 | 64 |
| 5 | vc-c | 0.031 | 0.031 | 0.031 | 0.031 | 0.031 | 0.031 | 0.031 | 0.031 | 0.031 | 0.031 | 0.031 | 0.031 |
| 5 | m | 0.031 | 0.031 | 0.031 | 0.031 | 0.031 | 0.031 | 0.031 | 0.031 | 0.031 | 0.031 | 0.031 | 0.031 |
| 5 | f-vf | 0.031 | 0.031 | 0.031 | 0.031 | 0.031 | 0.031 | 0.031 | 0.031 | 0.031 | 0.031 | 0.031 | 0.031 |
| 8 | vc-c | 0.031 | 0.031 | 0.031 | 0.031 | 0.031 | 0.031 | 0.031 | 0.031 | 0.031 | 0.031 | 0.031 | 0.031 |
| 8 | m | 0.031 | 0.031 | 0.031 | 0.031 | 0.031 | 0.031 | 0.031 | 0.031 | 0.031 | 0.031 | 0.031 | 0.031 |
| 8 | f-vf | 0.031 | 0.031 | 0.031 | 0.031 | 0.031 | 0.031 | 0.031 | 0.031 | 0.031 | 0.031 | 0.031 | 0.031 |
| 12 | vc-c | 0.031 | 0.031 | 0.031 | 0.031 | 0.031 | 0.031 | 0.031 | 0.031 | 0.031 | 0.031 | 0.031 | 0.031 |
| 12 | m | 0.031 | 0.031 | 0.031 | 0.031 | 0.031 | 0.031 | 0.031 | 0.031 | 0.031 | 0.031 | 0.031 | 0.031 |
| 12 | f-vf | 0.031 | 0.031 | 0.031 | 0.031 | 0.031 | 0.031 | 0.031 | 0.031 | 0.031 | 0.031 | 0.031 | 0.031 |
| 14 | vc-c | 0.031 | 0.031 | 0.031 | 0.031 | 0.031 | 0.031 | 0.031 | 0.031 | 0.031 | 0.031 | 0.031 | 0.031 |
| 14 | m | 0.031 | 0.031 | 0.031 | 0.031 | 0.031 | 0.031 | 0.031 | 0.031 | 0.031 | 0.031 | 0.031 | 0.031 |
| 14 | f-vf | 0.031 | 0.031 | 0.031 | 0.031 | 0.031 | 0.031 | 0.031 | 0.031 | 0.031 | 0.031 | 0.031 | 0.031 |
| 18 | vc-c | 0.031 | 0.031 | 0.031 | 0.031 | 0.031 | 0.031 | 0.031 | 0.031 | 0.031 | 0.031 | 0.031 | 0.031 |
| 18 | m | 0.031 | 0.031 | 0.031 | 0.031 | 0.031 | 0.031 | 0.031 | 0.031 | 0.031 | 0.031 | 0.031 | 0.031 |
| 18 | f-vf | 0.031 | 0.031 | 0.031 | 0.031 | 0.031 | 0.031 | 0.031 | 0.031 | 0.031 | 0.031 | 0.031 | 0.031 |
| 19 | vc-c | 0.031 | 0.031 | 0.031 | 0.031 | 0.031 | 0.031 | 0.031 | 0.031 | 0.031 | 0.031 | 0.031 | 0.031 |
| 19 | m | 0.031 | 0.031 | 0.031 | 0.031 | 0.031 | 0.031 | 0.031 | 0.031 | 0.031 | 0.031 | 0.031 | 0.031 |
| 19 | f-vf | 0.031 | 0.031 | 0.031 | 0.031 | 0.031 | 0.031 | 0.031 | 0.031 | 0.031 | 0.031 | 0.031 | 0.031 |
| 20 | vc-c | 0.031 | 0.031 | 0.031 | 0.031 | 0.031 | 0.031 | 0.031 | 0.031 | 0.031 | 0.031 | 0.031 | 0.031 |
| 20 | m | 0.031 | 0.031 | 0.031 | 0.031 | 0.031 | 0.031 | 0.031 | 0.031 | 0.031 | 0.031 | 0.031 | 0.031 |
| 20 | f-vf | 0.031 | 0.031 | 0.031 | 0.031 | 0.031 | 0.031 | 0.031 | 0.031 | 0.031 | 0.031 | 0.031 | 0.031 |
| 21 | vc-c | 0.031 | 0.031 | 0.031 | 0.031 | 0.031 | 0.031 | 0.031 | 0.031 | 0.031 | 0.031 | 0.031 | 0.031 |
| 21 | m | 0.031 | 0.031 | 0.031 | 0.031 | 0.031 | 0.031 | 0.031 | 0.031 | 0.031 | 0.031 | 0.031 | 0.031 |
| 21 | f-vf | 0.031 | 0.031 | 0.031 | 0.031 | 0.031 | 0.031 | 0.031 | 0.031 | 0.031 | 0.031 | 0.031 | 0.031 |
| 24 | vc-c | 0.031 | 0.031 | 0.031 | 0.031 | 0.031 | 0.031 | 0.031 | 0.031 | 0.031 | 0.031 | 0.031 | 0.031 |
| 24 | m | 0.031 | 0.031 | 0.031 | 0.031 | 0.031 | 0.031 | 0.031 | 0.031 | 0.031 | 0.031 | 0.031 | 0.031 |
| 24 | f-vf | 0.031 | 0.031 | 0.031 | 0.031 | 0.031 | 0.031 | 0.031 | 0.031 | 0.031 | 0.031 | 0.031 | 0.031 |
| 25 | vc-c | 0.031 | 0.031 | 0.031 | 0.031 | 0.031 | 0.031 | 0.031 | 0.031 | 0.031 | 0.031 | 0.031 | 0.031 |
| 25 | m | 0.031 | 0.031 | 0.031 | 0.031 | 0.031 | 0.031 | 0.031 | 0.031 | 0.031 | 0.031 | 0.031 | 0.031 |
| 25 | f-vf | 0.031 | 0.031 | 0.031 | 0.031 | 0.031 | 0.031 | 0.031 | 0.031 | 0.031 | 0.031 | 0.031 | 0.031 |
| 26 | vc-c | 0.031 | 0.031 | 0.031 | 0.031 | 0.031 | 0.031 | 0.031 | 0.031 | 0.031 | 0.031 | 0.031 | 0.031 |
| 26 | m | 0.031 | 0.031 | 0.031 | 0.031 | 0.031 | 0.031 | 0.031 | 0.031 | 0.031 | 0.031 | 0.031 | 0.031 |
| 26 | f-vf | 0.031 | 0.031 | 0.031 | 0.031 | 0.031 | 0.031 | 0.031 | 0.031 | 0.031 | 0.031 | 0.031 | 0.031 |
| 27 | vc-c | 0.031 | 0.031 | 0.031 | 0.031 | 0.031 | 0.031 | 0.031 | 0.031 | 0.031 | 0.031 | 0.031 | 0.031 |
| 27 | m | 0.031 | 0.031 | 0.031 | 0.031 | 0.031 | 0.031 | 0.031 | 0.031 | 0.031 | 0.031 | 0.031 | 0.031 |
| 27 | f-vf | 0.031 | 0.031 | 0.031 | 0.031 | 0.031 | 0.031 | 0.031 | 0.031 | 0.031 | 0.031 | 0.031 | 0.031 |

TABLE C33.2.2

| Probability table for Node FCAMBU | | | | | | | | | | | | | |
|---|---|---|---|---|---|---|---|---|---|---|---|---|---|
| Modified | | Final CAMBU Sand | | | | | | | | | | | |
| CAMBU | GGS | 42 | 43 | 44 | 45 | 51 | 52 | 53 | 54 | 55 | 62 | 63 | 64 |
| 28 | vc-c | 0.031 | 0.031 | 0.031 | 0.031 | 0.031 | 0.031 | 0.031 | 0.031 | 0.031 | 0.031 | 0.031 | 0.031 |
| 28 | m | 0.031 | 0.031 | 0.031 | 0.031 | 0.031 | 0.031 | 0.031 | 0.031 | 0.031 | 0.031 | 0.031 | 0.031 |
| 28 | f-vf | 0.031 | 0.031 | 0.031 | 0.031 | 0.031 | 0.031 | 0.031 | 0.031 | 0.031 | 0.031 | 0.031 | 0.031 |
| 31 | vc-c | 0.031 | 0.031 | 0.031 | 0.031 | 0.031 | 0.031 | 0.031 | 0.031 | 0.031 | 0.031 | 0.031 | 0.031 |
| 31 | m | 0.031 | 0.031 | 0.031 | 0.031 | 0.031 | 0.031 | 0.031 | 0.031 | 0.031 | 0.031 | 0.031 | 0.031 |
| 31 | f-vf | 0.031 | 0.031 | 0.031 | 0.031 | 0.031 | 0.031 | 0.031 | 0.031 | 0.031 | 0.031 | 0.031 | 0.031 |
| 32 | vc-c | 0.031 | 0.031 | 0.031 | 0.031 | 0.031 | 0.031 | 0.031 | 0.031 | 0.031 | 0.031 | 0.031 | 0.031 |
| 32 | m | 0.031 | 0.031 | 0.031 | 0.031 | 0.031 | 0.031 | 0.031 | 0.031 | 0.031 | 0.031 | 0.031 | 0.031 |
| 32 | f-vf | 0.031 | 0.031 | 0.031 | 0.031 | 0.031 | 0.031 | 0.031 | 0.031 | 0.031 | 0.031 | 0.031 | 0.031 |
| 33 | vc-c | 0.031 | 0.031 | 0.031 | 0.031 | 0.031 | 0.031 | 0.031 | 0.031 | 0.031 | 0.031 | 0.031 | 0.031 |
| 33 | m | 0.031 | 0.031 | 0.031 | 0.031 | 0.031 | 0.031 | 0.031 | 0.031 | 0.031 | 0.031 | 0.031 | 0.031 |
| 33 | f-vf | 0.031 | 0.031 | 0.031 | 0.031 | 0.031 | 0.031 | 0.031 | 0.031 | 0.031 | 0.031 | 0.031 | 0.031 |
| 34 | vc-c | 0.031 | 0.031 | 0.031 | 0.031 | 0.031 | 0.031 | 0.031 | 0.031 | 0.031 | 0.031 | 0.031 | 0.031 |
| 34 | m | 0.031 | 0.031 | 0.031 | 0.031 | 0.031 | 0.031 | 0.031 | 0.031 | 0.031 | 0.031 | 0.031 | 0.031 |
| 34 | f-vf | 0.031 | 0.031 | 0.031 | 0.031 | 0.031 | 0.031 | 0.031 | 0.031 | 0.031 | 0.031 | 0.031 | 0.031 |
| 35 | vc-c | 0.031 | 0.031 | 0.031 | 0.031 | 0.031 | 0.031 | 0.031 | 0.031 | 0.031 | 0.031 | 0.031 | 0.031 |
| 35 | m | 0.031 | 0.031 | 0.031 | 0.031 | 0.031 | 0.031 | 0.031 | 0.031 | 0.031 | 0.031 | 0.031 | 0.031 |
| 35 | f-vf | 0.031 | 0.031 | 0.031 | 0.031 | 0.031 | 0.031 | 0.031 | 0.031 | 0.031 | 0.031 | 0.031 | 0.031 |
| 36 | vc-c | 0.031 | 0.031 | 0.031 | 0.031 | 0.031 | 0.031 | 0.031 | 0.031 | 0.031 | 0.031 | 0.031 | 0.031 |
| 36 | m | 0.031 | 0.031 | 0.031 | 0.031 | 0.031 | 0.031 | 0.031 | 0.031 | 0.031 | 0.031 | 0.031 | 0.031 |
| 36 | f-vf | 0.031 | 0.031 | 0.031 | 0.031 | 0.031 | 0.031 | 0.031 | 0.031 | 0.031 | 0.031 | 0.031 | 0.031 |
| 41 | vc-c | 0.031 | 0.031 | 0.031 | 0.031 | 0.031 | 0.031 | 0.031 | 0.031 | 0.031 | 0.031 | 0.031 | 0.031 |
| 41 | m | 0.031 | 0.031 | 0.031 | 0.031 | 0.031 | 0.031 | 0.031 | 0.031 | 0.031 | 0.031 | 0.031 | 0.031 |
| 41 | f-vf | 0.031 | 0.031 | 0.031 | 0.031 | 0.031 | 0.031 | 0.031 | 0.031 | 0.031 | 0.031 | 0.031 | 0.031 |
| 42 | vc-c | 0.031 | 0.031 | 0.031 | 0.031 | 0.031 | 0.031 | 0.031 | 0.031 | 0.031 | 0.031 | 0.031 | 0.031 |
| 42 | m | 0.031 | 0.031 | 0.031 | 0.031 | 0.031 | 0.031 | 0.031 | 0.031 | 0.031 | 0.031 | 0.031 | 0.031 |
| 42 | f-vf | 0.031 | 0.031 | 0.031 | 0.031 | 0.031 | 0.031 | 0.031 | 0.031 | 0.031 | 0.031 | 0.031 | 0.031 |
| 43 | vc-c | 0.031 | 0.031 | 0.031 | 0.031 | 0.031 | 0.031 | 0.031 | 0.031 | 0.031 | 0.031 | 0.031 | 0.031 |
| 43 | m | 0.031 | 0.031 | 0.031 | 0.031 | 0.031 | 0.031 | 0.031 | 0.031 | 0.031 | 0.031 | 0.031 | 0.031 |
| 43 | f-vf | 0.031 | 0.031 | 0.031 | 0.031 | 0.031 | 0.031 | 0.031 | 0.031 | 0.031 | 0.031 | 0.031 | 0.031 |
| 44 | vc-c | 0.031 | 0.031 | 0.031 | 0.031 | 0.031 | 0.031 | 0.031 | 0.031 | 0.031 | 0.031 | 0.031 | 0.031 |
| 44 | m | 0.031 | 0.031 | 0.031 | 0.031 | 0.031 | 0.031 | 0.031 | 0.031 | 0.031 | 0.031 | 0.031 | 0.031 |
| 44 | f-vf | 0.031 | 0.031 | 0.031 | 0.031 | 0.031 | 0.031 | 0.031 | 0.031 | 0.031 | 0.031 | 0.031 | 0.031 |
| 45 | vc-c | 0.031 | 0.031 | 0.031 | 0.031 | 0.031 | 0.031 | 0.031 | 0.031 | 0.031 | 0.031 | 0.031 | 0.031 |
| 45 | m | 0.031 | 0.031 | 0.031 | 0.031 | 0.031 | 0.031 | 0.031 | 0.031 | 0.031 | 0.031 | 0.031 | 0.031 |
| 45 | f-vf | 0.031 | 0.031 | 0.031 | 0.031 | 0.031 | 0.031 | 0.031 | 0.031 | 0.031 | 0.031 | 0.031 | 0.031 |

TABLE C33.2.3

| Probability table for Node FCAMBU | | | | | | | | | | | | | |
|---|---|---|---|---|---|---|---|---|---|---|---|---|---|
| Modified | | Final CAMBU Sand | | | | | | | | | | | |
| CAMBU | GGS | 42 | 43 | 44 | 45 | 51 | 52 | 53 | 54 | 55 | 62 | 63 | 64 |
| 51 | vc-c | 0.031 | 0.031 | 0.031 | 0.031 | 0.031 | 0.031 | 0.031 | 0.031 | 0.031 | 0.031 | 0.031 | 0.031 |
| 51 | m | 0.031 | 0.031 | 0.031 | 0.031 | 0.031 | 0.031 | 0.031 | 0.031 | 0.031 | 0.031 | 0.031 | 0.031 |
| 51 | f-vf | 0.031 | 0.031 | 0.031 | 0.031 | 0.031 | 0.031 | 0.031 | 0.031 | 0.031 | 0.031 | 0.031 | 0.031 |
| 52 | vc-c | 0.031 | 0.031 | 0.031 | 0.031 | 0.031 | 0.031 | 0.031 | 0.031 | 0.031 | 0.031 | 0.031 | 0.031 |
| 52 | m | 0.031 | 0.031 | 0.031 | 0.031 | 0.031 | 0.031 | 0.031 | 0.031 | 0.031 | 0.031 | 0.031 | 0.031 |
| 52 | f-vf | 0.031 | 0.031 | 0.031 | 0.031 | 0.031 | 0.031 | 0.031 | 0.031 | 0.031 | 0.031 | 0.031 | 0.031 |
| 53 | vc-c | 0.031 | 0.031 | 0.031 | 0.031 | 0.031 | 0.031 | 0.031 | 0.031 | 0.031 | 0.031 | 0.031 | 0.031 |
| 53 | m | 0.031 | 0.031 | 0.031 | 0.031 | 0.031 | 0.031 | 0.031 | 0.031 | 0.031 | 0.031 | 0.031 | 0.031 |
| 53 | f-vf | 0.031 | 0.031 | 0.031 | 0.031 | 0.031 | 0.031 | 0.031 | 0.031 | 0.031 | 0.031 | 0.031 | 0.031 |
| 54 | vc-c | 0.031 | 0.031 | 0.031 | 0.031 | 0.031 | 0.031 | 0.031 | 0.031 | 0.031 | 0.031 | 0.031 | 0.031 |
| 54 | m | 0.031 | 0.031 | 0.031 | 0.031 | 0.031 | 0.031 | 0.031 | 0.031 | 0.031 | 0.031 | 0.031 | 0.031 |
| 54 | f-vf | 0.031 | 0.031 | 0.031 | 0.031 | 0.031 | 0.031 | 0.031 | 0.031 | 0.031 | 0.031 | 0.031 | 0.031 |
| 55 | vc-c | 0.031 | 0.031 | 0.031 | 0.031 | 0.031 | 0.031 | 0.031 | 0.031 | 0.031 | 0.031 | 0.031 | 0.031 |
| 55 | m | 0.031 | 0.031 | 0.031 | 0.031 | 0.031 | 0.031 | 0.031 | 0.031 | 0.031 | 0.031 | 0.031 | 0.031 |
| 55 | f-vf | 0.031 | 0.031 | 0.031 | 0.031 | 0.031 | 0.031 | 0.031 | 0.031 | 0.031 | 0.031 | 0.031 | 0.031 |
| 62 | vc-c | 0.031 | 0.031 | 0.031 | 0.031 | 0.031 | 0.031 | 0.031 | 0.031 | 0.031 | 0.031 | 0.031 | 0.031 |
| 62 | m | 0.031 | 0.031 | 0.031 | 0.031 | 0.031 | 0.031 | 0.031 | 0.031 | 0.031 | 0.031 | 0.031 | 0.031 |
| 62 | f-vf | 0.031 | 0.031 | 0.031 | 0.031 | 0.031 | 0.031 | 0.031 | 0.031 | 0.031 | 0.031 | 0.031 | 0.031 |
| 63 | vc-c | 0.031 | 0.031 | 0.031 | 0.031 | 0.031 | 0.031 | 0.031 | 0.031 | 0.031 | 0.031 | 0.031 | 0.031 |
| 63 | m | 0.031 | 0.031 | 0.031 | 0.031 | 0.031 | 0.031 | 0.031 | 0.031 | 0.031 | 0.031 | 0.031 | 0.031 |
| 63 | f-vf | 0.031 | 0.031 | 0.031 | 0.031 | 0.031 | 0.031 | 0.031 | 0.031 | 0.031 | 0.031 | 0.031 | 0.031 |
| 64 | vc-c | 0.031 | 0.031 | 0.031 | 0.031 | 0.031 | 0.031 | 0.031 | 0.031 | 0.031 | 0.031 | 0.031 | 0.031 |
| 64 | m | 0.031 | 0.031 | 0.031 | 0.031 | 0.031 | 0.031 | 0.031 | 0.031 | 0.031 | 0.031 | 0.031 | 0.031 |
| 64 | f-vf | 0.031 | 0.031 | 0.031 | 0.031 | 0.031 | 0.031 | 0.031 | 0.031 | 0.031 | 0.031 | 0.031 | 0.031 |

TABLE C34.1.1

Probability table for Node FSAMP

| Modified | | Final SAMP Sand | | | | | | | | | |
|---|---|---|---|---|---|---|---|---|---|---|---|
| SAMP | GGS | 2 | 4 | 7 | 8 | 11 | 12 | 13 | 18 | 24 | 25 |
| 2 | vc-c | 0.038 | 0.038 | 0.038 | 0.038 | 0.038 | 0.038 | 0.038 | 0.038 | 0.038 | 0.038 |
| 2 | m | 0.038 | 0.038 | 0.038 | 0.038 | 0.038 | 0.038 | 0.038 | 0.038 | 0.038 | 0.038 |
| 2 | f-vf | 0.038 | 0.038 | 0.038 | 0.038 | 0.038 | 0.038 | 0.038 | 0.038 | 0.038 | 0.038 |
| 4 | vc-c | 0.038 | 0.038 | 0.038 | 0.038 | 0.038 | 0.038 | 0.038 | 0.038 | 0.038 | 0.038 |
| 4 | m | 0.038 | 0.038 | 0.038 | 0.038 | 0.038 | 0.038 | 0.038 | 0.038 | 0.038 | 0.038 |
| 4 | f-vf | 0.038 | 0.038 | 0.038 | 0.038 | 0.038 | 0.038 | 0.038 | 0.038 | 0.038 | 0.038 |
| 7 | vc-c | 0.038 | 0.038 | 0.038 | 0.038 | 0.038 | 0.038 | 0.038 | 0.038 | 0.038 | 0.038 |
| 7 | m | 0.038 | 0.038 | 0.038 | 0.038 | 0.038 | 0.038 | 0.038 | 0.038 | 0.038 | 0.038 |
| 7 | f-vf | 0.038 | 0.038 | 0.038 | 0.038 | 0.038 | 0.038 | 0.038 | 0.038 | 0.038 | 0.038 |
| 8 | vc-c | 0.038 | 0.038 | 0.038 | 0.038 | 0.038 | 0.038 | 0.038 | 0.038 | 0.038 | 0.038 |
| 8 | m | 0.038 | 0.038 | 0.038 | 0.038 | 0.038 | 0.038 | 0.038 | 0.038 | 0.038 | 0.038 |
| 8 | f-vf | 0.038 | 0.038 | 0.038 | 0.038 | 0.038 | 0.038 | 0.038 | 0.038 | 0.038 | 0.038 |
| 11 | vc-c | 0.038 | 0.038 | 0.038 | 0.038 | 0.038 | 0.038 | 0.038 | 0.038 | 0.038 | 0.038 |
| 11 | m | 0.038 | 0.038 | 0.038 | 0.038 | 0.038 | 0.038 | 0.038 | 0.038 | 0.038 | 0.038 |
| 11 | f-vf | 0.038 | 0.038 | 0.038 | 0.038 | 0.038 | 0.038 | 0.038 | 0.038 | 0.038 | 0.038 |
| 12 | vc-c | 0.038 | 0.038 | 0.038 | 0.038 | 0.038 | 0.038 | 0.038 | 0.038 | 0.038 | 0.038 |
| 12 | m | 0.038 | 0.038 | 0.038 | 0.038 | 0.038 | 0.038 | 0.038 | 0.038 | 0.038 | 0.038 |
| 12 | f-vf | 0.038 | 0.038 | 0.038 | 0.038 | 0.038 | 0.038 | 0.038 | 0.038 | 0.038 | 0.038 |
| 13 | vc-c | 0.038 | 0.038 | 0.038 | 0.038 | 0.038 | 0.038 | 0.038 | 0.038 | 0.038 | 0.038 |
| 13 | m | 0.038 | 0.038 | 0.038 | 0.038 | 0.038 | 0.038 | 0.038 | 0.038 | 0.038 | 0.038 |
| 13 | f-vf | 0.038 | 0.038 | 0.038 | 0.038 | 0.038 | 0.038 | 0.038 | 0.038 | 0.038 | 0.038 |
| 18 | vc-c | 0.038 | 0.038 | 0.038 | 0.038 | 0.038 | 0.038 | 0.038 | 0.038 | 0.038 | 0.038 |
| 18 | m | 0.038 | 0.038 | 0.038 | 0.038 | 0.038 | 0.038 | 0.038 | 0.038 | 0.038 | 0.038 |
| 18 | f-vf | 0.038 | 0.038 | 0.038 | 0.038 | 0.038 | 0.038 | 0.038 | 0.038 | 0.038 | 0.038 |
| 24 | vc-c | 0.038 | 0.038 | 0.038 | 0.038 | 0.038 | 0.038 | 0.038 | 0.038 | 0.038 | 0.038 |
| 24 | m | 0.038 | 0.038 | 0.038 | 0.038 | 0.038 | 0.038 | 0.038 | 0.038 | 0.038 | 0.038 |
| 24 | f-vf | 0.038 | 0.038 | 0.038 | 0.038 | 0.038 | 0.038 | 0.038 | 0.038 | 0.038 | 0.038 |
| 25 | vc-c | 0.038 | 0.038 | 0.038 | 0.038 | 0.038 | 0.038 | 0.038 | 0.038 | 0.038 | 0.038 |
| 25 | m | 0.038 | 0.038 | 0.038 | 0.038 | 0.038 | 0.038 | 0.038 | 0.038 | 0.038 | 0.038 |
| 25 | f-vf | 0.038 | 0.038 | 0.038 | 0.038 | 0.038 | 0.038 | 0.038 | 0.038 | 0.038 | 0.038 |
| 26 | vc-c | 0.038 | 0.038 | 0.038 | 0.038 | 0.038 | 0.038 | 0.038 | 0.038 | 0.038 | 0.038 |
| 26 | m | 0.038 | 0.038 | 0.038 | 0.038 | 0.038 | 0.038 | 0.038 | 0.038 | 0.038 | 0.038 |
| 26 | f-vf | 0.038 | 0.038 | 0.038 | 0.038 | 0.038 | 0.038 | 0.038 | 0.038 | 0.038 | 0.038 |
| 27 | vc-c | 0.038 | 0.038 | 0.038 | 0.038 | 0.038 | 0.038 | 0.038 | 0.038 | 0.038 | 0.038 |
| 27 | m | 0.038 | 0.038 | 0.038 | 0.038 | 0.038 | 0.038 | 0.038 | 0.038 | 0.038 | 0.038 |
| 27 | f-vf | 0.038 | 0.038 | 0.038 | 0.038 | 0.038 | 0.038 | 0.038 | 0.038 | 0.038 | 0.038 |

| Modified | Final SAMP Sand | | | | | | | | | |
|---|---|---|---|---|---|---|---|---|---|---|
| SAMP | 26 | 27 | 31 | 32 | 33 | 34 | 35 | 39 | 41 | 42 |
| 2 | 0.038 | 0.038 | 0.038 | 0.038 | 0.038 | 0.038 | 0.038 | 0.038 | 0.038 | 0.038 |
| 2 | 0.038 | 0.038 | 0.038 | 0.038 | 0.038 | 0.038 | 0.038 | 0.038 | 0.038 | 0.038 |
| 2 | 0.038 | 0.038 | 0.038 | 0.038 | 0.038 | 0.038 | 0.038 | 0.038 | 0.038 | 0.038 |
| 4 | 0.038 | 0.038 | 0.038 | 0.038 | 0.038 | 0.038 | 0.038 | 0.038 | 0.038 | 0.038 |
| 4 | 0.038 | 0.038 | 0.038 | 0.038 | 0.038 | 0.038 | 0.038 | 0.038 | 0.038 | 0.038 |
| 4 | 0.038 | 0.038 | 0.038 | 0.038 | 0.038 | 0.038 | 0.038 | 0.038 | 0.038 | 0.038 |
| 7 | 0.038 | 0.038 | 0.038 | 0.038 | 0.038 | 0.038 | 0.038 | 0.038 | 0.038 | 0.038 |
| 7 | 0.038 | 0.038 | 0.038 | 0.038 | 0.038 | 0.038 | 0.038 | 0.038 | 0.038 | 0.038 |
| 7 | 0.038 | 0.038 | 0.038 | 0.038 | 0.038 | 0.038 | 0.038 | 0.038 | 0.038 | 0.038 |
| 8 | 0.038 | 0.038 | 0.038 | 0.038 | 0.038 | 0.038 | 0.038 | 0.038 | 0.038 | 0.038 |
| 8 | 0.038 | 0.038 | 0.038 | 0.038 | 0.038 | 0.038 | 0.038 | 0.038 | 0.038 | 0.038 |
| 8 | 0.038 | 0.038 | 0.038 | 0.038 | 0.038 | 0.038 | 0.038 | 0.038 | 0.038 | 0.038 |
| 11 | 0.038 | 0.038 | 0.038 | 0.038 | 0.038 | 0.038 | 0.038 | 0.038 | 0.038 | 0.038 |
| 11 | 0.038 | 0.038 | 0.038 | 0.038 | 0.038 | 0.038 | 0.038 | 0.038 | 0.038 | 0.038 |
| 11 | 0.038 | 0.038 | 0.038 | 0.038 | 0.038 | 0.038 | 0.038 | 0.038 | 0.038 | 0.038 |
| 12 | 0.038 | 0.038 | 0.038 | 0.038 | 0.038 | 0.038 | 0.038 | 0.038 | 0.038 | 0.038 |
| 12 | 0.038 | 0.038 | 0.038 | 0.038 | 0.038 | 0.038 | 0.038 | 0.038 | 0.038 | 0.038 |
| 12 | 0.038 | 0.038 | 0.038 | 0.038 | 0.038 | 0.038 | 0.038 | 0.038 | 0.038 | 0.038 |
| 13 | 0.038 | 0.038 | 0.038 | 0.038 | 0.038 | 0.038 | 0.038 | 0.038 | 0.038 | 0.038 |
| 13 | 0.038 | 0.038 | 0.038 | 0.038 | 0.038 | 0.038 | 0.038 | 0.038 | 0.038 | 0.038 |
| 13 | 0.038 | 0.038 | 0.038 | 0.038 | 0.038 | 0.038 | 0.038 | 0.038 | 0.038 | 0.038 |
| 18 | 0.038 | 0.038 | 0.038 | 0.038 | 0.038 | 0.038 | 0.038 | 0.038 | 0.038 | 0.038 |
| 18 | 0.038 | 0.038 | 0.038 | 0.038 | 0.038 | 0.038 | 0.038 | 0.038 | 0.038 | 0.038 |
| 18 | 0.038 | 0.038 | 0.038 | 0.038 | 0.038 | 0.038 | 0.038 | 0.038 | 0.038 | 0.038 |
| 24 | 0.038 | 0.038 | 0.038 | 0.038 | 0.038 | 0.038 | 0.038 | 0.038 | 0.038 | 0.038 |
| 24 | 0.038 | 0.038 | 0.038 | 0.038 | 0.038 | 0.038 | 0.038 | 0.038 | 0.038 | 0.038 |
| 24 | 0.038 | 0.038 | 0.038 | 0.038 | 0.038 | 0.038 | 0.038 | 0.038 | 0.038 | 0.038 |
| 25 | 0.038 | 0.038 | 0.038 | 0.038 | 0.038 | 0.038 | 0.038 | 0.038 | 0.038 | 0.038 |
| 25 | 0.038 | 0.038 | 0.038 | 0.038 | 0.038 | 0.038 | 0.038 | 0.038 | 0.038 | 0.038 |
| 25 | 0.038 | 0.038 | 0.038 | 0.038 | 0.038 | 0.038 | 0.038 | 0.038 | 0.038 | 0.038 |
| 26 | 0.038 | 0.038 | 0.038 | 0.038 | 0.038 | 0.038 | 0.038 | 0.038 | 0.038 | 0.038 |
| 26 | 0.038 | 0.038 | 0.038 | 0.038 | 0.038 | 0.038 | 0.038 | 0.038 | 0.038 | 0.038 |

TABLE C34.1.1-continued

| Probability table for Node FSAMP | | | | | | | | | | |
|---|---|---|---|---|---|---|---|---|---|---|
| 26 | 0.038 | 0.038 | 0.038 | 0.038 | 0.038 | 0.038 | 0.038 | 0.038 | 0.038 | 0.038 |
| 27 | 0.038 | 0.038 | 0.038 | 0.038 | 0.038 | 0.038 | 0.038 | 0.038 | 0.038 | 0.038 |
| 27 | 0.038 | 0.038 | 0.038 | 0.038 | 0.038 | 0.038 | 0.038 | 0.038 | 0.038 | 0.038 |
| 27 | 0.038 | 0.038 | 0.038 | 0.038 | 0.038 | 0.038 | 0.038 | 0.038 | 0.038 | 0.038 |

TABLE C34.1.2

Probability table for Node FSAMP

| Modified | | Final SAMP Sand | | | | | | | | | |
|---|---|---|---|---|---|---|---|---|---|---|---|
| SAMP | GGS | 2 | 4 | 7 | 8 | 11 | 12 | 13 | 18 | 24 | 25 |
| 31 | vc-c | 0.038 | 0.038 | 0.038 | 0.038 | 0.038 | 0.038 | 0.038 | 0.038 | 0.038 | 0.038 |
| 31 | m | 0.038 | 0.038 | 0.038 | 0.038 | 0.038 | 0.038 | 0.038 | 0.038 | 0.038 | 0.038 |
| 31 | f-vf | 0.038 | 0.038 | 0.038 | 0.038 | 0.038 | 0.038 | 0.038 | 0.038 | 0.038 | 0.038 |
| 32 | vc-c | 0.038 | 0.038 | 0.038 | 0.038 | 0.038 | 0.038 | 0.038 | 0.038 | 0.038 | 0.038 |
| 32 | m | 0.038 | 0.038 | 0.038 | 0.038 | 0.038 | 0.038 | 0.038 | 0.038 | 0.038 | 0.038 |
| 32 | f-vf | 0.038 | 0.038 | 0.038 | 0.038 | 0.038 | 0.038 | 0.038 | 0.038 | 0.038 | 0.038 |
| 33 | vc-c | 0.038 | 0.038 | 0.038 | 0.038 | 0.038 | 0.038 | 0.038 | 0.038 | 0.038 | 0.038 |
| 33 | m | 0.038 | 0.038 | 0.038 | 0.038 | 0.038 | 0.038 | 0.038 | 0.038 | 0.038 | 0.038 |
| 33 | f-vf | 0.038 | 0.038 | 0.038 | 0.038 | 0.038 | 0.038 | 0.038 | 0.038 | 0.038 | 0.038 |
| 34 | vc-c | 0.038 | 0.038 | 0.038 | 0.038 | 0.038 | 0.038 | 0.038 | 0.038 | 0.038 | 0.038 |
| 34 | m | 0.038 | 0.038 | 0.038 | 0.038 | 0.038 | 0.038 | 0.038 | 0.038 | 0.038 | 0.038 |
| 34 | f-vf | 0.038 | 0.038 | 0.038 | 0.038 | 0.038 | 0.038 | 0.038 | 0.038 | 0.038 | 0.038 |
| 35 | vc-c | 0.038 | 0.038 | 0.038 | 0.038 | 0.038 | 0.038 | 0.038 | 0.038 | 0.038 | 0.038 |
| 35 | m | 0.038 | 0.038 | 0.038 | 0.038 | 0.038 | 0.038 | 0.038 | 0.038 | 0.038 | 0.038 |
| 35 | f-vf | 0.038 | 0.038 | 0.038 | 0.038 | 0.038 | 0.038 | 0.038 | 0.038 | 0.038 | 0.038 |
| 39 | vc-c | 0.038 | 0.038 | 0.038 | 0.038 | 0.038 | 0.038 | 0.038 | 0.038 | 0.038 | 0.038 |
| 39 | m | 0.038 | 0.038 | 0.038 | 0.038 | 0.038 | 0.038 | 0.038 | 0.038 | 0.038 | 0.038 |
| 39 | f-vf | 0.038 | 0.038 | 0.038 | 0.038 | 0.038 | 0.038 | 0.038 | 0.038 | 0.038 | 0.038 |
| 41 | vc-c | 0.038 | 0.038 | 0.038 | 0.038 | 0.038 | 0.038 | 0.038 | 0.038 | 0.038 | 0.038 |
| 41 | m | 0.038 | 0.038 | 0.038 | 0.038 | 0.038 | 0.038 | 0.038 | 0.038 | 0.038 | 0.038 |
| 41 | f-vf | 0.038 | 0.038 | 0.038 | 0.038 | 0.038 | 0.038 | 0.038 | 0.038 | 0.038 | 0.038 |
| 42 | vc-c | 0.038 | 0.038 | 0.038 | 0.038 | 0.038 | 0.038 | 0.038 | 0.038 | 0.038 | 0.038 |
| 42 | m | 0.038 | 0.038 | 0.038 | 0.038 | 0.038 | 0.038 | 0.038 | 0.038 | 0.038 | 0.038 |
| 42 | f-vf | 0.038 | 0.038 | 0.038 | 0.038 | 0.038 | 0.038 | 0.038 | 0.038 | 0.038 | 0.038 |
| 43 | vc-c | 0.038 | 0.038 | 0.038 | 0.038 | 0.038 | 0.038 | 0.038 | 0.038 | 0.038 | 0.038 |
| 43 | m | 0.038 | 0.038 | 0.038 | 0.038 | 0.038 | 0.038 | 0.038 | 0.038 | 0.038 | 0.038 |
| 43 | f-vf | 0.038 | 0.038 | 0.038 | 0.038 | 0.038 | 0.038 | 0.038 | 0.038 | 0.038 | 0.038 |
| 49 | vc-c | 0.038 | 0.038 | 0.038 | 0.038 | 0.038 | 0.038 | 0.038 | 0.038 | 0.038 | 0.038 |
| 49 | m | 0.038 | 0.038 | 0.038 | 0.038 | 0.038 | 0.038 | 0.038 | 0.038 | 0.038 | 0.038 |
| 49 | f-vf | 0.038 | 0.038 | 0.038 | 0.038 | 0.038 | 0.038 | 0.038 | 0.038 | 0.038 | 0.038 |
| 50 | vc-c | 0.038 | 0.038 | 0.038 | 0.038 | 0.038 | 0.038 | 0.038 | 0.038 | 0.038 | 0.038 |
| 50 | m | 0.038 | 0.038 | 0.038 | 0.038 | 0.038 | 0.038 | 0.038 | 0.038 | 0.038 | 0.038 |
| 50 | f-vf | 0.038 | 0.038 | 0.038 | 0.038 | 0.038 | 0.038 | 0.038 | 0.038 | 0.038 | 0.038 |
| 51 | vc-c | 0.038 | 0.038 | 0.038 | 0.038 | 0.038 | 0.038 | 0.038 | 0.038 | 0.038 | 0.038 |
| 51 | m | 0.038 | 0.038 | 0.038 | 0.038 | 0.038 | 0.038 | 0.038 | 0.038 | 0.038 | 0.038 |
| 51 | f-vf | 0.038 | 0.038 | 0.038 | 0.038 | 0.038 | 0.038 | 0.038 | 0.038 | 0.038 | 0.038 |

| Modified | Final SAMP Sand | | | | | | | | | |
|---|---|---|---|---|---|---|---|---|---|---|
| SAMP | 26 | 27 | 31 | 32 | 33 | 34 | 35 | 39 | 41 | 42 |
| 31 | 0.038 | 0.038 | 0.038 | 0.038 | 0.038 | 0.038 | 0.038 | 0.038 | 0.038 | 0.038 |
| 31 | 0.038 | 0.038 | 0.038 | 0.038 | 0.038 | 0.038 | 0.038 | 0.038 | 0.038 | 0.038 |
| 31 | 0.038 | 0.038 | 0.038 | 0.038 | 0.038 | 0.038 | 0.038 | 0.038 | 0.038 | 0.038 |
| 32 | 0.038 | 0.038 | 0.038 | 0.038 | 0.038 | 0.038 | 0.038 | 0.038 | 0.038 | 0.038 |
| 32 | 0.038 | 0.038 | 0.038 | 0.038 | 0.038 | 0.038 | 0.038 | 0.038 | 0.038 | 0.038 |
| 32 | 0.038 | 0.038 | 0.038 | 0.038 | 0.038 | 0.038 | 0.038 | 0.038 | 0.038 | 0.038 |
| 33 | 0.038 | 0.038 | 0.038 | 0.038 | 0.038 | 0.038 | 0.038 | 0.038 | 0.038 | 0.038 |
| 33 | 0.038 | 0.038 | 0.038 | 0.038 | 0.038 | 0.038 | 0.038 | 0.038 | 0.038 | 0.038 |
| 33 | 0.038 | 0.038 | 0.038 | 0.038 | 0.038 | 0.038 | 0.038 | 0.038 | 0.038 | 0.038 |
| 34 | 0.038 | 0.038 | 0.038 | 0.038 | 0.038 | 0.038 | 0.038 | 0.038 | 0.038 | 0.038 |
| 34 | 0.038 | 0.038 | 0.038 | 0.038 | 0.038 | 0.038 | 0.038 | 0.038 | 0.038 | 0.038 |
| 34 | 0.038 | 0.038 | 0.038 | 0.038 | 0.038 | 0.038 | 0.038 | 0.038 | 0.038 | 0.038 |
| 35 | 0.038 | 0.038 | 0.038 | 0.038 | 0.038 | 0.038 | 0.038 | 0.038 | 0.038 | 0.038 |
| 35 | 0.038 | 0.038 | 0.038 | 0.038 | 0.038 | 0.038 | 0.038 | 0.038 | 0.038 | 0.038 |
| 35 | 0.038 | 0.038 | 0.038 | 0.038 | 0.038 | 0.038 | 0.038 | 0.038 | 0.038 | 0.038 |
| 39 | 0.038 | 0.038 | 0.038 | 0.038 | 0.038 | 0.038 | 0.038 | 0.038 | 0.038 | 0.038 |
| 39 | 0.038 | 0.038 | 0.038 | 0.038 | 0.038 | 0.038 | 0.038 | 0.038 | 0.038 | 0.038 |
| 39 | 0.038 | 0.038 | 0.038 | 0.038 | 0.038 | 0.038 | 0.038 | 0.038 | 0.038 | 0.038 |
| 41 | 0.038 | 0.038 | 0.038 | 0.038 | 0.038 | 0.038 | 0.038 | 0.038 | 0.038 | 0.038 |
| 41 | 0.038 | 0.038 | 0.038 | 0.038 | 0.038 | 0.038 | 0.038 | 0.038 | 0.038 | 0.038 |

TABLE C34.1.2-continued

Probability table for Node FSAMP

| | | | | | | | | | | |
|---|---|---|---|---|---|---|---|---|---|---|
| 41 | 0.038 | 0.038 | 0.038 | 0.038 | 0.038 | 0.038 | 0.038 | 0.038 | 0.038 | 0.038 |
| 42 | 0.038 | 0.038 | 0.038 | 0.038 | 0.038 | 0.038 | 0.038 | 0.038 | 0.038 | 0.038 |
| 42 | 0.038 | 0.038 | 0.038 | 0.038 | 0.038 | 0.038 | 0.038 | 0.038 | 0.038 | 0.038 |
| 42 | 0.038 | 0.038 | 0.038 | 0.038 | 0.038 | 0.038 | 0.038 | 0.038 | 0.038 | 0.038 |
| 43 | 0.038 | 0.038 | 0.038 | 0.038 | 0.038 | 0.038 | 0.038 | 0.038 | 0.038 | 0.038 |
| 43 | 0.038 | 0.038 | 0.038 | 0.038 | 0.038 | 0.038 | 0.038 | 0.038 | 0.038 | 0.038 |
| 43 | 0.038 | 0.038 | 0.038 | 0.038 | 0.038 | 0.038 | 0.038 | 0.038 | 0.038 | 0.038 |
| 49 | 0.038 | 0.038 | 0.038 | 0.038 | 0.038 | 0.038 | 0.038 | 0.038 | 0.038 | 0.038 |
| 49 | 0.038 | 0.038 | 0.038 | 0.038 | 0.038 | 0.038 | 0.038 | 0.038 | 0.038 | 0.038 |
| 49 | 0.038 | 0.038 | 0.038 | 0.038 | 0.038 | 0.038 | 0.038 | 0.038 | 0.038 | 0.038 |
| 50 | 0.038 | 0.038 | 0.038 | 0.038 | 0.038 | 0.038 | 0.038 | 0.038 | 0.038 | 0.038 |
| 50 | 0.038 | 0.038 | 0.038 | 0.038 | 0.038 | 0.038 | 0.038 | 0.038 | 0.038 | 0.038 |
| 50 | 0.038 | 0.038 | 0.038 | 0.038 | 0.038 | 0.038 | 0.038 | 0.038 | 0.038 | 0.038 |
| 51 | 0.038 | 0.038 | 0.038 | 0.038 | 0.038 | 0.038 | 0.038 | 0.038 | 0.038 | 0.038 |
| 51 | 0.038 | 0.038 | 0.038 | 0.038 | 0.038 | 0.038 | 0.038 | 0.038 | 0.038 | 0.038 |
| 51 | 0.038 | 0.038 | 0.038 | 0.038 | 0.038 | 0.038 | 0.038 | 0.038 | 0.038 | 0.038 |

TABLE C34.1.3

Probability table for Node FSAMP

| Modified | | Final SAMP Sand | | | | | | | | | |
|---|---|---|---|---|---|---|---|---|---|---|---|
| SAMP | GGS | 2 | 4 | 7 | 8 | 11 | 12 | 13 | 18 | 24 | 25 |
| 52 | vc-c | 0.038 | 0.038 | 0.038 | 0.038 | 0.038 | 0.038 | 0.038 | 0.038 | 0.038 | 0.038 |
| 52 | m | 0.038 | 0.038 | 0.038 | 0.038 | 0.038 | 0.038 | 0.038 | 0.038 | 0.038 | 0.038 |
| 52 | f-vf | 0.038 | 0.038 | 0.038 | 0.038 | 0.038 | 0.038 | 0.038 | 0.038 | 0.038 | 0.038 |
| 62 | vc-c | 0.038 | 0.038 | 0.038 | 0.038 | 0.038 | 0.038 | 0.038 | 0.038 | 0.038 | 0.038 |
| 62 | m | 0.038 | 0.038 | 0.038 | 0.038 | 0.038 | 0.038 | 0.038 | 0.038 | 0.038 | 0.038 |
| 62 | f-vf | 0.038 | 0.038 | 0.038 | 0.038 | 0.038 | 0.038 | 0.038 | 0.038 | 0.038 | 0.038 |

| Modified | Final SAMP Sand | | | | | | | | | |
|---|---|---|---|---|---|---|---|---|---|---|
| SAMP | 26 | 27 | 31 | 32 | 33 | 34 | 35 | 39 | 41 | 42 |
| 52 | 0.038 | 0.038 | 0.038 | 0.038 | 0.038 | 0.038 | 0.038 | 0.038 | 0.038 | 0.038 |
| 52 | 0.038 | 0.038 | 0.038 | 0.038 | 0.038 | 0.038 | 0.038 | 0.038 | 0.038 | 0.038 |
| 52 | 0.038 | 0.038 | 0.038 | 0.038 | 0.038 | 0.038 | 0.038 | 0.038 | 0.038 | 0.038 |
| 62 | 0.038 | 0.038 | 0.038 | 0.038 | 0.038 | 0.038 | 0.038 | 0.038 | 0.038 | 0.038 |
| 62 | 0.038 | 0.038 | 0.038 | 0.038 | 0.038 | 0.038 | 0.038 | 0.038 | 0.038 | 0.038 |
| 62 | 0.038 | 0.038 | 0.038 | 0.038 | 0.038 | 0.038 | 0.038 | 0.038 | 0.038 | 0.038 |

TABLE C34.2.1

Probability table for Node FSAMP

| Modified | | Final SAMP Sand | | | | | |
|---|---|---|---|---|---|---|---|
| SAMP | GGS | 43 | 49 | 50 | 51 | 52 | 62 |
| 2 | vc-c | 0.038 | 0.038 | 0.038 | 0.038 | 0.038 | 0.038 |
| 2 | m | 0.038 | 0.038 | 0.038 | 0.038 | 0.038 | 0.038 |
| 2 | f-vf | 0.038 | 0.038 | 0.038 | 0.038 | 0.038 | 0.038 |
| 4 | vc-c | 0.038 | 0.038 | 0.038 | 0.038 | 0.038 | 0.038 |
| 4 | m | 0.038 | 0.038 | 0.038 | 0.038 | 0.038 | 0.038 |
| 4 | f-vf | 0.038 | 0.038 | 0.038 | 0.038 | 0.038 | 0.038 |
| 7 | vc-c | 0.038 | 0.038 | 0.038 | 0.038 | 0.038 | 0.038 |
| 7 | m | 0.038 | 0.038 | 0.038 | 0.038 | 0.038 | 0.038 |
| 7 | f-vf | 0.038 | 0.038 | 0.038 | 0.038 | 0.038 | 0.038 |
| 8 | vc-c | 0.038 | 0.038 | 0.038 | 0.038 | 0.038 | 0.038 |
| 8 | m | 0.038 | 0.038 | 0.038 | 0.038 | 0.038 | 0.038 |
| 8 | f-vf | 0.038 | 0.038 | 0.038 | 0.038 | 0.038 | 0.038 |
| 11 | vc-c | 0.038 | 0.038 | 0.038 | 0.038 | 0.038 | 0.038 |
| 11 | m | 0.038 | 0.038 | 0.038 | 0.038 | 0.038 | 0.038 |
| 11 | f-vf | 0.038 | 0.038 | 0.038 | 0.038 | 0.038 | 0.038 |
| 12 | vc-c | 0.038 | 0.038 | 0.038 | 0.038 | 0.038 | 0.038 |
| 12 | m | 0.038 | 0.038 | 0.038 | 0.038 | 0.038 | 0.038 |
| 12 | f-vf | 0.038 | 0.038 | 0.038 | 0.038 | 0.038 | 0.038 |
| 13 | vc-c | 0.038 | 0.038 | 0.038 | 0.038 | 0.038 | 0.038 |
| 13 | m | 0.038 | 0.038 | 0.038 | 0.038 | 0.038 | 0.038 |

TABLE C34.2.1-continued

Probability table for Node FSAMP

| Modified | | Final SAMP Sand | | | | | |
|---|---|---|---|---|---|---|---|
| SAMP | GGS | 43 | 49 | 50 | 51 | 52 | 62 |
| 13 | f-vf | 0.038 | 0.038 | 0.038 | 0.038 | 0.038 | 0.038 |
| 18 | vc-c | 0.038 | 0.038 | 0.038 | 0.038 | 0.038 | 0.038 |
| 18 | m | 0.038 | 0.038 | 0.038 | 0.038 | 0.038 | 0.038 |
| 18 | f-vf | 0.038 | 0.038 | 0.038 | 0.038 | 0.038 | 0.038 |
| 24 | vc-c | 0.038 | 0.038 | 0.038 | 0.038 | 0.038 | 0.038 |
| 24 | m | 0.038 | 0.038 | 0.038 | 0.038 | 0.038 | 0.038 |
| 24 | f-vf | 0.038 | 0.038 | 0.038 | 0.038 | 0.038 | 0.038 |
| 25 | vc-c | 0.038 | 0.038 | 0.038 | 0.038 | 0.038 | 0.038 |
| 25 | m | 0.038 | 0.038 | 0.038 | 0.038 | 0.038 | 0.038 |
| 25 | f-vf | 0.038 | 0.038 | 0.038 | 0.038 | 0.038 | 0.038 |
| 26 | vc-c | 0.038 | 0.038 | 0.038 | 0.038 | 0.038 | 0.038 |
| 26 | m | 0.038 | 0.038 | 0.038 | 0.038 | 0.038 | 0.038 |
| 26 | f-vf | 0.038 | 0.038 | 0.038 | 0.038 | 0.038 | 0.038 |
| 27 | vc-c | 0.038 | 0.038 | 0.038 | 0.038 | 0.038 | 0.038 |
| 27 | m | 0.038 | 0.038 | 0.038 | 0.038 | 0.038 | 0.038 |
| 27 | f-vf | 0.038 | 0.038 | 0.038 | 0.038 | 0.038 | 0.038 |

TABLE C34.2.2

Probability table for Node FSAMP

| Modified | | Final SAMP Sand | | | | | |
|---|---|---|---|---|---|---|---|
| SAMP | GGS | 43 | 49 | 50 | 51 | 52 | 62 |
| 31 | vc-c | 0.038 | 0.038 | 0.038 | 0.038 | 0.038 | 0.038 |
| 31 | m | 0.038 | 0.038 | 0.038 | 0.038 | 0.038 | 0.038 |
| 31 | f-vf | 0.038 | 0.038 | 0.038 | 0.038 | 0.038 | 0.038 |
| 32 | vc-c | 0.038 | 0.038 | 0.038 | 0.038 | 0.038 | 0.038 |
| 32 | m | 0.038 | 0.038 | 0.038 | 0.038 | 0.038 | 0.038 |
| 32 | f-vf | 0.038 | 0.038 | 0.038 | 0.038 | 0.038 | 0.038 |
| 33 | vc-c | 0.038 | 0.038 | 0.038 | 0.038 | 0.038 | 0.038 |
| 33 | m | 0.038 | 0.038 | 0.038 | 0.038 | 0.038 | 0.038 |
| 33 | f-vf | 0.038 | 0.038 | 0.038 | 0.038 | 0.038 | 0.038 |
| 34 | vc-c | 0.038 | 0.038 | 0.038 | 0.038 | 0.038 | 0.038 |
| 34 | m | 0.038 | 0.038 | 0.038 | 0.038 | 0.038 | 0.038 |
| 34 | f-vf | 0.038 | 0.038 | 0.038 | 0.038 | 0.038 | 0.038 |
| 35 | vc-c | 0.038 | 0.038 | 0.038 | 0.038 | 0.038 | 0.038 |
| 35 | m | 0.038 | 0.038 | 0.038 | 0.038 | 0.038 | 0.038 |
| 35 | f-vf | 0.038 | 0.038 | 0.038 | 0.038 | 0.038 | 0.038 |
| 39 | vc-c | 0.038 | 0.038 | 0.038 | 0.038 | 0.038 | 0.038 |
| 39 | m | 0.038 | 0.038 | 0.038 | 0.038 | 0.038 | 0.038 |
| 39 | f-vf | 0.038 | 0.038 | 0.038 | 0.038 | 0.038 | 0.038 |
| 41 | vc-c | 0.038 | 0.038 | 0.038 | 0.038 | 0.038 | 0.038 |
| 41 | m | 0.038 | 0.038 | 0.038 | 0.038 | 0.038 | 0.038 |
| 41 | f-vf | 0.038 | 0.038 | 0.038 | 0.038 | 0.038 | 0.038 |
| 42 | vc-c | 0.038 | 0.038 | 0.038 | 0.038 | 0.038 | 0.038 |
| 42 | m | 0.038 | 0.038 | 0.038 | 0.038 | 0.038 | 0.038 |
| 42 | f-vf | 0.038 | 0.038 | 0.038 | 0.038 | 0.038 | 0.038 |
| 43 | vc-c | 0.038 | 0.038 | 0.038 | 0.038 | 0.038 | 0.038 |
| 43 | m | 0.038 | 0.038 | 0.038 | 0.038 | 0.038 | 0.038 |
| 43 | f-vf | 0.038 | 0.038 | 0.038 | 0.038 | 0.038 | 0.038 |

TABLE C34.2.2-continued

Probability table for Node FSAMP

| Modified | | Final SAMP Sand | | | | | |
|---|---|---|---|---|---|---|---|
| SAMP | GGS | 43 | 49 | 50 | 51 | 52 | 62 |
| 49 | vc-c | 0.038 | 0.038 | 0.038 | 0.038 | 0.038 | 0.038 |
| 49 | m | 0.038 | 0.038 | 0.038 | 0.038 | 0.038 | 0.038 |
| 49 | f-vf | 0.038 | 0.038 | 0.038 | 0.038 | 0.038 | 0.038 |
| 50 | vc-c | 0.038 | 0.038 | 0.038 | 0.038 | 0.038 | 0.038 |
| 50 | m | 0.038 | 0.038 | 0.038 | 0.038 | 0.038 | 0.038 |
| 50 | f-vf | 0.038 | 0.038 | 0.038 | 0.038 | 0.038 | 0.038 |
| 51 | vc-c | 0.038 | 0.038 | 0.038 | 0.038 | 0.038 | 0.038 |
| 51 | m | 0.038 | 0.038 | 0.038 | 0.038 | 0.038 | 0.038 |
| 51 | f-vf | 0.038 | 0.038 | 0.038 | 0.038 | 0.038 | 0.038 |

TABLE C34.2.3

Probability table for Node FSAMP

| Modified | | Final SAMP Sand | | | | | |
|---|---|---|---|---|---|---|---|
| SAMP | GGS | 43 | 49 | 50 | 51 | 52 | 62 |
| 52 | vc-c | 0.038 | 0.038 | 0.038 | 0.038 | 0.038 | 0.038 |
| 52 | m | 0.038 | 0.038 | 0.038 | 0.038 | 0.038 | 0.038 |
| 52 | f-vf | 0.038 | 0.038 | 0.038 | 0.038 | 0.038 | 0.038 |
| 62 | vc-c | 0.038 | 0.038 | 0.038 | 0.038 | 0.038 | 0.038 |
| 62 | m | 0.038 | 0.038 | 0.038 | 0.038 | 0.038 | 0.038 |
| 62 | f-vf | 0.038 | 0.038 | 0.038 | 0.038 | 0.038 | 0.038 |

TABLE C35.1.1

Probability table for Node FSAMV

| Modified | | Final SAMV Sand | | | | | | | | | | | | | | | |
|---|---|---|---|---|---|---|---|---|---|---|---|---|---|---|---|---|---|
| SAM | GGS | 4 | 5 | 7 | 8 | 9 | 11 | 12 | 14 | 17 | 18 | 20 | 23 | 24 | 25 | 31 | 40 |
| 4 | vc-c | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 4 | m | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 4 | f-vf | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 5 | vc-c | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 5 | m | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 5 | f-vf | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 7 | vc-c | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 7 | m | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 7 | f-vf | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 8 | vc-c | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 8 | m | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 8 | f-vf | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 9 | vc-c | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 9 | m | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 9 | f-vf | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 11 | vc-c | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 11 | m | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 11 | f-vf | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 12 | vc-c | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 12 | m | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 12 | f-vf | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 14 | vc-c | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 14 | m | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 14 | f-vf | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 17 | vc-c | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 17 | m | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 17 | f-vf | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 18 | vc-c | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 18 | m | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 18 | f-vf | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 20 | vc-c | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 20 | m | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 20 | f-vf | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 23 | vc-c | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 23 | m | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 23 | f-vf | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |

TABLE C35.1.2

| Probability table for Node FSAMV | | | | | | | | | | | | | | | | | |
|---|---|---|---|---|---|---|---|---|---|---|---|---|---|---|---|---|---|
| Modified | | Final SAMV Sand | | | | | | | | | | | | | | | |
| SAMV | GGS | 4 | 5 | 7 | 8 | 9 | 11 | 12 | 14 | 17 | 18 | 20 | 23 | 24 | 25 | 31 | 40 |
| 24 | vc-c | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 24 | m | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 24 | f-vf | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 25 | vc-c | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 25 | m | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 25 | f-vf | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 31 | vc-c | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 31 | m | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 31 | f-vf | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 40 | vc-c | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 40 | m | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |
| 40 | f-vf | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 | 0.063 |

TABLE C36.1.1

| Probability table for Node FCAMSU | | | | | | | | | | | |
|---|---|---|---|---|---|---|---|---|---|---|---|
| Modified | | Final CAMSU Sand | | | | | | | | | |
| CAMSU | GGS | 1 | 2 | 4 | 5 | 6 | 8 | 9 | 10 | 13 | 14 |
| 1 | vc-c | 0.029 | 0.029 | 0.029 | 0.029 | 0.029 | 0.029 | 0.029 | 0.029 | 0.029 | 0.029 |
| 1 | m | 0.029 | 0.029 | 0.029 | 0.029 | 0.029 | 0.029 | 0.029 | 0.029 | 0.029 | 0.029 |
| 1 | f-vf | 0.029 | 0.029 | 0.029 | 0.029 | 0.029 | 0.029 | 0.029 | 0.029 | 0.029 | 0.029 |
| 2 | vc-c | 0.029 | 0.029 | 0.029 | 0.029 | 0.029 | 0.029 | 0.029 | 0.029 | 0.029 | 0.029 |
| 2 | m | 0.029 | 0.029 | 0.029 | 0.029 | 0.029 | 0.029 | 0.029 | 0.029 | 0.029 | 0.029 |
| 2 | f-vf | 0.029 | 0.029 | 0.029 | 0.029 | 0.029 | 0.029 | 0.029 | 0.029 | 0.029 | 0.029 |
| 4 | vc-c | 0.029 | 0.029 | 0.029 | 0.029 | 0.029 | 0.029 | 0.029 | 0.029 | 0.029 | 0.029 |
| 4 | m | 0.029 | 0.029 | 0.029 | 0.029 | 0.029 | 0.029 | 0.029 | 0.029 | 0.029 | 0.029 |
| 4 | f-vf | 0.029 | 0.029 | 0.029 | 0.029 | 0.029 | 0.029 | 0.029 | 0.029 | 0.029 | 0.029 |
| 5 | vc-c | 0.029 | 0.029 | 0.029 | 0.029 | 0.029 | 0.029 | 0.029 | 0.029 | 0.029 | 0.029 |
| 5 | m | 0.029 | 0.029 | 0.029 | 0.029 | 0.029 | 0.029 | 0.029 | 0.029 | 0.029 | 0.029 |
| 5 | f-vf | 0.029 | 0.029 | 0.029 | 0.029 | 0.029 | 0.029 | 0.029 | 0.029 | 0.029 | 0.029 |
| 6 | vc-c | 0.029 | 0.029 | 0.029 | 0.029 | 0.029 | 0.029 | 0.029 | 0.029 | 0.029 | 0.029 |
| 6 | m | 0.029 | 0.029 | 0.029 | 0.029 | 0.029 | 0.029 | 0.029 | 0.029 | 0.029 | 0.029 |
| 6 | f-vf | 0.029 | 0.029 | 0.029 | 0.029 | 0.029 | 0.029 | 0.029 | 0.029 | 0.029 | 0.029 |
| 8 | vc-c | 0.029 | 0.029 | 0.029 | 0.029 | 0.029 | 0.029 | 0.029 | 0.029 | 0.029 | 0.029 |
| 8 | m | 0.029 | 0.029 | 0.029 | 0.029 | 0.029 | 0.029 | 0.029 | 0.029 | 0.029 | 0.029 |
| 8 | f-vf | 0.029 | 0.029 | 0.029 | 0.029 | 0.029 | 0.029 | 0.029 | 0.029 | 0.029 | 0.029 |
| 9 | vc-c | 0.029 | 0.029 | 0.029 | 0.029 | 0.029 | 0.029 | 0.029 | 0.029 | 0.029 | 0.029 |
| 9 | m | 0.029 | 0.029 | 0.029 | 0.029 | 0.029 | 0.029 | 0.029 | 0.029 | 0.029 | 0.029 |
| 9 | f-vf | 0.029 | 0.029 | 0.029 | 0.029 | 0.029 | 0.029 | 0.029 | 0.029 | 0.029 | 0.029 |
| 10 | vc-c | 0.029 | 0.029 | 0.029 | 0.029 | 0.029 | 0.029 | 0.029 | 0.029 | 0.029 | 0.029 |
| 10 | m | 0.029 | 0.029 | 0.029 | 0.029 | 0.029 | 0.029 | 0.029 | 0.029 | 0.029 | 0.029 |
| 10 | f-vf | 0.029 | 0.029 | 0.029 | 0.029 | 0.029 | 0.029 | 0.029 | 0.029 | 0.029 | 0.029 |
| 13 | vc-c | 0.029 | 0.029 | 0.029 | 0.029 | 0.029 | 0.029 | 0.029 | 0.029 | 0.029 | 0.029 |
| 13 | m | 0.029 | 0.029 | 0.029 | 0.029 | 0.029 | 0.029 | 0.029 | 0.029 | 0.029 | 0.029 |
| 13 | f-vf | 0.029 | 0.029 | 0.029 | 0.029 | 0.029 | 0.029 | 0.029 | 0.029 | 0.029 | 0.029 |
| 14 | vc-c | 0.029 | 0.029 | 0.029 | 0.029 | 0.029 | 0.029 | 0.029 | 0.029 | 0.029 | 0.029 |
| 14 | m | 0.029 | 0.029 | 0.029 | 0.029 | 0.029 | 0.029 | 0.029 | 0.029 | 0.029 | 0.029 |
| 14 | f-vf | 0.029 | 0.029 | 0.029 | 0.029 | 0.029 | 0.029 | 0.029 | 0.029 | 0.029 | 0.029 |
| 15 | vc-c | 0.029 | 0.029 | 0.029 | 0.029 | 0.029 | 0.029 | 0.029 | 0.029 | 0.029 | 0.029 |
| 15 | m | 0.029 | 0.029 | 0.029 | 0.029 | 0.029 | 0.029 | 0.029 | 0.029 | 0.029 | 0.029 |
| 15 | f-vf | 0.029 | 0.029 | 0.029 | 0.029 | 0.029 | 0.029 | 0.029 | 0.029 | 0.029 | 0.029 |
| 18 | vc-c | 0.029 | 0.029 | 0.029 | 0.029 | 0.029 | 0.029 | 0.029 | 0.029 | 0.029 | 0.029 |
| 18 | m | 0.029 | 0.029 | 0.029 | 0.029 | 0.029 | 0.029 | 0.029 | 0.029 | 0.029 | 0.029 |
| 18 | f-vf | 0.029 | 0.029 | 0.029 | 0.029 | 0.029 | 0.029 | 0.029 | 0.029 | 0.029 | 0.029 |

| Modified | Final CAMSU Sand | | | | | | | | | |
|---|---|---|---|---|---|---|---|---|---|---|
| CAMSU | 15 | 18 | 19 | 20 | 21 | 25 | 26 | 27 | 28 | 33 |
| 1 | 0.029 | 0.029 | 0.029 | 0.029 | 0.029 | 0.029 | 0.029 | 0.029 | 0.029 | 0.029 |
| 1 | 0.029 | 0.029 | 0.029 | 0.029 | 0.029 | 0.029 | 0.029 | 0.029 | 0.029 | 0.029 |
| 1 | 0.029 | 0.029 | 0.029 | 0.029 | 0.029 | 0.029 | 0.029 | 0.029 | 0.029 | 0.029 |
| 2 | 0.029 | 0.029 | 0.029 | 0.029 | 0.029 | 0.029 | 0.029 | 0.029 | 0.029 | 0.029 |
| 2 | 0.029 | 0.029 | 0.029 | 0.029 | 0.029 | 0.029 | 0.029 | 0.029 | 0.029 | 0.029 |
| 2 | 0.029 | 0.029 | 0.029 | 0.029 | 0.029 | 0.029 | 0.029 | 0.029 | 0.029 | 0.029 |
| 4 | 0.029 | 0.029 | 0.029 | 0.029 | 0.029 | 0.029 | 0.029 | 0.029 | 0.029 | 0.029 |
| 4 | 0.029 | 0.029 | 0.029 | 0.029 | 0.029 | 0.029 | 0.029 | 0.029 | 0.029 | 0.029 |

TABLE C36.1.1-continued

Probability table for Node FCAMSU

| | | | | | | | | | | |
|---|---|---|---|---|---|---|---|---|---|---|
| 4 | 0.029 | 0.029 | 0.029 | 0.029 | 0.029 | 0.029 | 0.029 | 0.029 | 0.029 | 0.029 |
| 5 | 0.029 | 0.029 | 0.029 | 0.029 | 0.029 | 0.029 | 0.029 | 0.029 | 0.029 | 0.029 |
| 5 | 0.029 | 0.029 | 0.029 | 0.029 | 0.029 | 0.029 | 0.029 | 0.029 | 0.029 | 0.029 |
| 5 | 0.029 | 0.029 | 0.029 | 0.029 | 0.029 | 0.029 | 0.029 | 0.029 | 0.029 | 0.029 |
| 6 | 0.029 | 0.029 | 0.029 | 0.029 | 0.029 | 0.029 | 0.029 | 0.029 | 0.029 | 0.029 |
| 6 | 0.029 | 0.029 | 0.029 | 0.029 | 0.029 | 0.029 | 0.029 | 0.029 | 0.029 | 0.029 |
| 6 | 0.029 | 0.029 | 0.029 | 0.029 | 0.029 | 0.029 | 0.029 | 0.029 | 0.029 | 0.029 |
| 8 | 0.029 | 0.029 | 0.029 | 0.029 | 0.029 | 0.029 | 0.029 | 0.029 | 0.029 | 0.029 |
| 8 | 0.029 | 0.029 | 0.029 | 0.029 | 0.029 | 0.029 | 0.029 | 0.029 | 0.029 | 0.029 |
| 8 | 0.029 | 0.029 | 0.029 | 0.029 | 0.029 | 0.029 | 0.029 | 0.029 | 0.029 | 0.029 |
| 9 | 0.029 | 0.029 | 0.029 | 0.029 | 0.029 | 0.029 | 0.029 | 0.029 | 0.029 | 0.029 |
| 9 | 0.029 | 0.029 | 0.029 | 0.029 | 0.029 | 0.029 | 0.029 | 0.029 | 0.029 | 0.029 |
| 9 | 0.029 | 0.029 | 0.029 | 0.029 | 0.029 | 0.029 | 0.029 | 0.029 | 0.029 | 0.029 |
| 10 | 0.029 | 0.029 | 0.029 | 0.029 | 0.029 | 0.029 | 0.029 | 0.029 | 0.029 | 0.029 |
| 10 | 0.029 | 0.029 | 0.029 | 0.029 | 0.029 | 0.029 | 0.029 | 0.029 | 0.029 | 0.029 |
| 10 | 0.029 | 0.029 | 0.029 | 0.029 | 0.029 | 0.029 | 0.029 | 0.029 | 0.029 | 0.029 |
| 13 | 0.029 | 0.029 | 0.029 | 0.029 | 0.029 | 0.029 | 0.029 | 0.029 | 0.029 | 0.029 |
| 13 | 0.029 | 0.029 | 0.029 | 0.029 | 0.029 | 0.029 | 0.029 | 0.029 | 0.029 | 0.029 |
| 13 | 0.029 | 0.029 | 0.029 | 0.029 | 0.029 | 0.029 | 0.029 | 0.029 | 0.029 | 0.029 |
| 14 | 0.029 | 0.029 | 0.029 | 0.029 | 0.029 | 0.029 | 0.029 | 0.029 | 0.029 | 0.029 |
| 14 | 0.029 | 0.029 | 0.029 | 0.029 | 0.029 | 0.029 | 0.029 | 0.029 | 0.029 | 0.029 |
| 14 | 0.029 | 0.029 | 0.029 | 0.029 | 0.029 | 0.029 | 0.029 | 0.029 | 0.029 | 0.029 |
| 15 | 0.029 | 0.029 | 0.029 | 0.029 | 0.029 | 0.029 | 0.029 | 0.029 | 0.029 | 0.029 |
| 15 | 0.029 | 0.029 | 0.029 | 0.029 | 0.029 | 0.029 | 0.029 | 0.029 | 0.029 | 0.029 |
| 15 | 0.029 | 0.029 | 0.029 | 0.029 | 0.029 | 0.029 | 0.029 | 0.029 | 0.029 | 0.029 |
| 18 | 0.029 | 0.029 | 0.029 | 0.029 | 0.029 | 0.029 | 0.029 | 0.029 | 0.029 | 0.029 |
| 18 | 0.029 | 0.029 | 0.029 | 0.029 | 0.029 | 0.029 | 0.029 | 0.029 | 0.029 | 0.029 |
| 18 | 0.029 | 0.029 | 0.029 | 0.029 | 0.029 | 0.029 | 0.029 | 0.029 | 0.029 | 0.029 |

TABLE C36.1.2

Probability table for Node FCAMSU

| Modified | | Final CAMSU Sand | | | | | | | | | |
|---|---|---|---|---|---|---|---|---|---|---|---|
| CAMSU | GGS | 1 | 2 | 4 | 5 | 6 | 8 | 9 | 10 | 13 | 14 |
| 19 | vc-c | 0.029 | 0.029 | 0.029 | 0.029 | 0.029 | 0.029 | 0.029 | 0.029 | 0.029 | 0.029 |
| 19 | m | 0.029 | 0.029 | 0.029 | 0.029 | 0.029 | 0.029 | 0.029 | 0.029 | 0.029 | 0.029 |
| 19 | f-vf | 0.029 | 0.029 | 0.029 | 0.029 | 0.029 | 0.029 | 0.029 | 0.029 | 0.029 | 0.029 |
| 20 | vc-c | 0.029 | 0.029 | 0.029 | 0.029 | 0.029 | 0.029 | 0.029 | 0.029 | 0.029 | 0.029 |
| 20 | m | 0.029 | 0.029 | 0.029 | 0.029 | 0.029 | 0.029 | 0.029 | 0.029 | 0.029 | 0.029 |
| 20 | f-vf | 0.029 | 0.029 | 0.029 | 0.029 | 0.029 | 0.029 | 0.029 | 0.029 | 0.029 | 0.029 |
| 21 | vc-c | 0.029 | 0.029 | 0.029 | 0.029 | 0.029 | 0.029 | 0.029 | 0.029 | 0.029 | 0.029 |
| 21 | m | 0.029 | 0.029 | 0.029 | 0.029 | 0.029 | 0.029 | 0.029 | 0.029 | 0.029 | 0.029 |
| 21 | f-vf | 0.029 | 0.029 | 0.029 | 0.029 | 0.029 | 0.029 | 0.029 | 0.029 | 0.029 | 0.029 |
| 25 | vc-c | 0.029 | 0.029 | 0.029 | 0.029 | 0.029 | 0.029 | 0.029 | 0.029 | 0.029 | 0.029 |
| 25 | m | 0.029 | 0.029 | 0.029 | 0.029 | 0.029 | 0.029 | 0.029 | 0.029 | 0.029 | 0.029 |
| 25 | f-vf | 0.029 | 0.029 | 0.029 | 0.029 | 0.029 | 0.029 | 0.029 | 0.029 | 0.029 | 0.029 |
| 26 | vc-c | 0.029 | 0.029 | 0.029 | 0.029 | 0.029 | 0.029 | 0.029 | 0.029 | 0.029 | 0.029 |
| 26 | m | 0.029 | 0.029 | 0.029 | 0.029 | 0.029 | 0.029 | 0.029 | 0.029 | 0.029 | 0.029 |
| 26 | f-vf | 0.029 | 0.029 | 0.029 | 0.029 | 0.029 | 0.029 | 0.029 | 0.029 | 0.029 | 0.029 |
| 27 | vc-c | 0.029 | 0.029 | 0.029 | 0.029 | 0.029 | 0.029 | 0.029 | 0.029 | 0.029 | 0.029 |
| 27 | m | 0.029 | 0.029 | 0.029 | 0.029 | 0.029 | 0.029 | 0.029 | 0.029 | 0.029 | 0.029 |
| 27 | f-vf | 0.029 | 0.029 | 0.029 | 0.029 | 0.029 | 0.029 | 0.029 | 0.029 | 0.029 | 0.029 |
| 28 | vc-c | 0.029 | 0.029 | 0.029 | 0.029 | 0.029 | 0.029 | 0.029 | 0.029 | 0.029 | 0.029 |
| 28 | m | 0.029 | 0.029 | 0.029 | 0.029 | 0.029 | 0.029 | 0.029 | 0.029 | 0.029 | 0.029 |
| 28 | f-vf | 0.029 | 0.029 | 0.029 | 0.029 | 0.029 | 0.029 | 0.029 | 0.029 | 0.029 | 0.029 |
| 33 | vc-c | 0.029 | 0.029 | 0.029 | 0.029 | 0.029 | 0.029 | 0.029 | 0.029 | 0.029 | 0.029 |
| 33 | m | 0.029 | 0.029 | 0.029 | 0.029 | 0.029 | 0.029 | 0.029 | 0.029 | 0.029 | 0.029 |
| 33 | f-vf | 0.029 | 0.029 | 0.029 | 0.029 | 0.029 | 0.029 | 0.029 | 0.029 | 0.029 | 0.029 |
| 34 | vc-c | 0.029 | 0.029 | 0.029 | 0.029 | 0.029 | 0.029 | 0.029 | 0.029 | 0.029 | 0.029 |
| 34 | m | 0.029 | 0.029 | 0.029 | 0.029 | 0.029 | 0.029 | 0.029 | 0.029 | 0.029 | 0.029 |
| 34 | f-vf | 0.029 | 0.029 | 0.029 | 0.029 | 0.029 | 0.029 | 0.029 | 0.029 | 0.029 | 0.029 |
| 35 | vc-c | 0.029 | 0.029 | 0.029 | 0.029 | 0.029 | 0.029 | 0.029 | 0.029 | 0.029 | 0.029 |
| 35 | m | 0.029 | 0.029 | 0.029 | 0.029 | 0.029 | 0.029 | 0.029 | 0.029 | 0.029 | 0.029 |
| 35 | f-vf | 0.029 | 0.029 | 0.029 | 0.029 | 0.029 | 0.029 | 0.029 | 0.029 | 0.029 | 0.029 |
| 36 | vc-c | 0.029 | 0.029 | 0.029 | 0.029 | 0.029 | 0.029 | 0.029 | 0.029 | 0.029 | 0.029 |
| 36 | m | 0.029 | 0.029 | 0.029 | 0.029 | 0.029 | 0.029 | 0.029 | 0.029 | 0.029 | 0.029 |
| 36 | f-vf | 0.029 | 0.029 | 0.029 | 0.029 | 0.029 | 0.029 | 0.029 | 0.029 | 0.029 | 0.029 |
| 42 | vc-c | 0.029 | 0.029 | 0.029 | 0.029 | 0.029 | 0.029 | 0.029 | 0.029 | 0.029 | 0.029 |
| 42 | m | 0.029 | 0.029 | 0.029 | 0.029 | 0.029 | 0.029 | 0.029 | 0.029 | 0.029 | 0.029 |
| 42 | f-vf | 0.029 | 0.029 | 0.029 | 0.029 | 0.029 | 0.029 | 0.029 | 0.029 | 0.029 | 0.029 |

TABLE C36.1.2-continued

| Probability table for Node FCAMSU | | | | | | | | | | |
|---|---|---|---|---|---|---|---|---|---|---|
| Modified | Final CAMSU Sand | | | | | | | | | |
| CAMSU | 15 | 18 | 19 | 20 | 21 | 25 | 26 | 27 | 28 | 33 |
| 19 | 0.029 | 0.029 | 0.029 | 0.029 | 0.029 | 0.029 | 0.029 | 0.029 | 0.029 | 0.029 |
| 19 | 0.029 | 0.029 | 0.029 | 0.029 | 0.029 | 0.029 | 0.029 | 0.029 | 0.029 | 0.029 |
| 19 | 0.029 | 0.029 | 0.029 | 0.029 | 0.029 | 0.029 | 0.029 | 0.029 | 0.029 | 0.029 |
| 20 | 0.029 | 0.029 | 0.029 | 0.029 | 0.029 | 0.029 | 0.029 | 0.029 | 0.029 | 0.029 |
| 20 | 0.029 | 0.029 | 0.029 | 0.029 | 0.029 | 0.029 | 0.029 | 0.029 | 0.029 | 0.029 |
| 20 | 0.029 | 0.029 | 0.029 | 0.029 | 0.029 | 0.029 | 0.029 | 0.029 | 0.029 | 0.029 |
| 21 | 0.029 | 0.029 | 0.029 | 0.029 | 0.029 | 0.029 | 0.029 | 0.029 | 0.029 | 0.029 |
| 21 | 0.029 | 0.029 | 0.029 | 0.029 | 0.029 | 0.029 | 0.029 | 0.029 | 0.029 | 0.029 |
| 21 | 0.029 | 0.029 | 0.029 | 0.029 | 0.029 | 0.029 | 0.029 | 0.029 | 0.029 | 0.029 |
| 25 | 0.029 | 0.029 | 0.029 | 0.029 | 0.029 | 0.029 | 0.029 | 0.029 | 0.029 | 0.029 |
| 25 | 0.029 | 0.029 | 0.029 | 0.029 | 0.029 | 0.029 | 0.029 | 0.029 | 0.029 | 0.029 |
| 25 | 0.029 | 0.029 | 0.029 | 0.029 | 0.029 | 0.029 | 0.029 | 0.029 | 0.029 | 0.029 |
| 26 | 0.029 | 0.029 | 0.029 | 0.029 | 0.029 | 0.029 | 0.029 | 0.029 | 0.029 | 0.029 |
| 26 | 0.029 | 0.029 | 0.029 | 0.029 | 0.029 | 0.029 | 0.029 | 0.029 | 0.029 | 0.029 |
| 26 | 0.029 | 0.029 | 0.029 | 0.029 | 0.029 | 0.029 | 0.029 | 0.029 | 0.029 | 0.029 |
| 27 | 0.029 | 0.029 | 0.029 | 0.029 | 0.029 | 0.029 | 0.029 | 0.029 | 0.029 | 0.029 |
| 27 | 0.029 | 0.029 | 0.029 | 0.029 | 0.029 | 0.029 | 0.029 | 0.029 | 0.029 | 0.029 |
| 27 | 0.029 | 0.029 | 0.029 | 0.029 | 0.029 | 0.029 | 0.029 | 0.029 | 0.029 | 0.029 |
| 28 | 0.029 | 0.029 | 0.029 | 0.029 | 0.029 | 0.029 | 0.029 | 0.029 | 0.029 | 0.029 |
| 28 | 0.029 | 0.029 | 0.029 | 0.029 | 0.029 | 0.029 | 0.029 | 0.029 | 0.029 | 0.029 |
| 28 | 0.029 | 0.029 | 0.029 | 0.029 | 0.029 | 0.029 | 0.029 | 0.029 | 0.029 | 0.029 |
| 33 | 0.029 | 0.029 | 0.029 | 0.029 | 0.029 | 0.029 | 0.029 | 0.029 | 0.029 | 0.029 |
| 33 | 0.029 | 0.029 | 0.029 | 0.029 | 0.029 | 0.029 | 0.029 | 0.029 | 0.029 | 0.029 |
| 33 | 0.029 | 0.029 | 0.029 | 0.029 | 0.029 | 0.029 | 0.029 | 0.029 | 0.029 | 0.029 |
| 34 | 0.029 | 0.029 | 0.029 | 0.029 | 0.029 | 0.029 | 0.029 | 0.029 | 0.029 | 0.029 |
| 34 | 0.029 | 0.029 | 0.029 | 0.029 | 0.029 | 0.029 | 0.029 | 0.029 | 0.029 | 0.029 |
| 34 | 0.029 | 0.029 | 0.029 | 0.029 | 0.029 | 0.029 | 0.029 | 0.029 | 0.029 | 0.029 |
| 35 | 0.029 | 0.029 | 0.029 | 0.029 | 0.029 | 0.029 | 0.029 | 0.029 | 0.029 | 0.029 |
| 35 | 0.029 | 0.029 | 0.029 | 0.029 | 0.029 | 0.029 | 0.029 | 0.029 | 0.029 | 0.029 |
| 35 | 0.029 | 0.029 | 0.029 | 0.029 | 0.029 | 0.029 | 0.029 | 0.029 | 0.029 | 0.029 |
| 36 | 0.029 | 0.029 | 0.029 | 0.029 | 0.029 | 0.029 | 0.029 | 0.029 | 0.029 | 0.029 |
| 36 | 0.029 | 0.029 | 0.029 | 0.029 | 0.029 | 0.029 | 0.029 | 0.029 | 0.029 | 0.029 |
| 36 | 0.029 | 0.029 | 0.029 | 0.029 | 0.029 | 0.029 | 0.029 | 0.029 | 0.029 | 0.029 |
| 42 | 0.029 | 0.029 | 0.029 | 0.029 | 0.029 | 0.029 | 0.029 | 0.029 | 0.029 | 0.029 |
| 42 | 0.029 | 0.029 | 0.029 | 0.029 | 0.029 | 0.029 | 0.029 | 0.029 | 0.029 | 0.029 |
| 42 | 0.029 | 0.029 | 0.029 | 0.029 | 0.029 | 0.029 | 0.029 | 0.029 | 0.029 | 0.029 |

TABLE C36.1.3

| Probability table for Node FCAMSU | | | | | | | | | | | |
|---|---|---|---|---|---|---|---|---|---|---|---|
| Modified | | Final CAMSU Sand | | | | | | | | | |
| CAMSU | GGS | 1 | 2 | 4 | 5 | 6 | 8 | 9 | 10 | 13 | 14 |
| 43 | vc-c | 0.029 | 0.029 | 0.029 | 0.029 | 0.029 | 0.029 | 0.029 | 0.029 | 0.029 | 0.029 |
| 43 | m | 0.029 | 0.029 | 0.029 | 0.029 | 0.029 | 0.029 | 0.029 | 0.029 | 0.029 | 0.029 |
| 43 | f-vf | 0.029 | 0.029 | 0.029 | 0.029 | 0.029 | 0.029 | 0.029 | 0.029 | 0.029 | 0.029 |
| 44 | vc-c | 0.029 | 0.029 | 0.029 | 0.029 | 0.029 | 0.029 | 0.029 | 0.029 | 0.029 | 0.029 |
| 44 | m | 0.029 | 0.029 | 0.029 | 0.029 | 0.029 | 0.029 | 0.029 | 0.029 | 0.029 | 0.029 |
| 44 | f-vf | 0.029 | 0.029 | 0.029 | 0.029 | 0.029 | 0.029 | 0.029 | 0.029 | 0.029 | 0.029 |
| 45 | vc-c | 0.029 | 0.029 | 0.029 | 0.029 | 0.029 | 0.029 | 0.029 | 0.029 | 0.029 | 0.029 |
| 45 | m | 0.029 | 0.029 | 0.029 | 0.029 | 0.029 | 0.029 | 0.029 | 0.029 | 0.029 | 0.029 |
| 45 | f-vf | 0.029 | 0.029 | 0.029 | 0.029 | 0.029 | 0.029 | 0.029 | 0.029 | 0.029 | 0.029 |
| 52 | vc-c | 0.029 | 0.029 | 0.029 | 0.029 | 0.029 | 0.029 | 0.029 | 0.029 | 0.029 | 0.029 |
| 52 | m | 0.029 | 0.029 | 0.029 | 0.029 | 0.029 | 0.029 | 0.029 | 0.029 | 0.029 | 0.029 |
| 52 | f-vf | 0.029 | 0.029 | 0.029 | 0.029 | 0.029 | 0.029 | 0.029 | 0.029 | 0.029 | 0.029 |
| 53 | vc-c | 0.029 | 0.029 | 0.029 | 0.029 | 0.029 | 0.029 | 0.029 | 0.029 | 0.029 | 0.029 |
| 53 | m | 0.029 | 0.029 | 0.029 | 0.029 | 0.029 | 0.029 | 0.029 | 0.029 | 0.029 | 0.029 |
| 53 | f-vf | 0.029 | 0.029 | 0.029 | 0.029 | 0.029 | 0.029 | 0.029 | 0.029 | 0.029 | 0.029 |
| 54 | vc-c | 0.029 | 0.029 | 0.029 | 0.029 | 0.029 | 0.029 | 0.029 | 0.029 | 0.029 | 0.029 |
| 54 | m | 0.029 | 0.029 | 0.029 | 0.029 | 0.029 | 0.029 | 0.029 | 0.029 | 0.029 | 0.029 |
| 54 | f-vf | 0.029 | 0.029 | 0.029 | 0.029 | 0.029 | 0.029 | 0.029 | 0.029 | 0.029 | 0.029 |
| 55 | vc-c | 0.029 | 0.029 | 0.029 | 0.029 | 0.029 | 0.029 | 0.029 | 0.029 | 0.029 | 0.029 |
| 55 | m | 0.029 | 0.029 | 0.029 | 0.029 | 0.029 | 0.029 | 0.029 | 0.029 | 0.029 | 0.029 |
| 55 | f-vf | 0.029 | 0.029 | 0.029 | 0.029 | 0.029 | 0.029 | 0.029 | 0.029 | 0.029 | 0.029 |
| 63 | vc-c | 0.029 | 0.029 | 0.029 | 0.029 | 0.029 | 0.029 | 0.029 | 0.029 | 0.029 | 0.029 |
| 63 | m | 0.029 | 0.029 | 0.029 | 0.029 | 0.029 | 0.029 | 0.029 | 0.029 | 0.029 | 0.029 |
| 63 | f-vf | 0.029 | 0.029 | 0.029 | 0.029 | 0.029 | 0.029 | 0.029 | 0.029 | 0.029 | 0.029 |
| 64 | vc-c | 0.029 | 0.029 | 0.029 | 0.029 | 0.029 | 0.029 | 0.029 | 0.029 | 0.029 | 0.029 |

TABLE C36.1.3-continued

Probability table for Node FCAMSU

| | | | | | | | | | | | |
|---|---|---|---|---|---|---|---|---|---|---|---|
| 64 | m | 0.029 | 0.029 | 0.029 | 0.029 | 0.029 | 0.029 | 0.029 | 0.029 | 0.029 | 0.029 |
| 64 | f-vf | 0.029 | 0.029 | 0.029 | 0.029 | 0.029 | 0.029 | 0.029 | 0.029 | 0.029 | 0.029 |
| 65 | vc-c | 0.029 | 0.029 | 0.029 | 0.029 | 0.029 | 0.029 | 0.029 | 0.029 | 0.029 | 0.029 |
| 65 | m | 0.029 | 0.029 | 0.029 | 0.029 | 0.029 | 0.029 | 0.029 | 0.029 | 0.029 | 0.029 |
| 65 | f-vf | 0.029 | 0.029 | 0.029 | 0.029 | 0.029 | 0.029 | 0.029 | 0.029 | 0.029 | 0.029 |
| 66 | vc-c | 0.029 | 0.029 | 0.029 | 0.029 | 0.029 | 0.029 | 0.029 | 0.029 | 0.029 | 0.029 |
| 66 | m | 0.029 | 0.029 | 0.029 | 0.029 | 0.029 | 0.029 | 0.029 | 0.029 | 0.029 | 0.029 |
| 66 | f-vf | 0.029 | 0.029 | 0.029 | 0.029 | 0.029 | 0.029 | 0.029 | 0.029 | 0.029 | 0.029 |

| Modified | Final CAMSU Sand | | | | | | | | | |
|---|---|---|---|---|---|---|---|---|---|---|
| CAMSU | 15 | 18 | 19 | 20 | 21 | 25 | 26 | 27 | 28 | 33 |
| 43 | 0.029 | 0.029 | 0.029 | 0.029 | 0.029 | 0.029 | 0.029 | 0.029 | 0.029 | 0.029 |
| 43 | 0.029 | 0.029 | 0.029 | 0.029 | 0.029 | 0.029 | 0.029 | 0.029 | 0.029 | 0.029 |
| 43 | 0.029 | 0.029 | 0.029 | 0.029 | 0.029 | 0.029 | 0.029 | 0.029 | 0.029 | 0.029 |
| 44 | 0.029 | 0.029 | 0.029 | 0.029 | 0.029 | 0.029 | 0.029 | 0.029 | 0.029 | 0.029 |
| 44 | 0.029 | 0.029 | 0.029 | 0.029 | 0.029 | 0.029 | 0.029 | 0.029 | 0.029 | 0.029 |
| 44 | 0.029 | 0.029 | 0.029 | 0.029 | 0.029 | 0.029 | 0.029 | 0.029 | 0.029 | 0.029 |
| 45 | 0.029 | 0.029 | 0.029 | 0.029 | 0.029 | 0.029 | 0.029 | 0.029 | 0.029 | 0.029 |
| 45 | 0.029 | 0.029 | 0.029 | 0.029 | 0.029 | 0.029 | 0.029 | 0.029 | 0.029 | 0.029 |
| 45 | 0.029 | 0.029 | 0.029 | 0.029 | 0.029 | 0.029 | 0.029 | 0.029 | 0.029 | 0.029 |
| 52 | 0.029 | 0.029 | 0.029 | 0.029 | 0.029 | 0.029 | 0.029 | 0.029 | 0.029 | 0.029 |
| 52 | 0.029 | 0.029 | 0.029 | 0.029 | 0.029 | 0.029 | 0.029 | 0.029 | 0.029 | 0.029 |
| 52 | 0.029 | 0.029 | 0.029 | 0.029 | 0.029 | 0.029 | 0.029 | 0.029 | 0.029 | 0.029 |
| 53 | 0.029 | 0.029 | 0.029 | 0.029 | 0.029 | 0.029 | 0.029 | 0.029 | 0.029 | 0.029 |
| 53 | 0.029 | 0.029 | 0.029 | 0.029 | 0.029 | 0.029 | 0.029 | 0.029 | 0.029 | 0.029 |
| 53 | 0.029 | 0.029 | 0.029 | 0.029 | 0.029 | 0.029 | 0.029 | 0.029 | 0.029 | 0.029 |
| 54 | 0.029 | 0.029 | 0.029 | 0.029 | 0.029 | 0.029 | 0.029 | 0.029 | 0.029 | 0.029 |
| 54 | 0.029 | 0.029 | 0.029 | 0.029 | 0.029 | 0.029 | 0.029 | 0.029 | 0.029 | 0.029 |
| 54 | 0.029 | 0.029 | 0.029 | 0.029 | 0.029 | 0.029 | 0.029 | 0.029 | 0.029 | 0.029 |
| 55 | 0.029 | 0.029 | 0.029 | 0.029 | 0.029 | 0.029 | 0.029 | 0.029 | 0.029 | 0.029 |
| 55 | 0.029 | 0.029 | 0.029 | 0.029 | 0.029 | 0.029 | 0.029 | 0.029 | 0.029 | 0.029 |
| 55 | 0.029 | 0.029 | 0.029 | 0.029 | 0.029 | 0.029 | 0.029 | 0.029 | 0.029 | 0.029 |
| 63 | 0.029 | 0.029 | 0.029 | 0.029 | 0.029 | 0.029 | 0.029 | 0.029 | 0.029 | 0.029 |
| 63 | 0.029 | 0.029 | 0.029 | 0.029 | 0.029 | 0.029 | 0.029 | 0.029 | 0.029 | 0.029 |
| 63 | 0.029 | 0.029 | 0.029 | 0.029 | 0.029 | 0.029 | 0.029 | 0.029 | 0.029 | 0.029 |
| 64 | 0.029 | 0.029 | 0.029 | 0.029 | 0.029 | 0.029 | 0.029 | 0.029 | 0.029 | 0.029 |
| 64 | 0.029 | 0.029 | 0.029 | 0.029 | 0.029 | 0.029 | 0.029 | 0.029 | 0.029 | 0.029 |
| 64 | 0.029 | 0.029 | 0.029 | 0.029 | 0.029 | 0.029 | 0.029 | 0.029 | 0.029 | 0.029 |
| 65 | 0.029 | 0.029 | 0.029 | 0.029 | 0.029 | 0.029 | 0.029 | 0.029 | 0.029 | 0.029 |
| 65 | 0.029 | 0.029 | 0.029 | 0.029 | 0.029 | 0.029 | 0.029 | 0.029 | 0.029 | 0.029 |
| 65 | 0.029 | 0.029 | 0.029 | 0.029 | 0.029 | 0.029 | 0.029 | 0.029 | 0.029 | 0.029 |
| 66 | 0.029 | 0.029 | 0.029 | 0.029 | 0.029 | 0.029 | 0.029 | 0.029 | 0.029 | 0.029 |
| 66 | 0.029 | 0.029 | 0.029 | 0.029 | 0.029 | 0.029 | 0.029 | 0.029 | 0.029 | 0.029 |
| 66 | 0.029 | 0.029 | 0.029 | 0.029 | 0.029 | 0.029 | 0.029 | 0.029 | 0.029 | 0.029 |

TABLE C36.2.1

Probability table for Node FCAMSU

| Modified | | Final CAMSU Sand | | | | | | | | | | | | | | |
|---|---|---|---|---|---|---|---|---|---|---|---|---|---|---|---|---|
| CAMSU | GGS | 34 | 35 | 36 | 42 | 43 | 44 | 45 | 52 | 53 | 54 | 55 | 63 | 64 | 65 | 66 |
| 1 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 1 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 1 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 2 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 2 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 2 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 4 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 4 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 4 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 5 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 5 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 5 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 6 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 6 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 6 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 8 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 8 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 8 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 9 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |

TABLE C36.2.1-continued

Probability table for Node FCAMSU

| Modified | | Final CAMSU Sand | | | | | | | | | | | | | | |
|---|---|---|---|---|---|---|---|---|---|---|---|---|---|---|---|---|
| CAMSU | GGS | 34 | 35 | 36 | 42 | 43 | 44 | 45 | 52 | 53 | 54 | 55 | 63 | 64 | 65 | 66 |
| 9 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 9 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 10 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 10 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 10 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 13 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 13 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 13 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 14 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 14 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 14 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 15 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 15 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 15 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 18 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 18 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 18 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |

TABLE C36.2.2

Probability table for Node FCAMSU

| Modified | | Final CAMSU Sand | | | | | | | | | | | | | | |
|---|---|---|---|---|---|---|---|---|---|---|---|---|---|---|---|---|
| CAMSU | GGS | 34 | 35 | 36 | 42 | 43 | 44 | 45 | 52 | 53 | 54 | 55 | 63 | 64 | 65 | 66 |
| 19 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 19 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 19 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 20 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 20 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 20 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 21 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 21 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 21 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 25 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 25 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 25 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 26 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 26 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 26 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 27 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 27 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 27 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 28 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 28 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 28 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 33 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 33 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 33 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 34 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 34 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 34 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 35 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 35 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 35 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 36 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 36 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 36 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 42 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 42 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 42 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |

TABLE C36.2.3

Probability table for Node FCAMSU

| Modified CAMSU | GGS | Final CAMSU Sand 34 | 35 | 36 | 42 | 43 | 44 | 45 | 52 | 53 | 54 | 55 | 63 | 64 | 65 | 66 |
|---|---|---|---|---|---|---|---|---|---|---|---|---|---|---|---|---|
| 43 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 43 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 43 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 44 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 44 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 44 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 45 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 45 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 45 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 52 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 52 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 52 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 53 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 53 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 53 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 54 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 54 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 54 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 55 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 55 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 55 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 63 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 63 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 63 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 64 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 64 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 64 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 65 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 65 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 65 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 66 | vc-c | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 66 | m | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |
| 66 | f-vf | 0.029 | 0.029 | 0.029 | 0.029 | 0.029 | 0.029 | 0.029 | 0.029 | 0.029 | 0.029 | 0.029 | 0.029 | 0.029 | 0.029 | 0.029 |

TABLE C37.1.1

Probability table for Node FCISU

| Modified CISU | GGS | Final CISU Sand 10 | 14 | 15 | 19 | 20 | 21 | 25 | 26 | 27 | 28 |
|---|---|---|---|---|---|---|---|---|---|---|---|
| 10 | vc-c | 0.038 | 0.038 | 0.038 | 0.038 | 0.038 | 0.038 | 0.038 | 0.038 | 0.038 | 0.038 |
| 10 | m | 0.038 | 0.038 | 0.038 | 0.038 | 0.038 | 0.038 | 0.038 | 0.038 | 0.038 | 0.038 |
| 10 | f-vf | 0.038 | 0.038 | 0.038 | 0.038 | 0.038 | 0.038 | 0.038 | 0.038 | 0.038 | 0.038 |
| 14 | vc-c | 0.038 | 0.038 | 0.038 | 0.038 | 0.038 | 0.038 | 0.038 | 0.038 | 0.038 | 0.038 |
| 14 | m | 0.038 | 0.038 | 0.038 | 0.038 | 0.038 | 0.038 | 0.038 | 0.038 | 0.038 | 0.038 |
| 14 | f-vf | 0.038 | 0.038 | 0.038 | 0.038 | 0.038 | 0.038 | 0.038 | 0.038 | 0.038 | 0.038 |
| 15 | vc-c | 0.038 | 0.038 | 0.038 | 0.038 | 0.038 | 0.038 | 0.038 | 0.038 | 0.038 | 0.038 |
| 15 | m | 0.038 | 0.038 | 0.038 | 0.038 | 0.038 | 0.038 | 0.038 | 0.038 | 0.038 | 0.038 |
| 15 | f-vf | 0.038 | 0.038 | 0.038 | 0.038 | 0.038 | 0.038 | 0.038 | 0.038 | 0.038 | 0.038 |
| 19 | vc-c | 0.038 | 0.038 | 0.038 | 0.038 | 0.038 | 0.038 | 0.038 | 0.038 | 0.038 | 0.038 |
| 19 | m | 0.038 | 0.038 | 0.038 | 0.038 | 0.038 | 0.038 | 0.038 | 0.038 | 0.038 | 0.038 |
| 19 | f-vf | 0.038 | 0.038 | 0.038 | 0.038 | 0.038 | 0.038 | 0.038 | 0.038 | 0.038 | 0.038 |
| 20 | vc-c | 0.038 | 0.038 | 0.038 | 0.038 | 0.038 | 0.038 | 0.038 | 0.038 | 0.038 | 0.038 |
| 20 | m | 0.038 | 0.038 | 0.038 | 0.038 | 0.038 | 0.038 | 0.038 | 0.038 | 0.038 | 0.038 |
| 20 | f-vf | 0.038 | 0.038 | 0.038 | 0.038 | 0.038 | 0.038 | 0.038 | 0.038 | 0.038 | 0.038 |
| 21 | vc-c | 0.038 | 0.038 | 0.038 | 0.038 | 0.038 | 0.038 | 0.038 | 0.038 | 0.038 | 0.038 |
| 21 | m | 0.038 | 0.038 | 0.038 | 0.038 | 0.038 | 0.038 | 0.038 | 0.038 | 0.038 | 0.038 |
| 21 | f-vf | 0.038 | 0.038 | 0.038 | 0.038 | 0.038 | 0.038 | 0.038 | 0.038 | 0.038 | 0.038 |
| 25 | vc-c | 0.038 | 0.038 | 0.038 | 0.038 | 0.038 | 0.038 | 0.038 | 0.038 | 0.038 | 0.038 |
| 25 | m | 0.038 | 0.038 | 0.038 | 0.038 | 0.038 | 0.038 | 0.038 | 0.038 | 0.038 | 0.038 |
| 25 | f-vf | 0.038 | 0.038 | 0.038 | 0.038 | 0.038 | 0.038 | 0.038 | 0.038 | 0.038 | 0.038 |
| 26 | vc-c | 0.038 | 0.038 | 0.038 | 0.038 | 0.038 | 0.038 | 0.038 | 0.038 | 0.038 | 0.038 |
| 26 | m | 0.038 | 0.038 | 0.038 | 0.038 | 0.038 | 0.038 | 0.038 | 0.038 | 0.038 | 0.038 |
| 26 | f-vf | 0.038 | 0.038 | 0.038 | 0.038 | 0.038 | 0.038 | 0.038 | 0.038 | 0.038 | 0.038 |
| 27 | vc-c | 0.038 | 0.038 | 0.038 | 0.038 | 0.038 | 0.038 | 0.038 | 0.038 | 0.038 | 0.038 |
| 27 | m | 0.038 | 0.038 | 0.038 | 0.038 | 0.038 | 0.038 | 0.038 | 0.038 | 0.038 | 0.038 |
| 27 | f-vf | 0.038 | 0.038 | 0.038 | 0.038 | 0.038 | 0.038 | 0.038 | 0.038 | 0.038 | 0.038 |
| 28 | vc-c | 0.038 | 0.038 | 0.038 | 0.038 | 0.038 | 0.038 | 0.038 | 0.038 | 0.038 | 0.038 |

TABLE C37.1.1-continued

Probability table for Node FCISU

| | | | | | | | | | | | |
|---|---|---|---|---|---|---|---|---|---|---|---|
| 28 | m | 0.038 | 0.038 | 0.038 | 0.038 | 0.038 | 0.038 | 0.038 | 0.038 | 0.038 | 0.038 |
| 28 | f-vf | 0.038 | 0.038 | 0.038 | 0.038 | 0.038 | 0.038 | 0.038 | 0.038 | 0.038 | 0.038 |
| 33 | vc-c | 0.038 | 0.038 | 0.038 | 0.038 | 0.038 | 0.038 | 0.038 | 0.038 | 0.038 | 0.038 |
| 33 | m | 0.038 | 0.038 | 0.038 | 0.038 | 0.038 | 0.038 | 0.038 | 0.038 | 0.038 | 0.038 |
| 33 | f-vf | 0.038 | 0.038 | 0.038 | 0.038 | 0.038 | 0.038 | 0.038 | 0.038 | 0.038 | 0.038 |
| 34 | vc-c | 0.038 | 0.038 | 0.038 | 0.038 | 0.038 | 0.038 | 0.038 | 0.038 | 0.038 | 0.038 |
| 34 | m | 0.038 | 0.038 | 0.038 | 0.038 | 0.038 | 0.038 | 0.038 | 0.038 | 0.038 | 0.038 |
| 34 | f-vf | 0.038 | 0.038 | 0.038 | 0.038 | 0.038 | 0.038 | 0.038 | 0.038 | 0.038 | 0.038 |

| Modified | Final CISU Sand | | | | | | | | | |
|---|---|---|---|---|---|---|---|---|---|---|
| CISU | 33 | 34 | 35 | 36 | 42 | 43 | 44 | 45 | 52 | 53 |
| 10 | 0.038 | 0.038 | 0.038 | 0.038 | 0.038 | 0.038 | 0.038 | 0.038 | 0.038 | 0.038 |
| 10 | 0.038 | 0.038 | 0.038 | 0.038 | 0.038 | 0.038 | 0.038 | 0.038 | 0.038 | 0.038 |
| 10 | 0.038 | 0.038 | 0.038 | 0.038 | 0.038 | 0.038 | 0.038 | 0.038 | 0.038 | 0.038 |
| 14 | 0.038 | 0.038 | 0.038 | 0.038 | 0.038 | 0.038 | 0.038 | 0.038 | 0.038 | 0.038 |
| 14 | 0.038 | 0.038 | 0.038 | 0.038 | 0.038 | 0.038 | 0.038 | 0.038 | 0.038 | 0.038 |
| 14 | 0.038 | 0.038 | 0.038 | 0.038 | 0.038 | 0.038 | 0.038 | 0.038 | 0.038 | 0.038 |
| 15 | 0.038 | 0.038 | 0.038 | 0.038 | 0.038 | 0.038 | 0.038 | 0.038 | 0.038 | 0.038 |
| 15 | 0.038 | 0.038 | 0.038 | 0.038 | 0.038 | 0.038 | 0.038 | 0.038 | 0.038 | 0.038 |
| 15 | 0.038 | 0.038 | 0.038 | 0.038 | 0.038 | 0.038 | 0.038 | 0.038 | 0.038 | 0.038 |
| 19 | 0.038 | 0.038 | 0.038 | 0.038 | 0.038 | 0.038 | 0.038 | 0.038 | 0.038 | 0.038 |
| 19 | 0.038 | 0.038 | 0.038 | 0.038 | 0.038 | 0.038 | 0.038 | 0.038 | 0.038 | 0.038 |
| 19 | 0.038 | 0.038 | 0.038 | 0.038 | 0.038 | 0.038 | 0.038 | 0.038 | 0.038 | 0.038 |
| 20 | 0.038 | 0.038 | 0.038 | 0.038 | 0.038 | 0.038 | 0.038 | 0.038 | 0.038 | 0.038 |
| 20 | 0.038 | 0.038 | 0.038 | 0.038 | 0.038 | 0.038 | 0.038 | 0.038 | 0.038 | 0.038 |
| 20 | 0.038 | 0.038 | 0.038 | 0.038 | 0.038 | 0.038 | 0.038 | 0.038 | 0.038 | 0.038 |
| 21 | 0.038 | 0.038 | 0.038 | 0.038 | 0.038 | 0.038 | 0.038 | 0.038 | 0.038 | 0.038 |
| 21 | 0.038 | 0.038 | 0.038 | 0.038 | 0.038 | 0.038 | 0.038 | 0.038 | 0.038 | 0.038 |
| 21 | 0.038 | 0.038 | 0.038 | 0.038 | 0.038 | 0.038 | 0.038 | 0.038 | 0.038 | 0.038 |
| 25 | 0.038 | 0.038 | 0.038 | 0.038 | 0.038 | 0.038 | 0.038 | 0.038 | 0.038 | 0.038 |
| 25 | 0.038 | 0.038 | 0.038 | 0.038 | 0.038 | 0.038 | 0.038 | 0.038 | 0.038 | 0.038 |
| 25 | 0.038 | 0.038 | 0.038 | 0.038 | 0.038 | 0.038 | 0.038 | 0.038 | 0.038 | 0.038 |
| 26 | 0.038 | 0.038 | 0.038 | 0.038 | 0.038 | 0.038 | 0.038 | 0.038 | 0.038 | 0.038 |
| 26 | 0.038 | 0.038 | 0.038 | 0.038 | 0.038 | 0.038 | 0.038 | 0.038 | 0.038 | 0.038 |
| 26 | 0.038 | 0.038 | 0.038 | 0.038 | 0.038 | 0.038 | 0.038 | 0.038 | 0.038 | 0.038 |
| 27 | 0.038 | 0.038 | 0.038 | 0.038 | 0.038 | 0.038 | 0.038 | 0.038 | 0.038 | 0.038 |
| 27 | 0.038 | 0.038 | 0.038 | 0.038 | 0.038 | 0.038 | 0.038 | 0.038 | 0.038 | 0.038 |
| 27 | 0.038 | 0.038 | 0.038 | 0.038 | 0.038 | 0.038 | 0.038 | 0.038 | 0.038 | 0.038 |
| 28 | 0.038 | 0.038 | 0.038 | 0.038 | 0.038 | 0.038 | 0.038 | 0.038 | 0.038 | 0.038 |
| 28 | 0.038 | 0.038 | 0.038 | 0.038 | 0.038 | 0.038 | 0.038 | 0.038 | 0.038 | 0.038 |
| 28 | 0.038 | 0.038 | 0.038 | 0.038 | 0.038 | 0.038 | 0.038 | 0.038 | 0.038 | 0.038 |
| 33 | 0.038 | 0.038 | 0.038 | 0.038 | 0.038 | 0.038 | 0.038 | 0.038 | 0.038 | 0.038 |
| 33 | 0.038 | 0.038 | 0.038 | 0.038 | 0.038 | 0.038 | 0.038 | 0.038 | 0.038 | 0.038 |
| 33 | 0.038 | 0.038 | 0.038 | 0.038 | 0.038 | 0.038 | 0.038 | 0.038 | 0.038 | 0.038 |
| 34 | 0.038 | 0.038 | 0.038 | 0.038 | 0.038 | 0.038 | 0.038 | 0.038 | 0.038 | 0.038 |
| 34 | 0.038 | 0.038 | 0.038 | 0.038 | 0.038 | 0.038 | 0.038 | 0.038 | 0.038 | 0.038 |
| 34 | 0.038 | 0.038 | 0.038 | 0.038 | 0.038 | 0.038 | 0.038 | 0.038 | 0.038 | 0.038 |

TABLE C37.1.2

Probability table for Node FCISU

| Modified | | Final CISU Sand | | | | | | | | | |
|---|---|---|---|---|---|---|---|---|---|---|---|
| CISU | GGS | 10 | 14 | 15 | 19 | 20 | 21 | 25 | 26 | 27 | 28 |
| 35 | vc-c | 0.038 | 0.038 | 0.038 | 0.038 | 0.038 | 0.038 | 0.038 | 0.038 | 0.038 | 0.038 |
| 35 | m | 0.038 | 0.038 | 0.038 | 0.038 | 0.038 | 0.038 | 0.038 | 0.038 | 0.038 | 0.038 |
| 35 | f-vf | 0.038 | 0.038 | 0.038 | 0.038 | 0.038 | 0.038 | 0.038 | 0.038 | 0.038 | 0.038 |
| 36 | vc-c | 0.038 | 0.038 | 0.038 | 0.038 | 0.038 | 0.038 | 0.038 | 0.038 | 0.038 | 0.038 |
| 36 | m | 0.038 | 0.038 | 0.038 | 0.038 | 0.038 | 0.038 | 0.038 | 0.038 | 0.038 | 0.038 |
| 36 | f-vf | 0.038 | 0.038 | 0.038 | 0.038 | 0.038 | 0.038 | 0.038 | 0.038 | 0.038 | 0.038 |
| 42 | vc-c | 0.038 | 0.038 | 0.038 | 0.038 | 0.038 | 0.038 | 0.038 | 0.038 | 0.038 | 0.038 |
| 42 | m | 0.038 | 0.038 | 0.038 | 0.038 | 0.038 | 0.038 | 0.038 | 0.038 | 0.038 | 0.038 |
| 42 | f-vf | 0.038 | 0.038 | 0.038 | 0.038 | 0.038 | 0.038 | 0.038 | 0.038 | 0.038 | 0.038 |
| 43 | vc-c | 0.038 | 0.038 | 0.038 | 0.038 | 0.038 | 0.038 | 0.038 | 0.038 | 0.038 | 0.038 |
| 43 | m | 0.038 | 0.038 | 0.038 | 0.038 | 0.038 | 0.038 | 0.038 | 0.038 | 0.038 | 0.038 |
| 43 | f-vf | 0.038 | 0.038 | 0.038 | 0.038 | 0.038 | 0.038 | 0.038 | 0.038 | 0.038 | 0.038 |
| 44 | vc-c | 0.038 | 0.038 | 0.038 | 0.038 | 0.038 | 0.038 | 0.038 | 0.038 | 0.038 | 0.038 |
| 44 | m | 0.038 | 0.038 | 0.038 | 0.038 | 0.038 | 0.038 | 0.038 | 0.038 | 0.038 | 0.038 |
| 44 | f-vf | 0.038 | 0.038 | 0.038 | 0.038 | 0.038 | 0.038 | 0.038 | 0.038 | 0.038 | 0.038 |
| 45 | vc-c | 0.038 | 0.038 | 0.038 | 0.038 | 0.038 | 0.038 | 0.038 | 0.038 | 0.038 | 0.038 |

TABLE C37.1.2-continued

Probability table for Node FCISU

| | | | | | | | | | | | |
|---|---|---|---|---|---|---|---|---|---|---|---|
| 45 | m | 0.038 | 0.038 | 0.038 | 0.038 | 0.038 | 0.038 | 0.038 | 0.038 | 0.038 | 0.038 |
| 45 | f-vf | 0.038 | 0.038 | 0.038 | 0.038 | 0.038 | 0.038 | 0.038 | 0.038 | 0.038 | 0.038 |
| 52 | vc-c | 0.038 | 0.038 | 0.038 | 0.038 | 0.038 | 0.038 | 0.038 | 0.038 | 0.038 | 0.038 |
| 52 | m | 0.038 | 0.038 | 0.038 | 0.038 | 0.038 | 0.038 | 0.038 | 0.038 | 0.038 | 0.038 |
| 52 | f-vf | 0.038 | 0.038 | 0.038 | 0.038 | 0.038 | 0.038 | 0.038 | 0.038 | 0.038 | 0.038 |
| 53 | vc-c | 0.038 | 0.038 | 0.038 | 0.038 | 0.038 | 0.038 | 0.038 | 0.038 | 0.038 | 0.038 |
| 53 | m | 0.038 | 0.038 | 0.038 | 0.038 | 0.038 | 0.038 | 0.038 | 0.038 | 0.038 | 0.038 |
| 53 | f-vf | 0.038 | 0.038 | 0.038 | 0.038 | 0.038 | 0.038 | 0.038 | 0.038 | 0.038 | 0.038 |
| 54 | vc-c | 0.038 | 0.038 | 0.038 | 0.038 | 0.038 | 0.038 | 0.038 | 0.038 | 0.038 | 0.038 |
| 54 | m | 0.038 | 0.038 | 0.038 | 0.038 | 0.038 | 0.038 | 0.038 | 0.038 | 0.038 | 0.038 |
| 54 | f-vf | 0.038 | 0.038 | 0.038 | 0.038 | 0.038 | 0.038 | 0.038 | 0.038 | 0.038 | 0.038 |
| 55 | vc-c | 0.038 | 0.038 | 0.038 | 0.038 | 0.038 | 0.038 | 0.038 | 0.038 | 0.038 | 0.038 |
| 55 | m | 0.038 | 0.038 | 0.038 | 0.038 | 0.038 | 0.038 | 0.038 | 0.038 | 0.038 | 0.038 |
| 55 | f-vf | 0.038 | 0.038 | 0.038 | 0.038 | 0.038 | 0.038 | 0.038 | 0.038 | 0.038 | 0.038 |
| 63 | vc-c | 0.038 | 0.038 | 0.038 | 0.038 | 0.038 | 0.038 | 0.038 | 0.038 | 0.038 | 0.038 |
| 63 | m | 0.038 | 0.038 | 0.038 | 0.038 | 0.038 | 0.038 | 0.038 | 0.038 | 0.038 | 0.038 |
| 63 | f-vf | 0.038 | 0.038 | 0.038 | 0.038 | 0.038 | 0.038 | 0.038 | 0.038 | 0.038 | 0.038 |
| 64 | vc-c | 0.038 | 0.038 | 0.038 | 0.038 | 0.038 | 0.038 | 0.038 | 0.038 | 0.038 | 0.038 |
| 64 | m | 0.038 | 0.038 | 0.038 | 0.038 | 0.038 | 0.038 | 0.038 | 0.038 | 0.038 | 0.038 |
| 64 | f-vf | 0.038 | 0.038 | 0.038 | 0.038 | 0.038 | 0.038 | 0.038 | 0.038 | 0.038 | 0.038 |

| Modified | Final CISU Sand | | | | | | | | | |
|---|---|---|---|---|---|---|---|---|---|---|
| CISU | 33 | 34 | 35 | 36 | 42 | 43 | 44 | 45 | 52 | 53 |
| 35 | 0.038 | 0.038 | 0.038 | 0.038 | 0.038 | 0.038 | 0.038 | 0.038 | 0.038 | 0.038 |
| 35 | 0.038 | 0.038 | 0.038 | 0.038 | 0.038 | 0.038 | 0.038 | 0.038 | 0.038 | 0.038 |
| 35 | 0.038 | 0.038 | 0.038 | 0.038 | 0.038 | 0.038 | 0.038 | 0.038 | 0.038 | 0.038 |
| 36 | 0.038 | 0.038 | 0.038 | 0.038 | 0.038 | 0.038 | 0.038 | 0.038 | 0.038 | 0.038 |
| 36 | 0.038 | 0.038 | 0.038 | 0.038 | 0.038 | 0.038 | 0.038 | 0.038 | 0.038 | 0.038 |
| 36 | 0.038 | 0.038 | 0.038 | 0.038 | 0.038 | 0.038 | 0.038 | 0.038 | 0.038 | 0.038 |
| 42 | 0.038 | 0.038 | 0.038 | 0.038 | 0.038 | 0.038 | 0.038 | 0.038 | 0.038 | 0.038 |
| 42 | 0.038 | 0.038 | 0.038 | 0.038 | 0.038 | 0.038 | 0.038 | 0.038 | 0.038 | 0.038 |
| 42 | 0.038 | 0.038 | 0.038 | 0.038 | 0.038 | 0.038 | 0.038 | 0.038 | 0.038 | 0.038 |
| 43 | 0.038 | 0.038 | 0.038 | 0.038 | 0.038 | 0.038 | 0.038 | 0.038 | 0.038 | 0.038 |
| 43 | 0.038 | 0.038 | 0.038 | 0.038 | 0.038 | 0.038 | 0.038 | 0.038 | 0.038 | 0.038 |
| 43 | 0.038 | 0.038 | 0.038 | 0.038 | 0.038 | 0.038 | 0.038 | 0.038 | 0.038 | 0.038 |
| 44 | 0.038 | 0.038 | 0.038 | 0.038 | 0.038 | 0.038 | 0.038 | 0.038 | 0.038 | 0.038 |
| 44 | 0.038 | 0.038 | 0.038 | 0.038 | 0.038 | 0.038 | 0.038 | 0.038 | 0.038 | 0.038 |
| 44 | 0.038 | 0.038 | 0.038 | 0.038 | 0.038 | 0.038 | 0.038 | 0.038 | 0.038 | 0.038 |
| 45 | 0.038 | 0.038 | 0.038 | 0.038 | 0.038 | 0.038 | 0.038 | 0.038 | 0.038 | 0.038 |
| 45 | 0.038 | 0.038 | 0.038 | 0.038 | 0.038 | 0.038 | 0.038 | 0.038 | 0.038 | 0.038 |
| 45 | 0.038 | 0.038 | 0.038 | 0.038 | 0.038 | 0.038 | 0.038 | 0.038 | 0.038 | 0.038 |
| 52 | 0.038 | 0.038 | 0.038 | 0.038 | 0.038 | 0.038 | 0.038 | 0.038 | 0.038 | 0.038 |
| 52 | 0.038 | 0.038 | 0.038 | 0.038 | 0.038 | 0.038 | 0.038 | 0.038 | 0.038 | 0.038 |
| 52 | 0.038 | 0.038 | 0.038 | 0.038 | 0.038 | 0.038 | 0.038 | 0.038 | 0.038 | 0.038 |
| 53 | 0.038 | 0.038 | 0.038 | 0.038 | 0.038 | 0.038 | 0.038 | 0.038 | 0.038 | 0.038 |
| 53 | 0.038 | 0.038 | 0.038 | 0.038 | 0.038 | 0.038 | 0.038 | 0.038 | 0.038 | 0.038 |
| 53 | 0.038 | 0.038 | 0.038 | 0.038 | 0.038 | 0.038 | 0.038 | 0.038 | 0.038 | 0.038 |
| 54 | 0.038 | 0.038 | 0.038 | 0.038 | 0.038 | 0.038 | 0.038 | 0.038 | 0.038 | 0.038 |
| 54 | 0.038 | 0.038 | 0.038 | 0.038 | 0.038 | 0.038 | 0.038 | 0.038 | 0.038 | 0.038 |
| 54 | 0.038 | 0.038 | 0.038 | 0.038 | 0.038 | 0.038 | 0.038 | 0.038 | 0.038 | 0.038 |
| 55 | 0.038 | 0.038 | 0.038 | 0.038 | 0.038 | 0.038 | 0.038 | 0.038 | 0.038 | 0.038 |
| 55 | 0.038 | 0.038 | 0.038 | 0.038 | 0.038 | 0.038 | 0.038 | 0.038 | 0.038 | 0.038 |
| 55 | 0.038 | 0.038 | 0.038 | 0.038 | 0.038 | 0.038 | 0.038 | 0.038 | 0.038 | 0.038 |
| 63 | 0.038 | 0.038 | 0.038 | 0.038 | 0.038 | 0.038 | 0.038 | 0.038 | 0.038 | 0.038 |
| 63 | 0.038 | 0.038 | 0.038 | 0.038 | 0.038 | 0.038 | 0.038 | 0.038 | 0.038 | 0.038 |
| 63 | 0.038 | 0.038 | 0.038 | 0.038 | 0.038 | 0.038 | 0.038 | 0.038 | 0.038 | 0.038 |
| 64 | 0.038 | 0.038 | 0.038 | 0.038 | 0.038 | 0.038 | 0.038 | 0.038 | 0.038 | 0.038 |
| 64 | 0.038 | 0.038 | 0.038 | 0.038 | 0.038 | 0.038 | 0.038 | 0.038 | 0.038 | 0.038 |
| 64 | 0.038 | 0.038 | 0.038 | 0.038 | 0.038 | 0.038 | 0.038 | 0.038 | 0.038 | 0.038 |

TABLE C37.1.3

Probability table for Node FCISU

| Modified | | Final CISU Sand | | | | | | | | | |
|---|---|---|---|---|---|---|---|---|---|---|---|
| CISU | GGS | 10 | 14 | 15 | 19 | 20 | 21 | 25 | 26 | 27 | 28 |
| 65 | vc-c | 0.038 | 0.038 | 0.038 | 0.038 | 0.038 | 0.038 | 0.038 | 0.038 | 0.038 | 0.038 |
| 65 | m | 0.038 | 0.038 | 0.038 | 0.038 | 0.038 | 0.038 | 0.038 | 0.038 | 0.038 | 0.038 |
| 65 | f-vf | 0.038 | 0.038 | 0.038 | 0.038 | 0.038 | 0.038 | 0.038 | 0.038 | 0.038 | 0.038 |
| 66 | vc-c | 0.038 | 0.038 | 0.038 | 0.038 | 0.038 | 0.038 | 0.038 | 0.038 | 0.038 | 0.038 |

TABLE C37.1.3-continued

| Probability table for Node FCISU | | | | | | | | | | | |
|---|---|---|---|---|---|---|---|---|---|---|---|
| 66 | m | 0.038 | 0.038 | 0.038 | 0.038 | 0.038 | 0.038 | 0.038 | 0.038 | 0.038 | 0.038 |
| 66 | f-vf | 0.038 | 0.038 | 0.038 | 0.038 | 0.038 | 0.038 | 0.038 | 0.038 | 0.038 | 0.038 |

| Modified | Final CISU Sand | | | | | | | | | |
|---|---|---|---|---|---|---|---|---|---|---|
| CISU | 33 | 34 | 35 | 36 | 42 | 43 | 44 | 45 | 52 | 53 |
| 65 | 0.038 | 0.038 | 0.038 | 0.038 | 0.038 | 0.038 | 0.038 | 0.038 | 0.038 | 0.038 |
| 65 | 0.038 | 0.038 | 0.038 | 0.038 | 0.038 | 0.038 | 0.038 | 0.038 | 0.038 | 0.038 |
| 65 | 0.038 | 0.038 | 0.038 | 0.038 | 0.038 | 0.038 | 0.038 | 0.038 | 0.038 | 0.038 |
| 66 | 0.038 | 0.038 | 0.038 | 0.038 | 0.038 | 0.038 | 0.038 | 0.038 | 0.038 | 0.038 |
| 66 | 0.038 | 0.038 | 0.038 | 0.038 | 0.038 | 0.038 | 0.038 | 0.038 | 0.038 | 0.038 |
| 66 | 0.038 | 0.038 | 0.038 | 0.038 | 0.038 | 0.038 | 0.038 | 0.038 | 0.038 | 0.038 |

TABLE C37.2.1

Probability table for Node FCISU

| Modified | | Final CISU Sand | | | | | |
|---|---|---|---|---|---|---|---|
| CISU | GGS | 54 | 55 | 63 | 64 | 65 | 66 |
| 10 | vc-c | 0.038 | 0.038 | 0.038 | 0.038 | 0.038 | 0.038 |
| 10 | m | 0.038 | 0.038 | 0.038 | 0.038 | 0.038 | 0.038 |
| 10 | f-vf | 0.038 | 0.038 | 0.038 | 0.038 | 0.038 | 0.038 |
| 14 | vc-c | 0.038 | 0.038 | 0.038 | 0.038 | 0.038 | 0.038 |
| 14 | m | 0.038 | 0.038 | 0.038 | 0.038 | 0.038 | 0.038 |
| 14 | f-vf | 0.038 | 0.038 | 0.038 | 0.038 | 0.038 | 0.038 |
| 15 | vc-c | 0.038 | 0.038 | 0.038 | 0.038 | 0.038 | 0.038 |
| 15 | m | 0.038 | 0.038 | 0.038 | 0.038 | 0.038 | 0.038 |
| 15 | f-vf | 0.038 | 0.038 | 0.038 | 0.038 | 0.038 | 0.038 |
| 19 | vc-c | 0.038 | 0.038 | 0.038 | 0.038 | 0.038 | 0.038 |
| 19 | m | 0.038 | 0.038 | 0.038 | 0.038 | 0.038 | 0.038 |
| 19 | f-vf | 0.038 | 0.038 | 0.038 | 0.038 | 0.038 | 0.038 |
| 20 | vc-c | 0.038 | 0.038 | 0.038 | 0.038 | 0.038 | 0.038 |
| 20 | m | 0.038 | 0.038 | 0.038 | 0.038 | 0.038 | 0.038 |
| 20 | f-vf | 0.038 | 0.038 | 0.038 | 0.038 | 0.038 | 0.038 |
| 21 | vc-c | 0.038 | 0.038 | 0.038 | 0.038 | 0.038 | 0.038 |
| 21 | m | 0.038 | 0.038 | 0.038 | 0.038 | 0.038 | 0.038 |
| 21 | f-vf | 0.038 | 0.038 | 0.038 | 0.038 | 0.038 | 0.038 |
| 25 | vc-c | 0.038 | 0.038 | 0.038 | 0.038 | 0.038 | 0.038 |
| 25 | m | 0.038 | 0.038 | 0.038 | 0.038 | 0.038 | 0.038 |
| 25 | f-vf | 0.038 | 0.038 | 0.038 | 0.038 | 0.038 | 0.038 |
| 26 | vc-c | 0.038 | 0.038 | 0.038 | 0.038 | 0.038 | 0.038 |
| 26 | m | 0.038 | 0.038 | 0.038 | 0.038 | 0.038 | 0.038 |
| 26 | f-vf | 0.038 | 0.038 | 0.038 | 0.038 | 0.038 | 0.038 |
| 27 | vc-c | 0.038 | 0.038 | 0.038 | 0.038 | 0.038 | 0.038 |
| 27 | m | 0.038 | 0.038 | 0.038 | 0.038 | 0.038 | 0.038 |
| 27 | f-vf | 0.038 | 0.038 | 0.038 | 0.038 | 0.038 | 0.038 |
| 28 | vc-c | 0.038 | 0.038 | 0.038 | 0.038 | 0.038 | 0.038 |
| 28 | m | 0.038 | 0.038 | 0.038 | 0.038 | 0.038 | 0.038 |
| 28 | f-vf | 0.038 | 0.038 | 0.038 | 0.038 | 0.038 | 0.038 |
| 33 | vc-c | 0.038 | 0.038 | 0.038 | 0.038 | 0.038 | 0.038 |
| 33 | m | 0.038 | 0.038 | 0.038 | 0.038 | 0.038 | 0.038 |
| 33 | f-vf | 0.038 | 0.038 | 0.038 | 0.038 | 0.038 | 0.038 |
| 34 | vc-c | 0.038 | 0.038 | 0.038 | 0.038 | 0.038 | 0.038 |
| 34 | m | 0.038 | 0.038 | 0.038 | 0.038 | 0.038 | 0.038 |
| 34 | f-vf | 0.038 | 0.038 | 0.038 | 0.038 | 0.038 | 0.038 |

TABLE C37.2.2

Probability table for Node FCISU

| Modified | | Final CISU Sand | | | | | |
|---|---|---|---|---|---|---|---|
| CISU | GGS | 54 | 55 | 63 | 64 | 65 | 66 |
| 35 | vc-c | 0.038 | 0.038 | 0.038 | 0.038 | 0.038 | 0.038 |
| 35 | m | 0.038 | 0.038 | 0.038 | 0.038 | 0.038 | 0.038 |
| 35 | f-vf | 0.038 | 0.038 | 0.038 | 0.038 | 0.038 | 0.038 |
| 36 | vc-c | 0.038 | 0.038 | 0.038 | 0.038 | 0.038 | 0.038 |

TABLE C37.2.2-continued

Probability table for Node FCISU

| Modified | | Final CISU Sand | | | | | |
|---|---|---|---|---|---|---|---|
| CISU | GGS | 54 | 55 | 63 | 64 | 65 | 66 |
| 36 | m | 0.038 | 0.038 | 0.038 | 0.038 | 0.038 | 0.038 |
| 36 | f-vf | 0.038 | 0.038 | 0.038 | 0.038 | 0.038 | 0.038 |
| 42 | vc-c | 0.038 | 0.038 | 0.038 | 0.038 | 0.038 | 0.038 |
| 42 | m | 0.038 | 0.038 | 0.038 | 0.038 | 0.038 | 0.038 |
| 42 | f-vf | 0.038 | 0.038 | 0.038 | 0.038 | 0.038 | 0.038 |
| 43 | vc-c | 0.038 | 0.038 | 0.038 | 0.038 | 0.038 | 0.038 |
| 43 | m | 0.038 | 0.038 | 0.038 | 0.038 | 0.038 | 0.038 |
| 43 | f-vf | 0.038 | 0.038 | 0.038 | 0.038 | 0.038 | 0.038 |
| 44 | vc-c | 0.038 | 0.038 | 0.038 | 0.038 | 0.038 | 0.038 |
| 44 | m | 0.038 | 0.038 | 0.038 | 0.038 | 0.038 | 0.038 |
| 44 | f-vf | 0.038 | 0.038 | 0.038 | 0.038 | 0.038 | 0.038 |
| 45 | vc-c | 0.038 | 0.038 | 0.038 | 0.038 | 0.038 | 0.038 |
| 45 | m | 0.038 | 0.038 | 0.038 | 0.038 | 0.038 | 0.038 |
| 45 | f-vf | 0.038 | 0.038 | 0.038 | 0.038 | 0.038 | 0.038 |
| 52 | vc-c | 0.038 | 0.038 | 0.038 | 0.038 | 0.038 | 0.038 |
| 52 | m | 0.038 | 0.038 | 0.038 | 0.038 | 0.038 | 0.038 |
| 52 | f-vf | 0.038 | 0.038 | 0.038 | 0.038 | 0.038 | 0.038 |
| 53 | vc-c | 0.038 | 0.038 | 0.038 | 0.038 | 0.038 | 0.038 |
| 53 | m | 0.038 | 0.038 | 0.038 | 0.038 | 0.038 | 0.038 |
| 53 | f-vf | 0.038 | 0.038 | 0.038 | 0.038 | 0.038 | 0.038 |
| 54 | vc-c | 0.038 | 0.038 | 0.038 | 0.038 | 0.038 | 0.038 |
| 54 | m | 0.038 | 0.038 | 0.038 | 0.038 | 0.038 | 0.038 |
| 54 | f-vf | 0.038 | 0.038 | 0.038 | 0.038 | 0.038 | 0.038 |
| 55 | vc-c | 0.038 | 0.038 | 0.038 | 0.038 | 0.038 | 0.038 |
| 55 | m | 0.038 | 0.038 | 0.038 | 0.038 | 0.038 | 0.038 |
| 55 | f-vf | 0.038 | 0.038 | 0.038 | 0.038 | 0.038 | 0.038 |
| 63 | vc-c | 0.038 | 0.038 | 0.038 | 0.038 | 0.038 | 0.038 |
| 63 | m | 0.038 | 0.038 | 0.038 | 0.038 | 0.038 | 0.038 |
| 63 | f-vf | 0.038 | 0.038 | 0.038 | 0.038 | 0.038 | 0.038 |
| 64 | vc-c | 0.038 | 0.038 | 0.038 | 0.038 | 0.038 | 0.038 |
| 64 | m | 0.038 | 0.038 | 0.038 | 0.038 | 0.038 | 0.038 |
| 64 | f-vf | 0.038 | 0.038 | 0.038 | 0.038 | 0.038 | 0.038 |

TABLE C37.2.3

Probability table for Node FCISU

| Modified | | Final CISU Sand | | | | | |
|---|---|---|---|---|---|---|---|
| CISU | GGS | 54 | 55 | 63 | 64 | 65 | 66 |
| 65 | vc-c | 0.038 | 0.038 | 0.038 | 0.038 | 0.038 | 0.038 |
| 65 | m | 0.038 | 0.038 | 0.038 | 0.038 | 0.038 | 0.038 |
| 65 | f-vf | 0.038 | 0.038 | 0.038 | 0.038 | 0.038 | 0.038 |
| 66 | vc-c | 0.038 | 0.038 | 0.038 | 0.038 | 0.038 | 0.038 |
| 66 | m | 0.038 | 0.038 | 0.038 | 0.038 | 0.038 | 0.038 |
| 66 | f-vf | 0.038 | 0.038 | 0.038 | 0.038 | 0.038 | 0.038 |

What is claimed is:

1. A method for predicting sand-grain composition and sand texture comprising:

selecting a first set of system variables, said first set associated with sand-grain composition and sand texture;

selecting a second set of system variables, said second set being directly or indirectly causally related to said first set of variables;

obtaining or estimating data for each variable in the second set;

forming a network with nodes comprising both sets of variables, having directional links connecting interdependent nodes, said directional links honoring known causality relationships; and using a Bayesian Network algorithm with said data to solve the network for said first set of variables and their associated uncertainties.

2. The method of claim 1 further comprising:

appraising the quality of selected data; and including the quality appraisals in the network and in the application of the Bayesian Network algorithm.

3. The method of claim 1, where the system has a behavior, the method further comprising:

selecting the first set of variables and the second set of variables so that together they are sufficiently complete to account for the behavior of the system.

4. The method of claim 1, where forming the network comprises:

forming a third set of intermediate nodes interposed between at least some of the nodes representing the first set of system variables and at least some of the nodes representing the second set of system variables.

5. The method of claim 1, where selecting the first set of system variables comprises:

selecting one or more system variables associated with sand-grain composition; and selecting one or more system variables associated with sand texture.

6. The method of claim 1 where selecting the second set of system variables comprises:

selecting one or more system variables associated with hinterland geology;

selecting one or more system variables associated with hinterland weathering and transport; and selecting one or more system variables associated with basin transport and deposition.

7. A method for predicting sand-grain composition and sand texture comprising:

establishing one or more root nodes in a Bayesian network;

establishing one or more leaf nodes in the Bayesian network;

coupling the root nodes to the leaf nodes to enable the Bayesian network to predict sand-grain composition and texture.

8. The method of claim 7 where establishing the one or more root nodes comprises:

establishing one or more root nodes for hinterland geology;

establishing one or more root nodes for hinterland weathering and transport; and establishing one or more root nodes for basin transport and deposition.

9. The method of claim 8 where establishing one or more root nodes for hinterland geology comprises:

establishing a root node for tectonic setting.

10. The method of claim 8 where establishing one or more root nodes for hinterland weathering and transport comprises:

establishing a root node for climate;

establishing a root node for rate of hinterland uplift; and establishing a root node for hinterland transport distance.

11. The method of claim 8 where establishing one or more root nodes for basin transport and deposition comprises:

establishing a root node for rate of basin subsidence;

establishing a root node for basin fluvial transport distance; and establishing a root node for depositional facies.

12. The method of claim 7 where establishing one or more leaf nodes comprises:

establishing one or more leaf nodes for sand-grain composition; and establishing one or more leaf nodes for sand texture.

13. The method of claim 12 where establishing one or more leaf nodes for sand texture comprises:

establishing a leaf node for grain size;

establishing a leaf node for degree of sorting; and establishing a leaf node for deposited matrix abundance.

14. The method of claim 12 where establishing the leaf node for grain composition comprises:

establishing a leaf node for final CIBU sand;

establishing a leaf node for final CISU sand;

establishing a leaf node for final CAMBU sand;

establishing a leaf node for final CAMSU sand;

establishing a leaf node for final SAMV sand; and establishing a leaf node for final SAMP sand.

15. The method of claim 7 further comprising:

establishing one or more intermediate nodes; and where coupling the root nodes to the leaf nodes to enable the Bayesian network to predict sand-grain composition and texture comprises:

coupling at least some of the one or more root nodes to at least some of the one or more leaf nodes through the one or more intermediate nodes.

16. The method of claim 15 where coupling the root nodes to the leaf nodes to enable the Bayesian network to predict sand-grain composition and texture comprises:

coupling the root nodes to the leaf nodes in causal relationships that honor observations of natural systems.

17. The method of claim 15 where coupling the root nodes to the leaf nodes to enable the Bayesian network to predict sand-grain composition and texture comprises:

defining for each root node one or more outputs that connect to other nodes that the root node causes;

defining for each intermediate node:

one or more inputs that connect to the other nodes that cause the intermediate node;

one or more outputs that connect to other nodes that the intermediate node causes; and defining for each leaf node one or more inputs that connect to other nodes that cause the leaf node.

18. The method of claim 15 where establishing the one or more root nodes comprises:

creating a probability table for each root node;

each probability table having one or more predefined states; and each predefined state having associated with it a probability that the root node is in that state.

19. The method of claim 18 where creating the probability table for each root node comprises:

completing the probability table based on quantitative observations of a natural system associated with the root node.

20. The method of claim 19 further comprising:

modifying the probability table based on quantitative observations of the natural system associated with the root node.

21. The method of claim 15 where establishing the one or more leaf nodes comprises:

creating a probability table for each leaf node;

each probability table having a respective one or more predefined states; and each predefined state having associated with it a probability that the leaf node is in that state.

22. The method of claim 15 where each leaf node has a predefined number of inputs and where creating the probability table for each leaf node comprises:

creating a probability table having the respective predefined number of input dimensions.

23. The method of claim 22 where creating the probability table for each leaf node comprises:

completing the probability table with data reflecting quantitative observations of a natural system associated with the leaf node.

24. The method of claim 23 further comprising:

modifying the probability table based on quantitative observations of the natural system associated with the leaf node.

25. The method of claim 15 where establishing the one or more intermediate nodes comprises:

creating a probability table for each intermediate node;

each probability table having a respective one or more predefined states; and each predefined state having associated with it a probability that the intermediate node is in that state.

26. The method of claim 15 where each intermediate node has a predefined number of inputs and where creating the probability table for each intermediate node comprises:

creating a probability table having the respective predefined number of input dimensions.

27. The method of claim 26 where creating the probability table for each intermediate node comprises:

completing the probability table with data reflecting quantitative observations of a natural system associated with the intermediate node.

28. The method of claim 27 further comprising:

modifying the probability table based on quantitative observations of the natural system associated with the intermediate node.

29. A Bayesian network comprising:

one or more root nodes;

one or more leaf nodes;

the root nodes being coupled to the leaf nodes to enable the Bayesian network to predict sand-grain composition and texture.

30. The Bayesian network of claim 29 the one or more root nodes comprise:

one or more root nodes for hinterland geology;

one or more root nodes for hinterland weathering and transport; and one or more root nodes for basin transport and deposition.

31. The Bayesian network of claim 30 where the one or more root nodes for hinterland geology comprise:

a root node for tectonic setting; and a root node for dominant geologic units.

32. The Bayesian network of claim 30 where the one or more root nodes for hinterland weathering and transport comprise:

a root node for climate;

a root node for rate of hinterland uplift; and a root node for hinterland transport distance.

33. The Bayesian network of claim 30 where the one or more root nodes for basin transport and deposition comprise:

a root node for rate of basis subsidence;

a root node for basin fluvial transport distance; and a root node for depositional facies.

34. The Bayesian network of claim 29 where the one or more root nodes comprise:

one or more leaf nodes for sand-grain composition; and one or more leaf nodes for sand texture.

35. The Bayesian network of claim 34 where the one or more root nodes for sand texture comprise:

a leaf node for grain size;

a leaf node for degree of sorting; and a leaf node for deposited matrix abundance.

36. The Bayesian network of claim 35 where the leaf node for grain size comprises:

a leaf node for final CIBU sand;

a leaf node for final CISU sand;

a leaf node for final CAMBU sand;

a leaf node for final CAMSU sand;

a leaf node for final SAMV sand; and a leaf node for final SAMP sand.

37. The Bayesian network of claim 29 further comprising:

one or more intermediate nodes; and where the coupling between the root nodes and the leaf nodes to enable the Bayesian network to predict sand-grain composition and texture comprises:

at least some of the one or more root nodes be coupled to at least some of the one or more leaf nodes through the one or more intermediate nodes.

38. The Bayesian network of claim 37 where the coupling between the root nodes and the leaf nodes to enable the Bayesian network to predict sand-grain composition and texture comprises:

the root nodes being coupled to the leaf nodes in causal relationships that honor observations of natural systems.

39. The Bayesian network of claim 37 where the coupling between the root nodes and the leaf nodes to enable the Bayesian network to predict sand-grain composition and texture comprises:

for each root node, one or more outputs that connect to other nodes that the root node causes;

for each intermediate node:

one or more inputs that connect to the other nodes that cause the intermediate node;

one or more outputs that connect to other nodes that the intermediate node causes; and for each leaf node one or more inputs that connect to other nodes that cause the leaf node.

40. The Bayesian network of claim 37 where the one or more root nodes comprises:

a probability table for each root node;

each probability table having one or more predefined states; and each predefined state having associated with it a probability that the root node is in that state.

41. The Bayesian network of claim 40 where the probability table for each root node comprises:

data reflecting quantitative observations of a natural system associated with the root node.

42. The Bayesian network of claim 41 further comprising:

modifications to the probability table based on quantitative observations of the natural system associated with the root node.

43. The Bayesian network of claim 38 where the one or more leaf nodes comprises:

a probability table for each leaf node;

each probability table having a respective one or more predefined states; and each predefined state having associated with it a probability that the leaf node is in that state.

44. The Bayesian network of claim 38 where each leaf node has a predefined number of inputs and where creating a probability table for each leaf node comprises:

creating a probability table having the respective predefined number of input dimensions.

45. The Bayesian network of claim 44 where creating the probability table for each leaf node comprises:

data reflecting quantitative observations of a natural system associated with the leaf node.

46. The Bayesian network of claim 45 further comprising:

modifications the probability table based on quantitative observations of the natural system associated with the leaf node.

47. The Bayesian network of claim 38 where the one or more intermediate nodes comprises:

a probability table for each intermediate node;

each probability table having a respective one or more predefined states; and each predefined state having associated with it a probability that the intermediate node is in that state.

48. The Bayesian network of claim 38 where each intermediate node has a predefined number of inputs and where the probability table for each intermediate node comprises:

a respective predefined number of input dimensions.

49. The Bayesian network of claim 48 where the probability table for each intermediate node comprises:

data reflecting quantitative observations of a natural system associated with the intermediate node.

50. The Bayesian network of claim 49 further comprising:

modifications to the probability table based on quantitative observations of the natural system associated with the intermediate node.

51. A method for predicting porosity and permeability comprising:

predicting sand-grain composition and sand texture from tectonic setting, hinterland weathering and transport and basin transport and deposition using a Bayesian network; and predicting porosity and permeability from the predicted sand-grain composition and sand texture.

* * * * *